(12) United States Patent
Fang et al.

(10) Patent No.: US 12,046,085 B2
(45) Date of Patent: Jul. 23, 2024

(54) SYSTEM, METHOD, AND APPARATUS FOR MANAGING VEHICLE DATA COLLECTION

(71) Applicant: Sonatus, Inc., Sunnyvale, CA (US)

(72) Inventors: Yu Fang, Palo Alto, CA (US); Yixiang Chen, Palo Alto, CA (US)

(73) Assignee: Sonatus, Inc., Sunnyvale, CA (US)

( * ) Notice: Subject to any disclaimer, the term of this patent is extended or adjusted under 35 U.S.C. 154(b) by 0 days.

(21) Appl. No.: 18/123,195

(22) Filed: Mar. 17, 2023

(65) Prior Publication Data

US 2023/0298405 A1 Sep. 21, 2023

Related U.S. Application Data

(63) Continuation of application No. 17/469,148, filed on Sep. 8, 2021, now Pat. No. 11,721,137, which is a continuation of application No. 17/195,589, filed on Mar. 8, 2021, now Pat. No. 11,538,287, which is a continuation-in-part of application No. 17/027,167, filed on Sep. 21, 2020, now Pat. No. 11,411,823, and a continuation-in-part of application No. 17/027,187, filed on Sep. 21, 2020, now Pat. No. 11,228,496.

(Continued)

(51) Int. Cl.
| | |
|---|---|
| G06F 15/16 | (2006.01) |
| G06F 9/54 | (2006.01) |
| G07C 5/00 | (2006.01) |
| G07C 5/08 | (2006.01) |
| H04L 29/06 | (2006.01) |
| H04L 67/125 | (2022.01) |

(52) U.S. Cl.
CPC ........... *G07C 5/008* (2013.01); *G07C 5/0808* (2013.01); *G07C 5/0816* (2013.01); *H04L 67/125* (2013.01)

(58) Field of Classification Search
CPC ....... H04L 41/0893; H04L 2012/40215; H04L 29/12849; H04L 45/72; H04L 67/125; H04W 4/40; G07C 5/008; G07C 5/0808
USPC ......................................................... 701/31.5
See application file for complete search history.

(56) References Cited

U.S. PATENT DOCUMENTS 6,292,731 B1  9/2001  Kirchhoffer et al.
7,702,739 B1  4/2010  Cheng et al.
(Continued)

FOREIGN PATENT DOCUMENTS

CN  103019167 A  4/2013
CN  103685000 A  3/2014
(Continued)

OTHER PUBLICATIONS

"Automotive testing and Engineering services", 2022, 20 pages.
(Continued)

*Primary Examiner* — Hamza N Algibhah
(74) *Attorney, Agent, or Firm* — GTC Law Group PC & Affiliates

(57) ABSTRACT

An apparatus that includes a parameter acquisition circuit, a parameter conditioning circuit, and a parameter storage circuit. The parameter acquisition circuit interprets a plurality of vehicle parameter values. The parameter conditioning circuit conditions the plurality of vehicle parameter values for storage in one or more cache devices. The parameter storage circuit stores the conditioned plurality of vehicle parameter values in the one or more cache devices.

27 Claims, 147 Drawing Sheets

Related U.S. Application Data

(60) Provisional application No. 63/123,531, filed on Dec. 10, 2020, provisional application No. 63/024,383, filed on May 13, 2020, provisional application No. 62/986,444, filed on Mar. 6, 2020, provisional application No. 62/911,249, filed on Oct. 5, 2019, provisional application No. 62/911,248, filed on Oct. 5, 2019, provisional application No. 62/903,462, filed on Sep. 20, 2019.

(56) References Cited

U.S. PATENT DOCUMENTS

| | | |
|---|---|---|
| 8,024,486 B2 | 9/2011 | Beers et al. |
| 8,705,527 B1 | 4/2014 | Addepalli et al. |
| 9,355,507 B1 | 5/2016 | Lee et al. |
| 9,380,428 B1 | 6/2016 | Dame et al. |
| 9,470,579 B2* | 10/2016 | Ritter .................... G01J 1/4204 |
| 9,634,892 B2 | 4/2017 | Das |
| 9,852,636 B2 | 12/2017 | Chow et al. |
| 9,871,819 B2 | 1/2018 | Liyanage et al. |
| 10,573,168 B1 | 2/2020 | Razak et al. |
| 10,616,176 B2 | 4/2020 | Lei et al. |
| 10,650,621 B1 | 5/2020 | King et al. |
| 10,759,424 B2 | 9/2020 | Misu et al. |
| 10,945,199 B2 | 3/2021 | Omiya et al. |
| 10,951,728 B2* | 3/2021 | Lepp .................... H04L 67/566 |
| 11,072,356 B2* | 7/2021 | Mong .................... H04L 67/12 |
| 11,165,651 B2 | 11/2021 | Fang et al. |
| 11,228,496 B2 | 1/2022 | Fang et al. |
| 11,252,039 B2 | 2/2022 | Fang et al. |
| 11,287,150 B2 | 3/2022 | Guan et al. |
| 11,349,717 B2 | 5/2022 | Fang et al. |
| 11,362,899 B2 | 6/2022 | Fang et al. |
| 11,386,229 B2 | 7/2022 | Adams et al. |
| 11,411,823 B2 | 8/2022 | Fang et al. |
| 11,538,287 B2 | 12/2022 | Fang et al. |
| 11,721,137 B2 | 8/2023 | Fang et al. |
| 11,736,357 B2 | 8/2023 | Fang et al. |
| 11,750,462 B2 | 9/2023 | Fang et al. |
| 11,772,583 B2 | 10/2023 | Fang et al. |
| 11,805,018 B2 | 10/2023 | Fang et al. |
| 11,824,722 B2 | 11/2023 | Fang et al. |
| 2001/0033225 A1* | 10/2001 | Razavi .................... H04L 67/34 340/988 |
| 2004/0093434 A1 | 5/2004 | Hovell et al. |
| 2004/0267410 A1* | 12/2004 | Duri .................... H04L 63/20 701/1 |
| 2005/0075760 A1* | 4/2005 | Moisel .................... B60R 1/00 348/148 |
| 2005/0108444 A1 | 5/2005 | Flauaus et al. |
| 2005/0182534 A1 | 8/2005 | Legate et al. |
| 2006/0089938 A1* | 4/2006 | Leonard .................... G06F 16/22 |
| 2006/0155438 A1* | 7/2006 | Tsunoda ............ G06F 16/9574 701/1 |
| 2007/0229350 A1* | 10/2007 | Scalisi .................... G06Q 10/08 342/350 |
| 2008/0119983 A1 | 5/2008 | Inbarajan et al. |
| 2008/0147250 A1 | 6/2008 | Oesterling et al. |
| 2008/0195257 A1 | 8/2008 | Rauch |
| 2008/0258939 A1 | 10/2008 | Smith et al. |
| 2009/0125153 A1 | 5/2009 | Yang et al. |
| 2009/0187968 A1 | 7/2009 | Roese et al. |
| 2009/0207818 A1 | 8/2009 | Tsai et al. |
| 2010/0169353 A1* | 7/2010 | Soetarman ............ G06F 16/951 707/E17.108 |
| 2010/0269155 A1 | 10/2010 | Droms et al. |
| 2010/0332584 A1* | 12/2010 | Koul .................... G06Q 10/06 715/752 |
| 2011/0078299 A1 | 3/2011 | Nagapudi et al. |
| 2011/0153149 A1* | 6/2011 | Jeon .................... H04L 69/169 701/1 |
| 2011/0260884 A1 | 10/2011 | Yi et al. |
| 2011/0269441 A1* | 11/2011 | Silver .................... H04W 4/90 455/418 |
| 2012/0139489 A1* | 6/2012 | Gaul .................... H02J 7/00041 320/109 |
| 2013/0159489 A1* | 6/2013 | Cha .................... H04L 65/1069 709/223 |
| 2013/0303192 A1 | 11/2013 | Louboutin et al. |
| 2013/0311774 A1 | 11/2013 | Larson et al. |
| 2014/0173076 A1 | 6/2014 | Ravindran et al. |
| 2014/0215491 A1 | 7/2014 | Addepalli et al. |
| 2014/0277935 A1 | 9/2014 | Daman et al. |
| 2014/0325602 A1* | 10/2014 | Kwon .................... H04L 67/12 726/4 |
| 2014/0350768 A1* | 11/2014 | Filippov ............ B60W 60/0053 701/23 |
| 2014/0359185 A1 | 12/2014 | Sawal et al. |
| 2015/0071115 A1 | 3/2015 | Neff et al. |
| 2015/0149017 A1 | 5/2015 | Attard et al. |
| 2015/0200969 A1 | 7/2015 | Leung et al. |
| 2015/0210287 A1 | 7/2015 | Penilla et al. |
| 2015/0228130 A1 | 8/2015 | Zinner et al. |
| 2015/0244806 A1* | 8/2015 | Renac .................... H04L 67/01 707/602 |
| 2015/0276415 A1 | 10/2015 | Shrinath et al. |
| 2016/0031441 A1 | 2/2016 | Foley |
| 2016/0133063 A1 | 5/2016 | Lim et al. |
| 2016/0163136 A1 | 6/2016 | Lee et al. |
| 2016/0197776 A1* | 7/2016 | Das .................... H04W 8/265 455/419 |
| 2016/0255154 A1* | 9/2016 | Kim .................... H04L 63/08 726/25 |
| 2016/0275158 A1* | 9/2016 | Baset .................... G06F 16/248 |
| 2016/0294605 A1 | 10/2016 | Searle et al. |
| 2016/0328197 A1* | 11/2016 | Bai .................... G06F 3/1454 |
| 2017/0054574 A1 | 2/2017 | Wu et al. |
| 2017/0126810 A1 | 5/2017 | Kentley et al. |
| 2017/0147989 A1 | 5/2017 | Onimaru |
| 2017/0161973 A1 | 6/2017 | Katta et al. |
| 2017/0210228 A1* | 7/2017 | Katayama ............... G06F 3/147 |
| 2017/0228410 A1 | 8/2017 | Slusar |
| 2017/0248965 A1 | 8/2017 | Wellman et al. |
| 2017/0251339 A1 | 8/2017 | Addepalli et al. |
| 2017/0339056 A1 | 11/2017 | Uno |
| 2017/0339095 A1* | 11/2017 | Lei .................... H04L 61/5076 |
| 2017/0359128 A1 | 12/2017 | Xi et al. |
| 2018/0007161 A1* | 1/2018 | Hwang ............... H04L 67/5681 |
| 2018/0017404 A1 | 1/2018 | Mendels et al. |
| 2018/0062988 A1 | 3/2018 | Sikaria et al. |
| 2018/0072250 A1 | 3/2018 | Kim et al. |
| 2018/0076970 A1 | 3/2018 | Han et al. |
| 2018/0131524 A1* | 5/2018 | Shin .................... H04L 9/14 |
| 2018/0189323 A1* | 7/2018 | Wheeler .................... G06F 9/54 |
| 2018/0191636 A1* | 7/2018 | Wang .................... H04L 47/762 |
| 2018/0205703 A1 | 7/2018 | Grau |
| 2018/0232235 A1 | 8/2018 | Gaur et al. |
| 2018/0237039 A1* | 8/2018 | Mong .................... B61L 23/005 |
| 2018/0261020 A1* | 9/2018 | Petousis ............... G07C 5/0841 |
| 2018/0267530 A1 | 9/2018 | Sugaiwa et al. |
| 2018/0270230 A1 | 9/2018 | Schmidt et al. |
| 2018/0286152 A1 | 10/2018 | Iwaasa |
| 2018/0287815 A1 | 10/2018 | Yamamoto et al. |
| 2018/0293809 A1 | 10/2018 | James et al. |
| 2018/0357561 A1* | 12/2018 | Selvarajan ............... H04L 12/66 |
| 2018/0367525 A1 | 12/2018 | Kassimis et al. |
| 2019/0007794 A1 | 1/2019 | Thakur et al. |
| 2019/0020985 A1 | 1/2019 | Dai et al. |
| 2019/0079842 A1 | 3/2019 | Chae et al. |
| 2019/0095650 A1* | 3/2019 | Midgley ............... G06F 9/4401 |
| 2019/0097932 A1* | 3/2019 | Buczek ................ H04L 12/413 |
| 2019/0098472 A1* | 3/2019 | Yoshihara ............ H04M 1/72463 |
| 2019/0108049 A1 | 4/2019 | Singh et al. |
| 2019/0129778 A1 | 5/2019 | Olson et al. |
| 2019/0141133 A1 | 5/2019 | Rajan et al. |
| 2019/0141142 A1* | 5/2019 | Filippou .................... H04W 4/40 |
| 2019/0207862 A1 | 7/2019 | Kajio et al. |
| 2019/0215185 A1* | 7/2019 | Hellenthal ............... H04L 12/40 |
| 2019/0258252 A1 | 8/2019 | Muta et al. |
| 2019/0260800 A1 | 8/2019 | Shalev et al. |
| 2019/0334763 A1* | 10/2019 | Cawse ................ H04L 43/0817 |
| 2019/0349071 A1* | 11/2019 | Saxena ............... H04B 7/18506 |
| 2019/0356574 A1 | 11/2019 | Schoch |

(56) References Cited

U.S. PATENT DOCUMENTS

| | | | |
|---|---|---|---|
| 2019/0379683 A1 | 12/2019 | Overby et al. | |
| 2019/0394089 A1* | 12/2019 | Barrett | H04W 12/088 |
| 2019/0394305 A1 | 12/2019 | Kim et al. | |
| 2020/0036717 A1 | 1/2020 | Akella et al. | |
| 2020/0057630 A1 | 2/2020 | Cho et al. | |
| 2020/0090504 A1* | 3/2020 | Kadar | G08G 1/0112 |
| 2020/0145252 A1 | 5/2020 | Torisaki et al. | |
| 2020/0160633 A1* | 5/2020 | Zhang | B60R 25/102 |
| 2020/0164882 A1* | 5/2020 | Beiderbeck | B60W 30/18163 |
| 2020/0186449 A1* | 6/2020 | Tofighbakhsh | H04L 43/04 |
| 2020/0208998 A1* | 7/2020 | Xiang | G06F 16/29 |
| 2020/0209002 A1* | 7/2020 | Hou | G05D 1/0088 |
| 2020/0210336 A1 | 7/2020 | Bräutigam et al. | |
| 2020/0218531 A1 | 7/2020 | Kushwaha et al. | |
| 2020/0252339 A1 | 8/2020 | Mckeefery et al. | |
| 2020/0257317 A1 | 8/2020 | Musk et al. | |
| 2020/0259919 A1* | 8/2020 | Lepp | H04W 4/44 |
| 2020/0264632 A1* | 8/2020 | Sugimoto | G05D 1/0276 |
| 2020/0267080 A1 | 8/2020 | Joshi et al. | |
| 2020/0341956 A1* | 10/2020 | Bayer | G06F 16/219 |
| 2020/0342691 A1* | 10/2020 | Saers | G06F 9/44526 |
| 2020/0346628 A1 | 11/2020 | Whitfield | |
| 2020/0361487 A1* | 11/2020 | Sakamoto | G05B 9/02 |
| 2020/0389469 A1 | 12/2020 | Litichever et al. | |
| 2020/0406910 A1 | 12/2020 | Ruan et al. | |
| 2020/0413408 A1* | 12/2020 | Bailey | H04L 9/3239 |
| 2021/0024035 A1 | 1/2021 | Nakashima et al. | |
| 2021/0026617 A1 | 1/2021 | Maru et al. | |
| 2021/0070321 A1* | 3/2021 | Serizawa | G07C 5/0808 |
| 2021/0075800 A1* | 3/2021 | Paraskevas | H04L 63/1441 |
| 2021/0092018 A1 | 3/2021 | Fang et al. | |
| 2021/0092019 A1 | 3/2021 | Fang et al. | |
| 2021/0144068 A1 | 5/2021 | Mo et al. | |
| 2021/0152639 A1 | 5/2021 | Madden | |
| 2021/0155267 A1* | 5/2021 | Goto | B60W 60/0027 |
| 2021/0155269 A1* | 5/2021 | Oba | H04W 4/44 |
| 2021/0171042 A1* | 6/2021 | Hayakawa | B60W 30/18163 |
| 2021/0173911 A1* | 6/2021 | Ohashi | G06F 21/32 |
| 2021/0192867 A1 | 6/2021 | Fang et al. | |
| 2021/0197831 A1 | 7/2021 | Choi et al. | |
| 2021/0234760 A1 | 7/2021 | Fang et al. | |
| 2021/0234761 A1 | 7/2021 | Fang et al. | |
| 2021/0234762 A1 | 7/2021 | Fang et al. | |
| 2021/0234763 A1 | 7/2021 | Fang et al. | |
| 2021/0258189 A1 | 8/2021 | Toyoda et al. | |
| 2021/0264693 A1 | 8/2021 | Rueck et al. | |
| 2021/0310217 A1* | 10/2021 | Akiyama | E02F 9/2054 |
| 2021/0407220 A1* | 12/2021 | Fang | G07C 5/0808 |
| 2022/0070063 A1 | 3/2022 | Fang et al. | |
| 2022/0078084 A1 | 3/2022 | Fang et al. | |
| 2022/0131751 A1 | 4/2022 | Fang et al. | |
| 2022/0131752 A1 | 4/2022 | Fang et al. | |
| 2022/0131753 A1 | 4/2022 | Fang et al. | |
| 2022/0131755 A1 | 4/2022 | Fang et al. | |
| 2022/0173969 A1 | 6/2022 | Fang et al. | |
| 2022/0173970 A1 | 6/2022 | Fang et al. | |
| 2022/0173971 A1 | 6/2022 | Fang et al. | |
| 2022/0173972 A1 | 6/2022 | Fang et al. | |
| 2022/0231917 A1 | 7/2022 | Fang et al. | |
| 2022/0271971 A1 | 8/2022 | Newald et al. | |
| 2022/0297635 A1 | 9/2022 | Fang et al. | |
| 2023/0150523 A1 | 5/2023 | Fang et al. | |
| 2023/0154244 A1 | 5/2023 | Fang et al. | |
| 2023/0154245 A1 | 5/2023 | Fang et al. | |
| 2023/0154246 A1 | 5/2023 | Fang et al. | |
| 2023/0158974 A1 | 5/2023 | Fang et al. | |
| 2023/0158975 A1 | 5/2023 | Fang et al. | |
| 2023/0161583 A1 | 5/2023 | Fang et al. | |
| 2023/0298398 A1 | 9/2023 | Fang et al. | |
| 2023/0298399 A1 | 9/2023 | Fang et al. | |
| 2023/0298400 A1 | 9/2023 | Fang et al. | |
| 2023/0298401 A1 | 9/2023 | Fang et al. | |
| 2023/0298402 A1 | 9/2023 | Fang et al. | |
| 2023/0298403 A1 | 9/2023 | Fang et al. | |
| 2023/0298404 A1 | 9/2023 | Fang et al. | |
| 2023/0298406 A1 | 9/2023 | Fang et al. | |
| 2023/0316817 A1 | 10/2023 | Fang et al. | |
| 2023/0360448 A1 | 11/2023 | Fang et al. | |
| 2023/0396634 A1 | 12/2023 | Fang et al. | |
| 2024/0022524 A1 | 1/2024 | Bibernell et al. | |

FOREIGN PATENT DOCUMENTS

| | | | |
|---|---|---|---|
| CN | 106961437 A | 7/2017 | |
| CN | 107409079 A | 11/2017 | |
| CN | 107819736 A | 3/2018 | |
| CN | 107925594 A | 4/2018 | |
| CN | 208401892 U | 1/2019 | |
| DE | 102006023137 A1 | 11/2007 | |
| EP | 2959654 A1 | 12/2015 | |
| KR | 20010027471 A | 4/2001 | |
| KR | 100310412 B1 | 9/2001 | |
| WO | 2001026332 | 4/2001 | |
| WO | 2007050406 A1 | 5/2007 | |
| WO | WO-2007050406 A1 * | 5/2007 | B60T 7/22 |
| WO | 2020039295 A1 | 2/2020 | |
| WO | 2020150872 A1 | 7/2020 | |
| WO | 2021055952 A1 | 3/2021 | |
| WO | 2021055955 A1 | 3/2021 | |
| WO | 2021178979 A1 | 9/2021 | |
| WO | 2021178979 A8 | 10/2021 | |
| WO | 2022218554 A1 | 10/2022 | |
| WO | 2022256742 A1 | 12/2022 | |
| WO | 2023059938 A1 | 4/2023 | |

OTHER PUBLICATIONS 20864819.6 , "European Application Serial No. 20864819.6, Extended European Search Report mailed Jun. 28, 2023", Sonatus, Inc., 9 pages.

20864819.6 , "European Application Serial No. 20864819.6, Non-Final Office Action mailed Jul. 18, 2023", Sonatus, Inc., 1 page.

Chapin, Peter C., et al., "Authorization in Trust Management: Features and Foundations", Retrieved on Dec. 2, 2020 (Dec. 2, 2020) from <http://lemuria.cis.vtc.edu/-pchapin/papers/chapin-skalka-wang-ACMCS2008.pdf> entire document, 48 pages.

Chen, Wai , et al., "Ad hoc peer-to-peer network architecture for vehicle safety communications", IEEE Communications Magazine, vol. 43, No. 4, 2005, pp. 100-107.

Felser, Max , et al., "Coexistence Standardization of Operation Technology and Information Technology", Proceedings of the IEEE, IEEE. New York, US, vol. 107, No. 6,, Jun. 1, 2019, pp. 962-976.

Ishak, Mohamad Khairi, et al., "Vehicle Sensors Programming BAsed on Controller Area Network (CAN) Bus Using Canoe", 2019, 4 pages.

Nguyen-Duy, Jonathan , "Smart Cars: A Peek Into the Future of Converged Networks", Jan. 9, 2018, 4 pages.

PCT/US2020/051817 , "International Application Serial No. PCT/US2020/051817, International Preliminary Report on Patentability mailed Mar. 31, 2022", Sonatus, Inc., 22 pages.

PCT/US2020/051817 , "International Application Serial No. PCT/US2020/051817, International Search Report and Written Opinion mailed Feb. 24, 2021", Sonatus, Inc., 23 pages.

PCT/US2020/051817 , "International Application Serial No. PCT/US2020/051817, Invitation to Pay Additional Fees and, Where Applicable, Protest Fee mailed Dec. 1, 2020", Sonatus, Inc., 2 pages.

PCT/US2020/051825 , "International Application Serial No. PCT/US2020/051825, International Search Report and Written Opinion mailed Jan. 13, 2021", Sonatus, Inc., 15 pages.

PCT/US2021/021421 , "International Application Serial No. PCT/US2021/021421, International Preliminary Report on Patentability mailed Sep. 15, 2022", Sonatus, Inc., 17 pages.

PCT/US2021/021421 , "International Application Serial No. PCT/US2021/021421, International Search Report and Written Opinion mailed Jul. 21, 2021", Sonatus, Inc., 19 pages.

PCT/US2021/021421 , "International Application Serial No. PCT/US2021/021421, Invitation to Pay Additional Fees and, Where Applicable, Protest Fee mailed May 10, 2021", Sonatus, Inc., 2 pages.

(56) References Cited

OTHER PUBLICATIONS

PCT/US2022/032380, "International Application Serial No. PCT/US2022/032380, International Search Report and Written Opinion mailed Sep. 8, 2022", Sonatus, Inc., 12 pages.

PCT/US2022/046292, "International Application Serial No. PCT/US2022/046292, International Search Report and Written Opinion mailed Mar. 7, 2023", Sonatus, Inc., 18 pages.

PCT/US2022/046292, "International Application Serial No. PCT/US2022/046292, Invitation to Pay Additional Fees and, Where Applicable, Protest Fee mailed Jan. 11, 2023", Sonatus, Inc., 2 pages.

PCTUS2020051825, "International Application Serial No., International Preliminary Report on Patentability mailed Mar. 31, 2022", Sonatus, Inc., 16 pages.

Wakikawa, Ryuji, et al., "Design of Vehicle Network: Mobile Gateway for MANET and NEMO Converged Communication", Sep. 2, 2005, 2 pages.

Wang, Yujing, et al., "Adapting a Container Infrastructure for Autonomous Vehicle Development", Cornell University Library/Computer Science/Software Engineering, Nov. 19, 2019, [online] [retrieved on Jun. 22, 2021 (Jun. 22, 2021)] Retrieved from the Internet <URL: https://arxiv.org/abs/1911.01075>, entire document,, 6 pages.

U.S. Appl. No. 18/123,151, filed Mar. 17, 2023, Pending, Yu Fang.
U.S. Appl. No. 18/123,159, filed Mar. 17, 2023, Pending, Yu Fang.
U.S. Appl. No. 18/123,172, filed Mar. 17, 2023, Pending, Yu Fang.
U.S. Appl. No. 18/123,183, filed Mar. 17, 2023, Pending, Yu Fang.
U.S. Appl. No. 18/123,186, filed Mar. 17, 2023, Pending, Yu Fang.
U.S. Appl. No. 18/123,188, filed Mar. 17, 2023, Pending, Yu Fang.
U.S. Appl. No. 18/123,193, filed Mar. 17, 2023, Pending, Yu Fang.
U.S. Appl. No. 18/123,198, filed Mar. 17, 2023, Pending, Yu Fang.
U.S. Appl. No. 18/123,203, filed Mar. 17, 2023, Pending, Yu Fang.
U.S. Appl. No. 18/123,208, filed Mar. 17, 2023, Pending, Yu Fang.

202080080424.7, "Chinese Application No. 202080080424.7, First Office Action and Search Report mailed Oct. 12, 2023", Sonatus, Inc., 11 pages.

202217011087, "Indian Application Serial No. 202217011087 First Examination Report, mailed Jan. 12, 24", Sonatus, Inc., 6 pages.

20865060.6, "European Application Serial No. 20865060.6, Extended European Search Report mailed Jul. 10, 2023", Sonatus, Inc., 8 pages.

Herber, Christian, et al., "Real-time capable CAN to AVB ethernet gateway using frame aggregation and scheduling", 2015 Design, Automation & Test in Europe Conference & Exhibition (Date), EDAA,, Mar. 9, 2015, pp. 61-66.

PCT/US2022/032380, "International Application Serial No. PCT/US2022/032380, International Preliminary Report on Patentability mailed Nov. 21, 2023", Sonatus, Inc., 13 pages.

PCT/US2023/032346, "International Application Serial No. PCT/US2023/032346, International Search Report and Written Opinion mailed Nov. 27, 2023", Sonatus, Inc., 3 pages.

\* cited by examiner

| | 13606 |
|---|---|
| Selectively transmit in response to a selected transmission interval | |

Fig. 137

| | 13606 |
|---|---|
| Selectively transmit in response to a selected bandwidth utilization | |

Fig. 138

| | 13606 |
|---|---|
| Selectively transmit in response to a data type of the collected data | |

Fig. 139

| | 13606 |
|---|---|
| Selectively transmit in response to a vehicle operational impact of transmission operations | |

Fig. 140

| | 13606 |
|---|---|
| Selectively transmit in response to a power utilization impact of transmission operations | |

Fig. 141

| | 13606 |
|---|---|
| Selectively transmit in response to a data transmission capacity value | |

Selectively transmit in response to a currently available transmission type — 13606

Fig. 144

Selectively transmit in response to a selected data transmission chunk size — 13606

Fig. 145

Selectively transmit in response to a success parameter for transmitting operations — 13606

Fig. 146

Selectively transmit in response to a quality of service value for transmitting operations — 13606

SYSTEM, METHOD, AND APPARATUS FOR MANAGING VEHICLE DATA COLLECTION

CROSS-REFERENCE TO RELATED APPLICATIONS

This application claims priority to, and is a continuation of, U.S. application Ser. No. 17/469,148, filed Sep. 8, 2021, now U.S. Pat. No. 11,721,137 issued Aug. 8, 2023 and entitled "SYSTEM, METHOD, AND APPARATUS FOR MANAGING VEHICLE DATA COLLECTION".

U.S. application Ser. No. 17/469,148 claims priority to, and is a continuation of, U.S. application Ser. No. 17/195,589, filed Mar. 8, 2021, now U.S. Pat. No. 11,538,287 issued Dec. 27, 2022 and entitled "SYSTEM, METHOD, AND APPARATUS FOR MANAGING VEHICLE DATA COLLECTION".

U.S. application Ser. No. 17/195,589 claims priority to U.S. Provisional Patent Application Ser. No. 62/986,444, filed Mar. 6, 2020 and entitled "SYSTEM, METHOD AND APPARATUS FOR IMPLEMENTING CONFIGURABLE DATA COLLECTION FOR A VEHICLE", U.S. Provisional Patent Application Ser. No. 63/024,383, filed May 13, 2020 and entitled "SYSTEM, METHOD AND APPARATUS FOR IMPLEMENTING CONFIGURABLE DATA COLLECTION FOR A VEHICLE", and U.S. Provisional Patent Application Ser. No. 63/123,531, filed Dec. 10, 2020 and entitled "SYSTEM METHOD AND APPARATUS FOR IMPLEMENTING CONFIGURABLE DATA COLLECTION FOR A VEHICLE".

U.S. application Ser. No. 17/195,589 claims priority to and is a continuation-in-part of U.S. patent application Ser. No. 17/027,167, filed Sep. 21, 2020, now U.S. Pat. No. 11,411,823, issued Aug. 9, 2022 and entitled "SYSTEM, METHOD, AND APPARATUS TO SUPPORT MIXED NETWORK COMMUNICATIONS ON A VEHICLE".

U.S. application Ser. No. 17/027,167 claims benefit of priority to the following provisional applications: U.S. Application Ser. No. 62/903,462, filed Sep. 20, 2019 entitled SYSTEM, METHOD AND APPARATUS FOR A MIXED VEHICLE NETWORK; U.S. Application Ser. No. 62/911,249 filed Oct. 5, 2019 entitled SYSTEM, METHOD AND APPARATUS FOR A MIXED VEHICLE NETWORK; U.S. Application Ser. No. 62/911,248, filed Oct. 5, 2019 entitled SYSTEM, METHOD AND APPARATUS FOR CLOUD-BASED INTERACTIONS WITH A MIXED VEHICLE NETWORK; U.S. Application Ser. No. 62/986,444, filed Mar. 6, 2020 entitled SYSTEM, METHOD AND APPARATUS FOR IMPLEMENTING CONFIGURABLE DATA COLLECTION FOR A VEHICLE; and U.S. Application Ser. No. 63/024,383, filed May 13, 2020 entitled SYSTEM, METHOD AND APPARATUS TO TEST AND VERIFY A VEHICLE NETWORK.

U.S. application Ser. No. 17/195,589 claims priority to and is a continuation-in-part of U.S. patent application Ser. No. 17/027,187, filed Sep. 21, 2020, now U.S. Pat. No. 11,228,496, issued Jan. 18, 2022 and entitled "SYSTEM, METHOD, AND APPARATUS TO EXTRA VEHICLE COMMUNICATIONS CONTROL".

U.S. application Ser. No. 17/027,187 claims benefit of priority to the following provisional applications: U.S. Application Ser. No. 62/903,462, filed Sep. 20, 2019 entitled SYSTEM, METHOD AND APPARATUS FOR A MIXED VEHICLE NETWORK; U.S. Application Ser. No. 62/911,249 filed Oct. 5, 2019 entitled SYSTEM, METHOD AND APPARATUS FOR A MIXED VEHICLE NETWORK; U.S. Application Ser. No. 62/911,248, filed Oct. 5, 2019 entitled SYSTEM, METHOD AND APPARATUS FOR CLOUD-BASED INTERACTIONS WITH A MIXED VEHICLE NETWORK; U.S. Application Ser. No. 62/986,444, filed Mar. 6, 2020 entitled SYSTEM, METHOD AND APPARATUS FOR IMPLEMENTING CONFIGURABLE DATA COLLECTION FOR A VEHICLE; and U.S. Application Ser. No. 63/024,383, filed May 13, 2020 entitled SYSTEM, METHOD AND APPARATUS TO TEST AND VERIFY A VEHICLE NETWORK.

All of the above patent documents are incorporated herein by reference in their entirety.

BACKGROUND

Vehicle communication networks are utilized to connect sensors, actuators, controllers, user interfaces, rider personal devices, trailers, and communication devices throughout a vehicle. Recent trends have been increasing the burden on these vehicle communication networks, with more devices being connected, more data passing between devices, lower latency requirements to meet vehicle performance, safety, and emissions requirements, and added vehicle features. Additionally, consumers expect increasing connectivity, reduced driver burden, and features that increase the burdens on vehicle communication networks. These trends are expected to continue, and to accelerate, for the foreseeable future.

Traditional vehicle communication networks (CAN, LIN, FlexRay, MOST, LVDS, etc.) suffer from a number of drawbacks and challenges. These vehicle communication networks have been developed to meet the particular challenges of a vehicle environment, and have accordingly developed separately from other networks, such as computer local area networks, wide area networks, massively interconnected networks (e.g., the internet), and wireless networks. Most vehicle networks consist of a data link layer and an application layer, utilizing robust and dedicated equipment such as a Controller Area Network (CAN) bus, with dedicated or shared wiring between devices utilizing specific data protocols (e.g., J1939, OBD, etc.). A modern vehicle may have multiple network buses, with specific commands and communications available, and limited customization and data speed available. E.g., CAN buses typically operate at up to about 1 Mbps, with high capability CAN buses operating up to about 10 Mbps. Additionally, CAN buses experience latency greater than 25 ms, and generally higher from about 60 ms to 500 ms, depending upon the configuration, the traffic on the CAN, the priority for particular messages, and the like.

As the number of devices and the data rate demand from the devices increases, traditional vehicle communication networks require the implementation of higher performance buses. Because the automotive industry is a high volume industry with a very low tolerance for failure of components, automotive manufacturers utilize the same components for a long time, and across a broad range of vehicles—including sharing of components across manufacturers. Additionally, a change to a nominally more capable component may introduce risks, integration costs, re-certification burdens for a given application, or have other undesirable consequences to the system. Accordingly, even if vehicle communication networks transition to a higher capability network configuration, it is desirable to keep network types segregated in the system, and to keep a large number of legacy devices (e.g., CAN compatible) in a system for a long period of time.

Data collection from vehicles includes a number of additional challenges. For example, data collection operations are subject to regulation and liability risks, especially with data collection that may include private or personally identifiable information. Data collectors, including entities that may have ownership or possession of sensitive data are subject to risk while holding data, for example in the event of inadvertent or malicious access to the data. With regard to vehicle data being collected, a large amount of data may be collected, and a large number of purposes for collecting the data may be present, increasing the risks relative to other general data storage applications. Accordingly, it may be desirable to control data collection, storage, and access, to reduce risks, and it may further be desirable to include verification of data access, partitioning or other exclusion of data when the data is not being used, and the like.

Data collection for vehicles is further complicated by the amount and type of data to be communicated between the vehicle and external devices, where the network system of the vehicle is limited by constraints of a mobile application, expenses and/or bandwidth limitations incurred by high data rates and large data transfers. Even in light of the foregoing, customer demands, market expectations, increasing requirements for efficiency of vehicle operations, and the increase of functional capability for data related applications are continuing to proliferate the aggregate amount of data to be transferred, the number of off-vehicle applications utilizing transferred data, the number of purposes that the data may be utilized for, and the number of users or entities having a legitimate need for portions of the transferred data. Additionally, applications utilizing the data continue to increase in sophistication and capability, increasing the data demand for the limited available transfer resources, and increasing the cost and complexity of logistical control and storage of the transferred data. For example, higher capability pathing or operation algorithms related to the vehicle, increasing automation of vehicle functions, increasing demand for prognostic determinations and/or maintenance support, and increasing media streams (both the number of media streams and the quality of those media streams) all drive for increased demand in data rates, stored data amounts, and the number of entities or applications accessing the stored data.

The complexities and other challenges set forth preceding have synergistic effects that cause the complexity of the vehicle data environment to be even greater than the sum of the individual contributions from each challenge.

As one example, the increasing number of entities or applications accessing the data increases the likelihood that individual data requests will overlap—for example with multiple entities requesting the same or similar data. Further, the increasing number of entities or applications accessing the data increases the likelihood that members of the accessing group will share similar authorization levels, such that the data access for individual members of the entity or application group require data management.

In another example, regulations regarding sensitive data are increasing, which increases the data management requirements of the system generally, but also increases the likelihood that data management may be subjected to multiple constraints at a given time, and/or changing constraints over time as regulations change.

In yet another example, the complex environment of presently known and transitioning vehicle network architectures—for example vehicles having mixed network types and/or partitioned networks—increase the complexity of data access for individual entities that, without certain aspects of the present disclosure, may otherwise be required to determine requesting parameter specifications for particular data elements, and to update those requesting parameters as vehicle network architectures evolve. In view of the increasing number of entities requesting data access, the aggregate cost to the automotive support market increases non-linearly, as each of the entities incurs the costs to track requesting parameter specifications. Additionally, the trajectory of additional entities requesting data access is moving toward entities that are positioned further away in the technological knowledge space from core automotive functions, and accordingly the intricacies and idiosyncrasies of vehicle and/or automotive applications, including on-vehicle network configurations, specific data descriptions, data requesting and communication protocols, industry standards or customs for presenting information, and the like, are becoming less well known on average for each incremental new entity, further increasing the cost volume function (e.g., the cost over time for a given entity to meet desired data collection deliverables, where the given entity may be an automotive manufacturer, and/or a vehicle market, a geographic market, and/or an industry such as the automotive industry, the passenger car industry, etc.). For example, consider a notional cost volume function such as:

COST=# of entities*basic learning cost*adapting to transition cost trajectory*data trajectory cost*regulatory adaptation cost*data access/storage liability cost The described COST function is a non-limiting notional example to demonstrate how various challenges and complications with regard to presently known systems interact and synergize to increase the costs to meet future data collection functions for vehicle applications. The cost parameters described are not intended to cover all costs related to the challenges present for the automotive data collection industry or presently known systems. Parameters may be averages or other complex functions, and the values of particular parameters will generally not be known with specificity. In addition, the units of the COST may be expressed in monetary values, as a resource (e.g., engineering hours, computation time, etc.) to meet data collection targets over time, as another non-monetary unit such as equivalent emissions, customer satisfaction, risk incurred, public perception losses or gains, etc. The # of entities parameter reflects generally the number of entities accessing vehicle data over time; the basic learning cost reflects the costs for new entities to learn the specifics of data collection requirements and protocols for a specific vehicle, vehicle type, market, etc.; the adapting to transition cost trajectory reflects the costs to adapt to changing vehicle network configurations, including network types and organization; the data trajectory cost reflects the increasing demand for data collection from relevant vehicles over time, including data communication, storage, and resulting functional consequences such as not being able to support a desired application or costs to enhance data communication infrastructure; the regulatory adaptation cost reflects the costs associated with an increasing number of regulations, an increasing number of regulatory frameworks, and/or an increasing number of regulating entities; and the data access/storage liability cost reflects the costs incurred for compliance and security of data, and/or losses incurred due to data breaches, unauthorized use, or the like.

SUMMARY

An example apparatus includes a remote access execution circuit structured to interpret a remote access request value from a requesting device, the remote access request value including at least one requested vehicle property; a property translation circuit structured to determine a property request value in response to the at least one requested vehicle property; a parameter acquisition circuit structured to interpret a plurality of vehicle parameter values in response to the property request value; a parameter conditioning circuit structured to generate, in response to the property request value, vehicle property data from the plurality of vehicle parameter values, the vehicle property data corresponding to at least one the requested vehicle property; and wherein the remote access execution circuit is further structured to transmit the vehicle property data to the requesting device.

Certain further aspects of the example apparatus are described following, any one or more of which may be present in certain embodiments. The apparatus further including a converged network device (CND) structured to regulate communications between a first network zone having a first network endpoint and a second network zone having a second network endpoint, wherein at least a portion of the plurality of vehicle parameter values are generated by each of the first network endpoint and the second network endpoint. The apparatus further includes wherein the remote access request value further includes a vehicle function value; wherein the property translation circuit is further structured to determine an actuator command value in response to the vehicle function value; and a remote operation circuit structured to provide the actuator command value to an endpoint of a network zone of a vehicle. The apparatus further includes a converged network device (CND) structured to regulate communications between a first network zone having a first network endpoint and a second network zone having a second network endpoint and including the network zone of the vehicle; wherein the first network endpoint provides at least a portion of the plurality of vehicle parameter values; and wherein the second network endpoint includes an actuator responsive to the actuator command value. The property translation circuit is further structured to determine the actuator command value by performing at least one operation selected from the operations consisting of: determining the actuator command value as a sequence of actuator commands corresponding to a diagnostic test operation; determining the actuator command value as a sequence of actuator commands corresponding to a remote control operation; or determining the actuator command value as at least one actuator command responsive to the vehicle function value. The apparatus further including an additional plurality of endpoints distributed across at least the first network zone and the second network zone, wherein the additional plurality of endpoints each provide at least a portion of the plurality of vehicle parameter values. The apparatus further including an additional plurality of endpoints distributed across at least the first network zone and the second network zone, wherein the additional plurality of endpoints each include a corresponding actuator, each responsive to at least a portion of the actuator command value. The remote access request value includes a policy. The policy includes at least one value selected from the values consisting of: an authorization value of the requesting device; a data collection description including the at least one requested vehicle property; a trigger description value including a trigger condition and a trigger response value, and wherein the parameter acquisition circuit is further structured to generate at least a portion of the vehicle property data from the plurality of vehicle parameter values further in response to the trigger description value; or a policy priority value. The remote access request value includes a policy. The policy includes at least one value selected from the values consisting of: an authorization value of the requesting device; a trigger description value including a trigger condition and a trigger response value, and wherein the remote operation circuit is further structured to provide the actuator command value further in response to the trigger description value; and a policy priority value.

An example apparatus includes a policy acquisition circuit structured to interpret a vehicle policy data value including at least one requested vehicle property; a parameter acquisition circuit structured to interpret a plurality of vehicle parameter values, responsive to the at least one requested vehicle property, from a plurality of providing end points, each of the plurality of providing end points on at least one network zone of a vehicle; and a parameter storage circuit structured to selectively store at least a portion of the plurality of vehicle parameter values, wherein at least a first portion of the stored at least a portion of the plurality of vehicle parameter values are stored on a storage end point distinct from an associated one of the providing end points for the at least a first portion of the stored vehicle parameter values.

Certain further aspects of the example apparatus are described following, any one or more of which may be present in certain embodiments. The parameter storage circuit is further structured to selectively store the at least a portion of the plurality of vehicle parameter values on a single storage end point. The apparatus further including a storage management circuit structured to determine a parameter transmission schedule for stored vehicle parameter values, and wherein the parameter storage circuit is further structured to selectively store the at least a portion of the plurality of vehicle parameter values in response to the parameter transmission schedule. The apparatus further including a storage management circuit structured to determine a parameter expiration schedule for stored vehicle parameter values, and wherein the parameter storage circuit is further structured to selectively store the at least a portion of the plurality of vehicle parameter values in response to the parameter expiration schedule. The parameter storage circuit is further structured to perform at least one operation responsive to the parameter expiration schedule selected from the operations consisting of: deleting at least a portion of the stored vehicle parameter values; summarizing at least a portion of the stored vehicle parameter values; compressing at least a portion of the stored vehicle parameter values; or adjusting a reserved memory amount associated with at least a portion of the stored vehicle parameter values. The parameter storage circuit is further structured to determine a reserved memory amount associated with at least a portion of the plurality of vehicle parameter values, and to perform the selectively storing the at least a portion of the plurality of vehicle parameter values in response to the reserved memory amount. The parameter storage circuit is further structured to determine the reserved memory amount by performing at least one operation selected from the operations consisting of: determining an amount of data to be collected to support the at least a portion of the plurality of vehicle parameter values; determining an amount of data to be collected to support a trigger evaluation associated with the at least a portion of the plurality of vehicle parameter values; or determining a transmission latency value associated with the at least a portion of the plurality of vehicle parameter values. The parameter storage circuit is further structured to determine the reserved memory amount in response to a priority value associated with the at least a portion of the vehicle parameter values. The priority value includes an on-vehicle data storage priority. The priority value includes a transmission priority. The priority value includes a priority associated with an end point providing the at least a portion of the vehicle parameter values. The priority value includes a priority associated with an end point requesting the at least a portion of the vehicle parameter values. The priority value includes a priority associated with an entity requesting the at least a portion of the vehicle parameter values. The priority value includes a priority associated with an application requesting the at least a portion of the vehicle parameter values. The priority value includes a priority associated with an application associated with an end point requesting the at least a portion of the vehicle parameter values. The priority value includes a priority associated with a flow requesting the at least a portion of the vehicle parameter values. The priority value includes a priority associated with a flow associated with an end point requesting the at least a portion of the vehicle parameter values.

BRIEF DESCRIPTION OF THE FIGURES

FIG. 120 depicts an example procedure for identifying data according to certain embodiments of the present disclosure;

FIG. 121 depicts an example cloud system for preparing data collection policies according to certain embodiments of the present disclosure;

FIG. 122 depicts an example policy creator circuit according to certain embodiments of the present disclosure;

FIG. 123 depicts an example request interface according to certain embodiments of the present disclosure;

FIG. 124 depicts an example procedure for operating a request interface according to certain embodiments of the present disclosure;

FIG. 125 depicts an example schematic to operate a container-based implementation of one or more control aspects of a vehicle according to certain embodiments of the present disclosure;

FIG. 126 depicts an example schematic to operate a container-based implementation of one or more control aspects of a vehicle according to certain embodiments of the present disclosure;

FIG. 127 depicts an example schematic to operate a container-based implementation of one or more control aspects of a vehicle according to certain embodiments of the present disclosure;

FIG. 128 depicts an example schematic to operate a container-based implementation of one or more control aspects of a vehicle according to certain embodiments of the present disclosure;

FIG. 129 depicts an example schematic to operate a container-based implementation of one or more control aspects of a vehicle according to certain embodiments of the present disclosure;

FIG. 130 depicts an example schematic to operate a container-based implementation of one or more control aspects of a vehicle according to certain embodiments of the present disclosure;

FIG. 131 depicts an example schematic to provide automated vehicle operations based on data values according to certain embodiments of the present disclosure;

Figure 132:
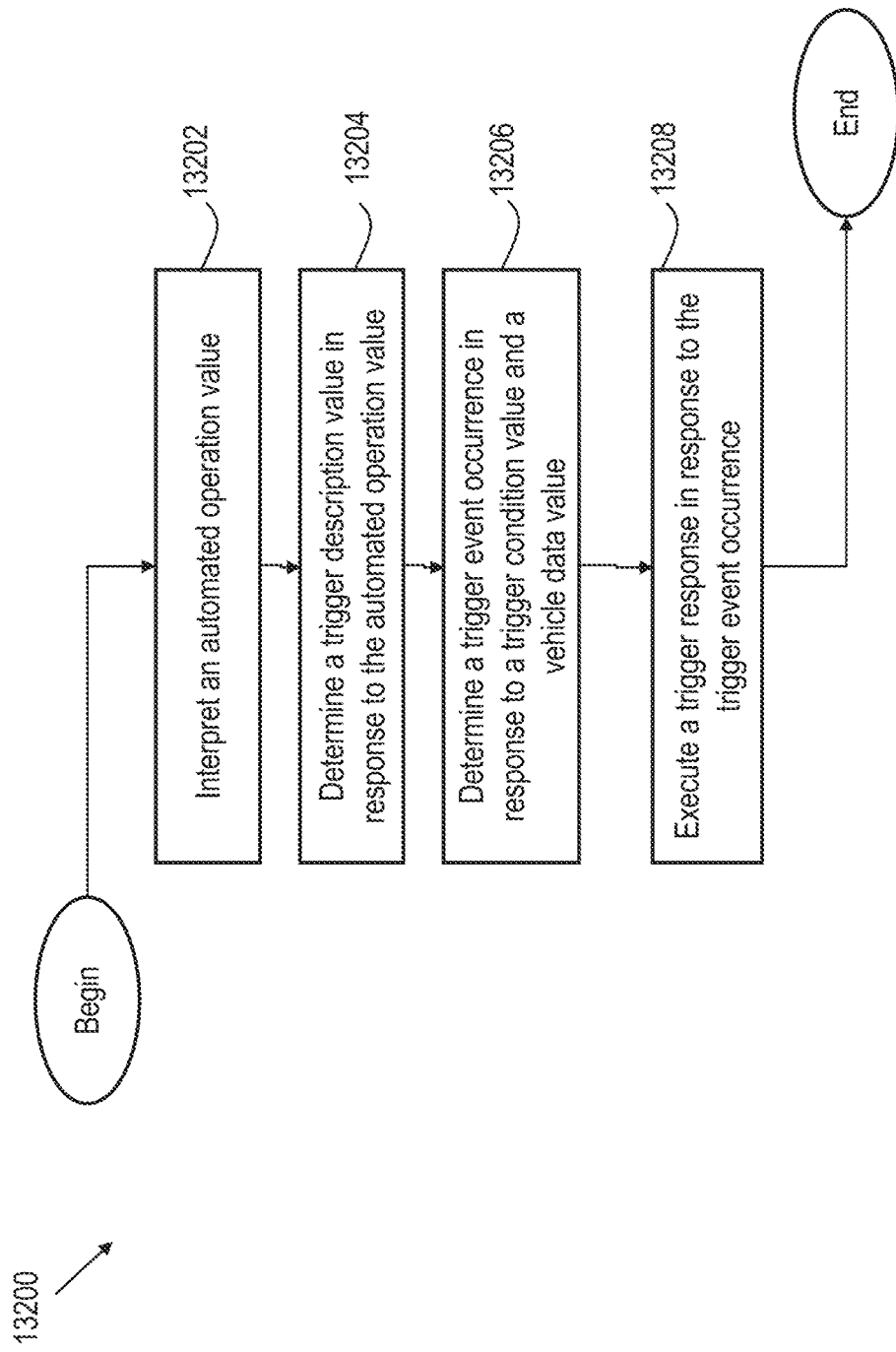
Figure 133:
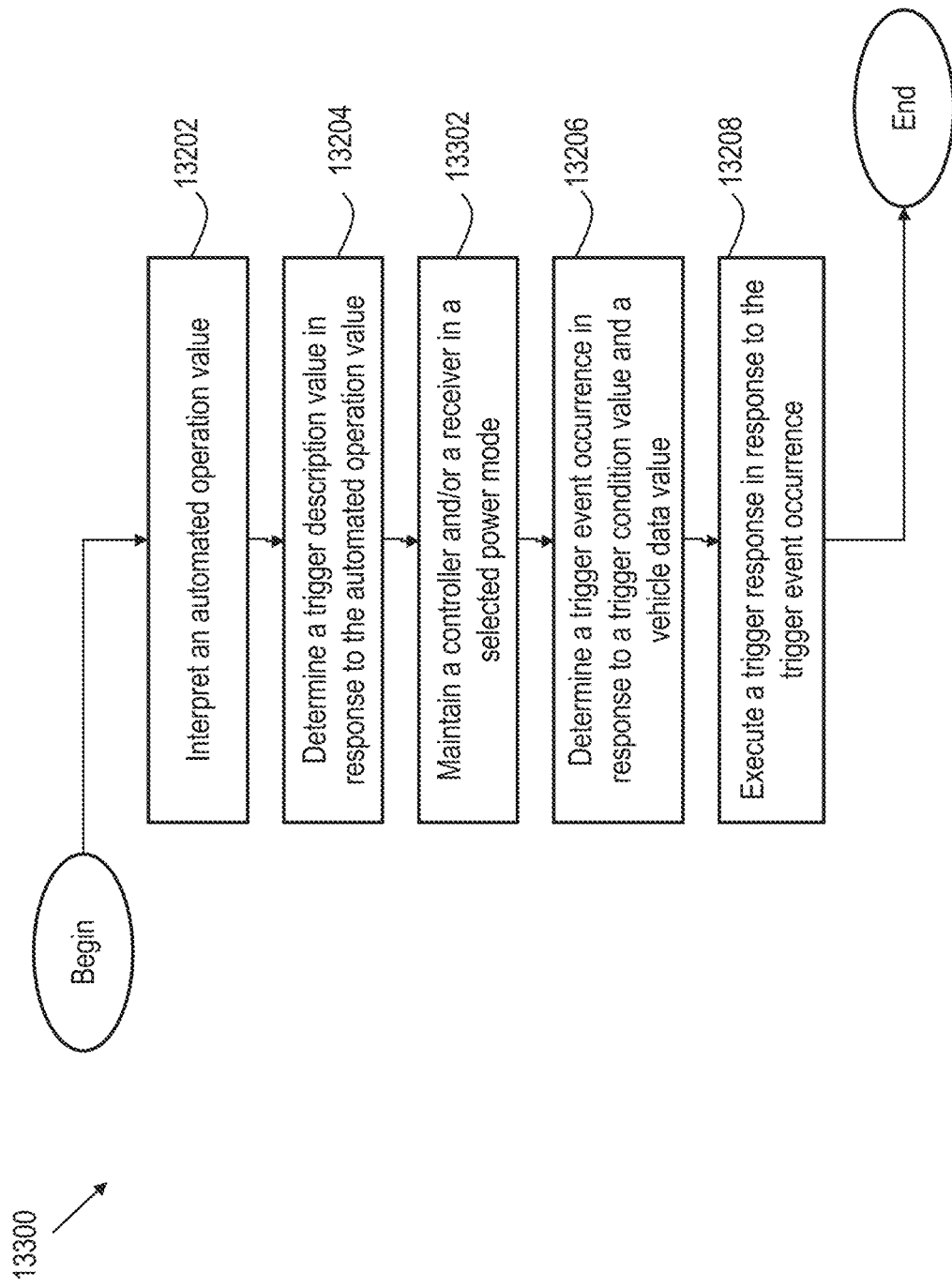
Figure 134:
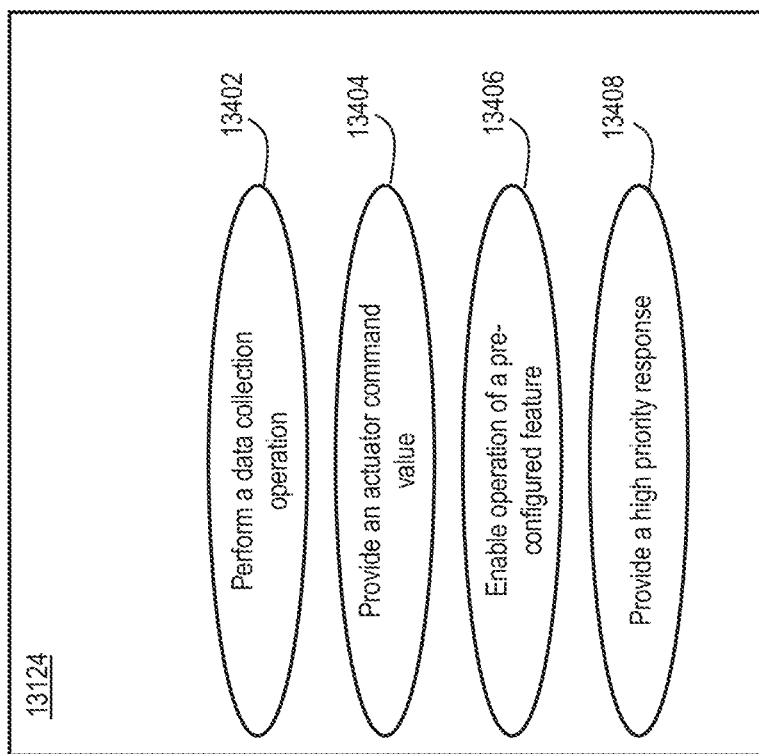
Figure 135:
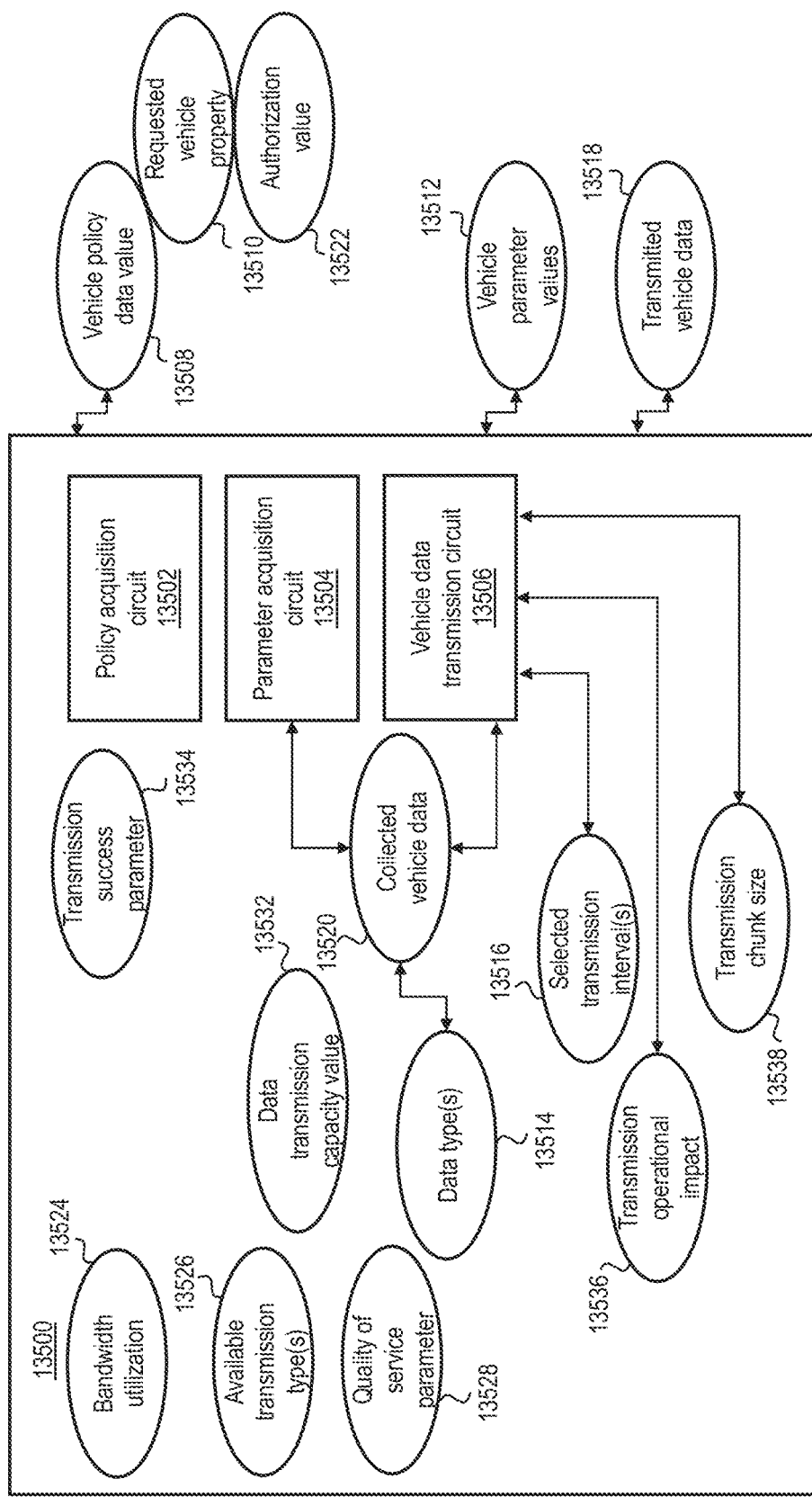
Figure 136:
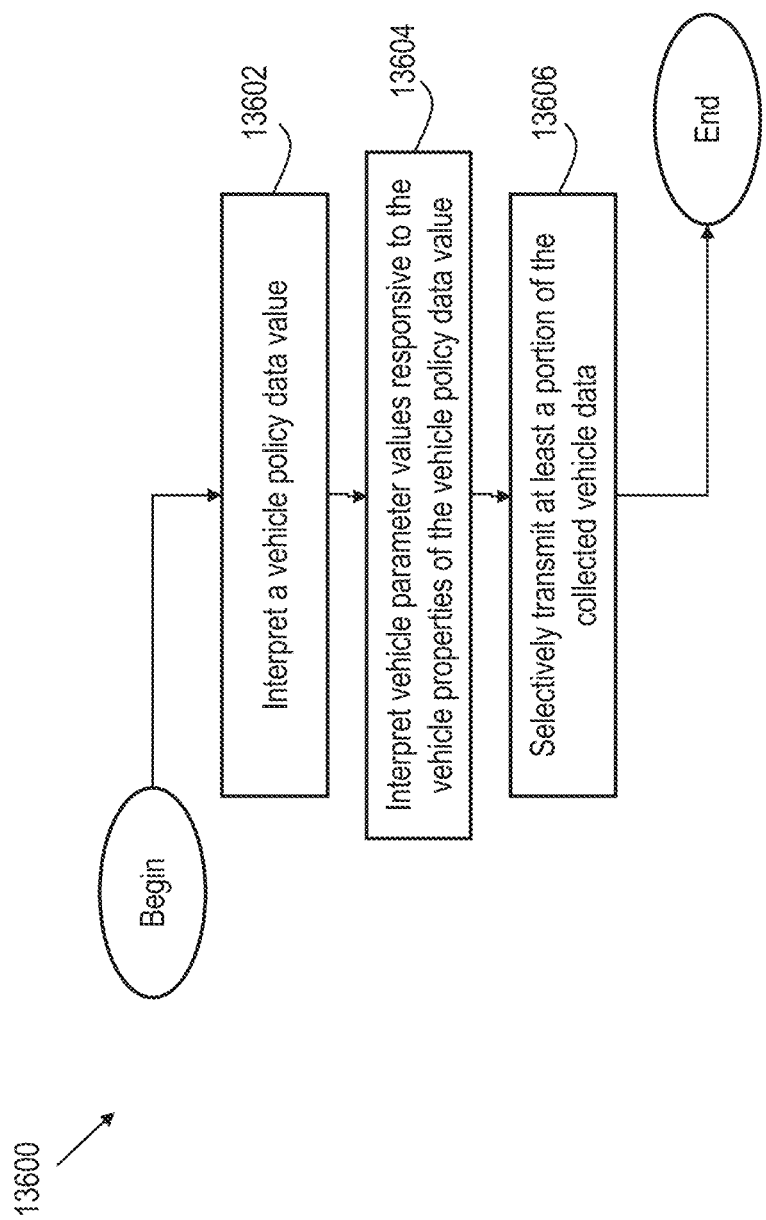
Figure 147:
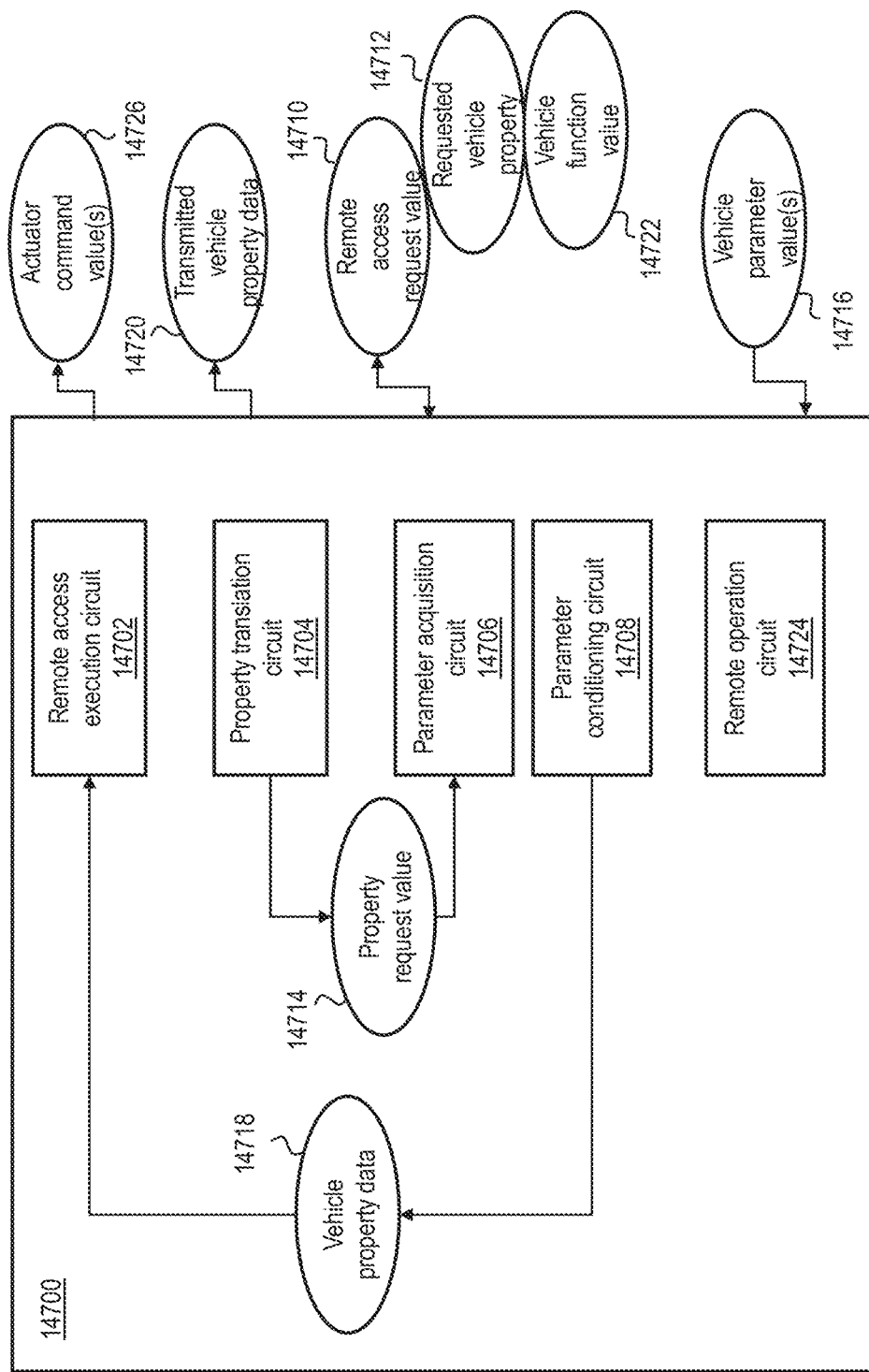
Figure 148:
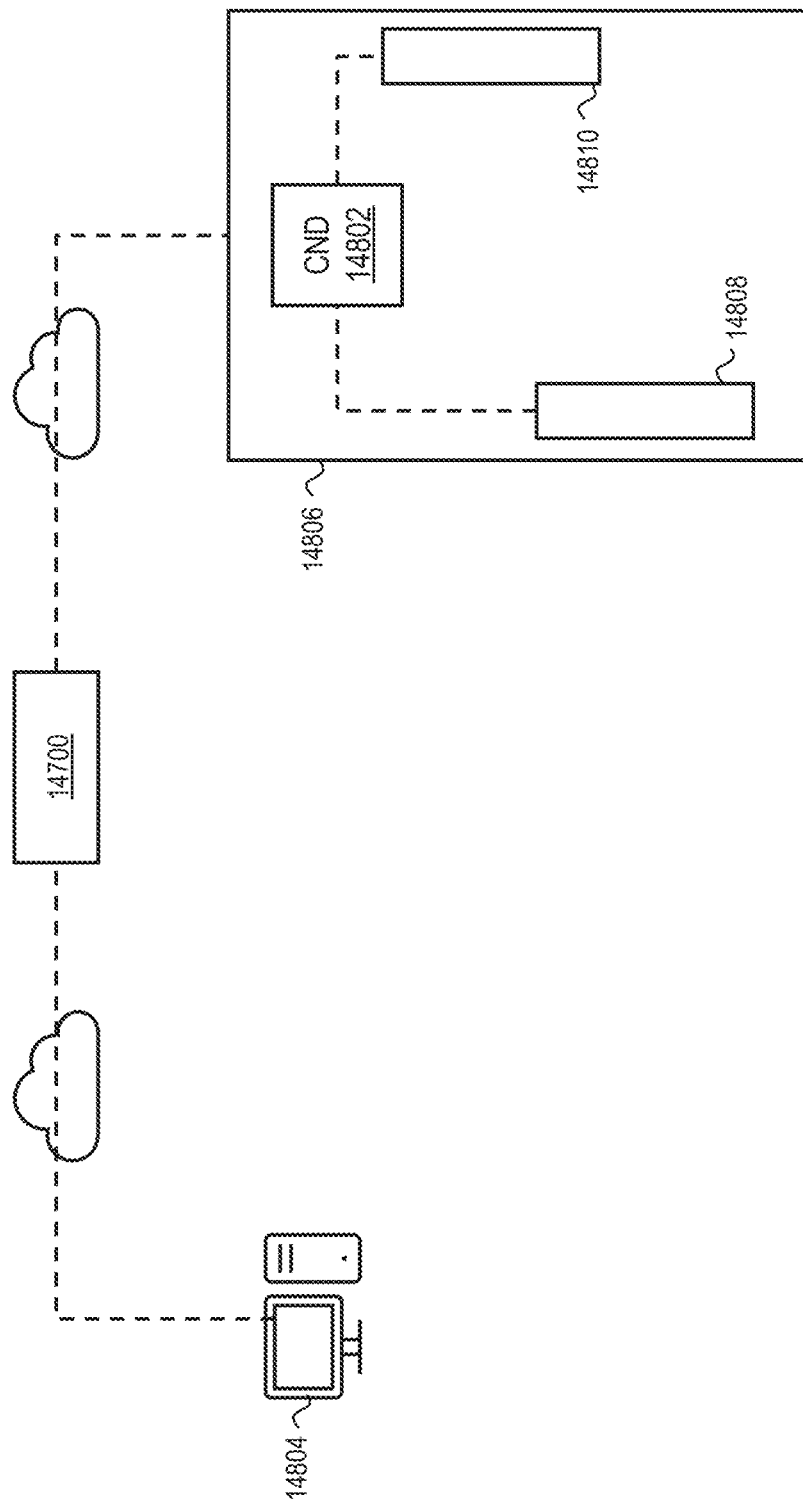
Figure 149:
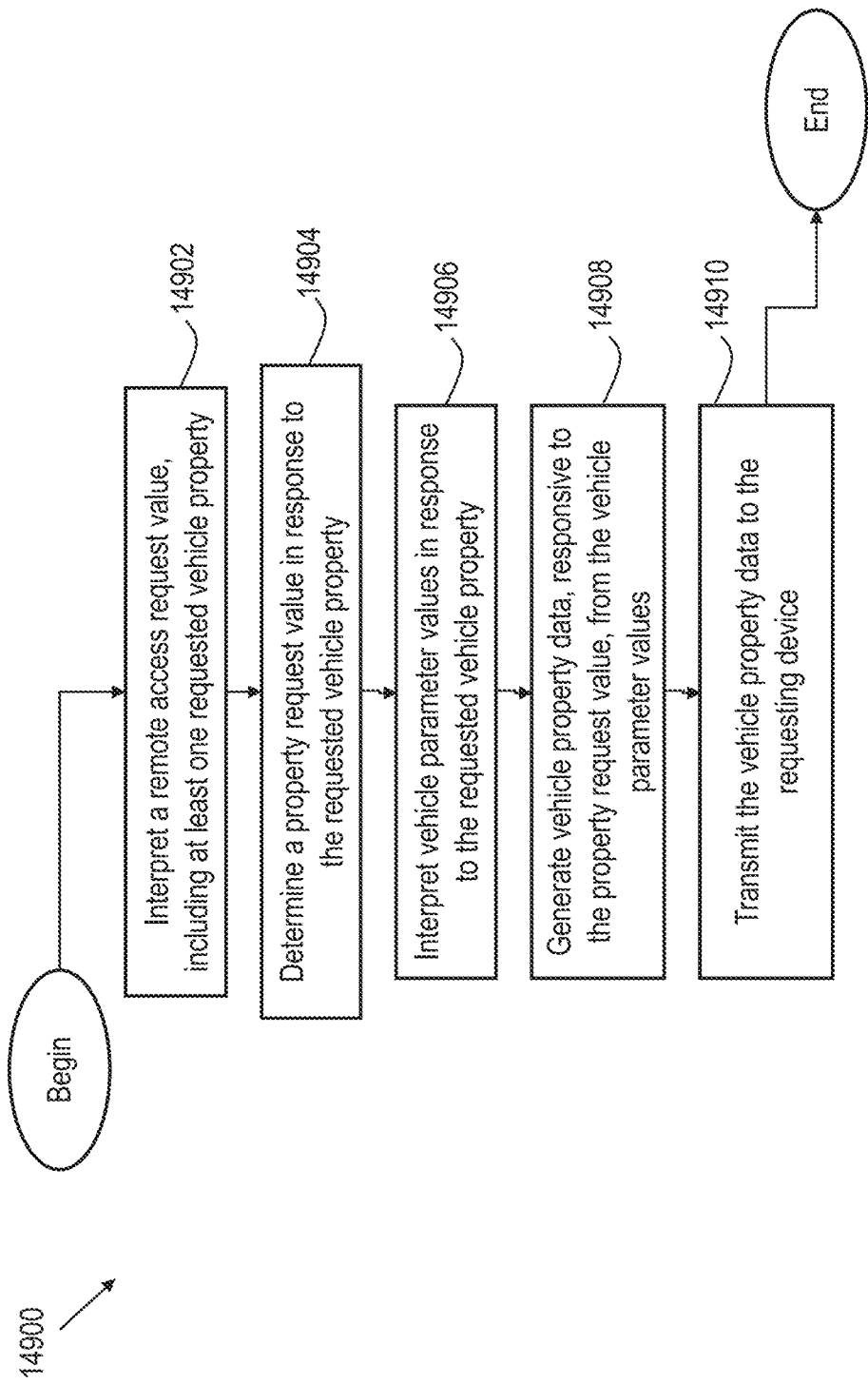
Figure 150:
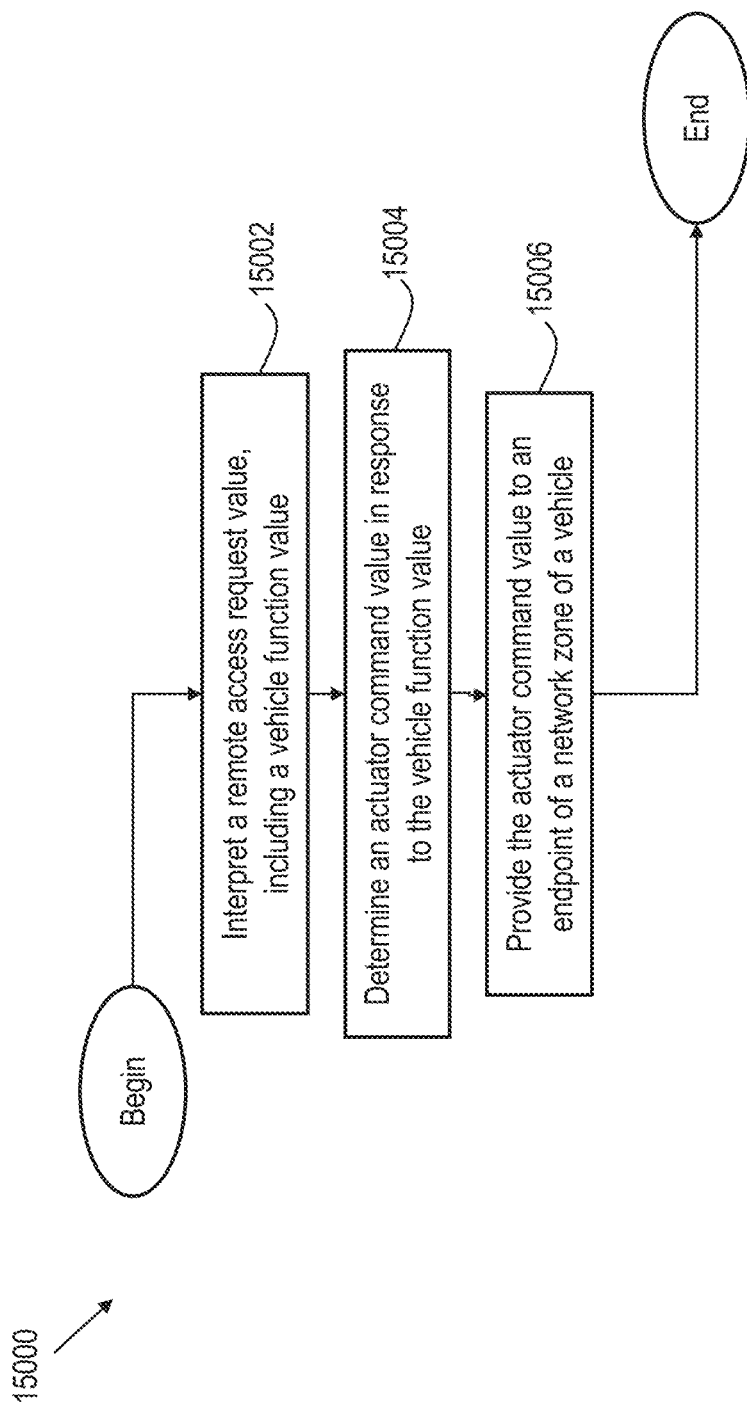
Figure 151:
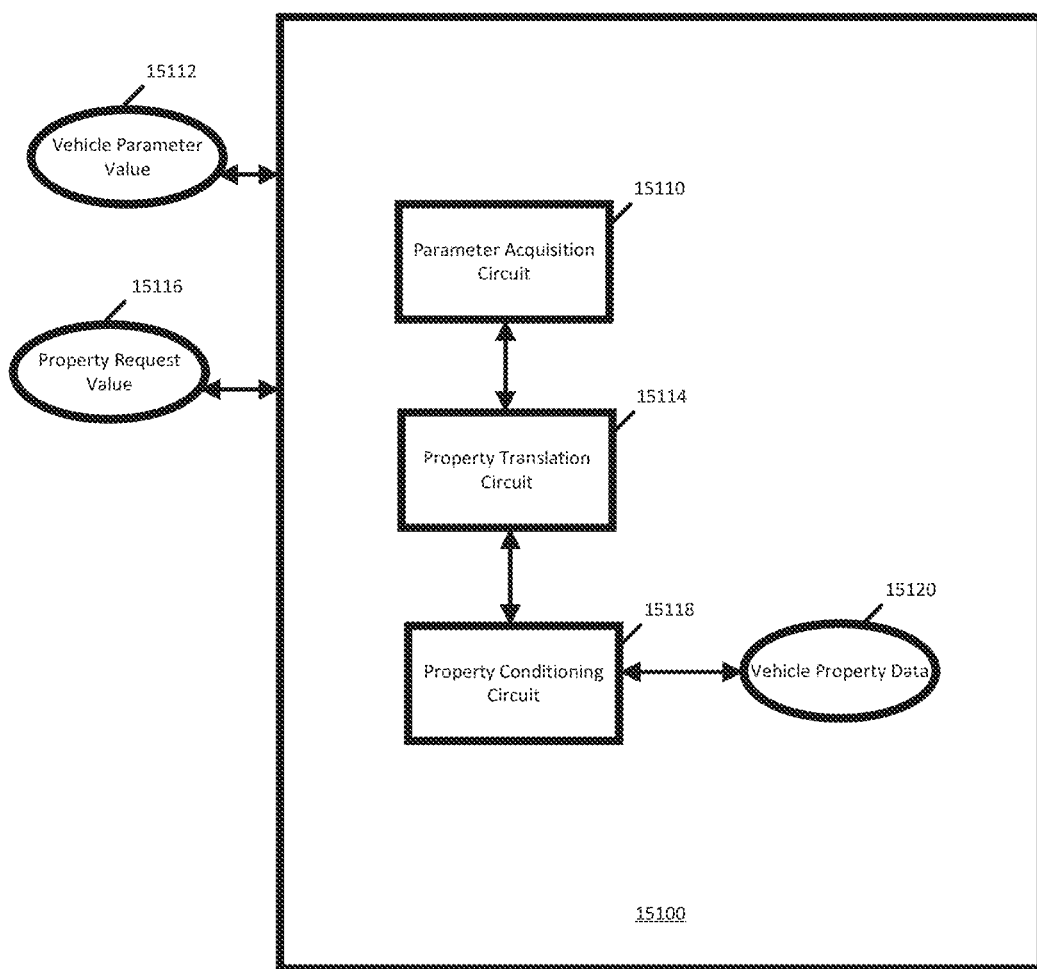
Figure 152:
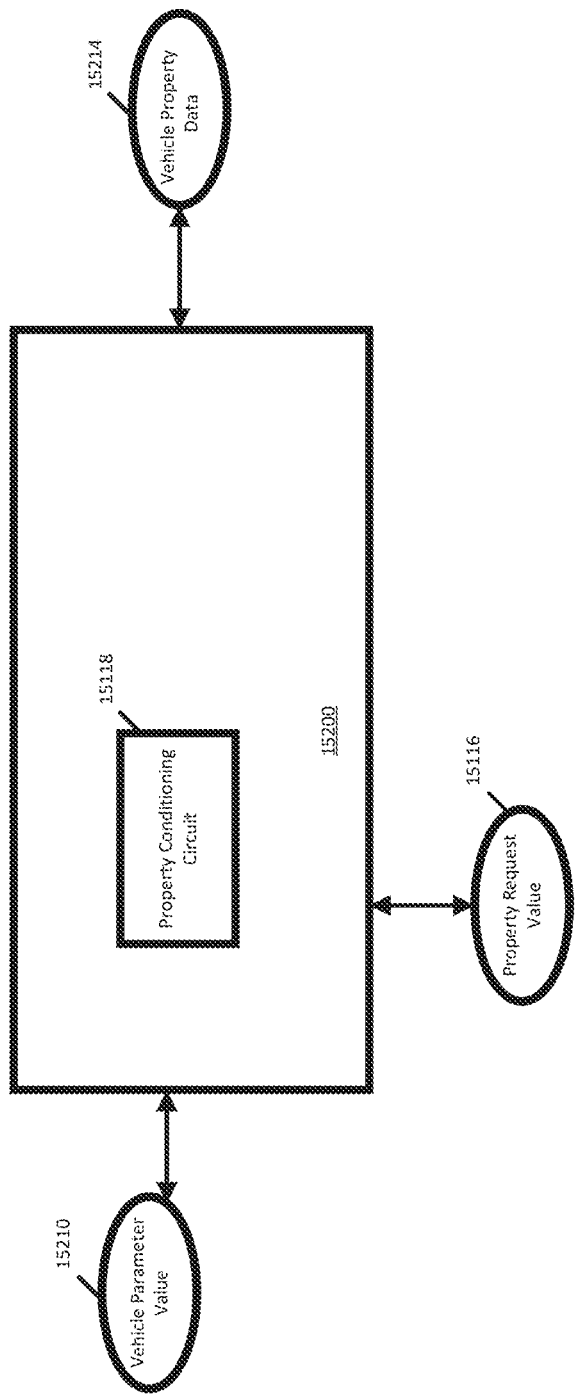
Figure 153:
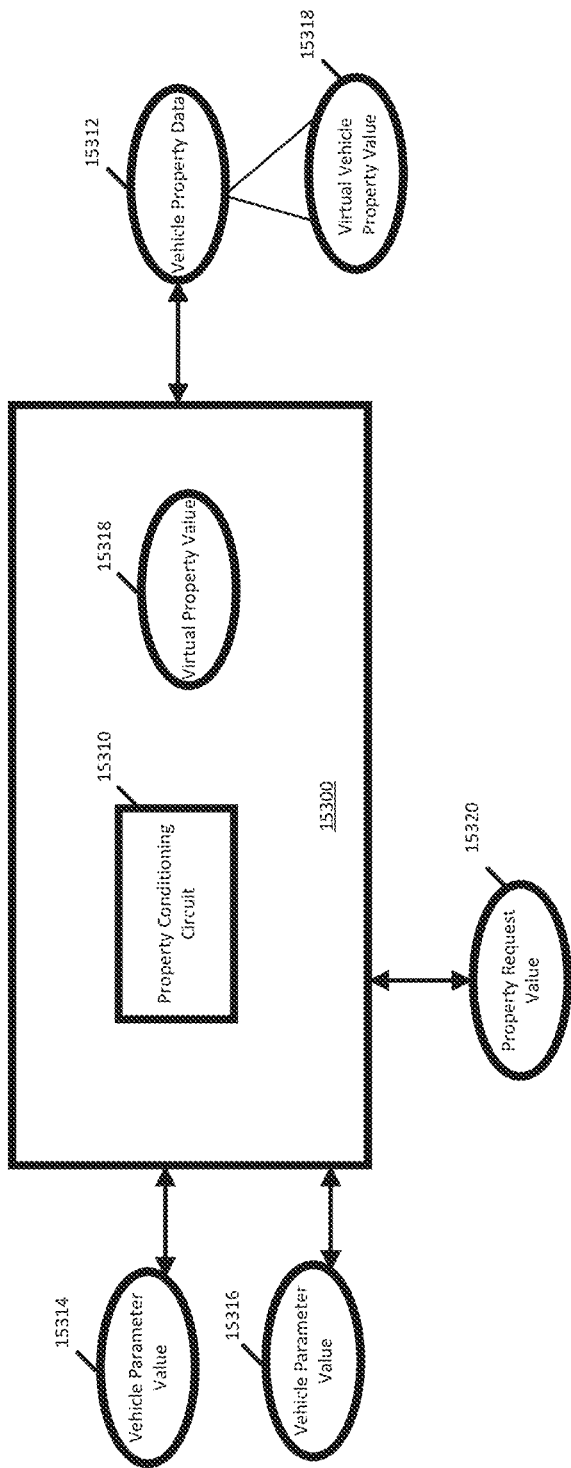
Figure 154:
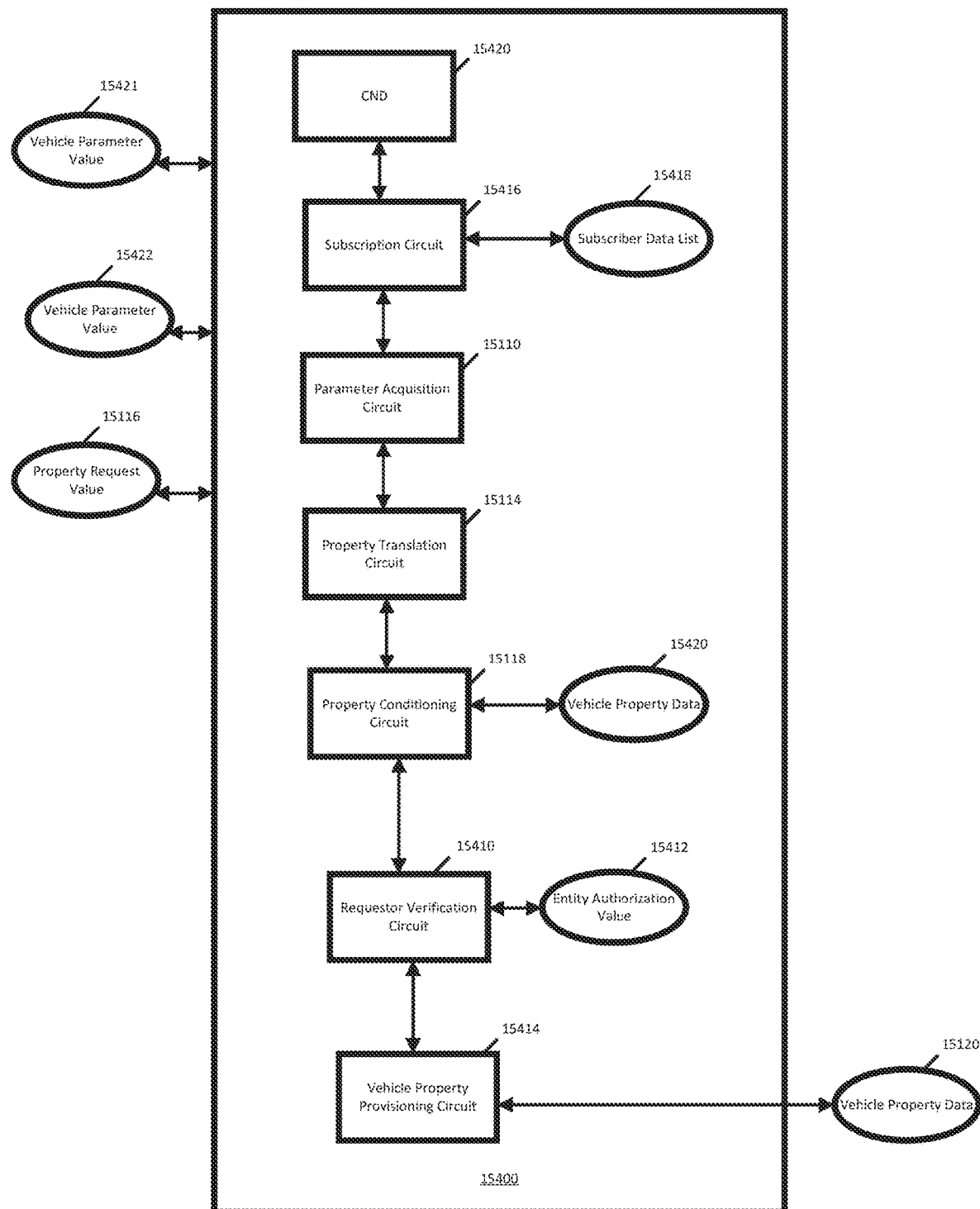
Figure 155:
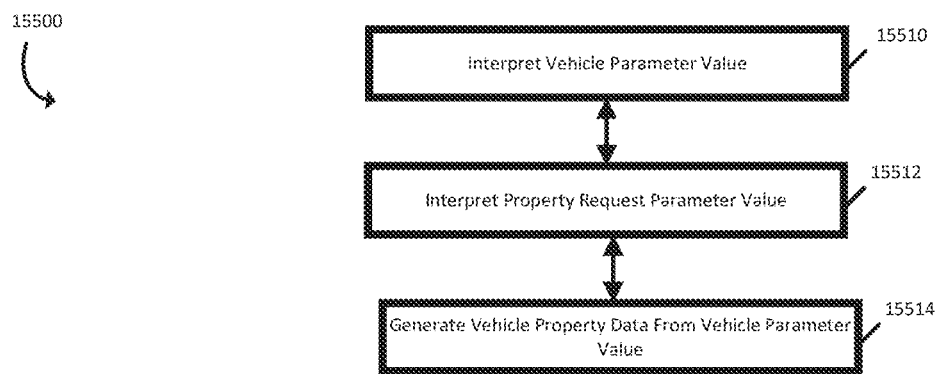
Figure 156:
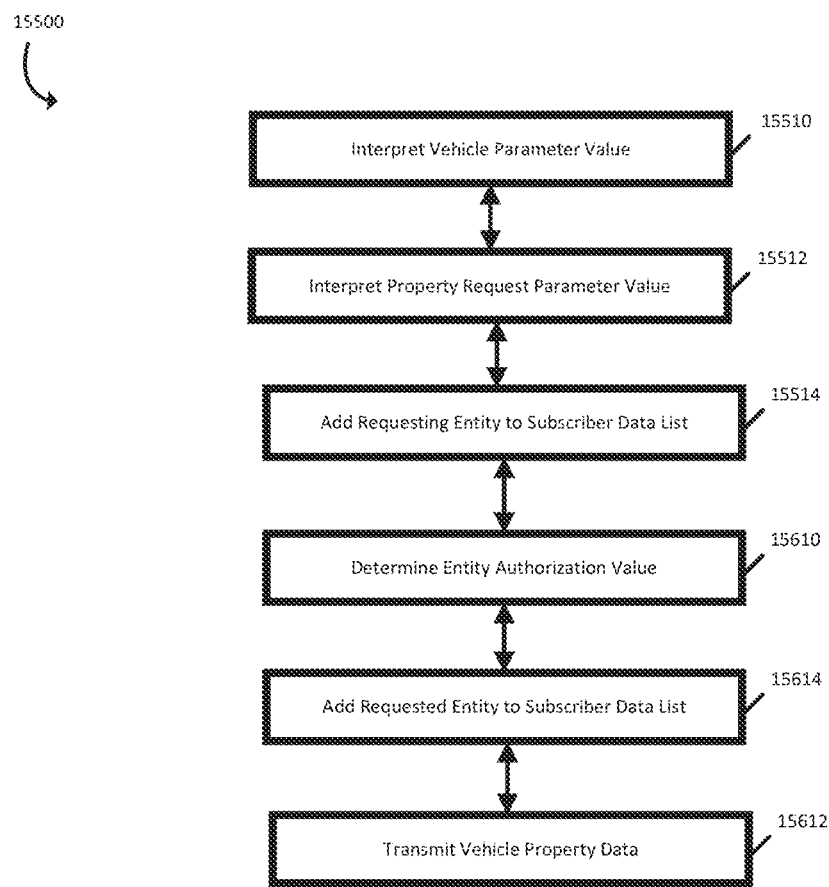
Figure 157:
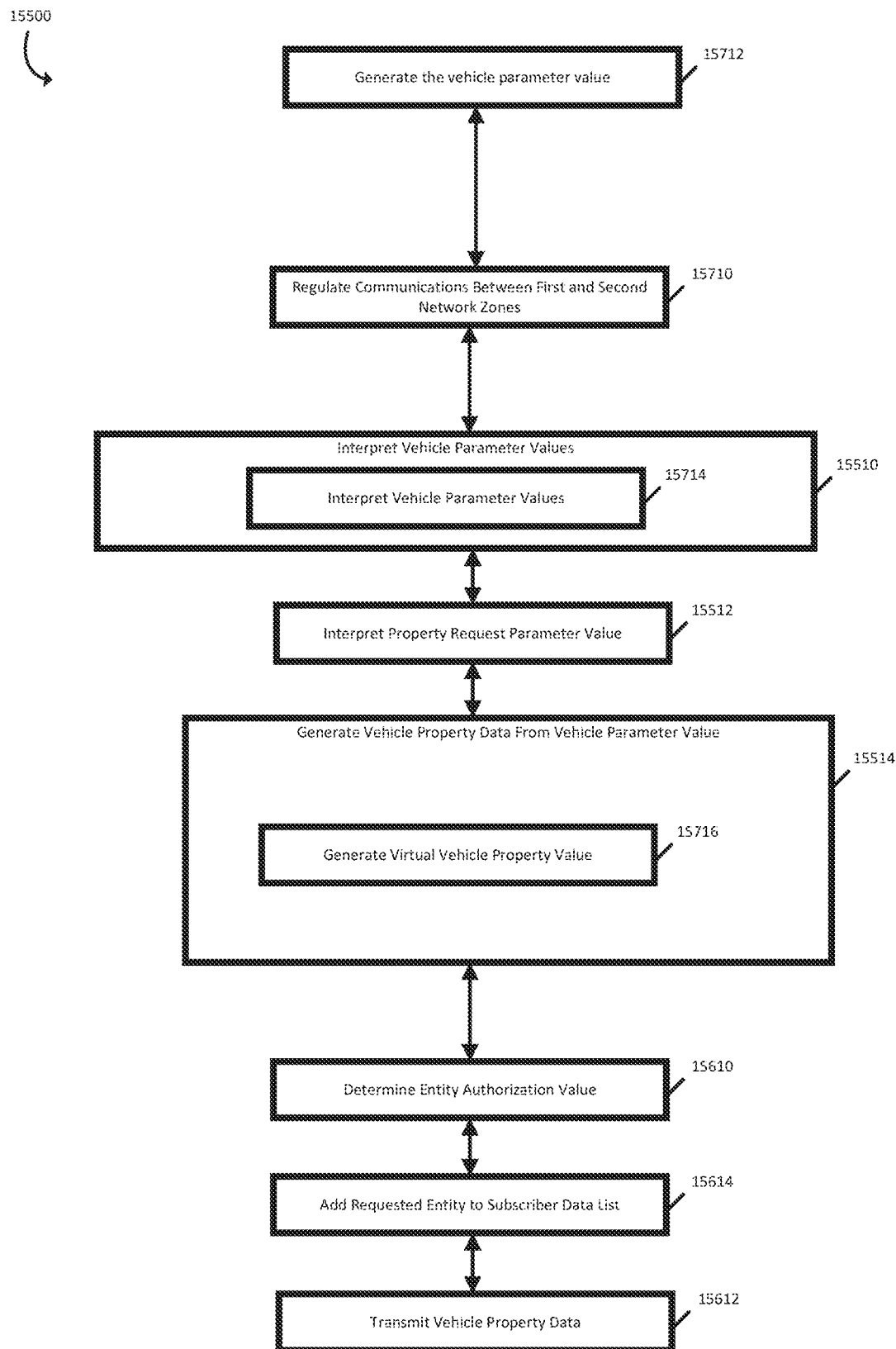
Figure 158:
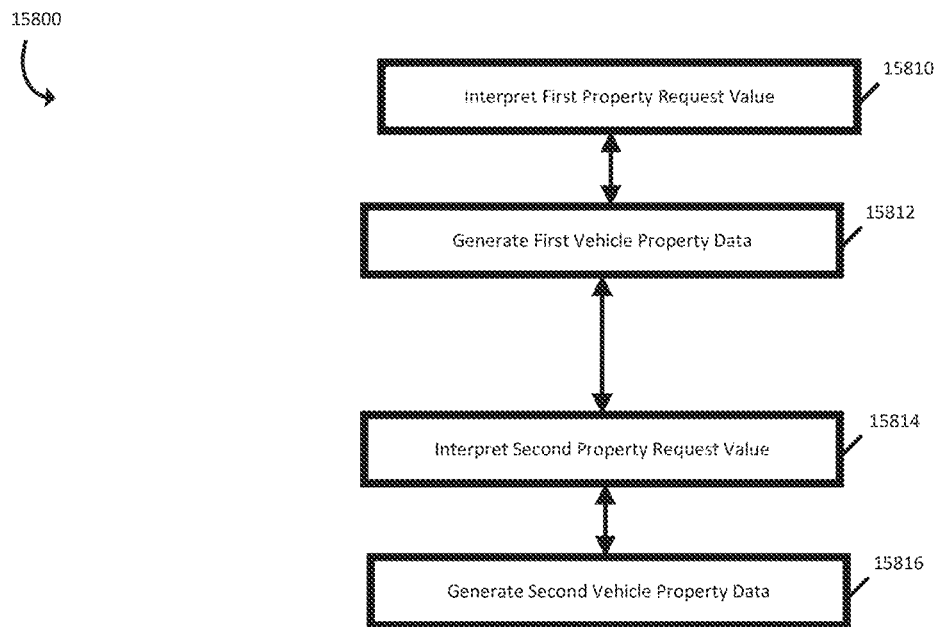
Figure 159:
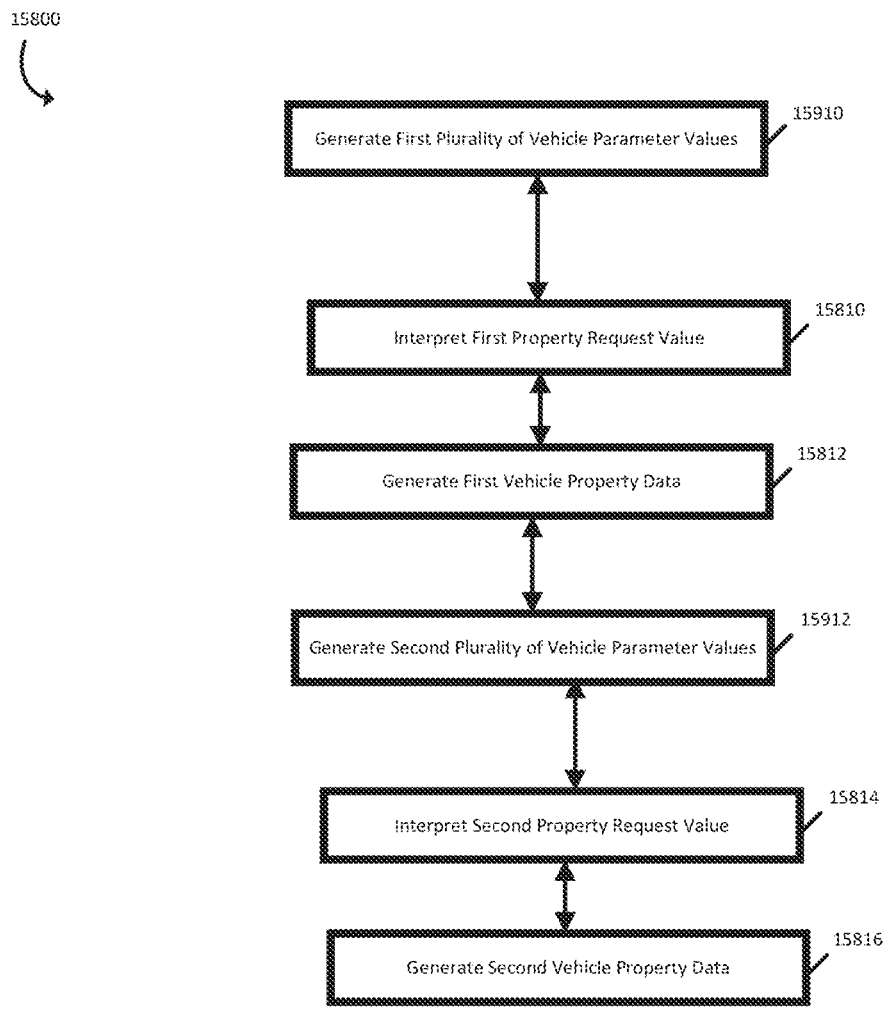
Figure 160:
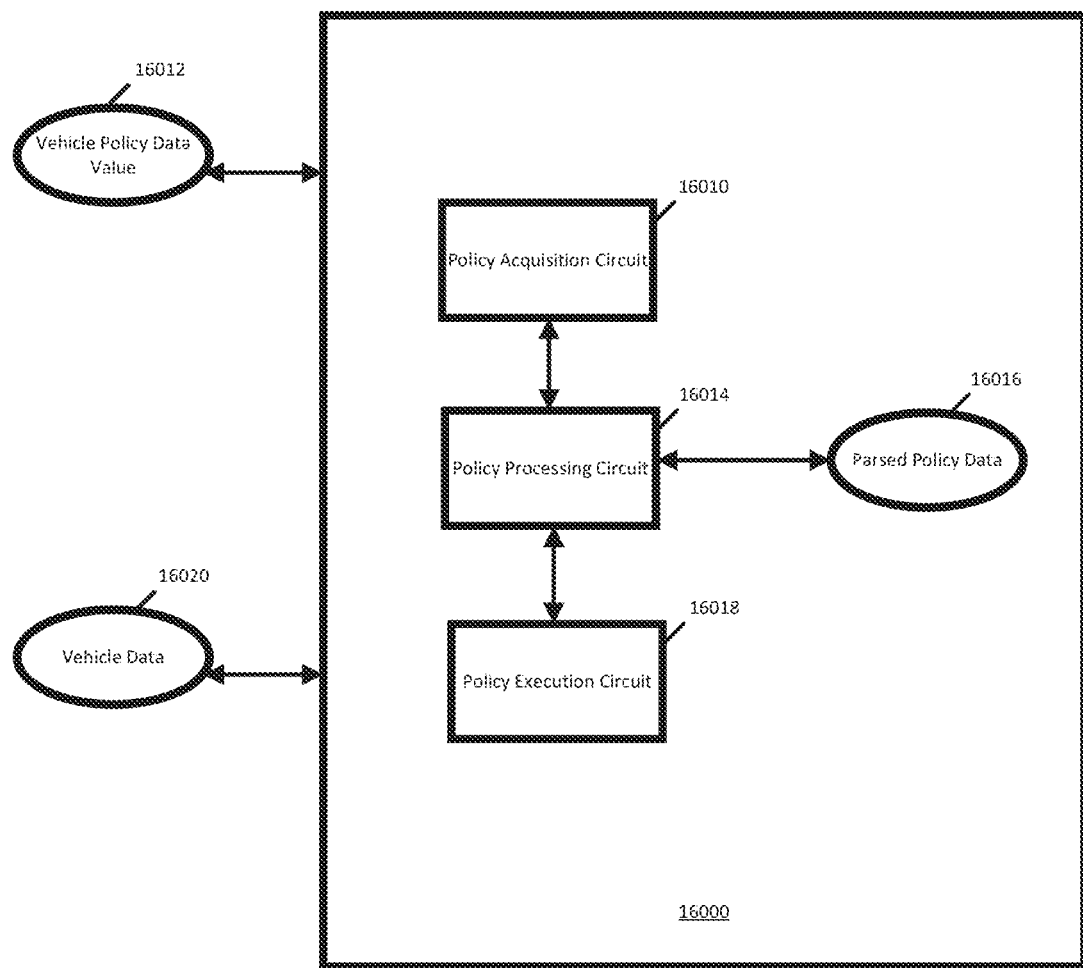
Figure 161:
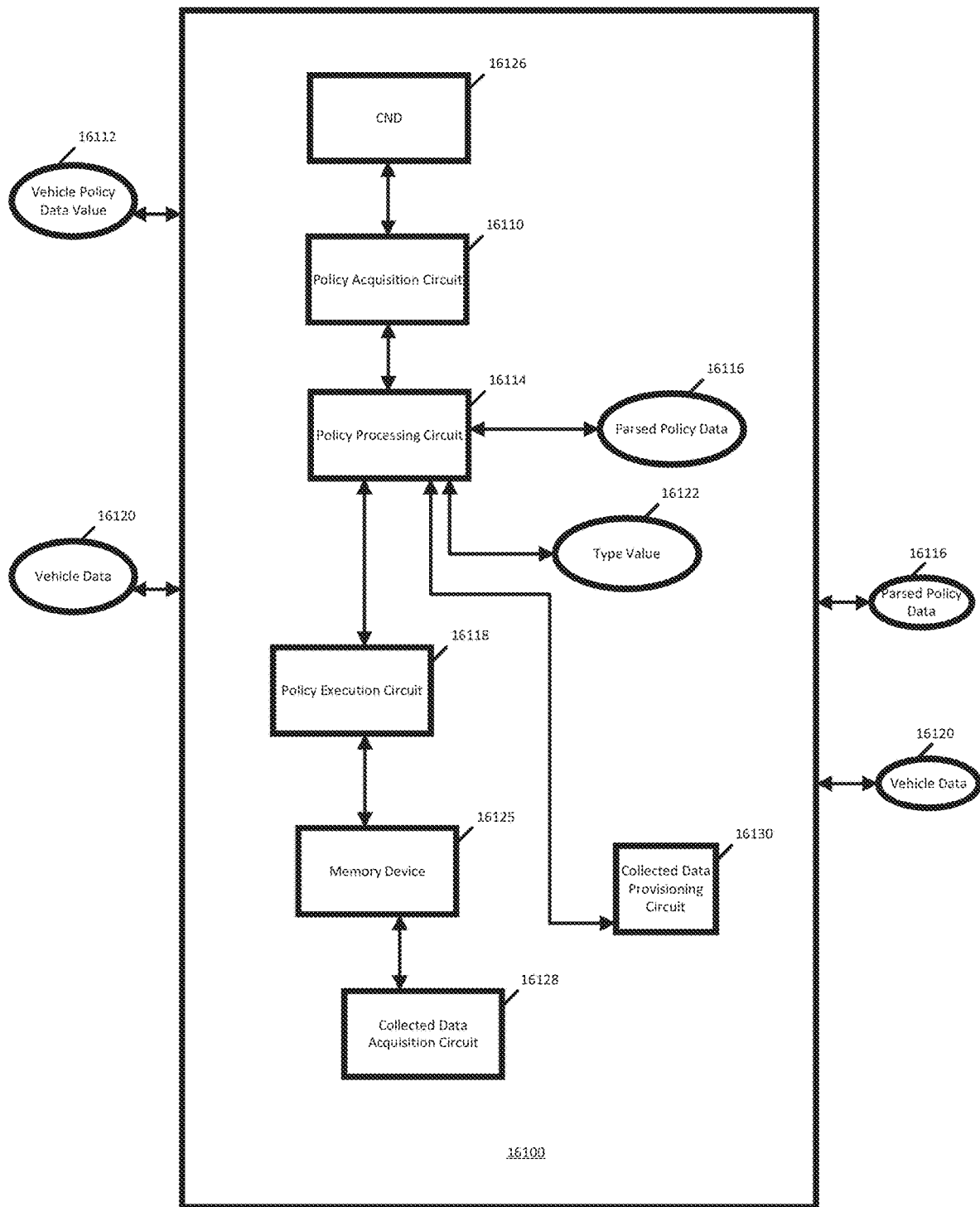
Figure 162:
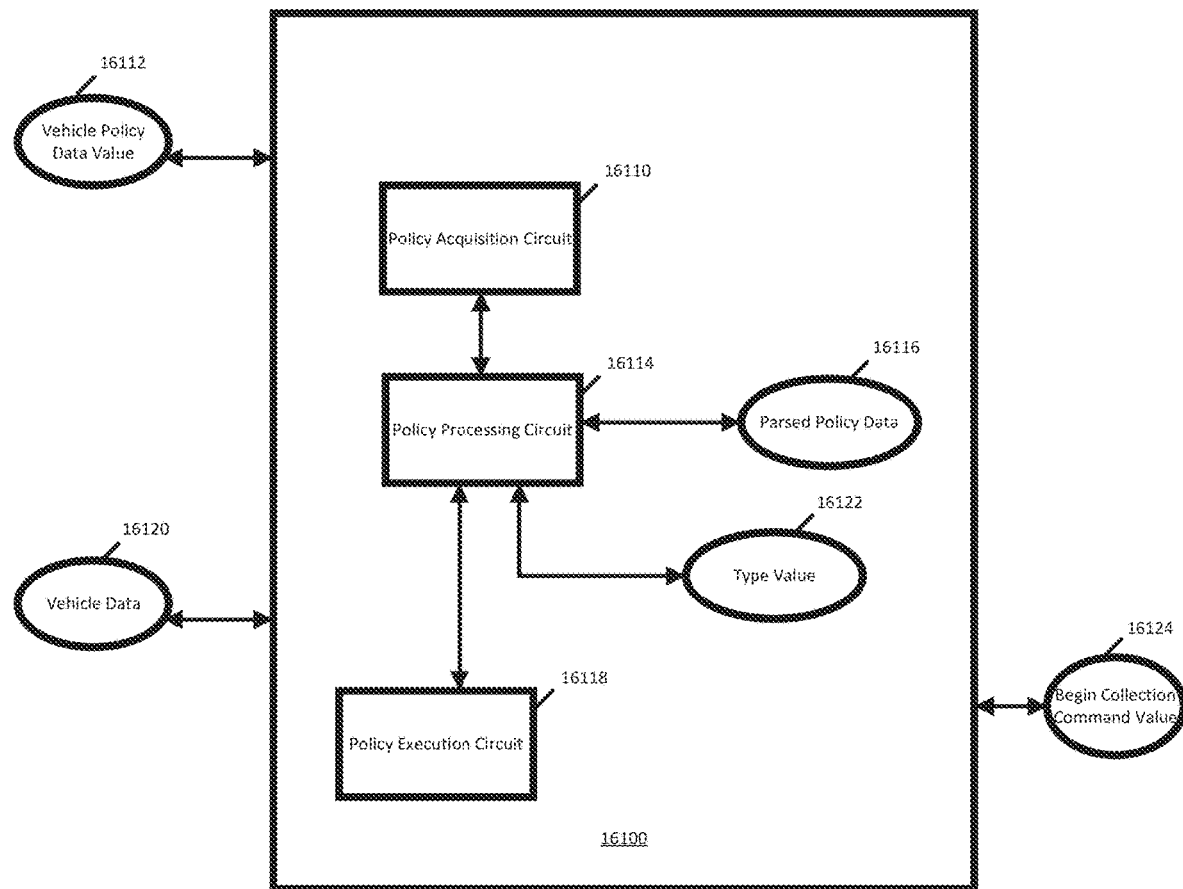
Figure 163:
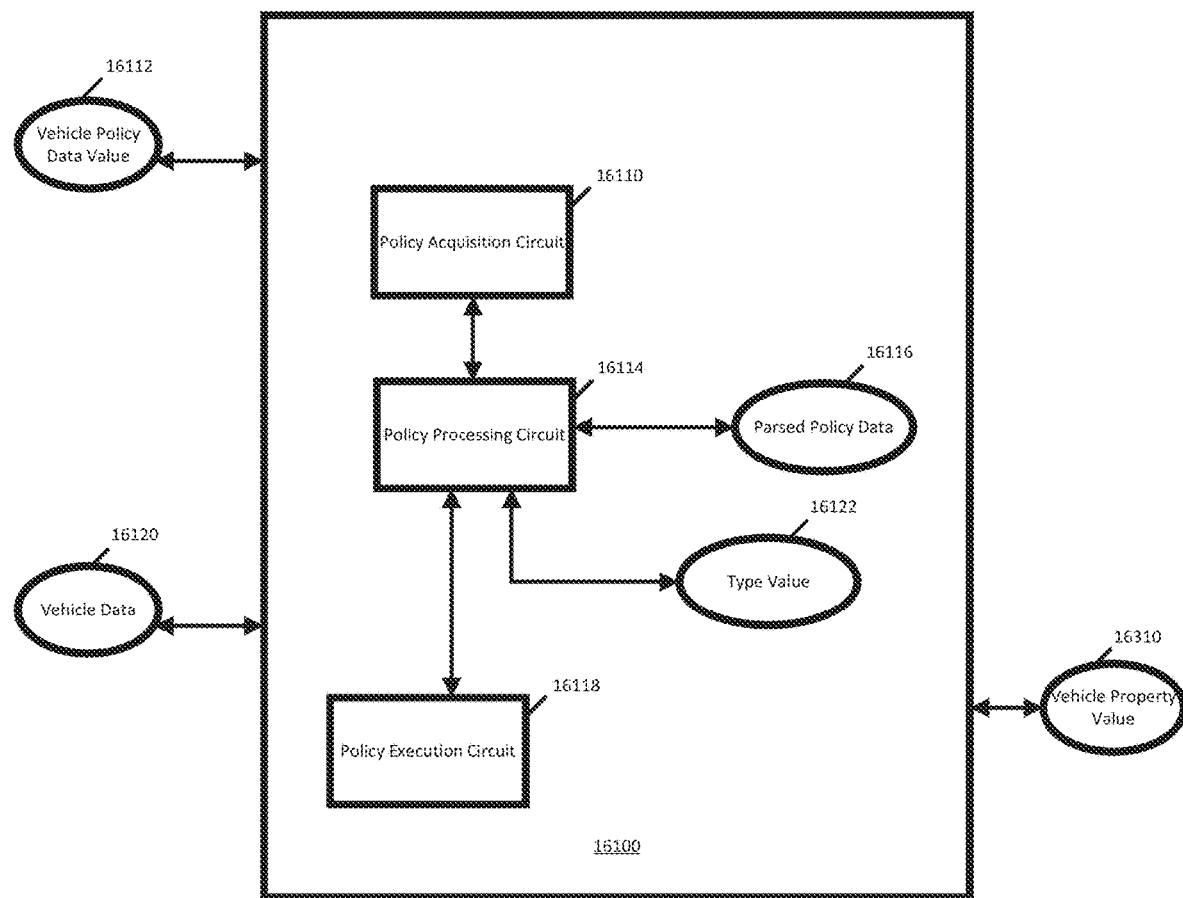
Figure 164:
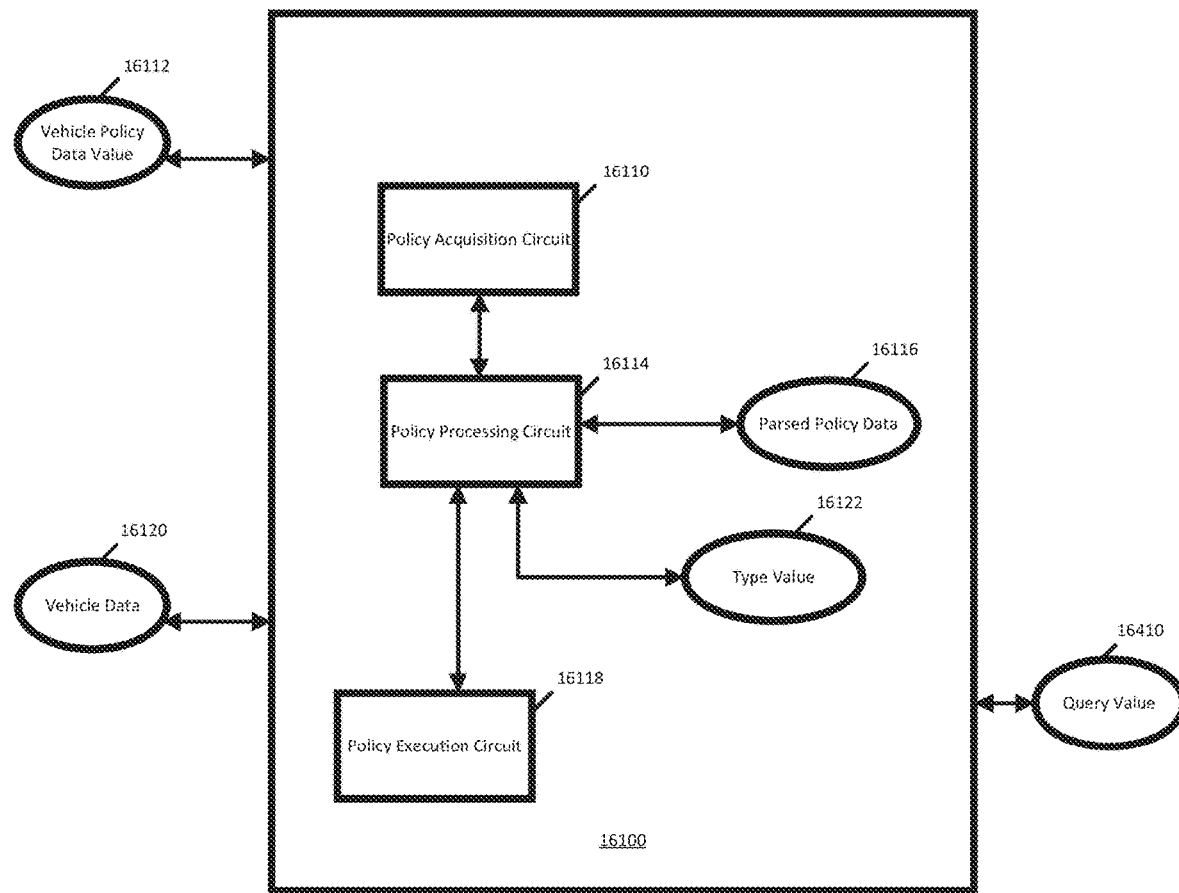
Figure 165:
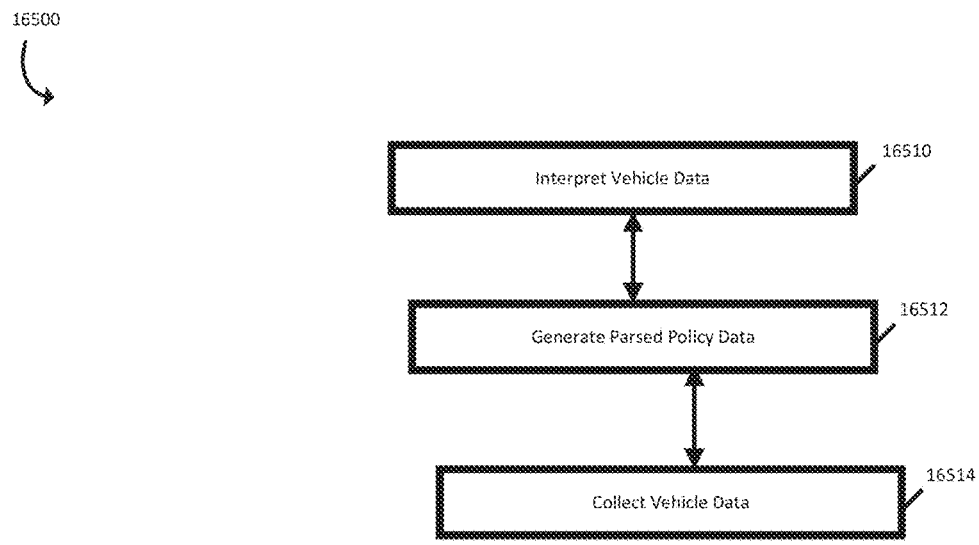
Figure 166:
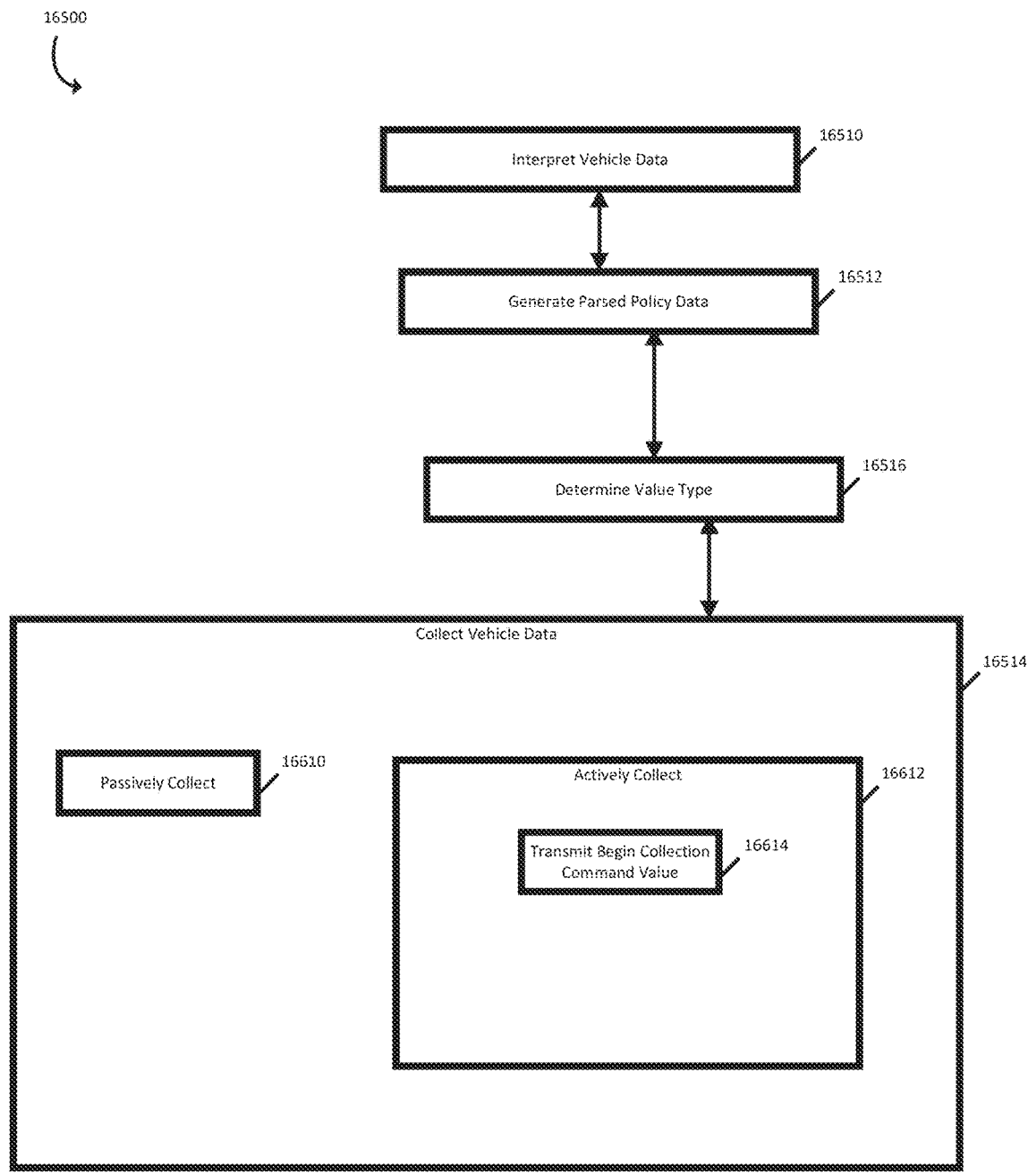
Figure 167:
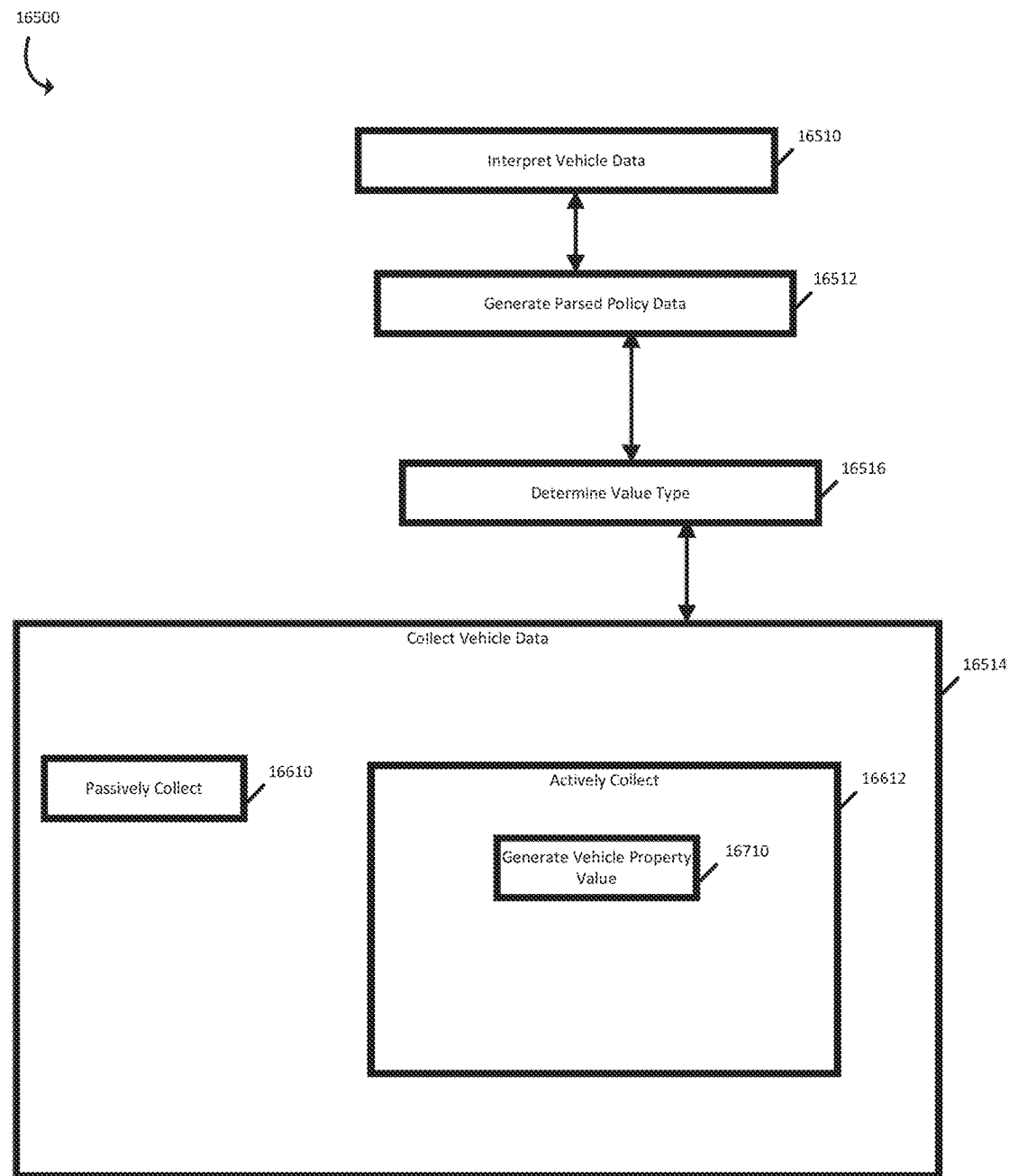
Figure 168:
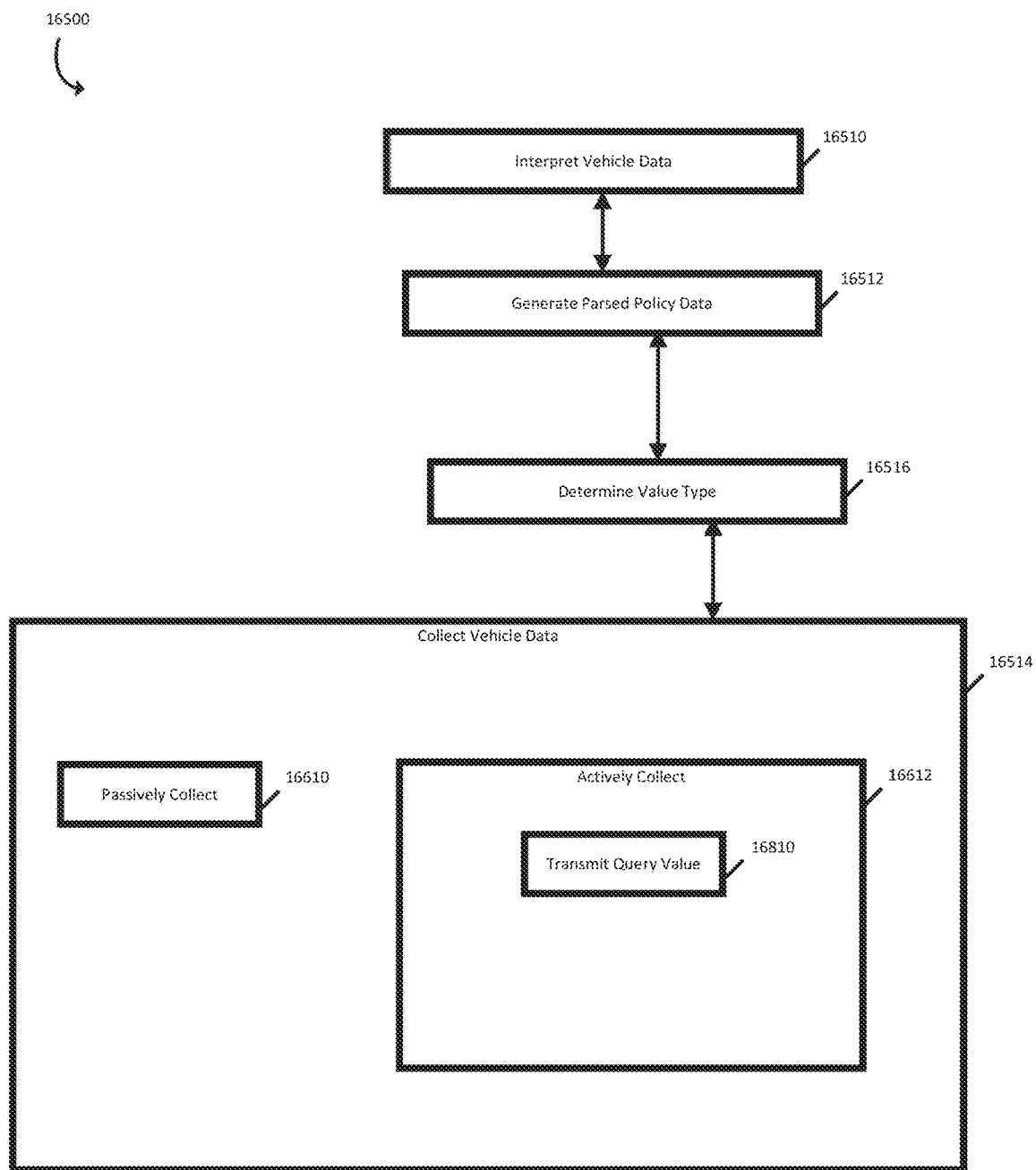
Figure 169:
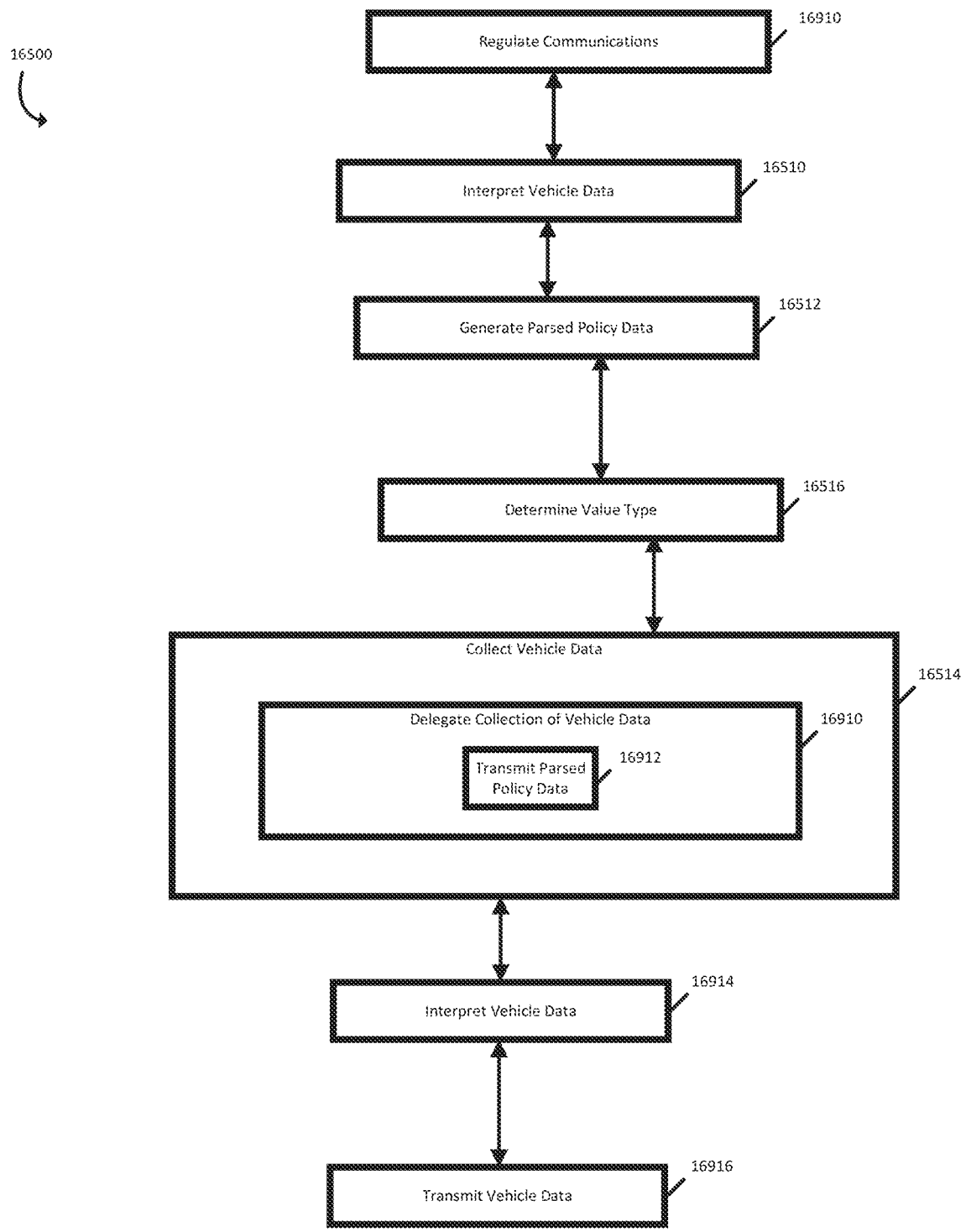
Figure 170:
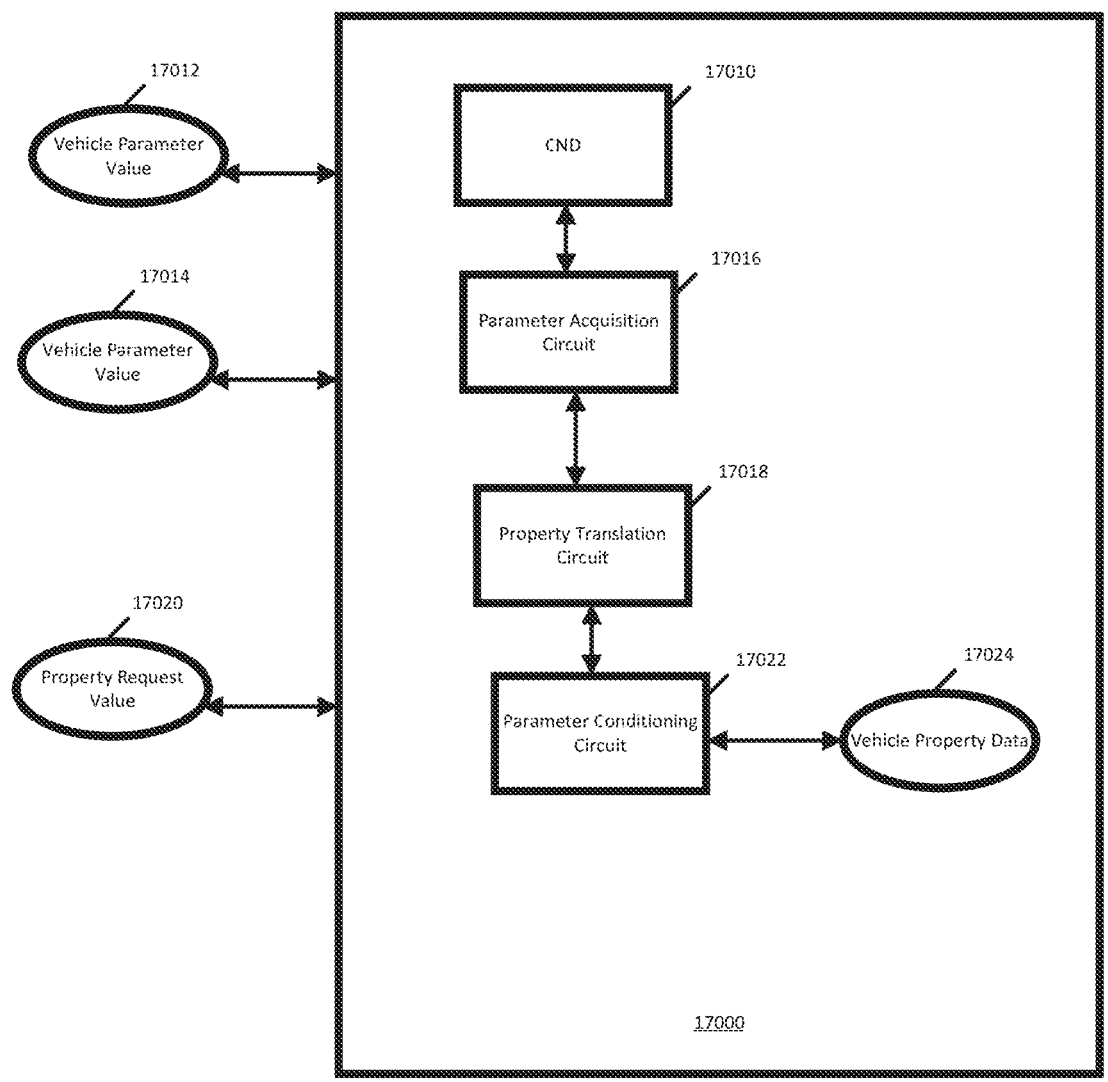
Figure 171:
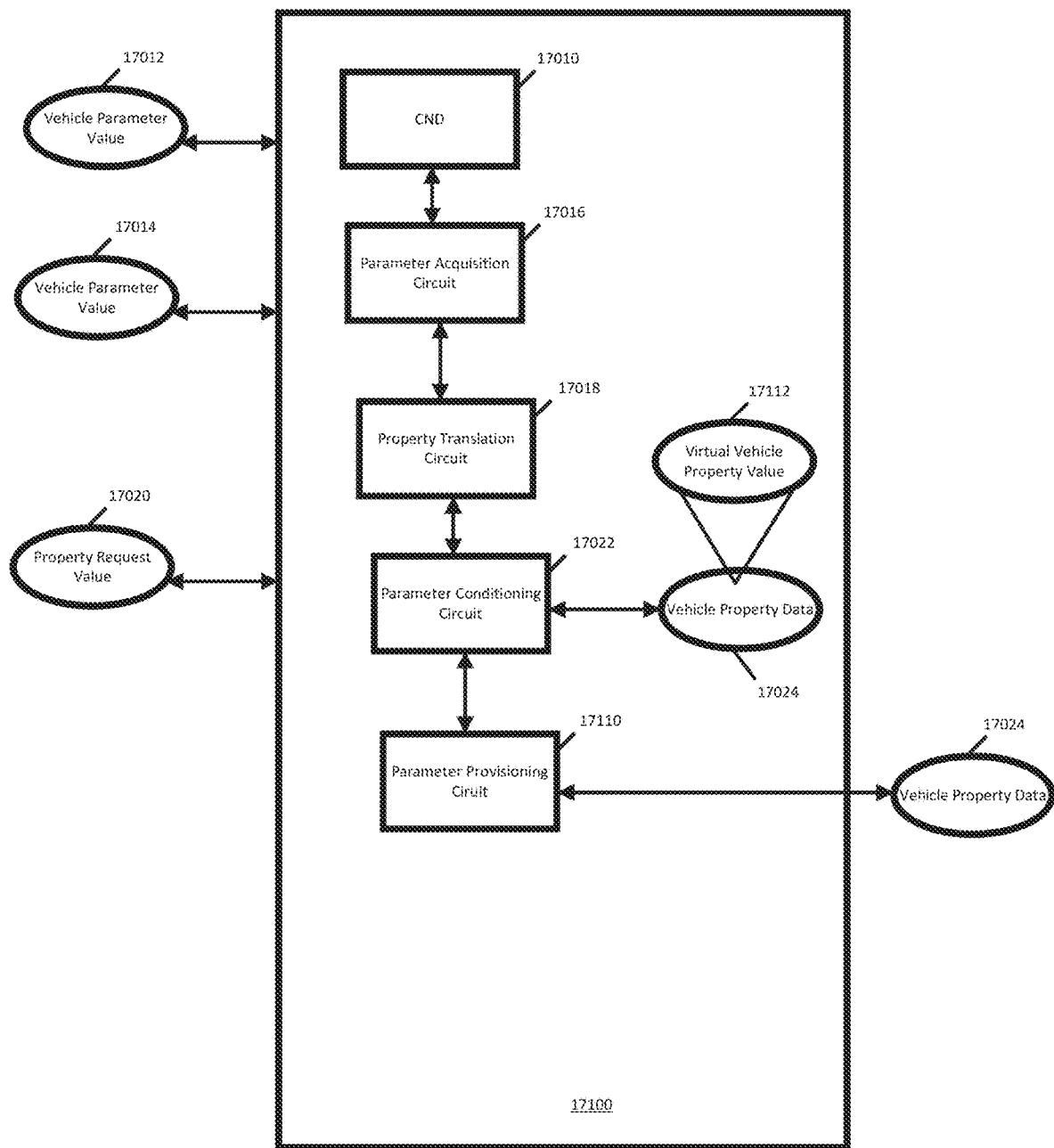
Figure 172:
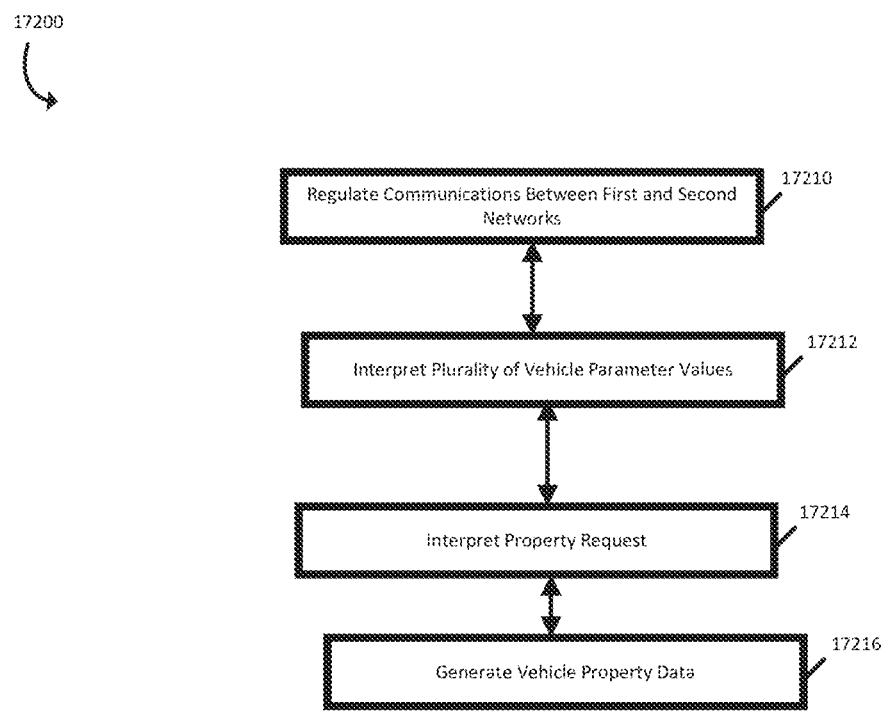
Figure 173:
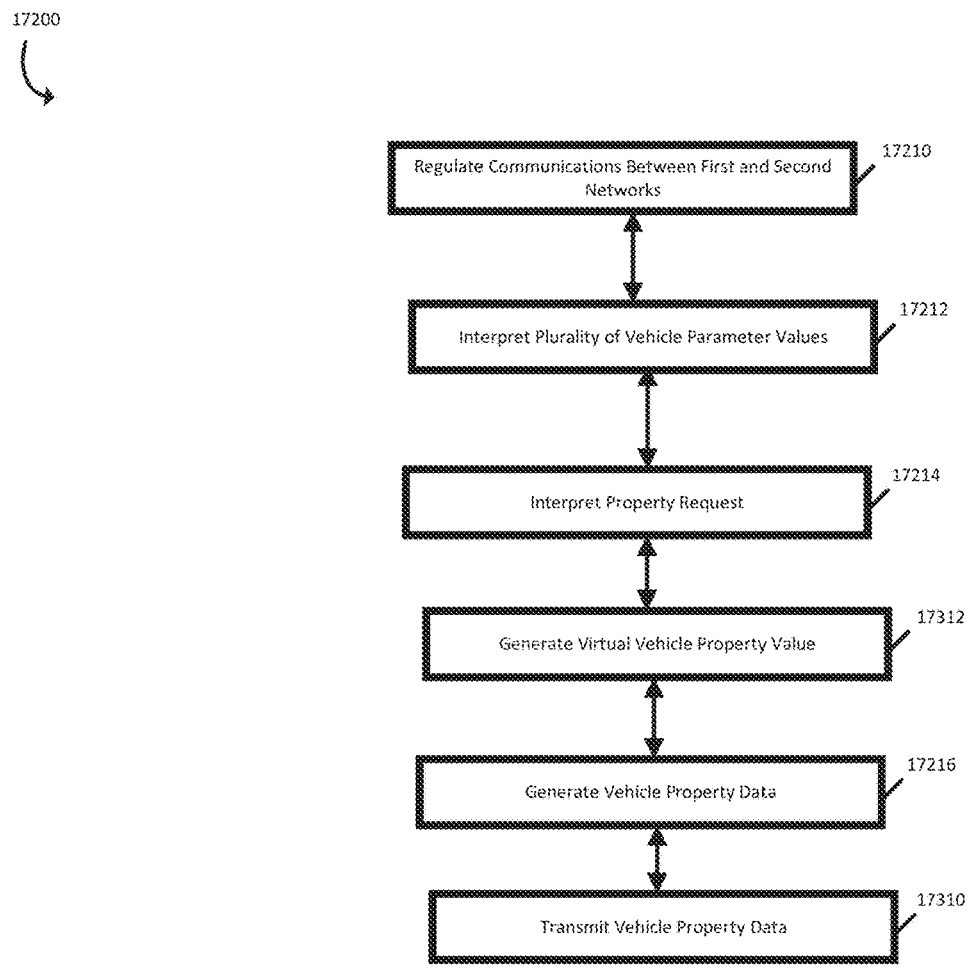
Figure 174:
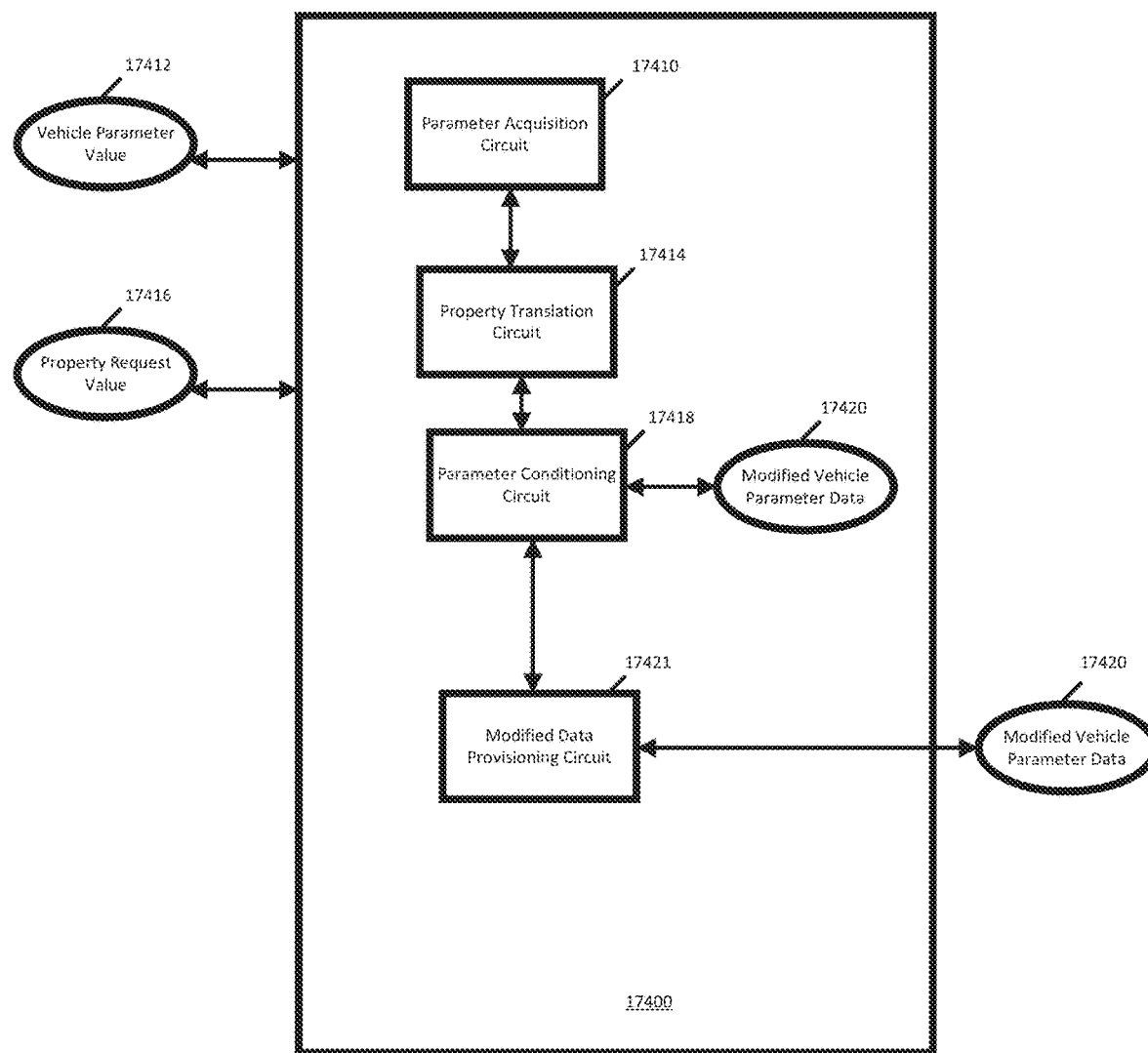
Figure 175:
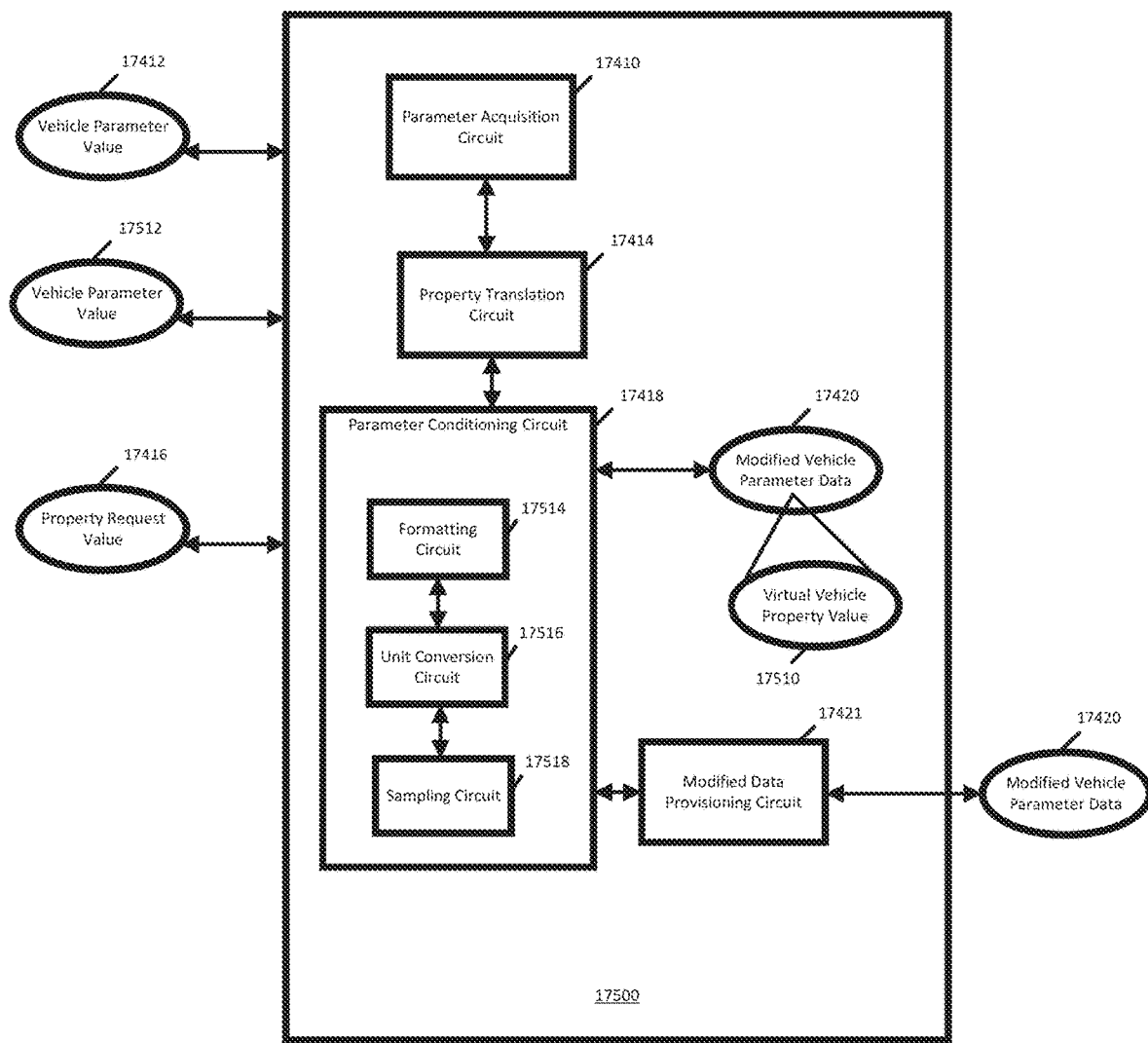
Figure 176:
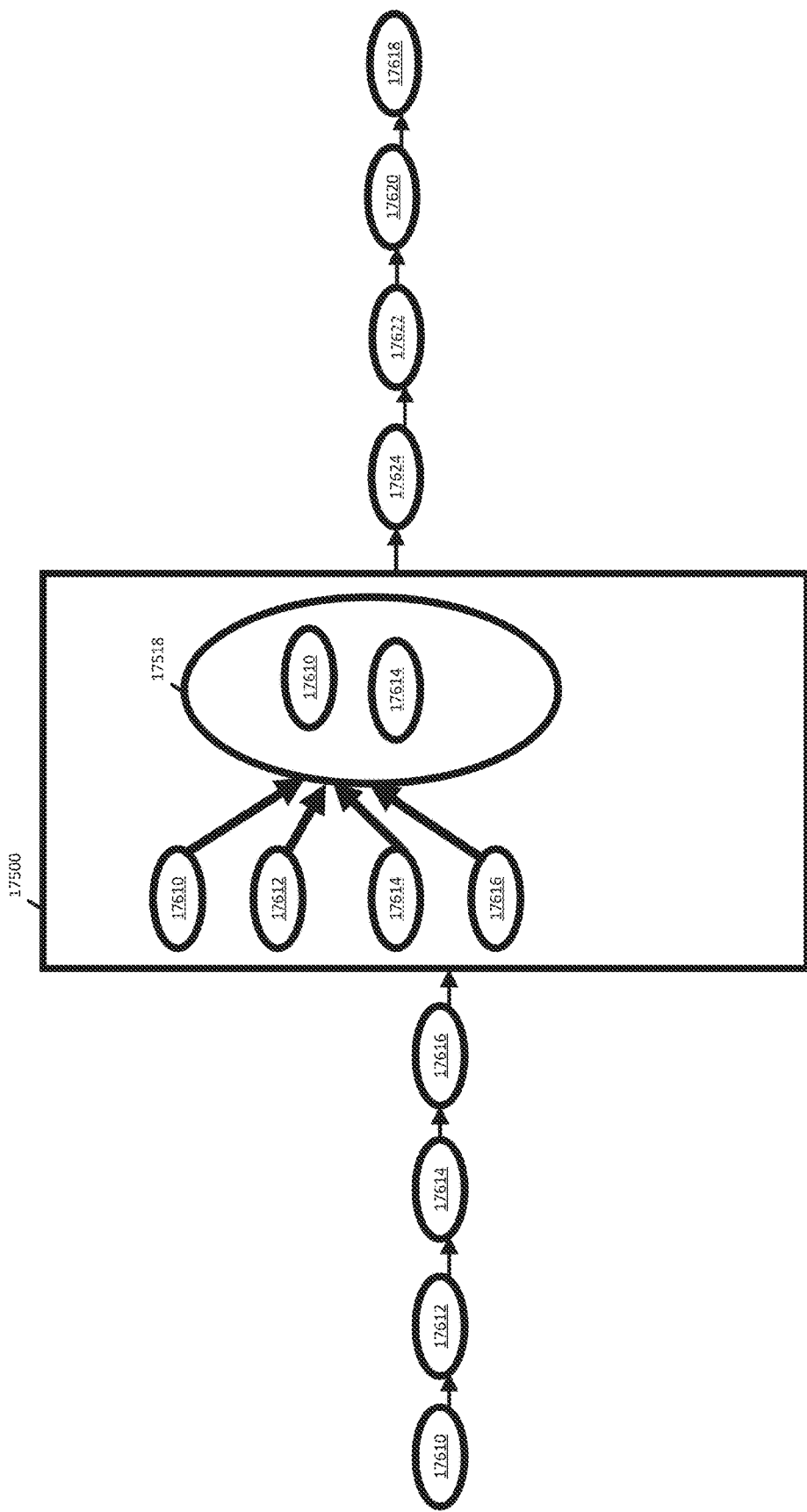
Figure 177:
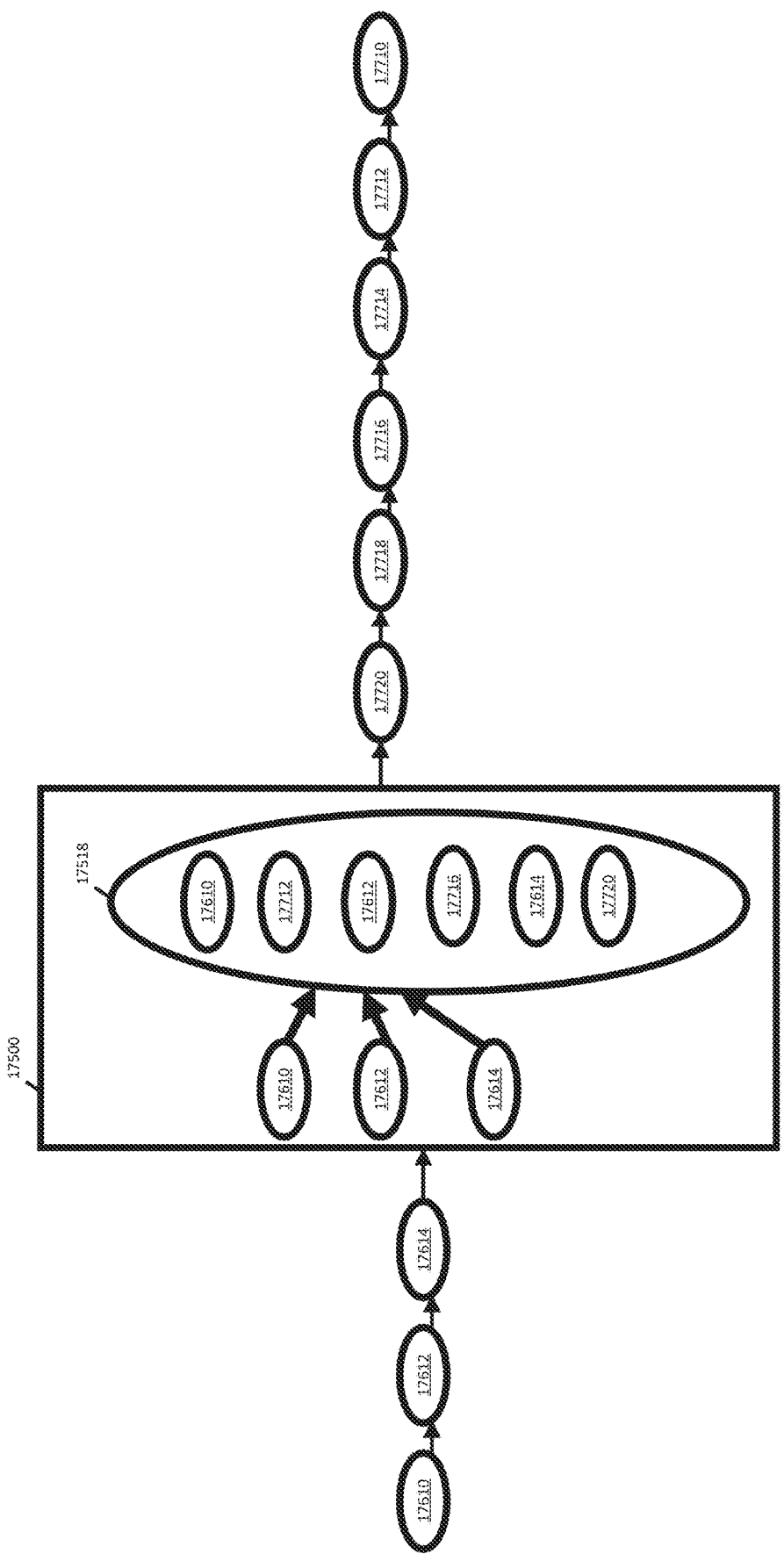
Figure 178:
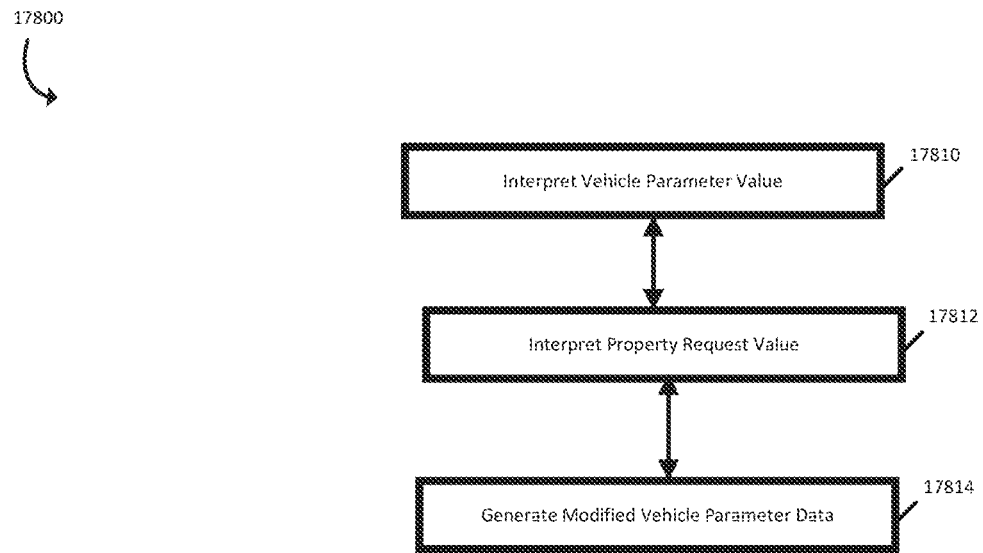
Figure 179:
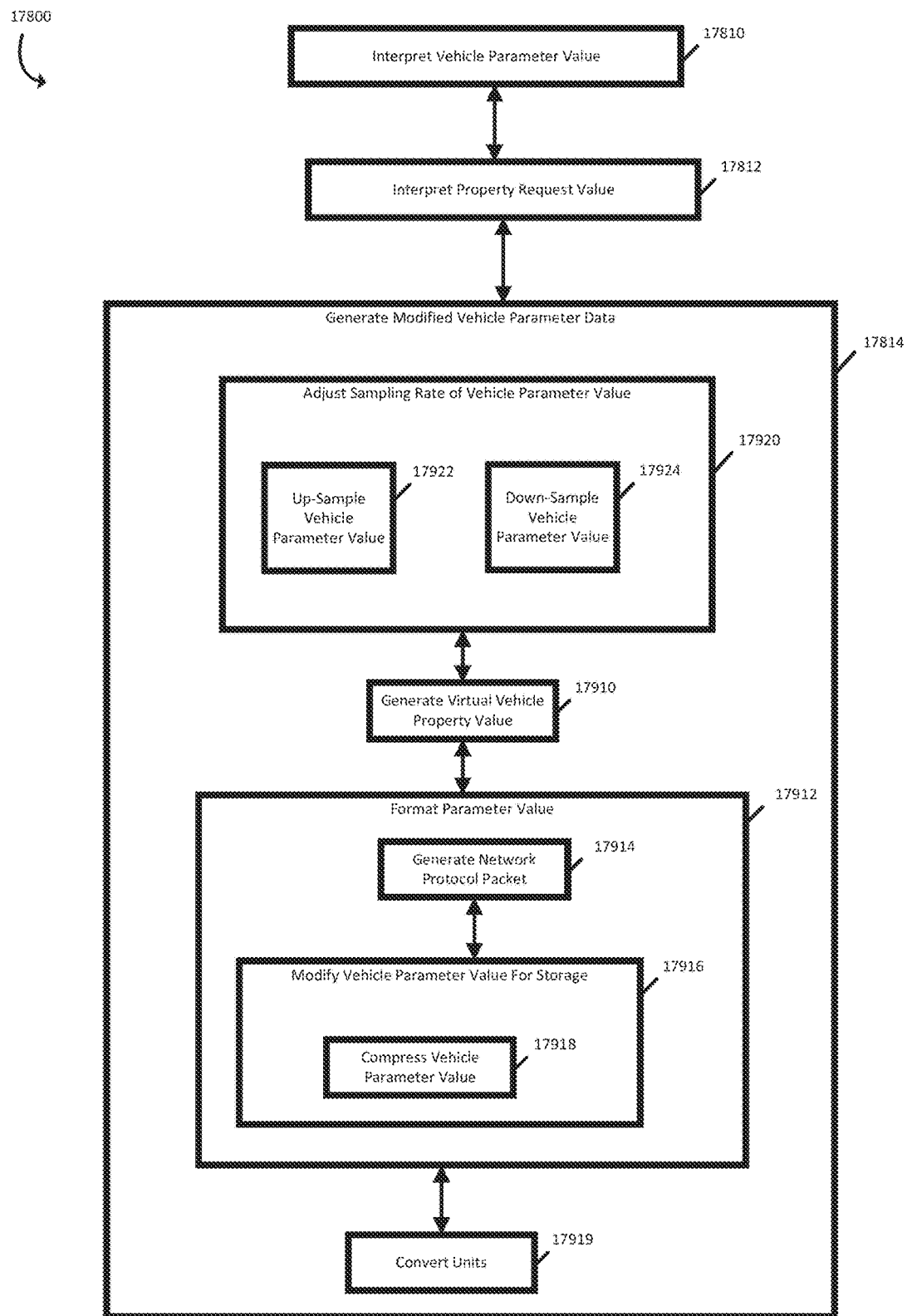
Figure 180:
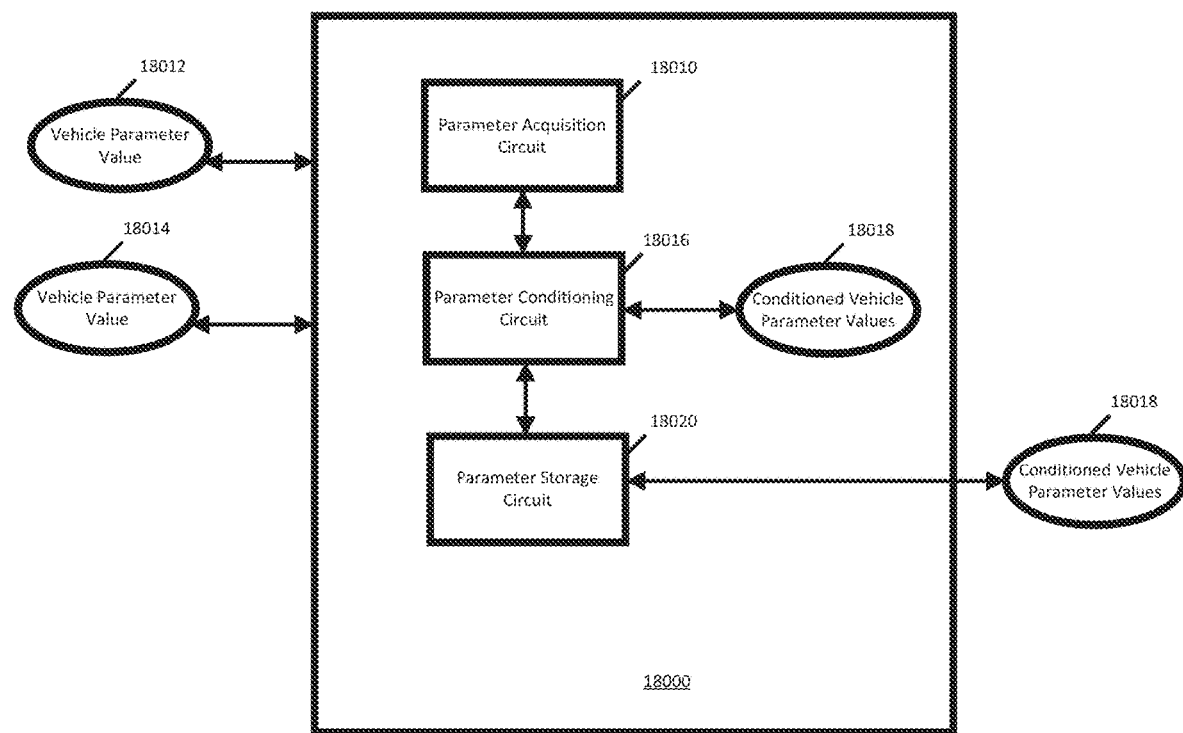
Figure 181:
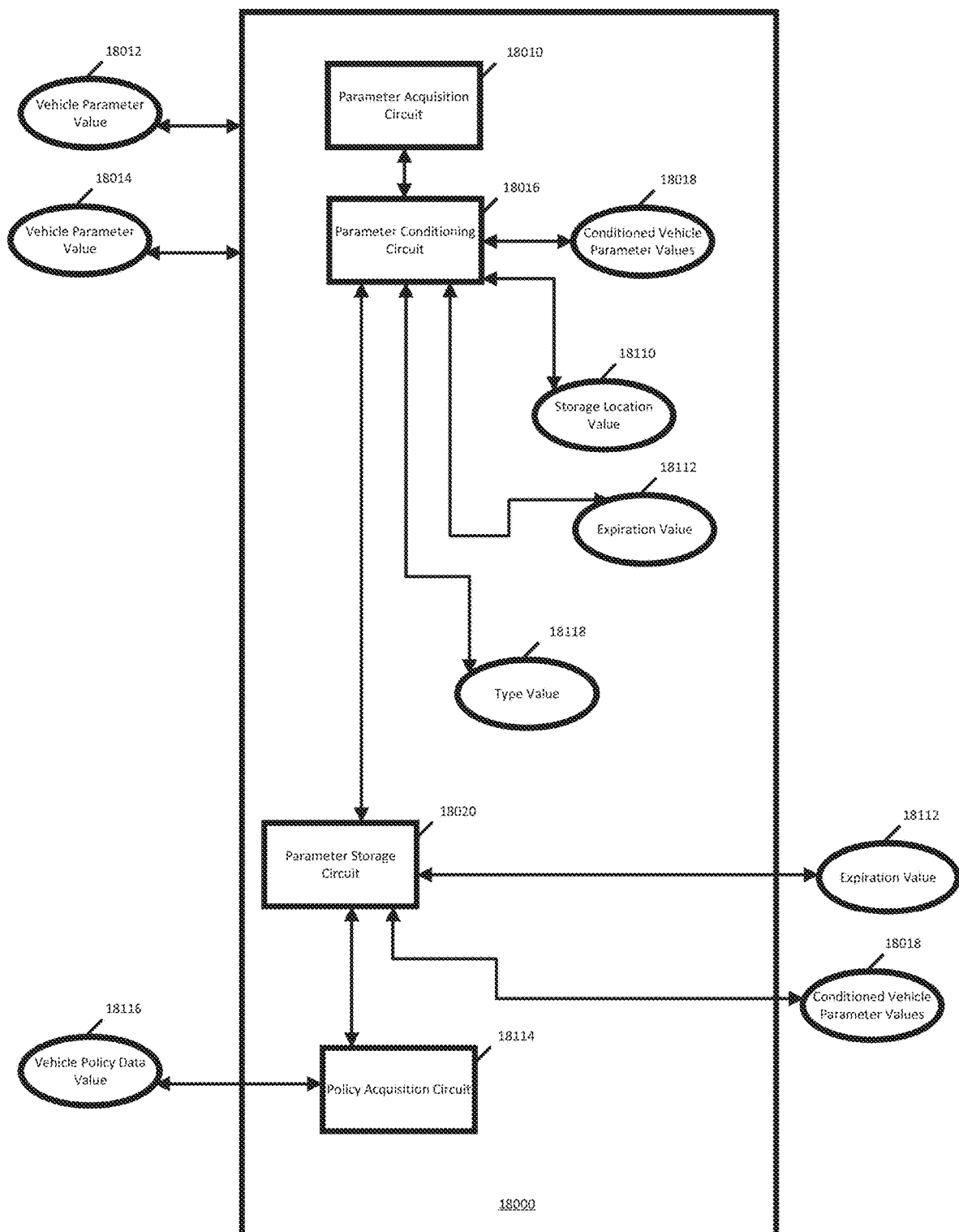
Figure 182:
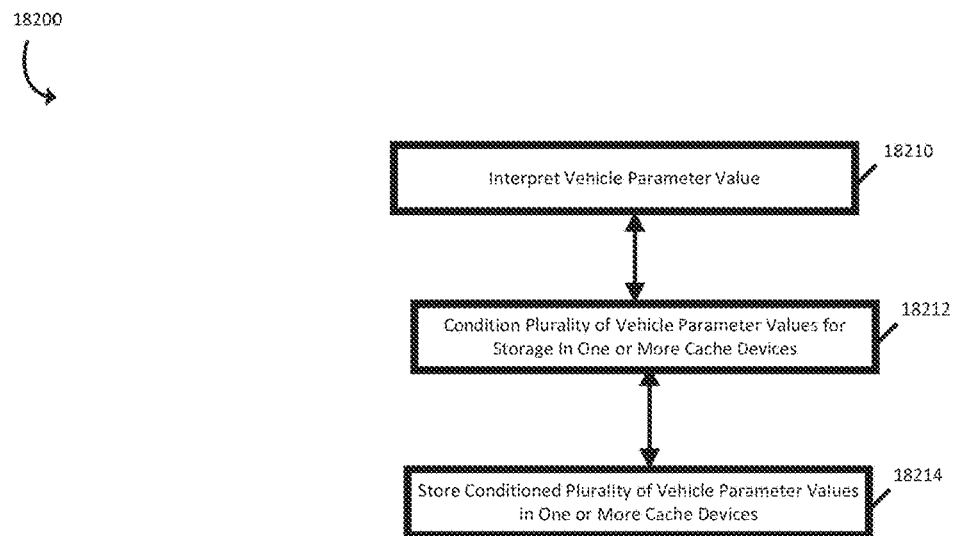
Figure 183:
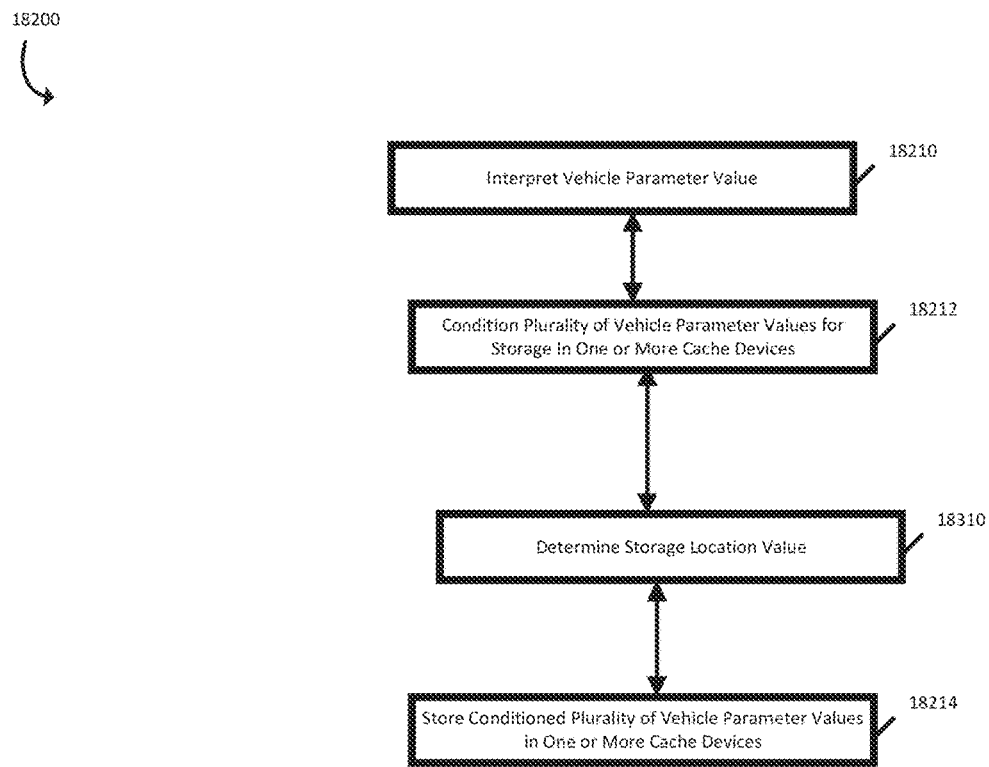
Figure 184:
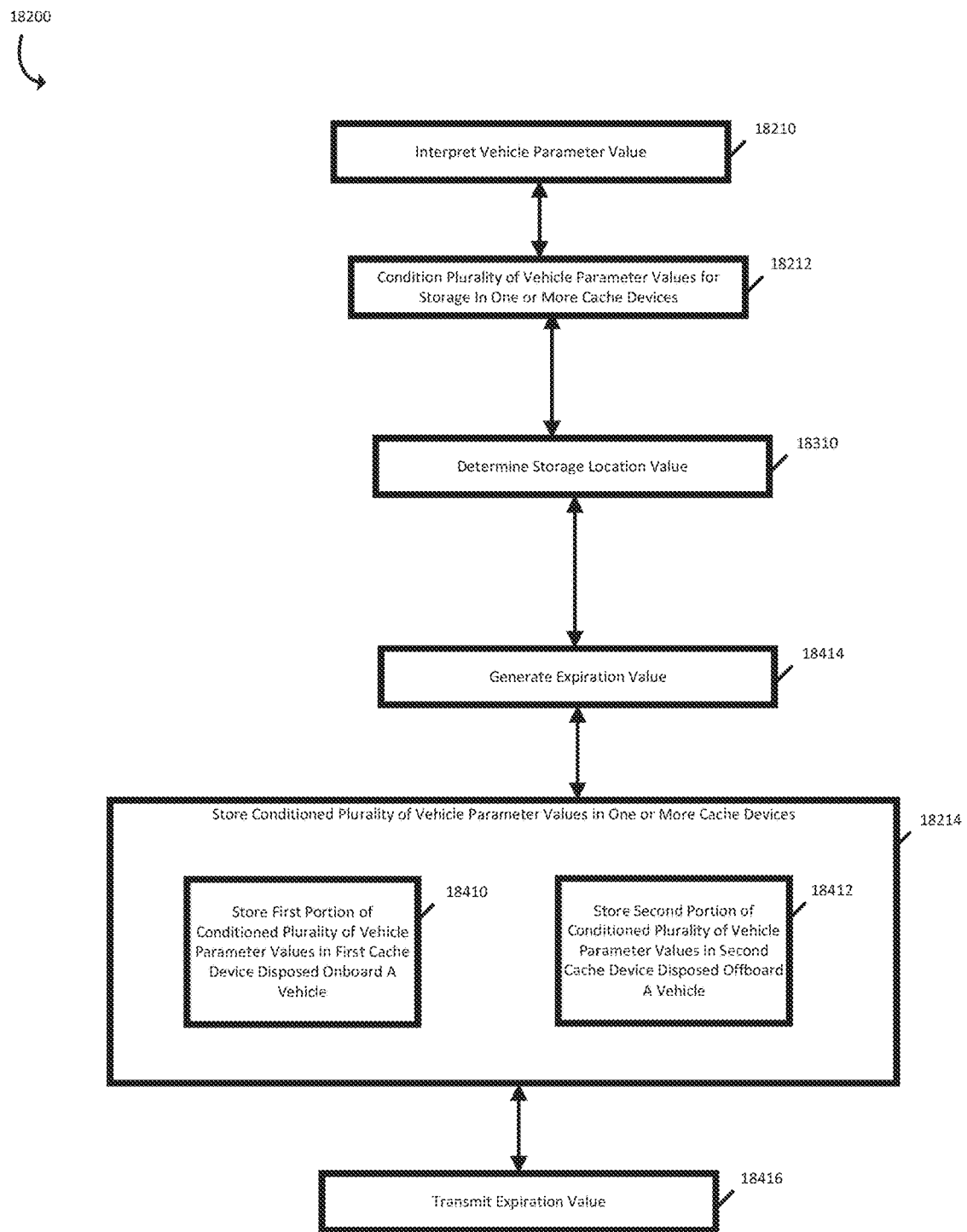
Figure 185:
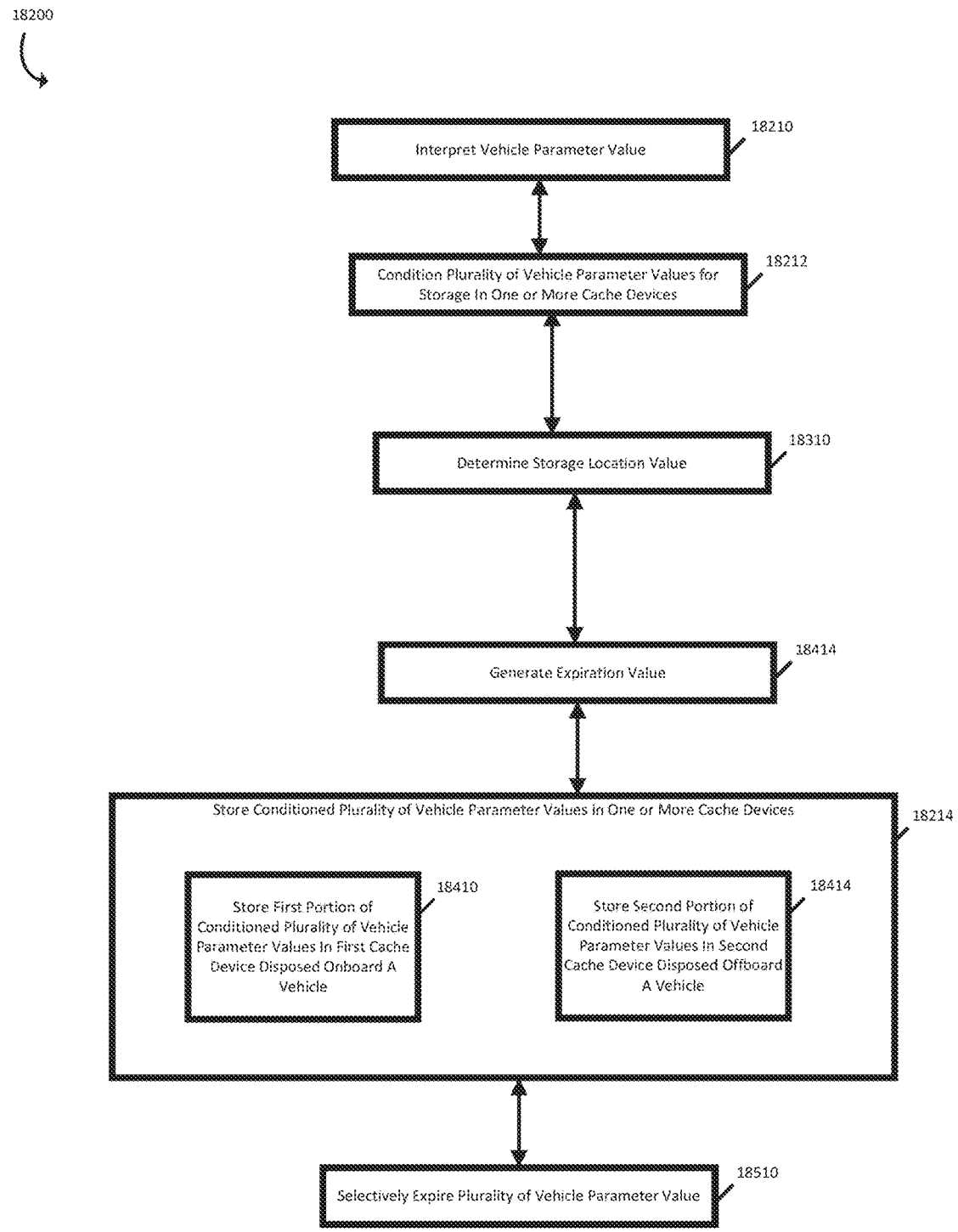
Figure 186:
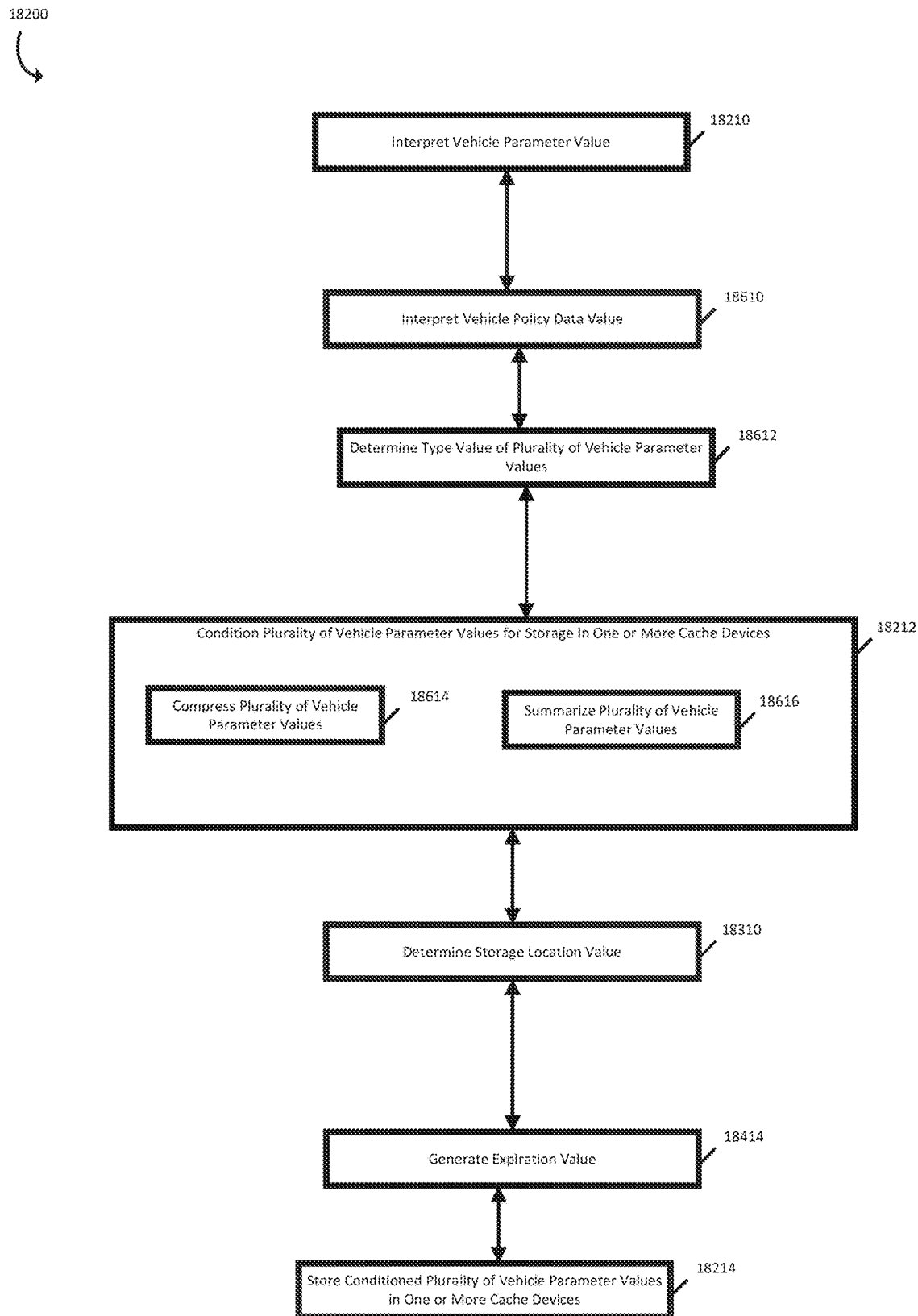
Figure 187:
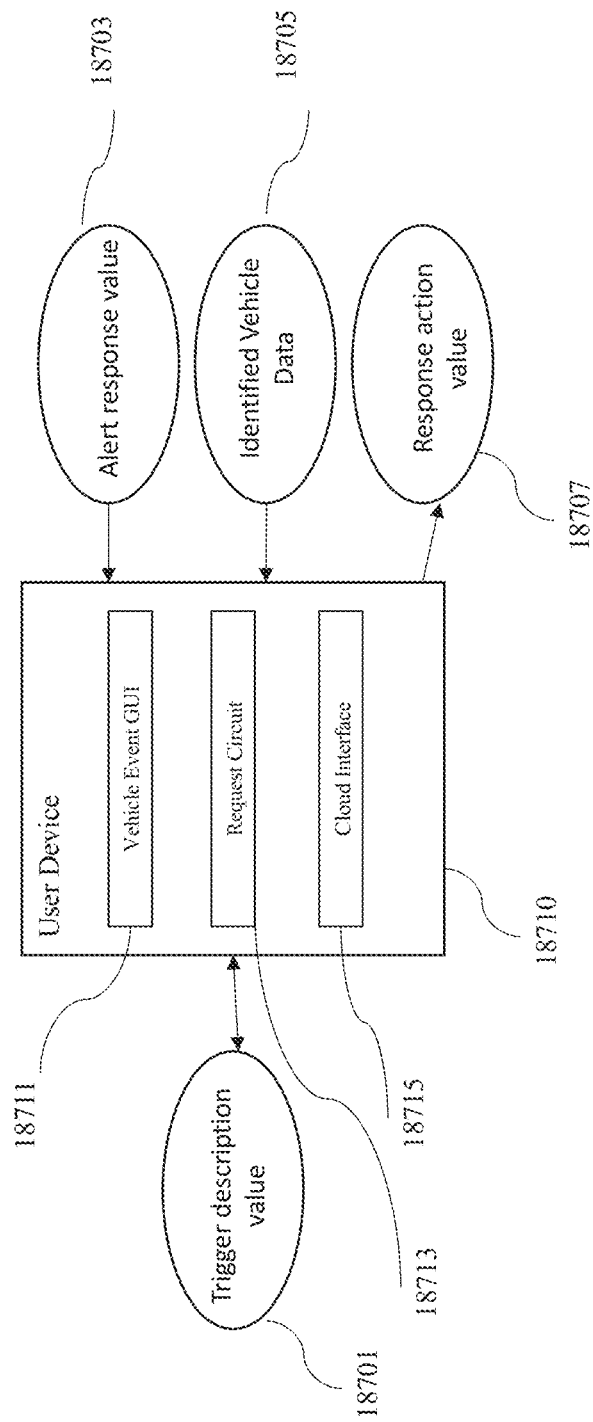
Figure 188:
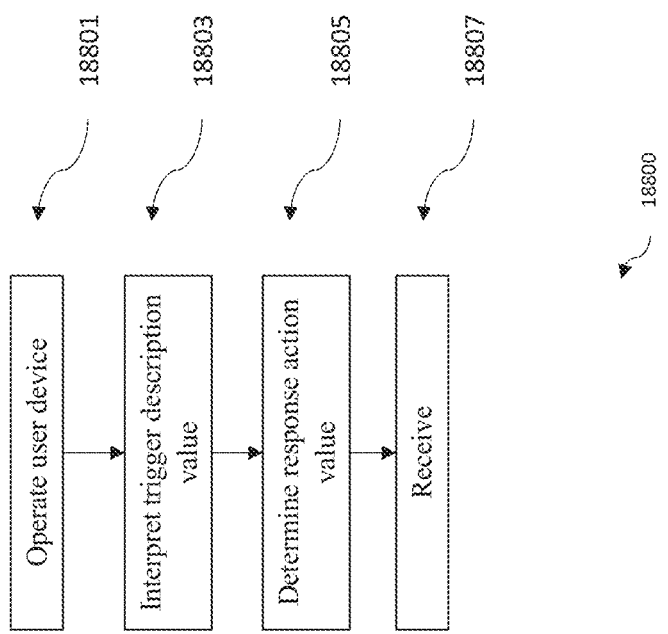
Figure 189:
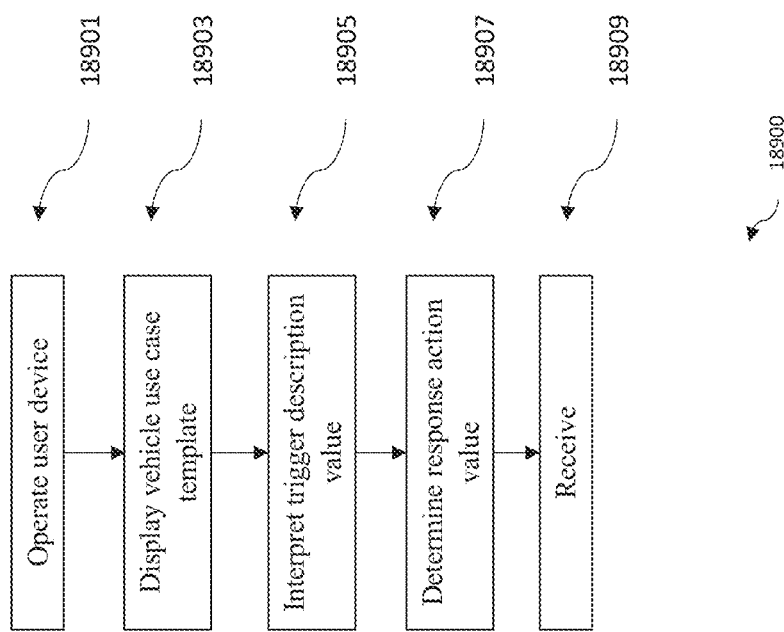
Figure 190:
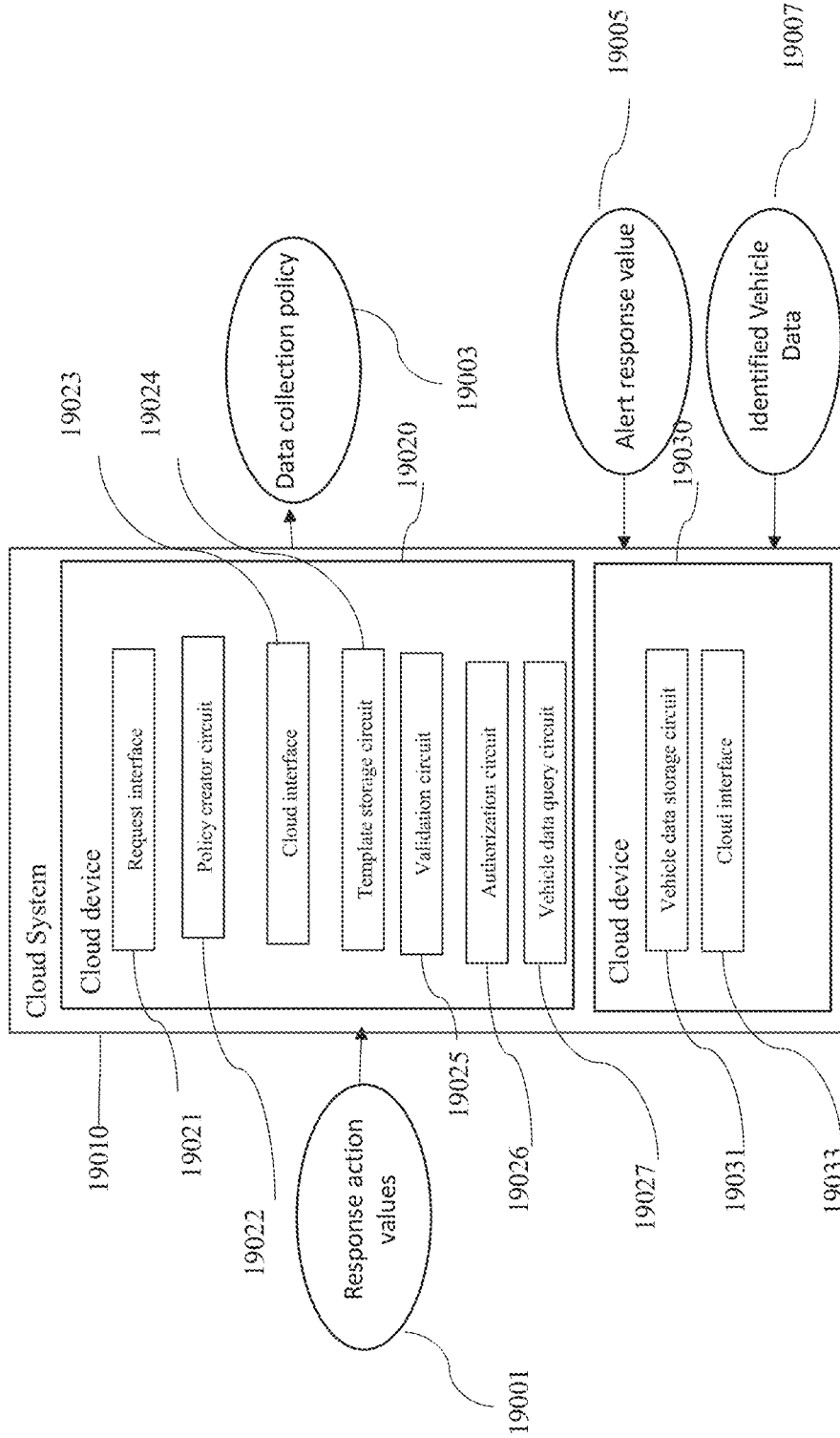
Figure 196:
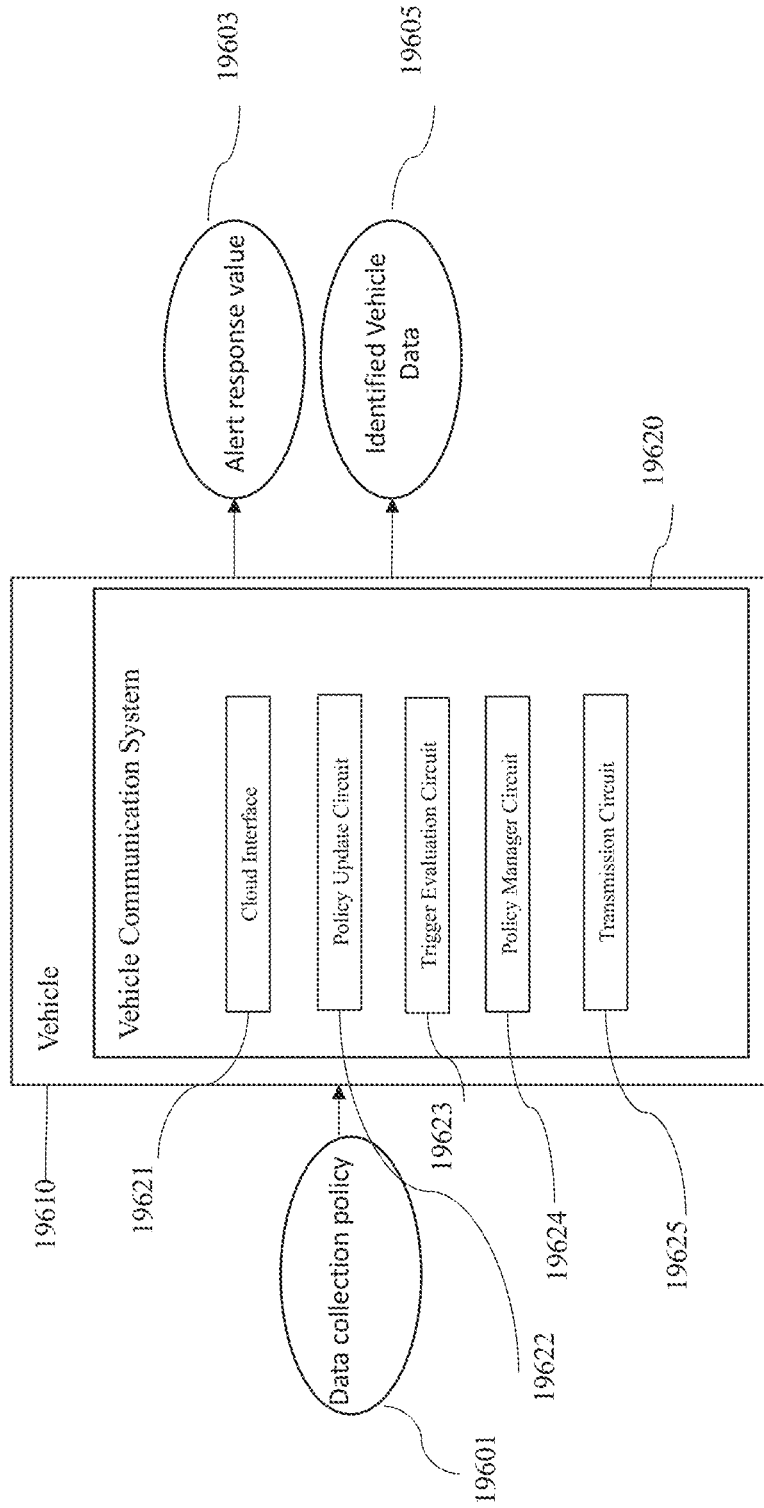
Figure 201:
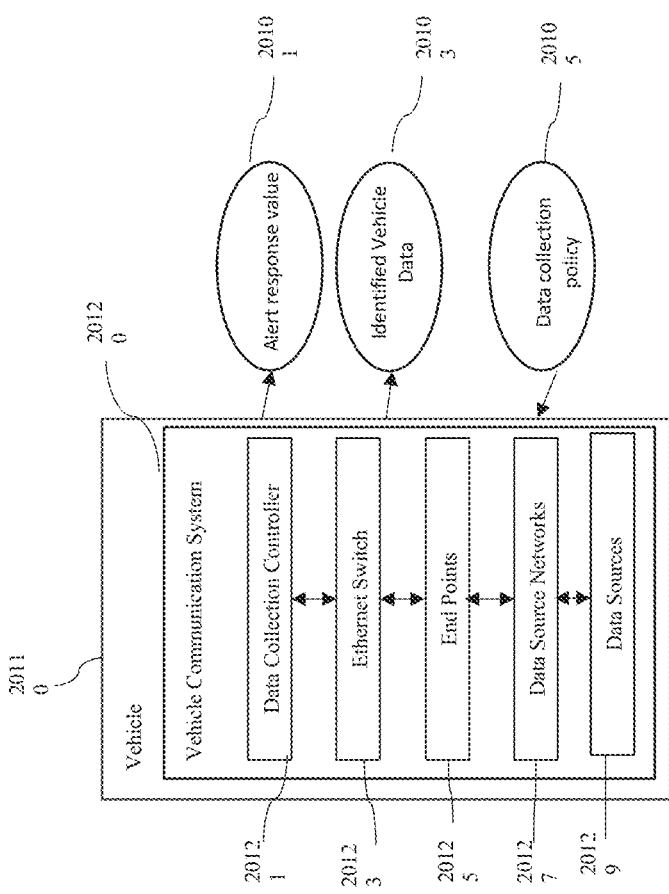
Figure 202:
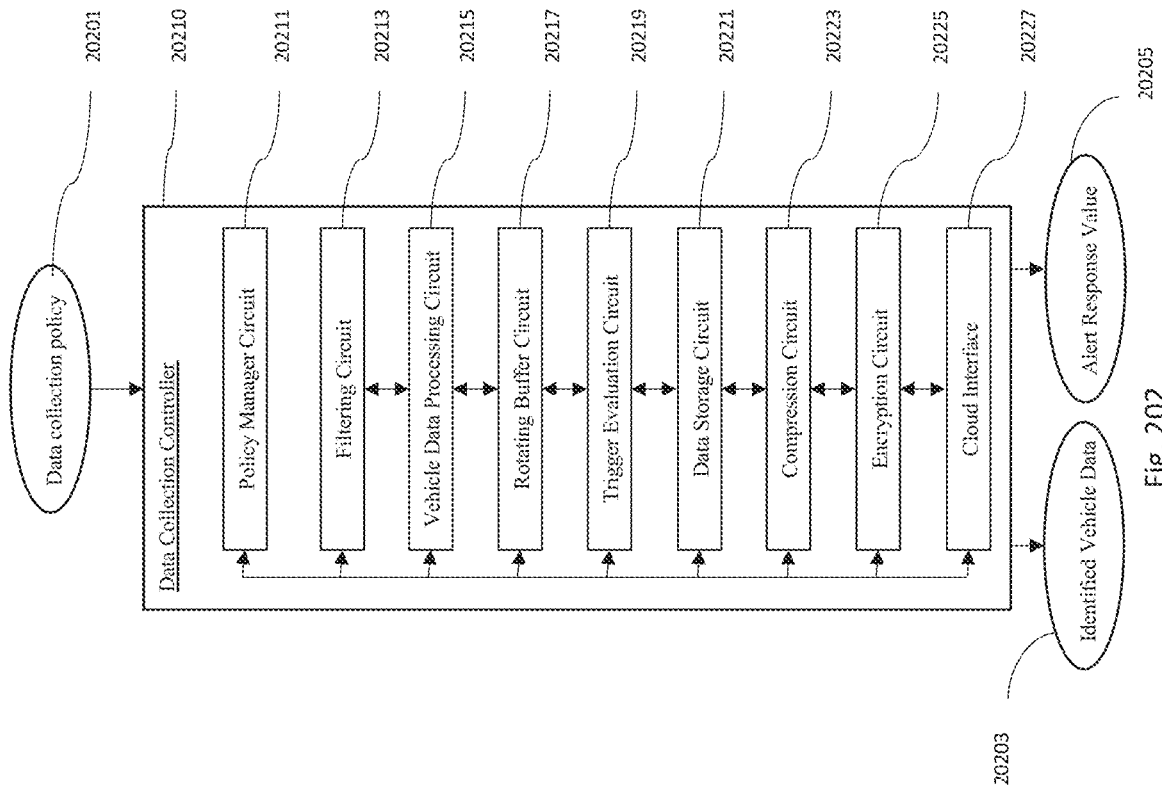
Figure 203:
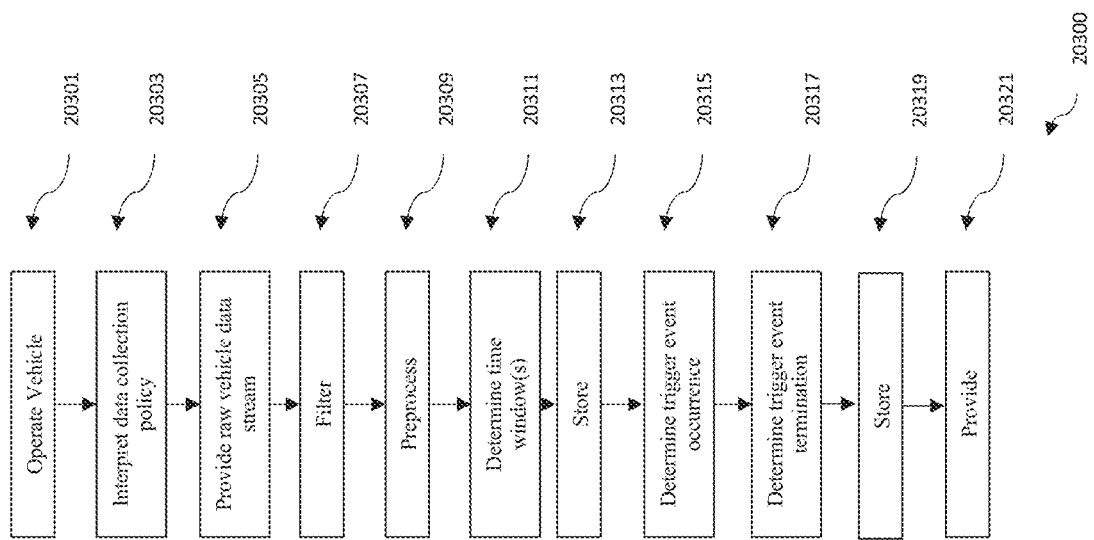
Figure 204:
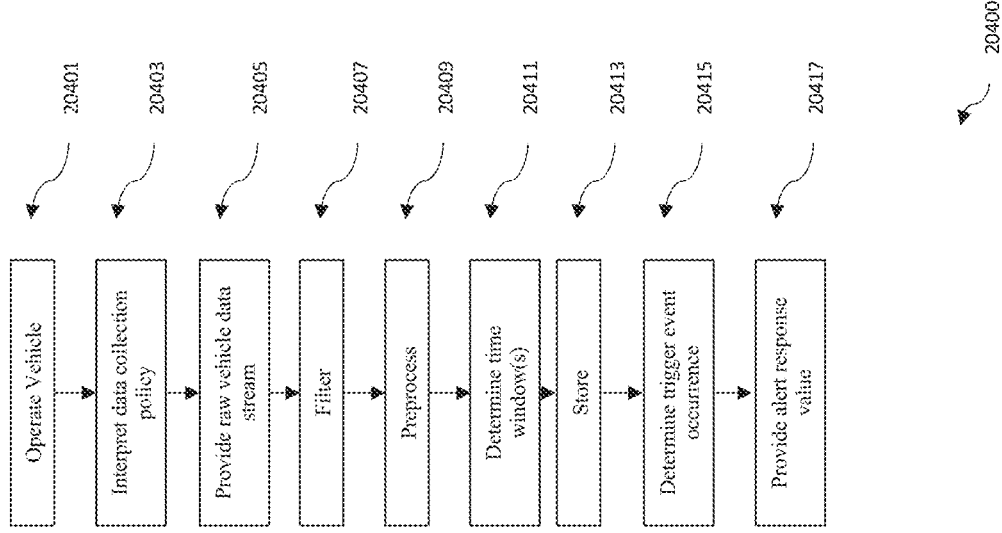
Figure 205:
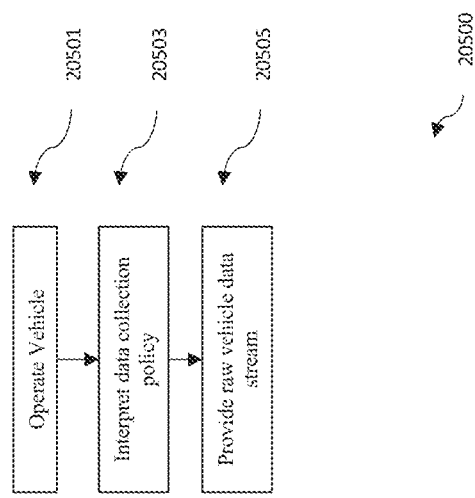
Figure 206:
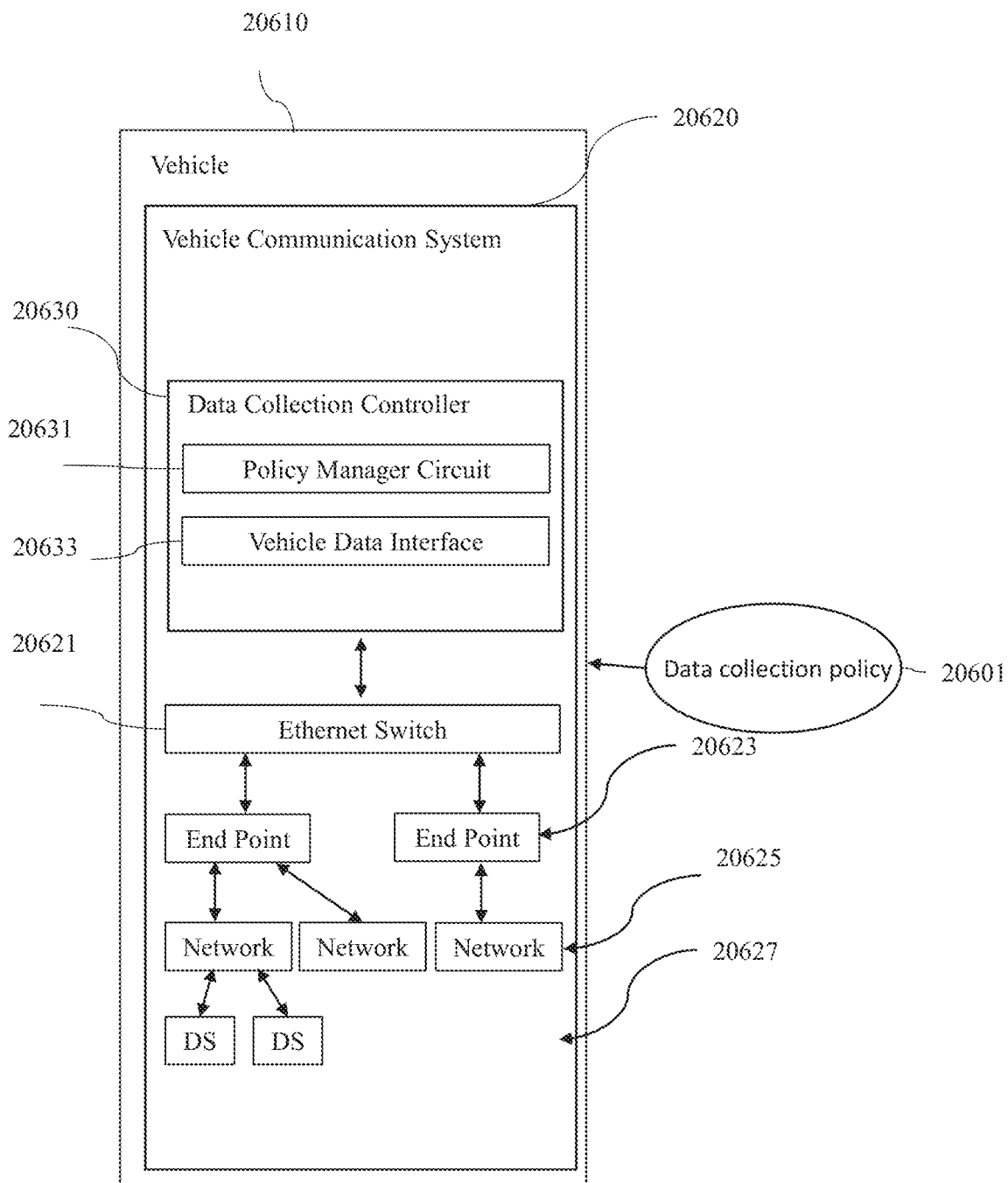
Figure 207:
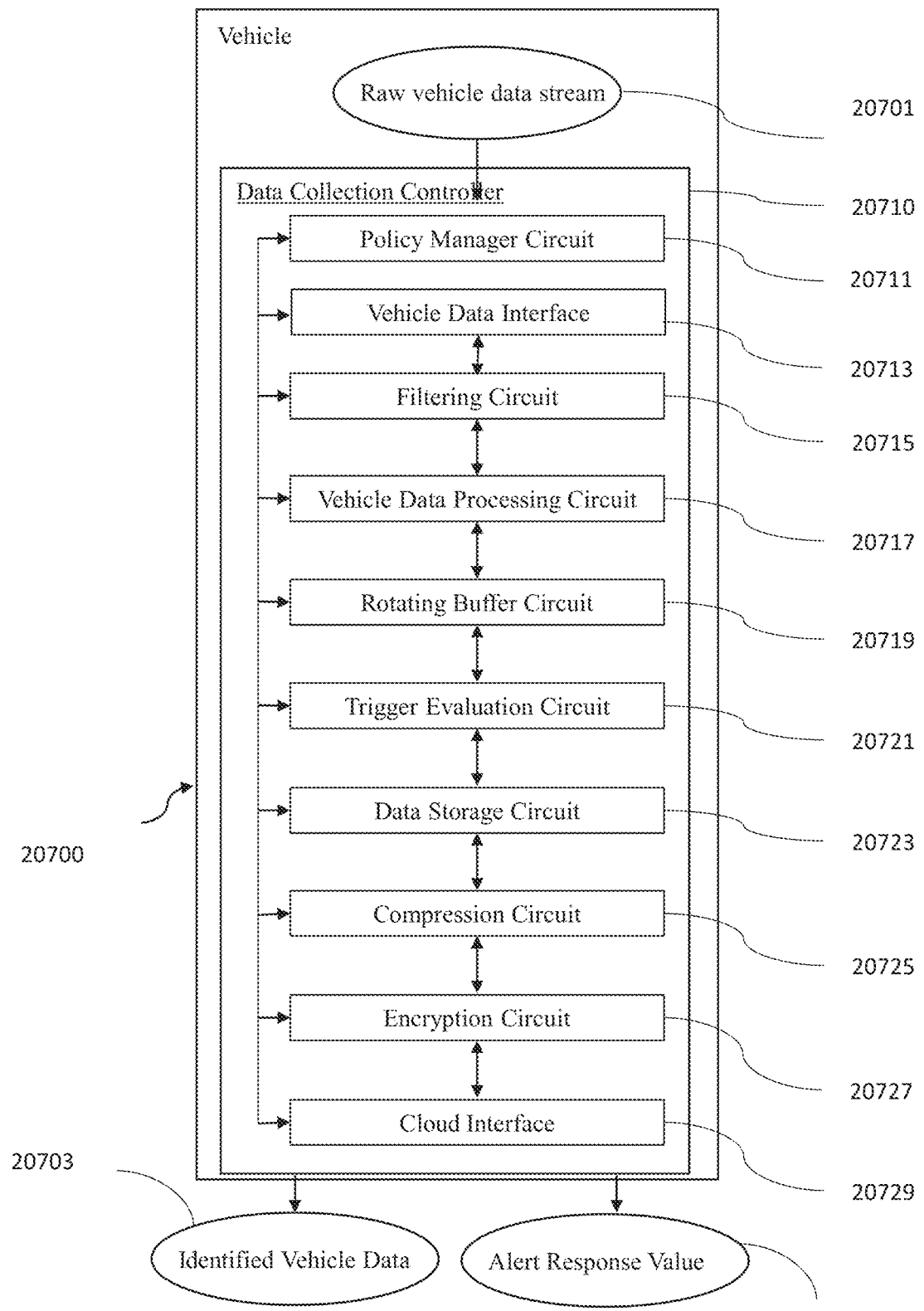
Figure 208:
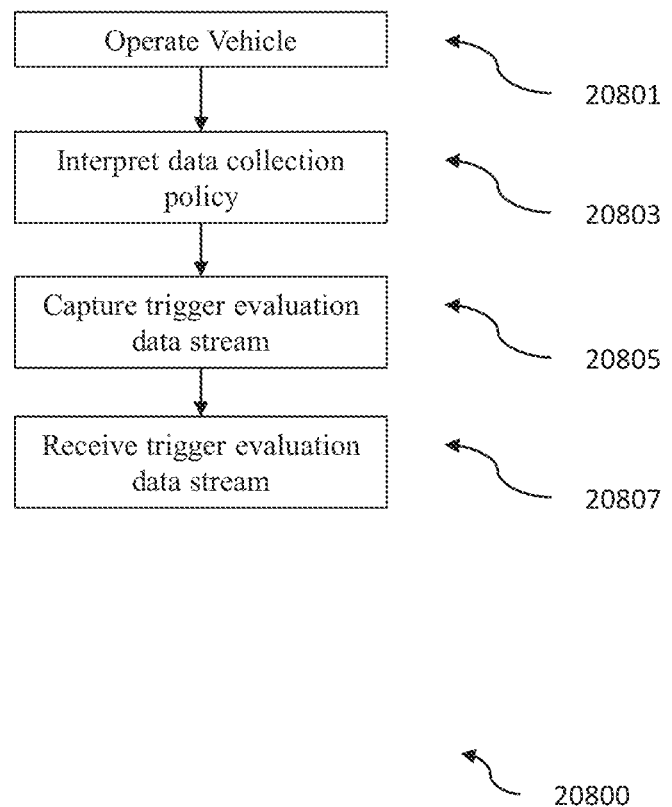
Figure 209:
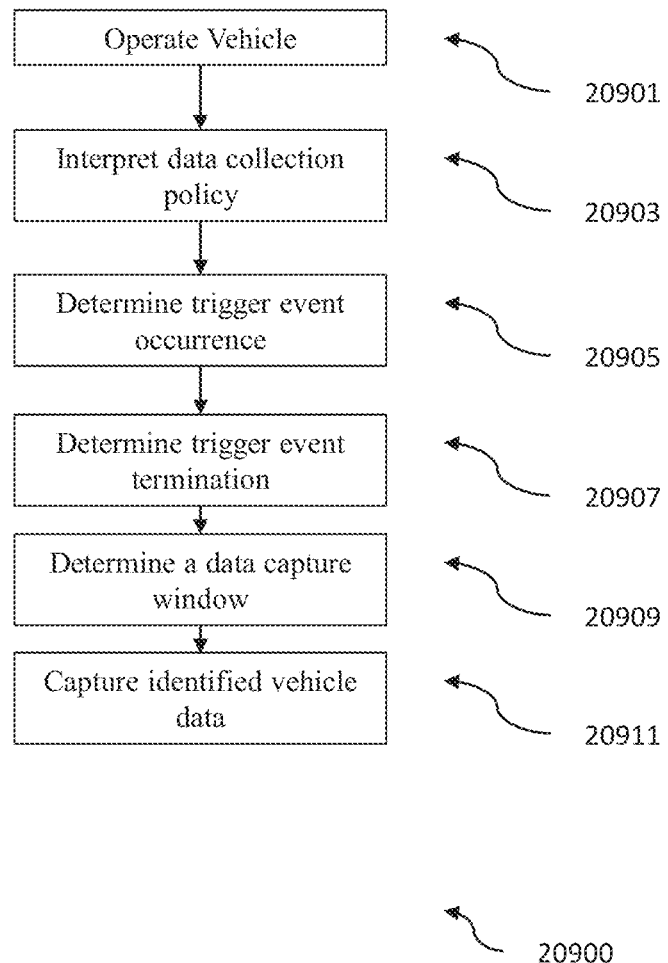
Figure 210:
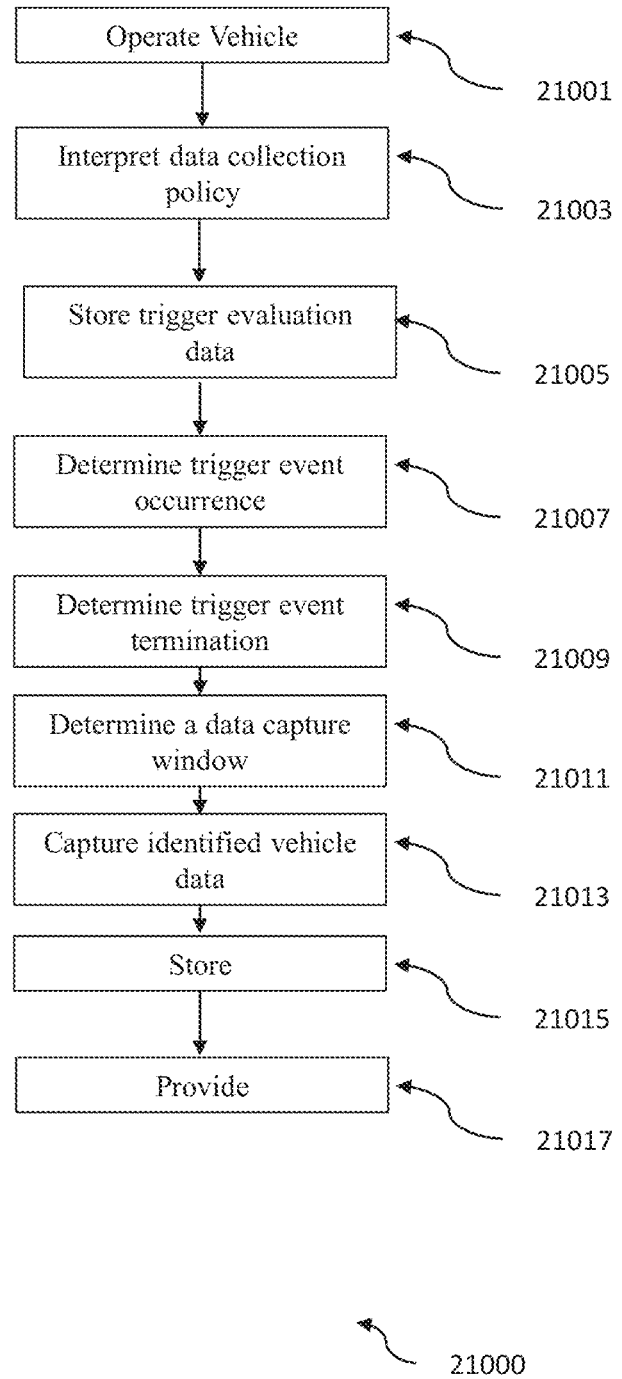

FIG. 132 depicts an example schematic to provide automated vehicle operations based on data values according to certain embodiments of the present disclosure;

FIG. 133 depicts an example schematic to provide automated vehicle operations based on data values according to certain embodiments of the present disclosure;

FIG. 134 depicts an example schematic for performing data collection operations according to certain embodiments of the present disclosure;

FIG. 135 depicts an example schematic for transmission operations of vehicle data with a cloud system and/or an external device according to certain embodiments of the present disclosure;

FIG. 136 depicts an example procedure to manage transmission operations of a vehicle according to certain embodiments of the present disclosure;

FIG. 137 depicts an example procedure for selectively transmitting collected data in response to a selected transmission interval according to certain embodiments of the present disclosure;

FIG. 138 depicts an example procedure for selectively transmitting collected data in response to a selected bandwidth utilization according to certain embodiments of the present disclosure;

FIG. 139 depicts an example procedure for selectively transmitting collected data in response to a data type of the collected data according to certain embodiments of the present disclosure;

FIG. 140 depicts an example procedure for selectively transmitting collected data in response to a vehicle operational impact of transmission operations according to certain embodiments of the present disclosure;

FIG. 141 depicts an example procedure for selectively transmitting collected data in response to a power utilization impact of transmission operations according to certain embodiments of the present disclosure;

FIG. 142 depicts an example procedure for selectively transmitting collected data in response to a data transmission capacity value according to certain embodiments of the present disclosure;

FIG. 143 depicts an example procedure for selectively transmitting collected data in response to a currently available transmission type according to certain embodiments of the present disclosure;

FIG. 144 depicts an example procedure for selectively transmitting collected data in response to a selected data transmission chunk size according to certain embodiments of the present disclosure;

FIG. 145 depicts an example procedure for selectively transmitting collected data in response to a success parameter for transmitting operations according to certain embodiments of the present disclosure;

FIG. 146 depicts an example procedure for selectively transmitting collected data in response to a quality of service value for transmitting operations according to certain embodiments of the present disclosure;

FIG. 147 depicts an example schematic for implementing remote assistance operations for a vehicle according to certain embodiments of the present disclosure;

FIG. 148 depicts an example schematic for a cloud system in communication with a vehicle according to certain embodiments of the present disclosure;

FIG. 149 depicts an example procedure for performing remote operations for a vehicle according to certain embodiments of the present disclosure;

FIG. 150 depicts an example procedure for performing operations for a vehicle including remote assistance operations according to certain embodiments of the present disclosure;

FIG. 151 is a schematic drawing of an apparatus for collecting and/or managing vehicle data according to certain embodiments of the present disclosure;

FIG. 152 is a schematic diagram of another apparatus for collecting and/or managing vehicle data according to certain embodiments of the present disclosure;

FIG. 153 is a schematic diagram of another apparatus for collecting and/or managing vehicle data according to certain embodiments of the present disclosure;

FIG. 154 is a schematic diagram of another apparatus for collecting and/or managing vehicle data according to certain embodiments of the present disclosure;

FIG. 155 is a flow chart depicting a method for collecting and/or managing vehicle data, according to certain embodiments of the present disclosure;

FIG. 156 is another flow chart depicting the method of FIG. 155 according to certain embodiments of the present disclosure;

FIG. 157 is another flow chart depicting the method of FIG. 155, according to certain embodiments of the present disclosure;

FIG. 158 is a flow chart depicting another method for collecting and/or managing vehicle data according to certain embodiments of the present disclosure;

FIG. 159 is another flow chart depicting the method of FIG. 158 according to certain embodiments of the present disclosure;

FIG. 160 is a schematic diagram of an apparatus for data collection policy intake and execution according to certain embodiments of the present disclosure;

FIG. 161 is a schematic diagram of another apparatus for data collection policy intake and execution according to certain embodiments of the present disclosure;

FIG. 162 is another schematic diagram of the apparatus of FIG. 161 according to certain embodiments of the present disclosure;

FIG. 163 is another schematic diagram of the apparatus of FIG. 161 according to certain embodiments of the present disclosure;

FIG. 164 is another schematic diagram of the apparatus of FIG. 161 according to certain embodiments of the present disclosure;

FIG. 165 is a flow chart depicting a method for data collection policy intake and execution according to certain embodiments of the present disclosure;

FIG. 166 is another flow chart depicting the method of FIG. 165 according to certain embodiments of the present disclosure;

FIG. 167 is another flow chart depicting the method of FIG. 165 according to certain embodiments of the present disclosure;

FIG. 168 is another flow chart depicting the method of FIG. 165 according to certain embodiments of the present disclosure;

FIG. 169 is another flow chart depicting the method of FIG. 165 according to certain embodiments of the present disclosure;

FIG. 170 is a schematic diagram of an apparatus for data collection in a mixed network environment according to certain embodiments of the present disclosure;

FIG. 171 is a schematic diagram of another apparatus for data collection in a mixed network environment according to certain embodiments of the present disclosure;

FIG. 172 is a flow chart depicting a method for data collection in a mixed network environment according to certain embodiments of the present disclosure;

FIG. 173 is another flow chart depicting the method of FIG. 172 according to certain embodiments of the present disclosure;

FIG. 174 is a schematic diagram of an apparatus for data collection process management according to certain embodiments of the present disclosure;

FIG. 175 is a schematic diagram of another apparatus for data collection process management according to certain embodiments of the present disclosure;

FIG. 176 is another schematic diagram of the apparatus of FIG. 175 according to certain embodiments of the present disclosure;

FIG. 177 is another schematic diagram of the apparatus of FIG. 175 according to certain embodiments of the present disclosure;

FIG. 178 is a flow chart depicting a method for data collection process management according to certain embodiments of the present disclosure;

FIG. 179 is another flow chart depicting the method of FIG. 178 according to certain embodiments of the present disclosure;

FIG. 180 is a schematic diagram of an apparatus for data storage management according to certain embodiments of the present disclosure;

FIG. 181 is another schematic diagram of the apparatus of FIG. 180 according to certain embodiments of the present disclosure;

FIG. 182 is a flow chart depicting a method for data storage management according to certain embodiments of the present disclosure;

FIG. 183 is another flow chart depicting the method of FIG. 182 according to certain embodiments of the present disclosure;

FIG. 184 is another flow chart depicting the method of FIG. 182 according to certain embodiments of the present disclosure;

FIG. 185 is another flow chart depicting the method of FIG. 182 according to certain embodiments of the present disclosure;

FIG. 186 is another flow chart depicting the method of FIG. 182 according to certain embodiments of the present disclosure;

FIG. 187 is a box diagram illustrating an exemplary user device according to certain embodiments of the present disclosure;

FIGS. 188-189 are flowcharts illustrating exemplary user device-based data collection processes according to certain embodiments of the present disclosure;

FIG. 190 is a box diagram illustrating an exemplary cloud system according to certain embodiments of the present disclosure;

FIGS. 191-195 are flowcharts illustrating exemplary cloud system-based data collection processes according to certain embodiments of the present disclosure;

FIG. 196 is a box diagram illustrating an exemplary vehicle according to certain embodiments of the present disclosure;

FIGS. 197-200 are flowcharts illustrating exemplary vehicle-based data collection according to certain embodiments of the present disclosure;

FIG. 201 is a box diagram of an exemplary vehicle according to certain embodiments of the present disclosure;

FIG. 202 is a box diagram of an exemplary data collection controller according to certain embodiments of the present disclosure;

FIGS. 203-205 are flowcharts illustrating exemplary data collection processes according to certain embodiments of the present disclosure;

FIG. 206 is a box diagram of an exemplary vehicle according to certain embodiments of the present disclosure;

FIG. 207 is a box diagram of an exemplary data collection controller according to certain embodiments of the present disclosure; and FIGS. 208-210 are flowcharts illustrating exemplary data collection processes according to certain embodiments of the present disclosure.

DETAILED DESCRIPTION

Without limitation to any other aspect of the present disclosure, aspects of the disclosure herein reduce and/or eliminate any one or more of: a cost per entity added to a data collection system, a basic learning cost for a new entity to implement an application utilizing collected data, an adaptation cost to changing vehicle network configuration(s), a cost incurred to meet the increasing demand for data collection, a cost to adapt to a changing regulatory environment, and/or a cost to secure data and/or losses incurred for breaches or unauthorized use. Certain embodiments and/or aspects of the disclosure herein may address one or more of the described cost parameters. Certain embodiments and/or aspects of the disclosure herein may increase one or more given cost parameters, but nevertheless be beneficial by decreasing the overall cost function for a target vehicle, vehicle type, entity, industry, etc. Certain embodiments and/or aspects of the disclosure herein may increase one or more given cost parameters, but provide other benefits such as improved functionality. In certain embodiments, improved functionality may be achieved at an increased cost, but at a lower cost than previously known systems configured to achieve a similar improved functionality.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

The present disclosure describes systems, methods, and apparatuses to perform data collection operations related to a vehicle. Certain embodiments set forth herein reference a mixed vehicle network on a vehicle. Example mixed vehicle networks include a network having one or more CAN buses with a number of devices communicating over the CAN bus(es), and one or more ethernet networks with a number of devices communicating over the ethernet network, and communication that crosses from CAN to ethernet and/or vice-versa. Mixed networks are not limited to CAN and ethernet, and may include, without limitation, any one or more of a local interconnect network (LIN), FlexRay, Media Oriented Systems Transport (MOST), and/or low-voltage differential signaling (LVDS). Currently available ethernet networks are highly capable, having bandwidth ratings between 100 Mbps to 25 Gbps, and latency values between 5 ms to 20 µs (0.02 ms). In certain embodiments, more than one ethernet network (or zone) may be present, and may include mixed capability ethernet networks. Additionally or alternatively, in certain embodiments, one or more networks present may include wireless networks such as a WiFi network (e.g., an 802.11x standard such as a/b/g; n; and/or ac), a mobile standard network (e.g., 4G and/or 5G), Bluetooth communications, universal serial bus (USB) connections, and/or fiber optic connections. The recited networks are non-limiting examples, and any type of network and/or communication protocol is contemplated herein for a mixed vehicle network.

In certain embodiments, the mixed vehicle network includes one or more low-capability networks combined with one or more high-capability networks. The capability that is considered low-capability depends upon the application, the number of devices that are in communication, the types of communication that are allowed on the network, and the available network management (e.g., registration, addition, or removal of devices, encryption of messages, customization of messages, etc.) for the particular network and communication protocols being utilized. In certain embodiments, the mixed vehicle network includes more than one network, where at least two of the networks present an integration challenge. For example, one of the networks may only allow certain types of communications, require certain types of synchronous or asynchronous communications, only allow connection of certain types of devices, limit the implementation of certain network topologies, or have other differences or limitations that render utilization of a single network (or network type) throughout the vehicle undesirable or impractical.

The description herein utilizing off-vehicle, extra-vehicle, and/or cloud-based interactions references any external network communications of the vehicle, including without limitation wireless-based communications (e.g., mobile data, WiFi, and/or Bluetooth) to external devices. Communications to external devices may be to a general network (e.g., over the internet), a WAN, a LAN, a mobile device in proximity to the vehicle, and/or combinations of these. Certain systems and procedures described herein particularly contemplate run-time operations of the vehicle, for example external communications occurring during operating conditions wherein the vehicle is executing a mission (e.g., moving, performing operations while not moving, etc.). The disclosure herein further contemplates communications that may occur during any period, including during down-time of the vehicle and/or during service events. The disclosure herein further contemplates communications that may occur through wired communication channels, such as when the vehicle network is in communication with a service tool, on-board diagnostics (OBD) instrument, or other physically coupled device.

The description herein references vehicle applications as a non-limiting example and for clarity of the present description. However, embodiments herein are applicable to other applications having similar challenges and/or implementations. Without limitation to any other application, embodiments herein are applicable to any application having multiple end points, including multiple data sources, controllers, sensors, and/or actuators, and which may further include end points present in distinct or distributed network environments, and/or applications having historical or legacy networking or communication systems that may be transitioning (within a given system, as a class of systems, and/or as an industry) to newer and/or more capable networking or communication systems. Example and non-limiting embodiments include one or more of industrial equipment; robotic systems (including at least mobile robots, autonomous vehicle systems, and/or industrial robots); mobile applications (that may be considered "vehicles", or not) and/or manufacturing systems. It will be understood that certain features, aspects, and/or benefits of the present disclosure are applicable to any one or more of these applications, not applicable to others of these applications, and the applicability of certain features, aspects, and/or benefits of the present disclosure may vary depending upon the operating conditions, constraints, cost parameters (e.g., operating cost, integration cost, operating cost, data communication and/or storage costs, service costs and/or downtime costs, etc.) of the particular application. Accordingly, wherever the present disclosure references a vehicle, a vehicle system, a mobile application, industrial equipment, robotic system, and/or manufacturing systems, each one of these are also contemplated herein, and may be applicable in certain embodiments, or not applicable in certain other embodiments, as will be understood to one of skill in the art having the benefit of the present disclosure.

A flow, as utilized herein, should be understood broadly. An example flow includes a related group of data (e.g., speed data, temperature data, audio-visual data, navigation data, etc.), a related group of functions (e.g., among vehicle functions, extra-vehicle functions such as service operations and/or data collection, aggregations between related vehicles, and/or combinations of these that are related for a particular system), a related group of devices (e.g., door actuators), and/or a related group of applications. Flows, as used herein, provide an organizing concept that may be utilized to relate certain data, certain end points, certain applications, and/or related functions of the vehicle or apart from the vehicle. In certain embodiments, a controller can utilize a flow to identify a data source, a data destination, permissions available for the flow, priority information related to the flow, or the like, to implement certain data regulating operations here. In certain embodiments, the utilization of the flow allows the controller to perform separate operations that may involve the same end points to support the desired network management. For example, a vehicle speed management application may have a high priority, and a speedometer end point may be associated with the vehicle speed management application. In the example, if the vehicle speed is being communicated to support the vehicle speed management application, then the controller applies a high priority to the vehicle speed message. However, if the vehicle speed is being communicated to support a trip planning flow (e.g., where a trip planning flow is present and does not have a high priority), the controller may apply a lower priority to the vehicle speed message. In a further example, a failure of a vehicle controller, portion of a network, or other off-nominal condition may result in the migration of the vehicle speed management application to another controller in the system, whereby the vehicle speed message is being communicated (e.g., where the backup controller is on another network) to support the vehicle speed management application, and the controller may apply a higher priority to the vehicle speed message. The utilization of flows and applications to organize the components of the system allows for the same or similar information to be regulated by the controller in a differential manner to support various functions, allowing for improvements in the performance and security of network regulation operations (e.g., reducing unnecessary cross-network traffic, and providing information only as needed), and supports additional functionality relative to previously known systems, such as redundancy support, distributed control, and granular cross-network messaging.

A policy, as utilized herein, includes a description of data to be collected, such as data parameters, collection rates, resolution information, priority values (e.g., ordering data collection values for selection in response to off-nominal conditions where not all data collection parameters can be serviced, etc.). In certain embodiments, a policy further includes event information, which may be stipulated as parameter or quantitative based events (e.g., a given data value exceeds a threshold, etc.), and/or categorical events (e.g., a particular fault code, operational condition or state, or vehicle location/jurisdiction occurs). In certain embodiments, a policy further includes an event response, such as data values to be captured in response to the occurrence of the event, and/or other changes in the data collection scheme such as increased or reduced data collection rates, changes in collected resolution, or the like. In certain embodiments, an event response further includes a time frame associated with the event occurrence, for example a time period after the event occurrence to utilize the adjusted data collection scheme, and/or a time period preceding the event occurrence (e.g., utilizing a rolling buffer or other data collection operation, providing temporary information that can subsequently be captured if the event occurs). In certain embodiments, changes to the data collection scheme for an event can include multiple changes—for example changes over a period of time, further changes based upon the progression of the event (e.g., if the event severity gets worse), and/or criteria to determine that an event is cleared. In certain embodiments, changes to a data collection scheme may be implemented based on event related clearance of the same or another event, for example implementing a data collection change until a next shutdown event of the vehicle, until a service technician clears the event, for a selected number of shutdown events occurs, or the like.

The utilization of a policy herein may reference a partial policy, for example the implied policy that would be implemented in response to a single data collection scheme from a single user, wherein the full policy is prepared, verified, and communicated to the vehicle after one or more partial policies are aggregated. The utilization of a policy herein may reference an unverified policy, for example after a policy responsive to a number of users is aggregated, but verification operations of the policy are not yet completed (e.g., before it is determined if the data collection implied by the policy can be performed). The utilization of a policy herein may reference a previously applied policy (e.g., a policy present on a vehicle before an updated version of the policy is communicated to the vehicle and/or implemented on the vehicle). The utilization of a policy herein may reference an updated policy, for example a verified policy that is pending for communication to the vehicle 102 and/or confirmed by the vehicle 102 (e.g., from the data collection controller 202).

Figure 1:
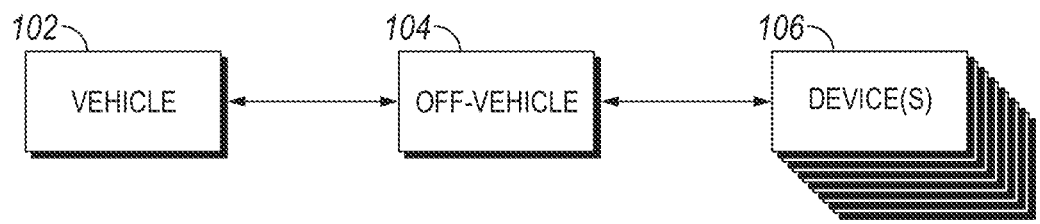
FIG. 1 is a schematic diagram of an example data collection system according to certain embodiments of the present disclosure.

Referencing FIG. 1, an example system is disclosed having a vehicle 102 communicatively coupled to an off-vehicle device 104. The example system includes the off-vehicle 104 device(s) communicatively coupled to one or more user devices 106. For example, the vehicle 102 may include a mixed network having a number of data providing devices coupled to network(s) on the vehicle, for example with one or more devices coupled to a CAN network, and one or more other devices coupled to an ethernet network. The example system allows for users (e.g., application providers, fleet owners, manufacturers, customers, etc.) to access the off-vehicle 104 device, configuring data collection to be implemented from the vehicle 102 to the off-vehicle device 104. In a further example, the system allows for access to at least a portion of the collected data for utilization in an application relating to the vehicle. In certain embodiments, the system provides for authorization control for users and/or applications to ensure that data collection requests are properly made. In certain embodiments, the system provides for data collection control to ensure that requested data communications are achievable, and/or consume reduced data communication resources. In certain embodiments, the system provides for consent implementation to ensure appropriate consent (e.g., from an operator or owner of the vehicle) is provided before relevant data collection is performed. In certain embodiments, the system provides for isolation of specific vehicle information (e.g., data parameter names, communication protocol information, locations and/or ID values of data providers in a mixed network environment of the vehicle) from data requestors and/or users, thereby alleviating the data requestor and/or user from having to learn the specific vehicle information and/or keeping that information updated. In certain embodiments, the system provides for isolation of stored data collected from the vehicle from a system providing requested data to applications utilizing portions of the data. In certain embodiments, the system provides for integrated policy management controlling data collection parameters from a number of simultaneous data requestors, and/or providing enhanced policy management controls to certain users such as policy creators and/or policy controllers. In certain embodiments, the system provides for enhanced policy creation and/or updating, whereby the system communicates with a user in a manner structured to provide the user with high level functionality descriptions, without requiring knowledge from the user about the specific vehicle and/or specific data utilized to support the corresponding high level functionality. In certain embodiments, the system provides for enhanced data communication to and from the vehicle that is responsive to intermittent network access, and/or intermittent network bandwidth availability, to communicate requested data from the vehicle to an off-vehicle device.

Figure 2:
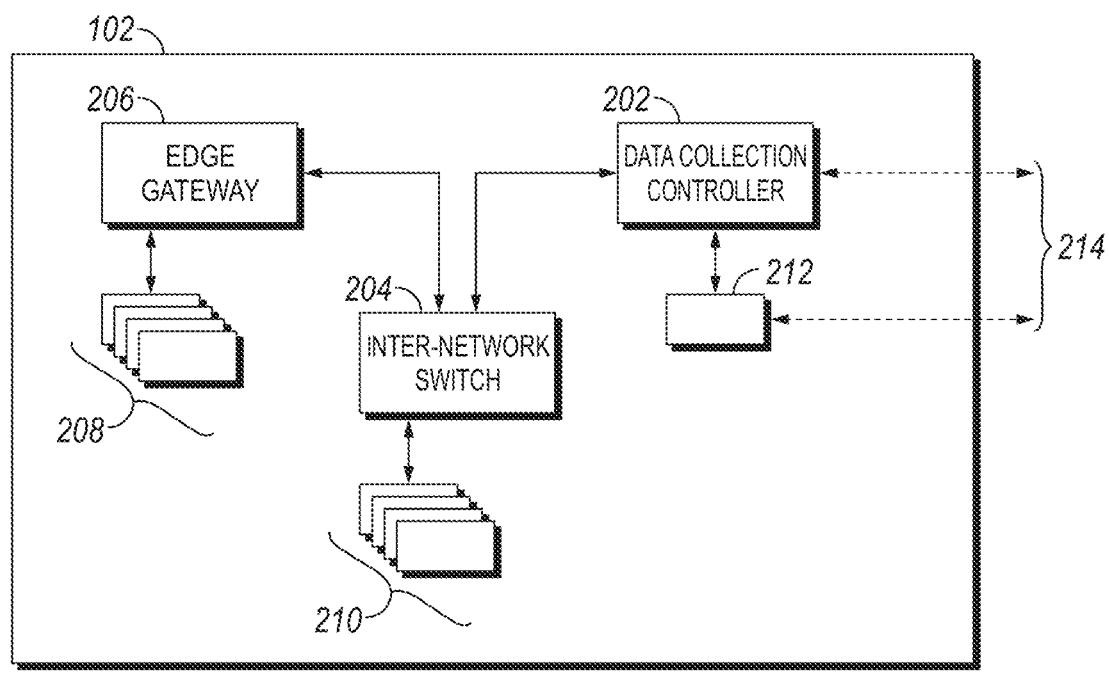
FIG. 2 is a schematic diagram of an example vehicle having aspects of a data collection system according to certain embodiments of the present disclosure.

Referencing FIG. 2, an example vehicle 102 is depicted schematically having certain aspects of a data collection system set forth herein. The example vehicle includes a data collection controller 202 that is configured to accept a policy from an off-vehicle device 104, and to propagate functionality in response to the policy to on-vehicle devices to perform appropriate data collection. The example data collection controller 202 further communicates the collected data to the off-vehicle device 104, and/or manages communication in response to intermittent network availability and/or intermittent network bandwidth availability. Certain further and/or more detailed operations of the data collection controller 202 are described in the portion of the disclosure referencing FIGS. 5 and 10.

The example vehicle 102 further includes an inter-network switch 204 that is communicatively coupled to at least two networks on the vehicle 102. The example inter-network switch 204 is directly coupled to a number of devices 210 on a first network, and coupled to a second number of devices 208 on a second network, for example via communications with an edge gateway 206. Certain further and/or more detailed operations of the inter-network switch 204 are described in the portion of the disclosure referencing FIGS. 5 and 7. Certain further and/or more detailed operations of the devices 210 are described in the portion of the disclosure referencing FIGS. 5 and 8. Certain further and/or more detailed operations of the edge gateway 206 are described in the portion of the disclosure referencing FIGS. 5 and 6.

The example vehicle 102 further includes a user consent controller 212 that is communicatively coupled to the data collection controller 202 and/or to the off-vehicle device 104. In certain embodiments, the user consent controller 212 may be an on-vehicle device such as a vehicle display (e.g., a PAD or console device), and/or the user consent controller 212 may be a mobile application (e.g., a mobile device of the user having a consent application operable thereon), a web-based application (e.g., a web application accessible to the user and relating to the vehicle 102), and/or may include more than one of these. Certain further and/or more detailed operations of the user consent controller 212 are described in the portion of the disclosure referencing FIGS. 5 and 9. In the example of FIG. 2, external communications 214 are depicted, which may include communications to the off-vehicle device 104. The external communications 214 may be passed wirelessly (e.g., from an available transceiver on the vehicle and in communication with the data collection controller 202 and/or the user consent controller 212), and/or may be passed through a wired communication (e.g., a service tool, OBD device, or the like coupled to a network on the vehicle, for example as a device 210 in communication with the inter-network switch 204).

Figure 3:
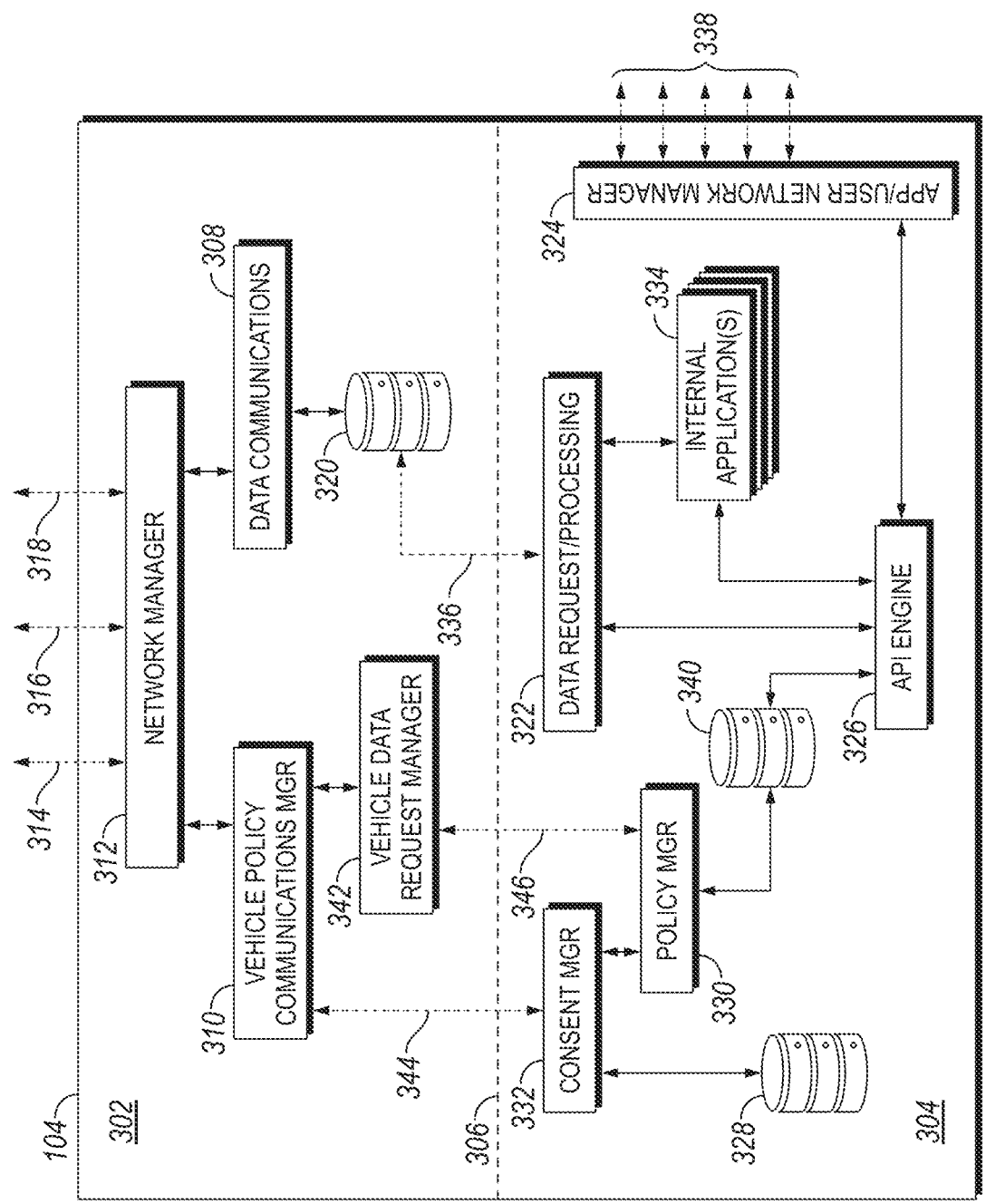
FIG. 3 is a schematic diagram of an example off-vehicle device according to certain embodiments of the present disclosure.

Referencing FIG. 3, an example off-vehicle device 104 is depicted. The example off-vehicle device 104 is depicted schematically as an integrated device having managers and other components depicted thereon to illustrate the interaction of functional elements of the off-vehicle device 104. The off-vehicle device 104 may be a distributed device, having aspects present on a number of controllers, transceivers, servers, or the like. In certain embodiments, the off-vehicle device 104 may be implemented at least partially as a cloud-based device, for example utilizing or communicating with a web-based and/or cloud-based service, such as Amazon Web Services (AWS), Microsoft Azure web services, Cloudflare network services, or the like. In certain embodiments, aspects of the off-vehicle device 104 may be segregated and/or distributed across more than one service, dedicated server, and/or computing device. In the example of FIG. 3, a first partition 302 performs certain operations of the off-vehicle device 104, and interfaces with a second partition 304 that performs certain other operations of the off-vehicle device 104. The example of FIG. 3 depicts a partition 306, where communications across the partition 306 may be configured to an interface specification or other agreed upon or implemented communication scheme.

The example partition 302 includes a network manager 312 that performs load management functions and manages communication with the vehicle 102. The example of FIG. 3 depicts policy communications 316, consent communications 314, and data communications 318 that are at least intermittently communicated with the vehicle 102. The example network manager 312 interfaces with a data communications 308 component, for example passing vehicle data received to the data communications 308 component. The example network manager 312 interfaces with a vehicle policy communications manager 310, for example receiving data collection policies, policy updates, and/or providing consent communications between the vehicle policy communications manager 310 and the vehicle 102. In certain embodiments, the vehicle policy communications manager 310 receives processed policies from a policy manager 330 (and/or from a vehicle data request manager 342) on the second partition 304, makes the policy available to the vehicle 102, and/or determines the timing of when to communicate the policy to the vehicle.

The example vehicle data request manager 342 determines data to be collected in response to a policy provided by the policy manager 330. In certain embodiments, a policy includes a number of data requests from users (e.g., devices 106 and/or internal applications 334), and the vehicle data request manager 342 aggregates the requested data into a set of specific parameters for data collection that meet the data collection needs of all data requests in the policy. In certain embodiments, the policy manager 330 and/or the vehicle data request manager 342 perform policy verification, ensuring that a given policy can be supported (e.g., the requesting user is authorized, the parameter is available on the vehicle, and/or the aggregated data collection to meet the policy can be achieved within the bandwidth limits available) before the vehicle data request manager 342 provides the data requests to the vehicle policy communications manager 310. In certain embodiments, the aggregated data collection set is stored in a data structure, such as an XML structure, a JSON data structure, an HTML data structure, or other selected data structure. In certain embodiments, the aggregated data collection set, including the relevant data structure, comprises the policy to be sent to the vehicle 102. In certain embodiments, the data structure to be sent to the vehicle 102 includes other information, such as event descriptions, priority information, and/or response information to off-nominal conditions such as intermittent network availability, as a part of the policy.

Embodiments of the present disclosure provide for systems, apparatuses, and methods for providing a service oriented architecture (SOA) and management of SOA features and functions. SOA embodiments herein are capable to support multiple types of services, such as data services and/or functional services. SOA embodiments herein are capable to support multiple types of service participants, including without limitation manufacturers, OEMs, customers, operators, owners, service personnel, fleet managers (e.g., service, dispatch, compliance, etc.), SOA service requestors, SOA service providers, and/or third-party applications. Embodiments herein are capable to support SOA operations over multiple networks, including one or more vehicle networks, vehicle networks having mixed network types, external networks, and/or cloud based networks. Embodiments herein are capable to support multiple network protocols, including for devices or participants as SOA service providers and/or SOA service requestors, including at least SOME/IP, MQTT, HTTP, CAN, LIN, FlexRay, MOST, TTP, and/or LVDS network protocols. Embodiments herein are capable to support reliable, secure, and convenient SOA service implementations, including service discovery, recovery, maintenance, and/or updates to available services provided and/or requested.

An example policy, as utilized herein, includes a policy provided by an external device that requests a vehicle to collect a set of data over a defined period of time, or short period of time, and to send the data back to the external device. The data may be sent back to the external device within a defined time period stated in the policy, and/or according to a default time period for such policy operations, and may include sending the data back to the external device as soon as the collection of the data is complete. The example policy may be deleted, removed, or otherwise considered complete after the data collection event, and/or after a successive number of data collection events. Such a policy may be referenced as an ad hoc policy, a one-time policy (which may include one or more finite data collection events), an impromptu policy, a single-use policy, an emergency policy, or the like. Example uses of such a policy include rapid response data collection (e.g., handling for an emergency event; information collection to prepare for an update, campaign, or other planned change to a number of vehicles; collection of a data set for training a model or an artificial intelligence component; and/or data collection under any circumstance where the use of the data is expected to be performed within a finite period of time, and ongoing data collection for the policy is not desired).

An example policy, as utilized herein, includes a policy provided by an external device that requests the vehicle to collect a set of data over an extended period of time, and/or on an ongoing basis, where the collected data is sent back to the external device periodically and/or intermittently at intervals that allow for improved utilization of bandwidth by selecting transmission times and/or allowing for compression operations on the data to reduce communicated data volumes. The example policy may be kept for a defined period, kept until removed by the external device, and/or kept until an event occurs (e.g., a research data collection operation, where the event is configured to establish that the vehicle is no longer relevant to the research). The defined period and/or event parameters to delete the policy may be defined within the policy. Example uses of such a policy include research projects, continuous improvement projects (e.g., development of diagnostic or prognostic algorithms for a vehicle or a related group of vehicles, continuous improvement of operational algorithms, etc.), ongoing analysis projects (e.g., analyzing a large data set to detect trends, changes within a related group of vehicles, and/or verify that a change to the related group of vehicles is having an expected effect), and/or projects where a time constant of the project output is long relative to data rates typically received from low utilization data transmission operations. Such a policy may be referenced as a research policy, an analysis policy, a non-urgent data policy, or the like.

An example policy, as utilized herein, includes a policy provided by an external device that requests a vehicle to collect a set of data over an extended period of time, and send the data back to the external device the vehicle as the data is collected, in defined data blocks as each data block is collected, and/or in a streaming fashion. The example policy may be kept for a defined period, kept until removed by the external device, and/or kept until an event occurs (e.g., a change in an algorithm or process utilizing the data, where the data utilized by the algorithm or process changes, where the algorithm or process is discontinued, where the algorithm or process is replaced by an updated algorithm or process, or the like). The defined period and/or event parameters to delete the policy may be defined within the policy. Example uses of such a policy include real-time monitoring of vehicle conditions, implementation of diagnostic or prognostic algorithms for a vehicle or a related group of vehicles, and/or projects where a time constant of the project output is short enough that low utilization data transmission operations are not sufficient to support the project, or to support the project with acceptable performance. Such a policy may be referenced as a real-time monitoring policy, an urgent data policy, an immediate data policy, or the like.

The first partition 302 further includes a data store 320, which may be a raw data store that stores the data provided by the data communications 308 component. the data store 320 keeps the data segregated from the second partition 304 until the collected data is requested, thereby segmenting the risk incurred from data storage. For example, the first partition 302 may be controlled by and/or operated by a first entity, and the second partition 304 may be controlled by and/or operated by a second entity, whereby the partition 306 segments the risk associated with the data storage. In certain embodiments, the data store 320 stores the data in an encrypted format, which may further be configured such that the first entity operating the first partition 302 cannot access the data values of the stored data. In certain embodiments, the data store 320 stores the data associated with metadata values, such as vehicle information, time stamps, data category descriptions, or the like, such that appropriate data can be supplied responsive to a data request by the data request/processing 322 component.

The example second partition 304 further includes a consent manager 332 that determines whether consent for data values in a policy are required, and communicates with the user consent controller 212 and/or a consent application 402 (reference FIG. 12) to request and receive consent values. In certain embodiments, an application authorization data store 328 is utilized to store consent information, such as consent confirmations for a current policy, pending policy, or the like. The application authorization data store 328 may further be utilized to determine policy aspects (e.g., data parameters, sampling rates, event values, and/or use case values) that are authorized for access by specific users, user roles, applications 402, and/or in accordance with other authorization schemes to be utilized.

The example second partition 304 further includes a policy manager 330 that receives inputs from users and/or applications to determine a requested policy, policy update, policy change, or the like. In certain embodiments, the policy manager 330 interfaces with user devices 106, external applications 402, and/or internal applications 334 via an API engine 326 to determine the requested data collection, events, priorities, etc. to be utilized in determining the policy. In certain embodiments, a user or application may provide a requested policy as a data structure to the policy manager 330, for example a formatted data XML, JSON, HTML, or other data structure that includes formatted descriptions of the requested policy elements.

In certain embodiments, the policy manager 330 provides a user interface to a user or application to provide for rapid, convenient, and/or reliable formatting for policy requests. For example, the policy manager 330 interfacing with an application or user may provide a list of data elements, predetermined event values, and/or predetermined response values, that are available in the system. In certain embodiments, the list may include interface elements such as dropdown lists, check boxes, or other interfaces allowing for rapid selection of requested elements, and ensuring proper formatting of the requested elements. In certain embodiments, user and/or application authorization of requested elements may be performed during construction or entry of the requested policy elements—for example the policy manager 330 may hide unauthorized elements, display unauthorized elements in an alternative format (e.g., grayed out), and/or provide an alert or notification that an unauthorized element is presently contained within the requested policy elements. In certain embodiments, the policy manager 330 may allow unauthorized elements into the policy request (and/or omit pre-screening of authorization), where the policy manager 330 will reject creation of a policy based on the policy request if unauthorized elements are still present at a time of verifying an integrated policy for updating (e.g., integrating a number of policy requests from various users and/or applications into an integrated policy). In certain embodiments, the policy manager 330 may notify a user or application (e.g., a policy creator, policy controller, a super-user, or the like) that a verification of a policy request has failed, whether due to inclusion of an unauthorized data request, due to excessive communication bandwidth requirements, or otherwise. In certain embodiments, the policy manager 330 may identify which element of the policy request caused the verification failure, and/or may provide the notified user or application with options, such as a communication to the user or application making the unauthorized request, an option to authorize the unauthorized request, or the like.

In certain embodiments, operations of the policy manager 330 include operations to compile a number of policy requests from users and/or applications (internal or external) into an integrated policy structure. In certain embodiments, the policy manager 330 (and/or the vehicle data request manager 342) provides the integrated policy structure as a super-set of the data requests (e.g., consolidating data requests for a given parameter), and may further consolidate event requests and/or event responses where those consolidation operations can be made consistent with achieving the events and responses within the individual policy requests. In certain embodiments, the policy manager 330 may include consideration of the data super-set in determining event responses—for example where an event is requesting data to be taken in response to an event, but the data is already being collected for another request within the policy, the event may be omitted and/or the data collected may be reduced to account for the availability of the data.

In certain embodiments, the policy manager 330 includes operations to verify the integrated policy structure, for example to ensure that users and/or applications are only requesting authorized data, to ensure that data parameters requiring consent have the consent available (and/or communicating the consent requirement to the consent manager 332 for appropriate action), and/or to ensure that network bandwidth capabilities of the vehicle, data storage capabilities of the vehicle, or other parameters can meet the requirements of the integrated policy structure. In certain embodiments, the policy manager 330 keeps an updated "live" verification, for example verifying a potential integrated policy structure as policy requests are received from users and/or application. In certain embodiments, the policy manager 330 performs a verification upon request, for example by a policy creator, which may be performed as a "build" of a policy or policy update. In certain embodiments, the policy manager 330 utilizes a default policy, for example when a vehicle is first manufactured.

In certain embodiments, after the policy is verified, the policy manager 330 may communicate the policy to the vehicle policy communications manager 310 for communication to the vehicle 102. Additionally or alternatively, the policy manager 330 may communicate the policy to the vehicle policy communications manager 310 in response to a request from a policy creator, super-user, or other authorized system user.

In certain embodiments, the policy manager 330 or other system components may access a policy data store 340, which may include previously verified policies, legacy policies, one or more default policies, and/or GUI parameters such as common names for data elements, user role descriptions, application role descriptions (e.g., a set of event values, event responses, and/or data values available based upon an application role such as OEM, Manufacturer, $3^{rd}$ part, etc.), example event values and/or event responses, and/or vehicle data (e.g., nominal bandwidth descriptions, storage information, etc.).

In certain embodiments, the policy manager 330 provides a high level description to a user or application, which in certain embodiments may be referenced as a "use case." A use case may include one or more data collection elements, such as a group of parameters to be collected, and/or may further include one or more associated events and/or event responses. The selection of the use case can thereby be utilized to quickly build a policy request having predetermined information therein. The use case presented to the user may be stored in the data store 340, and/or may depend upon the role and/or authorizations of the user and/or application. In certain embodiments, a use case may have an identifiable or common name, such as "routing application use case," "passenger car standard use case," "delivery vehicle use case," etc. The data store 340 may have default use cases available, and/or may include use cases created or constructed, and/or made available by a policy creator, policy controller, super-user, or the like. In certain embodiments, a user and/or application may have the capability to build a policy request, and save the request as a use case for future implementation as a template, baseline group of data collection parameters, or the like. In certain embodiments, verification operations of the policy manager 330 may utilize the use case (e.g., utilizing a pre-determined value that for a given vehicle, user, application, or the like, that a use case is authorized or unauthorized), and/or verification operations of the policy manager 330 may evaluate the individual elements populated in response to the use case for verification. In certain embodiments, the data values populated by the use case may be displayed to the user and/or application, or may be hidden from the user and/or application.

The example second partition 304 further includes one or more internal applications 334—for example applications created or implemented by an operating entity associated with the second partition 304. The example second partition 304 further includes an application/user network manager 324, for example that performs load balancing operations, and provides communications to and/or receives communications from external applications using a communication interface 338. In certain embodiments, the application/user network manager 324 performs operations to implement a user interface or graphical user interface with external users and/or applications.

The example off-vehicle device 104 implements consent communications 344, policy communications 346, and/or data communication 336 to manage communication between the partitions 302, 304. The communications 344, 346, 336 may include standardized interface and/or protocols, for example such that a given partition 302, 304 can be operated independently from updates or changes to the other partition.

The example of FIG. 3 depicts two partitions 302, 304, although in certain embodiments the off-vehicle device 104 may be an integrated device, and/or aspects of the partitions 302, 304 may have additional partitions, and/or a different distribution of components between partitions.

Figure 4:
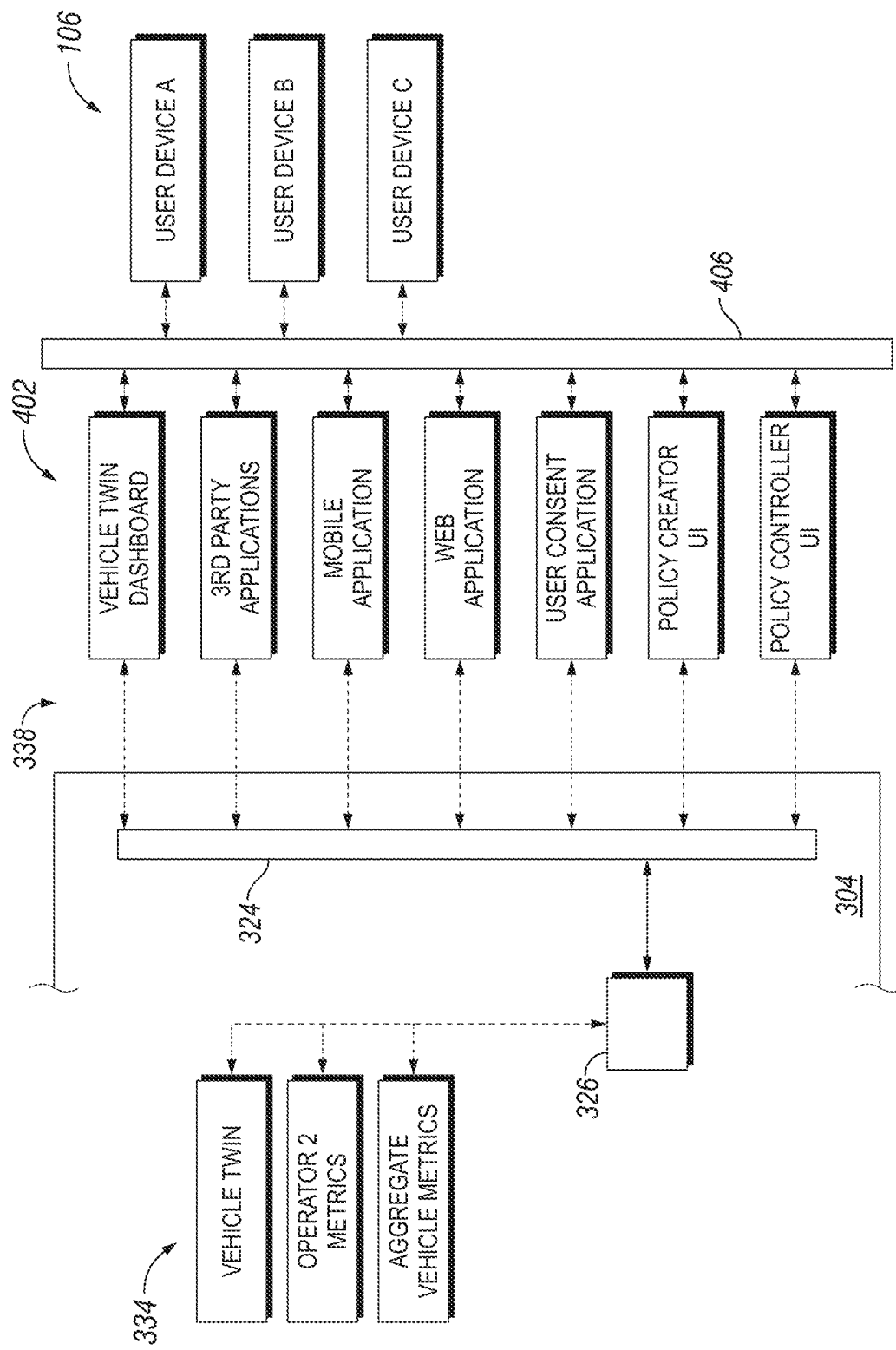
FIG. 4 is a diagram of example internal and/or external applications according to certain embodiments of the present disclosure.

Referencing FIG. 4, example internal applications 334 and/or external applications 402 are depicted. The present disclosure is not limited to the depicted applications, and a given application may be provided as an internal application 334 or an external application 402. The example of FIG. 4 depicts a number of user devices 106, which may be communicatively coupled to the system through a network interface 406, which may include one or more aspects such as an internet connection, a mobile communication interface, a proprietary network interface, or the like. A given user device 106 may interface with one or more applications 402, and a given application 402 may interface with one or more user devices 106. In certain embodiments, an application 402 may be operated without an interfacing user device 106 (e.g., a data scraper, AI component, or the like), and/or may be operated selectively interfacing with a user device 106 at certain times or operating conditions, and operating independently of a user device 106 at other times or operating conditions.

Figure 5A:
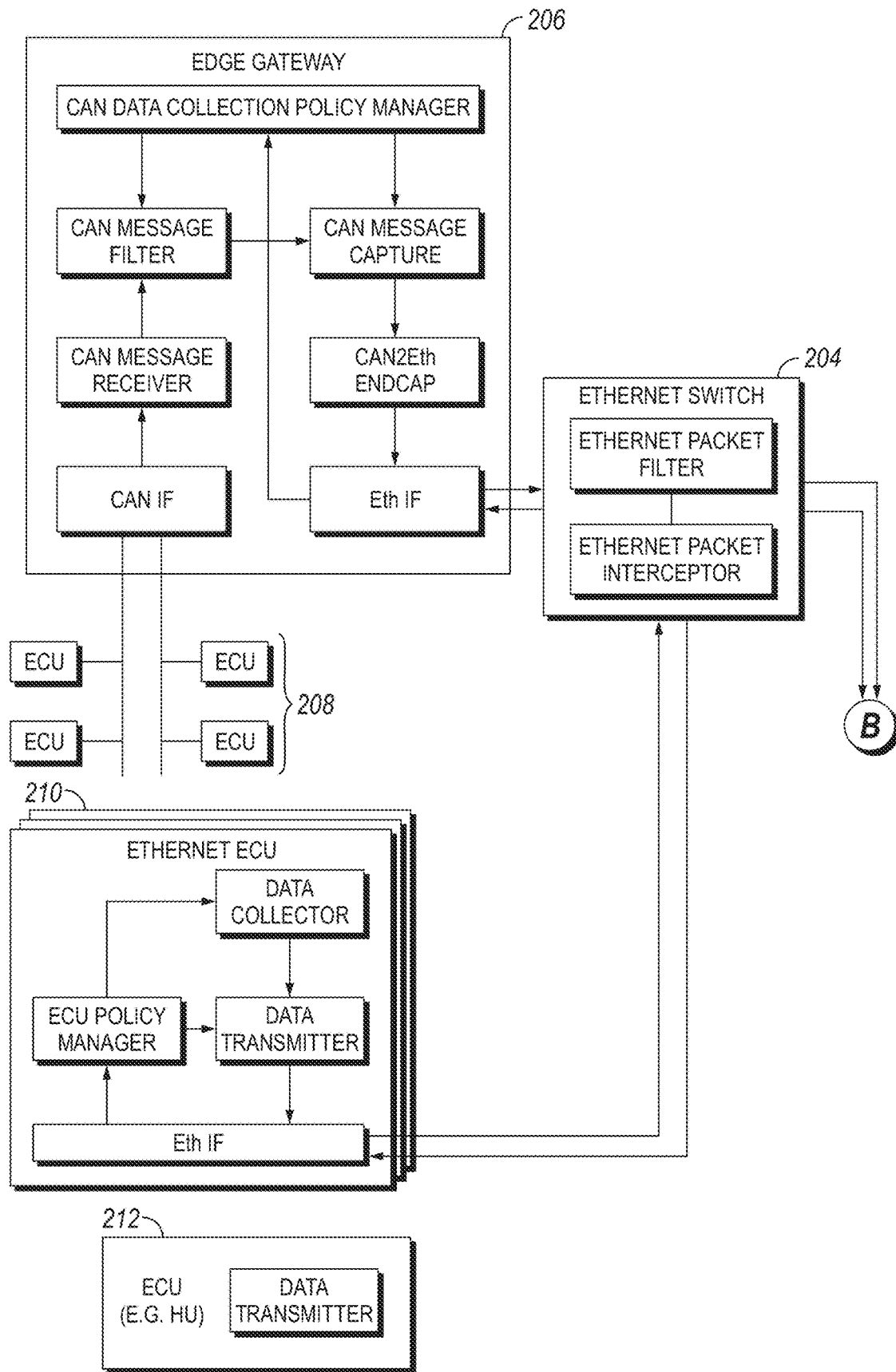
FIGS. 5A and 5B depict a schematic diagram of an example vehicle network infrastructure for a vehicle according to certain embodiments of the present disclosure.
Figure 5B:
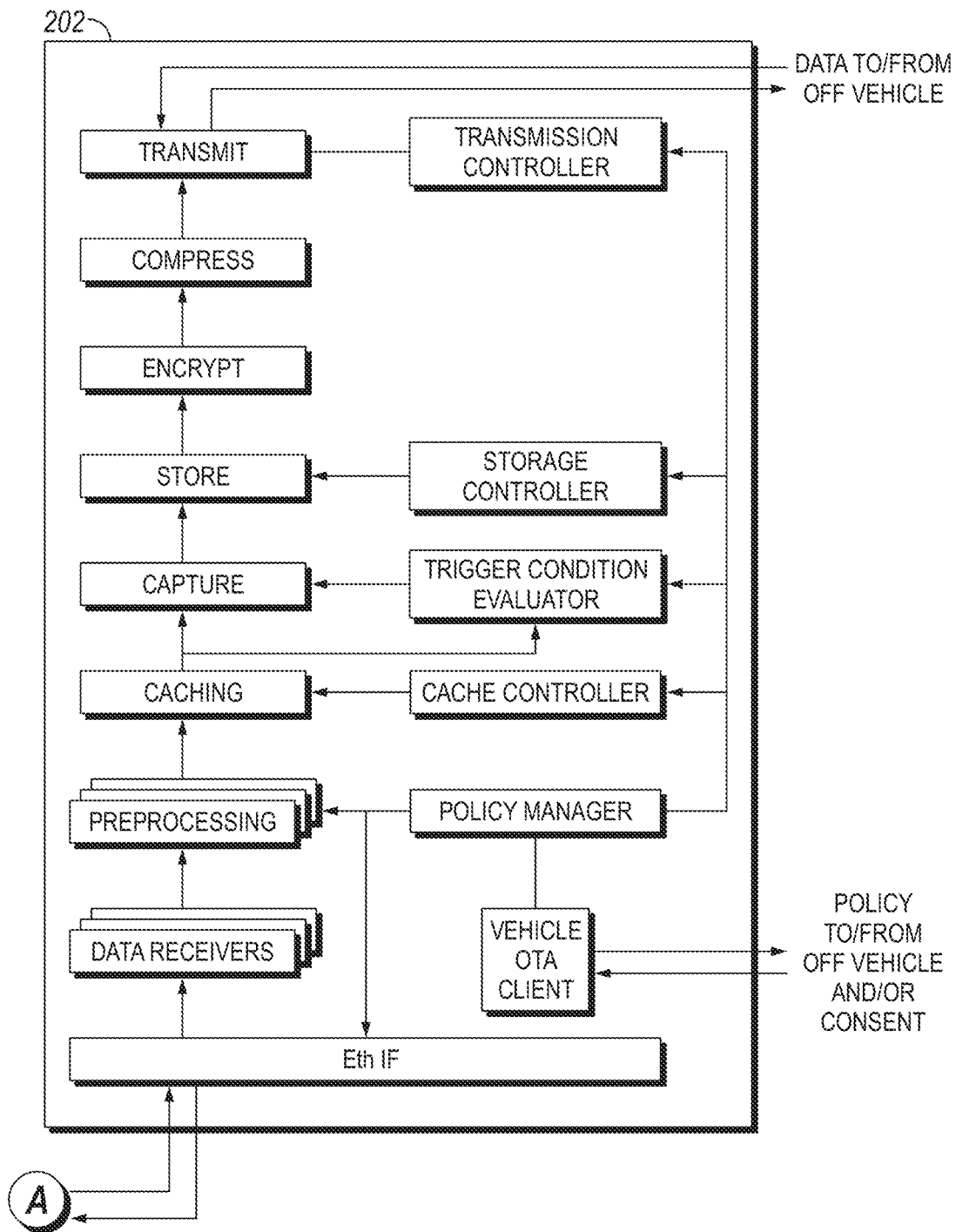

Referencing FIGS. 5A and 5B, an example vehicle network infrastructure for a vehicle 102 is schematically depicted. The example vehicle 102 includes an ethernet switch in communication with a number of ethernet based devices (e.g., sensors, actuators, and/or controllers in communication with an ethernet network), an edge gateway device (e.g., interacting with a second network such as a CAN or second ethernet network, and providing parameters to the first network or ethernet network), a data collection controller, a number of ethernet devices, and a user consent controller.

Figure 6:
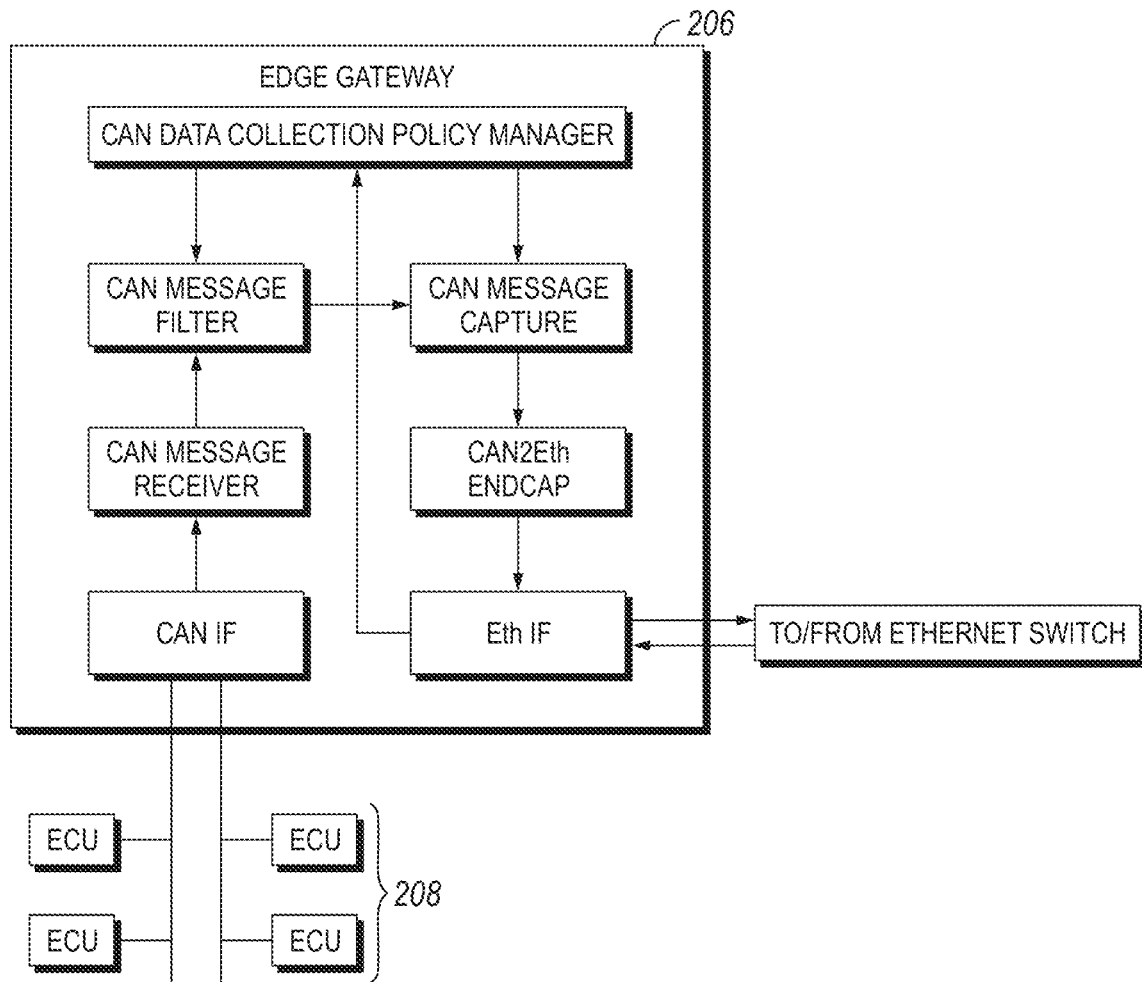
FIG. 6 is a schematic diagram of an example edge gateway according to certain embodiments of the present disclosure.

Referencing FIG. 6, an example edge gateway 206 is depicted. The example Edge Gateway 206 includes a CAN data collection policy manager, which receives data collection commands from the data collection controller. The CAN data collection policy manager instructs CAN data collection from CAN devices 208 to support the data collection commands, and provides ethernet communication parameters to the ethernet switch to support the data collection. The utilization of the Edge Gateway 206 supports mixed network operation, and in certain embodiments allows the off-vehicle device 104 to operate without requiring knowledge of which devices are present on the CAN, ethernet, or other network. The example Edge Gateway 206 further includes CAN processing components, such as a CAN IP component that interprets CAN addresses of respective CAN components 208, a CAN message receiver that interprets CAN messages to determine the data values therein, and CAN message filter that supports, for example, down sampling of CAN messages to reduce network traffic within the vehicle network while supporting the policy. For example, if a parameter is provided on the CAN at a 20 ms rate, but the policy requires only a 1 sec sampling rate for the parameter, then the CAN message filter can expunge excess sampling of the message. In certain embodiments, other components may perform down sampling in addition to, or instead of, a CAN message filter. For example, the ethernet switch and/or the data collection controller may perform appropriate down sampling. The location of the down sampling may depend on the specifics of the policy (e.g., if a parameter may occasionally be sampled faster due to an event, then the CAN message filter may provide data at the highest rate that could be required, allowing another component to down sample when the higher rate is not required, and/or the CAN message filter may be responsive to the event, down sampling appropriately based one the circumstances). The example Edge Gateway 206 additionally includes a CAN message capture, for example passing the CAN sampled data and/or buffering the CAN sampled data until it is passed. The example CAN Gateway further includes a CAN2Eth Encap component, that encapsulates the captured CAN message into an ethernet message (e.g., including leading and/or trailing message data, and/or packaging one or more of the CAN messages into a single ethernet packet). The example CAN Gateway further includes an Eth IP component, which communicates the encapsulated CAN messages to the appropriate address on the ethernet network. In certain embodiments, messages are passed in both directions, for example allowing the CAN data collection policy manager to receive appropriate portions of the current policy, allowing the Edge Gateway to receive event data indicators (e.g., than a given event has occurred), and the like. In certain embodiments, a mixed network may include different network types than a CAN-ethernet mix, and/or may include networks with distinct protocols (e.g., packet sizes, leading/trailing bits, etc.), where the Edge Gateway includes appropriate components therefore.

Figure 7:
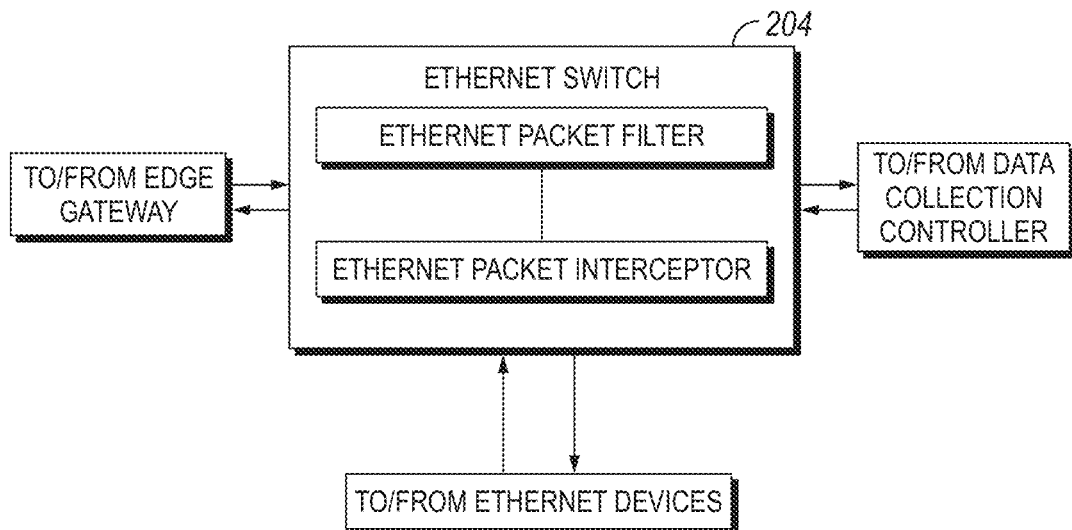
FIG. 7 is a schematic diagram of an example ethernet switch according to certain embodiments of the present disclosure.

Referencing FIG. 7, an example ethernet switch 204 is depicted. The example ethernet switch 204 includes an ethernet packet filter component, for example to perform down sampling and/or to reject un-needed packets (e.g., data responsive to an event provided by an ethernet device and/or the Edge Gateway during an operating period where the event is not active) and an ethernet packet interceptor. The example ethernet packet interceptor retrieves selected data from the ethernet network. In certain embodiments, the ethernet switch 204 performs operations such as port switching or other routing operations. The example ethernet switch 204 is in communication with the data collection controller 202, the Edge Gateway 206, and one or more ethernet devices 210.

Figure 8:
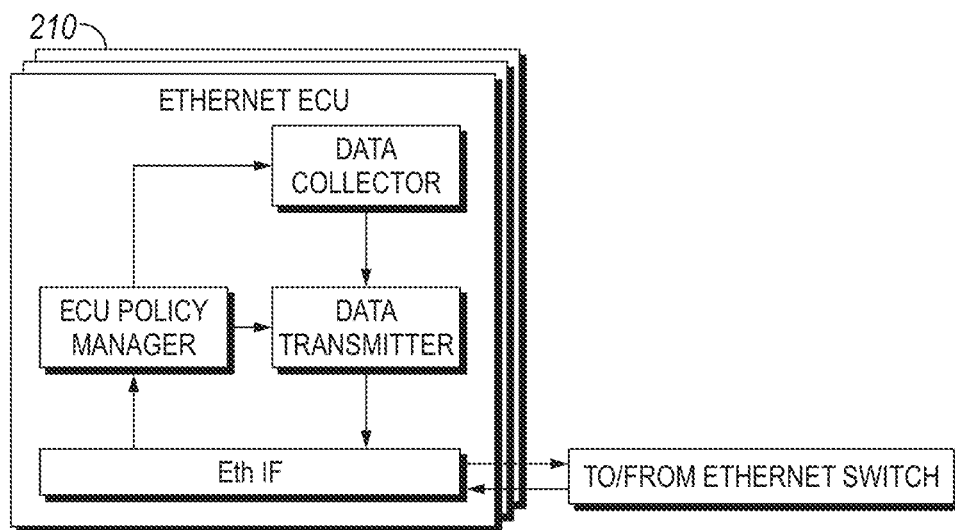
FIG. 8 is a schematic diagram of an example ethernet device according to certain embodiments of the present disclosure.

Referencing FIG. 8, an example ethernet device 210 is depicted. In certain embodiments, the ethernet device 210 manages policy implementation relevant to the specific device, for example utilizing an ECU policy manager (electronic control unit) that determines data transmission values responsive to the policy, including data rates, resolution, and/or data response to events. In certain embodiments, the ECU manager performs event detection (e.g., reading ethernet parameters and determining whether the event is active). In certain embodiments, the ECU manager receives an event status, and manages only the data transmission requirements responsive to the event status. The ethernet device 210 further includes a data collector, which may down sample, adjust resolutions of data values, and/or provide multiple data values (e.g., within a packet, and/or time stamped for later matching in the data collection controller 202 and/or off-vehicle device 104). The example ethernet device 210 further includes a data transmitter that provides packets to an Eth IP, where the Eth IP manages addressing, sending, and/or receiving of associated packets. The example ethernet device 210 may be associated with a specific component, for example controlling ethernet communications responsive to the policy for the associated component. Additionally or alternatively, the ethernet device 210 may be a part of the component (e.g., managing ethernet communications for the component that may be in addition to the data collection aspects supporting the policy) and/or may be a part of a controller associated with the component. The example ethernet device 210 is in communication with the ethernet network, and/or the ethernet switch 204.

Figure 9:
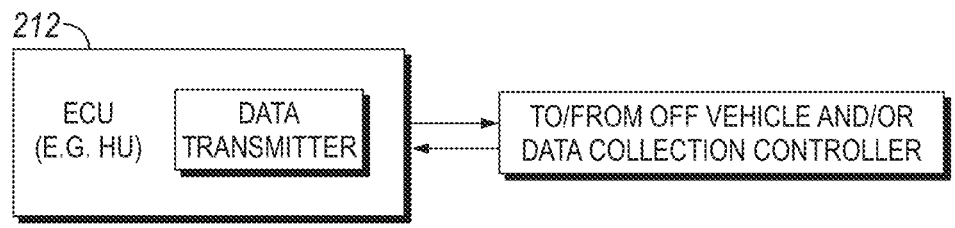
FIG. 9 is a schematic diagram of an example user consent controller according to certain embodiments of the present disclosure.

Referencing FIG. 9, an example user consent controller 212 is depicted. The user consent controller 212 may be a part of, and/or may be associated with, an on-vehicle user input device such as a console (e.g., a touch screen interface) accessible to the vehicle operator. In certain embodiments, the user consent controller 212 may be omitted, and/or may be in another part of the system, for example as an application for a mobile device, a web portal or other interface for a connected device, or the like. For example, where the owner of the vehicle and/or associated data is separate from the operator, and/or for the convenience of the operator, an alternate interface may be provided for consent communications. In one example, an operator utilizes a mobile device having an application installed thereon for performing consent operations, for example having a login or authentication operation that confirms the association with the vehicle. In another example, an owner or agent having authority accesses an application or web portal—for example a fleet manager having a web based access on a computing device and/or a mobile application associated with the vehicle. In certain embodiments, user consent can be provided for multiple vehicles within a single interface (e.g., a web application listing a group of vehicles) and/or with a single action (e.g., approving a policy update for a selected group of vehicles). In certain embodiments, a user consent application (e.g., reference FIG. 4) may be used in conjunction with, or as an alternative to, the user consent controller 212.

Figure 10:
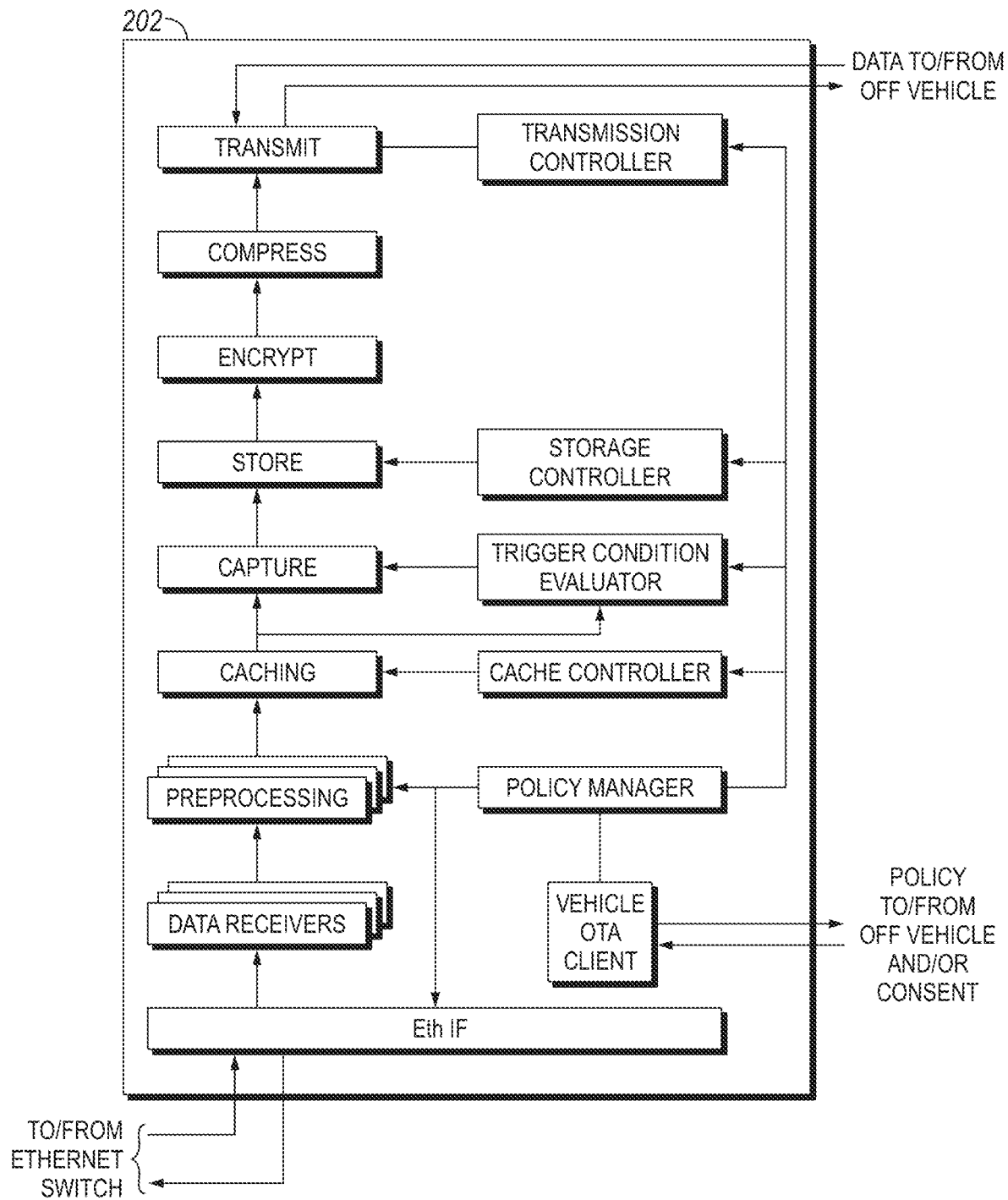
FIG. 10 is a schematic diagram of an example data collector controller according to certain embodiments of the present disclosure.

Referencing FIG. 10, an example data collector controller 202 having a number of components thereon, and configured to functionally execute operations of the data collector controller 202 is schematically depicted. The data collector controller 202 includes a vehicle OTA client (over the air) that receives policy updates, policies, and/or policy notifications from the off-vehicle device 104. The example vehicle OTA client communicates the policy, policy update, and/or policy notification to the policy manager. In certain embodiments, the policy may be provided from the off-vehicle device 104 through an MQTT broker (reference FIG. 11), allowing for the vehicle 102 to subscribe for policy updates, and to receive immediate notification that an updated policy is available, without requiring that the full policy be communicated to the vehicle 102 until the vehicle 102 is in a condition to receive and/or implement the policy. In certain embodiments, the policy manager may download a policy update and store it for later implementation. In certain embodiments, the policy manager may command a download of the policy only when the vehicle 102 is in a condition to implement the policy (e.g., during a shutdown operation, during steady state operation, or the like).

The example policy manager verifies the policy, for example performing checks based on vehicle specific information that may not be available to the policy manager 330 on the off-vehicle device 104, to ensure the policy can be implemented. For example, if the policy requires data collection from device that is not present, requires network traffic (on either network of the vehicle, through the ethernet switch, or at some other component of the vehicle network) that is not possible or otherwise not compliant with the requirements of the vehicle, and/or requires a type of information that the vehicle 102 cannot provide (e.g., a sampling rate and/or resolution that is not available), the policy manager may reject the policy and/or provide a notification to the off-vehicle device 104 that the policy was rejected. In certain embodiments, the policy manager may be configured to partially implement the policy, for example implementing higher priority data collection elements from one part of the policy and rejecting other lower priority data collection elements, and/or replacing part of a currently implemented policy having a lower priority than a high priority portion of the updated policy. However, in certain embodiments, the policy controller may be configured to either accept or reject a new or updated policy in the whole. In certain embodiments, for example where the policy manager is not able to fully comply with a new or updated policy, the policy manager may be configured to communicate information about the partial implementation of the policy to the off-vehicle device 104 (e.g., a flag indicating only partial compliance, and/or further information such as which parameters are not being serviced, and/or a level of service available or being provided instead).

In certain embodiments, the policy manager parses the policy elements and communicates relevant elements to policy managers throughout the system (e.g., to the Edge Gateway, ethernet switch, ethernet devices, and/or other components with the data collection controller 202 as described following). The example data collection controller 202 includes data receiver component(s) that receive data responsive to the policy (and/or planned for response if an event condition is detected) from the ethernet network (e.g., utilizing an Eth IP component) and/or other components on the vehicle 102 (e.g., from the user consent controller). The data receivers provide the data to a pre-processing component, which may determine virtual sensor or modeled values, adjust data sample rates (e.g., performing filtering operations), adjust resolution values, and the like. In certain embodiments, the pre-processing component may perform certain operations that support event detection, such as determining secondary state values that inform the event status determination, reject or tag data based on fault codes present, or the like.

The example data collection controller 202 includes a caching component that performs short-term data storage, for example to allow for parameter processing, and/or to support information capture such as rolling buffers where an event may trigger short-term past data recovery (e.g., a trigger indicating an accident, a component failure, or the like where past data is desirable when the event is detected). The example caching component may be responsive to commands from cache controller, which may receive parsed caching instructions to support the policy, and/or may adjust caching operations in response to the current operating conditions of the vehicle 102. In certain embodiments, the size of the cache and/or other available storage may affect the ability of the data collection controller 202 to meet the requirements of a policy. For example, where numerous events in the policy provide for significant consumption of cache memory, the policy manager may determine that the current configuration of the vehicle 102 cannot meet the policy. In certain embodiments, for example where multiple part numbers of the cache component having distinct cache sizes are present within a group of vehicles, and/or where a vehicle specific condition is present (e.g., a portion of the cache memory is failed or otherwise unavailable), the policy manager having superior information about the specific vehicle relative to the policy manager 330 on the off-vehicle device 104, may make a determination that the policy cannot be verified where the policy manager 330 approved the policy. In certain embodiments, the trigger condition evaluator receives parsed information from the policy manager indicating event detection criteria, and the trigger condition evaluator determines which event conditions are present in response to the event detection criteria and the cached and/or captured data. In certain embodiments, event detection may be performed in other components as described throughout the present disclosure, such as at the Edge Gateway policy manager and/or at the Ethernet device policy manager. In certain embodiments, the policy manager of the data collection controller 202 determines which device has sufficient information available to fulfill operations of the event detection, and provides parsed elements of the policy to the appropriate component. Accordingly, in certain embodiments, the trigger condition evaluator may reference a state value indicating whether a given event condition has occurred, rather than perform a direct detection of the parameters utilized to determine whether an event has occurred. In certain embodiments, one device may perform primary event detection, and another component (e.g., the trigger condition evaluator) may perform a secondary detection of the same event, for example providing a system that is responsive to detect an event when a primary sensor indicating the event has failed, but a backup sensor to detect the occurrence of the event.

The example data collection controller 202 includes a capture component that provides the parameters for storage. In certain embodiments, the capture component is responsive to commands from a trigger condition evaluator, for example indicating that a trigger condition (event) is active, and may pull further information from the caching component (e.g., buffered values available in the cache) to support the implementation of the policy. The example data collection controller 202 includes a storage component that stores the captured data for transmission to the off-vehicle device 104. An example storage component utilizes non-volatile memory, such as FLASH memory, allowing for stored data that has not been transmitted to be saved in the event of power loss. The example data collection controller 202 includes a storage controller that provides storage commands for the storage component to support implementation of the policy, and/or to support specific operating conditions of the vehicle 102, such as intermittent loss of network communication to the off-vehicle device 104 and/or intermittent ability to communicate data to the off-vehicle device 104 (e.g., where higher priority resources are utilizing available bandwidth, and/or where data communication limits exist, such as a data plan limitation). In certain embodiments, storage of data collection parameters is performed until the store component is full, wherein some of the data is purged (e.g., oldest data, lowest priority data, and/or least utilized data). For example, if a first data element supports numerous policy requests, and another data element supports only a single policy request, the storage controller may be configured to keep the data that meets the higher percentage of the available policy requests. In certain embodiments, data element correspondence to various policy requests is not available at the data storage controller 202, and other criteria are utilized to determine which data will be purged or expired. In certain embodiments, a portion of the data to be purged may additionally or alternatively be compressed and/or summarized to reduce utilization of the storage. In certain embodiments, a portion of the data to be purged may be down sampled to reduce utilization of the storage. In certain embodiments, the amenability of certain data elements to compression, summarization, and/or down sampling (amenability may include required consumption of processing power, descriptive value of the data in a compressed, summarized, or down sampled format for the underlying data, or similar considerations) may be considered in determining the commands from the storage controller in response to a full (or filling) storage component. In certain embodiments, commands to compress, summarize, and/or down sample data in response to a full or filling storage component may be provided as a part of the policy, and/or the policy may further includes instructions for techniques to be utilized for the compression, summarization, and/or down sampling of data when indicated. In certain embodiments, the policy may further include thresholds (e.g., storage value thresholds, time remaining until storage is full, etc.) indicating when storage purging, compression, summarization, and/or down sampling operations are to be performed.

In certain embodiments, the storage controller is configured to support cache operations by utilizing a portion of the storage available on the storage component. In certain embodiments, the storage controller may be configured to determine an amount of storage than can be utilized based on historical information such as usage fractions of the storage component over time, and/or network availability to transfer collected data to the off-vehicle device 104. In certain embodiments, storage support for the caching component may be defined within the policy. In certain embodiments, storage support for the caching component may not be utilized. In certain embodiments, the availability of storage support for the caching component may be considered by the policy manager in operations to verify the policy.

In certain embodiments, the data collection controller 202 includes an encryption component configured to encrypt data to be transmitted to the off-vehicle device 104. In certain embodiments, the data collection controller 202 includes a compression component configured to compress data to be transmitted to the off-vehicle device 104. The compression may be lossy or lossless compression, and the compression type may be determined according to the type of data, the descriptive value of the data after compression, and/or may be determined by the policy. The data collection controller 202 further includes a transmit component configured to transmit collected data to the off-vehicle device 104, and a transmission controller component to configure the transmission, for example to support selected data protocols, to mediate between competing transmission resource of the vehicle 102 (e.g., comparing relative data priority to other transmission elements, scheduling transmission according to a data plan, vehicle operating condition, and/or to support a virtual channel utilized on a transceiver). In certain embodiments, the transmission controller is responsive to parsed elements of the policy indicating data plan values (which may differ between specific data elements—for example where a first data element is associated with a first requestor having a first data plan, and where a second data element is associated with a second requestor having a second data plan), transmission priorities, and/or vehicle operating conditions related to any of the foregoing.

Figure 11:
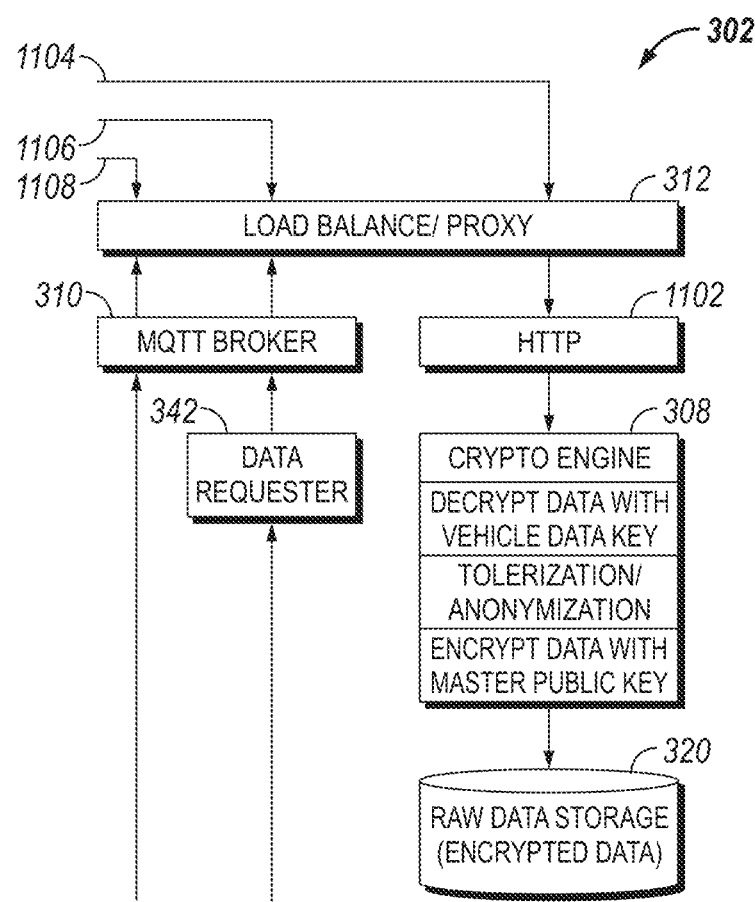
FIG. 11 is a schematic diagram of an example first partition according to certain embodiments of the present disclosure.

Referencing FIG. 11, an example first partition 302 is depicted having a number of components configured to functionally execute operations of the first partition 302. The example first partition 302 includes a load balancing/proxy controller 312 (e.g., a network manager) configured to communicatively interact with the data collection controller 202. The example load balancing/proxy controller 312 interacts utilizing policy communications 1106, consent communications 1108, and data communications 1104 between the vehicle 102 and the off-vehicle device 104. The communications 1104, 1106, 1108 include primary data communications, authentications, confirmations, and the like.

The example first partition 302 further includes an http component 1102 configured to package the received data into a selected data structure (e.g., http for the example of FIG. 11) for storage. The example first partition 302 further includes a data communications component 308 configured to package the data for storage, and may further include a crypto engine that decrypts the received data (e.g., utilizing a temporary vehicle key), a tokenization/anonymization component that recoverably replaces sensitive data with a token, and an encryption component that encrypts the data with a master public key (e.g., where the data request/processing component 322 has the master private key), such that the first partition 302 cannot access the data values. In certain embodiments, the data communications component 308 associates metadata with the stored data such that a request from the data request/processing component 322 can be answered with the corresponding data. The example first partition 302 stores the data into a raw data storage 320 for access, as authorized, by internal applications 334 and external applications 402.

The example first partition 302 further includes an MQTT broker that publishes an updated policy, such that subscribing devices (e.g., a data collection controller 202) receive a notification that an updated policy is available. In certain embodiments, the first partition 302 may push updated policies to a vehicle 102, and/or the vehicle 102 may periodically request whether a policy update is available, and/or request policy updates in response to certain events (e.g., certain operating conditions, service events, network availability events, etc.).

Figure 12:
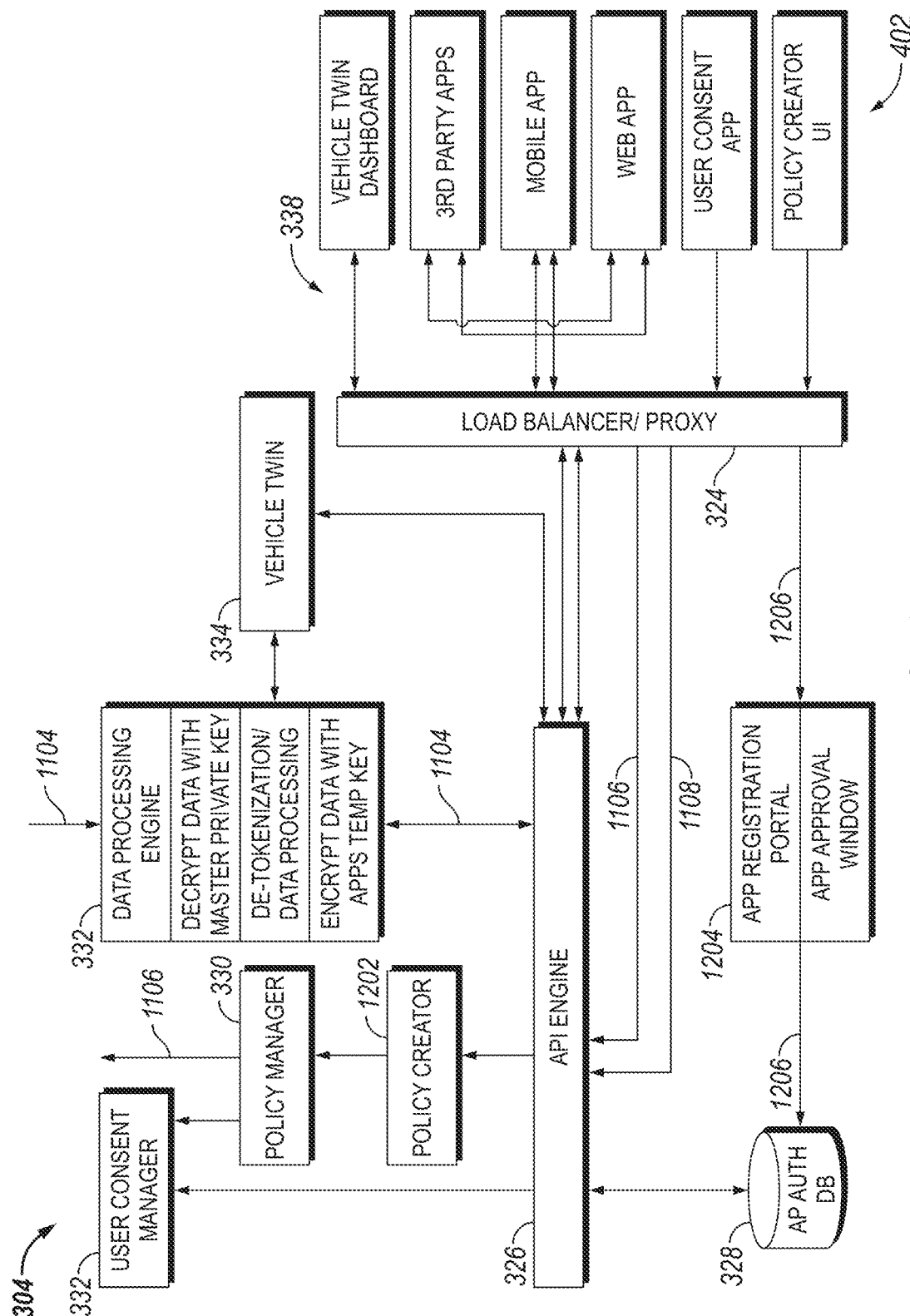
FIG. 12 is a schematic diagram of an example second partition according to certain embodiments of the present disclosure.

Referencing FIG. 12, an example second partition 304 includes a policy creator component 1202, for example to perform operations to compile, implement, create, and/or store policies for utilization in the system. In certain embodiments, the policy creator component 1202 is further configured to roll out policy updates, for example updating a policy to a small number of vehicles before sending the policy update to a larger number of vehicles. The example second partition 304 further includes the data request/processing component 322 having a data processing engine that decrypts received data from the first partition 302 utilizing a master private key, a de-tokenization component that restores tokenized information within the received data, and an encryption component that re-encrypts the data with a temporary key for sharing of the data with an application and/or user device requesting the data (if authorized). The example of FIG. 12 includes an internal application 334 such as a vehicle twin application being operate for a corresponding vehicle 102, and a number of external applications 402, such as a vehicle twin dashboard, a $3^{rd}$ party application (of any type), a mobile application, a web based application, a user consent application, and/or a policy creator user interface.

Figure 13:
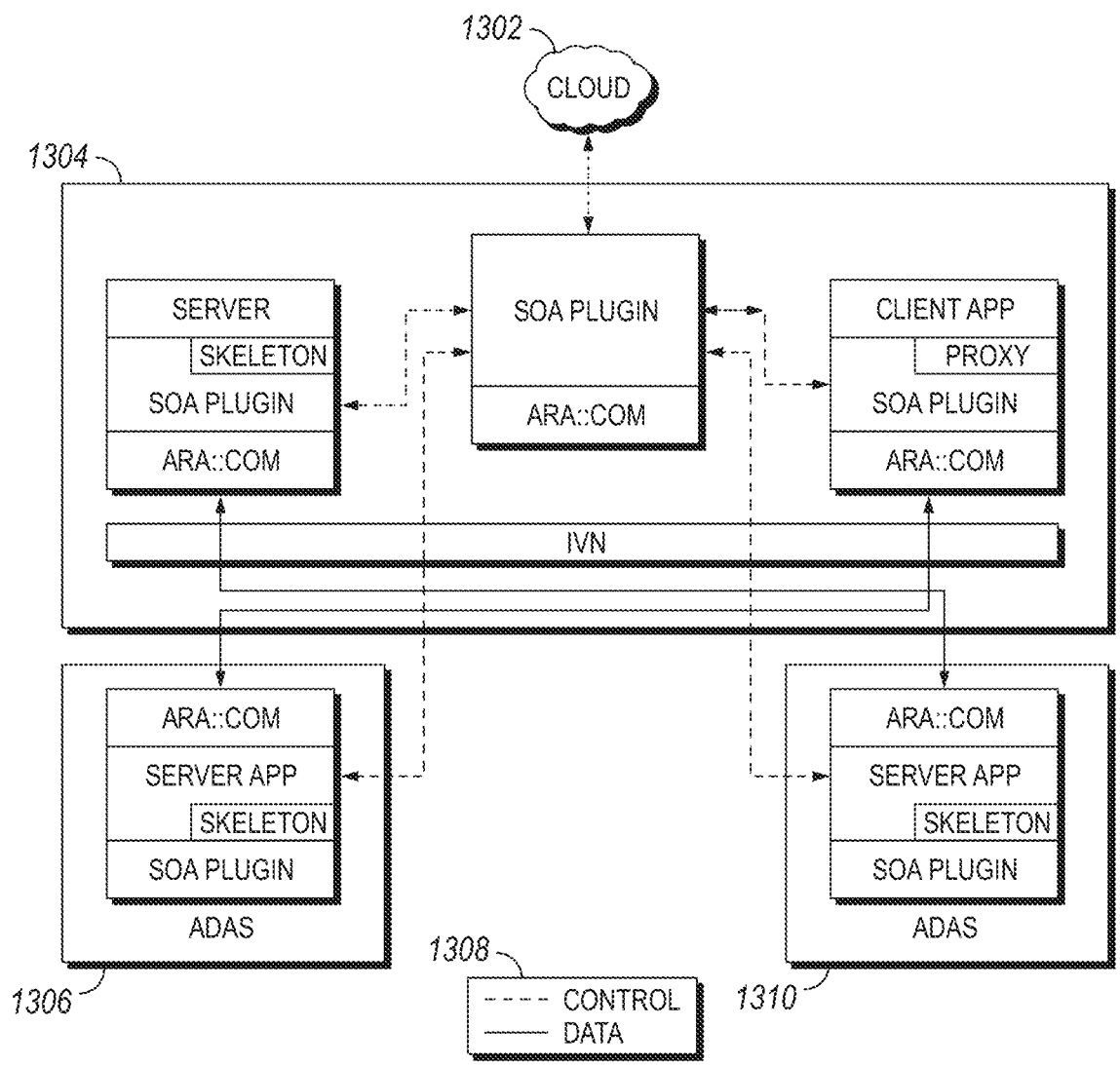
FIG. 13 is a schematic diagram of an example data collection system according to certain embodiments of the present disclosure.

The example second partition 304 further includes an application registration portal, and an application approval workflow component (together—1204) that interfaces with applications and proposed applications to ensure proper authorization, enforce application standards, and the like. The application registration portal, and the application approval workflow component 1204 further interact with the application authorization database 328 to record application registrations, and ensure authorization of accessing applications. In the example of FIG. 13, authorization communications 1206 are depicted, although authorization communications may pass between other components of the second partition 304 beyond those depicted.

In certain embodiments, one or more data stores described herein are utilized to store raw vehicle messages and data, and may further include metadata or other information to identify the data at a selected time—such as vehicle identifications, time stamps, identifiers for the data, and/or any other information allowing the system to access content of the raw data store at a selected time and utilize the content of the raw data store for one or more purposes described herein. Raw data may reference vehicle data communicated off-vehicle, stored locally on the vehicle (e.g., for a selected period of time), as the data is presented such as from a data collection controller 202 (reference FIG. 2). In certain embodiments, data may be processed at least partially, for example compressed data, down-sampled data, summary data, aggregated data, or the like, and may still constitute raw data as set forth herein. In certain embodiments, data may be significantly processed—for example data determined from a model, virtual sensor, or the like, and may still constitute raw data as set forth herein. For example, an output of a virtual sensor or model describing a basic vehicle parameter such as vehicle speed, ambient air temperature, or the like, may be stored as raw data for utilization by applications 402, 334 (e.g., reference FIG. 4). The description utilizing raw data may include data that is utilized in a manner as provided by the vehicle, and/or data utilized in a manner that is presented to applications 402, 334 as basic vehicle parameters that are available for utilization. A given data value (e.g., vehicle location) may be treated as raw data for a particular system and/or for a particular purpose, and not treated as raw data for another system and/or purpose.

Embodiments of the present disclosure provide for systems, apparatuses, and methods for providing container management, including operating and managing container run-time operations for embedded environments such as a mobile application. Example operations include providing container management for mobile applications having more than one network on-vehicle, and/or mixed networks on the vehicle. Embodiments herein provide for virtual network construction and configuration, intra-container communication, and inter-container communication. Embodiments herein provide for container registry, deployment, and orchestration. Embodiments herein provide for container monitoring, recovery, and/or updating. Embodiments herein provide for dynamic configuration of a configurable edge gateway (e.g., interfacing to CAN network, LVDS network, electrical signal zone, etc.), dynamic data collection from edge networks, dynamic signal to service mapping for edge networks, and/or programming/configuration of cross-network communications with reduced latency using a communications engine or other implementing circuit or controller.

Embodiments of the present disclosure provide for systems, apparatuses, and methods for operating and/or managing vehicle automation features and/or functions. Embodiments herein allow for the addition, deployment, configuration, and/or updating of vehicle automation features and/or functions without coding (e.g., algorithm development, compiling, and/or updating of computer readable instructions, operating system changes, and/or firmware updates). Embodiments herein allow for the addition, deployment, configuration, and/or updating of vehicle automation features utilizing an index of automation recipes, interactions with an operator, and/or interactions with an application that further interfaces with an operator, owner, service personnel, manufacturer, fleet personnel, and/or OEM. Embodiments herein support management, initiation, and/or updating of flexible triggers for vehicle automation features and/or functions, and/or execution of vehicle automation features and/or functions.

Embodiments of the present disclosure provide for systems, apparatuses, and methods for managing and/or operating vehicle remote control enhancements. Embodiments herein allow for reduced latency and/or no latency vehicle-external network communications, for example utilizing low power persistent vehicle-cloud communications. Embodiments herein allow for extensive control functions for customer support, customer service, business analysis, manufacturer/OEM application differentiation, consumer applications, customized features, and/or aftermarket features. Embodiments herein allow for implementation of remote control enhancements utilizing programmable complex control procedures, with high capability for secure access to vehicle networks, devices, end points, and/or flows, and for access to ancillary aspects to allow for implementation of high capability features (e.g., determining supporting vehicle states, conditions, etc., and/or capabilities to ensure mission functions are not inhibited).

Embodiments of the present disclosure provide for systems, apparatuses, and methods for consistent implementation of intrusion detection systems (IDS) across networks of a mobile application, and may further include implementation of a unified across all networks and/or a selected sub-set of network of the mobile application. Embodiments of the present disclosure further include implementation of IDS for mobile applications having external connections and data communication, and/or functionality operated at least in part on an external device (e.g., fleet computing device, cloud server, etc.). Embodiments of the present disclosure include implementation of IDS for Ethernet, CAN, and/or vehicle-cloud IDS. Embodiments of the present disclosure include generating and/or communicating incident reports, data logs, activity/response descriptions, and/or alerts, and/or generating data to be utilized in incident reports, data logs, activity/response descriptions, and/or alerts. Embodiments of the present disclosure include providing incident reports, data logs, activity/response descriptions, and/or alerts, to selected devices and/or communication flows, including on-vehicle devices, off-vehicle devices, and/or devices associated with selected entities (e.g., operator, owner, fleet personnel, manufacturer, OEM, service personnel, monitoring applications or services, etc.). Embodiments herein include operations to implement rule based incident response to IDS operations. Embodiments herein include dynamic configuration and/or updating of IDS operations.

Embodiments of the present disclosure provide for systems, apparatuses, and methods for management and/or operation of shared network storage for a mobile application having a number of data storage devices associated therewith, and/or may further include where the number of data storage devices are distributed across at least two networks and/or across networks of a mixed network for the mobile application. Embodiments include a unified storage shared by multiple applications, flows, processors, circuits, end points, devices, services, and the like. Embodiments herein provide for network file system access to end points, devices, applications, and/or flows on the networks of the mobile application. Embodiments herein provide for an overlaid database service for shared stored data, and/or portions thereof. Embodiments herein provide for selected encryption schemes for shared stored data, including at least encryption of data at rest. Embodiments herein provide for authentication, access control, and auditing of shared network storage operations, including at least scheduled operations according to a policy, permissions of participating devices, etc. Embodiments herein provide for data life cycle management of shared stored data, including at least: implementation of policies; data retention schemes; and/or prioritization between devices, end points, applications, flows, related services, data types, and/or determined operating conditions of the mobile application.

Implementations of the present disclosure are provided as a service oriented architecture (SOA), faster development, code reuse, reduced complexity, and easier deployment. OEMs benefit from reduced development costs, improved time-to-market, reduced warranty expenses, and recall expenses. Customer benefits include vehicles with more capabilities, feature upgrades after purchase, and less inconveniences due to work associated with warranties and/or recalls. A SOA, as used herein, includes operations for devices, end points, applications, and/or flows to publish (e.g., a service provider) the availability of a service (e.g., data values, actuator operations, and/or functions available), and to subscribe (e.g., a service requestor) or otherwise request an available service. Services may be selectively published (e.g., only to subscribers having sufficient permissions, and/or only by providers having sufficient permissions). Services may have distinct permissions on both the publication and request side, for example with owners, manufacturers, OEMs, body builders, fleet operators, third-party applications, etc. having distinct permissions to publish and/or request services. Service providers and/or requestors may be on-vehicle or off-vehicle.

Previously known vehicle functions today are implemented as mission-specific, monolithic code that is tightly coupled with underlying middleware, operating system, and hardware of a particular controller (e.g., ECU). A SOA architecture allows new applications to re-use either data or function provided by existing applications across the network, regardless which ECU they reside in, which network they are associated with, the underlying hardware, OS, middleware, and the programming language used. The utilization of a SOA decouples the control logic from sensor data and actuator, thus making applications and control functions portable to different ECUs. The utilization of a SOA increases the scalability of the overall system functions because both service providers and consumers could be added/subtracted or enabled/disabled based on performance, cost tradeoff, and changes to the system (e.g., operating conditions, change in permissions, change in subscriptions, etc.). Additionally, the utilization of a SOA allows for the timing of a feature to be de-coupled from the manufacturing event or dealer preparation event, as features can be readily added or removed when the feature is available.

An example SOA supports utilization of AUTOSAR ARA::COM compliant API interface, and further includes extensions thereto. Example characteristics of the ARA::COM module, without extensions, include the utilization of a distributed architecture (e.g., each service provider and requester manages offers, finding, connecting, and interaction with counterparts), and accordingly there is no readily available way to monitor or control service management activities such as discover, publication, subscription, starting/stopping of services, and/or reporting of activity for debugging, diagnostics, or analysis. The lack of central management results in extraneous network traffic, unavailability of inter-network services, requirements that each device adapt individually to changes in services, and lack of permissions scheming or security for publication and/or subscription of services. Further, under ARA::COM, numerous aspects of the service interface must be defined statically (e.g., service ID, IP address, port number, etc.) before or during compiling operations. Accordingly, changing any of the static values requires modifying and recompiling the code, which is cumbersome and error prone. Additionally, the static local registry of a given ECU in different applications across the mobile application may become out of sync due to various error conditions, and recovery from such a situation may take a long time, fail completely, and may thereby result in extensive down time, failure of the mission, and/or expensive service operations to reconfigure the ECU(s) of the vehicle.

An example embodiment includes a centralized controller for implementing a service-oriented software infrastructure for a mobile application (e.g., a SOA). Example capabilities include central management of all services (and/or all managed services) in the vehicle using policies that are maintained and deployed from the cloud. In certain embodiments, all or a portion of the policies may be maintained and/or deployed from an external device coupled to the vehicle, such as a service tool, OBD device, etc. In certain embodiments, all or a portion of the policies may be maintained and deployed from a user device, which may be coupled through the cloud, a web application, a hardware connection (e.g., a USB cable, OBD port coupling, etc.), and/or another connection such as a WiFi or Bluetooth connection. In certain embodiments, the capabilities and/or permissions to update and/or deploy policies may vary by the updating entity (e.g., manufacturer, service, owner, warranty implementer, etc.) and/or by the access type (e.g., cloud, web application, hardware connection, etc.). An example policy defines parameters such as service parameters, service access permission, and/or service connection modes. An example centralized controller implements dynamic updates to the policy, which can add, update, delete, enable, and/or disable service providers, requestors, service parameters, specific subscriptions, and/or publication parameters for a service. In certain embodiments, the centralized controller is at least partially capable to support a policy utilizing a static configuration (e.g., where cloud connectivity is unavailable, or not presently available). In certain embodiments, the centralized controller stores the policy in a data structure configured to provide the policy information, and capable to be stored in a separate memory location (e.g., a flash memory) from OS, boot-up, or other operating sectors of the centralized controller allowing for updates to the parameters without interruption of base operation. In certain embodiments, the separation of policy information may be physical (e.g., a distinct memory store device) and/or logical (e.g., memory addresses separated from the base operation addresses). In certain embodiments, storage of the policy information may be executed, in whole or part, as a shared network storage operation.

An example centralized controller provides for visibility of services to a cloud or external tool. For example, the centralized controller may determine and/or store a service map of all services offered and/or consumed on the vehicle. The specific service map shared with the requesting device may be configured according to the permissions of the requestor (e.g., distinct views for a manufacturer, service entity, fleet owner, security personnel, compliance personnel, etc.). An example centralized controller determines a log of key service activities in the vehicle (e.g., addition or removal of a service, a change in subscriptions, a change in a data provider to a service, etc.). The activities that are key service activities may vary according to the requestor and/or purpose for using the activity log, and accordingly the content of the log may be determined and/or adjusted according to the requesting device and/or entity. Additionally or alternatively, the sharing of the log, and/or the content of the shared log, may be configured according to the permissions of the requestor. The activity log may be utilized for debugging, diagnostics, auditing, compliance determination, or other purposes.

Example modes for service connection include: full service discovery, with publication/subscription data, and a fully dynamic connection; no service discovery, but provided publication/subscription data, and a partially dynamic connection; and/or no service discovery, no publication/subscription data, and a static connection. In certain embodiments, the mode applied to a service connection may be configured according to the permissions of the service connection, and/or may be utilized as responses to off-nominal operation (e.g., a service connection may be authorized for full service discovery, but a failure of service discovery occurs, the centralized controller may provide the partially dynamic connection as a fall-back operation, and may further provide the static connection as a fall-back operation if the publication/subscription data retrieval fails).

An example centralized controller operates an SOA manager as a pre-defined service provider that all end points can rely upon (e.g., consistent network address, etc.). Dynamic operations are managed through storage of configuration information including the policy information. In response to off-nominal conditions, such as where the SOA manager determines an error is present (e.g., an end point appears to be moved, missing, or intermittently available), the SOA manager queries configuration information and service connection states to recover.

An example centralized controller performs security operations for service connections, such as requiring identification certificates from service end points before allowing the service connection to be exercised. An example centralized controller operates a security engine having stored information defining the generation, storage, and verification of certificates. The example SOA manager grants or blocks a service connection, and/or specific operations on a service connection, based on the policy, configuration information, and permissions associated with the service end point. The policy information can be updated dynamically.

An example centralized controller includes the SOA manager operating extensions on top of a selected API, such as an ARA::COM module, and further operates as a service provider. The SOA manager configures, controls, and monitors service-oriented communications in vehicle, based on the policy information and configuration information. An example centralized controller further includes an SOA plugin SDK, including a library to be used by any application participating in SOA communication, where the library functions communicate with the SOA manager to determine control information, enforce control, and report status and activities to the SOA manager. The example SOA plugin SDK further includes a tool to modify generated client proxy and server skeleton code to support dynamic configuration of service parameters.

Referencing FIG. 13, an example system schematically depicts the centralized controller (ECU), an SOA manager, SOA plugins, and communication between vehicle controllers (e.g., ECU, ADAS) and external devices (e.g., cloud). End points depicted (e.g., ECU, ADA) are shown as a client or server application for purposes of the description. It will be understood that a given application may be a client, a server, or both depending upon the service, vehicle operating conditions, and the like. The "IVN" is the in-vehicle network layer, and may be a physical layer (e.g., a number of physical end point connections and network hardware), a logical layer (e.g., ports or virtual ports of an Ethernet network), or combinations of these. It will be understood that the IVN may encompass a mixed network, for example an Ethernet network and a CAN network, where one or more networks may interface with the SOA Manager utilizing a configurable edge gateway or other interfacing device.

An example centralized controller includes an AUTOSAR adaptive communication management module (e.g., including IPC, SOMEIP, and/or other protocol binding), the SOA manager integrated with an ARA:: COM module, and an SOA Plugin library and code generation tool.

An example centralized controller includes an SOA manager provided in a controller of the vehicle, where the SOA manager runs on top of a separate ARA::COM module, and the SOA Plugin library and code generation tool.

Examples of the present disclosure provide for the ability to provide frequent feature upgrades, addition or removal of features, and a personalized configuration of features for a mobile application. An example embodiment enables customized vehicle behavior by providing a simple, flexible, automation capability. An example embodiment includes an interface and integration tools allowing developers and users to quickly and easily create custom workflows that manipulate vehicle features based on user input and vehicle state.

Example embodiments allow users to create custom trigger-action rules to automate the vehicle environment, and to allow in-vehicle capabilities that were not previously available. For example, embodiments herein include customer control of cabin temperature, lighting, infotainment, seats, windows, sunroof, cabriolet top, driving mode, and/or adjustment of any other actuator or vehicle interface in response to voice commands, smart phone inputs, buttons in the vehicle, and/or detected vehicle operating conditions or events.

An example system includes a centralized controller having an automation manager that determines a customized operation including a trigger-action (e.g., a voice command; an operator input value such as from an application, personal device, vehicle operator input, and/or vehicle display input; vehicle operating condition; detected event; and/or combinations of these). The example automation manager monitors vehicle conditions to determine if the trigger-action has occurred, and commands the customized operation in response to the trigger-action occurrence. In certain embodiments, the automation manager may limit implementation of the customized operation in response to vehicle conditions (e.g., an "open door" command that opens the driver door may include a condition such as zero vehicle speed, which may be implemented by the user providing the customized operation or otherwise enforced elsewhere in the system). In certain embodiments, interactions with certain actuators (e.g., a direct vehicle start command) may be disallowed and/or require additional authorization or permission. In certain embodiments, interactions with certain actuators (e.g., the vehicle start command) may embody a request to an application or flow of the vehicle, rather than a direct command of the implementing actuator (e.g., where the vehicle has an automated starting function available on the vehicle, whereby the customized operation requests implementation of the automated starting function, rather than providing a direct command to the starter of the vehicle), which may have permissions that are distinct from permissions associated with the direct command of the underlying actuators. In certain embodiments, customized operation data are stored in a memory storage on the system, such as with configuration information. In certain embodiments, the automation manager limits configuration of the customized operation based on permissions and/or authorizations of the configuring entity (e.g., owner, operator, manufacturer, $3^{rd}$ party application provider, etc.), and/or according to permissions associated with data elements accessed and/or actuators commanded as a part of the customized operation.

Example operations are described following to illustrate a few operations of a type supportable by embodiments of the present disclosure. The example operations are non-limiting, and an example automation manager is capable to respond to any input capable of being provided as a network communication and/or data parameter stored on a computer readable medium, and to provide any response capable of being commanded to any actuator in the system, including actuators under the control of another controller in the system (e.g., a vehicle display, system speakers, vehicle powertrain, etc.).

An example customized operation includes an operation to set the passenger's seat heating in response to a driver tapping a driver's seat heating switch twice and setting the passenger's seat heating. The example operation returns the driver's seat heating switch to control of the driver's side heating after a brief delay (e.g., a few seconds). The example operation allows the driver to conveniently set the passenger seat heating from the driver's side of the vehicle.

An example customized operation includes an operation to configure a number of vehicle aspects in response to a command, such as "Hey car, start my morning commute." In the example, configured vehicle aspects may include tuning the radio to a selected station and volume, setting a preselected navigation destination (e.g., an office), setting the performance mode of the vehicle (e.g., fuel economy mode), setting the driver's seat position (e.g., forward/reverse, height, tilt, lumbar support, etc.), and/or setting HVAC parameters (e.g., selected cabin temperature). In certain embodiments, a customized operation may include further interactions based on ambient or external conditions, such as utilizing a different radio station depending upon the day of the week, adjusting HVAC settings based on ambient temperature, adjusting navigation according to a number of people in the vehicle, and the like.

An example customized operation includes an operation to configure a number of vehicle aspects in response to a system condition, such as an approach of the vehicle to the driver's home at night. In the example, the customized operation implements a workflow that dims the headlights, lowers the radio volume, sends a message to a home automation system to turn on lights and open the garage door, and retracts the side mirrors as the car pulls into the garage. In certain embodiments, the approach of the vehicle to the driver's home at night may be determined by any operations, such as determining from GPS coordinates, direct interaction with a network of the home automation system, etc.

An example customized operation includes an operation to configure a number of vehicle aspects in response to an input, such as a hard coded button on a vehicle display. An example includes setting an HVAC system of the vehicle to a desired temperature in response to the hard coded button, without having to navigate a climate control system, utilize multiple button presses, and/or turn related knobs where visibility may be lacking (e.g., the vehicle is dark) and/or the driver does not want to utilize attention to find and focus on the related knobs.

An example automation manager (or vehicle automation manager) allows users to create arbitrary trigger-action rules which can be executed on the vehicle, such as by the centralized controller. For instance, the user could create a trigger-action rule that would automatically turn on the high-beam headlights when there is no oncoming traffic while driving at night. An example schematic flow description of the customized operation includes:

The user accesses an app on her phone or web browser and uses it to create custom trigger-action rules, or enable predefined ones created by the OEM;

The trigger-action rules are sent to the cloud, and the enabled trigger-action rules are consolidated as a "recipe" on the cloud side;

The cloud pushes the recipe to the vehicle through the vehicle update controller (VUC) (e.g., storing configuration information related to customized operations);

When the trigger evaluation engine receives the latest recipe, it analyzes each rule in the recipe and executes each rule in a controlled and isolated manner;

Accounting data (such as the number of times a trigger-action rule has been executed, trigger event detections, trigger event data, and/or events where the action is triggered but suppressed based on operating conditions, etc.) is sent back to the cloud, where it can be further reviewed, e.g., from the phone app and/or other monitoring application.

It can be seen that the vehicle automation manager allows users to enrich their vehicle experience without waiting for a feature request, approval, and update process. The example vehicle automation manager further allows the user to leverage their own creativity and/or the creativity of $3^{rd}$ party application providers to implement improved vehicle interactions. Additionally, the vehicle brand owner (e.g., manufacturer or OEM) or other supporting or responsible party can implement trigger-action rules to more rapidly and/or more frequently provide updates or features to many users, or even to specific users.

An example Vehicle Automation Manager (VAM) takes recipes from the cloud as inputs and executes the trigger-action rules in the recipes. Each trigger-action rule is composed of triggers, conditions, and actions. The triggers are the inputs to the rule that encompass signals from the CAN bus, time, location, diagnostic states, vehicle status, video/audio, driving log, etc. Conditions take trigger input values and decide if certain conditions are met.

The conditions are described using a custom syntax, in order to express complex logical conditions, such as multi-level AND/OR logic, comparators, and advanced utility functions to calculate sum/mean/stddev etc. If the conditions are met, then the corresponding actions will be executed, and/or requested (but may be blocked due to operating conditions, etc.). The actions could include calling services in the SOA or sending CAN signals to the CAN ECUs.

Figure 14:
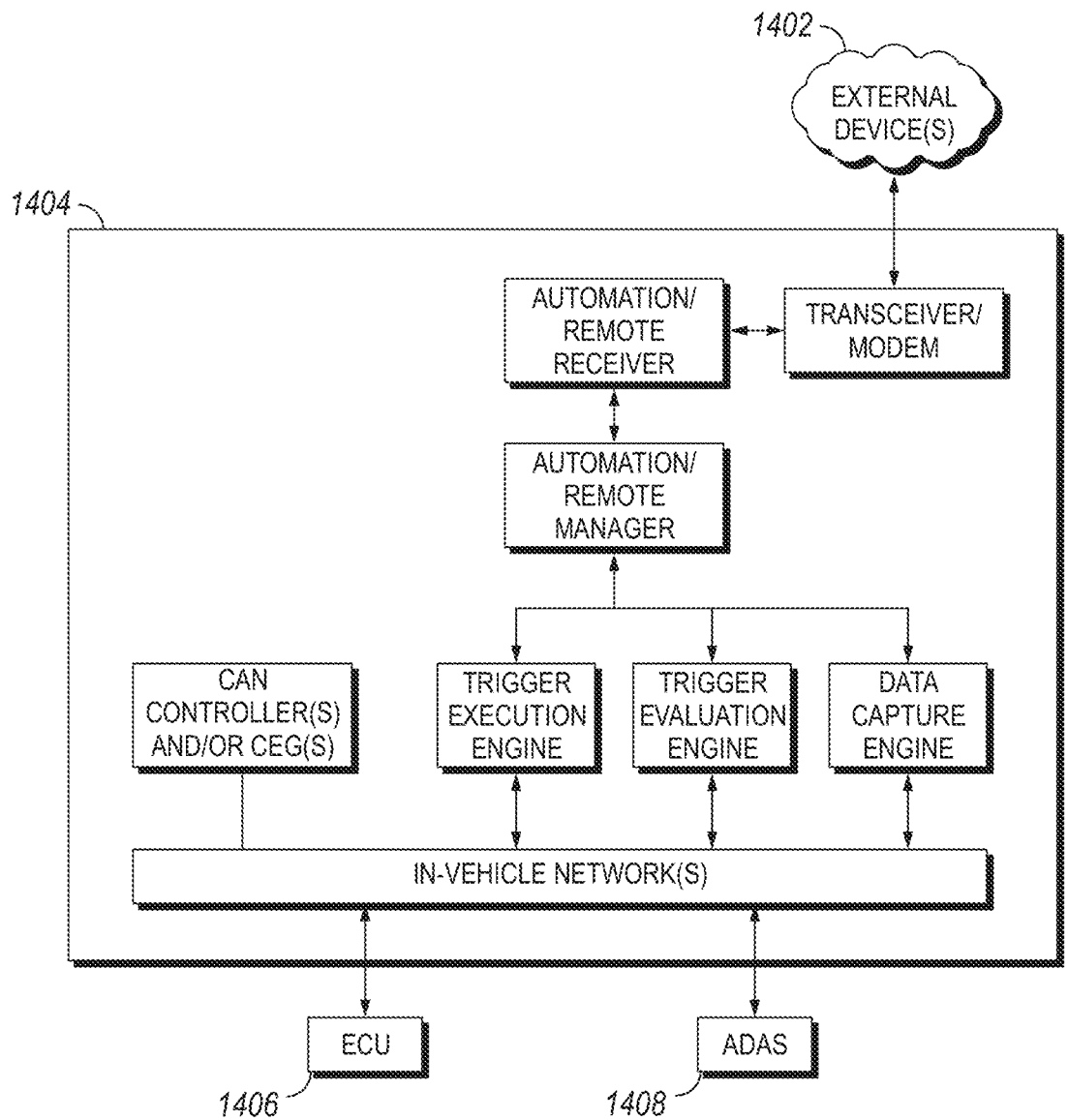
FIG. 14 is a schematic diagram of an example automation manager according to certain embodiments of the present disclosure.

Referencing FIG. 14, an example automation manager is schematically depicted, and positioned on a centralized controller. In the example of FIG. 14, the VUC receives recipes (and/or configuration information describing a customized operation) from the cloud using MQTT/HTTP/WebSocket, etc. The VAM controls the vehicle automation based on the recipes, and includes a lexical engine to parse the recipes, and a rule engine to orchestrate the rule execution by leveraging a trigger evaluation engine and a task execution engine (and/or a trigger execution engine). Operations of the automation manager such as in FIG. 14 may include vehicle automation operations, event trigger operations, remote control operations, and/or any configurable operations performed in response to an application, feature, trigger, or other automated application created by a manufacturer, OEM, fleet owner, vehicle owner, vehicle operator, and/or a third party.

An example trigger evaluation engine takes triggers as inputs and evaluates the trigger conditions based on the trigger values. The trigger values can come from any network, such as a CAN bus, for example using a configurable edge gateway to adjust the routing table to retrieve the signal values dynamically. In addition, the values could also come from other Ethernet ECUs through a SOA, from other modules on the centralized controller (e.g., Diagnostic Server), or raw video/RADAR/LiDAR streams over Ethernet. The centralized controller may further share the data collection performed for customized operations with other aspects of the system, such as data collection operations for other purposes, and/or between multiple customized operations utilizing at least some of the same trigger data parameters, thereby reducing redundant requests for the same data parameters. In certain embodiments, data collection may be a separate operation that may additionally be based on a trigger condition, and/or data collection may be performed as a customized operation.

In the example of FIG. 14, the trigger manager (e.g., as the automation/remote manager in the example of FIG. 14) manages triggers from various trigger related clients, such as vehicle automation, remote control, and/or data collection triggered flows. The example in FIG. 14 further includes a data listener that receives data related to the triggers, which may be taken from any location in the vehicle, such as: a CAN bus; Ethernet packets (including EthCC packets having state information such as vehicle location); a diagnostic manager providing DET errors, RDBI data, fault codes, etc.; a system manager (e.g., providing vehicle power state information); a time manager (e.g., providing a current time value); and/or any other information such as from the SOA.

In the example of FIG. 14, the data cache stores the data for condition evaluation, for example including buffered data, intermediate parameters, etc.

In the example of FIG. 14, the condition evaluation runtime is an engine to evaluate the conditions based on the trigger values in the cache, and to determine whether the trigger condition is met in response to the evaluation. The condition evaluation supports any type of analysis or determination operations, including at least: basic logical operators (e.g., AND, OR, numerical comparisons, etc.); nested logical expressions with appropriate formatting (e.g., ((X>5 && Y<10)||Z!=100) && P<0.05); math functions (e.g., arithmetic, exponential, trigonometric, modular, gamma, etc.); and/or complex data transformation functions over a range of data (e.g., median; mean; standard deviation; map; reduce; min/max; bucketing; filtering; integrating; derivating; and/or frequency analysis operations).

In the example of FIG. 14, the task execution engine performs actions defined in the action catalog (e.g., the actuators to be adjusted according to the customized operation). Example and non-limiting actions include turning on alight, turning on and/or adjusting the HVAC, turning on the ignition, etc. Embodiments of the present disclosure are capable to access any actuator that is reachable through any network, including actuators provided on more than one network (e.g., an Ethernet for one actuator, and a CAN for the other actuator). In certain embodiments, actions include a request for operation of an actuator (e.g., to another controller having direct control of the actuator), actions to request a published service be performed, and/or actions having complex interactions which may further be present on more than one other controller. For example, an action includes adjusting the ambient environment for the current user, which may include interacting with multiple controllers and/or flows, for example to determine a current user identity, her preferences, and adjusting the environment such as seat position, HVAC settings, radio channels, etc.

In certain embodiments, the automation manager advertises one or more customized operations as a service (e.g., which may be selectable by the requestor of the customized operation, defined in a policy, etc.). In certain embodiments, components, circuits, controllers, and/or engines of the automation manager are shared in whole or part with other managers such as a remote control manager, and/or may be responsive to other managers using an API, library calls, or other interaction interface, for example to determine whether a specified group of data and trigger logic (e.g., passed from the other manager to the automation manager) indicates that a trigger event has occurred (e.g., determined by the condition evaluation runtime), and/or to implement an operation provided by another manager (e.g., passed as an operation request from the other manager to the automation manager) to be implemented (e.g., operated by the task execution engine to move the actuator and/or provide appropriate commands to other controllers).

Implementations of the present disclosure provide for rapid development and deployment of customizable operations, automation implementation without coding and/or compilation requirements, access to customization for customers, $3^{rd}$ party applications, aftermarket suppliers, etc. Implementations of the present disclosure provide for ease of implementation of customizable operations even where data providers and/or actuators are distributed across more than one network type, and do not require that providers for customizable operations have knowledge of the present configuration of on vehicle networks.

Examples of the present disclosure provide for the ability to perform remote control operations for a mobile application. Remote control operations for certain features may be hard-coded in the ECU software—for example simple operations such as start/stop operations of the engine, lock/unlock operations of the doors, open/close operations of the windows and/or sunroof, etc. However, adding or changing functionality after production is complete for such features requires code changes and verification, which may include re-qualification of one or more ECUs, and/or software builds on those ECUs, that participate in remote functions. Embodiments of the present disclosure are capable to configure remote control operations of a mobile application at any point in the life cycle of the vehicle, and further allow for configuration, updating, and fixing of remote operations included at the time of manufacture. Additionally or alternatively, where a more robust remote control implementation is present such as set forth in the present disclosure, features that would previously be hard-coded may be implemented as a dynamic feature as set forth herein.

An example system for performing remote control and configuration operations includes operating a control portion of the mobile application in a powered mode during a shutdown vehicle operating condition. In certain embodiments, a controller to perform remote control operations includes granular power control of the centralized controller and/or other ECUs on the vehicle, keeping only those controllers powered that are required to perform remote control operations, and providing for operation of those controllers and related hardware components (e.g., board, chip, core, voltage, clock, etc.) in a low power state that is capable to receive remote control commands and configuration requests. In certain embodiments, a remote control manager powers determines that a vehicle shutdown operation is active, and keeps aspects of the vehicle's hardware powered that are responsive to a remote control command and/or configuration request. In certain embodiments, the remote control manager powers down controllers and hardware that are not needed for remote control command and/or configuration requests in response to the vehicle shutdown operation. The example remote control manager receives a remote control operation and/or configuration request, and wakes up any controllers or hardware required to perform the requested functions, and then returns the vehicle controllers or hardware to a low power state.

Example operations of the remote control manager to perform a vehicle shutdown operation include:

Turn off all controllers, except an ECU configured to perform remote control functions, and a cellular modem;

Stop all applications and processes in the ECU, except those required to perform remote control functions;

Shut down all but one core of the ECU, and lower the ECU clock frequency, e.g., to a minimum allowed Determine if any of the following are running, otherwise initiate one of the following (the cloud support, combined with functional and performance tests will inform which one of these is best for a particular application):

a long polling request;

a server sent event request;

a WebSocket request; or a HTTP/2 server push request

Place the cellular modem into a low-power mode, consistent with being capable to receive a message from the server Example operations of the remote control manager in response to a received remote control request include:

Process the message request, and based on the request, perform one or more of:

Place the cellular modem into a normal power mode;

Increase the clock frequency of the ECU to a normal level (and/or to a sufficient level to acceptably perform the remote control operations, which may be a lower clock frequency than required for normal vehicle operation);

Activate all cores (and/or a selected subset of cores) of the ECU;

Start applications (e.g., controllers, circuits, etc.) needed to execute the request (e.g., trigger evaluation engine, task execution engine)

Turn on controllers sufficient to provide control operations to service the remote control request (e.g., an Ethernet switch, configurable edge gateway, etc.), including actuator controllers, other ECUs, etc.

Execute the remote control request

Upon completion of the remote control request, which may include feedback about the operation to service the remote control request (e.g., acknowledgement, success indicator, fault value, etc.), the example remote control manager returns the vehicle to the vehicle's state when the request was received, or to another vehicle state as specified in the request.

An example remote control manager monitors the battery level. In response to the battery charge condition falling below a threshold value, the remote control manager can perform actions according to a policy and/or configuration information. For example, the remote control manager may wake up the ECU and the cellular modem, and send a message to an external device (e.g., a cloud, web application, user device such as a smart phone, etc.) to alert the user to the condition. In certain embodiments, depending on the policy, the remote control manager may start a prime mover of the vehicle, and charge the battery to a second threshold value (e.g., higher than the first threshold value by a selected amount, and/or a fully charged condition). In certain embodiments, the remote control manager shuts down the vehicle and disables remote control support in response to the battery charge falling to the first threshold value or another charge value (e.g., lower than the first threshold value). In certain embodiments, the user is prompted and/or can request that the vehicle be started to recharge the battery, for example in response to the message sent when the battery charge condition falls below the first threshold value. In certain embodiments, depending upon a policy and/or a user input, the remote control manager keeps the remote feature active below the first threshold value.

An example system includes a centralized controller having a remote control manager that determines a remote control operation including a command value (e.g., activating a customized response, and/or from a user selecting a configured response from an application) that requests operation of the remote control function. The example remote control manager activates required controllers to execute the remote control function, and performs the function in response to the command. In certain embodiments, the remote control manager accesses a trigger evaluation engine and a task execution engine (e.g., as a part of a vehicle automation component of the vehicle, such as represented in FIG. 14) to determine that the vehicle condition is consistent with performing the operation (e.g., no obstructions in a window or door to be closed, no persons in close proximity to the vehicle before starting, etc.) and/or to perform the functions to be performed as the remote control operation. In certain embodiments, the remote control manager includes or accesses a trigger evaluation engine and/or task execution engine that is separate from other components of the system. The remote control manager thereby performs the remote control operation, and/or determines that all or a portion of the remote control operation cannot be performed, or is not going to be performed. Customized remote control operations may be prepared as a part of a policy and/or in configuration information, similar to customized operations described preceding. In certain embodiments, the remote control manager may limit implementation of the remote control operations in response to vehicle conditions. In certain embodiments, interactions with certain actuators may be disallowed and/or require additional authorization or permission. In certain embodiments, interactions with certain actuators (e.g., the vehicle start command) may embody a request to an application or flow of the vehicle, rather than a direct command of the implementing actuator (e.g., where the vehicle has an automated starting function available on the vehicle, whereby the customized operation requests implementation of the automated starting function, rather than providing a direct command to the starter of the vehicle), which may have permissions that are distinct from permissions associated with the direct command of the underlying actuators.

In certain embodiments, customized remote control operation data are stored in a memory storage on the system, such as with configuration information and/or as a part of a policy. In certain embodiments, the automation manager limits configuration of the customized operation based on permissions and/or authorizations of the configuring entity (e.g., owner, operator, manufacturer, $3^{rd}$ party application provider, etc.), and/or according to permissions associated with data elements accessed and/or actuators commanded as a part of the customized operation.

Example operations are described following to illustrate a few remote control operations of a type supportable by embodiments of the present disclosure. The example operations are non-limiting, and an example remote control manager is capable to respond to any input capable of being provided as a network communication and/or data parameter stored on a computer readable medium, and to provide any response capable of being commanded to any actuator in the system, including actuators under the control of another controller in the system (e.g., a vehicle display, system speakers, vehicle powertrain, etc.).

An example operation includes receiving a customer configuration of a scheduled acclimatization, where remote control operations include activating the HVAC system at a scheduled time (e.g., 7 AM) on selected days (e.g., weekdays), to a selected condition (e.g., a selected temperature, and/or utilization of defrost to ensure the windows are clear). In certain embodiments, the customer may configure the operation using an application (e.g., a $3^{rd}$ party application), using a cloud or web-based interface, and/or using an application provided by a manufacturer, dealer, etc. In certain embodiments, an operator selects a recipe for a remote control operation (e.g., which may include prompts to set certain parameters, and/or may be only an instruction or approval to turn a feature on or off). In certain embodiments, an operator builds a customized remote control operation, which may, for example, be based upon customized operation features present on the vehicle, available in a recipe, and/or may be built entirely by the user interacting with an interface to allow the entry of operations to be performed, any conditions to be applied, and settings for any thresholds, etc.

An example operation includes an EV reactive grid compensation mode, whereby an electric vehicle is electrically coupled to a grid, and whereby an electric provider utilizes a bidirectional charger of the vehicle (e.g., to level out power demand spikes). In certain embodiments, the EV reactive grid compensation mode may include scheduling (e.g., time of day, charge target of the vehicle, days of the week, associated pairs of these, etc.) and/or may be toggled on or off (e.g., turning the feature on for an extended period when the operator goes on vacation).

An example operation includes the remote control manager responding to a progressive preconditioning command to heat the cabin of the vehicle in a selected order, such as using the HVAC to get cabin air to a desired temperature, then activating a heated steering wheel and/or heated seat function.

An example operation includes the remote control manager responding to a user setting request, and adjusting the vehicle configuration (e.g., steering column position, ambient light color, interior/dash light brightness, UI/UX style selection, etc.) in response to the user setting request.

An example operation includes a vehicle management setting (e.g., a valet mode, borrowed vehicle mode, configured mode for a child of the parent owner when driving the vehicle, etc.), for example to reduce a vehicle speed limit, a location limit (e.g., a geofence perimeter of 500 m from an activation location, limits with defined areas such as a city limit, and/or outside of defined areas such as a state line, another city limit, a total distance from an activation location, etc.). The applied limits for the vehicle management setting may be an actual applied limit (e.g., a maximum speed, performance value, etc.) or a notification limit (e.g., typically a geographic restriction may be implemented as a notification limit rather than a shutdown limit), where a notification is sent to the owner and/or to a selected device if a limit of the vehicle management setting is exceeded (and/or tested, such as with an actual applied limit).

An example operation includes a security mode, for example requesting data from a camera, microphone, vehicle display, dashboard, etc., in response to a request for the security mode. In certain embodiments, the user can select one or more devices (e.g., specific cameras and/or locations within or relative to the vehicle), and can receive streaming video and/or a snapshot from the selected device(s). In certain embodiments, the security mode allows for a data request from a device communicatively coupled to the vehicle, for example a security camera of a home security system in communication with the vehicle (e.g., see customized operations preceding).

An example operation includes a personalized operation, such as playing "Happy Birthday to You" and/or manipulating cabin lights upon the driver entering the vehicle on her birthday. Additionally or alternatively, a personalized operation can be any type of operation such as: playing a selected song or play list on a given calendar date, day of the week, etc.; reminding an operator of a calendar event (e.g., linking to a calendar function of a smart phone, etc.), an anniversary, etc. upon entry to the vehicle; and/or reminding an operator of a scheduled stop (e.g., picking up groceries upon entering the vehicle to return home from work).

Example and non-limiting remote control operations allow for determination of complex conditions (e.g., utilizing CAN data, location, time, date, etc.), either in determining conditions for executing a remote control operation, and/or in performing the remote control operation. Example and non-limiting remote control operations include a scheduled sequence of a number of operations, including determining conditions when a first scheduled operation is completed and a next operation should be performed.

Example and non-limiting remote control operations include performing one or more operations, such as: sending a note to the operator, showing the note on a vehicle display, and/or announcing the note on a speaker; taking a snapshot from one or more cameras and sending it to an operator and/or requestor; allowing a $3^{rd}$ party service (e.g., mobile re-fueling, vehicle service, and/or delivery company) to access vehicle location and door status, but only under specified conditions (e.g., selected times of the day, until the completion of an event, and/or in response to a proximity of the $3^{rd}$ party service to the vehicle); beginning start-up operations of the vehicle, a controller, the head unit, etc., as an operator approaches; reacting to environmental changes by defrosting the vehicle (e.g., in response to frost build-up, ambient temperature determination, etc.); and/or running a scheduled test for diagnostic purposes (e.g., running an active diagnostic test when the operator is away from the vehicle, reducing impact of the test on the vehicle mission).

Example remote control operations include a prerequisite condition, a task, and/or a status report. The prerequisite condition includes any combination of vehicle status, CAN signals, Ethernet packets, information stored on a computer readable medium (e.g., log information, trip information, and/or other vehicle information stored in a memory location), time and/or date, location, etc. to be utilized as a prerequisite trigger condition for the remote operation, and can further be configured as a complex logical expression and may further be based on a number of conditions. The task includes an action that can be performed utilizing a CAN signal, Ethernet packet, or other network communication, including at least any action described under customized operation preceding. The status report includes acknowledgement information, confirmation that an operation was performed and/or notification that an operation was not performed, related data, confirming data, utilization data related to the remote control operation, etc. The content of the status report may vary with the recipient and/or requestor of the status report—for example the operator may receive a simple status report confirming the operation, a service personnel may receive a more detailed status report with associated parameters related to the operation, and a manufacturer may receive a detailed status report with personally identifiable information removed (e.g., to compile reliability data, while allowing for storage and aggregation of the data without having to manage personally identifiable information). The presence and/or content of the prerequisite condition, task, and/or status report may be provided and/or updated by user input, policy, and/or configuration information.

An example remote control solution supports combinations of different elements of a remote control request, for example as reflected in the example code snippet for a request:

```
If (preCondition1 is true) {
    do(Task1);
    report(Status1);
If (preCondition2 is true) {
    do(Task2);
    report(Status2);
do(Task3);
report(Status3);
......
```

An example remote control solution supports the specification of a final vehicle state (to which the vehicle should return) after all the remote control functions are completed (e.g., an operating condition, interior cabin settings, a battery state of charge, etc.). This vehicle state can be different than the vehicle state when the request was received. It is also configurable and programmable, similar to the task.

Again referencing FIG. 14, an example remote control manager is schematically depicted, being a part of a centralized controller in the example, although the remote control manager may be a distinct device, and/or positioned on another device. The interface to the CAN controller may be performed through a configurable edge gateway. In the example, the task execution engine and trigger evaluation engine is depicted as separate and dedicated to the remote control manager, solely for clarity of the present description. The task execution engine and/or trigger evaluation engine may be positioned, in whole or part, with another device or controller such as an automation manager, shared between the remote control manager and the automation manager, and/or each of the remote control manager and automation manager (where present) may have separate trigger evaluation engine(s) and/or task execution engine(s).

An example system includes a unified intrusion detection system (IDS) manager structured to provide for unified vehicle side security of data, operational control, and network access. The unified IDS manager may further include detection of cloud side or external vehicle access as set forth herein. As more cars are connected, and more applications and services can legitimately access the vehicle, the attack surface increases. "Bad actors" are increasingly turning their attention to hacking into vehicle infrastructure because they perceive opportunities to steal personal information or intellectual property, extort money using ransomware, disrupt vehicle operation, or worse.

Network firewalls are a basic requirement for network security. Layer 5-7 "proxy" firewalls add a higher level of protection, but still are insufficient to protect against sophisticated attacks. Intrusion Detection Systems can identify suspicious behavior that appears to be authentic activity by trusted entities. However, using multiple IDS solutions from different vendors for different parts of the network makes it difficult to provide consistent and complete security across the system. A single, Unified IDS solution is the most effective, because it has full visibility of all internal, inbound, and outbound traffic, so it can inspect data flows throughout the system and correlate seemingly unrelated events. In a vehicle, this includes monitoring various network traffic, such as CAN, Ethernet, and Wi-Fi traffic, as well as traffic through the cellular modem.

OEMs benefit from reinforced security features, faster reaction times to intrusions, and higher loyalty from their customers. Customers benefit from more secure vehicles and personal data protection.

Example operations are described following to illustrate a few operations of a type supportable by embodiments of the present disclosure. The example operations are non-limiting, and an example unified IDS manager is capable to detect intrusive operations accessing or attempting to access a network according to any aspect of the disclosure herein.

An example unified IDS manager monitors DNS, HTTP, and HTTPS accesses from any end point in the vehicle, allowing for detection of an ECU in the vehicle that has been infected with ransomware and/or spyware, where the ECU begins downloading malicious software packets and/or uploading private or proprietary data via a secure connection to an outside server. In the example, maintaining traffic visibility to the unified IDS manager (such as through a centralized controller) allows for rapid detection of the issue, and blocking of the communication with the external rogue server.

An example unified IDS manager allows for an urgent software update to an ECU, for example to patch a vulnerability that is discovered by an investigator, $3^{rd}$ party, and/or observed during operation. The unified IDS manager further allows for communications from the vulnerable ECU to be monitored, blocking or mitigating the vulnerability until it is corrected. In the example, the vulnerability may be discovered on a mission-critical ECU, or on another ECU of the vehicle, where the vulnerability could be exploited to gain access to a mission-critical ECU. In the example, the central management of the network communications allows for superior mitigation operations to the vulnerability, rapid implementation of updates to a single location (e.g., a centralized controller), and configuration files, policy information, certificate information, and the like may be stored outside of the base operating system, allowing for many updates to be performed without requiring substantial downtime to implement an update and/or validation or re-certification of ECUs that may otherwise require such if the primary software build is otherwise required to be updated.

An example unified IDS manager detects incoming communications requesting vehicle propulsion system access (e.g., from a bad actor over a cellular network), which may be on a CAN bus. An example unified IDS manager detects the attack, prevents the requested access to the CAN bus, and/or provides an alert to a customer and/or monitoring service.

An example unified IDS manager has configurable detection information, such as communication request counts or the like, where the configurable detection information is stored as configuration information apart from base operations of the unified IDS manager. Accordingly, detection parameters of the unified IDS manager can be updated dynamically and without extended downtime for implementation, allowing for rapid and convenient adjustment of detection thresholds (e.g., reducing thresholds to increase sensitivity, and/or increasing thresholds to reduce false positive detections).

From a technological perspective, a centralized intrusion detection system, where signals/packets and messages are analyzed and processed at the same location, is fundamental for the early detection of potential attack vectors and the creation of a safer and secure vehicle environment.

An example unified IDS manager provides mechanisms and policies to inspect traffic that is internal to the vehicle, and also traffic entering and exiting the vehicle. The internal traffic consists of in-vehicle Ethernet data and CAN data.

Internal Traffic Inspection:
Detect malfunctioning, modified, and/or malicious ECUs.
Detect anomalies in vehicle functioning and provide context.

External Traffic Inspection:
Examine outgoing and incoming traffic, and detect any protocols that are not configured.
Examine outgoing and incoming traffic protocols, such as DNS and HTTP, to identify user behavior and to detect any suspicious activity, policy violations, and so on.
Examine HTTPS headers for domain access and certificate violations.

An example unified IDS manager uses Protocol Analysis, Signature-based and Anomaly-based techniques, to detect intrusions. Unified IDS will have the ability to send out alerts securely based on the configuration. The alerts can be used to take further action, such as terminating connections or notifying the relevant users or services. It can also log the anomalies and the logs can be used for further analysis.

Figure 15:
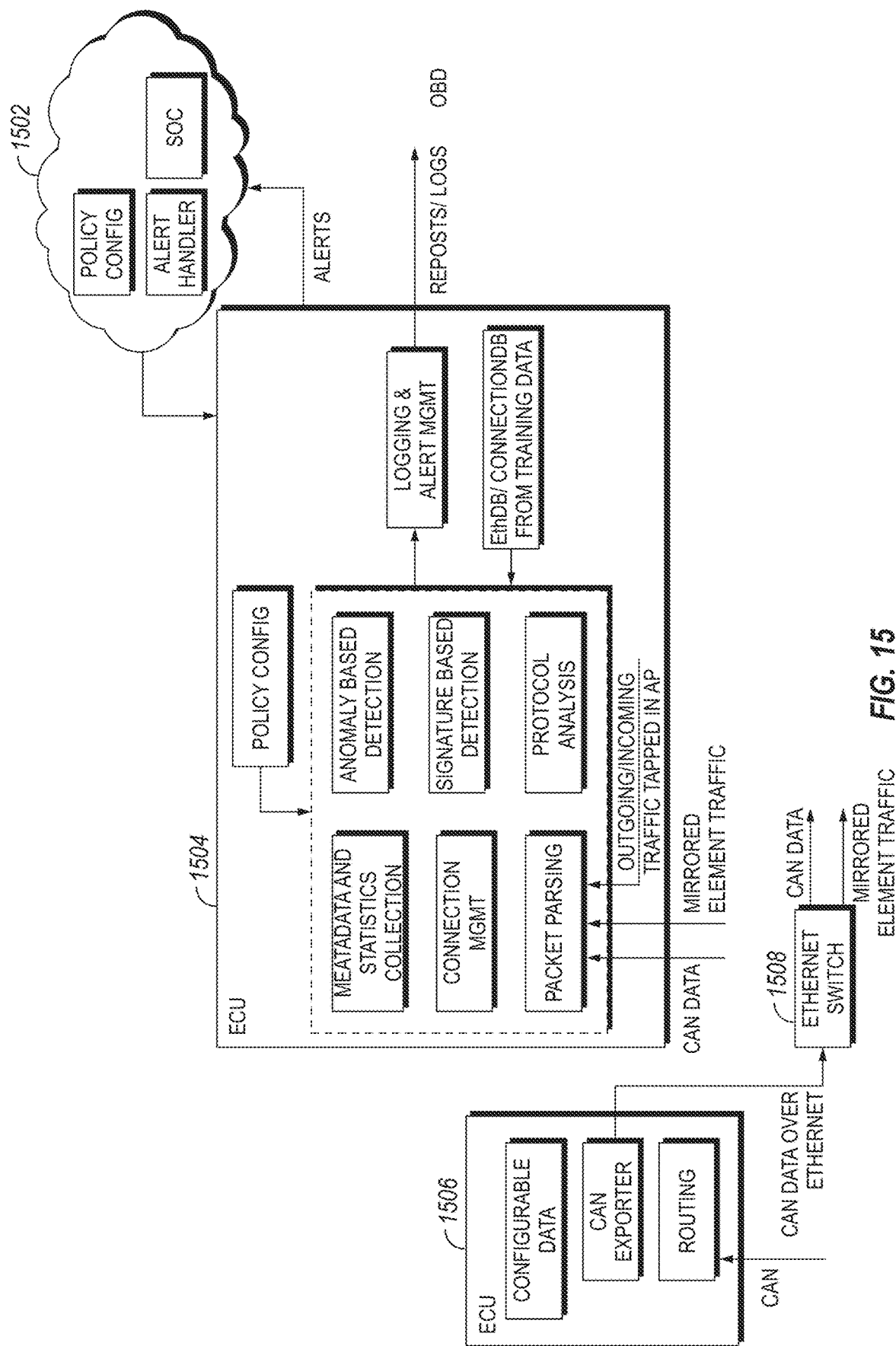
FIG. 15 is a schematic diagram of an example implementation for a unified IDS manager (ECU) according to certain embodiments of the present disclosure.

Referencing FIG. 15, an example implementation for a unified IDS manager (ECU) is schematically depicted. A unified IDS manager may be operated on any type of network traffic, including at least Ethernet traffic, CAN data, and/or external traffic. In the example, a configurable edge gateway provides CAN traffic to a port of the Ethernet network, for example as encapsulated CAN messages, which may include processed payload data, added frame data (e.g., time stamps or other metadata), with CAN frame data included or removed, and/or with processed CAN frame data. In certain embodiments, the CAN exporter provides compressed metadata to the unified IDS manager to save bandwidth.

An example unified IDS manager parses the three types of traffic (e.g., at Packet Parsing block). The example Packet Parsing block includes parsers for Ethernet, IP, ARP, ICMP, TCP, UDP, HTTP, HTTPS, DNS, CAN, and EthXX protocols. Any protocol may be supported as needed. The example unified IDS manager includes a Protocol Analysis block that checks for protocol errors and flags violations. A protocol violation could be caused by a misconfigured or malicious ECU, and this is an efficient way to detect intrusions, if they can be detected in this block. An example of a violation that can be detected using protocol analysis is invalid TCP flag combinations resulting from port scanning applications running on an ECU.

An example unified IDS manager includes a Connection Management block that analyzes security vulnerabilities at the connection level. The definition of 'connection' depends on the protocol being considered. The Connection Management maintains various connection associations, such as:

Ethernet/VLAN (Source MAC, Destination MAC, and VLAN ID)
IP (Source, Destination Addresses, and Protocol)
TCP/UDP (Source, Destination Addresses, Source Port, Destination Port, and Protocol)

A connection database is maintained to track all connections. The Metadata and Statistics Collection performs analysis and updates the connection database. Whenever a new connection is detected, it is added to the connection database, and the packet statistics are updated. For all subsequent packets of a given connection, the stats are just updated. Any metadata that is extracted from the packet is also added to the connection database. For example, the state of a TCP connection is the metadata maintained in the connection database for the TCP connection. TCP reassembly, if needed, is done as part of this block.

The Signature Based Detection block performs signature-based detection checks for known attacks by examining the data using known signatures or rules for the known attacks. The rules are run on a per-packet basis and are also run at the connection level. For example, a DNS packet larger than 512 bytes would be a violation. The signatures are configured or optimized for vehicular traffic and are designed for targeted detection of attacks pertinent to the vehicles. They will have a low memory footprint.

The Anomaly Based Detection block operates on communications whenever well-defined rules are not available, and/or as a rationality check, and is mainly used for unknown violations. A baseline of the traffic is maintained using the traffic patterns (either learned from the data or using ethDB) and any deviation from the baseline triggers a violation. A feedback scheme is used to learn from the detections and to decrease the number of false positives.

The Logging and Alert Management block logs events that are detected. Some of the events will result in alerts, depending on the severity and/or frequency of the event. Example alerts include selected information about the event, such as:

Timestamp
ID
Severity level
Protocol—CAN/Ethernet/IP/TCP/UDP/EthCC
Protocol Specific ID
Data
A complete log of all the events in the system is maintained in nonvolatile memory, which may be sent to the cloud, a service tool, and/or to the OBD port upon demand. The logs are sent via secure HTTPS.

The unified IDS manager provides configuration service so that a remote client can control the IDS feature. Example configuration options include:
Activate or deactivate IDS functionality
Configure severity of various events to generate alerts to be sent to a remote collector
Configure rules for signature-based IDS
Inclusion or exclusion of certain datasets in intrusion detection Aspects of the unified IDS manager may be implemented externally, such as in a cloud application, and/or a cloud application or other external application may selectively communicate with the unified IDS manager to support one or more features, such as:
Manage the IDS policy in a given vehicle
Collect IDS alerts from a given vehicle and (potentially) pass them to a selected location (e.g., a Security Operations Center (SOC)) for further processing
Provide secure access to alerts, and raise events and notifications to the relevant stakeholders for further action An example unified IDS additionally inspects external traffic. External traffic consists of traffic entering and exiting the vehicle. Even though the firewall operating on this traffic can block all connections based on the rules, the firewall is limited by the rules. The vehicle network is static and rules can be easily formulated but it is possible that one of the ECUs (e.g., any controller, processor, and/or computing device on the vehicle) may get infected by some intrusive software and could result in the following:

The infected ECU could connect to the allowed servers and waste bandwidth on the external network connection.

The infected ECUs and software could overwhelm the cloud servers and potentially cause DDoS attacks on servers.

The software could take control of the vehicle and result in ransomware kind of attack.

The software could install some spyware and collect data in the vehicle compromising the privacy of the occupants.

Firewall operation is based on the rules and does not look at patterns of anomalous behavior. So unified IDS and Firewall functions are complementary and both are essential for ensuring the highest level of security.

In the medium to long term, there will probably be more services offered in the vehicle that might require vehicular traffic to access servers outside of the network and monitoring external traffic will be very important in that scenario.

TABLE 1

Example Unified IDS Data/Metadata

| Traffic Type/Protocol | Data/Metadata |
| --- | --- |
| Ethernet | Frame rates, SMAC/DMAC address associations |
| IP | SIP/DIP address associations, Message rates, Protocol Errors |
| TCP | SIP/DIP/SPORT/DPORT associations, Data rates, Protocol Errors, TCP state validation, SYN/FIN rates for DoS checks, Port scan checks |
| UDP | SIP/DIP/SPORT/DPORT associations, Data rates, Protocol Errors, Port scan checks |
| DNS | Protocol validation, Message rates, Domain name validation |
| HTTP | Protocol validation, Message rates, Request URL validation, Response code validation and stats |
| EthCC | Message ID, Message rates, CRC check, Sequence check |
| CAN | ID, Frame rates |

The table above shows some of the data and metadata items collected and maintained for various protocols for detecting intrusions. The table is not exhaustive, and the elements can be configured according to the relevant protocols and intrusion types to be detected.

As OEMs enhance vehicles with advanced features and enriched content, the volume of data in the vehicle is increasing exponentially. This data needs to be stored in the vehicle—temporarily or longer—before it is consumed or transmitted elsewhere. Unfortunately, in traditional E/E architectures, memory is embedded in ECUs and is generally not accessible by other ECUs, which makes it difficult to share, secure, and preserve data. Centralized and/or distributed shared storage is an enabler of centralized vehicle functionality and hardware resources, which will reduce complexity and costs for storing a greater volume of data, reducing stored data redundancy, and the like.

Shared Network Storage enables more efficient data collection, storage and sharing by in-vehicle apps and services, more effective data security and backups, and new solutions like OTA (over the air). OEMs will benefit from lower overall memory costs, increased safety and performance, and increased revenues and profits from new, high-value applications and services. Customers will benefit from new data-rich features (e.g., Sentry Mode), flexible content downloads for entertainment, personal storage options (e.g., personal photos), and reduced input costs to the vehicle.

Example operations of a shared storage controller are provided for illustrative purposes.

An example shared storage controller includes storing vehicle condition information, such as camera footage for cameras related to the vehicle, which may be stored in a rolling data buffer. The contents of the buffer may be preserved upon a request (e.g., a customer receives a notification that her parked car has been hit, and requests preservation of the data which may include prompting the customer to preserve the data), and/or may be preserved according to event detection rules (e.g., a rule indicating to save the camera data buffer in response to an impact detection while parked, etc.). In the example, the customer can then retrieve (and/or provide to an insurance provider, police, etc.) the data including video recordings for a few minutes before the impact.

An example shared storage controller includes preserving configuration information for an ECU in the system, for example an image of a software installation update for the Head Unit. In the example, where the ECU fails an update, and the customer has indicated that operation of the vehicle is preferred over another attempt at the time, the ECU having the failed update can revert to the previous installation, and the image having the update is stored for installation at a later time. In certain embodiment, the shared storage controller may delete the image having the update after a later successful installation of the update for the ECU.

An example shared storage controller includes downloading media (e.g., a movie, game, music, audio book, etc.), for example when cellular data is readily available, where WiFi or another relatively unlimited external data connection is available, and/or upon request by a user. In the example, the request for the downloaded media may be made with a user device (e.g., a mobile device, web application, etc.) and/or a vehicle display such as the Head Unit. In the example, the passengers can then watch the movie, play the game, or otherwise access the media without interruption by slow or intermittent cellular connectivity, and/or without incurring cellular download costs. In the example, the shared storage controller may delete the downloaded media based on rules provided in configuration information and/or a policy, after a selected period of time, based on available space (e.g., rolling out older or least used media to make room for additional downloads, etc.).

An example shared storage controller caches data for external communication, for example collected data according to a policy, event detection, and/or a data collection request, and communicates the data at a later time. Accordingly, external data communications can be time shifted, for example to allow for more efficient use of cellular communications, to take advantage of an opportunistic high capability connection such as a WiFi, and/or to manage intermittent data interruptions (e.g., traveling through a tunnel). In certain embodiments, the cached data is deleted after later communication, and/or may be deleted according to data priority, policy, or other considerations, if the cache is filled before the data is communicated. In certain embodiments, configuration information, rules, and/or policy may indicate that certain data values should be compressed, summarized, and/or otherwise processed to reduce the storage space of the data, if the full data cannot be communicated before the cache is filled. In certain embodiments, other available data spaces that are unutilized, such as media storage space, preserved configuration information space, or any other available data space as disclosed herein, may be utilized in whole or part before deletion of collected data, for example allowing for a temporary increase of the data collection cache.

An example shared storage controller provides storage for a learning system, for example where large amounts of data are stored to collect and analyze driving behavior, vehicle performance, settings, environmental data, etc. to support learning operations to adjust to a customer driving style and/or to improve performance of an ADAS system. In the example, the data may be stored until a low cost transmission network, such as a WiFi, is available.

Using shared network storage, new ECU software can be further abstracted from the underlying hardware—enabling a consolidated architecture where vehicle applications run on a few high performance ECUs.

Embodiments of the present disclosure include an architecture that includes a secure centralized vehicle memory (optionally, through an expansion slot) and/or additional user-provided memory, such as a USB drive (which is both cost-effective and highly flexible). This allows users to store large amounts of data which is accessible from multiple sources which, in embodiments, may be through an in-vehicle network, external network, and/or other interfaces.

Figure 16:
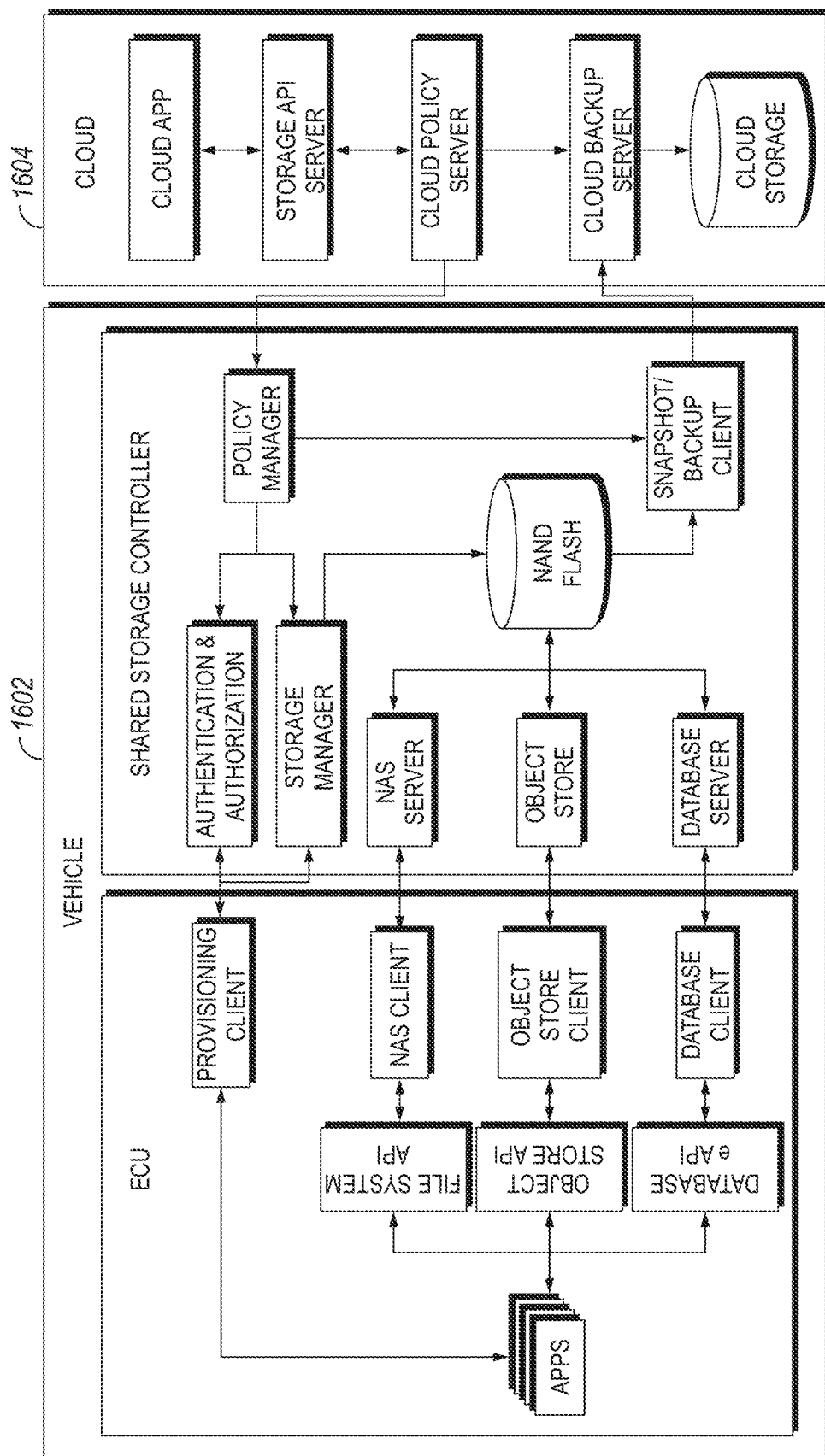
FIG. 16 is a schematic diagram of an example shared storage controller according to certain embodiments of the present disclosure.

Referencing FIG. 16, an example shared storage controller is depicted, which is depicted as interfacing with an ECU in the example of FIG. 16 (although a given embodiment may include a number of ECUs and/or the shared storage controller may be positioned, in whole or part, on one or more ECUs). An example shared storage controller includes an in-vehicle storage server that enables multiple applications from different ECUs to store or retrieve data to/from the shared storage. An example shared storage includes a centralized storage, such as a centralized flash drive. In certain embodiments, the shared storage may be distributed among a number of devices, where the centralization of the storage is a logical organization rather than a physical organization. Nevertheless, in certain embodiments the shared storage is a physical organization, whether in a single device or a small number of centralized devices.

The storage server is communicatively coupled to the in-vehicle network (IVN), and is capable of storing data in selected formats, for distinct file systems, and/or configured data objects and structures. Example file systems (e.g., formatting and addressing, decisions regarding which data is stored in what locations, etc.) include vehicle data, user data, and/or video files (e.g., generated for during monitoring operations, data captures after events, etc.). Example data objects include data collection objects (e.g., data structures holding collected data in a selected format), machine learning data (e.g., training data, feature vectors, neural parameters, etc.), and shared resources (e.g., data caches, configuration information, policy data, and/or any other shared resource data from ECUs on the system). In certain embodiments, the storage server provides one or more dedicated partitions of the shared storage, which may be virtual partitions or physical partitions (or a combination, for example providing a physical partition for ECUs having a large stable demand for storage resources, and virtual partitions for transient demands, uncertain demands, and/or during transient operating conditions to allow easier movement of storage capacity between ECUs). In certain embodiments, the storage server adjusts a size of a partition, allowing for reduced waste of utilized shared storage. In certain embodiments, the storage server provides for shared partitions, which may be shared between all ECUs and/or a subset of ECUs (e.g., grouping ECUs by function, data formats, data storage duty cycle matching and/or de-synchronization, etc.).

An example shared storage controller includes an authentication and authorization manager, which grants or denies access to ECUs to any specific container, for example based on policies (e.g., interfacing with the Policy Manager), configuration information, priority associated with the ECU and/or a flow associated with the ECU, etc. In certain embodiments, the authentication and authorization manager provides access to data storage capacity based on permissions, policy, priority, and the like. For example, the authentication and authorization manager may provide access to write to: a partition, a folder and/or subfolders, a file, etc. In embodiments, the authentication and authorization manager may separate reading rights from writing rights. For example, where a high priority ECU requires an increase in utilization of the shared storage, the increased storage may be provided, if available, and/or taken from lower priority shared data storage utilizers. In certain embodiments, snapshots, backups (full or partial), and/or cached data targeted for external communication, may be stored in the shared storage.

The shared storage may be of any size, for example 16 GB, 32 GB, 64 GB, or any other value. One of skill in the art, having the benefit of the present disclosure and information ordinarily available when contemplating a particular system, can readily determine an appropriate size for the shared storage. Certain considerations for determining a shared storage size include, without limitation: the number of ECUs on the system and the net storage need for the ECUs beyond their internal storage capability; the amount of data collection to be performed on the vehicle, the types of data to be stored, and the profile of available data communication to external devices (e.g., bandwidth, costs, and/or the magnitude and extent of likely low bandwidth periods or high bandwidth periods); the distributions of ECUs across separate networks; the amount of data communication expected between ECUs on separate networks; the bandwidth available on in-vehicle networks to support network cross-communications between ECUs on the separate networks; and/or the likely number and data requirements for consumer or $3^{rd}$ party features that may require data storage (e.g., for media buffering, pre-downloads, data collection, etc.). Referencing Table 2, typical sizing for video files is depicted for reference.

TABLE 2

Typical video file size data

| Video Quality | Size of Storage | | |
|---|---|---|---|
| | 32 GB | 64 GB | 128 GB |
| HD (1280 × 720)@1.5 Mbps | 26.6 hrs | 53.2 hrs | 106.4 hrs |
| FHD (1920 × 1080)@3.0 Mbps | 12.8 hrs | 25.6 hrs | 51.2 hrs |
| Driving Log | 6,400 hrs | 12,800 hrs | 25,600 hrs |

An example operating system for the shared storage controller includes a Linux operating system, although any operating system may be utilized. Without limitation, example data services include: NAS server operations including file system protocols such as NFS, SMB, and/or FTP; an object store for object-based storage; and/or a database server for storing custom database tables and indexes. Embodiments of the disclosure may use non-relational databases, e.g., a key/value pair database. In certain embodiments, the shared storage controller is configured to compress data as it is ingested, which may be configured according to the type of data (e.g., lossless compression for highly digitized data and/or data where compression loss is undesirable and/or will not meet requirements for the data; and/or lossy compression, for example where loss of information is acceptable, for highly continuous/varying data, etc.). In certain embodiments, the shared storage controller is configure to perform deep compression of cold data—for example data that is not likely to be utilized by an ECU on the system in the near term, which may also relieve vehicle control ECUs from deep compression tasks that may be highly intensive for processing and/or I/O resources. In certain embodiments, the shared storage controller is configured to encrypt data at rest. In certain embodiments, the shared storage controller is configured to age out data, to remove unneeded data, and/or to enforce a data retention policy. An example shared storage controller is configured to back up snapshot data in response to connectivity to an external backup device (e.g., a cloud server) and/or available bandwidth to communicate the snapshot data.

Example embodiments provide for expanded effective storage capacity of all ECUs on the vehicle, through both cost savings that allow for resources to dedicate to centralized storage, reduction of wasted storage space, and balancing of aggregate storage needs to provide greater certainty of the whole system storage needs versus highly variable individual ECU storage requirements that must be managed with individual storage capabilities associated with each device. Example embodiments provide for ease of scalability in storage capacity and performance, where relatively few resources can greatly expand available storage for the system. Example embodiments provide for data isolation, with app-specific and/or ECU-specific partitions, and secure access management between ECUs. Example embodiments provide for centralized secure storage of data, and simplification of data security management (e.g., reducing the requirement to configure and verify individual ECUs to ensure secure storage of related data).

An example system includes the provisioning client to be used as a proxy between apps running on individual ECUs and the authentication and authorization manager in the shared storage. An example system includes data clients (e.g., NFS, SMB, Object Store) for the apps to use as a proxy for sending and receiving data to and from the shared storage.

The growth of advanced vehicle functionality combined with pressures to reduce costs have combined to the point where typical vehicle configurations include a large number of ECUs, for example up to 150 ECUs. The current configuration of vehicles results in inefficient use of hardware, with redundant capability in processing power, memory, and other resources, while at the same time causing high network utilization, limited processing power and/or memory for individual applications, redundant software present throughout the system, and inconsistent quality and functionality of ECU implementations.

Figure 17:
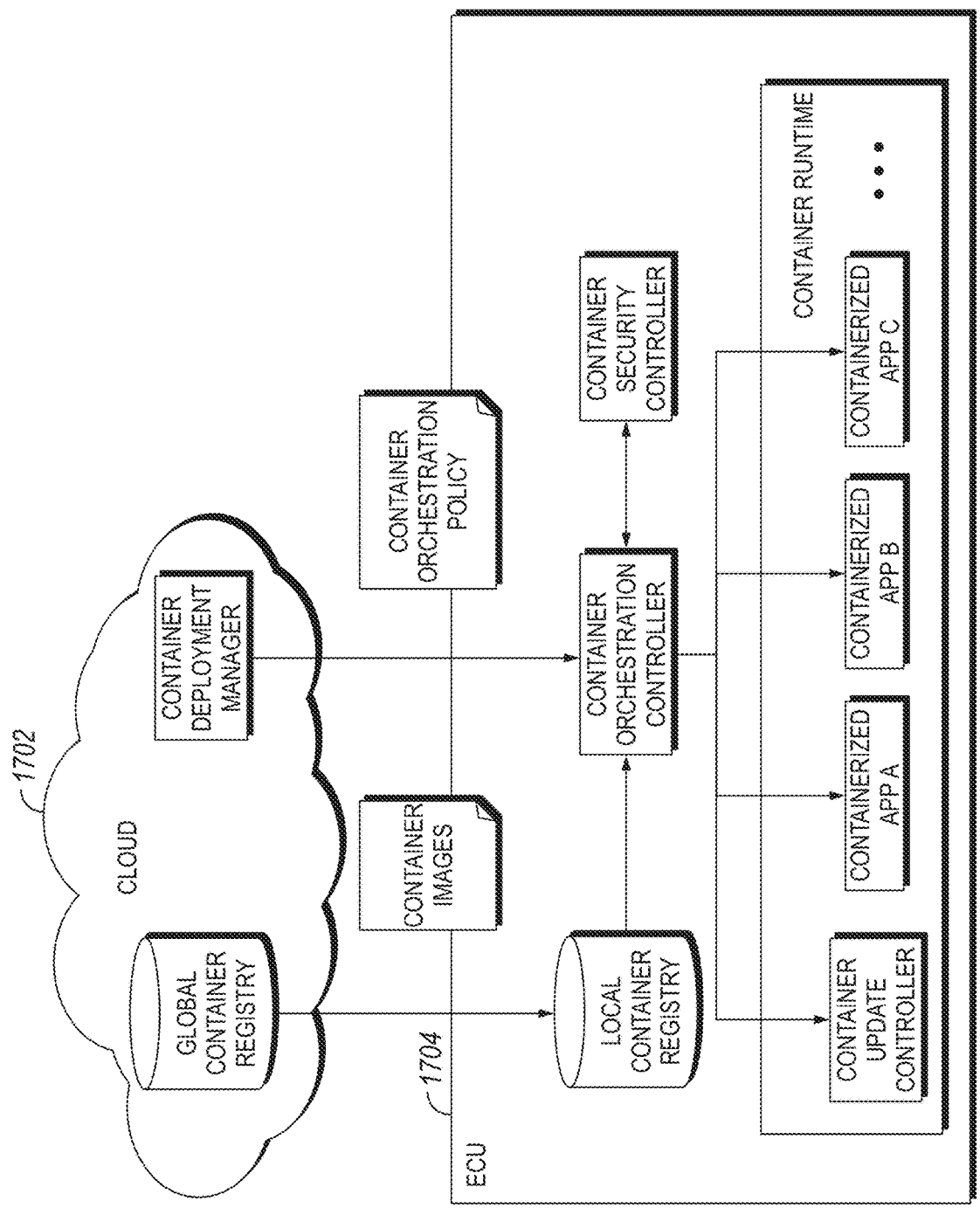
FIG. 17 is a schematic diagram of another example data collection system according to certain embodiments of the present disclosure.

Referencing FIG. 17, an example system supports consolidation of vehicle features and control operations into a reduced number of more powerful ECUs. Additionally, the example system supports migration from legacy implementations with a multitude of ECMs, to sequential progression toward consolidation of features over time, over the life cycle of a vehicle, over a number of model years of a vehicle, etc.

Containerized applications can easily be added, combined, and moved to create feature sets for different models and trim levels, update vehicle features, and even relocate applications between servers for reliability and power management.

With the help of container technology, the deployment of containers is fully controlled by Container Deployment Manager on the cloud side. A Container Orchestration Policy is created to specify:

Which container should be enabled on an ECU (for use cases like OTA, trim selection, feature subscription)
Container image for each container
Container security policy
Container migration strategy (e.g., where to run the container in order to save power, or in case of a hardware failure)

The example Container Orchestration Controller receives the policy and enforces it by harnessing the following other modules:

Container Security Controller: this module enforces the access control, authorization, and accounting of the container execution. The container has to pass the access control and authorization check in order to be eligible to the container runtime. In addition, container running statistics will be collected and sent back to the cloud.

Local Container Registry: this module downloads the eligible container images from the Cloud Container Registry.

Container Runtime: this module provides an Open Container Initiative (OCI) and Container Runtime Interface (CRI) compliant container runtime optimized for embedded environments.

Example implementations of a containerized application are provided following. The examples are illustrative of certain implementation features that are possible according to the present disclosure, and are not limiting.

An example implementation includes containerized applications downloaded (e.g., OTA) and installed on the VFAS ECU with the most available resources (e.g., CPU, memory, and/or I/O) and/or the VFAS ECU whereby installation of the containerized application will provide the least restriction relative to a limiting one of the available resources, and/or a VFAS ECU having sufficient resources to implement the particular containerized application. Example implementations include moving containerized applications that have already been installed, and/or balancing the overall load of containerized applications between available ECUs.

An example implementation includes utilizing containerized applications combined to create feature sets for different models and/or trim levels of a vehicle. An implementation includes adding or removing features, and/or providing upgraded versions of a feature, to provide an upgrade to a vehicle, and/or to implement control operations for a new model year of a vehicle.

An example implementation includes an operation to deploy a containerized application to support specific features for a particular user. For example, a significant data collection operation may be performed by a containerized application operating on an ECU of the vehicle, thereby able to process the data, which may provide improved data collection response (e.g., begin utilizing the collected data more quickly) and/or able to process the data, providing for a reduced amount of data that needs to be communicated via limited external data communication resources. In another example, an implementation includes an operation to deploy a containerized application to support a specific feature (e.g., a subscription based feature), and an operation to remove the containerized application in response to an expiration of the subscription, for example to free system resources.

An example implementation includes organizing a distribution of containerized applications on ECUs in response to a network utilization of the containerized applications, for example to reduce network utilization on busy or low capability networks, and/or to shift utilization from a low capability network to a higher capability network.

An example implementation is positioned on an electric vehicle to support an energy saving mode (e.g., utilized when batteries reach a selected state of charge) by deactivating non-critical features, reducing resource utilization such as processor operations, and/or consolidating features onto fewer ECUs to allow certain ECUs to be de-powered completely.

An example implementation includes positioning containerized application between ECUs to distribute system risk, for example placing critical vehicle applications into different containers than less critical applications (e.g., to reduce potential conflicts and/or prioritizing allocation of resources). In another example, critical applications are provided with redundancy (e.g., present on more than one ECU), such that a failure of the ECU does not cause a loss of the application, as the application can be executed from a backup version on another ECU. In certain embodiments, a critical application is migrated from a first ECU having a failure or a performance decrease to another ECU. The migration may be on vehicle, for example when communication can still be established with the reduced performance ECU, and/or the migrated containerized application may be migrated by downloading another version from the cloud server. In certain embodiments, a non-critical application may be migrated, shut down, and/or be allocated reduced resources in response to the failure and/or performance decrease of the ECU.

Lightweight containers require less server resources than hypervisors and virtual machines with embedded operating systems, and require negligible additional processing or memory compared to non-virtualized applications. Benefits for the OEM of using containers include reduced hardware costs, faster time-to-market for features and vehicles, lower development costs, and more reliable applications and systems.

Example benefits for implementation of a containerized application model include:

Containers under Docker are built with a microservice focus. This removes the burdensome infrastructure layers and helps optimize application delivery and workflow.

Through container repositories/registries such as Docker Hub, the deployment process could be simplified, and applications could be checked-in/out, turning infrastructure into code.

With templates such as Dockerfiles, application blueprints could be easily provided, bringing transparency into the application rollout process. With this new model, the need for Configuration Management was almost completely negated overnight from infrastructure and application pipelines.

With a massive reduction in the application environment's footprint, there could now be much faster software development testing/validation/deployment cycles and these lightweight containers could now help to enable a dynamically scalable microservice model, where applications are broken down into smaller, more atomic units.

Container images are decoupled from the traditional, heavyweight host OS, so they are now portable, running in any container runtime environment that supports them. This helps enable true hybrid deployment capabilities.

Container adoption, however, introduce challenges into traditional applications such as automotive control implementations, since management of container-based infrastructure requires completely different methods of operating, and the workflows oftentimes ran counter to long-established norms. Some additional challenges of container adoption include:

End-to-end control of the operating environment can be problematic—the rich ecosystem of infrastructure management tools developed over decades largely does not translate to the container-based world.

Key resources in a Data Center that normally require strict management, such as network and storage endpoints, are now abstracted out, with limited control functions.

HA/redundancy shifted from monolithic architectures to horizontally-scaled, software-driven platforms. This moved control away from the operations personnel and into the hands of developers.

Most hypervisors and virtualization platforms have strong, commercially-supported options. However, the container world (and its associated ecosystem) are primarily rooted in the "DIY", open source world, which is continuously evolving.

Due to the container ecosystem's alignment with developers, its configuration constructs are aligned to their worldview, which includes concepts such as API calls, configuration files written in declarative YAML or JSON format templates, repositories, and integration with CI/CD workflows. These concepts are not common in the traditional operations world, and they require a completely different approach and skillset to manage. Even within the IT industry, this continues to be a considerable challenge.

Figure 18:
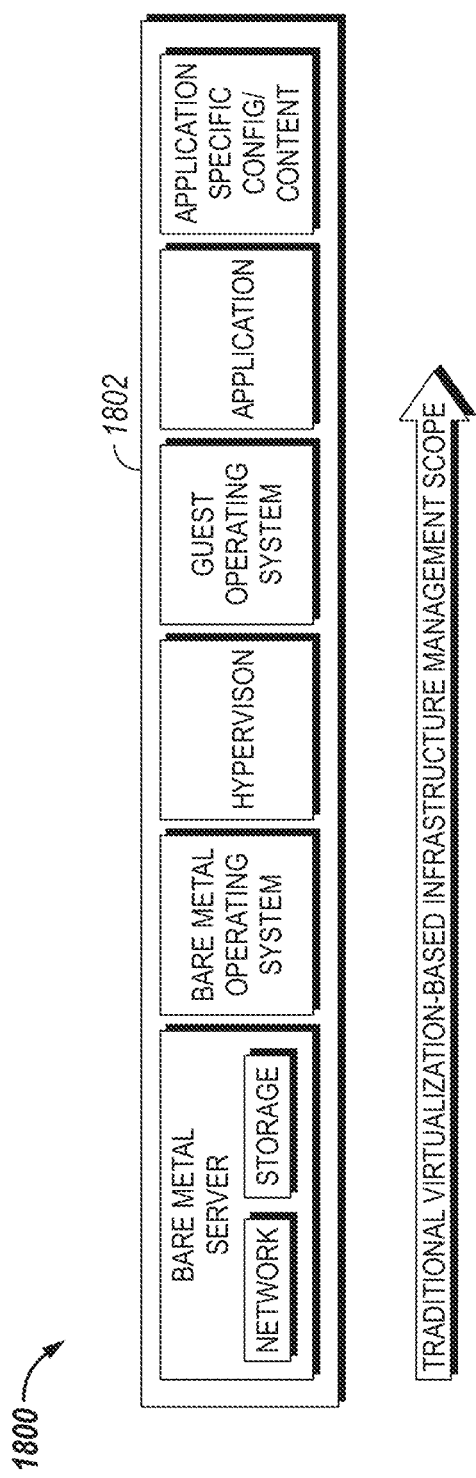
FIG. 18 is diagram of an example workflow according to certain embodiments of the present disclosure.

Referencing FIG. 18, example workflow changes for container-based application development versus traditional virtualization-based development are depicted for illustration.

Containers allow in-vehicle software to be decoupled from hardware, allowing for available hardware resources to be assigned more easily, and developed independently from other software that could share resources.

For example, as illustrated in the following figure, a containerized application environment would enable the deployment of different applications based on different trim vehicle levels on the same hardware platform.

Figure 19:
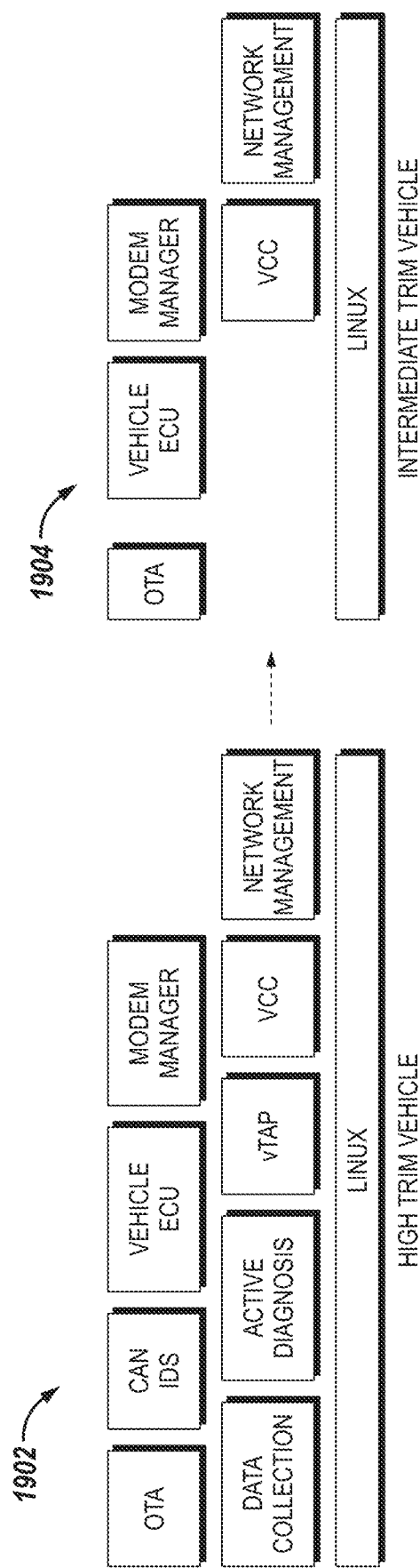
FIG. 19 is a schematic diagram of an example containerized application environment according to certain embodiments of the present disclosure.

Referencing FIG. 19, an implementation comparing vehicle trim levels with containerized application development.

Figure 20:
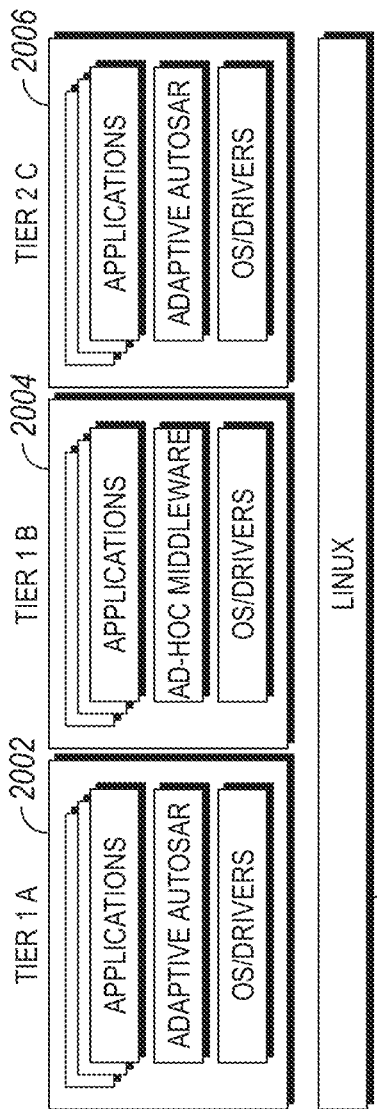
FIG. 20 is a schematic diagram of an example architecture implementation for container based applications on a vehicle according to certain embodiments of the present disclosure.

This benefits the OEMs by reducing development costs, optimizing hardware costs, accelerating application deployments, and improving time-to-market. In addition, customer benefits include vehicles with more features, higher reliability, and upgrade options after purchase. However, a number of challenges to migrating a vehicle application to a containerized application development introduces a number of challenges, such as:

Container runtime optimized for embedded environments
Container orchestration optimized for embedded environments
Virtual network bridge for containers to integrate with overall in-vehicle network management solutions
Private container registry for safety and security
Expand and enhance AUTOSAR Adaptive to support containers
ARA::COM integration for containerized applications
ARA::EM to manage containerized applications ARA::UCM to upgrade/update containerized applications ARA::LT to support log and trace for containerized applications Referencing FIG. 20, an example architecture implementation for container based applications on a vehicle is schematically depicted. The example architecture of FIG. 20 improves the workflow when multiple vendors are involved in an ECU development. Containers provide clear separation between their functional modules. The suppliers are free to choose the middleware, whether it is AUTOSAR Adaptive or ad-hoc middleware, that best fit their interests.

Figure 21:
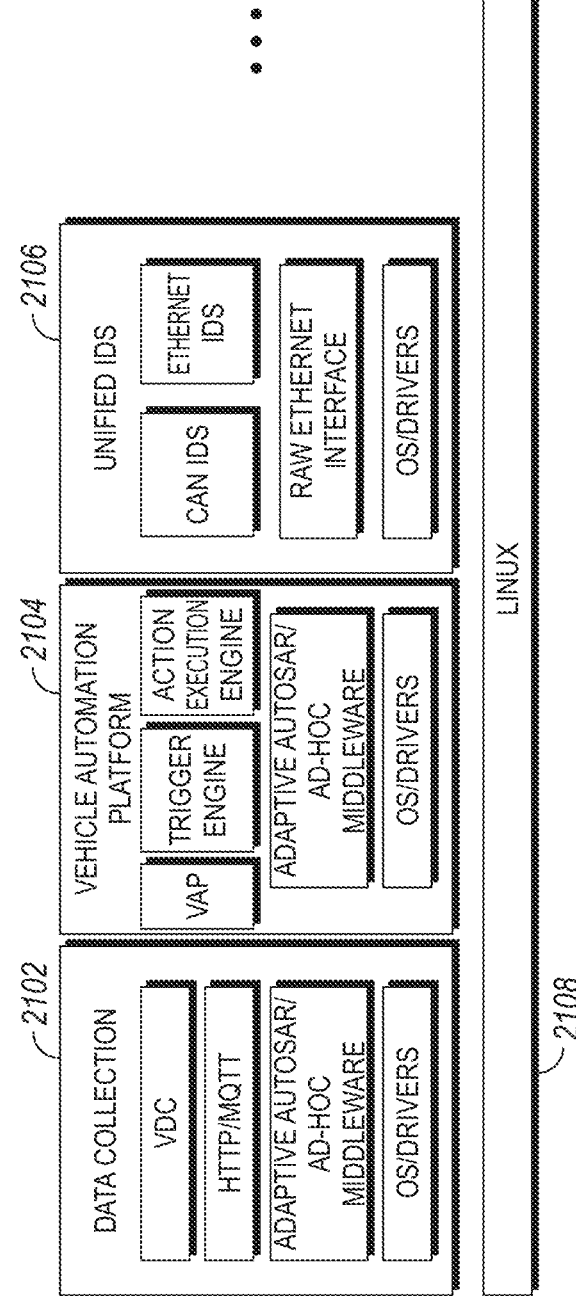
FIG. 21 is a schematic diagram of another example architecture implementation for container based applications on a vehicle according to certain embodiments of the present disclosure.

Referencing FIG. 21, an example alternate architecture implementation for container based applications on a vehicle is schematically depicted. In the example architecture of FIG. 21, the features are self-contained inside a container that brings at least two clear advantages. First, the features can be easily upgraded individually with zero-downtime impact on other features. Second, the feature set can be easily expanded or customized for different vehicle trims/levels. For example, the diagram below shows how to customize a full trim vehicle to an intermediate trim. All it needs is a simple change in the Container Orchestration Policy that decides what container to enable.

Each container can either use AUTOSAR Adaptive to realize all the middleware functionalities, or use ad-hoc middleware, such as SOME/IP, DBus, Systemd, and so on. The decision should be made on a case-by-case basis, and it should be based on the container functions and their coupling with AUTOSAR Adaptive.

Additionally, each feature container can associate a container manifest, which is defined and controlled by the OEM. The manifest dictates how much resources (e.g., CPU/memory) should be allocated to the container, as well as determining the container privilege level (set through AppArmor profile).

The diagram below shows a deep-dive into the container for data collection and helps illustrate the AppArmor and all middleware components.

Figure 22:
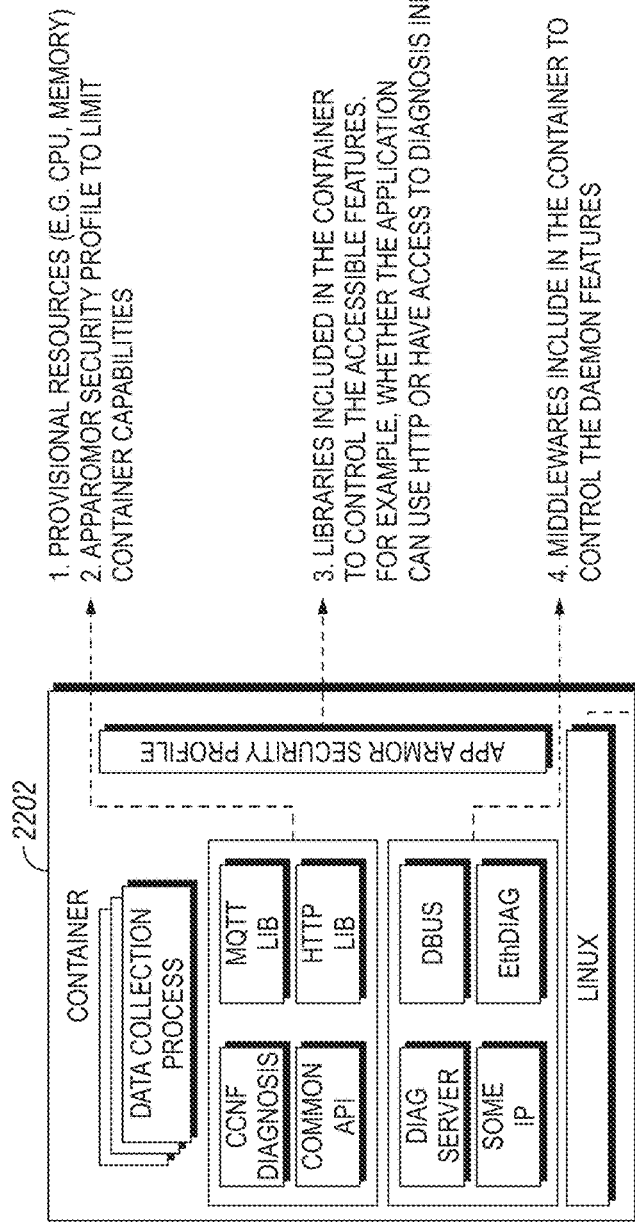
FIG. 22 is a schematic diagram of example details of a container according to certain embodiments of the present disclosure.

Referencing FIG. 22, a schematic diagram of certain details of a container is depicted.

Lastly, containers pose additional challenges on the infrastructure. As the number of containers grows inside the vehicle, managing the IP addresses and ensuring connectivity between containers becomes a critical and challenging task. The traditional approach of statically allocating the IP addresses to each container will not scale in this circumstance.

An example implementation includes all containers dynamically joining the same network to facilitate SOA. Logically, each container runs like an individual ECU directly attached to a virtual Ethernet backbone.

Figure 23:
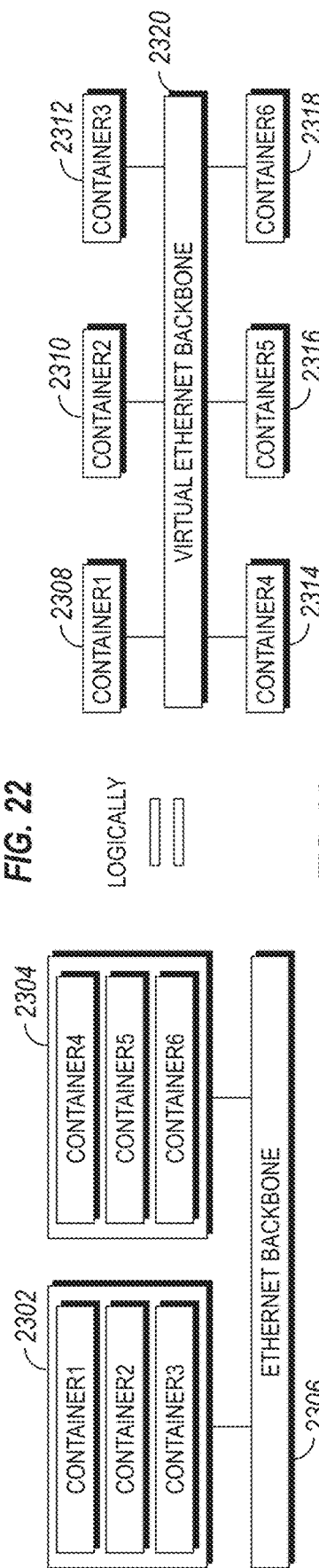
FIG. 23 is a diagram of an example container networking implementation according to certain embodiments of the present disclosure.

Referencing FIG. 23, a container networking example implementation is schematically depicted.

This new virtualized network should adapt the network configuration when a container joins or leaves the network to allow the new container to connect with others. A couple of new technologies are required to empower this, including MAC learning, Dynamic ARP, IgmpSnooping, DHCP, and their security counterparts. These new networking technologies will be enabled by Advanced Network Management of embodiments of the present disclosure.

AUTOSAR Adaptive defines interfaces and organizes the responsibilities in each module in order to provide an application runtime environment:

ara::exec defines run-time responsibilities including:

Function group is a set of applications with independent state

Execution dependency defines program startup order to ensure a process will start after the processes it depends on. Execution dependency is defined per function group to prevent failing a function group shall not impact the other function group Application lifecycle Resource limiting ara::per provides key-value pair storage and file-proxy available to applications However, AUTOSAR Adaptive was designed to support traditional applications on POSIX-compliant operating systems, and it was not designed to support containerized applications. An example implementation expands and enhances support for containers.

Containers on top of AUTOSAR Adaptive offers isolation enforcement for adaptive applications. Although the Adaptive platform suggests guidelines to make applications portable, it does NOT specify an OS level architecture to achieve proper isolation. An example implementation utilizes Linux namespaces, enabling a process and its children to have different views of the underlying system. An example implementation includes applying OS level virtualization to the adaptive platform.

Container features are implemented in the form of a plugin library, and platform applications (e.g., Execution Management functional cluster) can enable the features.

TABLE 3

Example list of OS-level isolation features

| Feature | Description |
|---|---|
| Application lifecycle: Grouping State machine Start/shutdown | AUTOSAR Adaptive Execution Management A Function Group is a set of coherent application processes. Each group has its own state (Function Group State), depending on the state, processes are started and terminated. System integrators can assign applications to a Function Group State and then request it by AUTOSAR Adaptive State Management. |
| Privilege limitation | Root privilege can be acquired accidentally, by design, or by an adversary intending to take control of the system. Linux user namespace provides OS level privilege isolation that defines a subgroup of UID/GID range that maps container-wide UID/GID to system-wide. For example, root (0) inside the container is mapped to a different range (1000) effective in the system. |
| Separate view of file system | AUTOSAR Adaptive Persistency: The persistency functional cluster assigns file storage (and key value storage) dedicated for a process and never be shared between two (or more) processes. If persistent data needs to be accessed by multiple processes, it is the duty of the application to provide a service interface to share data. AUTOSAR Adaptive does not specify how to prevent apps from accessing files on the system. This shall weaken file access isolation for a process or function group Linux mount namespace provides OS level support to separate the view of file-system mount point for the processes and its children. |
| Resource limitation and prioritization | AUTOSAR Adaptive Execution Management requires to support the configuration of OS resource budgets for processes and groups of processes. Linux cgroups can provide implementation to define usage limitation of RAM, CPU, NET, I/O per function group |
| IPC | AUTOSAR Adaptive Execution Management prevents a function group from depending on another function group. Linux IPC namespace provides separation of Linux IPC primitives, semaphore, and shared memory. This prevents processes in different namespaces from communicating with each other. |
| PID | Linux PID namespace spins off a new process tree with PID 1 (init process), restricts view, or controls other process groups. |

TABLE 3-continued

Example list of OS-level isolation features

| Feature | Description |
|---|---|
| Mandatory Access Control | AppArmor provides stronger, fine-grained access control compared to traditional POSIX DAC (Directory Access Control). |

Figure 24:
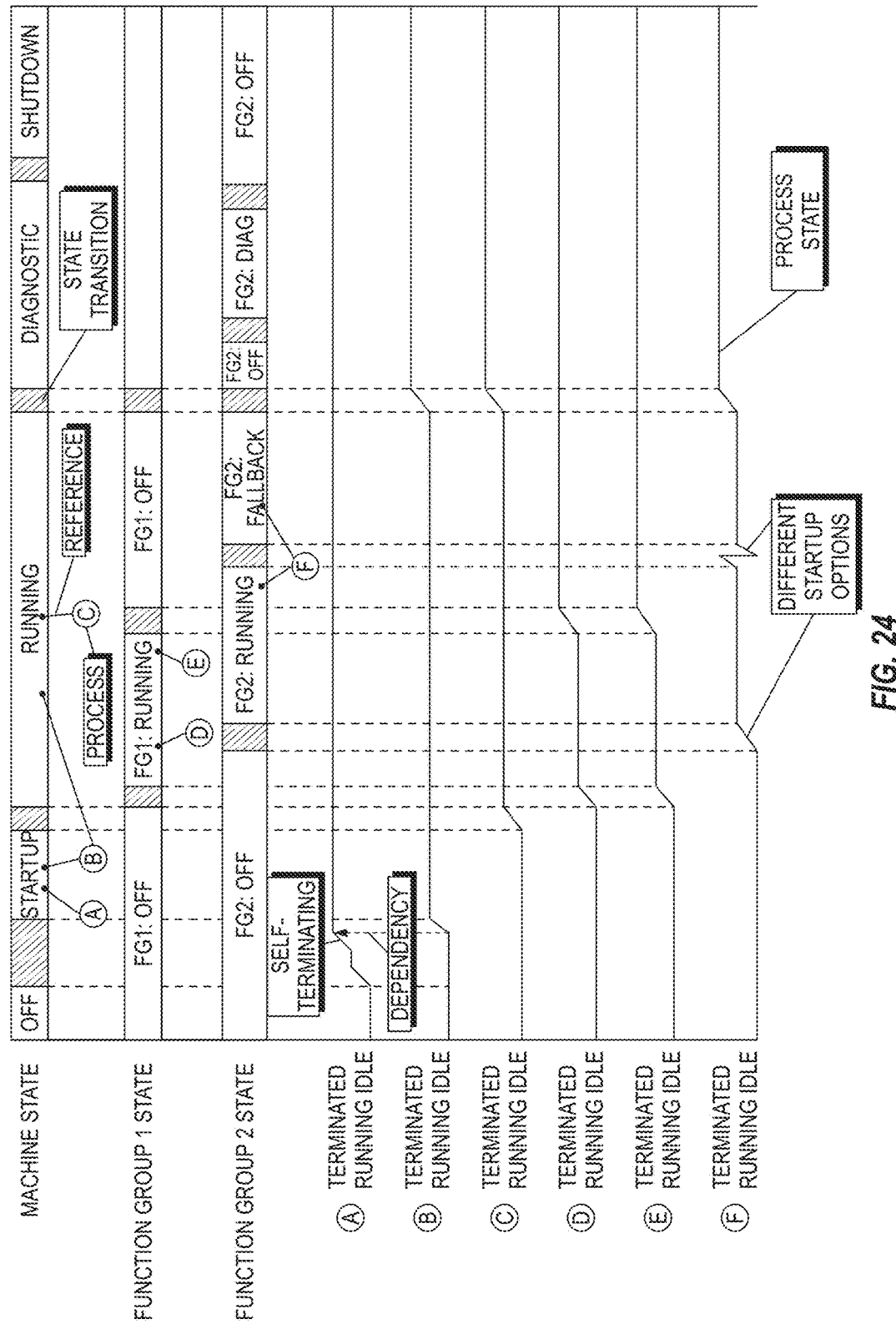
FIG. 24 is a diagram of an example AUTOSAR adaptive function state group according to certain embodiments of the present disclosure.

Referencing FIG. 24, an example AUTOSAR adaptive example of function state group is schematically depicted.

AUTOSAR Adaptive defines Function Groups that are a set of applications. Depending on Function Group State, applications are started or terminated Application process can belong to more than one Function Group The set of Function Group State is machine-specific and it is deployed as part of the Machine Manifest Function Group 1 (FG1) and Function Group 2 (FG2) have independent states and they can run simultaneously. There is no execution dependency configured between them.

FG1 defines Function Group State of {Off, Running}

FG2 defines Function Group State of {Off, Running, Fallback, Diag}

State Management (ara::sm) functional cluster requests Execution Management (ara::exec) to transit Function Group State Function Group States are defined in Execution Manifest (bundled in software package)

Container isolation features (namespaces) shall be configured per Function Group. The following sequence diagram depicts how container features are enabled as part of AUTOSAR Adaptive Function Group States.

Figure 25:
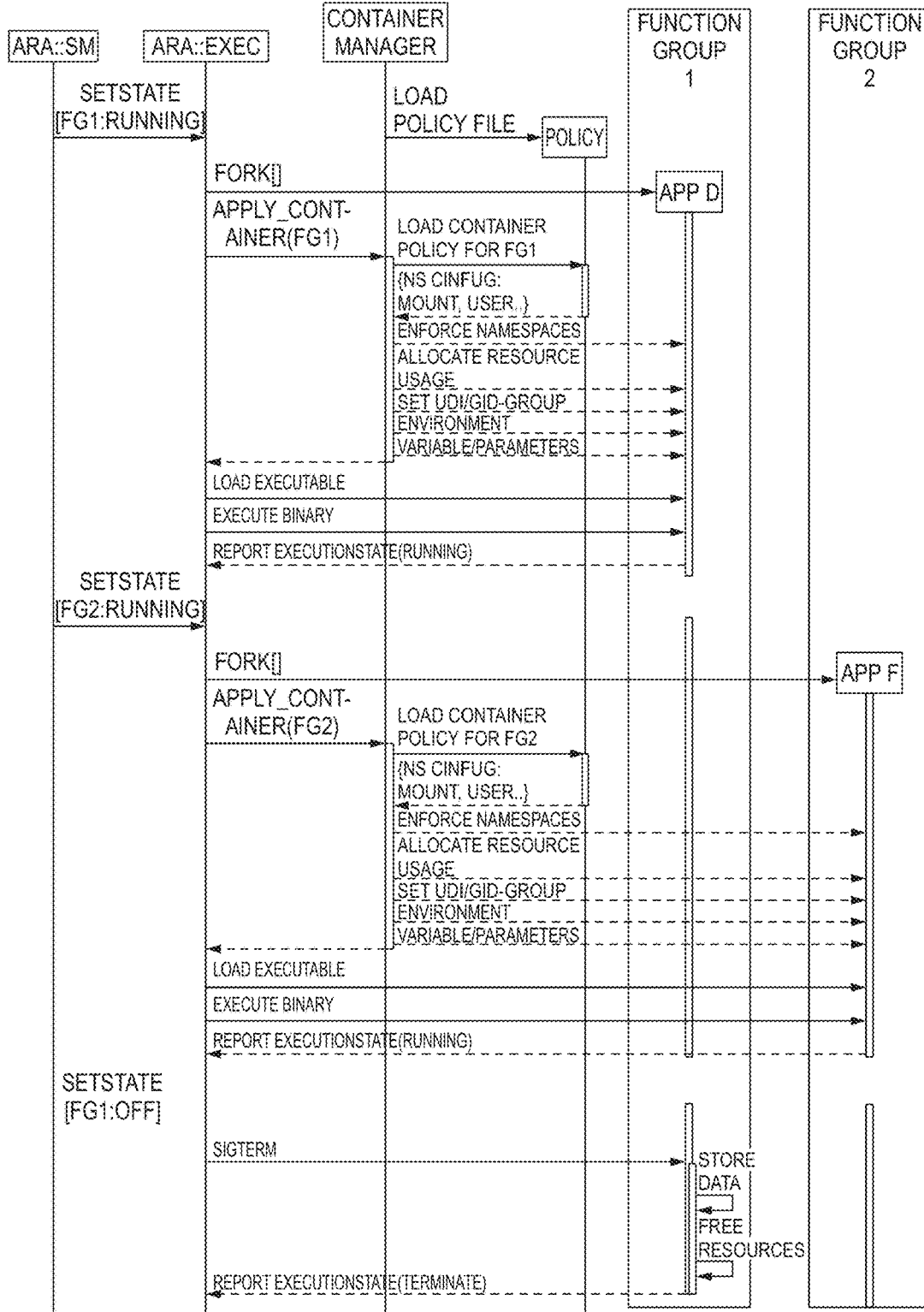
FIG. 25 is a schematic diagram of an example function flow to enforce a container policy according to certain embodiments of the present disclosure.

Referencing FIG. 25, a function flow to enforce a container policy is schematically depicted.

The Container Manager implements OS level isolation features (e.g., namespaces) and manages policies.

Figure 26:
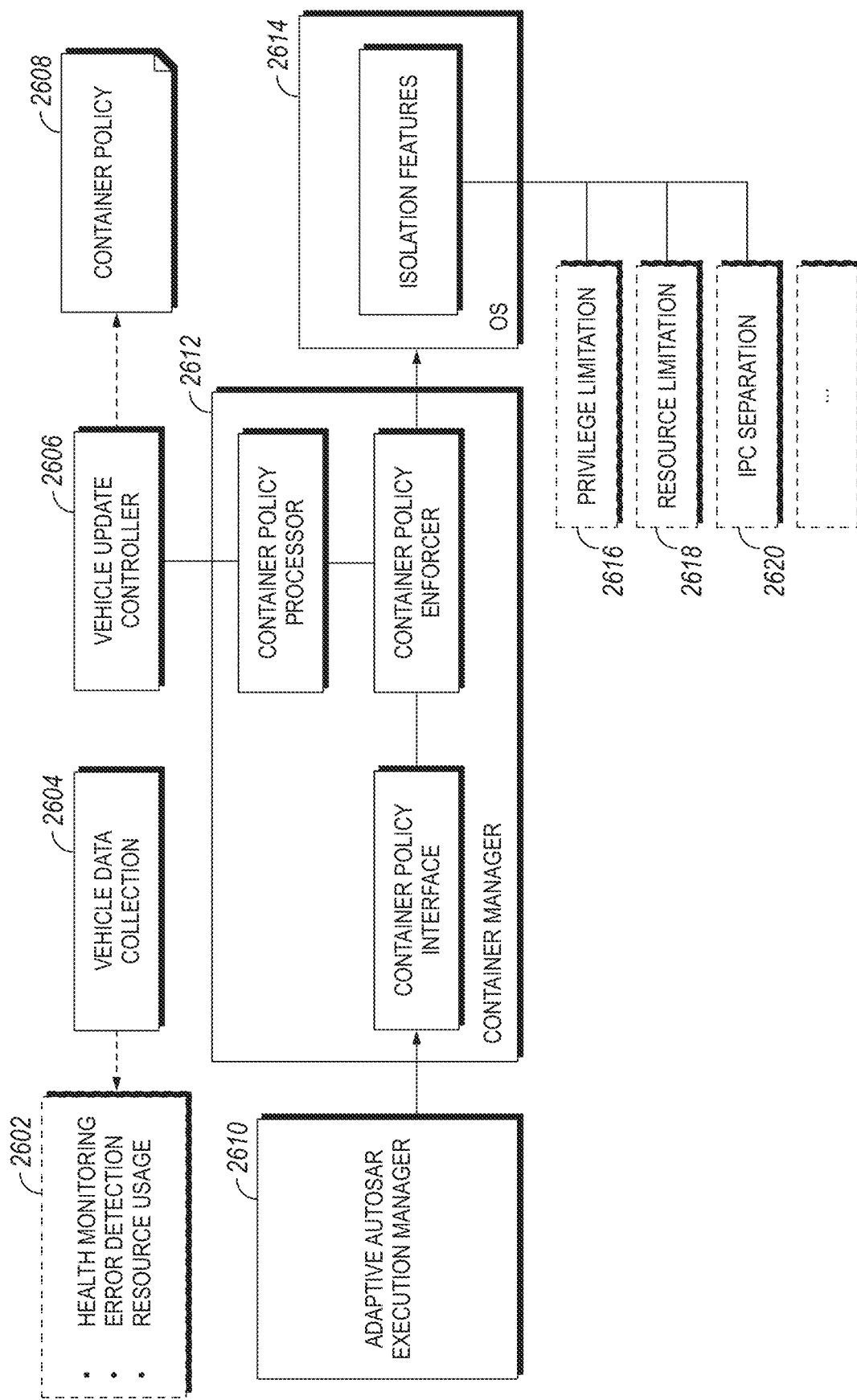
FIG. 26 is a schematic diagram of an example implementation of a container manager according to certain embodiments of the present disclosure.

The ECU will download and execute the policies that specify the list of applications to be configured and the container features to be enabled. Policies can differ by vehicle or groups of vehicles, and policies can be applied for both the first installation and later policy updates. Referencing FIG. 26, an example implementation of a container manager is schematically depicted.

Container Policy:

Accessible file system directories

Range of uid/gid mapping

Resource assignment

Ability to enable and disable isolation features

Monitor/audit:

Resource usage

Application health monitoring

Application error detection

Figure 27:
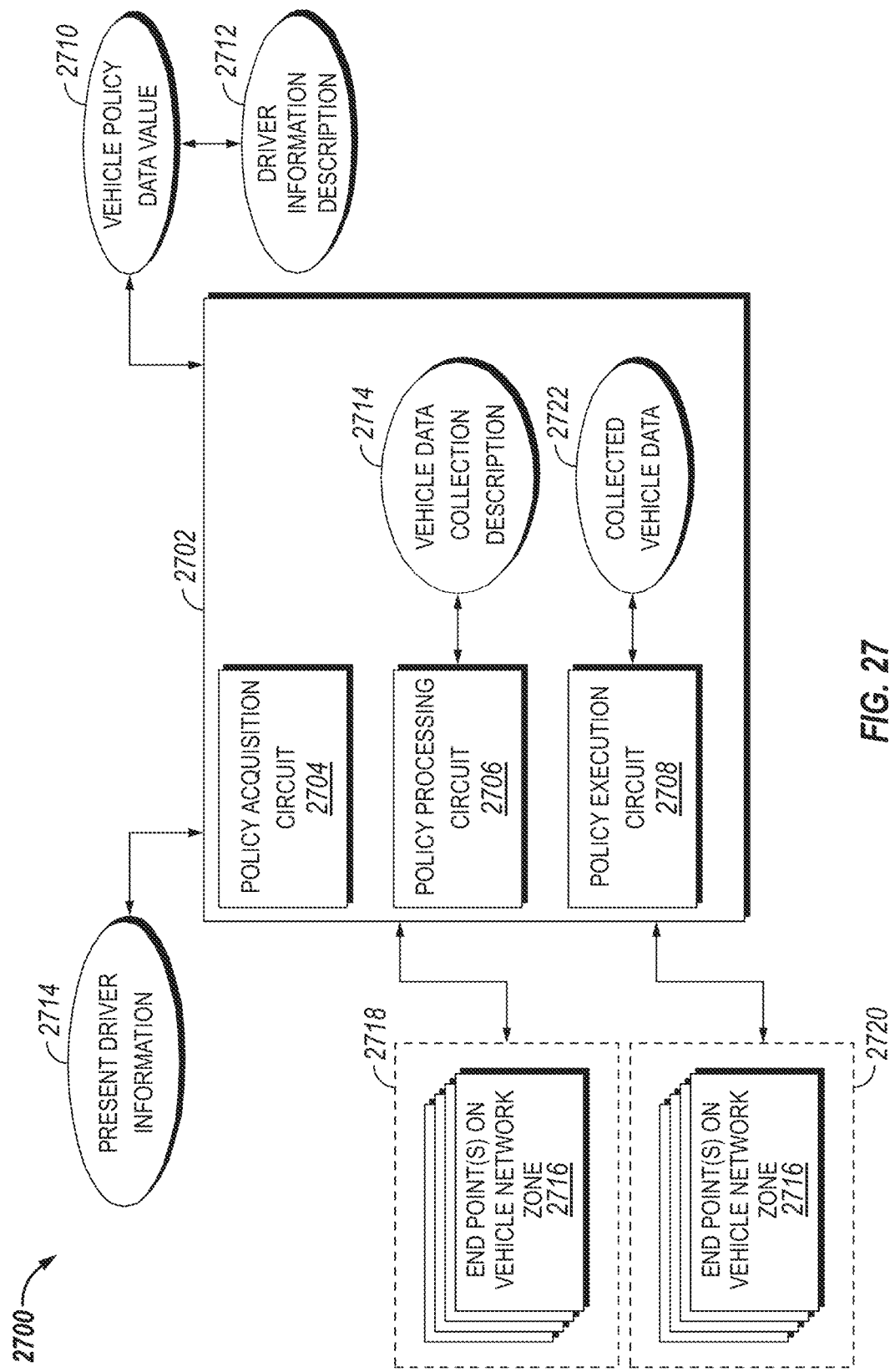
FIG. 27 is a schematic diagram of an example apparatus for implementing a policy based on driver behavior and/or monitoring of a driver for a vehicle according to certain embodiments of the present disclosure.

AUTOSAR Adaptive Execution Manager shall integrate with container plugin library AUTOSAR Adaptive Persistency shall integrate with container plugin library AUTOSAR Adaptive Update and Configuration Manager shall integrate with container plugin library Cloud components are needed to deploy and manage container Referencing FIG. 27, an example apparatus 2700 is depicted for implementing a policy based on driver behavior and/or monitoring of a driver for a vehicle (or selected group of vehicles). The example apparatus 2700 may be included, in whole or part, with any system, apparatus, and/or device described throughout, and aspects of the apparatus 2700 may implement all or a portion of any operations, procedures, methods, and/or functions as set forth throughout the present disclosure. Aspects of the apparatus 2700 may be embodied on the vehicle, on any controller of the vehicle (e.g., a CEG, CES, CND, and/or any controller and/or end point of the vehicle), external to the vehicle (e.g., on a cloud server or computing device, on an external computing device such as a service tool, manufacturing tool, OEM tool, service device, external user device such as an administrator, service, operator, owner, application, or the like), and/or on a device interfacing with any of these—whether through a network (e.g., a LAN, proprietary network, etc.), physical access to a port (e.g., an OBD port, service port, CAN connection, Ethernet port, etc.), wireless access to the vehicle, through a cloud or internet connection, and/or through a cellular connection to the vehicle. The example apparatus 2700 includes a controller 2702, depicted as a single device for illustration, but which may be a single device or a distributed device. The description of the apparatus 2700 depicts a number of circuits configured to functionally execute operations of the apparatus 2700. The circuits are each depicted as a single device for clarity of illustration, but a given circuit may be distributed among devices, and/or combined in whole or part with other devices.

Without limitation to any other aspect of the present disclosure, example embodiments of devices set forth throughout the present disclosure, including circuits, controllers, computing devices, modules, engines, configurable switches, configurable gateways, converged network devices, managers, evaluators, creators, applications, and other similar terminology, include any one or more of: any sensor present on the vehicle and/or communicative coupling to any such sensor (e.g., an electrical interface, LIN interface, A/D processing of a sensor signal, etc.); any actuator present on the vehicle and/or communicative coupling to any such actuator (e.g., electrical interface, LIN interface, command interface to the actuator, feedback interface from the actuator, etc.); any controller and/or computing device on the vehicle, cloud server, external device, etc., including processing resources, storage resources, I/O resources, and/or communication resources thereof; instructions stored on a computer readable medium, where the instructions are configured such that a computing device executing the instructions thereby performs one or more operations of the device; and/or access to any one or more of these either directly (e.g., accessing a parameter from a memory value of a controller, inserting a command value into a memory value of a controller, etc.) or indirectly (e.g., accessing a parameter on a network zone of the vehicle, providing a command value to a controller on a network zone of the vehicle, sending requests or commands to a controller of the vehicle, exercising an interface to access parameters, send commands, configure features, sensors, actuators, and/or control operations, etc.).

The example apparatus 2700 includes a policy acquisition circuit 2704 structured to interpret a vehicle policy data value 2710 including a driver information description 2712. The example vehicle policy data value 2710 may include a policy provided to the vehicle, for example as described throughout the present disclosure, a parsed portion thereof (e.g., a processed policy with portions of the policy relevant to the apparatus 2700 provided to and/or made available to the apparatus 2700, etc.). Without limitation to any other aspect of the present disclosure, the vehicle policy data value 2710 includes one or more of: data to be collected from the vehicle; features to be enabled or disabled on the vehicle;

configuration of feature parameters (e.g., set point values, available ranges configurable by the operator, minimum or maximum values to be enforced, display settings, data collection time ranges, sampling rates, storage amounts, etc.); and/or triggering conditions for any of the foregoing (e.g., data values, events, thresholds, etc. where data collection, feature adjustments, etc. operations are performed in response to these). The driver information description 2712 may include any one or more of a driver role (e.g., part-time, full-time, employee, contractor, commercial license type, owner, etc.); a driver identifier (e.g., identification of a specific driver; identification of whether a driver belongs to a specified group of drivers; identification of a classification of the driver, etc.); and/or a driver state value (e.g., operating at a certain number of hours into a driving event; having a certain driver performance value or category; having a certain fuel efficiency performance value or category, etc.). It can be seen that the vehicle policy data value 2710 including the driver information description 2712 provides for adjustments to data collection and/or monitoring parameters in response to a range of driver related conditions that may be of interest, and allows for configuration of features, changes in monitored values, changes in data collection operations, etc. based upon any selected driver criteria, such as the type of driver, past performance of the driver, events detected related to the driver, and the like. It can also be seen that the vehicle policy data value 2710 including the driver information description 2712 allows for monitoring, configuration, and/or data collection operations to be utilized for a given driver regardless of the vehicle—for example configuring a vehicle for driver preferences, data monitoring, display values, and the like, even where a driver switches vehicles. In certain embodiments, for example where a driver role or other general driver information description is utilized, the vehicle policy data value 2710 can automatically adjust collection, monitoring, and configuration operations without taking in any new policy information—for example where an apparatus 2700 is configured to perform one set of operations for drivers that are "owners" and another set of operations for drivers that are "operators." In certain embodiments, for example when information specific to a particular driver is utilized (e.g., driver history, driver performance, driver operating hours, etc.), the vehicle policy data value 2710 can be downloaded from an external device (e.g., from a cloud server, external device coupled to the vehicle through a port, WiFi, etc., and/or from a driver associated device such as a mobile device carried by the driver), either in whole or relevant portions thereof, allowing for configuration of the collection, monitoring, and/or configuration operations specific to the particular driver. In certain embodiments, data specific to the driver may be kept after the driver switches to another vehicle (e.g., preserving history, performance, and/or other individualized data on the vehicle)—for example to allow for a reduction in the data to be collected from the vehicle policy data value 2710 if the driver returns to the original vehicle. In certain embodiments, data specific to the driver may be removed immediately after the driver switches to another vehicle, and/or kept for a period of time and expired after a selected time period, event, confirmation that the driver is using another vehicle, etc. The configuration of whether data specific to the driver is kept, deleted, migrated to another vehicle, saved on a cloud server, and/or expiration criteria for such data, may be included within the vehicle policy data value 2710.

The example apparatus 2700 includes a policy processing circuit 2706 that generates, in response to and based at least in part on the vehicle policy data value 2710, parsed policy data that includes a vehicle data collection description 2714. The description utilizing parsed policy data includes consideration that a policy herein may include any one or more of: parameters to be collected; storage allocation for collected parameters; transmission resource allocation for collected parameters; priority values associated with collection instances (e.g., a group of parameters to be collected together, time ranges for collection of the group of parameters, etc.) including priority for collection operations, utilization of on-vehicle network resources, utilization of off-vehicle transmission resources, utilization of processing resources (e.g., to configure and/or provide parameters, to process and/or format parameters, and/or to perform expiration processing such as summarization, aggregation, and/or compressing operations where applicable); utilization of storage resources (e.g., cache storage, buffer storage, rolling buffer storage, and/or shared storage resources, including resources for collected data, intermediate processing data related to the collected data, and supporting data such as trigger evaluation data, short term historical data, and the like). The parsed policy data includes portions of the vehicle policy data value 2710 that are parsed for the vehicle (e.g., determining parameter names, end point locations, sample rates, units, formatting, etc. specified for collected data) and provided to or made accessible to end points of the vehicle that provide the responsive data, perform supporting operations for the data, process the data, and/or store the data. In certain embodiments, the policy processing circuit 2706 determines how the formatting of the collected data should be performed based on the requested data criteria (e.g., sampling rates, units, metadata, etc.) and the available responsive data on the vehicle. In certain embodiments, the policy processing circuit 2706 manages translation between the external data request made (e.g., "ambient temperature") and the data on the vehicle which is responsive to the external data request made—for example allowing successful operation regardless of the configuration of network zones and/or end points on the vehicle, the version of parameters, controls, or interfaces on the vehicle, and the like. In certain embodiments, the policy processing circuit 2706 is capable of updating the parsed policy data, for example in response to a change in the vehicle configuration (e.g., an end point moves from one network zone to another network zone, a parameter name changes on a controller of the vehicle, a parameter formatting changes on the vehicle—for example using a different unit, bit depth, resolution, sampling rate, etc.), and/or a parameter source changes (e.g., a parameter provided by a first controller is now provided by a second controller, and/or an off-nominal condition such as a sensor failure, fault condition, etc. causes a parameter source to change)—which may be performed, in certain embodiments, without an update to the vehicle policy data value 2710. For example, the policy passed to the vehicle may result in a first parsed policy data at a first time, and a second parsed policy data at a second time, without a change in the policy passed to the vehicle. In the example, both the first parsed policy data and the second parsed policy data may be responsive to the policy passed to the vehicle, although performance relative to the policy may vary (e.g., if a second source of a parameter is inferior or superior to the original source in some manner). In a further example, the second parsed policy data may not be fully responsive to the policy passed to the vehicle—for example when a requested parameter is no longer available, a requesting entity providing at least a portion of the policy passed to the vehicle no longer has sufficient authorization, etc.

The operations of the policy processing circuit 2706, and the implementation of the policy passed to the vehicle—whether utilizing parsed policy data or another implementation—are not specific to the apparatus 2700, and any devices referenced throughout the present disclosure may perform similar implementation operations, including any devices that perform any one or more of: receive and/or process a policy passed to the vehicle; prepare end points of the vehicle to support data collection, data collection support, trigger evaluation, storage operations, feature configuration, transmission operations, and/or automated operations; determine priority values related to data types, associated flows, associated applications, associated vehicle functions, requesting and/or providing end points, and/or requesting and/or providing entities for collected data, processing of collected data, storage of collected data, and/or transmission of collected data. The description of FIG. 27 is provided in the context of a policy passed to the vehicle for clarity in illustrating certain aspects of the present disclosure. In certain embodiments, the concept(s) represented by a vehicle policy data value 2710 may additionally or alternatively be referenced as a policy of any type, a data request, an automated operation value, a trigger description value, an actuator command value, a remote access request value, or similar terminology as will be understood in the particular context.

The example apparatus 2700 includes a policy execution circuit 2708 structured to collect vehicle data 2722 from one or more end points 2716 of at least one network zone (e.g., first network zone 2718 and second network zone 2720 in the example of FIG. 27) of a vehicle in response to the parsed policy data. The example policy execution circuit 2708 provides the collected vehicle data 2722 responsive to the vehicle policy data value 2710, which may be stored, transmitted, utilized to determine whether a trigger event is detected (e.g., triggering further data collection, an automated response, a change in data collection parameters, etc.), or utilized in any other operations as set forth throughout the present disclosure.

An example apparatus 2700 includes the end points 2716 (e.g., end points providing data for collection, and/or responding to actuation commands in the vehicle policy data value 2710) positioned on at least two different network zones of the vehicle. An example driver information description 2712 includes a driver characteristic, for example to be compared to present driver information 2714 (e.g., describing a driver role, driver identification, historical and/or performance data for the driver, etc.) to adjust the vehicle policy data value 2710 and/or to perform collection operations pursuant to the vehicle policy data value 2710 that are responsive to characteristics of the present driver of the vehicle. An example policy execution circuit 2708 interprets the present driver information 2714, comparing it to a driver characteristic of the driver information description 2712, and collects the vehicle data 2722 in response to the comparison—for example tailoring the parameters collected, features configured, formatting of collected data, etc. in response to the comparison. An example driver information description 2712 includes a description of monitoring data for a driver of the vehicle—for example tailoring monitoring parameters (e.g., speed, location, utilization of features, driving performance parameters, etc.) to the driver role, specific identified driver, and/or any other driver characteristic.

Figure 28:
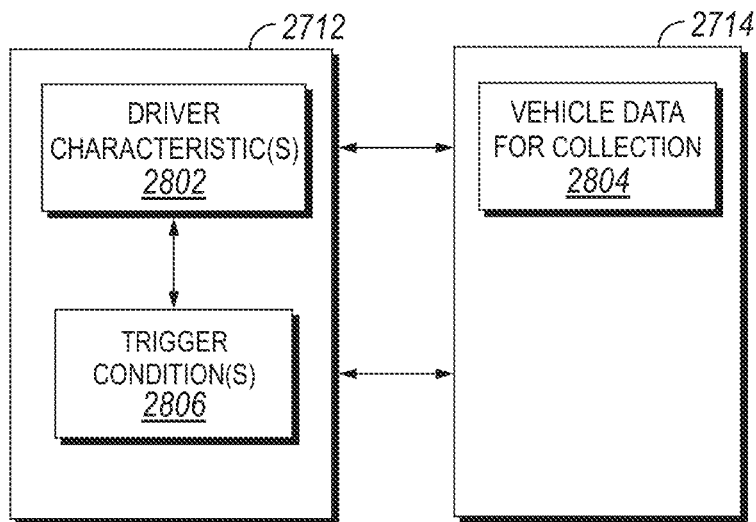
FIG. 28 is a schematic diagram of an example driver information description according to certain embodiments of the present disclosure.

Referencing FIG. 28, an example driver information description 2712 includes a trigger condition 2806, where the policy execution circuit 2708 collects vehicle data 2722 based on the trigger condition 2806 and/or driver characteristic 2802. The vehicle data collected in response to the trigger condition 2806 may be specified vehicle data 2804 provided in the vehicle data collection description 2714. For example, the trigger condition 2806 may indicate an event or data value to collect the vehicle data 2804, for example in response to a high speed event, a high acceleration event, an extended operating period of the vehicle, detection of a fault condition or diagnostic value, etc. The utilization of the trigger condition 2806 and/or driver characteristic 2802 allows for data collection in response to activity of interest on the vehicle, and further in response to a characteristic of the driver such as years of experience, driver role, location of the driver (e.g., a home location, current location, licensing location, etc.). Example and non-limiting trigger condition(s) 2806 include one or more of: an event detection condition (e.g., parameter values and/or processed parameter values indicating an event has occurred); a driver characteristic value (e.g., data collection in response to a driver condition, a change in the driver condition such as hours of activity or a status change); a driver classification value (e.g., license type, performance indicator, experience indicator, ownership type, etc.); and/or a driver performance value (e.g., efficiency performance, safe operation performance, feature utilization performance, etc.). In certain embodiments, the collected vehicle data 2722 includes data collected in response to the determination of an event occurrence based on a comparison of some of the collected data values to the trigger condition 2806.

Figure 29:
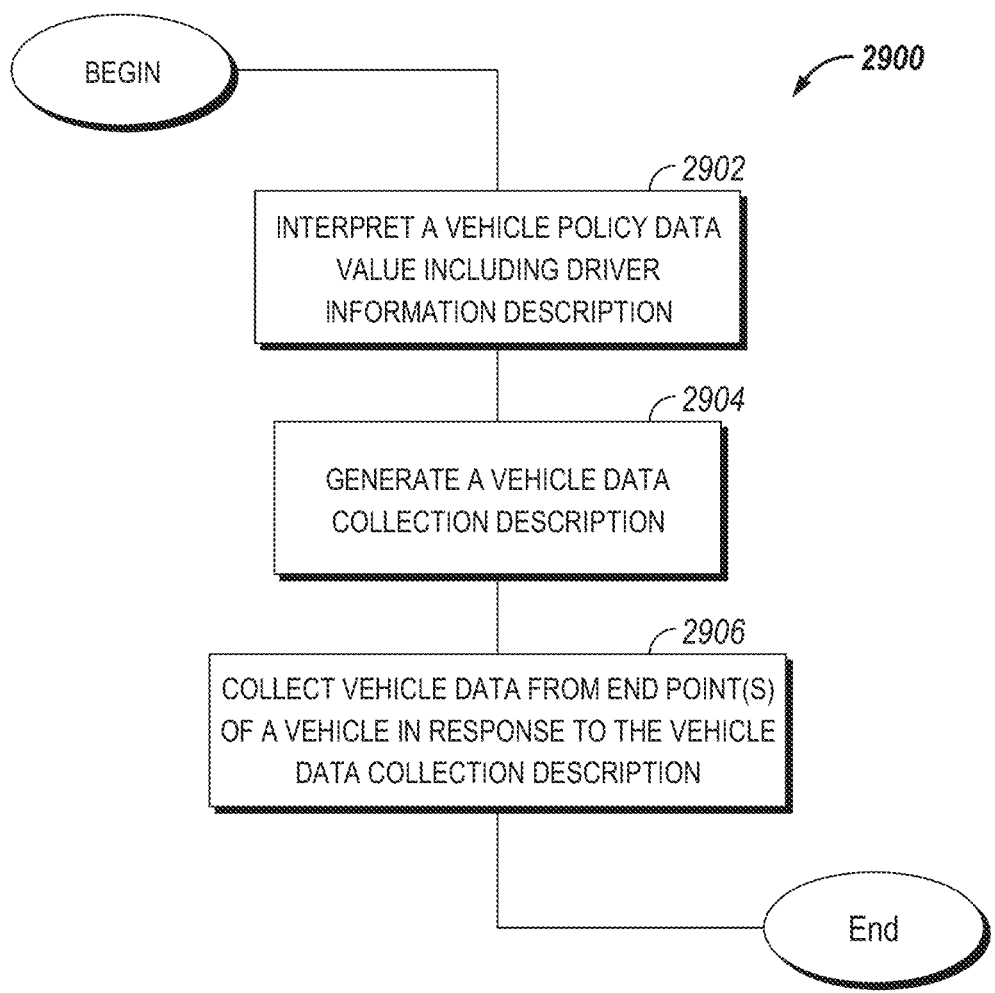
FIG. 29 is a flow chart depicting an example procedure for collecting data in response to a driver information description according to certain embodiments of the present disclosure.

Referencing FIG. 29, an example procedure 2900 for collecting data in response to a driver information description, for example to provide driver monitoring and/or collection of data based on a driver characteristic is schematically depicted. The example procedure 2900 includes an operation 2902 to interpret a vehicle policy data value including a driver information description, and an operation 2904 to generate a vehicle data collection description in response to the vehicle policy data value. The example procedure 2900 further includes an operation 2906 to collect vehicle data from end points of the vehicle in response to the vehicle data collection description. The collected data may be stored, used to determine whether a trigger condition has been met and/or an event has occurred, transmitted in whole or part to an external device (e.g., associated with an entity and/or application providing the vehicle policy data value or relevant portions thereof), and/or may be expired according to criteria in the vehicle policy data value.

Figure 30:
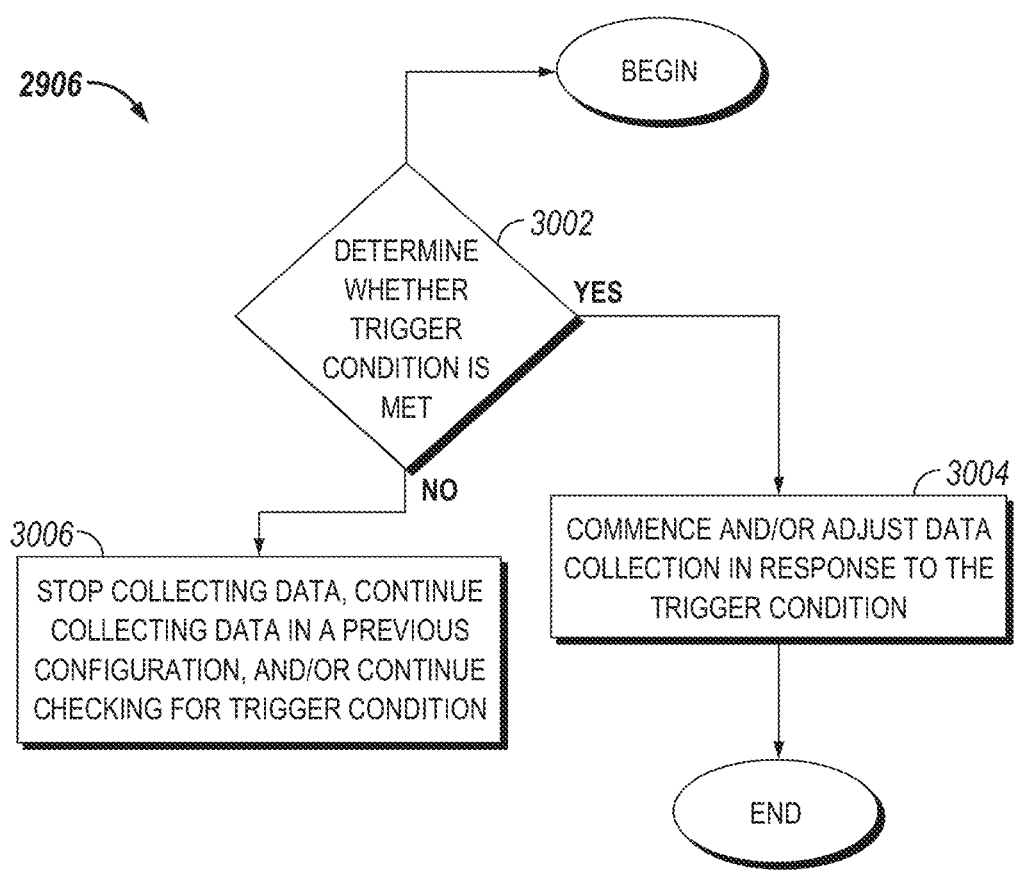
FIG. 30 is a flow chart depicting an example procedure for performing collection operations responsive to a vehicle policy data value and/or driver information description according to certain embodiments of the present disclosure.

Referencing FIG. 30, an example procedure 2906 for performing collection operations responsive to the vehicle policy data value and/or driver information description is schematically depicted. The example procedure 2906 includes an operation 3002 to determine whether a trigger condition is met, and in response to the operation 3002 determining "YES", the procedure 2906 includes an operation 3004 to commence and/or adjust data collection operations. In response to the operation 3002 determining "NO", the procedure 2906 includes an operation 3006 to stop collecting data, to continue collecting data in a previous configuration (e.g., not changing collection operations), and/or to continue checking for the trigger condition (e.g., return to operation 3002).

Figure 31:
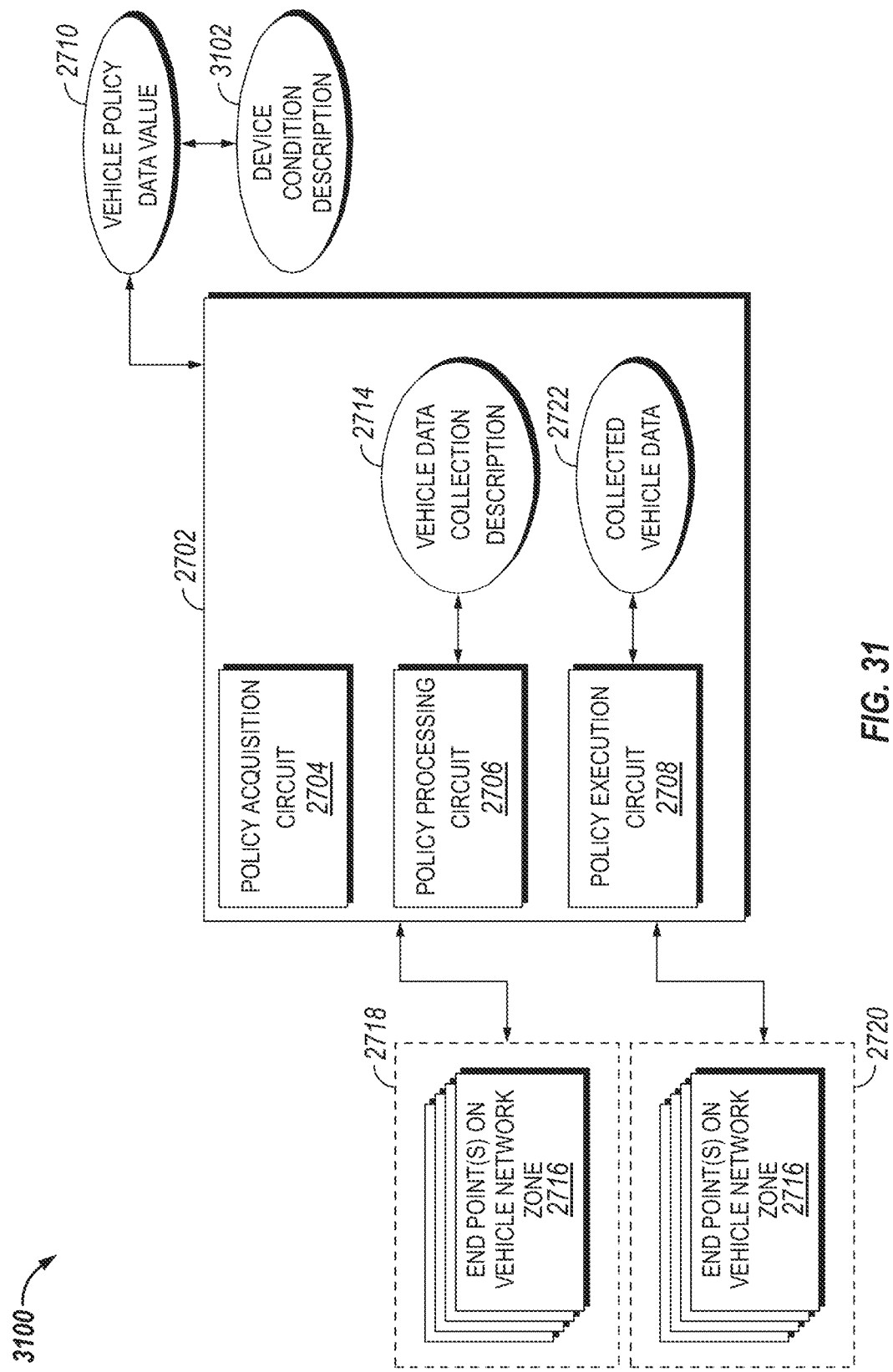
FIG. 31 is a schematic diagram of an example apparatus for providing data collection operations in response to a vehicle policy data value according to certain embodiments of the present disclosure.

Referencing FIG. 31, an example apparatus 3100 is depicted to provide data collection operations in response to a vehicle policy data value, including commencing, changing, and/or stopping data collection operations based on fault codes from devices on the vehicle. Descriptions herein referencing fault codes should be understood broadly, and include operations based on: fault code values (e.g., as determined by control operations, provided by relevant devices such as sensors, actuators, etc., and/or as determined from other parameters such as diagnostic algorithms, rationality checks, comparisons to other data values, etc.); fault counters (e.g., managing data used in fault determination, such as incrementing or decrementing counters or the like); a diagnostic value (e.g., an output of a diagnostic operation such as "PASS", "FAIL", "SUSPECT", etc., and/or intermediate values that may indicate a diagnostic operation has a preliminary indication of off-nominal operation even if the diagnostic operation has not yet diagnosed a failure, and/or that may indicate the diagnostic operation has a preliminary indication that an off-nominal operation may be returning to normal even if the diagnostic operation has not yet determined that off-nominal operation has cleared); and/or a diagnostic trouble code (e.g., a parameter utilized to indicate a diagnostic event and/or state, which may be an industry standard code, proprietary code, or any other diagnostic trouble code).

The example apparatus 3100 further includes the policy acquisition circuit 2704 that interprets the vehicle policy data value 2710 including a device condition description 3102, for example indicating which fault and/or diagnostic parameters, and/or which devices, are to be utilized to commence, change, and/or stop data collection operations. The example apparatus 3100 operates similarly to apparatus 2700, for example determining parsed policy data responsive to the vehicle policy data value 2710 and the device condition description 3102. The example apparatus 3100 allows for configuration of data collection operations responsive to any device in the system, for example any end point, sensor, actuator, control operation, or the like, and allows for the tailoring of data collection responsive to fault activity generally (e.g., collecting specified data whenever a fault occurs, and/or whenever a fault occurs from a group of faults that are of interest) and/or to specific fault activity (e.g., collecting specified data based on the specific fault—for example to determine if highly correlated faults have also occurred and/or may occur soon, to gather specific information related to the fault to determine a root cause of the fault, and/or to capture historical information preceding the fault occurrence). The operations of the apparatus 3100 may be utilized to support alternate operations (e.g., determining whether to utilize a substitute data value, control operation, or the like responsive to the fault occurrence); to support knowledge generation related to the vehicle and/or a group of vehicles (e.g., to accumulate the collected data with data from other vehicles and/or previous occurrences of the fault on the current vehicle, which may be utilized to improve the design, improve prognostication of faults, and/or improve service and/or diagnostic operations responsive to the fault occurrence); and/or for any other purpose (e.g., warranty execution and/or response, provision of alerts and/or notifications to the operator, service personnel, a fleet owner, etc.).

An example device condition description 3102 includes a description of vehicle data to be collected based on at least one of a device fault value or a device diagnostic value (e.g., collecting data in response to the fault value or diagnostic value becoming active, becoming inactive, having a counter value begin incrementing, decrementing, or achieving a selected value, etc.). The utilization of the device condition description 3102 allows for responsive activity to the fault or diagnostic value, for example performing data collection for a fault value based on a time since the fault value was last activated and/or last deactivated, responsive to a collection of fault values (e.g., beginning data collection when three fault values out of a selected group of twenty fault values have become active), and/or responsive activity to an intermediate value utilized in a fault and/or diagnostic operation, such as counters, threshold comparisons, and the like, which may show activity prior to the fault or diagnostic value being cleared, confirmed, etc.

In certain embodiments, the vehicle data collection description 2714 is determined in response to the vehicle policy data value 2710, and includes a description of vehicle data to be collected based on the criteria within the vehicle policy data value 2710. The vehicle policy data value 2710 may collect data related to a device associated with device condition description 3102, but may additionally or alternatively collect data associated with any other device on the vehicle. For example, an apparatus 3100 may be configured to collect data related to a faulted device, such as vehicle speed data related to a faulted speed sensor (e.g., where the vehicle speed data may capture outputs of the faulted speed sensor, and/or other related data such as a voltage supply to the speed sensor, etc.), and/or collect other data not related to the faulted speed sensor (e.g., current gear of the vehicle, power supply values throughout the system of the vehicle, multimedia activity data, etc.), that may be utilized in any manner as described. An example description of the monitoring data, for example as set forth in the vehicle data collection description 2714, includes at least one data value such as: a fault condition value; a fault count value; a diagnostic parameter value; a fault confirmation value; a diagnostic confirmation value; a fault intermediate value; or a diagnostic intermediate value.

Figure 32:
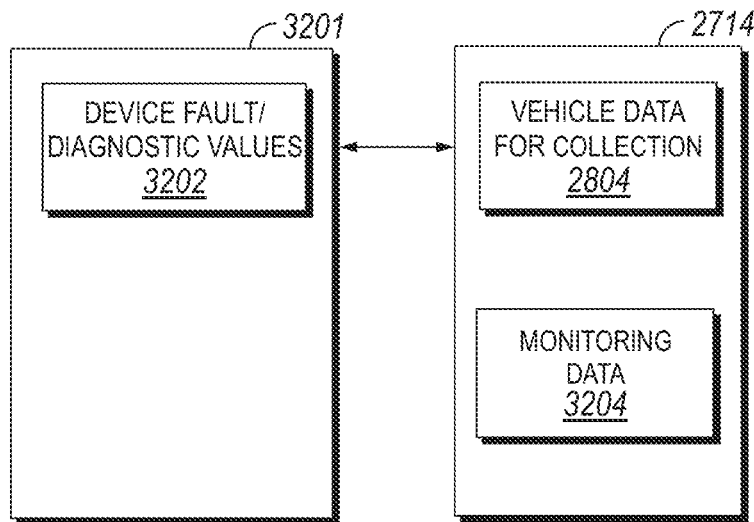
FIG. 32 is a schematic diagram of an example monitoring data description according to certain embodiments of the present disclosure.

Referencing FIG. 32, an example monitoring data description 3201, for example utilized with apparatus 3100, include device fault and/or diagnostic values 3202, which may be for the device of the device condition description 3102, or for another device on the vehicle. The example of FIG. 32 includes the vehicle data collection description 2714 having vehicle data for collection 2804, and in the example further having monitoring data 3204, for example related to the device of the device condition description 3102 or another device of the vehicle. In certain embodiments, monitoring data 3204 and/or collection operations are responsive to trigger conditions, for example as described in relation to FIG. 28.

Figure 33:
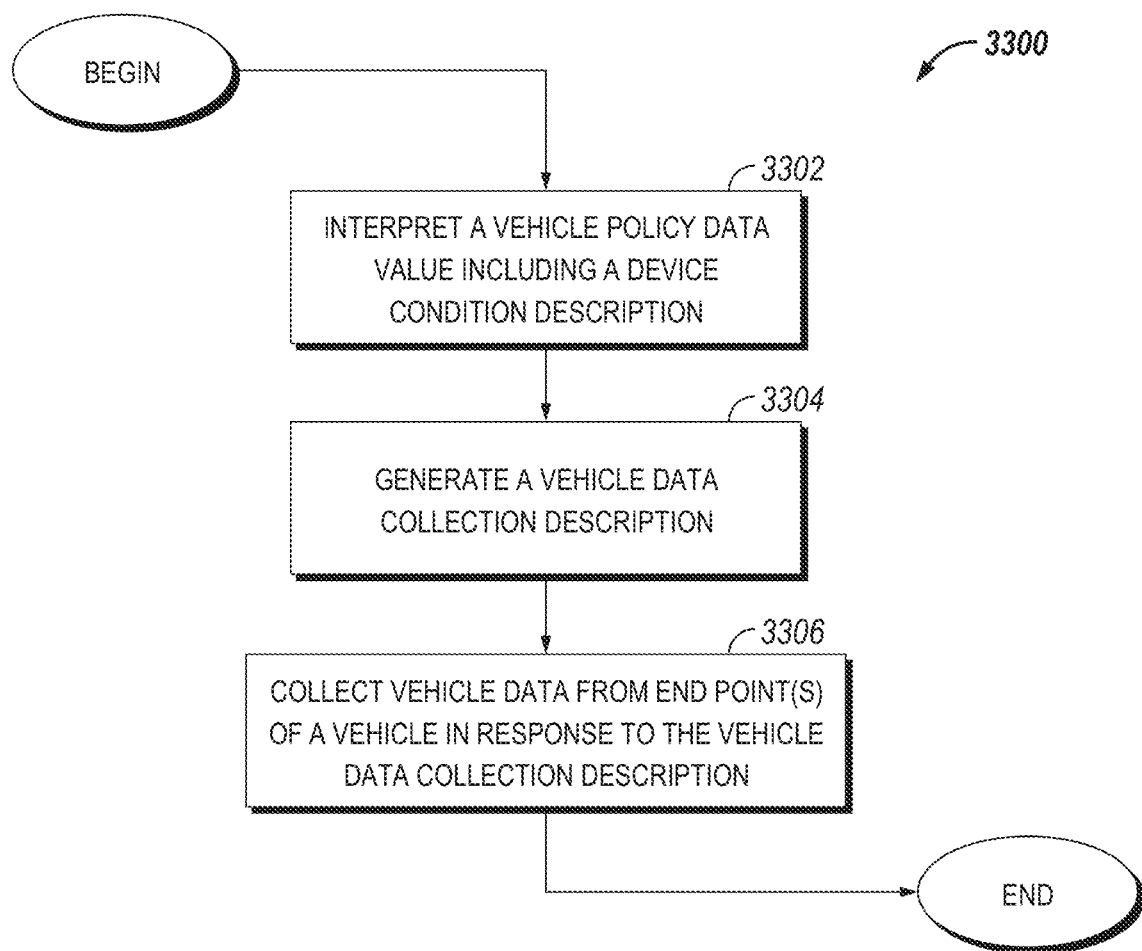
FIG. 33 is a flow chart depicting an example procedure for implementing a policy responsive to fault and/or diagnostic values for device(s) in a vehicle system according to certain embodiments of the present disclosure.

Referencing FIG. 33, an example procedure 3300 for implementing a policy responsive to fault and/or diagnostic values for device(s) in a vehicle system is schematically depicted. The example procedure 3300 includes an operation 3302 to interpret a vehicle policy data value including a device condition description, and an operation 3304 to generate a vehicle data collection description in response to the vehicle policy data value. The example procedure 3300 further includes an operation 3306 to collect vehicle data from end points of the vehicle in response to the vehicle data collection description.

Figure 34:
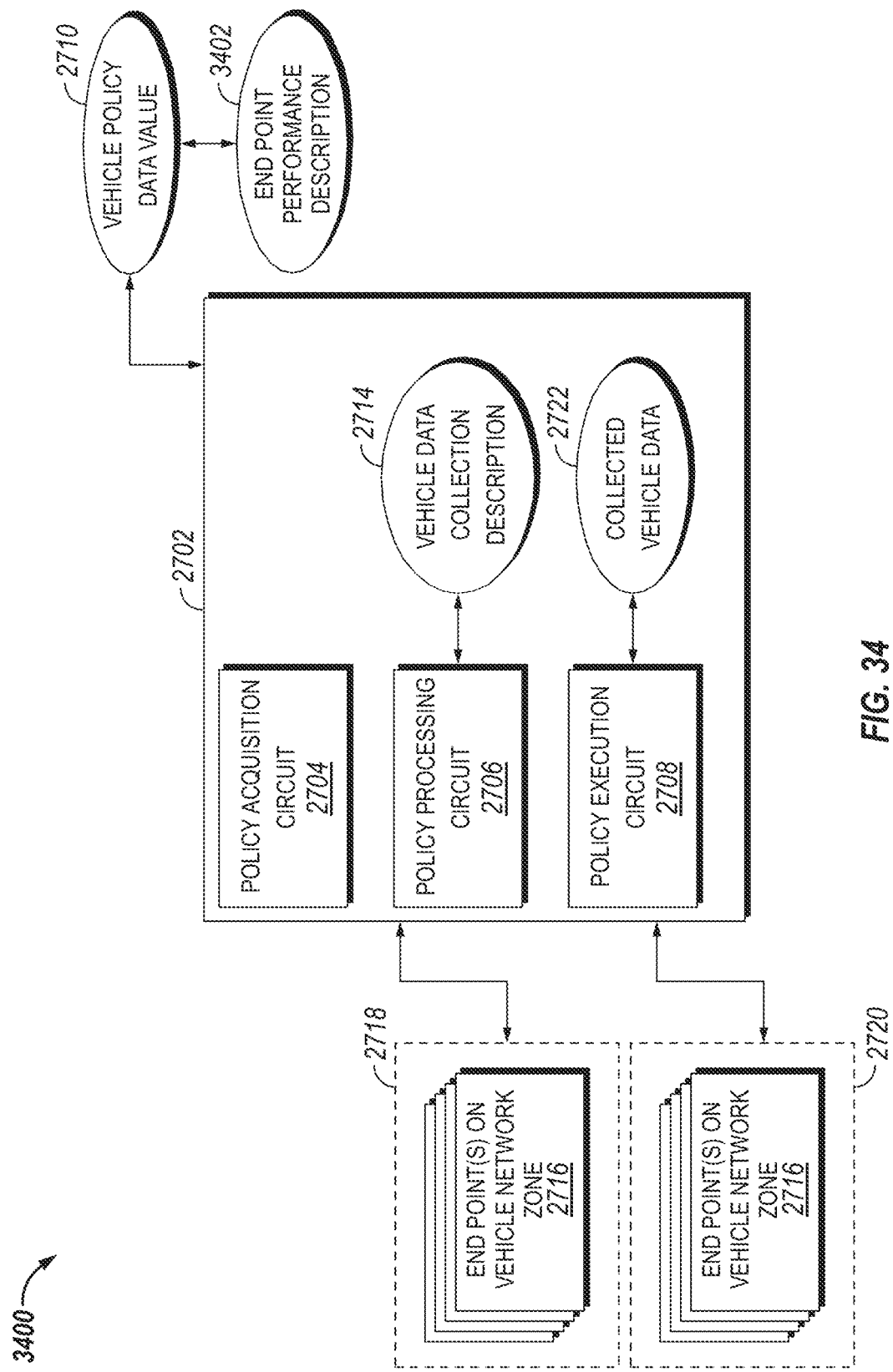
FIG. 34 is a schematic diagram of an example apparatus for providing data collection operations in response to a vehicle policy data value according to certain embodiments of the present disclosure.

Referencing FIG. 34, an example apparatus 3400 is depicted to provide data collection operations in response to a vehicle policy data value, including commencing, changing, and/or stopping data collection operations based on end point performance description(s) for end points of the vehicle. For example, operations of the apparatus 3400 allow for selected data collection, and/or adjustments of collected data, based on indications of capability of the end point, changes to the end point, and/or a configuration of the vehicle that can be determined based on the end point performance (e.g., a sensor or actuator capability that provides an indication that the vehicle is provided in a certain configuration—for example the presence of a particular sensor, and/or an output value or resolution provided by the sensor, may indicate that a particular vehicle configuration, feature set, performance rating, etc. is present on the vehicle).

The example apparatus 3400 includes the policy acquisition circuit 2704 that interprets a vehicle policy data value 2710 including an end point performance description 3402, and a policy processing circuit 2706 that generates parsed policy data including a vehicle data collection description 2714, based at least in part on the vehicle policy data value 2710. The apparatus 3400 otherwise operates similarly to apparatus 2700 and apparatus 3100.

Figure 35:
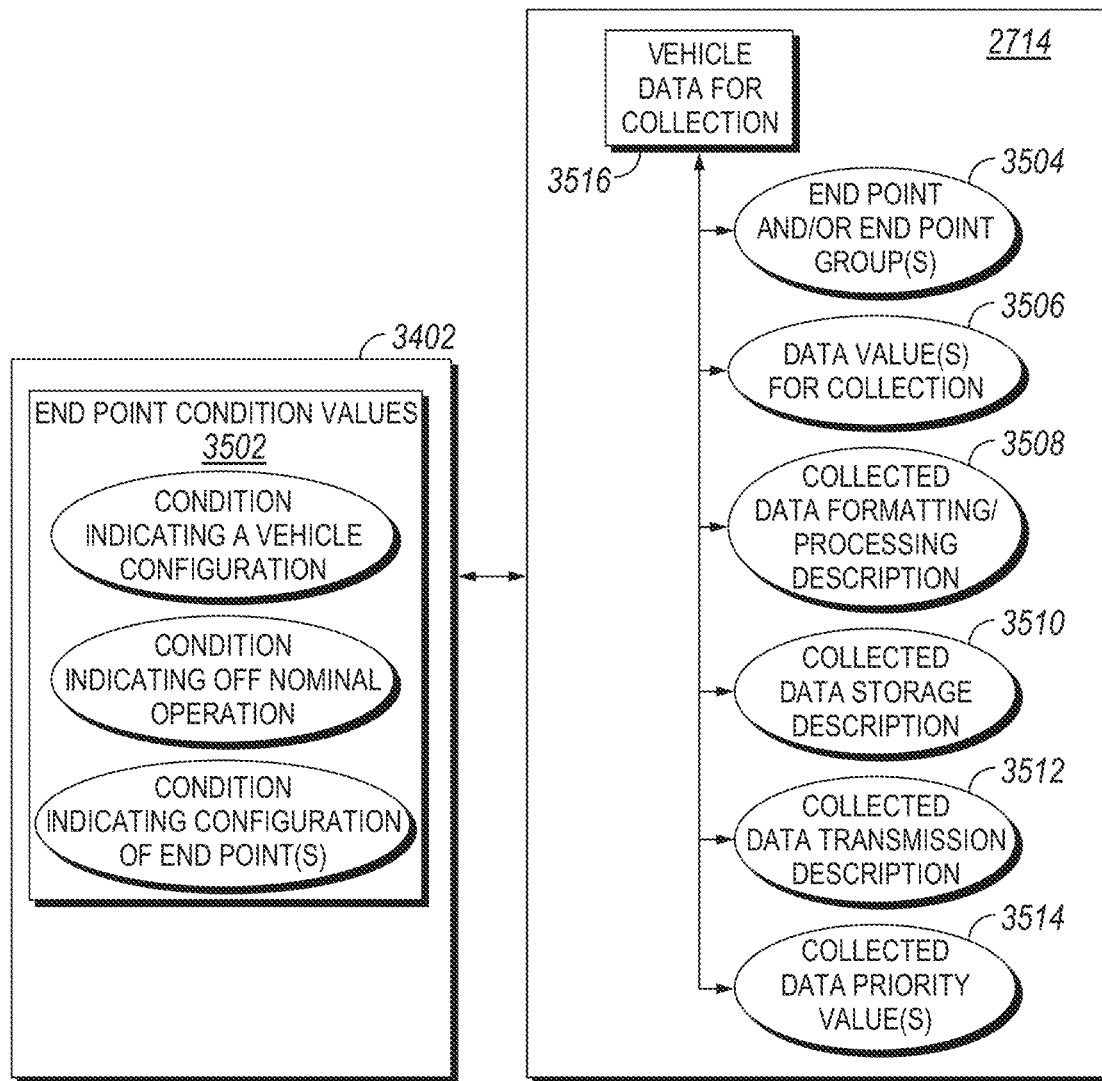
FIG. 35 is a schematic diagram of example end point performance descriptions according to certain embodiments of the present disclosure.

Referencing FIG. 35, example end point performance descriptions 3402 include end point condition values 3502, such as a condition indicating a vehicle configuration (e.g., an end point condition that indicates which vehicle configuration is active—such as network zone arrangements; location of end points on network zones; parameter names and/or formatting available on the vehicle; and/or features, applications, and/or flows active on the vehicle), a condition indicating off nominal operation (e.g., values provided by the end point that may indicate that an off-nominal condition is present, such as data values and/or ranges, availability of parameters, fault and/or diagnostic codes, a match between an expected value and an observed value based on operating conditions of the vehicle, etc.), and/or a condition indicating a configuration of one or more end points of the vehicle (e.g., where a value from the end point, such as a data value, status value, network address value, end point identifier, etc., indicates a configuration on the vehicle of the end point and/or one or more other end points, where the configuration may be any one or more of: features, applications, or flows associated with one or more end points; a location of control operations on one or more end points; the presence or absence of one or more data values; arrangement of network zones and/or end points on the network zones; formatting of data values available on the vehicle, etc.). The example apparatus 3400 includes the vehicle data collection description 2714, generated from the end point performance description 3402, including vehicle data for collection 3516 generated in response to the end point performance description 3402. Example and non-limiting vehicle data for collection 3516 examples include: end point and/or end point groups 3504 (e.g., end point locations, sources for parameters, and/or end points of interest where data should be collected in response to the performance condition of the end point(s) of the end point performance description 3402); data value(s) for collection 3506 (e.g., values of interest based on the performance description, confirming and/or verifying values, values that may be utilized to diagnose and/or prognosticate a performance change, and/or values to determine a consequence of the end point performance, mitigating actions for the end point performance, and/or to determine if related end points, applications, flows, or the like have been or will be affected by the end point performance); a collected data formatting and/or processing description 3508 (e.g., formatting and/or processing operations that should be performed in response to the end point performance, for example where the sampling rate, data resolution, bit depth, units, parameter names, metadata, or the like should be adjusted based on the end point performance); a collected data storage description 3510 (e.g., increasing and/or decreasing memory allocation, changing a storage priority, changing a data expiration time, etc., for example to increase the likelihood that related data will survive until transmission is available, to de-prioritize data collection in response to the end point performance indicating nominal or expected operation, and/or to preserve data for later access by a service tool or other operation); a collected data transmission description 3512 (e.g., increasing and/or decreasing a transmission priority, moving the data within a selected time frame—for example making the transmission urgent in response to the end point performance, and/or changing a data transmission limit such as a data cap or bandwidth limitation in response to the end point performance); and/or a collected data priority value 3514 (e.g., changing a priority value for the collected vehicle data 2722 responsive to the vehicle data for collection 3516, which may be utilized in any manner as described throughout the present disclosure, including at least determining processing resources, transmission resources, memory resources, bandwidth resources, data expiration management, data processing management, or the like for the associated data).

An example end point performance description 3402 includes a first data value to be collected in response to a target end point being in a first condition, and a second data value to be collected in response to the target end point being in a second condition. The utilization of the first condition and the second condition allows for changing the data to be collected based on any condition of the end point, including at least a type of the end point, a status of the end point (e.g., nominal, passed, failed, suspect, etc.), and/or another aspect of the vehicle that is indicated by the condition of the end point. An example apparatus 3400 includes the target end point in the first condition indicating a first vehicle configuration, and the target end point in the second condition indicating a second vehicle configuration. An example apparatus 3400 includes the target end point in the second condition indicating the target end point is determined to be in an off-nominal condition, such as: a failed condition, a faulted condition, a non-responsive condition, and/or a lost communication condition. An example apparatus 3400 includes the target end point in the first condition indicating a first target end point configuration (e.g., a sensor type, actuator type, version of a related application, flow, and/or control operation, etc.), and where the target end point in the second condition includes a second target end point configuration. The first data value includes data to be collected from a first end point group (e.g., the target end point in the first condition indicates that the vehicle data collection description 2714 is directed to a group of parameters from the first end point group, which may include the target end point or not), and the second data value includes data to be collected from a second end point group (e.g., the target end point in the second condition indicates that the vehicle data collection description 2714 is directed to a group of parameters from the second end point group, which may include the target end point or not). In certain embodiments, the first end point group and the second end point group may include one or more, or all, of the same end points, with the differences between the first end point group and the second end point group being limited to the overall parameter selection for collection from each end point group. In certain embodiments, and end point group (e.g., the first end point group and/or the second end point group) may include a single end point—for example and without limitation, a highly capable controller managing a large number of sensors, actuators, and/or control operations, may have a large number of parameters available, such that the parameters expressed by the first end point group and/or the second end point group may all be available from the single highly capable end point. In certain embodiments, the first end point group and the second end point group include at least one distinct data value (e.g., data values for collection from the first end point group have at least one different value from data values for collection from the second end point group) for collection. In certain embodiments, the first end point group and the second end point group include at least one distinct end point (e.g., end points making up the first end point group have at least one different end point from end points making up the second end point group). In certain embodiments, differences between the first end point group and the second end point group are present, additionally or alternatively, in other dimensions than the data values or the end points, for example priority values, formatting values, processing values, sampling rates, etc.

The embodiments of FIGS. 34-35 are described, for purposes of illustration, with regard to data collection operations responsive to an end point performance description. Additionally or alternatively, operations of an apparatus 3400 may adjust one or more of: feature parameters; enabling or disabling features; commencing and/or stopping data collection; and/or activating one or more actuators, in response to the end point performance description.

Figure 36:
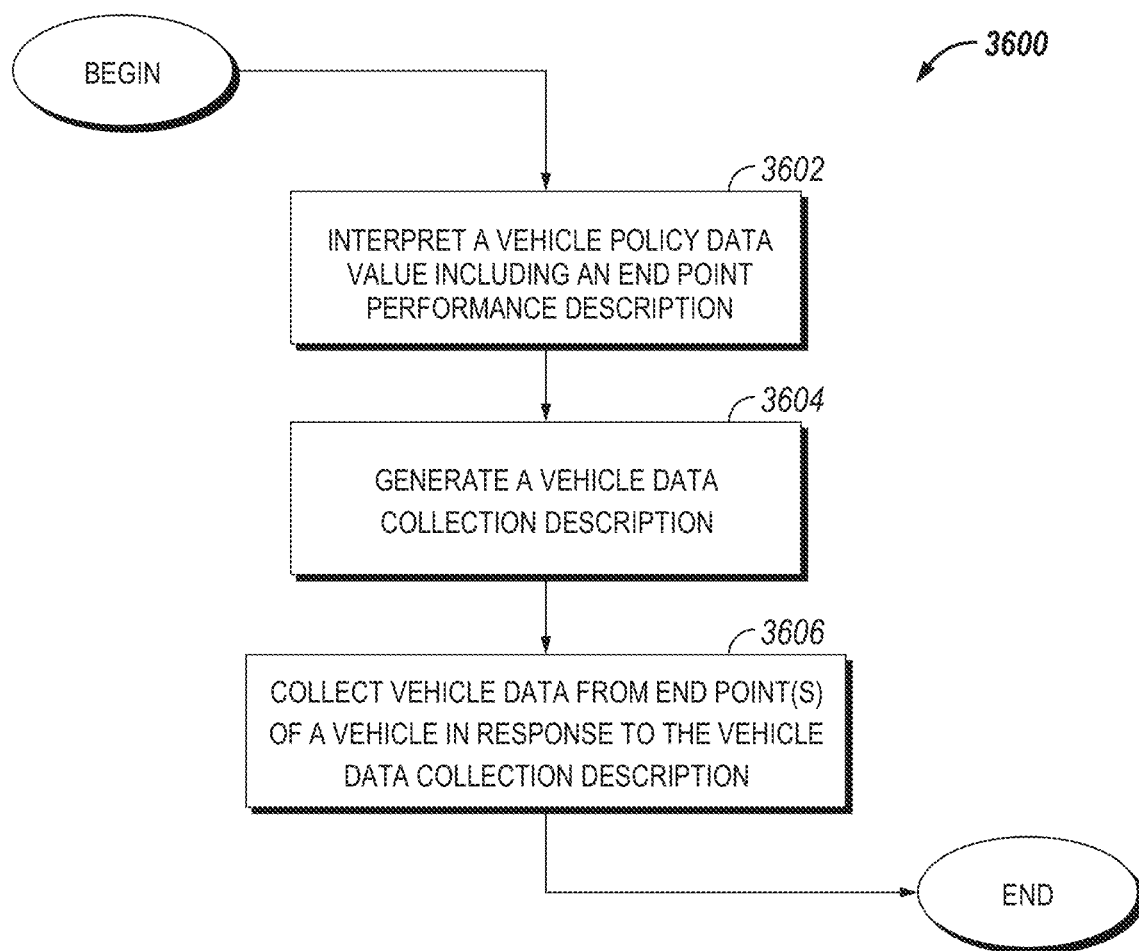
FIG. 36 is a flow chart depicting an example procedure for performing operations to adjust data collection in response to an end point performance description according to certain embodiments of the present disclosure.

Referencing FIG. 36, an example procedure 3600 for performing operations to adjust data collection in response to an end point performance description is schematically depicted. The example procedure 3600 includes an operation 3602 to interpret a vehicle policy data value in response to an end point performance description, and an operation 3604 to generate a vehicle data collection description—for example based on parsed policy data from the vehicle policy data value. The example procedure 3600 further includes an operation 3606 to collect vehicle data from end points of the vehicle in response to the vehicle data collection description.

Figure 37:
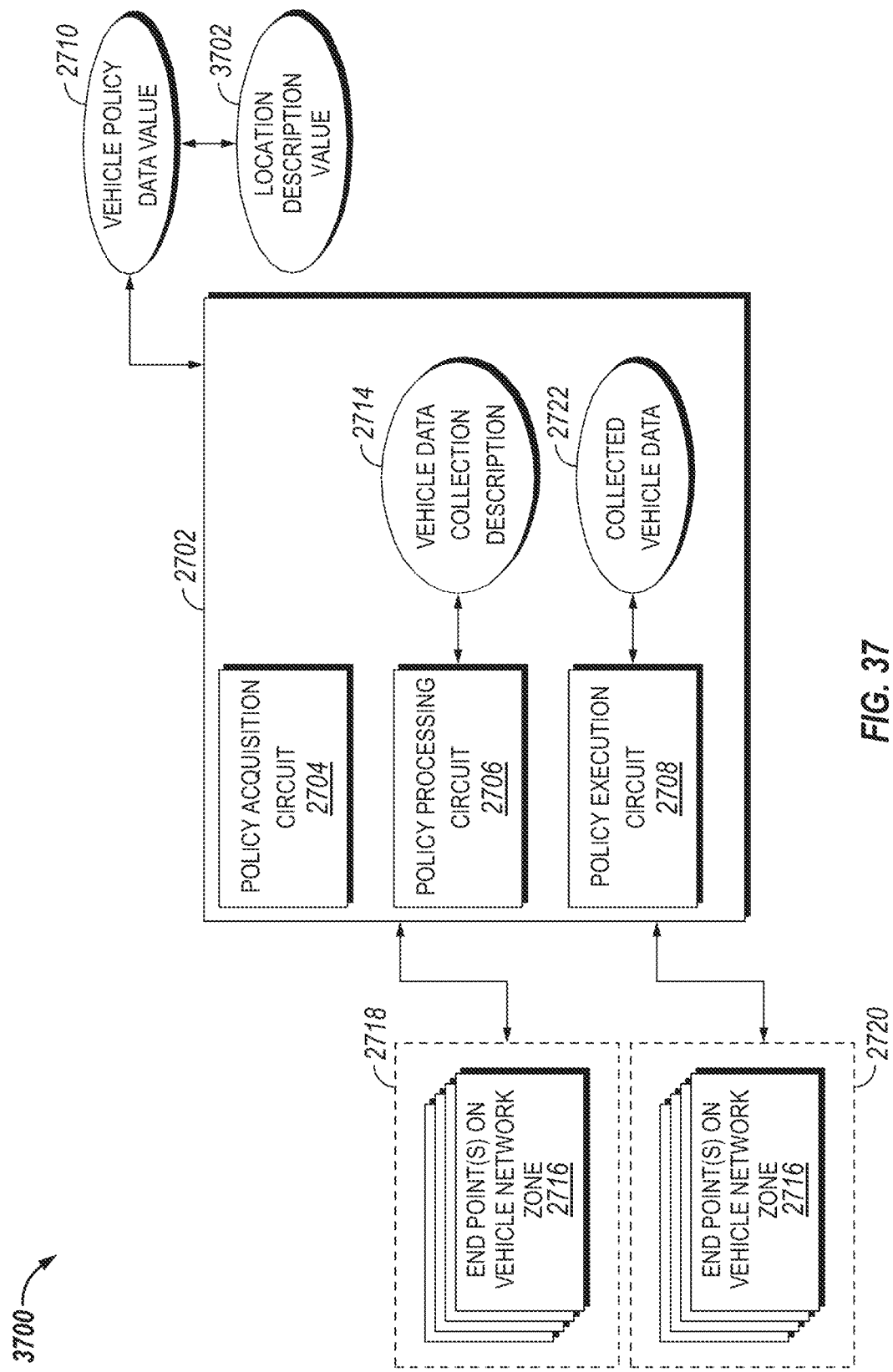
FIG. 37 is a schematic diagram of an example apparatus for providing data collection operations in response to a location description value according to certain embodiments of the present disclosure.

Referencing FIG. 37, an example apparatus 3700 is depicted to provide data collection operations in response to a location description value, including commencing, changing, and/or stopping data collection operations based on location values associated with the vehicle. For example, operations of the apparatus 3700 allow for selected data collection, and/or adjustments of collected data, based on a location of the vehicle—for example within a geographic area, jurisdiction, relative to a specified location, and/or within a defined boundary. In certain embodiments, it may be desirable to adjust data collection operations based on the location—for example collecting additional data, avoiding collection of certain data, changing a formatting and/or other configuration of collected data, changing transmission criteria (e.g., to reduce transmission utilization, and/or allow additional transmission utilization, etc.). Example differences between locations that may be relevant to data collection operations include, without limitation: differences in transmission resource availability; differences in vehicle service availability; differences in parameter names, units, industry standards, or other conventions relating to expected data formatting; differences in reliability (e.g., where geographic regions are known to cause differences in reliability, for example due to varying ambient conditions, road conditions, etc., and/or as determined by an artificial intelligence and/or machine learning component, which may indicate reliability differences between locations without the system necessarily having knowledge of the reason for the differences); differences in contractual obligations relating to the location; differences in warranty implementation relating to the location; differences in legal posture relating to the location (e.g., speed limits, weight limits, allowability of utilization of certain features such as cruise control, engine braking, automated driving, etc.); and/or differences in legal posture relating to the data per se based on the location (e.g., varying privacy laws, liability laws, emissions regulations, tracking and/or reporting, etc.). The utilization of location variable data collection accordingly supports a number of objectives. One of skill in the art, having the benefit of the present disclosure and information ordinarily available when contemplating a particular system, including a system having an apparatus 3700 included therewith, can readily determine location description values 3702 of interest, and adjustments to the vehicle data collection description 2714 responsive to the location description values 3702.

Figure 38:
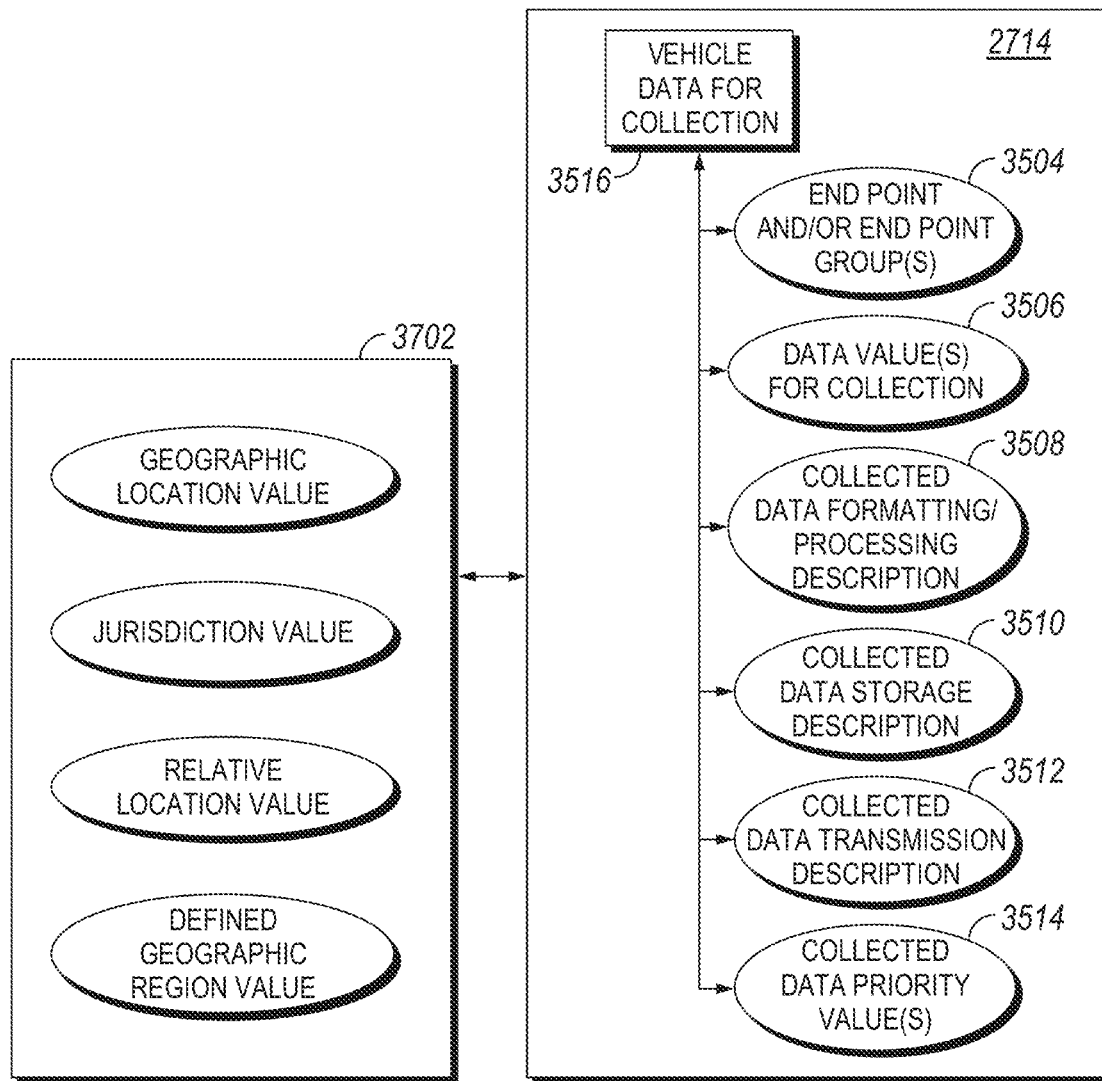
FIG. 38 is a schematic diagram of an example location description value according to certain embodiments of the present disclosure.

The embodiments of FIGS. 37-38 are described, for purposes of illustration, with regard to data collection operations responsive to a location description value 3702. Additionally or alternatively, operations of an apparatus 3700 may adjust one or more of: feature parameters; enabling or disabling features; commencing and/or stopping data collection; and/or activating one or more actuators, in response to the location description value 3702.

The example apparatus 3700 includes a policy acquisition circuit 2704 that interprets a vehicle policy data value 2710 including the location description value 3702, and a policy processing circuit 2706 that generates parsed policy data including a vehicle data collection description 2714 based, at least in part, on the vehicle policy data value 2710. The example apparatus 3700 includes a policy execution circuit 2708 that collects vehicle data (e.g., provided as collected vehicle data 2722) from end points 2716 of network zone(s) of the vehicle in response to the parsed policy data. Example implementations of the apparatus 2700 include capturing selected data based on the location description value 3702, stopping the collection of selected data based on the location description value 3702, changing a source of collected data (e.g., which end point provides a particular data value—such as a change in which sensor provides the value, a change from a directly detected value to a virtually determined value or vice versa, collecting a value to avoid or allow utilization of one or more network zones for the data value, and/or collecting a value to avoid or allow utilization of one or more features, flows, applications, etc. of the vehicle) based on the location description value 3702, adjusting collection parameters (e.g., sampling rates, formatting, units, bit depth, etc.) based on the location description value 3702, and/or adjusting storage and/or transmission criteria for the collected vehicle data 2722. In certain embodiments, the apparatus 2700 may be utilized, additionally or alternatively, to adjust a feature configuration, enable or disable a feature, to adjust trigger evaluation operations, and/or to adjust storage and/or transmission operations for at least a portion of the collected vehicle data 2722 in response to the location description value 3702.

Referencing FIG. 38, example and non-limiting location description value(s) 3702 include one or more of a geographic location value (e.g., GPS location information, and/or categorical information such as "UNITED STATES", "CANADA", "CALIFORNIA", "GERMANY", "EU COUNTRY", "RURAL HIGHWAY", "POPULATION CENTER", etc.), a jurisdiction value (e.g., a specific jurisdiction such as "FRANCE", and/or a descriptive jurisdiction such as "EURO 6 EMISSIONS LOCATION", "PRIVACY RULE 2 LOCATION", etc.), a relative location value (e.g., a distance from a point, region, or boundary, etc.), and/or a defined geographic region value (e.g., "DELIVERY ROUTE 25", within or outside a defined region, etc.). The example of FIG. 38 includes a vehicle data collection description 2714, having one or more vehicle data for collection 3516 values corresponding to one or more of the location description value(s) 3702. Example vehicle data for collection 3516 values include one or more of: an end point or end point group 3504 to be utilized; data value(s) for collection 3506; a collected data formatting and/or processing description 3508; a collected data storage description 3510; a collected data transmission description 3512; and/or collected data priority value(s) 3514.

Figure 39:
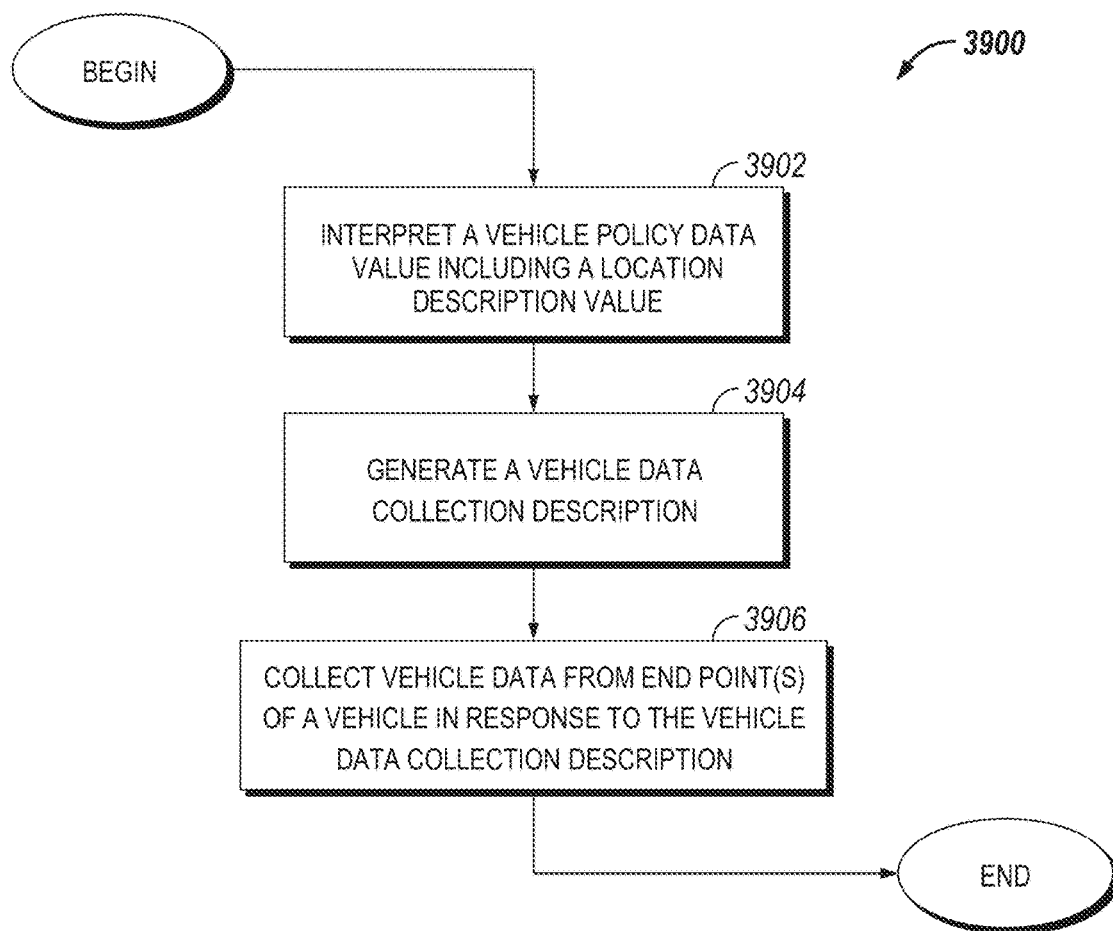
FIG. 39 is a flow chart depicting an example procedure for adjusting data collection in response to a location description value according to certain embodiments of the present disclosure.
Figure 40:
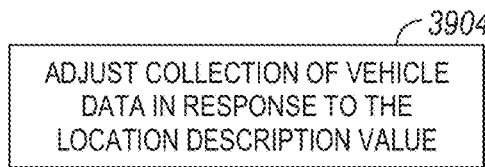
FIG. 40 is a diagram of an example operation that includes adjusting collection of the vehicle data in response to the location description value according to certain embodiments of the present disclosure.
Figure 43:
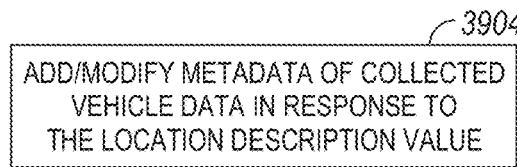
FIG. 43 is a diagram of an example operation that includes adding or modifying metadata of the collected vehicle data according to certain embodiments of the present disclosure.
Figure 42:
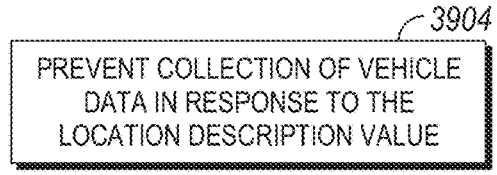
FIG. 42 is a diagram of an example operation that includes an operation to prevent collection of vehicle data according to certain embodiments of the present disclosure.
Figure 41:
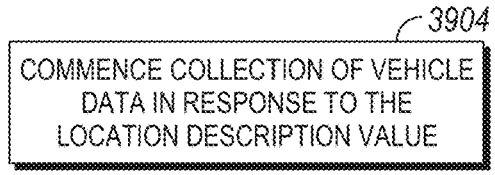
FIG. 41 is a diagram of an example operation that includes commencing collection of vehicle data according to certain embodiments of the present disclosure.
Figure 44:
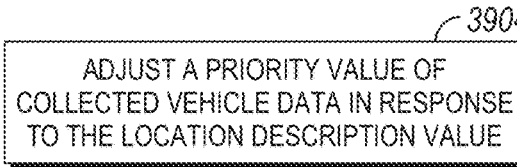
FIG. 44 is a diagram of an example operation that includes adjusting a priority value of at least a portion of the collected vehicle data according to certain embodiments of the present disclosure.

Referencing FIG. 39, an example procedure 3900 for adjusting data collection in response to a location description value is schematically depicted. The example procedure 3900 includes an operation 3902 to interpret a vehicle policy data value including a location description value, and an operation 3904 to generate a vehicle data collection description in response to the location description value. The example procedure 3900 further includes an operation 3906 to collect vehicle data from end points of a vehicle in response to the vehicle data collection description. Referencing FIG. 40, an example operation 3904 includes adjusting collection of the vehicle data in response to the location description value—for example changing a baseline data collection operation based on a location of the vehicle. Referencing FIG. 43, an example operation 3904 includes adding or modifying metadata of the collected vehicle data in response to the location description value, for example adjusting a time stamp, tagging data, making a notation (e.g., processing operation or other adjustment to the data, based on adjustments made according to the location, and/or according to requirements related to the location to capture processing operations utilized). Referencing FIG. 42, an example operation 3904 includes an operation to prevent collection of vehicle data (e.g., including just a portion of the vehicle data collected, or all of the vehicle data collected) in response to the location description value—where the operations to prevent collection of the vehicle data may include preventing any one or more operations in the collection cycle, such as requesting data from an end point (e.g., where the data is not ordinarily available, but the policy execution circuit 2708 retrieves it by requesting from a source end point), preventing the storage of the collected data (e.g., cache storage, buffering storage for external transmission, and/or storage of supporting information such as that utilized for trigger evaluations, historical data capture after an event, or the like), preventing related data and/or metadata collection, and/or preventing of external transmission of the data (and/or limiting transmission options, for example a cellular data transmission). Referencing FIG. 41, an example operation 3904 includes commencing collection of vehicle data in response to the location description value (and/or commencing any one or more operations of the collection cycle). Referencing FIG. 44, an example operation 3904 includes adjusting a priority value of at least a portion of the collected vehicle data in response to the location description value (e.g., a network utilization priority, data storage priority, and/or transmission priority).

Figure 45:
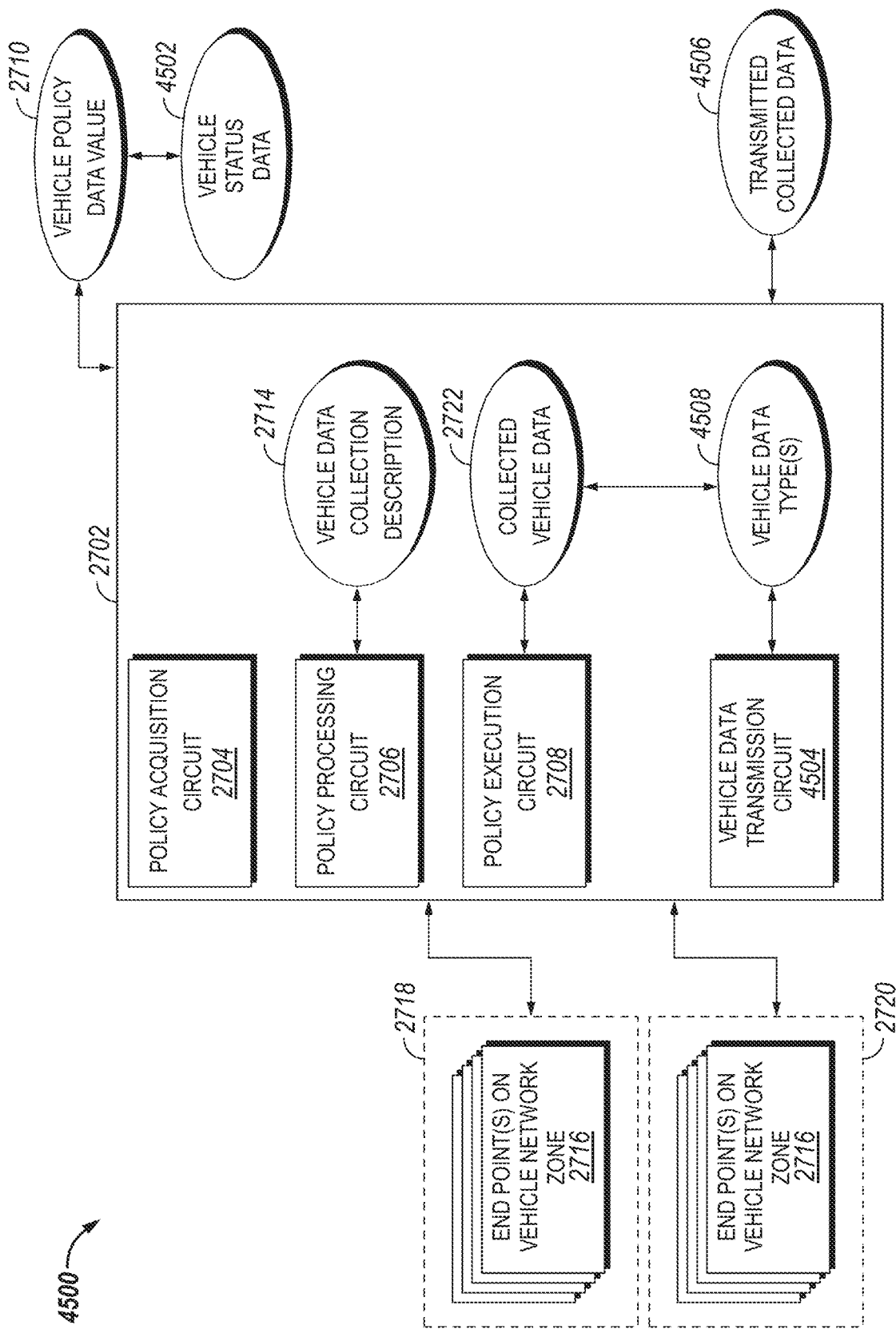
FIG. 45 is a schematic diagram of an example apparatus for data collection operations according to certain embodiments of the present disclosure.

Referencing FIG. 45, an example apparatus 4500 is depicted to provide data collection operations in response to vehicle status data, and/or based upon a data type of the collected data. For example, operations of the apparatus 4500 include commencing, changing, and/or stopping data collection operations based on the data type of the vehicle status data. For example, operations of the apparatus 4500 allow for selected data collection, and/or adjustments of collected data, based on the data type of the vehicle status data, such as adjustments in response to a control data type (e.g., data utilized for mission execution of the vehicle and/or operating a mission related feature of the vehicle), a diagnostic data type (e.g., data utilized to diagnose operations of the vehicle, and/or in a longer term diagnostic learning operation for the vehicle and/or a group of vehicles), a performance data type (e.g., data utilized for improving performance of the vehicle, to adjust performance of the vehicle, to implement a performance rating for the vehicle, etc.), a monitoring data type (e.g., to monitor a driver, vehicle status, etc.), and/or an aggregated data type (e.g., data that may be summarized, integrated with other data, summarized with other data, etc.). Operations of the apparatus 4500 allow for adjustments to data collection responsive to how the data is to be utilized, the urgency of the data, the value of the data in view of degraded transmission performance (e.g., time delay before transmission, loss of some data resolution and/or time synching availability upon summarization, lossy compression, intermittent gaps, etc.).

Operations of the apparatus 4500 allow for protection of the collected data for high value loss events (e.g., protecting data that is both mission critical, and experiences a high loss of value with minor degradation in time, data resolution, and/or loss of continuous sequencing), while allowing degradation and/or loss of data that is low value and/or does not experience a high loss in value with some degradation. Additionally or alternatively, operations of the apparatus 4500 allow for the removal of data that has already experienced a high loss value—for example removing data that, due to degradation, is no longer worth resource utilization, in favor of other data that, despite degradation, retains significant value. It can be seen that the operations of apparatus 4500 protect system resources (e.g., intra-network communication resources, on-vehicle processing resources, on-vehicle memory resources, transmission resources, etc.) to maximize the value and utility of data collection operations. In certain embodiments, apparatus 4500 protects higher value data (e.g., based on data type and/or priority value(s) provided in the vehicle policy data value), but may also protect the overall value of data collected, for example keeping data that initially has a lower value, but due to degradation may retain a higher value than other data that initially had a higher value.

The example apparatus 4500 includes a policy acquisition circuit 2704 that interprets a vehicle policy data value 2710 including vehicle status data 4502 (e.g., any data available on the vehicle, and/or any data on the vehicle indicating a status such as an operating condition, diagnostic condition, operation of a feature, and/or data utilized by a service operation, diagnostic operation, and/or application to determine a status of the vehicle). In certain embodiments, any data value available from an end point on the vehicle may be, depending upon the context and the operations of the application, flow, feature, and/or external device utilizing the collected data, a value indicating a status of the vehicle and/or a status of an end point, feature, flow, and/or application of the vehicle. The example apparatus 4500 further includes a policy processing circuit 2706 that generates parsed policy data in response to the vehicle policy data value 2710, where the parsed policy data includes a vehicle data collection description 2714. The example apparatus 4500 further includes a policy execution circuit 2708 that collects vehicle data 2722 form end points 2716 on network zone(s) 2718, 2720 on the vehicle. An example apparatus 4500 further includes a vehicle data transmission circuit 4504 that selectively transmits at least a portion of the collected vehicle data 2722, provided as transmitted collected data 4506 in the example, in response to a data type 4508 of the collected vehicle data 2722.

Example operations to selectively transmit the collected vehicle data 2722 include prioritizing transmission resources according to the vehicle data type(s) 4508, providing selected storage on-vehicle for collected vehicle data 2722, providing an opportunistic transmission of data (e.g., when detecting connection to a WiFi, coupled Ethernet service tool, or other low cost transmission element), deleting stored collected vehicle data 2722 that has not been transmitted (e.g., based on collected data storage needs, priority of competing collected data for the storage, and the remaining value of the stored data), and/or reducing a storage impact of the collected vehicle data 2722 (e.g., replacing a portion of the data with a summarized data segment, an aggregated data segment, a compressed data segment, etc.). In certain embodiments, the vehicle data type 4508 provides an indication of the value of the data based on resolution (e.g., loss of data resolution—such as in bit depth, precision, and/or time resolution such as sampling rate and/or synchronization data matching—may have a higher utility cost for certain data types such as control data, and a lower cost for certain data types such as monitoring data), preservation of sequential data segments (e.g., continuous data sequences without time gaps may be high value for certain data types, and not of significant value for other data types), time to transmission (e.g., some data may be highly valuable if transmitted almost immediately, but of little value if transmitted later, while other data may retain value regardless of the transmission time, or over an extended range of transmission times such as within a few hours, within a day, within a week, etc.), summarization effects (e.g., an average value over a period of time, during a selected event, etc., may be of high value for some data types, but of low value for other data types), and/or compression effects (e.g., compression operations may be lossy or lossless, which may depend upon the compression level utilized, and some data types may preserve value despite compression losses, while other data types may lose significant value, or all of their value, with compression losses. Further, time delays to implement compression operations may degrade the value of some data types more than other data types). Example and non-limiting data types may include a control data type; a diagnostic data type; a performance data type; a monitoring data type; or an aggregated data type. The example data types are non-limiting, and any data type may be utilized, for example including a data type associated with the data structure of the data (e.g., string, floating point value, Boolean value, single precision value, double precision value, integer, etc.), and/or a data type associated with the data request in the vehicle policy data value 2710 (e.g. —"MAINTENANCE", "FUEL ECONOMY", "FINANCE", etc.) allowing for a scheduled behavior of collected data transmission according to any selected criteria. In certain embodiments, the vehicle policy data value 2710 further includes a description of the data value (e.g., a quantitative description, qualitative description, ordering of data value, etc.), and/or a description of the loss of data value based on certain degradation events (e.g., time delay, intermittency gaps, compression losses, summarization losses, etc.). In certain embodiments, the vehicle policy data value 2710 further includes specific operations that may result in degradation of value for data types, which may define acceptable operations and/or a description of losses (e.g., send within 60 minutes of collection), and/or value descriptions associated with such operations (Example 1: send within 1 minute, and data retains a value of 100 units; send within 60 minutes, and data retains a value of 75 units; and send within 1 day and data retains a value of 35 units; Example 2: native collected data sent retains a value of 100 units, compression 1 lossless retains the value of 100 units, compression 2 lossy with 8-bit quantization retains a value of 30 units, and compression 3 lossy with 24-bit quantization retains a value of 55 units; Example 3: consecutive lossless sequences of at least 30 seconds are value 100, consecutive lossless sequences of at least 10 seconds are value 50, and sequences of less than 5 seconds are value 0). The examples are provided for illustration, and the matching of operations to value loss may be omitted (e.g., operations that may cause degradation are performed in an order determined by a priority indicated for specific data and/or data types 4508), and/or with a simplified loss determination (e.g., specific operations decrement the value of untransmitted data by fixed amounts and/or ratios, which may vary by the data type, apply to all data types, and/or only be applied to certain data types), or a combination of these. The description of value units is illustrative, and any value terminology, whether explicit or implicit, may be utilized. In certain embodiments, transmission of collected data may be performed in a priority order for the stored collected vehicle data 2722 (e.g., always transmit highest priority data when available, with priority defined in the vehicle policy data value 2710 and/or according to the vehicle data type 4508, and/or with weighted scheduling based on priority), and/or scheduling of operations that may result in degradation of value may be performed in priority order (e.g., protecting higher priority collected vehicle data 2722 before lower priority data) and/or in lost value order (e.g., protecting collected vehicle data 2722 where operations that may result in degradation will incur a greater loss in the value of the collected vehicle data 2722). In certain embodiments, aggregated and/or weighted loss of value may be considered by the vehicle data transmission circuit 4504—for example where operations (e.g., deletion, compression, summarization, etc.) on a single block of collected vehicle data 2722 may result in a high loss of value, but will protect an even greater loss of value (e.g., where a number of other blocks of collected vehicle data 2722 are thereby protected, even where individually they may each exhibit a smaller loss of value, but protected together preserve more value than is lost by the single block). In certain embodiments, portions of a block of collected vehicle data 2722 may be protected—for example preserving a five minute continuous chunk of collected data, but deleting the rest. In certain embodiments, value descriptions for collected vehicle data 2722, including loss of value determinations, may be weighted according to the amount of data, the number of parameters in the data, and/or the data type (and/or data types) represented in the data—for example a 50 kb block of data may have less weighted value than a similar 100 kb block of data (e.g., having a similar priority value expressed in the vehicle policy data value 2710 and/or a similar data type or mix of data types).

In certain embodiments, the policy execution circuit 2708 determines the data type of the collected vehicle data 2722 in response to one or more of: an end point providing an associated vehicle data (e.g., a source end point for the collected vehicle data 2722); an end point requesting the associated vehicle data; an entity requesting the associated vehicle data (e.g., an entity associated with an external device providing the vehicle policy data value 2710 or relevant portion thereof); an application associated with an end point providing the associated vehicle data (e.g., if the end point is part of a fueling control operation, the data type may be determined to be a control data type); an application associated with a request of the vehicle data; a flow associated with an end point providing the associated vehicle data; a flow associated with a request of the vehicle data; and/or an indicated data type provided in the vehicle policy data value 2710 for the collected vehicle data 2722.

Figure 46:
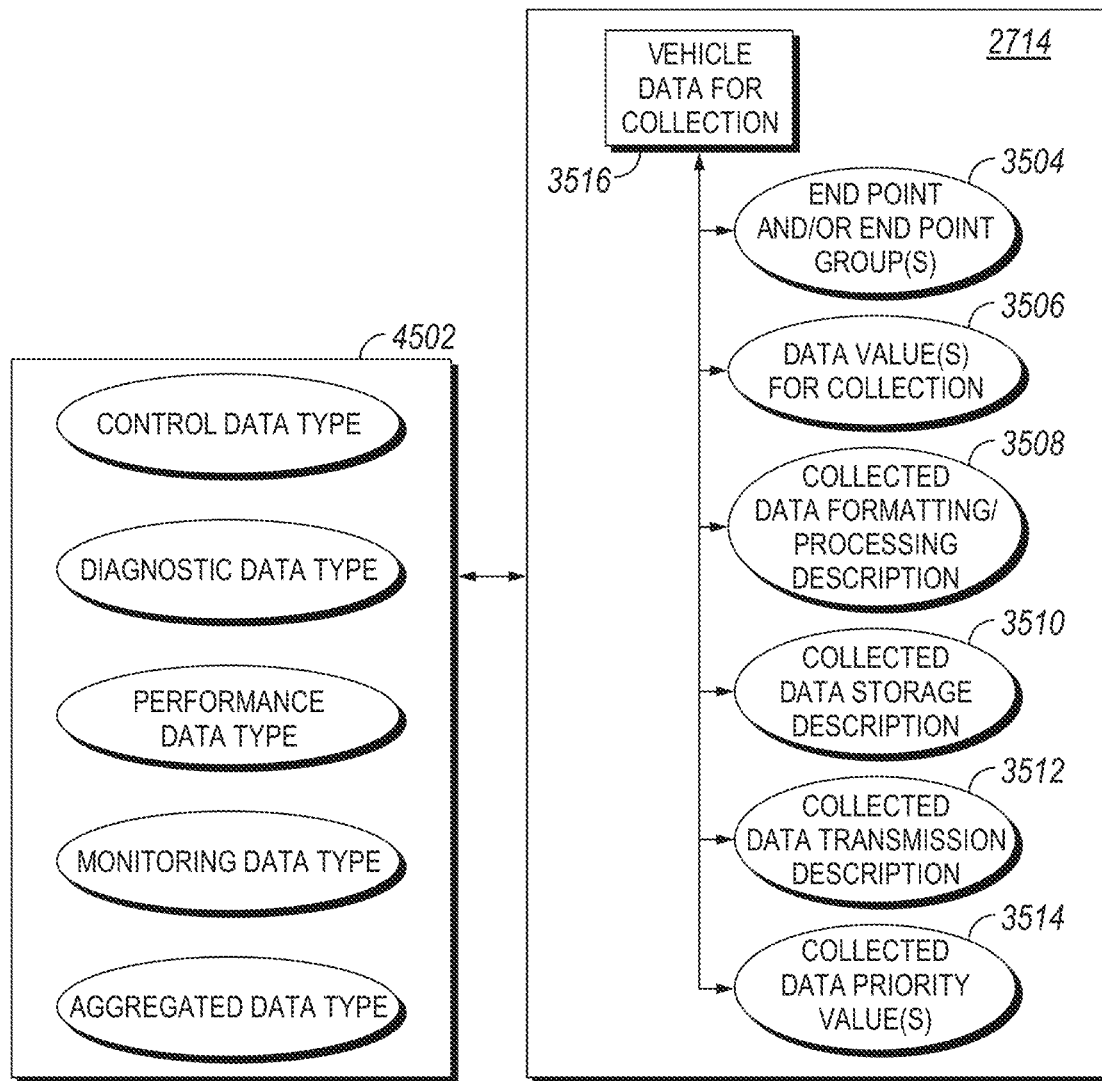
FIG. 46 is a schematic diagram of an example vehicle status data according to certain embodiments of the present disclosure.

Referencing FIG. 46, an example vehicle status data 4502 includes one or more data types such as a control data type, a diagnostic data type, a performance data type, a monitoring data type, and/or an aggregated data type. The example data types are non-limiting and illustrative. The example of FIG. 46 includes a vehicle data collection description 2714 having associated operations of the data collection cycle corresponding to each data type. The example of FIG. 46 includes vehicle data for collection 3516 associated with one or more of: an end point or end point group 3504 to be utilized; data value(s) for collection 3506; a collected data formatting and/or processing description 3508; a collected data storage description 3510; a collected data transmission description 3512; and/or collected data priority value(s) 3514.

Figure 47:
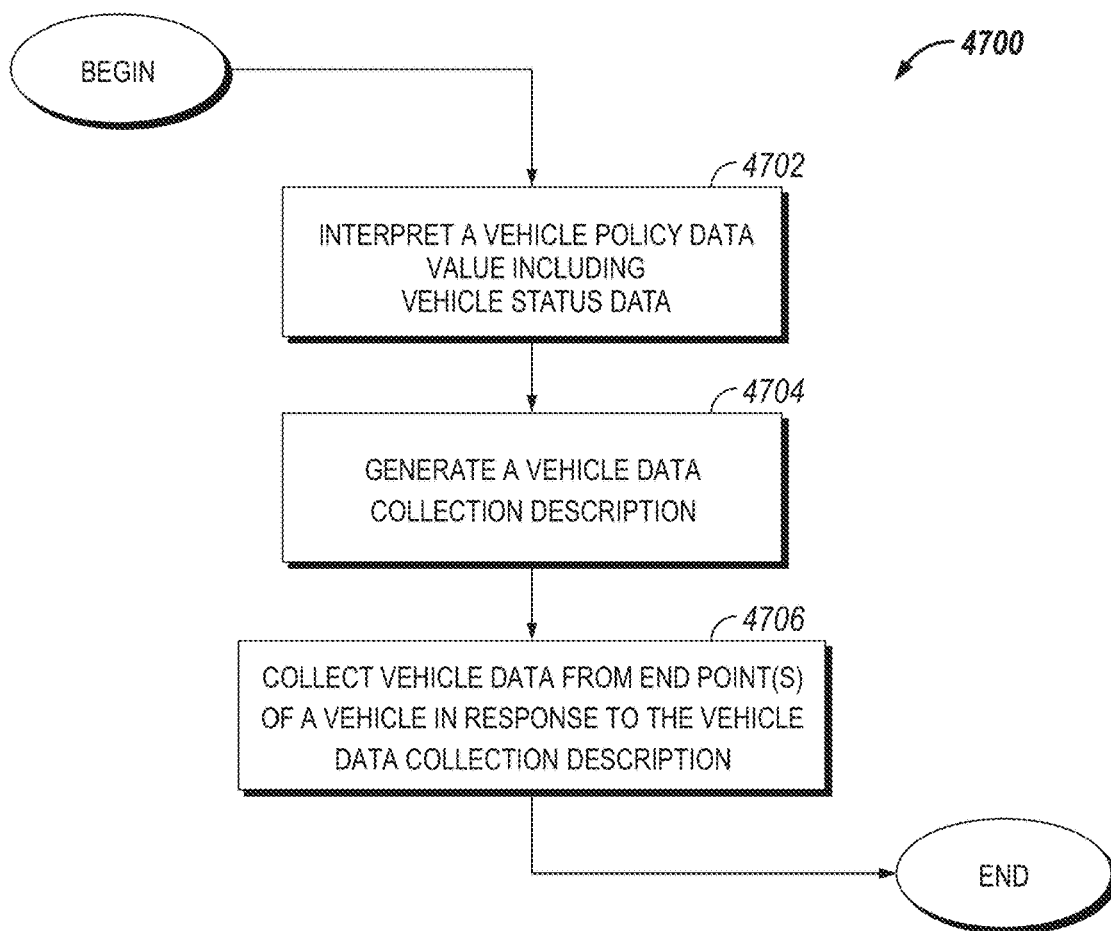
FIG. 47 is a flow chart depicting an example procedure to schedule data collection in response to a data type of the collected data according to certain embodiments of the present disclosure.
Figure 48:
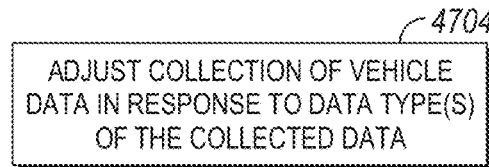
FIG. 48 is a schematic diagram of an example operation that includes an operation to adjust the collection of the vehicle data according to certain embodiments of the present disclosure.
Figure 51:
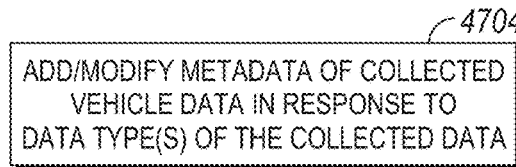
FIG. 51 is a schematic diagram of an example operation that includes an operation to add and/or modify metadata of collected vehicle data according to certain embodiments of the present disclosure.
Figure 50:
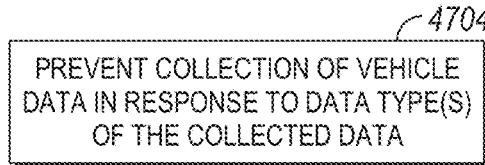
FIG. 50 is a schematic diagram of an example operation that includes an operation to prevent collection of vehicle data according to certain embodiments of the present disclosure.
Figure 49:
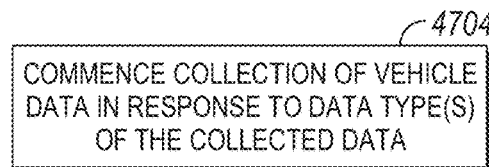
FIG. 49 is a schematic diagram of an example operation that includes an operation to commence collection of vehicle data according to certain embodiments of the present disclosure.
Figure 52:
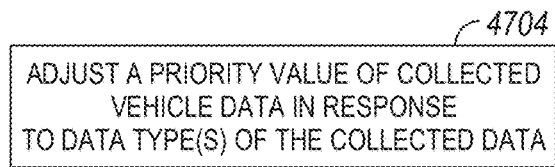
FIG. 52 is a schematic diagram of an example operation that includes an operation to adjust a priority value of collected vehicle data according to certain embodiments of the present disclosure.

Referencing FIG. 47, an example procedure 4700 to schedule data collection in response to a data type of the collected data is schematically depicted. The example procedure 4700 includes an operation 4702 to interpret a vehicle policy data value including vehicle status data, and an operation 4704 to generate a vehicle data collection description in response to the vehicle policy data value. The example procedure 4700 further includes an operation 4706 to collect vehicle data from end points of the vehicle in response to the vehicle data collection description. Referencing FIG. 48, an example operation 4704 includes an operation to adjust the collection of the vehicle data in response to data type(s) of the collected vehicle data. Referencing FIG. 49, an example operation 4704 includes an operation to commence collection of vehicle data in response to data type(s) of the data to be collected. Referencing FIG. 50, an example operation 4704 includes an operation to prevent collection of vehicle data in response to data type(s) of the data to be collected—for example where transmission of the data is not possible and the data cannot be stored, and/or in response to an operating condition of the vehicle whereby data of a particular data type is not to be collected (e.g., tagging a data type that should not be collected during certain operating conditions, in a specific location, etc.). Referencing FIG. 51, an example operation 4704 includes an operation to add and/or modify metadata of collected vehicle data in response to a data type of the collected data—for example to add time stamp information, source identifying information, network address information, and/or to translate these, in response to a data type of the collected data. Referencing FIG. 52, an example operation 4704 includes an operation to adjust a priority value of collected vehicle data in response to data type(s) of the collected data.

Figure 53:
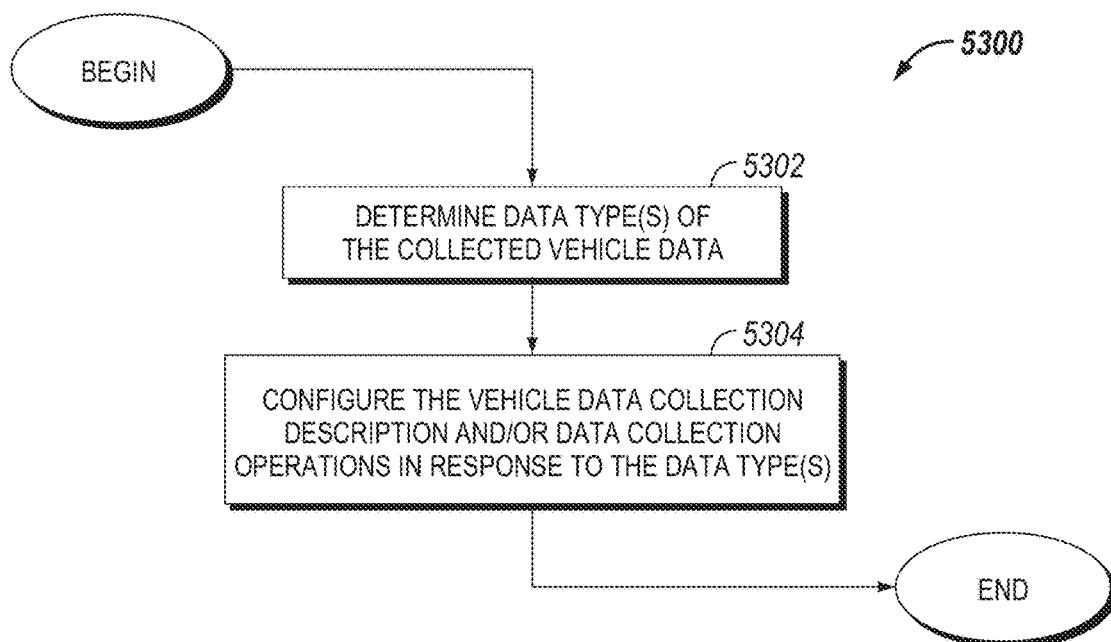
FIG. 53 is a flow chart depicting an example procedure to schedule data collection in response to a data type of the collected data according to certain embodiments of the present disclosure.
Figure 54:
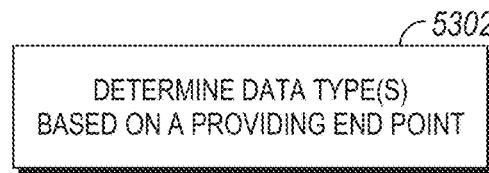
FIG. 54 is a schematic diagram of an example operation that includes determining data type(s) based on a providing end point for the collected data according to certain embodiments of the present disclosure.
Figure 55:
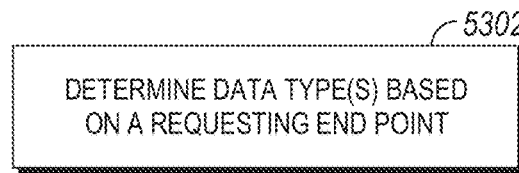
FIG. 55 is a schematic diagram of an example operation that includes determining data type(s) based on a requesting end point for the collected data according to certain embodiments of the present disclosure.
Figure 56:
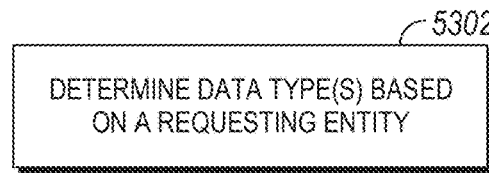
FIG. 56 is a schematic diagram of an example operation that includes determining data type(s) based on a requesting entity for the collected data according to certain embodiments of the present disclosure.
Figure 57:
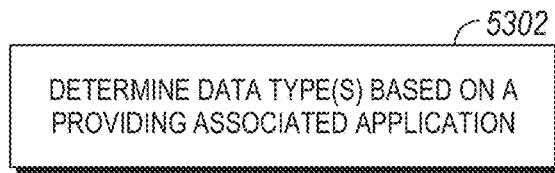
FIG. 57 is a schematic diagram of an example operation that includes determining data type(s) based on an application associated with an end point providing the collected data according to certain embodiments of the present disclosure.
Figure 58:
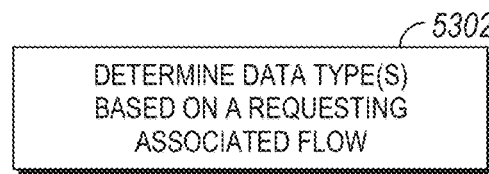
FIG. 58 is a schematic diagram of an example operation that includes determining data type(s) based on a flow associated with an end point requesting the collected data according to certain embodiments of the present disclosure.
Figure 59:
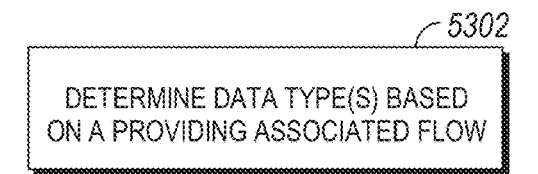
FIG. 59 is a schematic diagram of an example operation that includes determining data type(s) based on a flow associated with an end point providing the collected data according to certain embodiments of the present disclosure.
Figure 60:
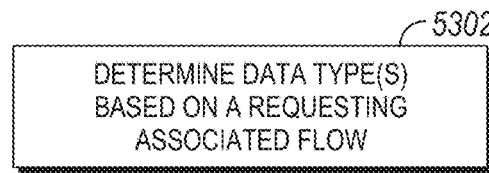
FIG. 60 is a schematic diagram of an example operation that includes determining data type(s) based on an application associated with an end point requesting the collected data according to certain embodiments of the present disclosure.
Figure 61:
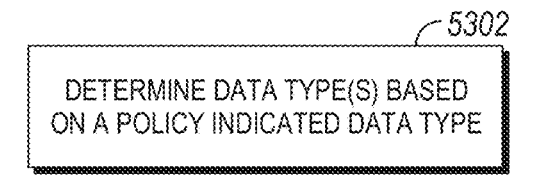
FIG. 61 is a schematic diagram of an example operation that includes determining data type(s) based on a data type indicated in a policy according to certain embodiments of the present disclosure.

Referencing FIG. 53, an example procedure 5300 to schedule data collection in response to a data type of the collected data is schematically depicted. The example procedure 5300 includes an operation 5302 to determine data type(s) of the collected vehicle data. The operation 5302 may be determined in response to the vehicle policy data value 2710—for example utilizing a defined data type in the policy, and/or determining the data type according to the end points, applications, flows, entities, etc. that are either providing or requesting the data. In certain embodiments, the operation 5302 may be determined after the data collection, for example determining from the collected vehicle data 2722 the source(s) providing the elements of the collected vehicle data 2722. The example procedure 5300 further includes an operation 5304 to configure the vehicle data collection description and/or data collection operations in response to the data types, where the data collection operations may relate to any aspect of the collection cycle (e.g., utilization of on-vehicle network transmission resources, data storage resources, data formatting and/or processing resources, and/or off-vehicle transmission resources). Referencing FIG. 54, an example operation 5302 includes determining data type(s) based on a providing end point for the collected data. Referencing FIG. 55, an example operation 5302 includes determining data type(s) based on a requesting end point for the collected data. Referencing FIG. 56, an example operation 5302 includes determining data type(s) based on a requesting entity for the collected data. Referencing FIG. 57, an example operation 5302 includes determining data type(s) based on an application associated with an end point providing the collected data. Referencing FIG. 58, an example operation 5302 includes determining data type(s) based on a flow associated with an end point requesting the collected data. Referencing FIG. 59, an example operation 5302 includes determining data type(s) based on a flow associated with an end point providing the collected data. Referencing FIG. 60, an example operation 5302 includes determining data type(s) based on an application associated with an end point requesting the collected data. Referencing FIG. 61, an example operation 5302 includes determining data type(s) based on a data type indicated in the policy. In certain embodiments, a given block of the collected data may include data provided from a number of end points, and/or include multiple associated flows, applications, and/or other prioritizing and/or data typing information. In certain embodiments, a highest priority and/or most important one of the associated end points, flows, applications, and/or indicated data type(s) may be utilized to determine data collection operations for the given block of the collected data. In certain embodiments, a weighted priority and/or data type value may be utilized (e.g., if 60% of the data is of a high priority data type, then weight the priority of the block at 60% of the high priority data type), and/or a most common or descriptive priority and/or data type value may be utilized (e.g., if 60% of the data is of a high priority data type, then treat the data block as the high priority data type).

Figure 62:
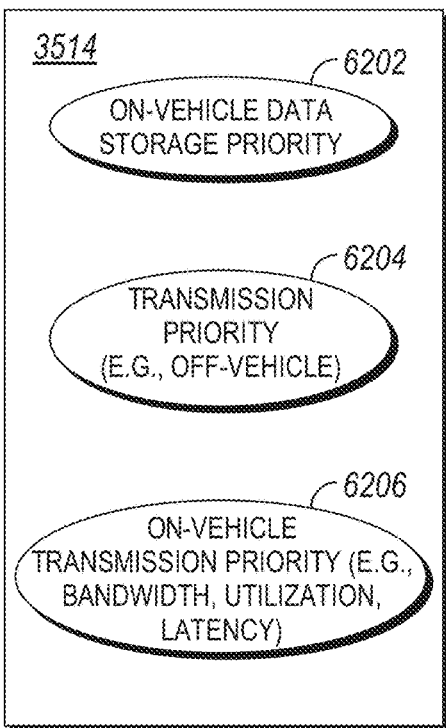
FIG. 62 is a schematic diagram of an example collected data priority value according to certain embodiments of the present disclosure.

Referencing FIGS. 62-65, examples of collected data priority values are schematically depicted. The example priority values are non-limiting, and any references to priority value determination for collected data throughout the present disclosure may be utilized as a collected data priority value 3514. Further, any references to priority value determination in the present disclosure may additionally or alternatively contemplate one or more of the values depicted in reference to FIGS. 62-65. FIG. 62 depicts an example collected data priority value 3514, including an on-vehicle data storage priority 6202, a transmission priority 6204, and/or an on-vehicle transmission priority 6206. Without limitation to any other aspect of the present disclosure, on-vehicle storage resources may include: memory allocations and/or stored values utilizing memory; resources utilized to delete, move, compress, and/or summarize stored data; and/or resources to determine memory allocation, to update memory allocation (e.g., based on collected data amounts relative to estimated data amounts to be collected), and/or to track expiration times and/or aging of stored data. Without limitation to any other aspect of the present disclosure, off-vehicle transmission resources may include: bandwidth utilization of external data transfer components (e.g., cellular data routes, Ethernet data routes, WiFi data routes, and/or other network data routes such as CAN communications); data capacity limitations (e.g., capped data amounts; data amounts associated with an entity, application, flow, etc.; and/or data amounts associated with an access point name (APN)); and/or power utilization associated with external data transfer (e.g., at any time, and/or during certain operating conditions such as when a prime mover of the vehicle is not providing power and battery power may be utilized for external data transfer). Without limitation to any other aspect of the present disclosure, on-vehicle transmission resources may include: bandwidth utilization of one or more network zones; allowed utilization of a network zone for a given end point, flow, application, etc.; latency management of communications on a network zone, including competition for low latency communications; and/or resource utilization of an inter-network device (e.g., a CEG, CES, and/or CND).

Figure 63:
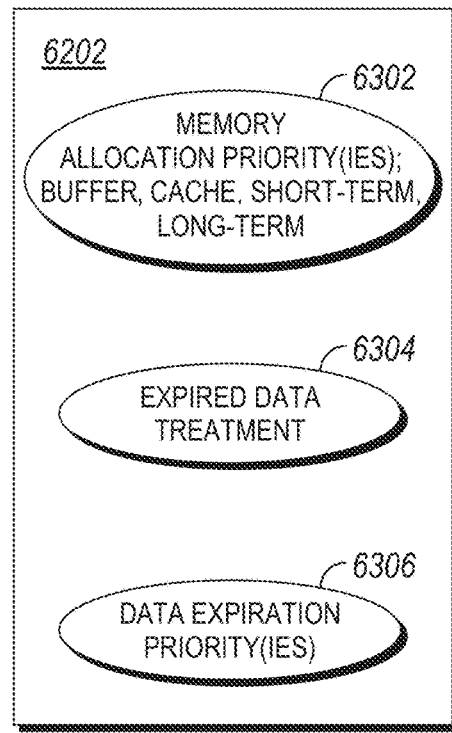
FIG. 63 is a schematic diagram of an example on-vehicle data storage priority according to certain embodiments of the present disclosure.
Figure 64:
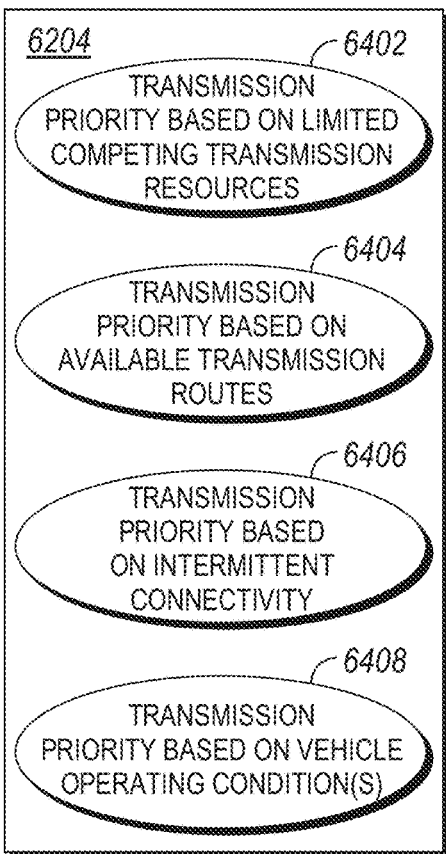
FIG. 64 is a schematic diagram of an example transmission priority according to certain embodiments of the present disclosure.
Figure 65:
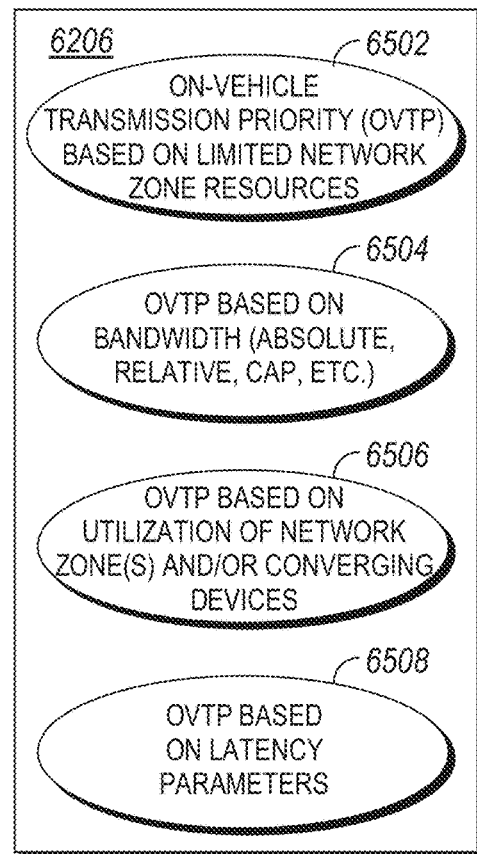
FIG. 65 is a schematic diagram of an example on-vehicle transmission priority according to certain embodiments of the present disclosure.

Referencing FIG. 63, an example on-vehicle data storage priority 6202 includes one or more of: memory allocation priorities 6302, including for buffer capacity, cache capacity, short-term memory capacity, and/or long-term memory capacity; expired data treatment priority 6304, including for management operations of expired data, processing of expired data, and management of data lifetime tracking and comparisons to expiration times; and/or data expiration priorities 6306, including determining the order of expired data management, loss of value associated with expired data management, and the like. Referencing FIG. 64, an example transmission priority 6204 includes one or more of: transmission priority based on limited competing transmission resources 6402; transmission priority based on available transmission routes 6404 (e.g., cellular transmission may have a first priority set, and WiFi transmission may have a different priority set); transmission priority based on intermittent connectivity 6406 (e.g., high connectivity operating periods may have a first priority set, low connectivity periods may have a second priority set, and intermittent connectivity periods may have a third priority set); and/or transmission priority based on vehicle operating conditions 6408 (e.g., running at rated power, shutdown operations, startup operations, idling operations, etc. may each have a distinct priority set for transmission of collected data). Referencing FIG. 65, an example on-vehicle transmission priority 6206 includes one or more of: an on-vehicle transmission priority (OVTP) based on limited network zone resources 6502 (e.g., bandwidth, utilization, low latency messaging slots, etc.); OVTP based on bandwidth 6504 (e.g., absolute or relative bandwidth allowed for the respective data, current bandwidth utilization and/or availability on the network zone, etc.); OVTP based on utilization of the network zone and/or converging devices 6506 passing parameters between network zones (e.g., capability of a CES, CEG, and/or CND to manage message transfer, and/or related resources such as message processing resources to prepare messages from a first network zone for utilization on the second network zone, buffering and/or caching memory to support intra-network message transfers, etc.); and/or OVTP based on latency parameters 6508 (e.g., where a network zone supports a limited number of low latency messages, where network zone traffic levels threaten the latency performance of high priority messages, etc.).

Figure 66:
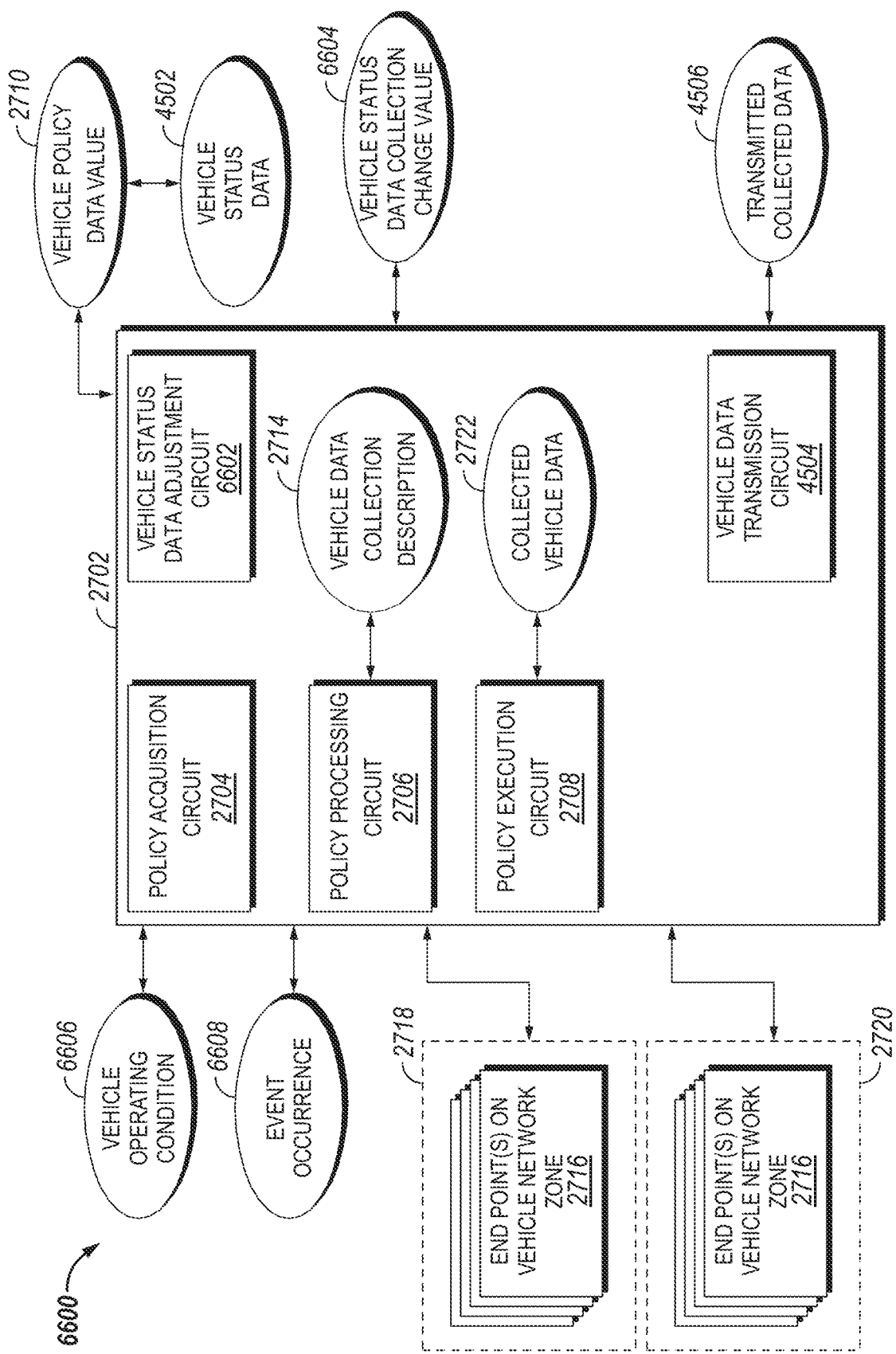
FIG. 66 is a schematic diagram of an example apparatus to provide data collection operations in response to vehicle status data according to certain embodiments of the present disclosure.

Referencing FIG. 66, an example apparatus 6600 is depicted to provide data collection operations in response to vehicle status data, which are dynamically changeable, and/or which may be adjusted based on geography, jurisdiction, and/or operating conditions of the vehicle. For example, operations of the apparatus 6600 may adjust data collection operations in response to a requested change, detected events, evaluated trigger conditions, and/or detection of predetermined vehicle operating conditions and/or a change in vehicle operating conditions.

The example apparatus 6600 operates similarly to apparatus 4500, with certain differences described here for purposes of illustration. The apparatus 6600 may be included in a system having a vehicle with one or more network zones as described throughout the present disclosure, and aspects of the apparatus 6600 may be included, in whole or part, with any systems, devices, controllers, and/or apparatuses as set forth throughout the present disclosure. Additionally or alternatively, aspects of any systems, devices, controllers, and/or apparatuses set forth herein may be included, in whole or part, with apparatus 6600.

The example apparatus 6600 includes a vehicle status data adjustment circuit 6602 that interprets a vehicle status data collection change value 6604. An example apparatus 6600 includes the policy execution circuit 2708 adjusting collection operations of the collected vehicle data 2722 in response to the vehicle status data collection change value 6604, and/or the vehicle data transmission circuit 4504 adjusting transmission operations of the collected vehicle data 2722 in response to the vehicle status data collection change value 6604. In certain embodiments, the vehicle status data adjustment circuit 6602 determines the vehicle status data collection change value 6604 in response to a vehicle operating condition 6606. An example vehicle operating condition 6606 may be a categorical and/or discrete value, such as a state condition (e.g., shutdown, moving, startup, idle, high load operation, low load operation, etc.). Additionally or alternatively, an example vehicle operating condition 6606 may be a quantitative and/or continuous value, such as a power throughput level, torque value, vehicle speed, etc.

In certain embodiments, the vehicle status data adjustment circuit 6602 determines the vehicle status data collection change value 6604 in response to determining an event occurrence 6608—for example based on a trigger condition, fault value, diagnostic code, or the like. In certain embodiments, the vehicle status data adjustment circuit determines the event occurrence 6608 in response to one or more of a fault condition value (e.g., whether a fault condition is present in the vehicle, for example a fault related to data collection of the respective parameters, a fault related to an associated flow and/or application for the data collection parameters, and/or a fault condition defined in the policy 2710 to adjust data collection); determining a fault count value (e.g., an intermediate value utilized before a fault condition is set, such as an incrementing, decrementing, and/or warning parameter, which may be published to a network zone or not); determining a diagnostic parameter value (e.g., a diagnostic code, an intermediate value for a diagnostic operation, etc.); a fault confirmation value (e.g., a state value indicating whether a fault is active, latent, recently active, pending confirmation, etc.); a diagnostic confirmation value (e.g., a state value determining a diagnostic condition, an intermediate value tending to confirm a diagnostic determination and/or make the diagnostic determination less likely, etc.); a fault intermediate value (e.g., a threshold or other condition tending to indicate a fault, any value determined by and/or utilized by a fault determination operation, and/or a value in a fault determination operation that may be used to determine whether a fault is potentially active, about to be set, and/or about to be cleared); and/or a diagnostic intermediate value. In certain embodiments, for example, the vehicle policy data value 2710 can be utilized to collect additional data related to a fault and/or diagnostic occurrence, for example to determine whether fault and/or diagnostic determinations are operating well, whether they can be improved or optimized, to provide information for fault tree analysis and/or diagnostic root cause analysis, and the like.

The capabilities of apparatus 6600, and/or other systems and devices herein, provide for a capability to collect additional data before a fault condition and/or diagnostic operation are confirmed—for example due to the ability of the policy execution circuit 2708 to reach any end point on any network zone of the vehicle, and to collect data—such as intermediate control data that is not ordinarily available on any network zone—to begin collecting more data, earlier in the process, where fault determination and/or diagnostic operations have not completed. Previously known systems provide a light and/or other notification in response to a fault being set or a diagnostic operation confirming that a problem exists, but by the time the notification is provided, the operations of the fault determination and/or diagnostic operation are already completed, and at best a short period of historical data can be captured. Collection of a greater amount of data for previously known systems is prohibitive, as parameters would have to be collected for an entire selected time period, with a vast amount of data, and where the fault may or may not occur during the entire selected time period. Operations of the apparatus 6600 allow for data collection configured based upon intermediate fault values—for example increasing the data collected (e.g., sampling rates, number of parameters, etc.) by collecting data when a preliminary indication that a fault may be applicable appears in the data, and/or further increasing the data collected if the fault or diagnostic condition appears more likely (e.g., increasing data collection rates and/or parameters as an intermediate counter value increases toward a fault threshold), while maintaining a high likelihood that data collected will be relevant to the intended use of the collected data. Additionally, the data that can be collected by apparatus 6600 is improved, as data collection is not limited to available data on a network zone, allowing for deeper analysis of fault and diagnostic operations, quicker convergence on improved service procedures and/or fault tree analysis, and the like. Further still, the capabilities of apparatus 6600 allow for a single policy to be utilized on vehicles having different configurations—including network zone layout, end point distribution on network zones, a different distribution of controllers and control operations across end points, and/or data having a different configuration (e.g., units, sampling rate, parameter names, bit depth and/or resolution, etc.). A given policy utilized to collect data, for example to improve fault determination and/or improve fault determination, can represent a significant investment to determine which data should be collected, the timing of the data collection relative to the event, and the like, and the ability to re-use a given policy across a number of vehicle configurations significantly reduces the cost of fault and diagnostic execution and improvement across the entire system of vehicles. The utilization of apparatus 6600 and other embodiments throughout the present disclosure for fault and diagnostic operations is an illustrative example to demonstrate various benefits of aspects of the present disclosure. It can be seen that numerous other operations that represent similar significant investment likewise benefit from the capabilities of systems, devices, and operations described herein—for example and without limitation: operations to tune features of a vehicle (e.g., control governors, learning systems, etc.); operations to determine operator utilization of features of the vehicle (e.g., cruise control, seat adjustments, wiper blade operations, multimedia interactions, etc.); correlations between nominally unrelated system (e.g., time of day when failures occur and/or features are utilized; relationship between changing locations and/or location types and vehicle operating conditions—for example determining which vehicle operating conditions and/or features are likely to be utilized by an operator when transitioning from a highly populated area to a rural highway, etc.).

An example vehicle status data 4502 further includes a trigger condition, where the vehicle status data adjustment circuit 6602 determines the event occurrence 6608 in response to the trigger condition. The trigger condition may be any trigger condition as set forth throughout the present disclosure, including at least: an event detection condition; a vehicle status value; and/or a vehicle operating condition value.

An example vehicle status data adjustment circuit 6602 further interprets the vehicle status data collection change value 6604 in response to a location description value, for example a location description value included as a part of the vehicle policy data value 2710. The location description value includes at least one description such as: a geographic location value; a jurisdiction value; a relative location value; or a defined geographic region value. The policy execution circuit 2708 is responsive to the vehicle status data collection change value 6604 to prevent collection of at least a portion of the vehicle data, to commence collection of at least a portion of the vehicle data, to adjust a formatting of at least a portion of the vehicle data, and/or to adjust a priority associated with at least a portion of the vehicle data, in response to the location description value.

Figure 67:
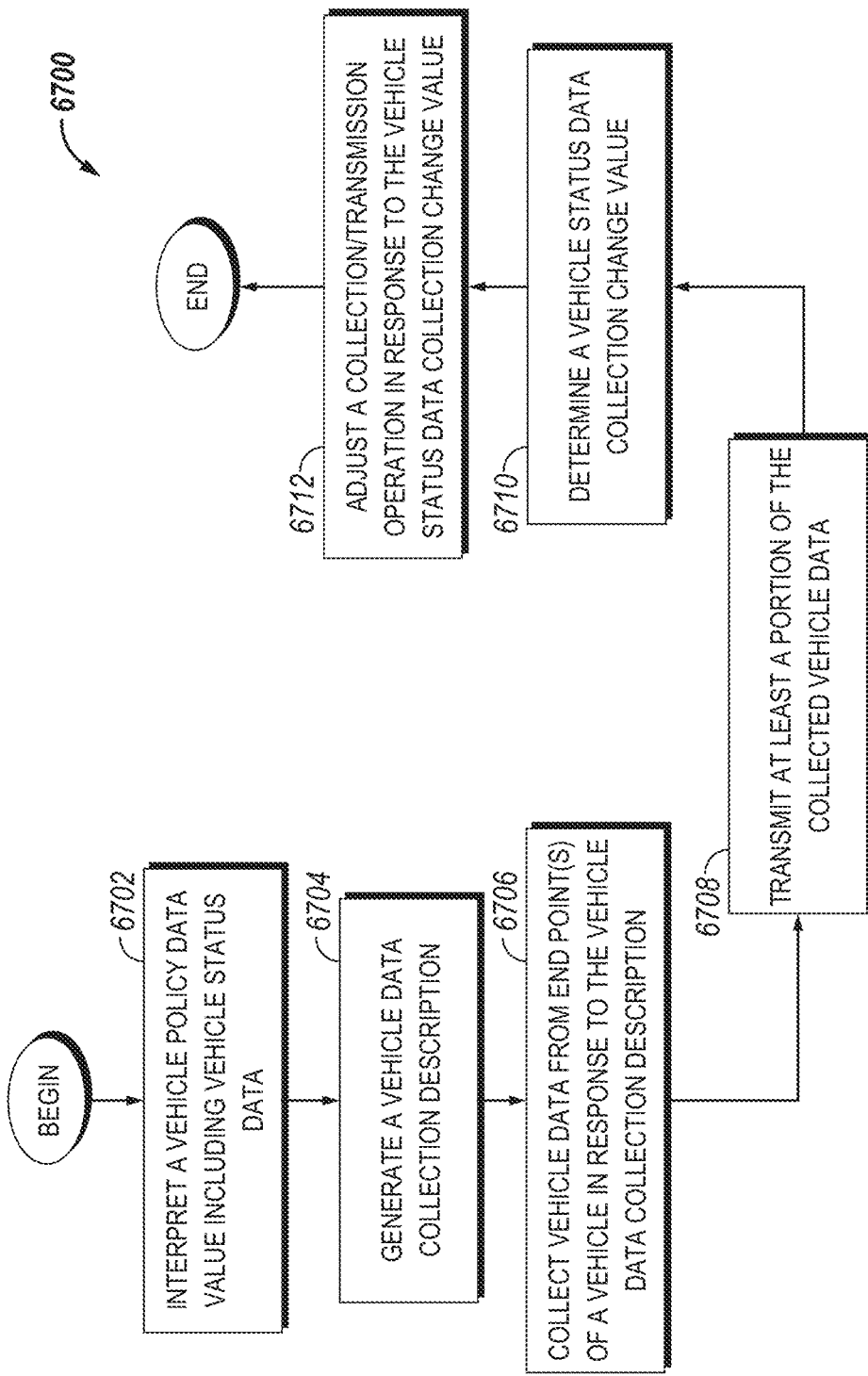
FIG. 67 is a flow chart depicting an example procedure to dynamically configure data collection for a vehicle according to certain embodiments of the present disclosure.

Referencing FIG. 67, an example procedure 6700 to dynamically configure data collection for a vehicle is schematically depicted. The example procedure 6700 includes an operation 6702 to interpret a vehicle policy data value including vehicle status data, an operation 6704 to generate a vehicle data collection description in response to the vehicle policy data value, and an operation 6706 to collect vehicle data from end points of the vehicle in response to the vehicle data collection description. The example procedure 6700 includes an operation 6708 to transmit at least a portion of the collected vehicle data, and an operation 6710 to determine a vehicle status least a portion of the collected vehicle data, and an operation 6710 to determine a vehicle status data collection change value. The example procedure 6700 includes an operation 6712 to adjust a collection and/or transmission operation in response to the vehicle status data collection change value.

Figure 68:
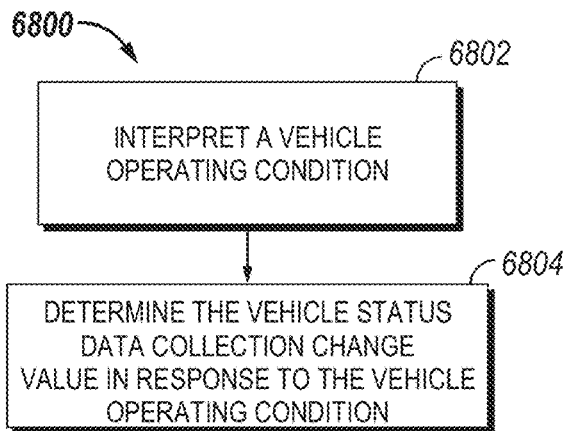
FIG. 68 is a flow chart depicting an example procedure to determine a vehicle status data collection change value according to certain embodiments of the present disclosure.
Figure 69:
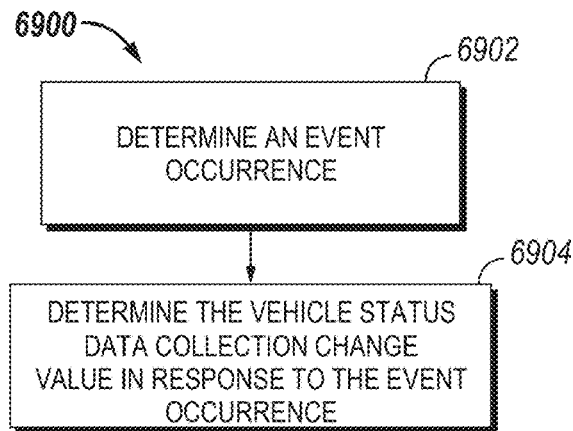
FIG. 69 is a flow chart depicting an example procedure that includes an operation to determine an event occurrence, and an operation to determine a vehicle status data collection change in response to the event occurrence, according to certain embodiments of the present disclosure.
Figure 70:
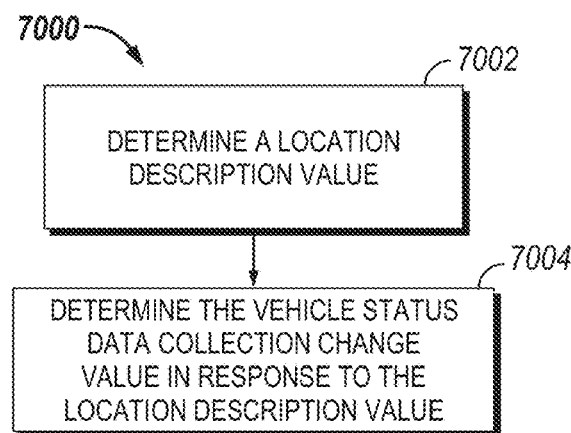
FIG. 70 is a flow chart depicting an example procedure that includes an operation to determine a location description value, and an operation to determine a vehicle status data collection change value, according to certain embodiments of the present disclosure.
Figure 71:
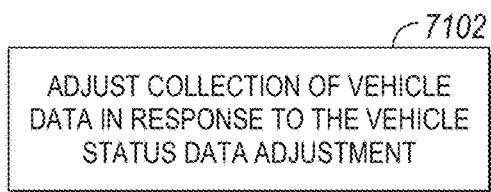
FIG. 71 is a schematic diagram of an example operation that includes adjusting collection of vehicle data according to certain embodiments of the present disclosure.
Figure 72:
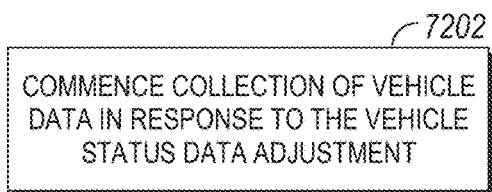
FIG. 72 is a schematic diagram of an example operation that includes commencing collection of vehicle data according to certain embodiments of the present disclosure.
Figure 73:
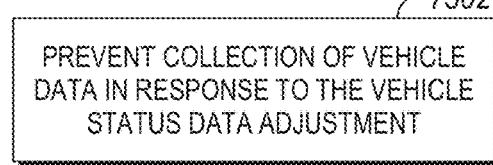
FIG. 73 is a schematic diagram of an example operation that includes preventing collection of vehicle data according to certain embodiments of the present disclosure.
Figure 74:
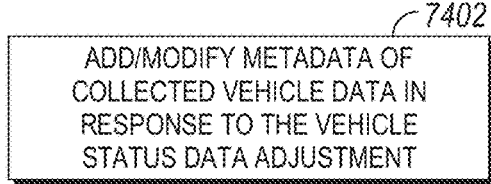
FIG. 74 is a schematic diagram of an example operation that includes adding and/or modifying metadata of collected vehicle data according to certain embodiments of the present disclosure.
Figure 75:
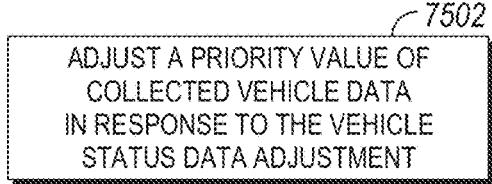
FIG. 75 is a schematic diagram of an example operation that includes adjusting a priority value of collected vehicle data according to certain embodiments of the present disclosure.
Figure 76:
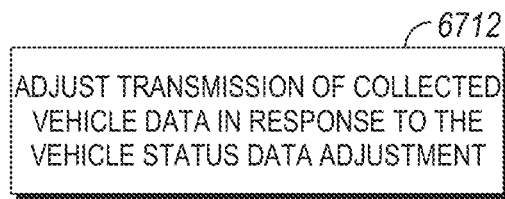
FIG. 76 is a schematic diagram of an example operation that includes adjusting transmission of collected vehicle data according to certain embodiments of the present disclosure.
Figure 77:
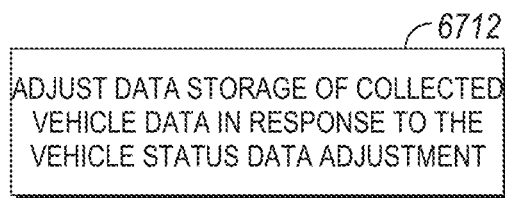
FIG. 77 is a schematic diagram of an example operation that includes adjusting data storage of collected vehicle data according to certain embodiments of the present disclosure.
Figure 78:
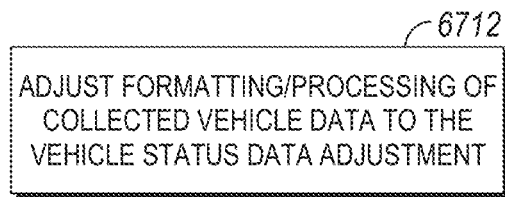
FIG. 78 is a schematic diagram of an example operation that includes adjusting formatting and/or processing of collected vehicle data according to certain embodiments of the present disclosure.

Referencing FIG. 68, an example procedure 6710 to determine a vehicle status data collection change value, including an operation 6802 to interpret a vehicle operating condition, and an operation 6804 to determine the vehicle status data collection change value in response to the vehicle operating condition. Referencing FIG. 69, an example procedure 6710 includes an operation 6902 to determine an event occurrence, and an operation 6904 to determine the vehicle status data collection change in response to the event occurrence. Referencing FIG. 70, an example procedure 6710 includes an operation 7002 to determine a location description value, and an operation 7004 to determine the vehicle status data collection change value in response to the location description value. Referencing FIGS. 71-78, example operations 6712 to adjust collection and/or transmission of collected data values in response to the vehicle status data collection change value are depicted. Referencing FIG. 71, an example operation 6712 includes adjusting collection of vehicle data (e.g., parameters collected, collection rates, amount of data to be captured, timing of data capture, etc.) in response to the vehicle status data collection change value (e.g., as a vehicle status data adjustment). Referencing FIG. 72, an example operation 6712 includes commencing collection of vehicle data in response to the vehicle status data adjustment. Referencing FIG. 73, an example operation 6712 includes preventing collection of vehicle data in response to the vehicle status data adjustment. Referencing FIG. 74, an example operation 6712 includes adding and/or modifying metadata of collected vehicle data in response to the vehicle status data adjustment. Referencing FIG. 75, an example operation 6712 includes adjusting a priority value of collected vehicle data in response to the vehicle status data adjustment. Referencing FIG. 76, an example operation 6712 includes adjusting transmission of collected vehicle data in response to the vehicle status data adjustment. Referencing FIG. 77, an example operation 6712 includes adjusting data storage of collected vehicle data in response to the vehicle status data adjustment. Referencing FIG. 78, an example operation 6712 includes adjusting formatting and/or processing of collected vehicle data in response to the vehicle status data adjustment.

Figure 79:
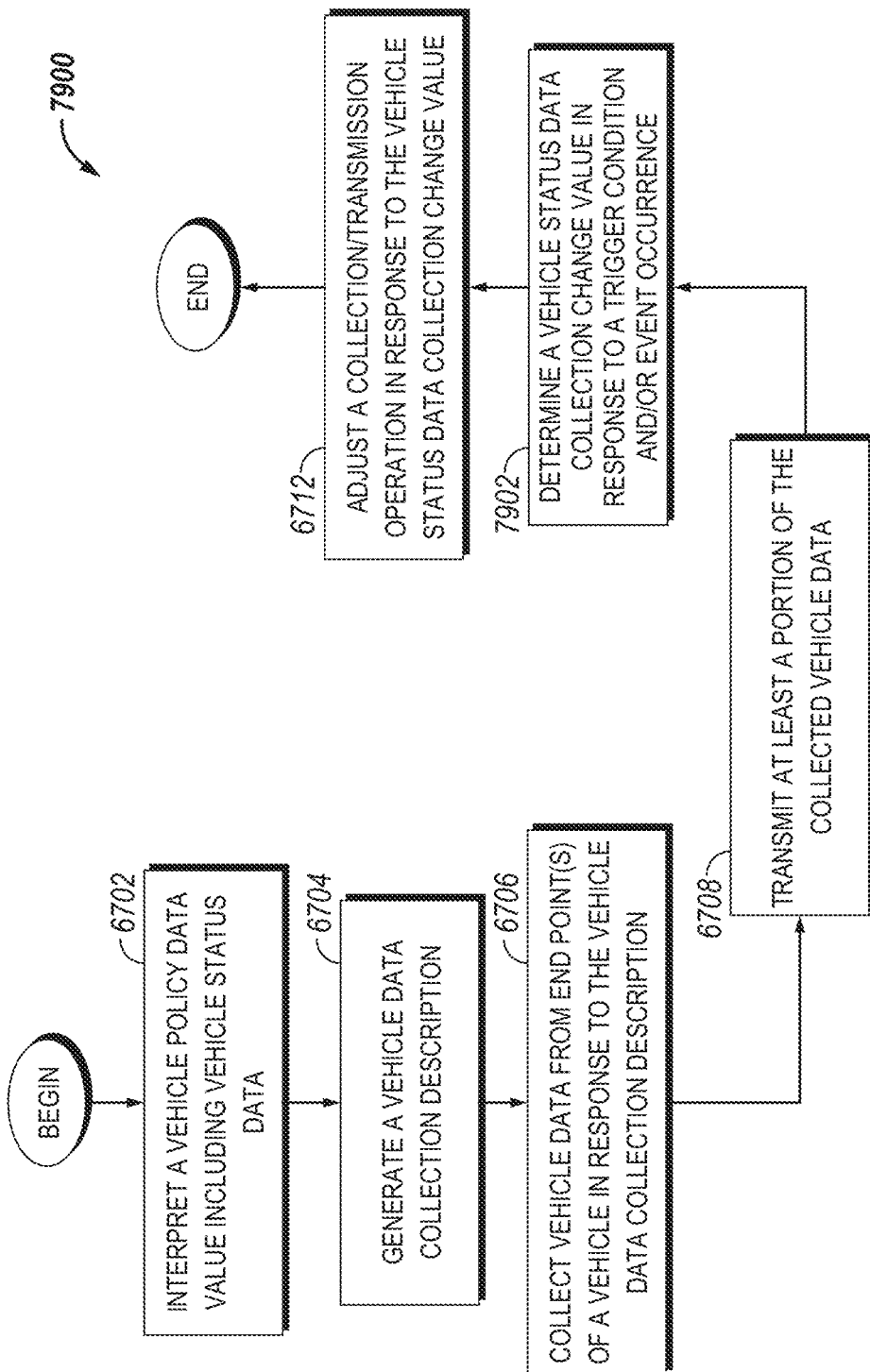
FIG. 79 is a flow chart depicting an example procedure to dynamically configure data collection for a vehicle according to certain embodiments of the present disclosure.
Figure 80:
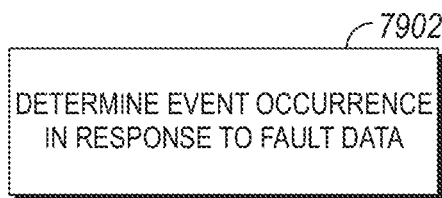
FIG. 80 is a schematic diagram of an example operation that includes determining an event occurrence in response to fault data according to certain embodiments of the present disclosure.
Figure 82:
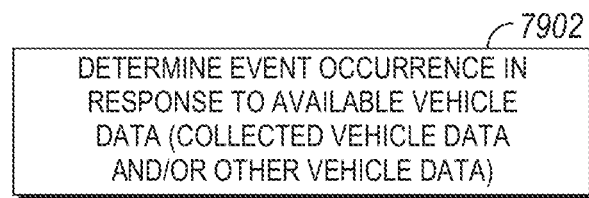
FIG. 82 is schematic diagram of an example operation that includes determining an event occurrence according to certain embodiments of the present disclosure.
Figure 81:
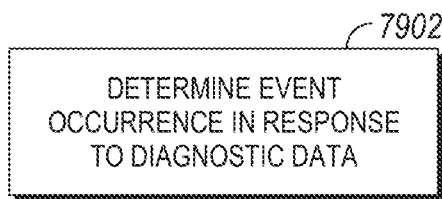
FIG. 81 is a schematic diagram of an example operation that includes determining an event occurrence according to certain embodiments of the present disclosure.
Figure 83:
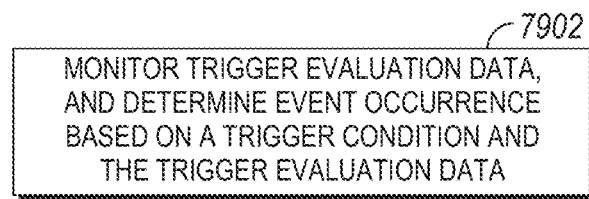
FIG. 83 is a schematic diagram of an example operation that includes an operation to monitor trigger evaluation data, and to determine an event occurrence based on a trigger condition and the trigger evaluation data, according to certain embodiments of the present disclosure.

Referencing FIG. 79, an example procedure 7900 to dynamically configure data collection for a vehicle is schematically depicted. The example procedure includes an operation 7902 to determine a vehicle status data collection change value in response to a trigger condition and/or an event occurrence, and operation 6712 to adjust a collection and/or transmission operation of the collected vehicle data in response to the vehicle status data collection change value. Referencing FIGS. 80-83, example operations 7902 to determine an event occurrence and/or a trigger condition are schematically depicted. Referencing FIG. 80, an example operation 7902 includes determining an event occurrence in response to fault data, for example determining that an event has occurred to change data collection and/or transmission in response to a fault being set, and/or an intermediate fault value (e.g., a fault counter, threshold value for data tending to indicate a fault, etc.). Referencing FIG. 81, an example operation 7902 includes determining an event occurrence in response to diagnostic data, for example determining that an event has occurred to change data collection and/or transmission in response to a diagnostic operation output value, intermediate value, and/or diagnostic code value. Referencing FIG. 82, an example operation 7902 includes determining an event occurrence in response to available vehicle data, including one or more collected vehicle data parameters, or another vehicle data parameter available from an end point of the vehicle. Referencing FIG. 83, an example operation 7902 includes an operation to monitor trigger evaluation data, and determine the event occurrence based on a trigger condition (e.g., provided in a policy) and the trigger evaluation data.

Figure 84:
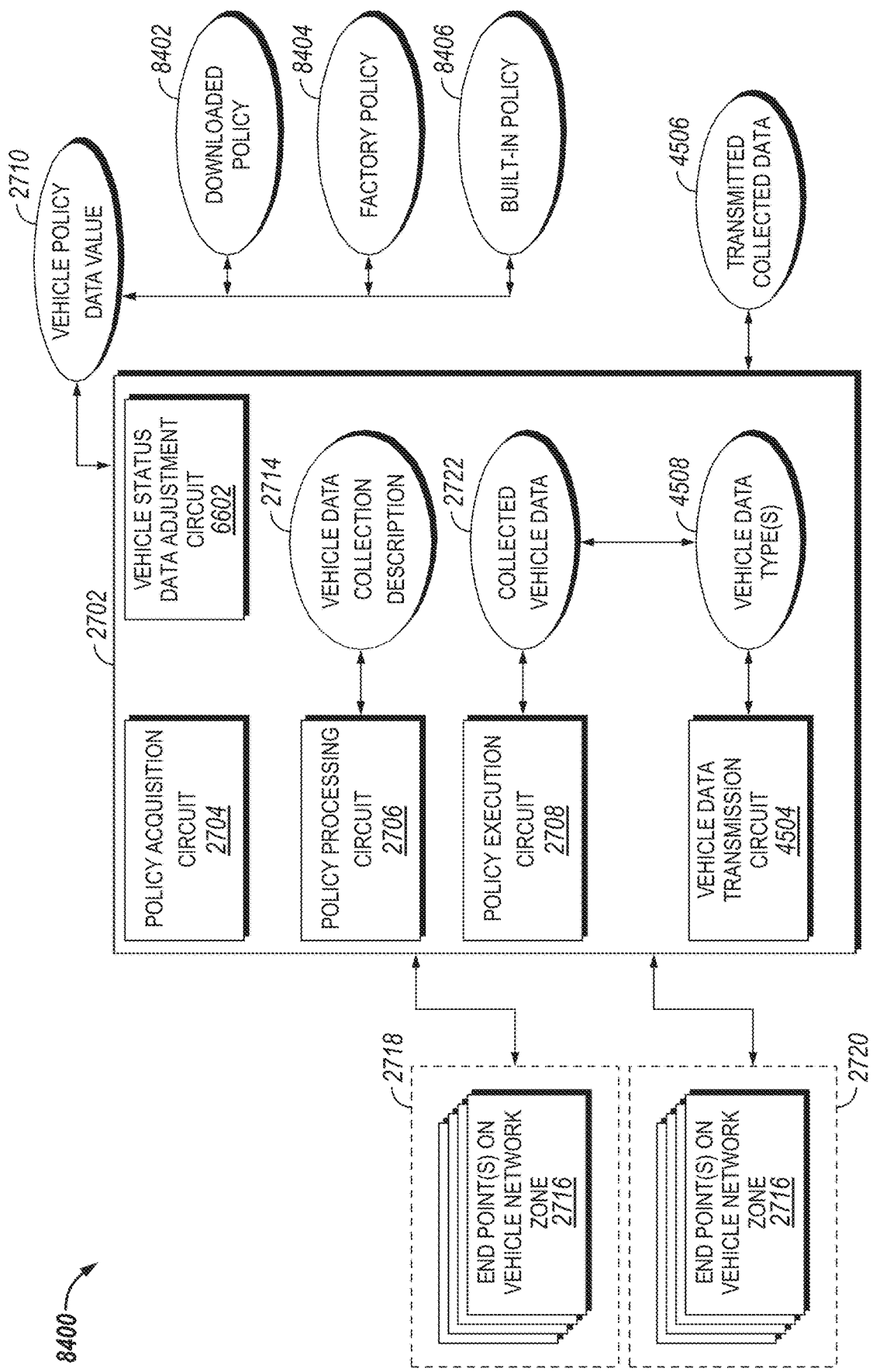
FIG. 84 is a schematic diagram of an example apparatus to implement data collection utilizing a policy hierarchy according to certain embodiments of the present disclosure.

Referencing FIG. 84, an example apparatus 8400 to implement data collection utilizing a policy hierarchy is schematically depicted. The example apparatus 8400 is disclosed in the context of data collection, but may be utilized to configure automated operations, triggered data collection, and/or any other policy based operations as set forth in the present disclosure. The example apparatus 8400 depicts example policy types to illustrate aspects of the present disclosure, but the policy types depicted are illustrative and non-limiting. Embodiments may include some or all of the policy types depicted, other policy types, and/or more than one policy of a given type.

The example apparatus 8400 operates similarly to apparatus 4500, with certain differences described here for purposes of illustration. The apparatus 8400 may be included in a system having a vehicle with one or more network zones as described throughout the present disclosure, and aspects of the apparatus 8400 may be included, in whole or part, with any systems, devices, controllers, and/or apparatuses as set forth throughout the present disclosure. Additionally or alternatively, aspects of any systems, devices, controllers, and/or apparatuses set forth herein may be included, in whole or part, with apparatus 8400.

The example apparatus 8400 includes a policy acquisition circuit 2704 that interprets a vehicle policy data value 2710. The example of FIG. 84 includes one or more of a downloaded policy 8402, a factory policy 8404, and/or a built-in policy 8406, where the vehicle policy data value 2710 is constructed from one or more of the policies 8402, 8404, 8406. The vehicle policy data value 2710 may utilize a selected one of the policies 8402, 8404, 8406 as the vehicle policy data value 2710, and/or the vehicle policy data value 2710 may be constructed using more than one of the policies 8402, 8404, 8406. In certain embodiments, the policies 8402, 8404, 8406 are utilized in a hierarchy by, for example, utilizing, in order and if present, the downloaded policy 8402 as the vehicle policy data value 2710, the factory policy 8404 (e.g., if a downloaded policy 8402 is not present), and/or the built-in policy 8406. The example utilizing a built-in policy, a factory policy, and a downloaded policy is illustrative and non-limiting. An example includes the built-in policy 8406 provided on a vehicle controller (e.g., the CND, and/or any other controller having policy management operations provided thereupon) at a time of initial manufacture of the vehicle and/or a supply of the respective controller to a manufacturer of the vehicle, a factory policy 8404 provided on the vehicle controller at a later stage of manufacturing (e.g., by a vehicle manufacturer, an original equipment manufacturer, body builder, assembler, an entity configuring a vehicle for a particular application, and/or a dealer), and the downloaded policy 8402 provided any time thereafter—for example by a dealer, after the vehicle is in operation, and/or as an update operation for the policy. Any number of intermediate policies, including at any stage before or after manufacturing and/or initial sale of the vehicle are contemplated herein. In certain embodiments, the built-in policy includes certain functionality, such as bootloading, initialization operations, or the like, that allow the collection of basic data, implementation of policy updates, or the like. In certain embodiments, basic functionality provided by a built-in policy 8406 is retained after other policies are implemented, and/or basic functionality may be implemented or replaced by a subsequent policy.

In certain embodiments, the higher level policies (e.g., downloaded policy 8402 relative to the factory policy 8404 and/or built-in policy 8406) supersede the lower policies. In certain embodiments, compatible portions of lower policies are retained, and the treatment of lower policies may vary (e.g., one of the factory policy 8404 and/or built-in policy 8406 includes at least a portion that is retained if compatible with a higher policy, where the other one of the factory policy 8404 and/or built-in policy 8406 is ignored, deprecated, and/or deleted when a higher policy is received). In certain embodiments, a lower policy that is ignored or deprecated is revived in response to the removal and/or expiration of a higher policy.

The description of the highest policy in the example of FIG. 84 references the highest policy as a "downloaded policy" as an example. However, a highest policy, and/or any other policy, may additionally or alternatively be received by any relevant operations, including provision by a tool having a direct connection (e.g., a physical port coupled to a network zone of the vehicle), through a LAN or WiFi connection, using cellular communications, and/or through any other operations. In certain embodiments, the downloaded policy 8402 may be received utilizing a replacement controller installed on a vehicle (e.g., as a service operation to replace a controller of the vehicle, wherein the replacement controller includes the downloaded policy 8402). In certain embodiments, the policy structure may have additional levels in a hierarchy, and/or more than one policy at a given level of the hierarchy. In certain embodiments, the assembly of the vehicle policy data value 2710, or portions thereof, occurs on a vehicle controller—for example where one or more, or all, of the policies 8402, 8404, 8406 are received by the policy acquisition circuit 2704, and the hierarchy is applied to provide a final on-vehicle policy data value 2710. In certain embodiments, the vehicle policy data value 2710 is assembled externally to the vehicle, and passed to the policy acquisition circuit 2704 after assembly. In certain embodiments, a combination of these is present—for example a vehicle policy data value 2710 is assembled and passed to the policy acquisition circuit 2704, and another downloaded policy 8402 (and/or vehicle policy data value 2710) is provided to the policy acquisition circuit 2704, which may replace and/or be added to the existing policy utilized on the vehicle.

Figure 85:
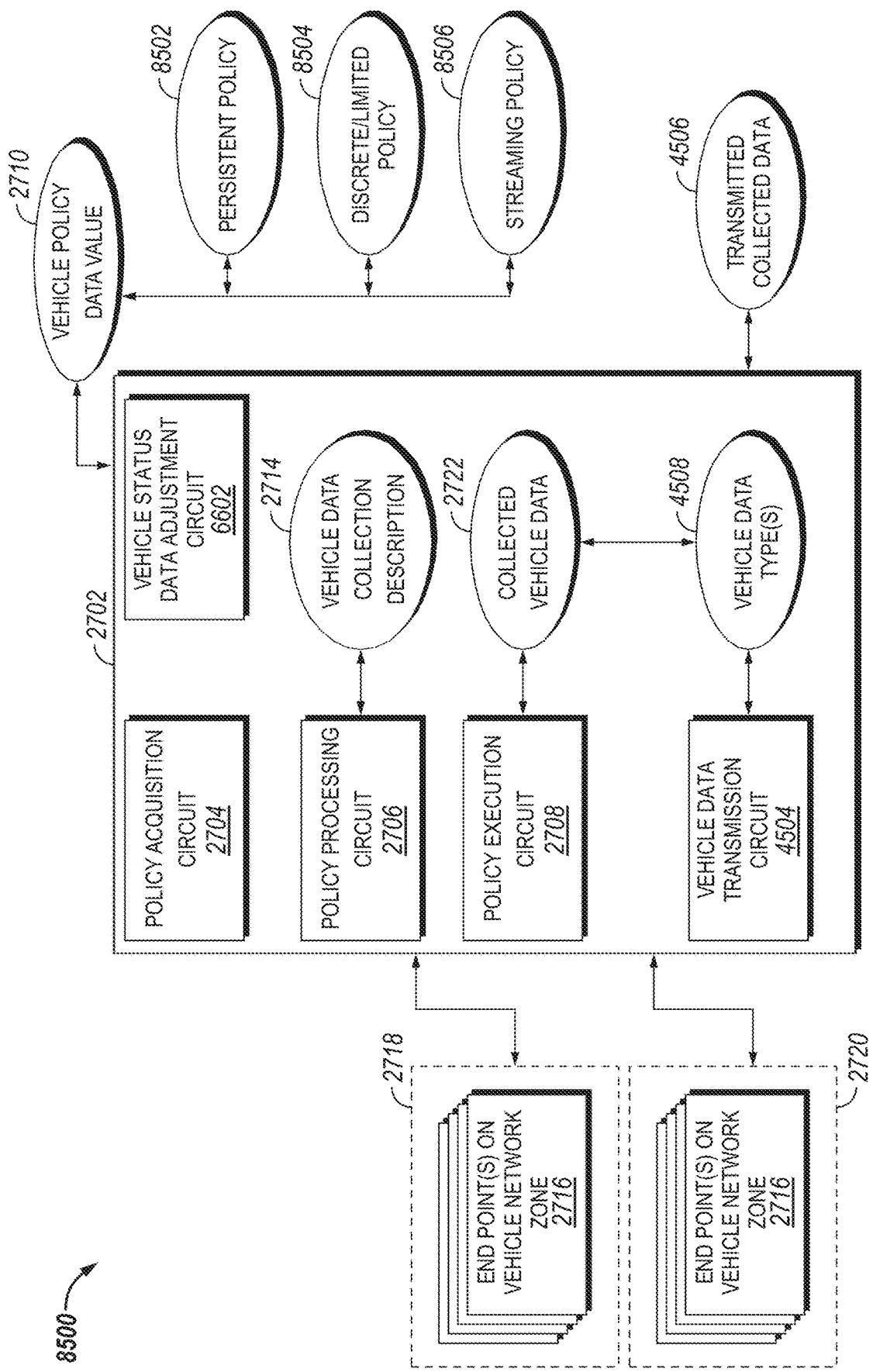
FIG. 85 is a schematic diagram of an example apparatus for utilizing multiple policy types to exercise vehicle data collection or other operations according to certain embodiments of the present disclosure.

Referencing FIG. 85, an example apparatus 8500 for utilizing multiple policy types to exercise vehicle data collection or other operations herein (e.g., trigger evaluation and consequent operations, control of authorization for data access, service access, and/or data collection, etc.) is schematically depicted.

The example apparatus 8500 operates similarly to apparatus 4500, with certain differences described here for purposes of illustration. The apparatus 8500 may be included in a system having a vehicle with one or more network zones as described throughout the present disclosure, and aspects of the apparatus 8500 may be included, in whole or part, with any systems, devices, controllers, and/or apparatuses as set forth throughout the present disclosure. Additionally or alternatively, aspects of any systems, devices, controllers, and/or apparatuses set forth herein may be included, in whole or part, with apparatus 8500.

The example of FIG. 85 includes a vehicle policy data value 2710 provided including one or more of a persistent policy 8502, a discrete (or limited) policy 8504, and a streaming policy 8506. In certain embodiments, the persistent policy 8502 sets forth data collection operations, or other operations, that exist on the vehicle on an ongoing basis, for example operating to collect data (and/or to check conditions for data collection) on an ongoing basis, for intermittent storage as collected vehicle data 2722, and transmission as transmitted collected data 4506 (e.g., according to priority values and/or other operations set forth herein). The example discrete policy 8504 sets for data collection operations, or other operations, that exist on the vehicle for execution over a selected time period, a selected number of operations, or the like. For example, a discrete policy 8504 may be configured to collect a specific set of data a single time, and/or to perform certain operations a single time (e.g., to open a door, start the vehicle, confirm an owner identity, etc.). After the selected number of executions, and/or expiration of the valid time frame, the discrete policy 8504 may be ignored, deprecated, and/or deleted. The example streaming policy 8506 sets forth data collection operations, or other operations, that exist on the vehicle either on an ongoing basis, for a selected time period, or the like, that provides transmits vehicle data 2722 immediately, or as soon as available, during operations pursuant to the streaming policy 8506. In certain embodiments, either a persistent policy 8502 or a discrete policy 8504 having a high transmission priority value, may operate effectively in the same manner, and in certain embodiments a streaming policy 8506 is implemented as another policy type having a high transmission priority value. The description including the persistent policy 8502, discrete policy 8504, and/or streaming policy 8506 is illustrative to demonstrate operations of certain embodiments. In certain embodiments, the policy acquisition circuit 2704 replaces a previous policy with an updated vehicle policy data value 2710, and/or replaces a previous policy with the updated vehicle policy data value 2710. In certain embodiments, the vehicle policy data value 2710 includes a data field or other implementing information that sets forth whether the policy should replace a previous policy, and/or to be appended to and/or utilized in addition to the previous policy. In certain embodiments, the data field or other implementing information is checked against an authorization of the policy provider (e.g., an entity providing the vehicle policy data value 2710 and/or one or more of the policies 8502, 8504, 8506) before implementing the updated policy. In certain embodiments, treatment of the policy types is distinct—for example a discrete policy 8504 and/or streaming policy 8506 may be always appended, and/or the persistent policy 8502 may selectively replace, append, and/or be added in parallel to a previous policy. The described operations are non-limiting examples.

Figure 86:
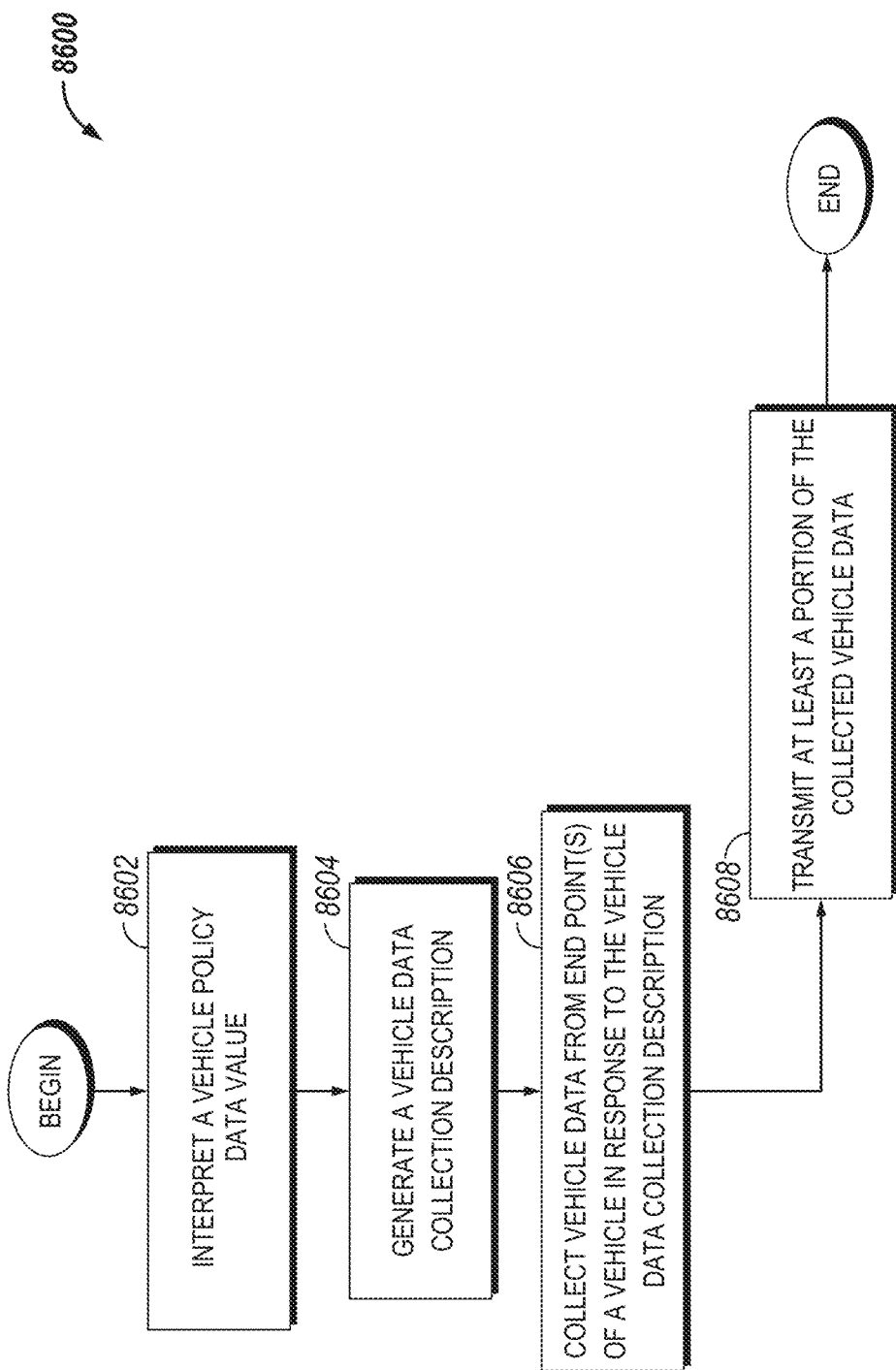
FIG. 86 is a flow chart depicting an example procedure for implementing policy execution on a vehicle according to certain embodiments of the present disclosure.

Referencing FIG. 86, an example procedure 8600 for implementing policy execution on a vehicle is schematically depicted. The procedure 8600 includes an operation 8602 to interpret a vehicle policy data value, an operation 8604 to generate a vehicle data collection description, an operation 8608 to collect vehicle data from end point(s) of a vehicle in response to the vehicle data collection description, and an operation 8608 to transmit at least a portion of the collected vehicle data. Operations of procedure 8600 may be performed in response to a hierarchy of policies (e.g., reference FIG. 84 and the related description) and/or in response to a number of policy types (e.g., reference FIG. 85 and the related description).

Figure 87:
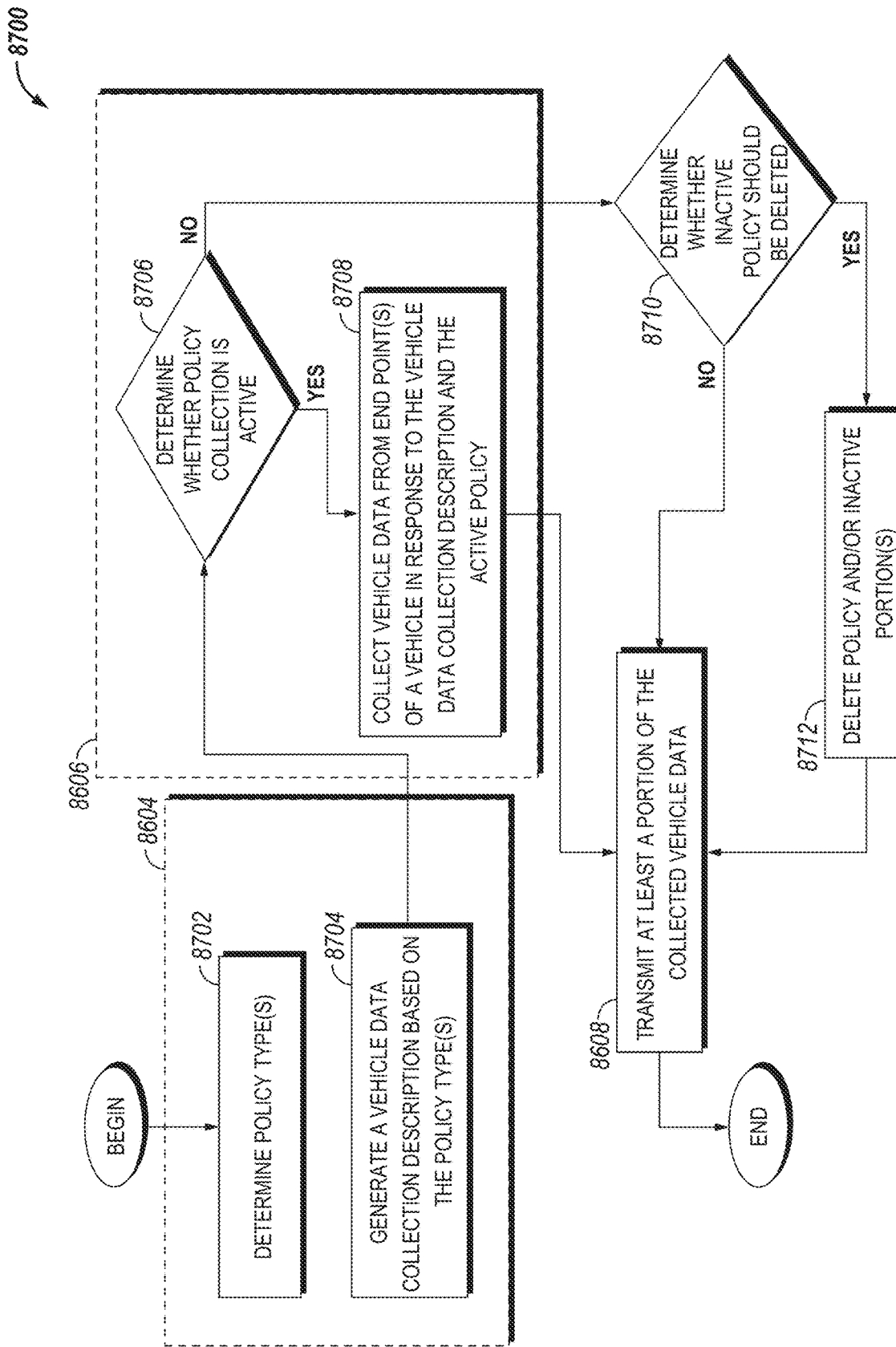
FIG. 87 is a flow chart depicting an example procedure for implementing policy execution on a vehicle according to certain embodiments of the present disclosure.

Referencing FIG. 87, an example procedure 8700 for implementing policy execution on a vehicle is schematically depicted. The procedure 8700 includes operation 8702 to determine policy type(s) provided to the vehicle, and operation 8704 to generate a vehicle data collection description based on the policy types. The operations 8702, 8704 may be combined as an operation 8604 to generate a vehicle data collection description. The example procedure 8700 further includes an operation 8706 to determine whether policy collection is active (e.g., if data collection pursuant to a policy is active, and/or monitoring for potential data collection pursuant to the policy is active), and operation 8708 to collect vehicle data in response to the vehicle data collection description if the operation 8706 determines YES. The operations 8706, 8708 may be combined as an operation 8606 to collect data from end points of a vehicle in response to the vehicle data collection description. The example procedure 8700 includes operation 8710 to determine if the inactive policy should be deleted—for example if a replaced policy, expired policy, resolved discrete policy, and/or a discrete and/or streaming policy having a time frame that has elapsed. In certain embodiments, the procedure 8700 includes an operation 8608 to transmit at least a portion of the collected vehicle data, for example in response to collected data from operation 8708, and/or in response to data previously collected for the inactive policy that has not been transmitted yet. In certain embodiments, the example procedure 8700 includes an operation 8712 to delete a policy and/or inactive portions of the policy, for example in response to operation 8710 determining YES. The operations of procedure 8700 may be configured to retain an inactive policy until data collected pursuant to the inactive policy have been transmitted. Additionally or alternatively, the inactive policy may be deleted, and the data collected pursuant to the inactive policy may be transmitted at a later time.

Figure 88:
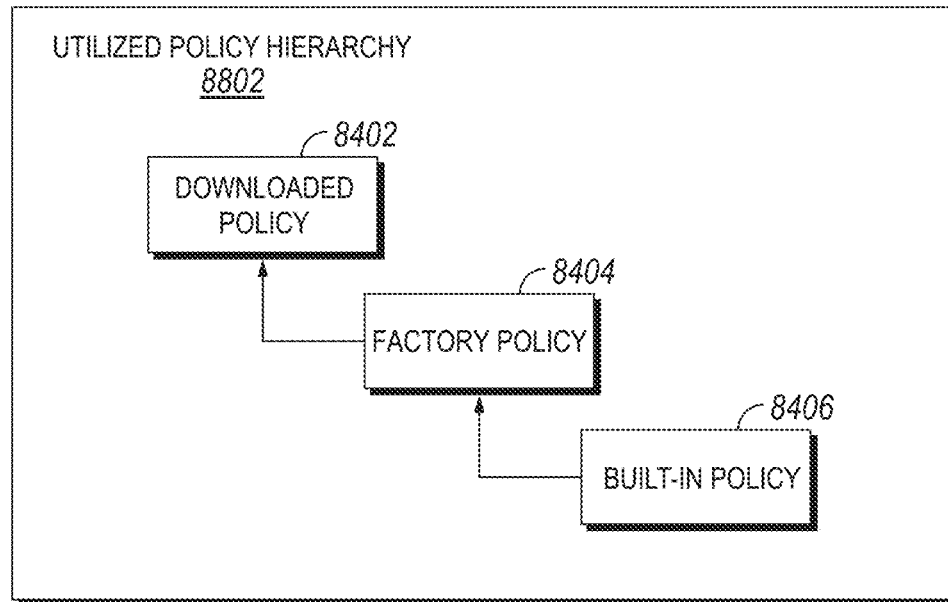
FIG. 88 is a schematic diagram of an example utilized policy hierarchy according to certain embodiments of the present disclosure.
Figure 89:
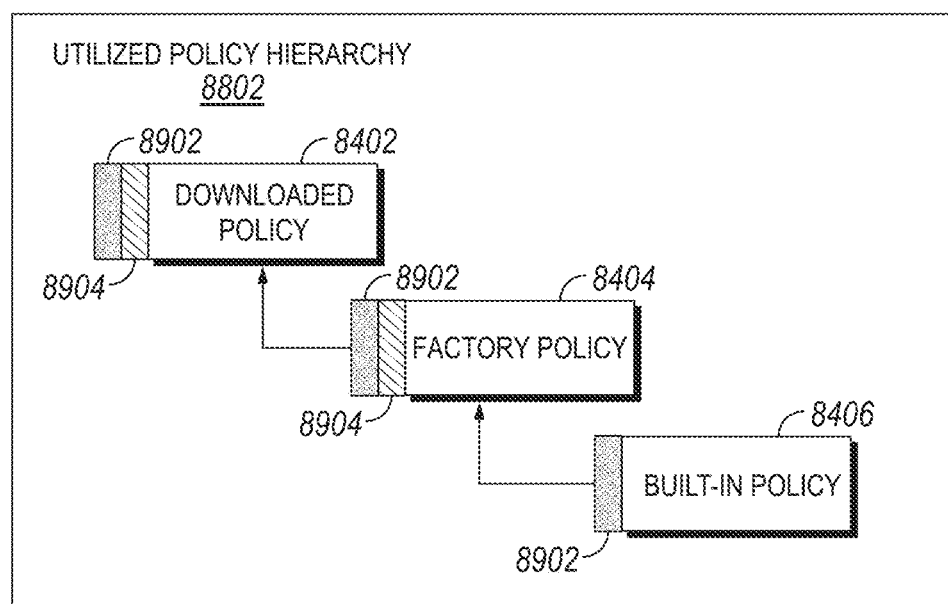
FIG. 89 is a schematic diagram of another example utilized policy hierarchy according to certain embodiments of the present disclosure.

Referencing FIG. 88, an illustrative utilized policy hierarchy 8802 is schematically depicted. In the example of FIG. 88, a downloaded policy 8402 is utilized if present, a factory policy 8404 is utilized if present and if the downloaded policy 8402 is not present, and a built-in policy 8406 is utilized if present, and if neither the downloaded policy 8402 or factory policy 8404 are present. Referencing FIG. 89, another illustrative utilized policy hierarchy 8802 is schematically depicted. In the example of FIG. 89, the built-in policy 8406 includes a compatible portion 8902 with the factory policy 8404 and the downloaded policy 8402, the factory policy 8404 includes a compatible portion 8904 with the downloaded policy 8402, and the final utilized policy includes the downloaded policy 8402 combined with the appended compatible portions 8904, 8902 of the factory policy 8404 and the built-in policy 8406. The example of FIG. 89 is illustrative, and for purposes of clarity the compatible portion 8902 of the built-in policy 8406 is depicted as compatible with both of the factory policy 8404 and the downloaded policy 8402. It will be understood that a portion of the built-in policy 8406 may be compatible with only one of the factory policy 8404 or the downloaded policy 8402, where only the compatible portions with both of the factory policy 8404 and the downloaded policy 8402 appended in the final policy. The example of FIG. 89 depicts appending the compatible portions of lower policies for clarity of the description. In certain embodiments, the policy processing circuit 2706 may utilize compatible portions to construct the vehicle data collection description 2714, without compiling a final policy having appended portions. For example, the policy processing circuit 2706 may provide the vehicle data collection description 2714 to implement the downloaded policy 8402, and the compatible portions of the lower policies, without constructing the appended final policy.

Figure 90:
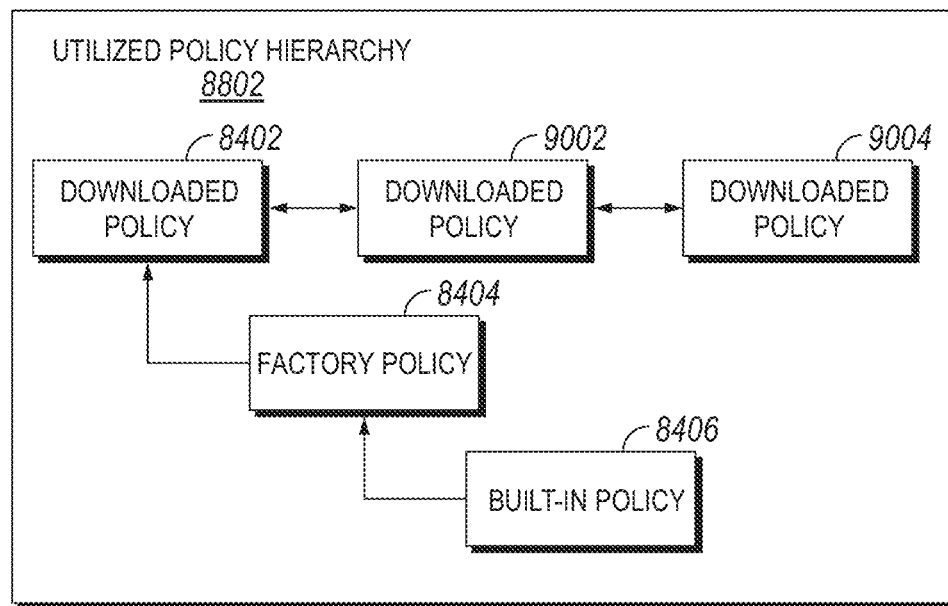
FIG. 90 is a schematic diagram of another example utilized policy according to certain embodiments of the present disclosure.
Figure 91:
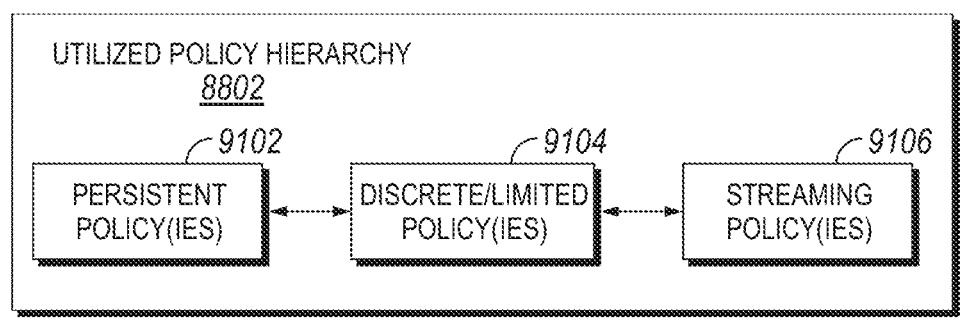
FIG. 91 is a schematic diagram of another example utilized policy according to certain embodiments of the present disclosure.

Referencing FIG. 90, an illustrative utilized policy hierarchy 8802 is schematically depicted, with a number of downloaded policies 8402, 9002, 9004 utilized in the construction of a final policy and/or the vehicle data collection description 2714. In the example, the lower policies may be ignored and/or utilized in compatible portions. Referencing FIG. 91, an example utilized policy hierarchy 8802 is schematically depicted, having a number of high level policies, such as one or more persistent policies 9102, one or more discrete policies 9104, and/or streaming policies 9106. The utilized policy hierarchy 8802 may be a compiled version of the policies 9102, 9104, 9106, and/or a vehicle data collection description 2714 constructed utilizing the policies 9102, 9104, 9106. In certain embodiments, the policies 9102, 9104, 9106 may be provided within a policy hierarchy, for example where all of the policies 9102, 9104, 9106 are treated as a downloaded policy 8402 and/or a highest level policy. In certain embodiments, the policies 9102, 9104, 9106 may have a hierarchy therebetween, for example determined according to a priority value and/or authorization value associated with an entity, device, flow, application, or the like providing the policy, where higher ones of the policies 9102, 9104, 9106 supersede lower ones of the policies, and/or where compatible portions of the lower ones of the policies are implemented. In certain embodiments, the utilized policy hierarchy 8802 may further include lower policies such as a factory policy 8404, a built-in policy 8406, where the lower policies 8404, 8406 may be ignored and/or utilized in compatible portions. In certain embodiments, a discrete policy 9104 and/or streaming policy 9106 is provided that is incompatible with a portion of a lower policy 8404, 8406, where the incompatible portion is ignored during operations pursuant to the higher level policy 9104, 9106 and revived after the higher level policy 9104, 9106 is resolved (e.g., data collection operations are completed, the relevant implementation time expires, and/or the higher level policy 9104, 9106 is deleted 8712).

Figure 92:
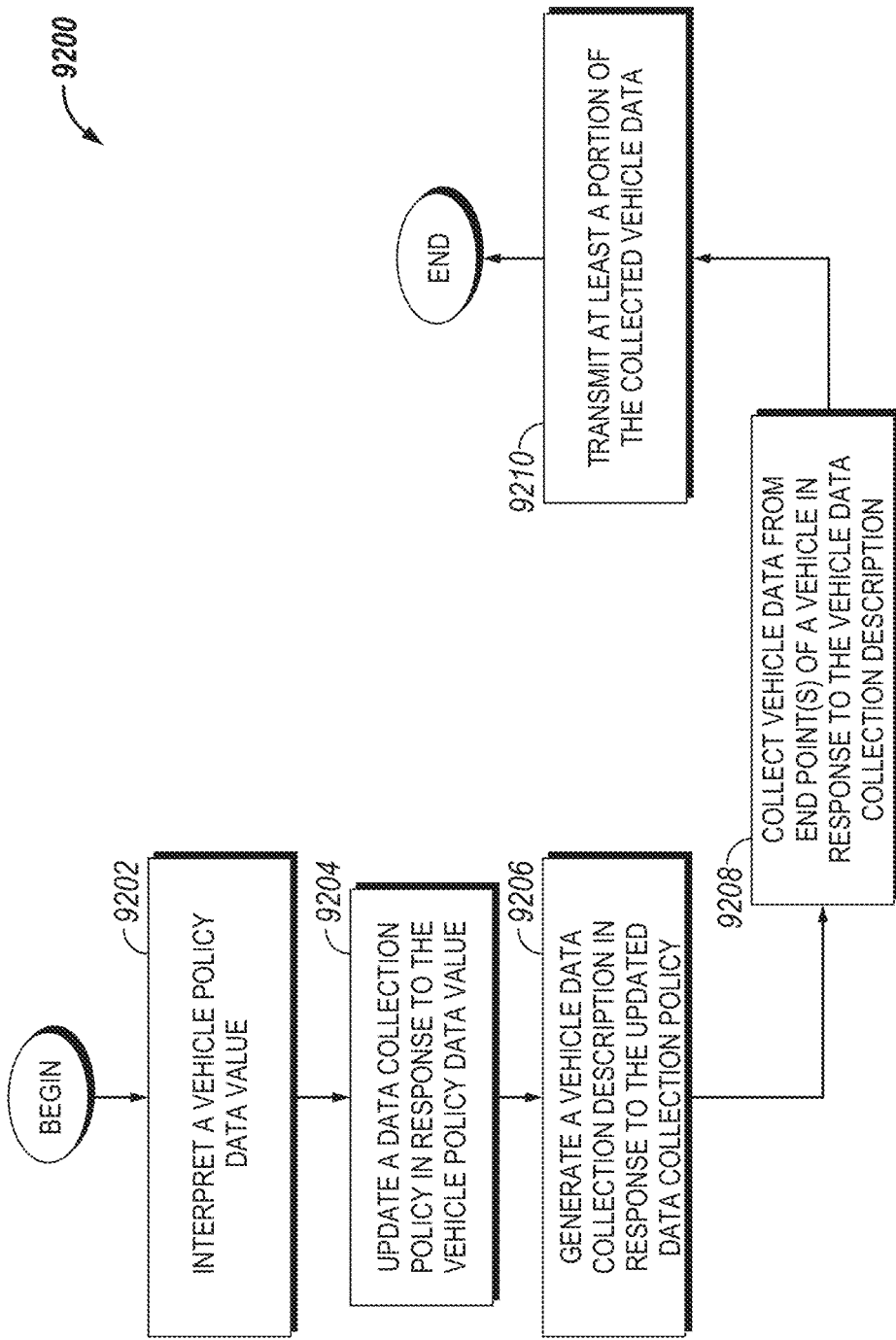
FIG. 92 is a flow chart depicting an example procedure to update a data collection policy according to certain embodiments of the present disclosure.

Referencing FIG. 92, an example procedure 9200 to update a data collection policy is schematically depicted. The example procedure 9200 includes an operation 9202 to interpret a vehicle policy data value, an operation 9204 to update a data collection policy in response to the vehicle policy data value (e.g., appending an update to the policy, providing the added policy as an additional policy to be implemented, and/or deleting a previous policy). The example procedure 9200 further includes an operation 9206 to generate a vehicle data collection description in response to the updated data collection policy, an operation 9208 to collect vehicle data responsive to the vehicle data collection description, and an operation 9210 to transmit at least a portion of the collected vehicle data.

Figure 93:
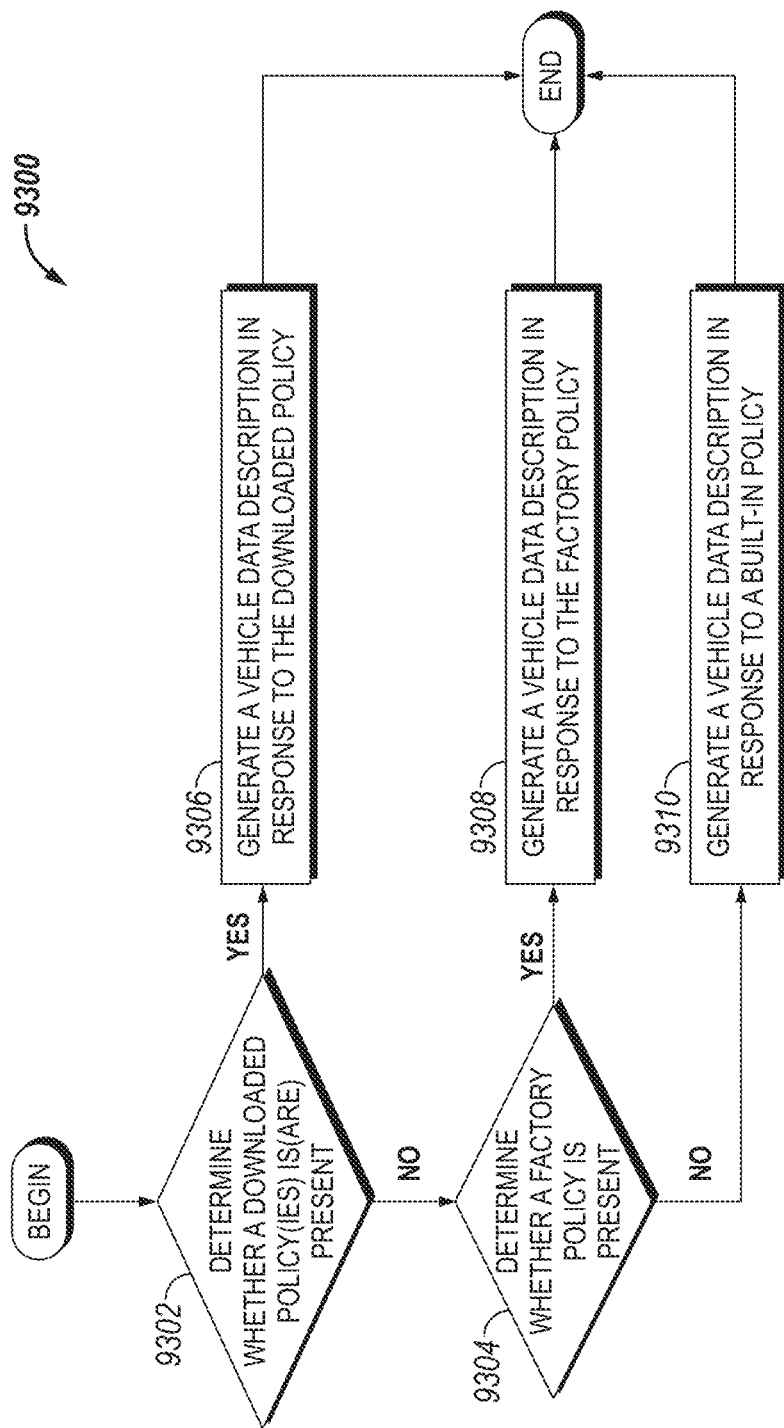
FIG. 93 is a flow chart depicting an example procedure to implement a policy hierarchy according to certain embodiments of the present disclosure.

Referencing FIG. 93, an example procedure 9300 to implement a policy hierarchy is depicted. The example procedure 9300 includes an operation 9302 to determine whether a downloaded policy is present on the vehicle, and an operation 9306 to generate a vehicle data collection description in response to operation 9302 determining YES. The example procedure 9300 includes an operation 9304 to determine whether a factory policy is present, and an operation 9308 to generate the vehicle data collection description in response to operation 9304 determining YES. The example procedure 9300 includes an operation 9310 to generate the vehicle data collection description in response to a built-in policy, in response to operation 9304 determining NO. The example operations of procedure 9300 utilize a highest level policy as the policy, but may be adjusted to implement compatible portions of one or more of the lower level policies.

Figure 94:
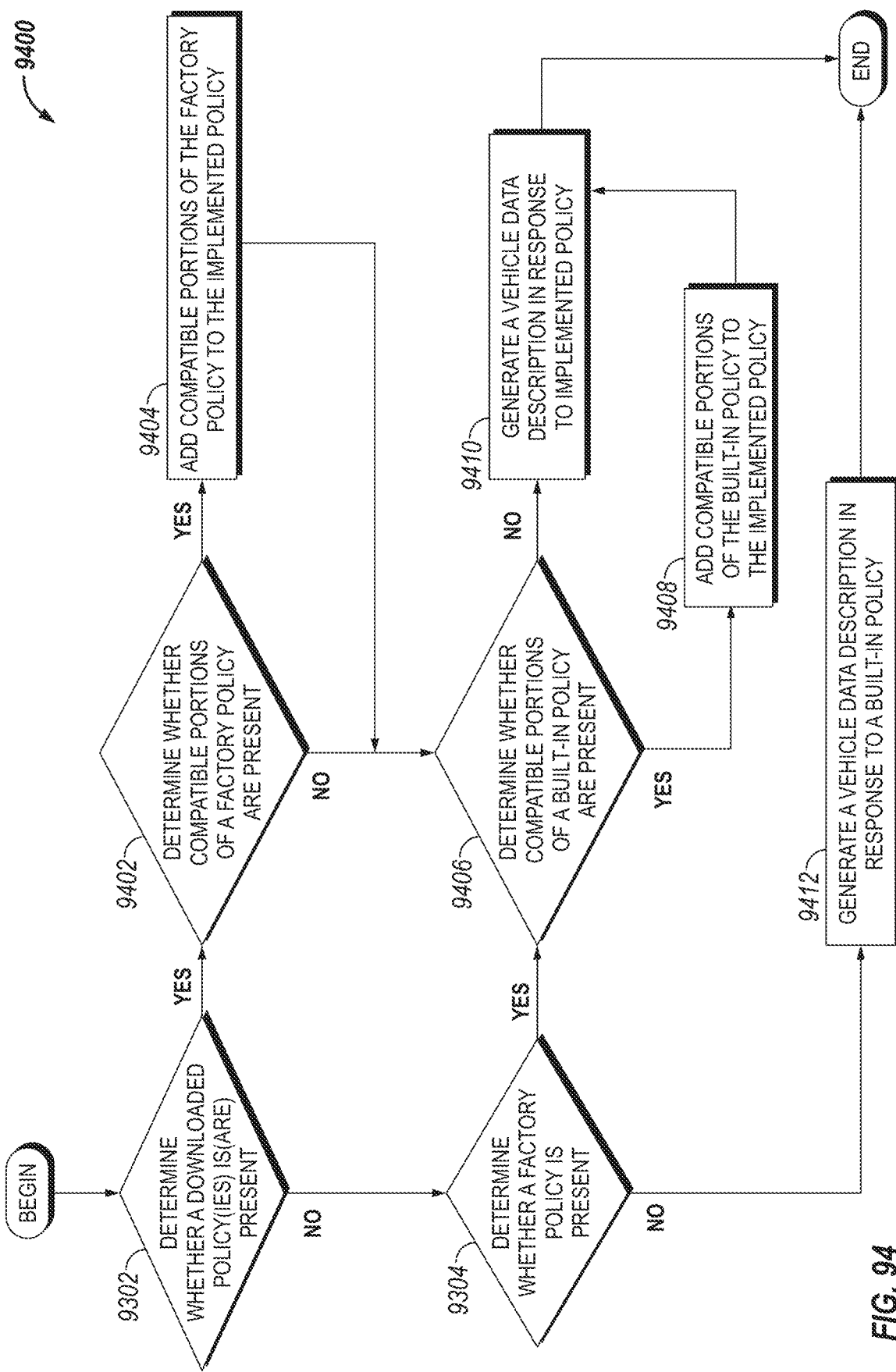
FIG. 94 is a flow chart depicting an example procedure to implement a policy hierarchy according to certain embodiments of the present disclosure.

Referencing FIG. 94, an example procedure 9400 to implement a policy hierarchy is depicted. In the example of FIG. 94, an operation 9402 determines whether compatible portions of a factory policy are present in response to determination YES from operation 9302. In the example of FIG. 94, operation 9404 include adding compatible portions of the factory policy to the implemented policy, and operation 9406 to determine whether compatible portions of the built-in policy are present in response to any one of: operation 9404, operation 9402 determining NO, and/or operation 9304 determining YES. The example procedure 9400 includes operation 9412 to generate the vehicle data collection description in response to the built-in policy, for example where neither the downloaded policy or the factory policy are present. The example procedure 9400 includes operation 9410 to generate the vehicle data description in response to the implemented policy, excluding the built-in policy, in response to operation 9406 determining NO. The example procedure 9400 includes operation 9408 to add compatible portions of the built-in policy to the implemented policy, and operation 9410 to generate the vehicle data description in response to the implemented policy, in response to operation 9406 determining YES.

Figure 95:
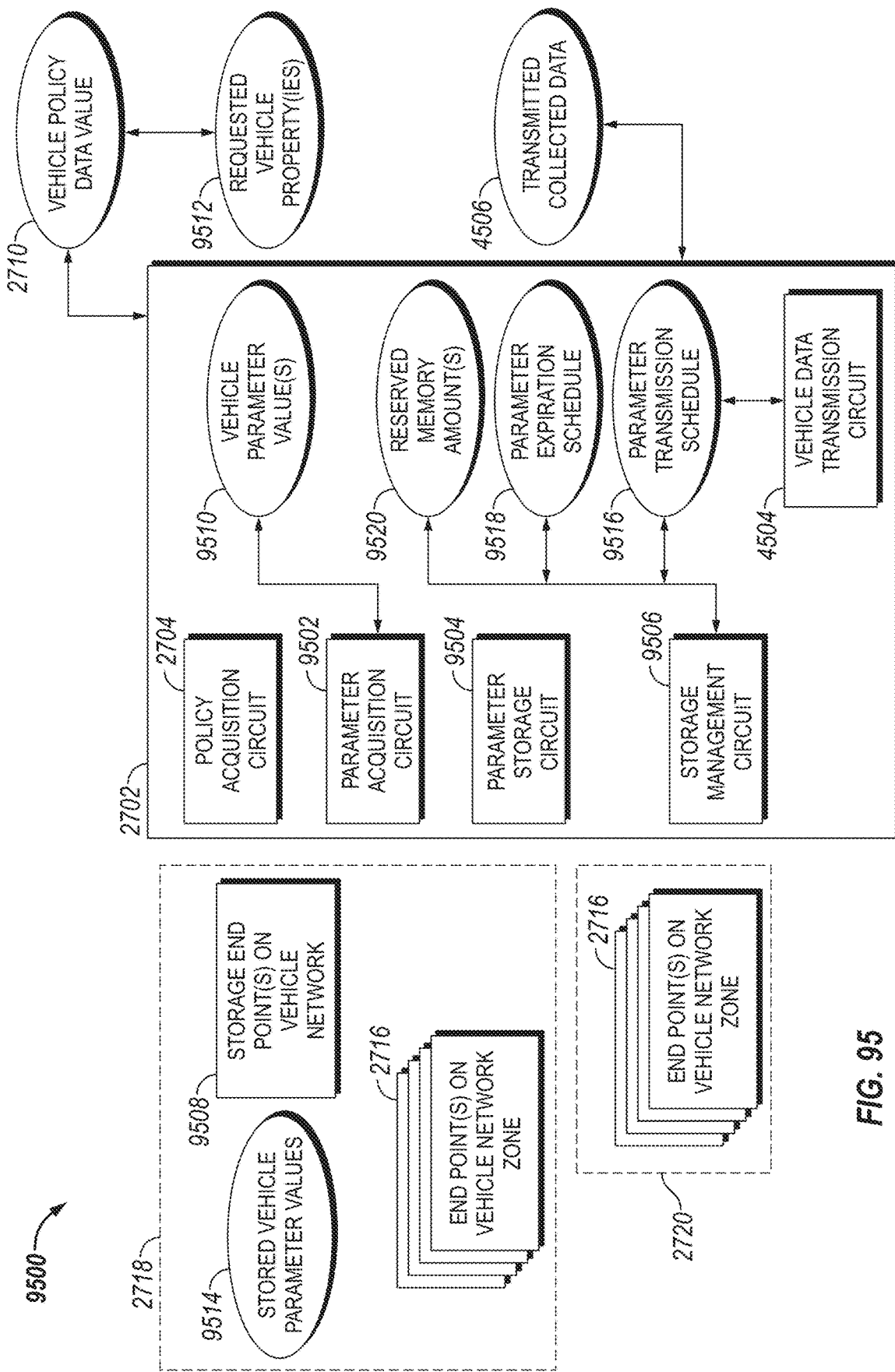
FIG. 95 is a schematic diagram of an example apparatus for performing data collection operations utilizing a shared storage for collected data according to certain embodiments of the present disclosure.

Referencing FIG. 95, an example apparatus 9500 for performing data collection operations utilizing a shared storage for collected data is schematically depicted. The example apparatus 9500 operates similarly to apparatus 4500, with certain differences described here for purposes of illustration. The apparatus 9500 may be included in a system having a vehicle with one or more network zones as described throughout the present disclosure, and aspects of the apparatus 9500 may be included, in whole or part, with any systems, devices, controllers, and/or apparatuses as set forth throughout the present disclosure. Additionally or alternatively, aspects of any systems, devices, controllers, and/or apparatuses set forth herein may be included, in whole or part, with apparatus 9500.

The example apparatus includes a parameter acquisition circuit 9502 that interprets a number of vehicle parameter values 9510 responsive to requested vehicle property(ies) 9512 of a vehicle policy data value 2710. The vehicle parameter values 9510 are interpreted from end point(s) 2716 on one or more network zones 2718, 2720 of a vehicle. The example apparatus 9500 further includes a parameter storage circuit 9504 that selectively stores at least a portion of the vehicle parameter values 9510, where at least a first portion of the stored vehicle parameter values 9514 are stored on a storage end point 9508 that is distinct from a providing end point for the stored vehicle parameter values 9514. In certain embodiments, all of the stored vehicle parameter values 9514 are stored on a single end point. The utilization of shared storage for collected data parameters can be used to consolidate capabilities in the system, providing for a few (or one) high capability storage resources in the system, reducing overall costs and complexity to manage storage of data collection parameters. The shared storage may be a general storage capable of storing any type of data from any ECU and/or applications. Additionally or alternatively, processing capability can be consolidated into a few (or one) high capability processing resource, which may be provided on controllers having high memory capability as well. The utilization of shared storage is supported by the ability of the parameter acquisition circuit 9502 to reach and move data from any end point on any network zone, while maintaining security, for example utilizing operations of a CEG, CES, CND, or the like. In certain embodiments, data at rest in the system (e.g., buffered data, cached data, stored vehicle parameter values, policy information and/or parsed policy data, and the like) is encrypted. The management of encrypted stored data is simplified with a reduced number of storage resources utilized in the system. In certain embodiments, shared storage may be provided by a single controller having memory resources, which may include a controller having policy management components such as the policy acquisition circuit 2704 and the like. However, the shared storage may be distributed across several controllers, and/or may be included separately from a controller having policy management components. In certain embodiments, policy management components are distributed, in whole or part, across several controllers, and may be provided partially on a controller having shared storage resources, or independently from a controller having shared storage resources. Controllers having shared storage resources are coupled to the system as end points of a network zone of the vehicle, and in certain embodiments controllers having policy management components are themselves end points of a network zone of the vehicle. Operations of the controller 2702 are capable to manage shared memory resources, including providing memory allocation provided for data collection operations, buffering and caching of parameter values, expiration of stored data, transmission of stored data, and/or reallocation of memory based on changes in a policy, observed data collection operations, and the like.

The allocation of memory resources may consider the amount of data to be collected to support policy collection operations, supporting data such as rolling buffer data (e.g., to capture historical data, perform trigger analysis, and the like), trigger evaluation data, conditionally stored data that may be sent upon request, the network zone location(s) of end points providing data and having shared storage resources (e.g., to determine on-vehicle network communication impacts in determining data generation and data storage locations), and transmission impacts for on-vehicle networks when the collected data is transmitted as transmitted collected data 4506. For example, a shared storage resource that requires fewer on-vehicle network resources to transmit may be selected to store the vehicle parameters that are likely to be transmitted, where a shared storage resource that requires more on-vehicle network resources to transmit (e.g., where the data is transferred from one network zone to another network zone before it can be transmitted) may be utilized for trigger evaluation data, intermediate data used for calculations and/or virtual parameter determinations, rolling buffer data where a large majority of the data is iteratively re-written, and only occasionally or never transmitted unless an event occurs, and/or any other type of data that is less likely to be transmitted, or that is a type of data that is never transmitted. In certain embodiments, data having a lower priority value and/or having a low value loss indication in response to memory management operations (e.g., the data as compressed, summarized, down-sampled, aged, or the like maintains a relatively high fraction of the original value of the data as collected) may be stored on a shared memory resource having a relatively higher transmission cost, since such data is more likely to be reduced through memory management operations before transmission than other data having a higher priority and/or higher value loss due to memory management operations.

An example parameter storage circuit 9504 selectively stores the at least a portion of the plurality of vehicle parameter values 9514 on a single storage end point 9508. An example storage management circuit 9506 determines a parameter transmission schedule 9516 for stored vehicle parameter values, and the parameter storage circuit 9504 selectively stores the at least a portion of the plurality of vehicle parameter values 9514 in response to the parameter transmission schedule 9516. The parameter transmission schedule 9516 may include estimated values for data collection operations to service aspects of the policy (or policies), and may further include estimated transmission times, data residence times, or the like, to determine memory allocation values to support the data collection operations. In certain embodiments, the transmission schedule 9516 is defined in the vehicle policy data value 2710, and/or determined in response to data in the vehicle policy data value 2710—for example according to transmission time constraints, time delay cost descriptions, priority values, or the like. Accordingly, the parameter storage circuit 9504 can determine which data collection operations require memory support, the amount of memory to support each operation, and select locations for the storage end points 9508 (e.g., where more than one shared storage resource is available) that protect the value of the data, reduce transmission costs, and preserve on-vehicle network resources to support other functions of the vehicle.

An example apparatus 9500 includes the storage management circuit 9506 determining a parameter expiration schedule 9518 for stored vehicle parameter values 9514, for example as defined in the policy, determined according to a data type of the respective collected data, and/or determined according to a loss value for the data based on time and/or likely memory management operations that will be performed on the data based on expected transmission delays (including consideration for uncertainties in the transmission delays). The example parameter storage circuit 9504 further selectively stores the at least a portion of the plurality of vehicle parameter values 9514 in response to the parameter expiration schedule 9518, for example adjusting allocated memory values, selected storage end points 9508, or the like.

Example operations of the parameter storage circuit 9504 to the parameter expiration schedule 9518 include operations such as: deleting at least a portion of the stored vehicle parameter values 9514 (e.g., after determining that the parameters have expired); summarizing at least a portion of the stored vehicle parameter values (e.g., storing a reduced form of the stored vehicle parameters 9514, such as a statistical description, average value, qualitative description, bucketed data description, etc.); compressing at least a portion of the stored vehicle parameter values; and/or adjusting a reserved memory amount 9520 associated with at least a portion of the stored vehicle parameter values 9514. Any other memory management operations as set forth throughout the present disclosure are also contemplated as operations of the parameter storage circuit 9504 to the parameter expiration schedule 9518. An example parameter storage circuit 9504 determines the reserved memory amount 9520 (e.g., memory allocation values on the storage end points 9508) associated with at least a portion of the plurality of vehicle parameter values, and selectively stores the at least a portion of the plurality of vehicle parameter values 9514 in response to the reserved memory amount 9520.

It will be seen that certain storage amount determinations depend upon the formatting and/or processing that is applied to the data, and determining the storage amount may consider how and when the formatting and/or processing is performed. For example, down-sampling operations reduce the number of data values utilized to capture a specified stream of data (e.g., a 10 second segment of data), and in certain embodiments down-sampling processing may be performed before the data is stored. In another example, up-sampling operations increase the number of data values utilized to capture a specified stream of data, which may be performed after storage of the initial data to preserve memory storage for collected data. In the example, the up-sampling operations would be performed before the data is transmitted, and/or the up-sampling operations may be performed by an off-vehicle processing resource before the transmitted data is provided to an end user and/or placed in cloud storage. In certain embodiments, certain types of processing, such as frame removal or reduction, bit depth reduction, precision reduction (e.g., converting a double precision floating point value to a single precision floating point value), and/or certain lossless compression operations (e.g., storage of consistent values such as a parameter name value in a single location or a few locations, rather than with every data value) reduce storage resources and utilize few processing resources, and may be performed before storage of the data values. In certain embodiments, certain types of processing, such as frame addition or enhancement, bit depth increases, and/or precision increases, increase the stored data value size, allowing for a selection between processing as-needed (e.g., to minimize storage size), selectively processing (e.g., in batches when processing resources on the vehicle are in a relatively low utilization period—such as during shutdown operations, idle operations, steady state operations, or the like) which may preserve responsiveness when a transmission opportunity occurs but reduce the overall storage impact of the collected data, and/or transfer of processing to off-vehicle resources (e.g., processing operations performed by an off-vehicle resource before providing to an end user and/or placing in a cloud storage). In certain embodiments, certain types of processing, such as lossy compression operations, more sophisticated lossless compression operations that utilize significant processing, or the like, reduce the storage impact, and may be performed selectively as processing resources are available and/or according to an aging of the stored data. Thus, the storage management circuit 9506 is capable to determine the characteristics of the system, including on-vehicle network communication resources, storage resources, processing resources and availability based on vehicle operating conditions, availability of transmission resources (including estimated time gaps between transmission opportunities, amount of data transmitted during transmission opportunities, etc.), availability of off-vehicle processing resources for formatting and/or processing data values, and the like, to determine values of the reserved memory amounts 9520, parameter expiration schedule 9518, parameter transmission schedule 9516, and the selection of processing, formatting, and/or memory management operations to reduce costs, reduce resource utilization, avoid impacts to the mission (and/or mission critical) function of controllers and/or network zones of the vehicle, and improve system capability (e.g., improved memory resource management results in the ability to service a policy having a greater data collection capability for a given memory storage amount). Additionally or alternatively, any one or more aspects set forth may be defined, at least partially, in the policy—for example and without limitation: parameter expiration times, memory management operations to be performed and the related data age values for such operations, transmission delay values that may be acceptable for data collection associated with the policy, the availability of external processing capability and/or formatting or processing operations that are allowed to be shifted off-vehicle.

Example operations to determine the reserved memory amount 9520 include operations such as: determining an amount of data to be collected to support the at least a portion of the plurality of vehicle parameter values (e.g., based on sampling rates, up-sampling and/or down-sampling operations, formatting operations, number of data values, estimated residence time of the data values, etc.); determining an amount of data to be collected to support a trigger evaluation associated with the at least a portion of the plurality of vehicle parameter values (e.g., associated data utilized to determine trigger evaluations, and/or rolling buffers or other historical data that might be captured based on a trigger event); or determining a transmission latency value associated with the at least a portion of the plurality of vehicle parameter values (e.g., transmission delays may be imposed due to the storage location of the data values, and/or processing operations to be performed on stored data before transmission, such that the parameter storage circuit 9504 adjusts the reserved memory amount 9520 to ensure acceptable servicing of the policy). An example parameter storage circuit 9504 further determines the reserved memory amount 9520 in response to a priority value associated with the at least a portion of the vehicle parameter values. In certain embodiments, high priority values associated with collected data values may indicate a higher memory allocation—for example to ensure those values are available for transmission. In certain embodiments, high priority values associated with collected data values may indicate a lower memory allocation—for example due to a high time degradation of the data value (e.g., collected data that has zero value after five minutes does not require storage beyond the five minutes) and/or due to a high likelihood that that data will be transmitted before it takes up significant memory space. In certain embodiments, the parameter storage circuit 9504 determines the reserved memory amount 9520 based on the priority value and other considerations as set forth herein, and/or may further update the reserved memory amount 9520 in response to feedback—for example reducing allocations for data collection units that under-utilize allocated memory, and increasing allocations for data collection units that over-utilize allocated memory, consistently experience memory management operations, and/or adjusting based on historical transmission opportunity values, vehicle operating condition values, and the like. Example priority values may be provided in the policy, and include any priority values set forth herein, including at least an on-vehicle data storage priority, a transmission priority, and/or an associated priority such as a priority for an end point (e.g., providing, requesting, and/or storing the data values), a priority for a flow (providing and/or requesting the data values), a priority for an application (e.g., providing and/or requesting the data values), priority for an entity (e.g., requesting the data values), and/or a priority associated with a data type of the data values.

Figure 96:
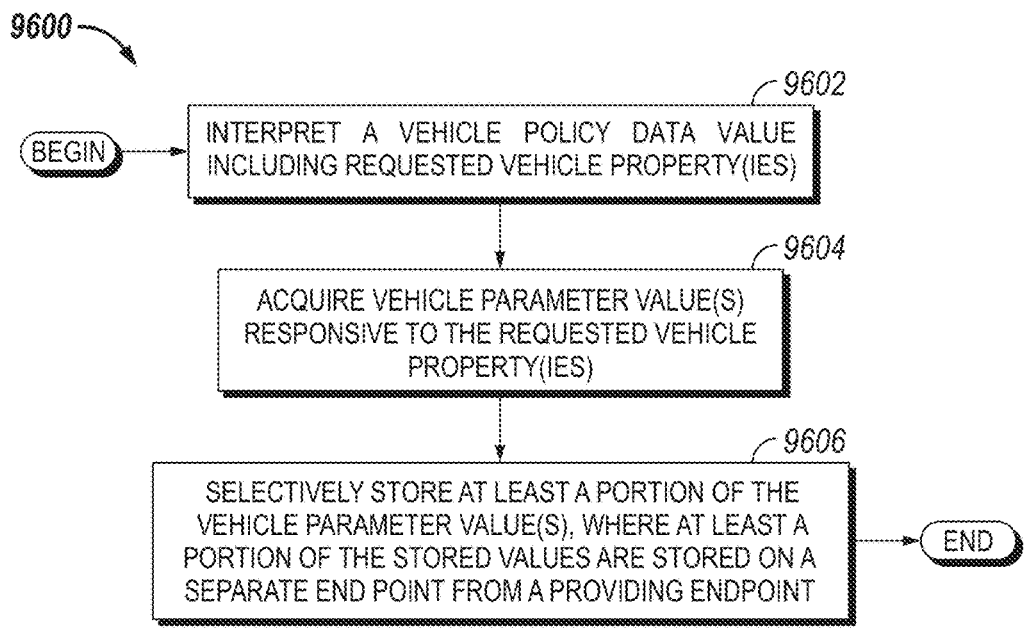
FIG. 96 is a flow chart depicting an example procedure for selectively storing collected data parameters on a vehicle according to certain embodiments of the present disclosure.
Figure 97:
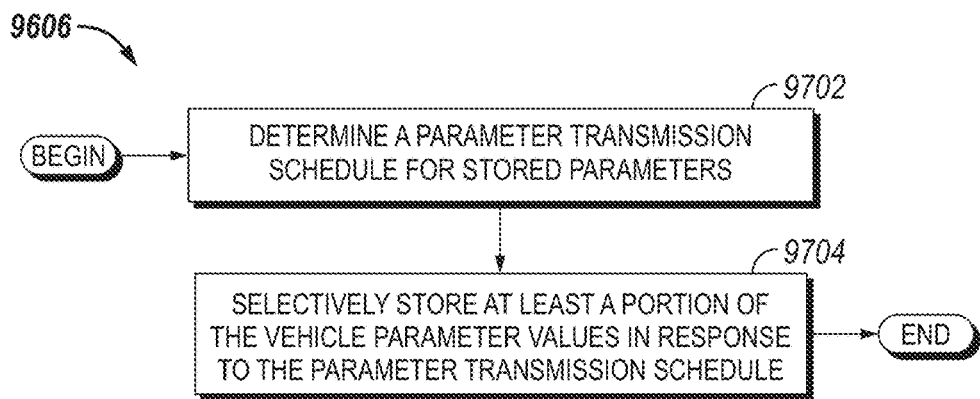
FIG. 97 is a schematic diagram of an example operation that includes an operation to determine a parameter transmission schedule for stored parameters, and an operation to selectively store at least a portion of vehicle parameter values, according to certain embodiments of the present disclosure.
Figure 98:
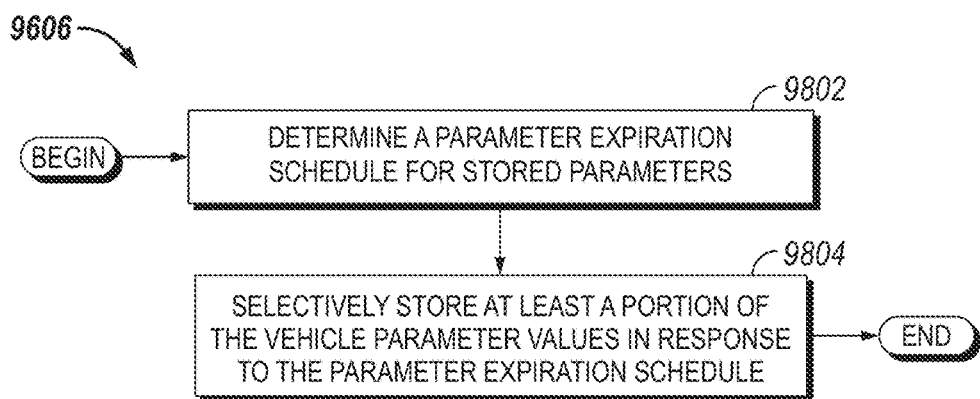
FIG. 98 is a schematic diagram of an example operation that includes an operation to determine a parameter expiration schedule for stored parameters, and an operation to selectively store at least a portion of vehicle parameter values, according to certain embodiments of the present disclosure.
Figure 99:
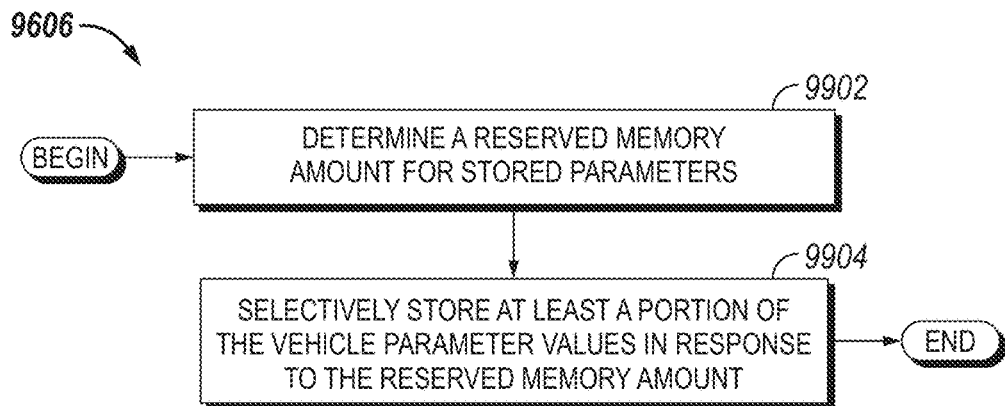
FIG. 99 is a schematic diagram of an example operation that includes an operation to determine a reserved memory amount for stored parameters, and an operation to selectively store at least a portion of vehicle parameter values in response to the reserved memory amount, according to certain embodiments of the present disclosure.
Figure 100:
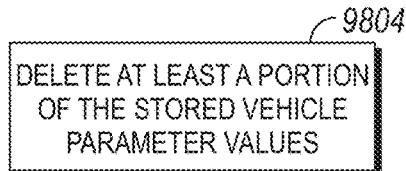
FIG. 100 is a schematic diagram of an example operation that includes deleting at least a portion of stored vehicle parameter values according to certain embodiments of the present disclosure.
Figure 101:
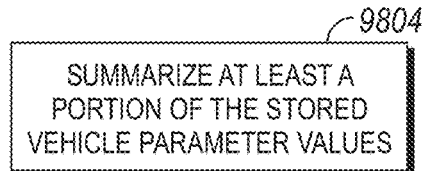
FIG. 101 is a schematic diagram of an example operation that includes summarizing at least a portion of the stored vehicle parameter values according to certain embodiments of the present disclosure.
Figure 102:
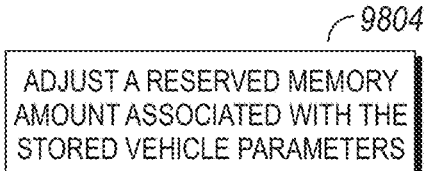
FIG. 102 is a schematic diagram of an example operation that includes adjusting a reserved memory amount associated with stored vehicle parameters according to certain embodiments of the present disclosure.
Figure 103:
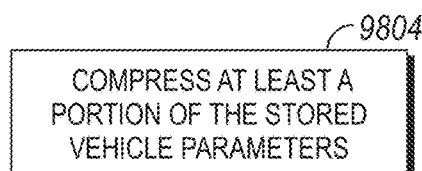
FIG. 103 is a schematic diagram of an example operation that includes compressing at least a portion of stored vehicle parameters according to certain embodiments of the present disclosure.
Figure 104:
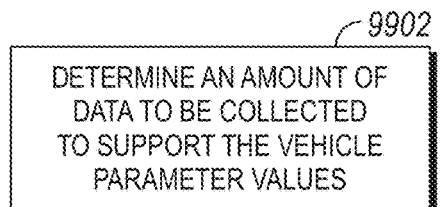
FIG. 104 is a schematic diagram of an example operation that includes determining an amount of data to be collected to support vehicle parameter values according to certain embodiments of the present disclosure.
Figure 105:
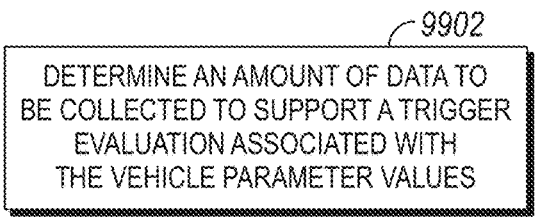
FIG. 105 is a schematic diagram of an example operation that includes determining an amount of data to be collected to support a trigger evaluation associated with vehicle parameter values according to certain embodiments of the present disclosure.
Figure 106:
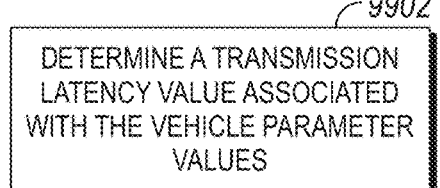
FIG. 106 is a schematic diagram of an example operation that includes determining a transmission latency value associated with vehicle parameter values according to certain embodiments of the present disclosure.
Figure 107:
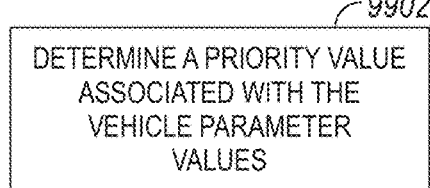
FIG. 107 is a schematic diagram of an example operation that includes determining a priority value associated with vehicle parameter values according to certain embodiments of the present disclosure.

Referencing FIG. 96, an example procedure 9600 for selectively storing collected data parameters on a vehicle is schematically depicted. The example procedure 9600 includes an operation 9602 to interpret a vehicle policy data value including requested vehicle properties, and an operation 9604 to acquire vehicle parameter value(s) responsive to the requested vehicle properties. The example procedure 9600 further includes an operation 9606 to selectively store at least a portion of the vehicle parameter value(s), where at least a portion of the stored values are stored on a separate end point from a providing end point. Referencing FIG. 97, an example operation 9606 includes an operation 9702 to determine a parameter transmission schedule for stored parameters, and an operation 9704 to selectively store at least a portion of the vehicle parameter values in response to the transmission parameter schedule. Referencing FIG. 98, an example operation 9606 includes an operation 9802 to determine a parameter expiration schedule for stored parameters, and an operation 9804 to selectively store at least a portion of the vehicle parameter values in response to the parameter expiration schedule. Referencing FIG. 99, an example operation 9606 includes an operation 9902 to determine a reserved memory amount for stored parameters, and an operation 9904 to selectively store at least a portion of the vehicle parameter values in response to the reserved memory amount.

Referencing FIGS. 100-103, example operations 9804 to selectively store at least a portion of the vehicle parameter values in response to the parameter expiration schedule are schematically depicted. Referencing FIG. 100, an operation 9804 includes deleting at least a portion of the stored vehicle parameter values. Referencing FIG. 101, an operation 9804 includes summarizing at least a portion of the stored vehicle parameter values. Referencing FIG. 102, an operation 9804 includes adjusting a reserved memory amount associated with the stored vehicle parameters. Referencing FIG. 103, an operation 9804 includes compressing at least a portion of the stored vehicle parameters.

Referencing FIGS. 104-107, example operations 9902 to determine a reserved memory amount for stored parameters are schematically depicted. Referencing FIG. 104, an operation 9902 includes determining an amount of data to be collected to support the vehicle parameter values. Referencing FIG. 105, an operation 9902 includes determining an amount of data to be collected to support a trigger evaluation associated with the vehicle parameter values. Referencing FIG. 106, an operation 9902 includes determining a transmission latency value associated with the vehicle parameter values. Referencing FIG. 107, an operation 9902 includes determining a priority value associated with the vehicle parameter values.

Figure 108:
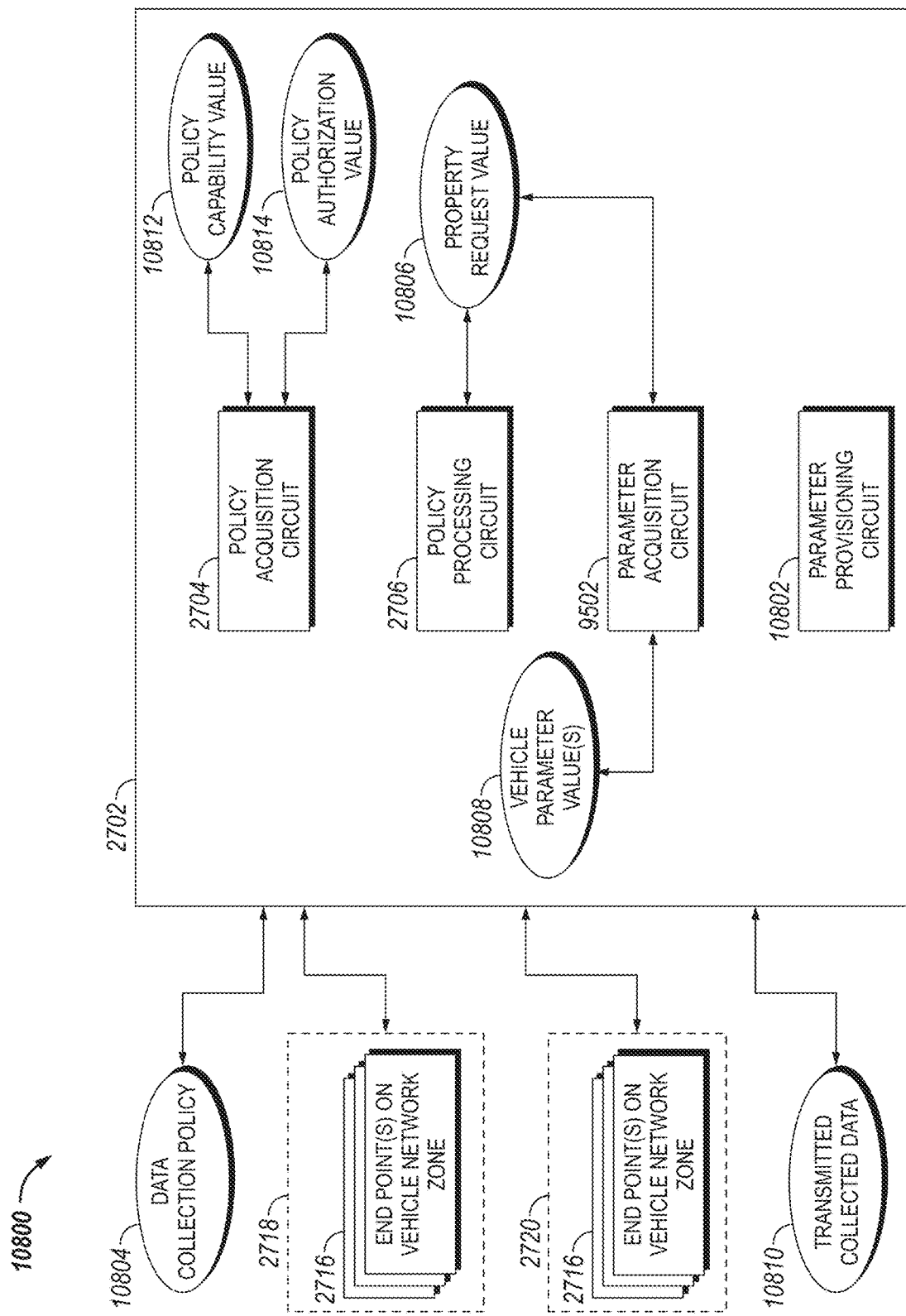
FIG. 108 is a schematic diagram of an example apparatus for performing data collection operations implementing a data collection policy according to certain embodiments of the present disclosure.

Referencing FIG. 108, an example apparatus 10800 for performing data collection operations implementing a data collection policy is schematically depicted. The example apparatus 10800 operates similarly to apparatus 4500, with certain differences described here for purposes of illustration. The apparatus 10800 may be included in a system having a vehicle with one or more network zones as described throughout the present disclosure, and aspects of the apparatus 10800 may be included, in whole or part, with any systems, devices, controllers, and/or apparatuses as set forth throughout the present disclosure. Additionally or alternatively, aspects of any systems, devices, controllers, and/or apparatuses set forth herein may be included, in whole or part, with apparatus 10800.

The example apparatus 10800 includes a policy acquisition circuit 2704 that interprets a data collection policy 10804 including at least one requested vehicle property, and a policy processing circuit 2706 that determines a property request value 10806 in response to the at least one requested vehicle property, for example translating a terminology utilized in the data collection policy 10804 to determine vehicle parameter values available that are responsive to data collection requests in the data collection policy 10804. The example apparatus 10800 includes parameter acquisition circuit 9502 that interprets at least one vehicle parameter value 10808 in response to the property request value 10806, for example collecting data from end points 2716 on one or more network zones 2718, 2720 of the vehicle. The example apparatus 10800 further includes a parameter provisioning circuit 10802 that selectively transmits the at least one vehicle parameter value 10808 in response to the data collection policy 10804, for example providing transmitted collected data 10810. The example apparatus 10800 determines data on the vehicle that is responsive to the requested data, including translating parameter names, determining the configuration of the vehicle, such as end point distribution, network zone configuration, and the like, to allow the data collection policy 10804 to request a standardized and/or interface selected parameter description, without a requesting device providing the data collection policy 10804 requiring knowledge about the vehicle or vehicle configuration.

An example data collection policy 10804 includes a policy type, where the parameter acquisition circuit 9502 further interprets the vehicle parameter values 10808 in response to the policy type. The policy type may be any type of policy as set forth herein, for example a persistent policy, discrete and/or limited policy type, and/or a streaming policy type. In certain embodiment, the policy type additionally or alternatively is a policy type within a policy hierarchy, for example a built-in policy type, factory policy type, and/or downloaded policy type. In certain embodiments, the parameter acquisition circuit 9502 persistently evaluates the data collection policy 10804 in response to the policy type being a persistent policy type—for example persistently collecting data, and/or persistently evaluating data collection criteria to determine whether data should be collected. In certain embodiments, the parameter acquisition circuit 9502 discontinues evaluating the data collection cycle of the data collection in response to fulfilling a data collection cycle of the data collection policy—for example where the policy type is an on demand policy (e.g., discontinuing after the defined data collection is serviced), where the policy type is a streaming policy (e.g., discontinuing after the defined data collection is provided), and/or where the policy type is a discrete or limited policy (e.g., discontinuing after a determined number of data collection events, expiration of a time period, etc.). In certain embodiments, the policy acquisition circuit 2704 deletes the data collection policy 10804 in response to the parameter acquisition circuit 9502 discontinuing the evaluating the data collection policy 10804—for example deleting the associated policy once the evaluation operations are discontinued, and/or deleting the associated policy after the related collected data is transmitted.

An example policy acquisition circuit 2704 implements a downloaded policy if present. An example policy acquisition circuit 2704 ignores a factory policy and a built-in policy, if the downloaded policy is present. An example policy acquisition circuit 2704 implements a compatible portion of the factory policy if present. An example policy acquisition circuit 2704 implement the factory policy if present and a downloaded policy is not present. An example policy acquisition circuit 2704 ignores the built-in policy, for example if a factory policy and/or downloaded policy is present. An example policy acquisition circuit 2704 implements a compatible portion of the built-in policy if present.

Figure 109:
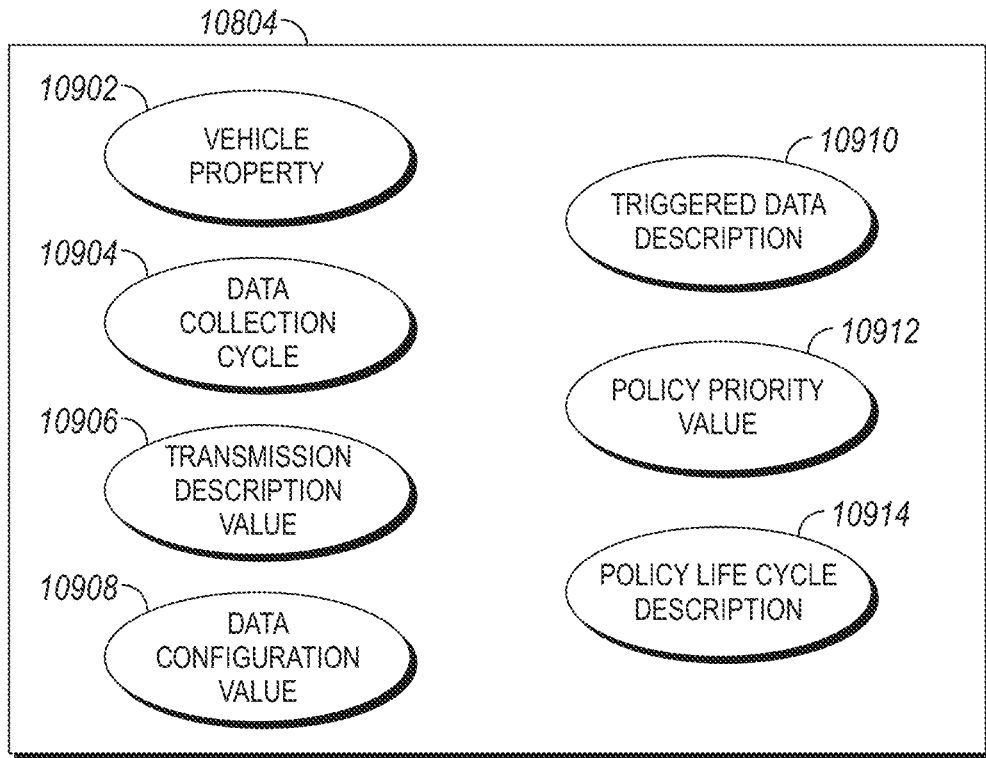
FIG. 109 is a schematic diagram of an example data collection policy according to certain embodiments of the present disclosure.

Referencing FIG. 109, an example data collection policy 10804 includes one or more of the following: a vehicle property 10902 (e.g., a description of a requested collection parameter, as viewed from the external device, user interface, and/or recited in a API (e.g., reference FIG. 121 and the related description); a data collection cycle 10904 (e.g., a timing, number of times, expiration window, etc., setting forth the requested data collection cycle of the policy); a transmission description value 10906 (e.g., transmission criteria such as time values, data chunk sizes, expiration times, associated APNs, and/or transmission routes, etc.); a data configuration value 10908 (e.g., units, formatting, bit depth, sampling rates, and/or synchronization criteria among data values); a triggered data description 10910 (e.g., parameters defining a trigger condition to be evaluated, data to be collected in response to the trigger occurrence, and/or operations to be performed in response to the trigger occurrence such as actuator commands, feature adjustments, etc.); a policy priority value 10912 (e.g., priority associated with the policy generally, and/or associated with individual elements of the policy such as vehicle properties, transmission, etc.); and/or a policy life cycle description 10914 (e.g., a number of times to be executed, a completion time, and/or a persistence and/or discrete operation value). The example data collection policy 10804 may be provided in any manner. In certain embodiments, the data collection policy 10804 is provided as a data structure readable by the policy acquisition circuit 2704, for example as an HTML file, XML file, a delimited file, a binary file, and/or any data structure parseable by the policy acquisition circuit 2704. In certain embodiments, the data collection policy 10804 is prepared by an external system, such as a cloud based system, service tool, manufacturing tool, or the like—for example as set forth in FIGS. 1-16, 114, 119, 121, and the related descriptions).

Figure 110:
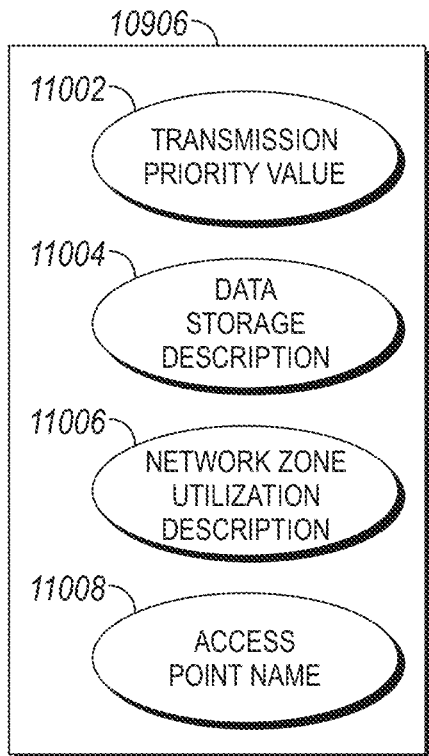
FIG. 110 is a schematic diagram of an example transmission description value according to certain embodiments of the present disclosure.
Figure 111:
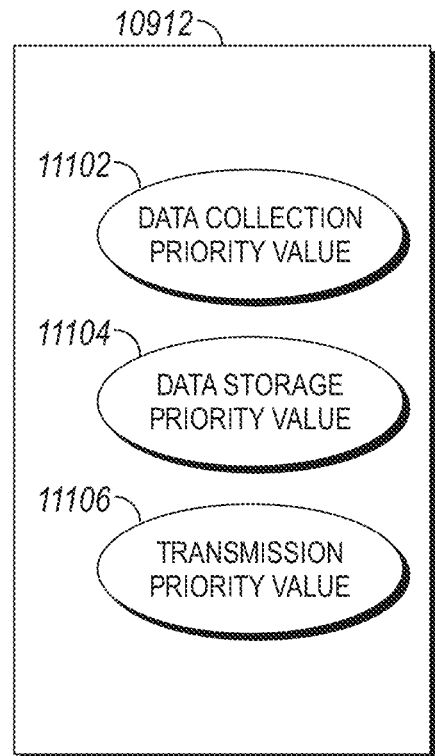
FIG. 111 is a schematic diagram of an example policy priority value according to certain embodiments of the present disclosure.
Figure 112:
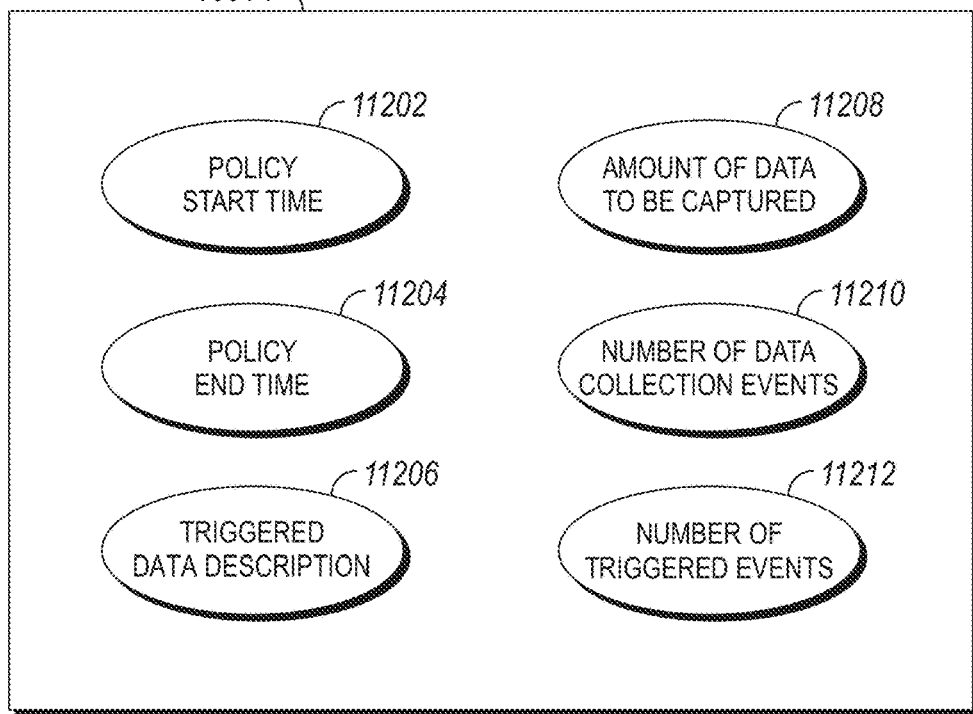
FIG. 112 is a schematic diagram of an example policy life cycle description according to certain embodiments of the present disclosure.

Referencing FIG. 110, an example transmission description value 10906 includes one or more of the following: a transmission priority value 11002 (e.g., transmission priority values associated with the collected data), a data storage description 11004 (e.g., data storage priority, reserved memory amount, data aging and/or expiration parameters, etc.), a network zone utilization description 11006 (e.g., a priority for network zone utilization for the policy, and/or allowed bandwidth and/or utilization values for a network zone, and/or for a data collection operation of the policy), and/or an APN 11008 (e.g., associated collected data elements each with one or more APNs). Referencing FIG. 111, an example policy priority value 10912 includes one or more of: a data collection priority value 11102 (e.g., providing data collection priority descriptions for data collection elements of the policy); a data storage priority value 11104 (e.g., providing data storage priority information for data collection elements of the policy); and/or a transmission priority value 11106. Note that the organization of elements of the policy is a non-limiting illustration—for example transmission priority values may be provided in a transmission description value 10906 and/or in a policy priority value 10912. Additionally or alternatively, elements may be applied to the whole policy, and/or to individual data collection aspects of the policy. Referencing FIG. 112, an example policy life cycle description 10914 includes one or more of the following: a policy start time 11202, a policy end time 11204, a triggered data description 11206, an amount of data to be captured 11208, a number of data collection events 11210, and/or a number of triggered event operations 11212.

Figure 113:
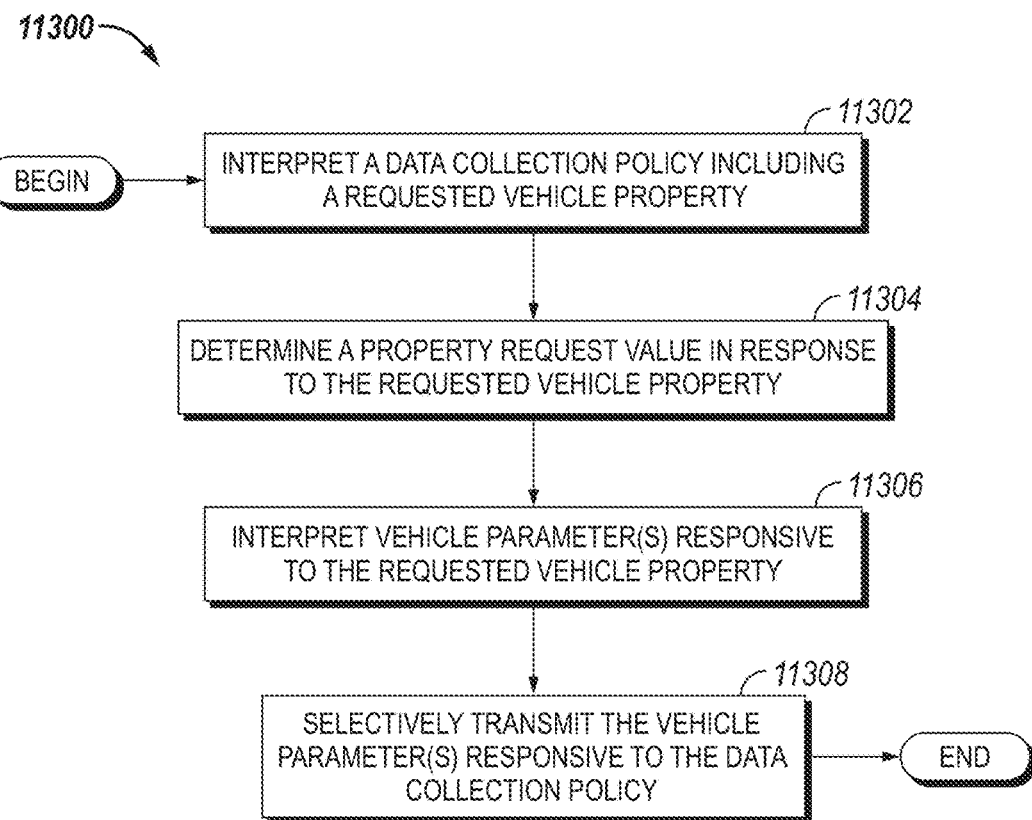
FIG. 113 is a flow chart depicting an example procedure to collect data pursuant to a policy according to certain embodiments of the present disclosure.

Referencing FIG. 113, an example procedure 11300 to collect data pursuant to a policy is schematically depicted. The example procedure 11300 includes an operation 11302 to interpret a data collection policy including a requested vehicle property, an operation 11304 to determine a property request value in response to the requested vehicle property, an operation 11306 to interpret vehicle parameter(s) responsive to the requested vehicle property, and an operation 11308 to selectively transmit the vehicle parameter(s) responsive to the data collection policy.

Figure 114:
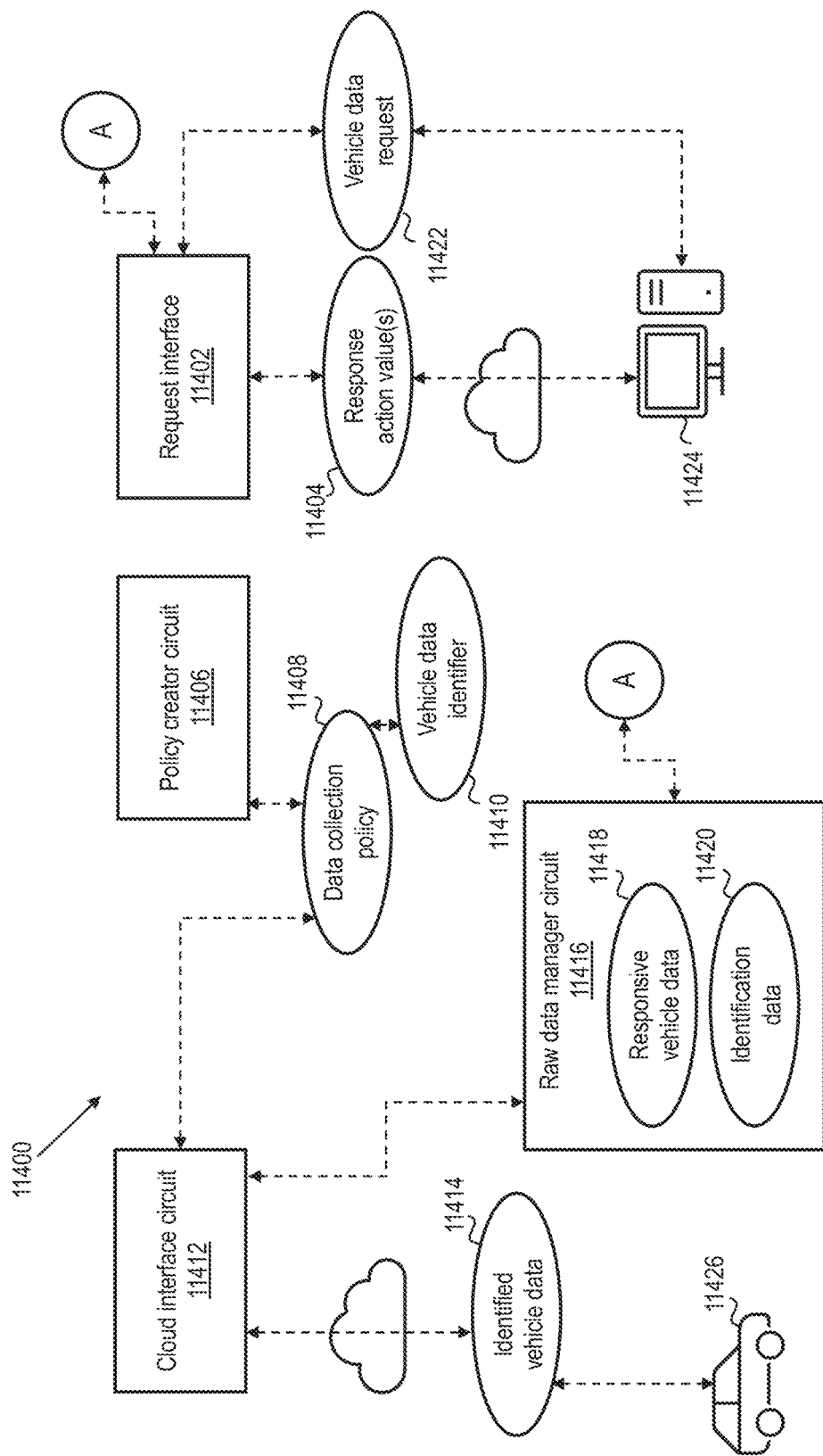
FIG. 114 is a schematic diagram of an example cloud system according to certain embodiments of the present disclosure.

Referencing FIG. 114, an example cloud system 11400 for retrieving selected data from a vehicle, and/or dividing stored collected data and access to the data. The example of FIG. 114 is described as a cloud-based system 11400 for clarity of the description to illustrate aspects of the present disclosure. However, operations of the system 11400 may be performed, additionally or alternatively, on any system configuration external to the vehicle. For example, operations may be performed in whole or part by a service tool, a manufacturing tool, a computing device at least selectively communicatively coupled to the vehicle, or other configurations as set forth herein. An example system includes an external device, whether a cloud-based system or otherwise, coupled to the vehicle using a cellular data connection, a WiFi connection, a physical port connection to a network zone of the vehicle, a Bluetooth connection, and/or any other connection as understood in the art. Operations of intra-vehicle network zone connection devices, such as a CES, CEG, and/or CND, allow for a connection to any network zone of the vehicle to be utilized to receive, configure, and/or update policies to be implemented on the vehicle, and to transmit collected data. In certain embodiments, aspects of the system 11400 may be implemented in the cloud, with other aspects implemented on another external device.

The example system 11400 includes a request interface 11402 configured to interpret a plurality of response action values 11404 from an external device 11424. The response action values 11404 include, without limitation, one or more of: data values for collection (e.g., requested data to be collected from the vehicle); trigger conditions for conditional actions (e.g., data values to be observed for characteristics indicating the trigger event, for example determined by threshold values, processed responses such as a rate of change of a value, a trigger based on a number of values, state values such as "ON", "OFF", "ACTIVE", and/or mode values such as indications of an operating mode, control operation state, etc.); time frames for data collection (e.g., calendar time; operating time relative to the vehicle; a time based amount of data to be collected—e.g., three minutes of data; a relative time to an event detection or trigger condition, such as beginning five minutes after the event, data from the three minutes preceding the event, etc.); priority information to be attributed to any of the foregoing; sampling rates for data values; formatting for data values (e.g., parameter units, bit depth, metadata descriptions, etc.); and/or a data type to be associated with the data values. In certain embodiments, the response action values 11404 may be provided by a user selection of preconfigured values—for example a user may select "vehicle speed" for inclusion as response action value 11404. In certain embodiments, aspects of the response action values 11404 that the user is not authorized to request may be hidden from the user—for example by not providing such values to the user interface operated on the external device 11424. In certain embodiments, aspects of the response action values 11404 that the user is not authorized to request may be annotated—for example with a greyed out text or the like—letting the user know that such values are generally available, but not with the present permissions of the user. In certain embodiments, aspects of the response action values 11404 are presented to the user, and enforcement of the authorization is performed by the policy creator circuit 11406, for example by excluding the values from a final data collection policy 11408, and/or by excluding the entire set of response action values 11404 from the final data collection policy 11408.

In the example of FIG. 114, response action values 11404 indicate defining operations for data collection, trigger evaluation, and/or automatic operations of the vehicle, while vehicle data requests 11422 indicate requests to access responsive vehicle data 11418 collected in response to the response action values 11404. The terminology utilized herein is illustrative and non-limiting.

Operations to generate the data collection policy 11408 with excluded values may include a notification to the user that the requested response action values 11404 were not authorized. In certain embodiments, a notification to the user that the requested response action values 11404 are not authorized in response to a submission attempt by the user—for example allowing the user to identify which aspects of the response action values 11404 are preventing submission, and allowing the user to adjust the response action values 11404. In certain embodiments, a combination of these operations are utilized on the interface—for example hiding some not authorized parameters completely from the user (e.g., highly sensitive parameters that are only available to certain users), and displaying some not authorized parameters to the user. Additionally or alternatively, some parameters may be available in response to a further approval—for example an administrative or supervising user of an entity may have authorization to approve certain parameters as response action values 11404, where another user from the entity requesting the certain parameters may receive a notification to request authorization, and/or the administrative or supervising user may receive a notification that one or more of the certain parameters have been requested. Additionally or alternatively, some parameters may be available based on a subscription, a particular version of the user interface (e.g., a standard versus premium version of a web portal, local application, mobile application, or the like), where the interface may prompt the user to obtain the authorizing features (e.g., subscription, or updated interface version), and/or a notification associated with the parameters may indicate the features needed to access the parameters. In certain embodiments, certain parameters may be available based on access characteristics—for example an unsecured access to the interface and/or a partial login operation to the interface (e.g., entering a password, but not a second step of a two-step authentication, etc.)—where the request interface 11402 may selectively hide parameters unavailable based on the access characteristics, and/or show the parameters as inactive on the interface.

In certain embodiments, the request interface 11402 is configured according to the external device, an associated entity, and/or a type of user and user goal associated with these. For example, the request interface 11402 for interaction with an owner of the vehicle and/or a third party application developer may be simplified, allowing for selection of data collection parameters using selections from menus, utilizing templates, and/or with more limited capability. In another example, the request interface 11402 for interaction with a sophisticated developer, such as a manufacturing entity, fleet owner, or the like, may include convenient interfaces, allow for direct submission of completed policy data structures (e.g., an HTML file, XML file, delimited file, binary file, or the like), or a combination of these (e.g., building an initial data structure based on menu interactions and selections, and allowing access to the source file generated thereby for direct editing and submission).

In certain embodiments, a user device 11424 to provide the response action values 11404 and to provide vehicle data requests 11422 may be different devices, and/or may access separate interfaces 11402. In certain embodiments, a first user providing the response action values 11404 and a second user providing the vehicle data requests 11422 may be separate users, users associated with different entities, and/or may be entirely unrelated. For example, a third party application developer may provide response action values 11404, where the vehicle data requests 11422 may be provided by a vehicle owner. In certain embodiments, a number of separate users may have access to the responsive vehicle data 11418.

In the example of FIG. 114, the system 11400 is depicted with a first cloud boundary to the external device 11424, and a second cloud boundary to the vehicle 11426, with the cloud system positioned therebetween, including the request interface 11402, the policy creator circuit 11406, the raw data manager circuit 11416, and the cloud interface circuit 11412. In certain embodiments, one or more aspects of the cloud system, or all aspects of the cloud system, may be positioned apart from a cloud system, for example with aspects positioned on the vehicle 11426, another external device, or combinations of these.

Additionally or alternatively, aspects of the cloud system 11400 may be provided as an internet-based aspect, a web portal, a mobile application, or the like. An example request interface 11402 includes more than one option to interface with the cloud system, for example with a first interface operated as a web portal, another interface operated as a mobile application, another interface operated on a tool (e.g., a service tool, manufacturing tool, or the like), and/or another interface such as on an external device 11424 operating a local application on the device. In certain embodiments, capabilities available for interacting with the cloud system may be varied according to the interface utilized for the interaction (e.g., a service tool having distinct capabilities relative to a mobile application), an entity associated with a user exercising the interface (e.g., a third party application provider, manufacturer, dealer, vehicle owner, etc.), and/or a type of interaction with the cloud system (e.g., a web portal access having distinct capabilities to a manufacturing tool coupled directly to a network zone of the vehicle). Additionally or alternatively, interactions with the cloud system may utilize verification and/or authorization, for example exercising a login interface, encrypted communications between the cloud system and external devices, between the cloud system and the vehicle, and between components of the cloud system. In certain embodiments, the cloud system components may be separate devices—including physically separate devices and/or logically separated devices. For example, the request interface 11402 may be embodied on a separate device (or group of devices) than the raw data manager circuit 11416. In another example, a portion of the request interface 11402 may be at least partially included on an external device and/or on the vehicle.

The example system 11400 includes a policy creator circuit 11406 that determines a data collection policy 11408 in response to the response action values 11404, the data collection policy 11408 including a vehicle data identifier 11410. In certain embodiments, the policy creator circuit 11406 compiles more than one response action values 11404 from more than one user into a data collection policy 11408, for example creating a single compiled data structure representing the policy, and/or providing multiple separate data structures representing the policy. In certain embodiments, the policy creator circuit 11406 checks authorization for portions of the policy according to the entity, user, application, flow, or the like providing the respective portion. In certain embodiments, the policy creator circuit 11406 checks for capability of the policy, for example determining whether data storage resources, processing resources, parameter availability, and/or transmission resources of the vehicle are capable to service data collection or other operations responsive to the policy. In certain embodiments, a policy manager on the vehicle further performs an authorization and/or capability check of the policy provided to the vehicle, for example providing a confirmation to the cloud interface circuit 11412 if the policy is accepted, and providing a notification to the cloud interface circuit 11412 if the policy is declined.

An example cloud interface circuit 11412—for example configured to access the vehicle—is configured to receive identified vehicle data 11414 collected in response to the data collection policy 11408. The vehicle data identifier 11410 may be specifically identifiable information about the vehicle—for example a vehicle identification number (VIN), serial number, media access control (MAC) address from a specified controller of the vehicle, or the like, and/or identifiable information ensuring that the identified vehicle data 11414 can be matched to the vehicle and/or a vehicle data request 11422. An example vehicle data identifier 11410 includes a session identifier (e.g., identifying a data collection "session", and/or a data collection instance, tied to the block of collected data provided in response to the data collection policy 11408)—for example a unique identifier included with the data collection policy 11408, and attached to the identified vehicle data 11414, allowing identification of the responsive vehicle data 11418 separate from other information such as personal information about the vehicle owner, identification of the specific vehicle related to the data, etc. In certain embodiments, the vehicle data identifier 11410 utilized for a particular data collection policy 11408 may depend upon the type of policy (e.g., a persistent policy may utilize a first type of identifier, and a discrete and/or streaming policy may utilize a second type of identifier), and/or according to the importance for the particular system to keep identifying information separate from the responsive vehicle data 11418.

An example raw data manager circuit 11416 stores at least a portion of the received identified vehicle data 11414, the at least a portion of the identified vehicle data including responsive vehicle data 11418 and identification data 11420. The identification data 11420 may be the same as the vehicle data identifier 11410, or a different identifier. In certain embodiments, the responsive vehicle data 11418 may be encrypted separately from the identification data 11420, allowing for the raw data manager circuit 11416 to provide the correct responsive vehicle data 11418 by comparing the related identification data 11420, without the raw data manager circuit 11416 having access to the responsive vehicle data 11418. The separation of the responsive vehicle data 11418 promotes separation of risk of a data breach, where improper access to a single aspect of the cloud system does not allow matching of the responsive data 11418 with identifying information such as an owner name, specific vehicle, or the like. Example identification data 11420 includes metadata specific to a particular set of response action value(s) 11404.

An example request interface 11402 interprets a vehicle data request 11422, and retrieves at least a portion of the responsive vehicle data 11418 from the raw data manager circuit 11416 in response to the vehicle data request 11422. The example request interface 11402 provides the retrieved data to the external device 11424.

An example system 11400 includes the responsive vehicle data 11418 encrypted utilizing a first encryption key set, and the identification data 11420 encrypted utilizing a second encryption key set. Accordingly, the raw data manager circuit 11416 can be configured to identify responsive data to vehicle data requests 11422, without having access to the responsive vehicle data 11418. In certain embodiments, the raw data manager circuit 11416 may identify responsive data utilizing a hash check or other operation. In certain embodiments, an encryption key to decrypt the responsive vehicle data 11418 is not present on the cloud system 11400, and/or unavailable to selected portions of the cloud system 11400 (e.g., unavailable to the raw data manager circuit 11416).

Figure 115:
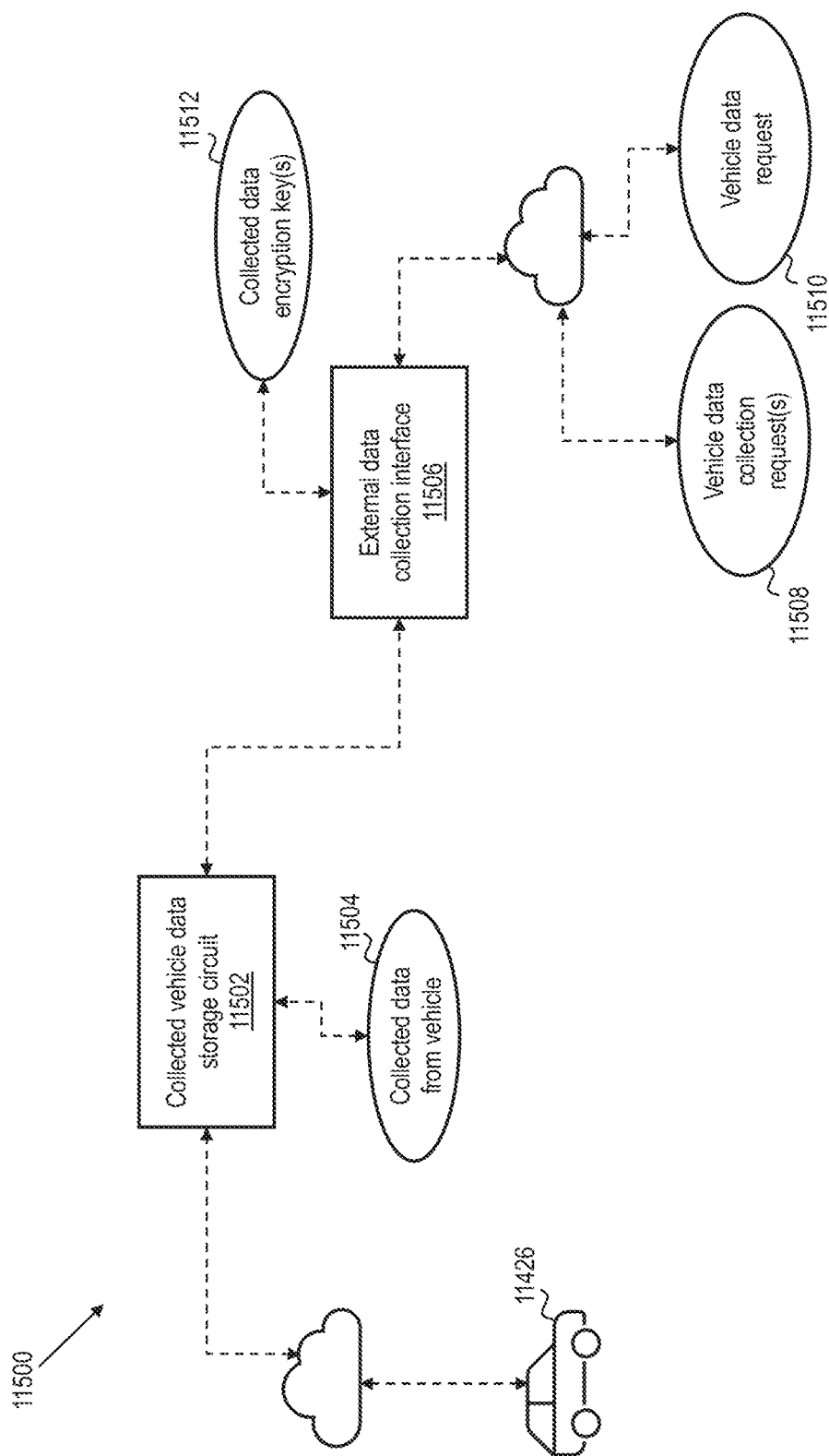
FIG. 115 depicts an example cloud system for retrieving selected data from a vehicle according to certain embodiments of the present disclosure.

Referencing FIG. 115, an example cloud system 11500 for retrieving selected data from a vehicle, and/or dividing stored collected data and access to the data is schematically depicted. The example of FIG. 115 is described as a cloud-based system 11500 for clarity of the description to illustrate aspects of the present disclosure. However, operations of the system 11500 may be performed, additionally or alternatively, on any system configuration external to the vehicle.

The example system 11500 includes a collected vehicle data storage circuit 11502 that stores collected data 11504 from a vehicle, and an external data collection interface 11506 that selectively provides vehicle data collection request(s) 11508 from an external device to the vehicle, for example by processing the vehicle data collection request(s) 11508 into a policy data structure provided to the vehicle. The example external data collection interface 11506 further provides at least a portion of the stored collected data 11504 from the collected vehicle data storage circuit 11502 in response to a vehicle data request 11510 from an external device. The example system includes separation of at least a portion of the stored collected data 11504 from an encryption key for the at least a portion of the stored collected data 11504. Example arrangements to separate the encryption key from the at least a portion of the stored collected data 11504 include, without limitation to any other aspect of the present disclosure: separate encryption of an identifying portion of the data from a payload portion of the data; identification and/or verification of the payload portion of the data utilizing a hash check; and/or identification and/or verification of the payload portion with a separate identifier for the payload portion. An example external data collection interface 11506 selectively provides the vehicle data collection request(s) 11508 to the vehicle by providing the requests 11508 to the collected vehicle data storage circuit 11502, and/or to a policy creator circuit 11406 (e.g., reference FIG. 114 and the related description).

Figure 116:
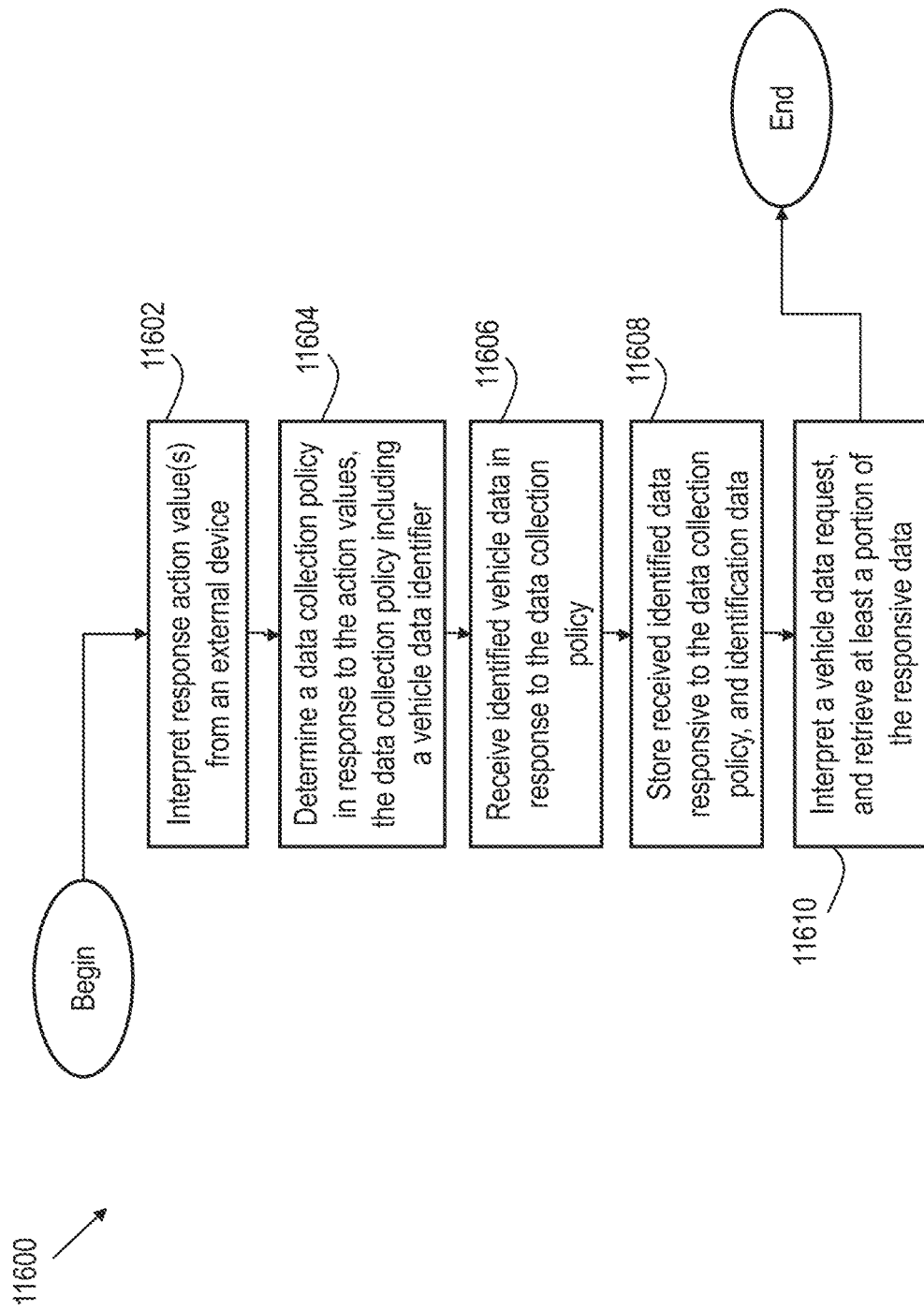
FIG. 116 depicts an example schematic diagram of an operation that includes an operation for data collection operations from a vehicle according to certain embodiments of the present disclosure.

Referencing FIG. 116, an example procedure 11600 for data collection operations from a vehicle is schematically depicted. The example procedure 11600 includes an operation 11602 to interpret response action values from an external device, and an operation 11604 to determine a data collection policy in response to the action values, the data collection policy including a vehicle data identifier. The example procedure 11600 includes an operation 11606 to receive identified vehicle data in response to the data collection policy, an operation 11608 to store received identified data from the vehicle that is responsive to the data collection policy and related identifying data, and an operation 11610 to interpret a vehicle data request, and to retrieve at least a portion of the responsive data.

Figure 117:
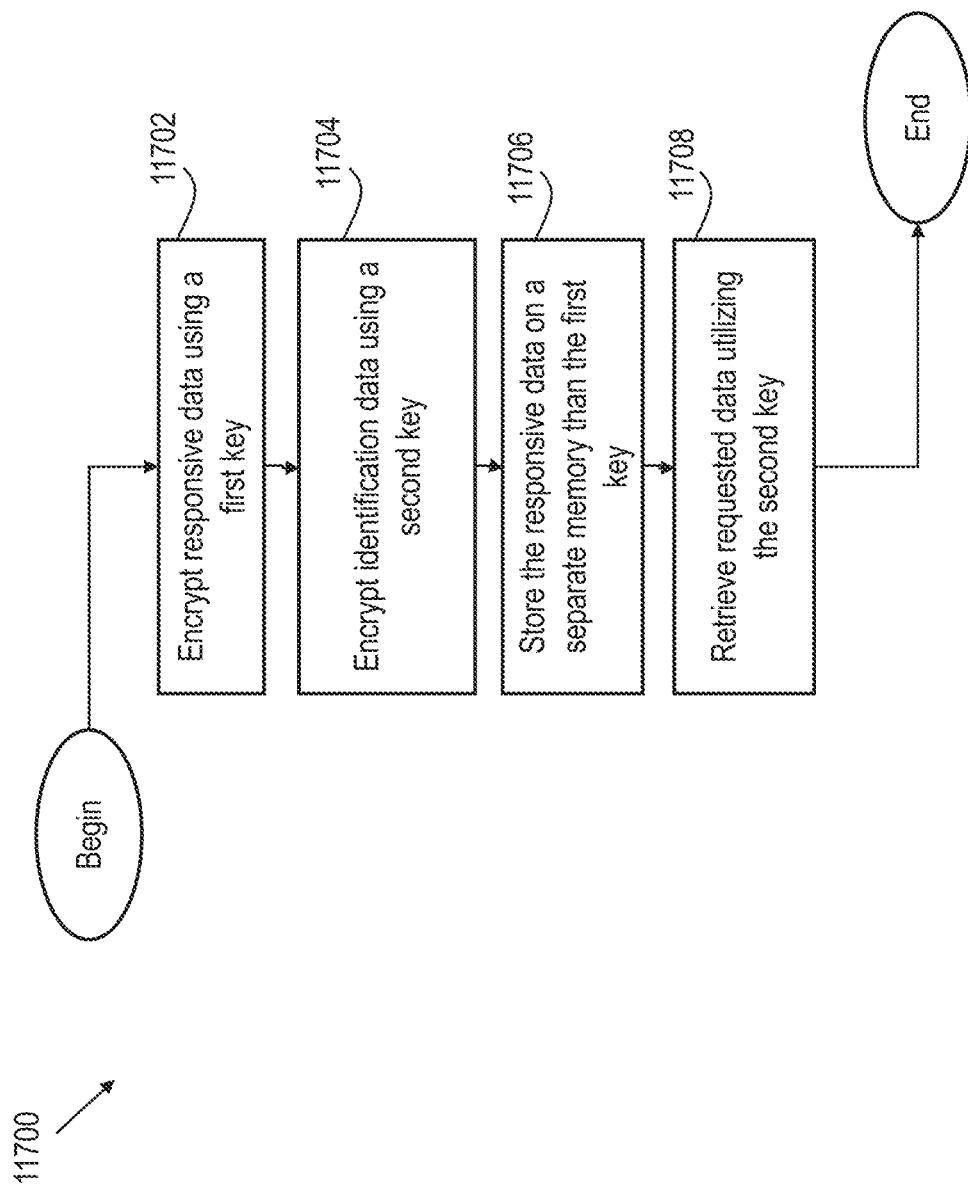
FIG. 117 depicts an example procedure for separating responsive data to a vehicle data collection operation according to certain embodiments of the present disclosure.

Referencing FIG. 117, an example procedure 11700 for separating responsive data to a vehicle data collection operation from access to the responsive data is schematically depicted. The example procedure 11700 includes an operation 11702 to encrypt responsive data using a first encryption key, and an operation 11704 to encrypt identification data using a second encryption key. In certain embodiments, identification data may be unencrypted. The example procedure 11700 further includes an operation 11706 to store the responsive data on a separate memory from the first encryption key, and an operation 11708 to retrieve requested data utilizing the second encryption key (and/or utilizing the identification data).

Figure 118:
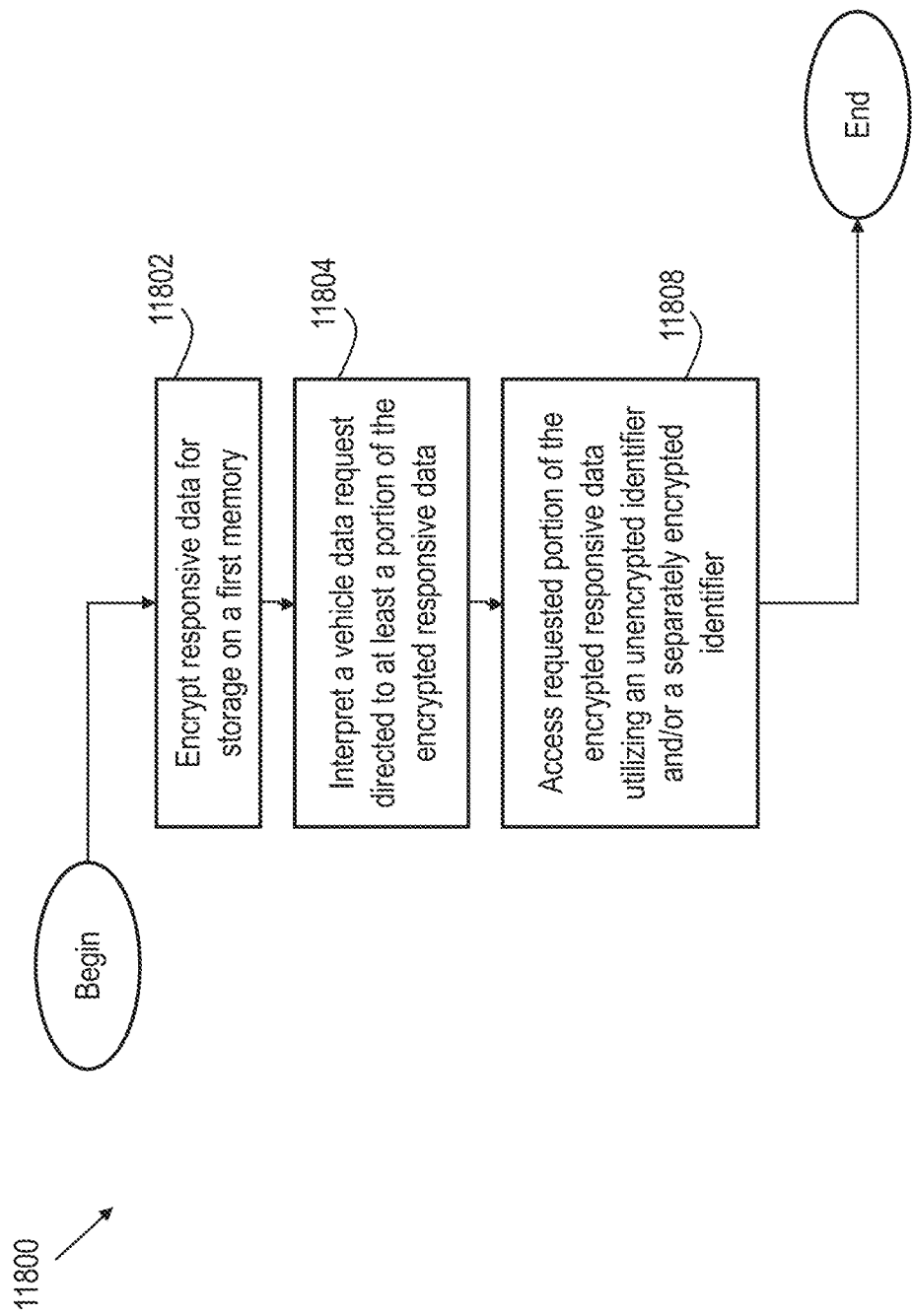
FIG. 118 depicts an example procedure for separating responsive data to a vehicle data collection operation according to certain embodiments of the present disclosure.

Referencing FIG. 118, an example procedure 11800 for separating responsive data to a vehicle data collection operation from access to the responsive data is schematically depicted. The example procedure 11800 includes an operation 11802 to encrypt responsive data for storage on a first memory, an operation 11804 to interpret a vehicle data request directed to at least a portion of the encrypted responsive data, and an operation 11808 to access requested portions of the encrypted responsive data utilizing an unencrypted identifier and/or a separately encrypted identifier.

Figure 119:
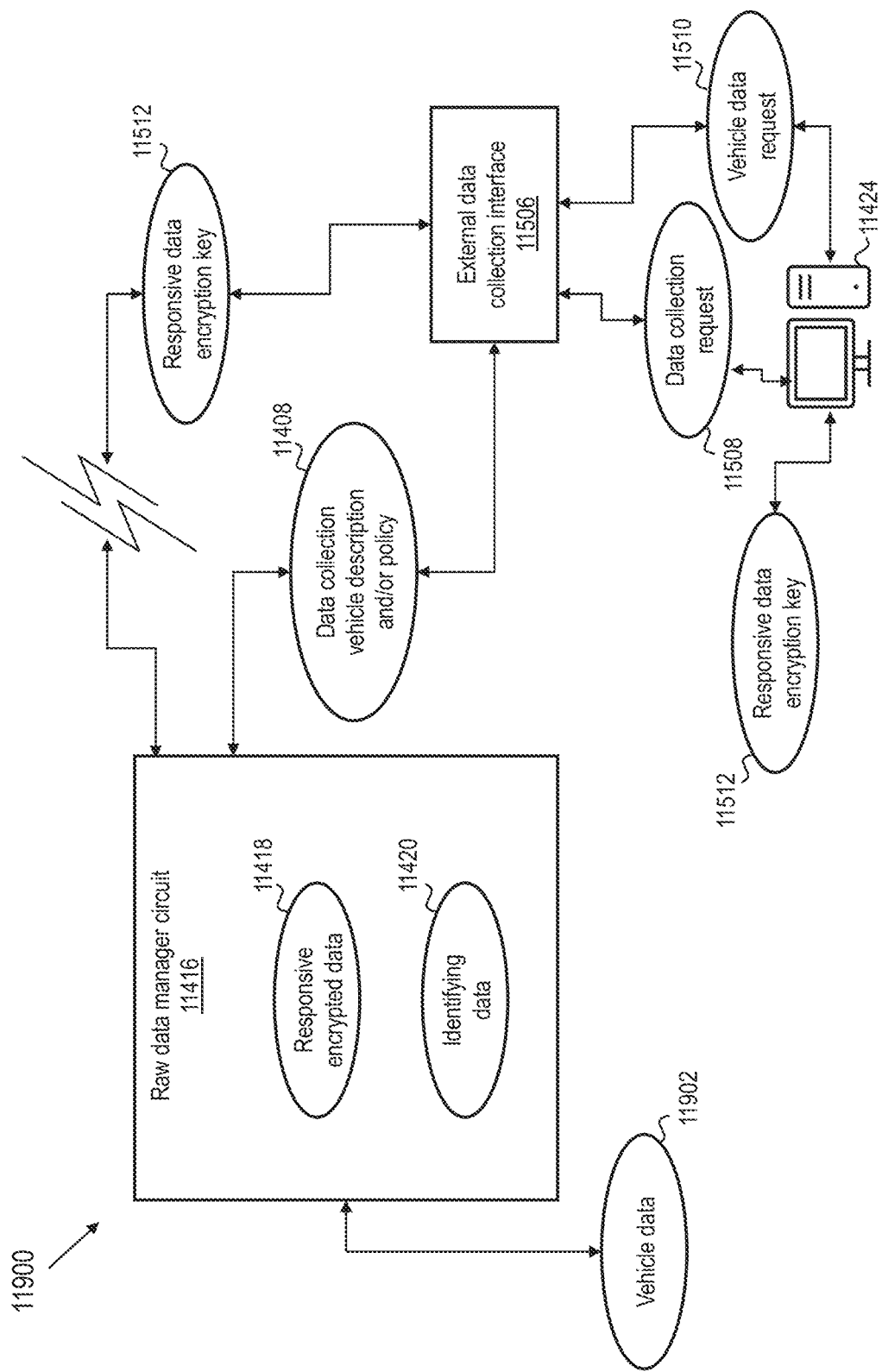
FIG. 119 depicts an example system for retrieving selected data from a vehicle according to certain embodiments of the present disclosure.

Referencing FIG. 119, an example system 11900 for retrieving selected data from a vehicle, and/or dividing stored collected data and access to the data is schematically depicted. The example system 11900 includes a raw data manager circuit 11416 that stores responsive encrypted data 11418, collected in response to a data collection vehicle description 11408 (and/or a policy), utilizing vehicle data 11902 provided by the vehicle operating a data collection policy on the vehicle. The example system 11900 includes an external data collection interface 11506 that provides at least a portion of the responsive encrypted data 11418 to an external device in response to a vehicle data request 11510. In the example of FIG. 119, an encryption key 11512 for the responsive encrypted data 11418 is kept separate from the raw data manager circuit 11416, for example utilizing separate identifying data 11420 to determine portions of the responsive encrypted data 11418 without decrypting the responsive encrypted data 11418. In certain embodiments, either or both of the external data collection interface 11506 or the external device 11424 have access to the responsive data encryption key 11512, thereby allowing the external device 11424 to access the received data. In the example of FIG. 119, the break between the responsive data encryption key 11512 and the raw data manager circuit 11416 is explicitly depicted for purposes of illustration, but the responsive data encryption key 11512 may be stored on a separate device from the raw data manager circuit 11416, whether a separate physical device or a separate logical device.

Figure 120:
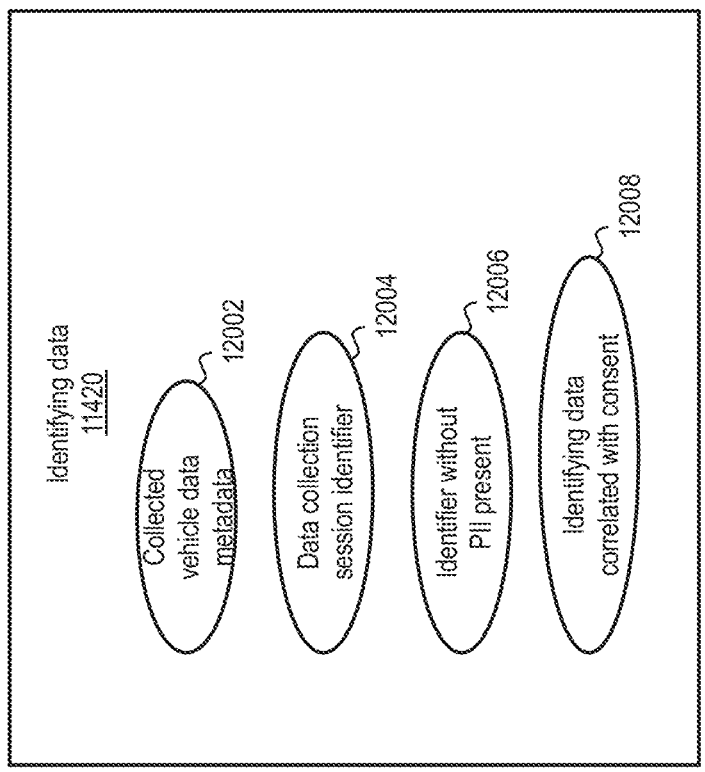

Referencing FIG. 120, example and non-limiting examples of identifying data 11420 are depicted. Example identifying data 11420 include one or more of the following: a collected vehicle data metadata 12002, a data collection session identifier 12004, an identifier configured without personally identifiable information (PII) present, and/or identifying data correlated with a consent 12008 (e.g., where the request interface 11402, and/or a policy manager on the vehicle, provide a consent notification to an external device, where the consent notification includes consent for information presented in the identifying data 11420).

Figure 121:
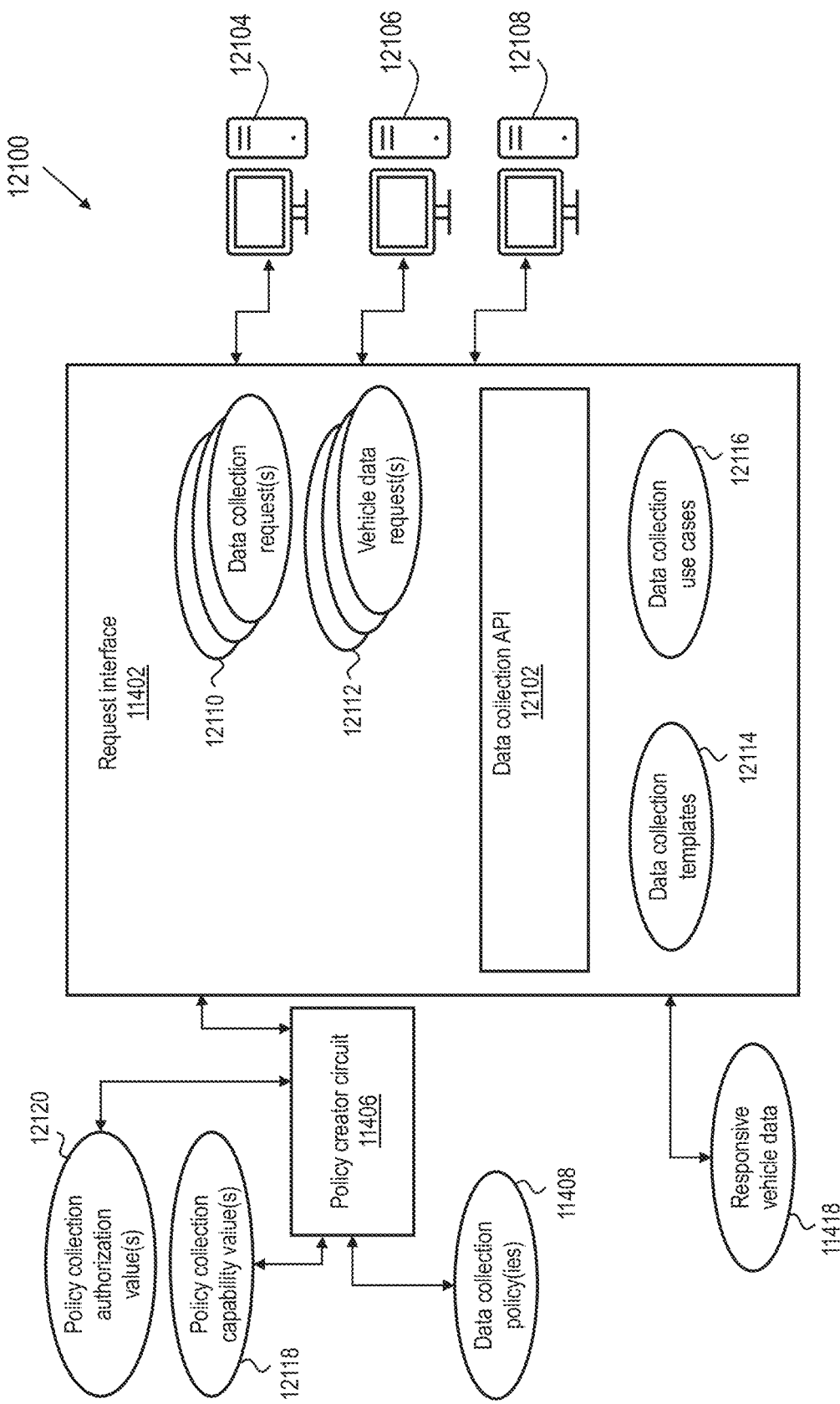

Referencing FIG. 121, an example cloud system for preparing data collection policies, and collecting responsive data from a vehicle, is schematically depicted. The example of FIG. 121 is described as a cloud-based system 12100 for clarity of the description to illustrate aspects of the present disclosure. However, operations of the system 12100 may be performed, additionally or alternatively, on any system configuration external to the vehicle.

The example system 12100 includes a request interface 11402 configured to interpret a vehicle data collection request 12110 for at least one identified vehicle, and a policy creator circuit 11406 that determines a data collection policy 11408 in response to the vehicle data collection request(s) 12110. An example cloud interface provides the data collection policy 11408 to a vehicle, and a raw data manager circuit that stores at least a portion of responsive vehicle data received from the vehicle (e.g., reference FIG. 114).

An example request interface 11402 is further configured to expose an application programming interface (API) (e.g., data collection API 12102) to an external device 12104, 12106, 12108. The API may include access to any selected operations, for example allowing a web portal, mobile application, tool, local application, or the like, to operate an interface to select available data values for collection, to configured a data structure including any aspects of a policy as set forth herein, and/or to request responsive vehicle data 11418 after collection operations. The example request interface 11402 further interprets a vehicle data request 12112, and provides retrieved data from the responsive vehicle data 11418 to an external device in response to a vehicle data request 12112. The data collection requests 12110 and/or the vehicle data requests 12112 may be received based on interactions with a user interface provided to the external device(s), and/or in response to an exercise of the API 12102 by the user, an application operated by the user, or the like. The example policy creator circuit 11406 determines the data collection policy 11408 in response to the data collection requests 12110, and/or further in response to policy collection authorization value(s) 12120 and/or policy collection capability value(s) 12118.

Example operations of the policy creator circuit 11406 to determine the policy capability value 12118 include determining the policy capability value 12118 in response to one or more of: a data storage size determined to support the vehicle data collection request; a transmission amount value determined to support the vehicle data collection request; a data availability value associated with the vehicle data collection request; or a data configuration value associated with the vehicle data collection request. Example operations of the policy creator circuit include determining a policy capability value 12118 in response to the vehicle data collection request 12110 and at least one additional vehicle data collection request 12110, and to selectively enable, in response to the policy capability value 12118, at least one of: determining the data collection policy 11408, or including at least one of the vehicle data collection request 12110 or the at least one additional vehicle data collection request 12110. The policy creator circuit 11406 further determines the policy capability value 12118 in response to at least one parameter such as: a data storage size determined to support each of the vehicle data collection request 12110 and the at least one additional vehicle data collection request 12110; a transmission amount value determined to support each of the vehicle data collection request 12110 and the at least one additional vehicle data collection request 12110; a data availability value associated with each of the vehicle data collection request 12110 and the at least one additional vehicle data collection request 12110; a data configuration value associated with each of the vehicle data collection request 12110 and the at least one additional vehicle data collection request 12110; or a priority determination between the vehicle data collection request 12110 and the at least one additional vehicle data collection request 12110 for any one or more of the foregoing.

An example policy creator circuit 11406 determines a policy authorization value 12120 in response to the vehicle data collection request 12110, and to perform at least one operation, in response to the policy authorization value, such as: selectively enabling the determining the data collection policy 11408; or determining the data collection policy 11408 to support at least a portion of the vehicle data collection request 12110. The request interface 11402 is configured to provide at least one use case value 12116 to a user interface, each use case value 12116 including a vehicle data collection template 12114, and determining the vehicle data collection request 12110 in response to responses from the user interface to the provided at least one use case value 12116. The request interface 11402 is further configured to determine the at least one use case value in response to at least one of: an entity type associated with the user interface; a permissions value associated with the user interface; and previous data collection policies determined for users having a shared characteristic determined for the user interface.

Figure 122:
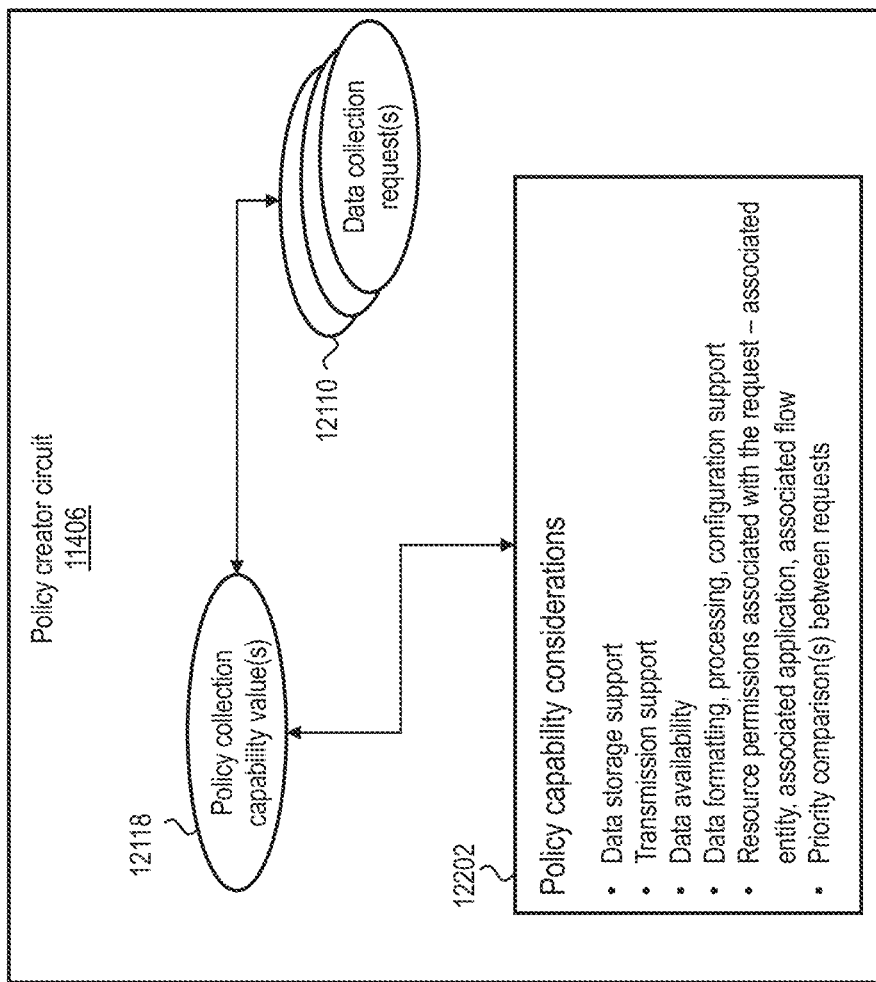

Referencing FIG. 122, an example policy creator circuit 11406 is schematically depicted. The example policy creator circuit 11406 may be utilized in any system herein, and/or may perform operations herein, related to determining, interpreting, and/or creating a policy and/or data collection operations. The example policy creator circuit 11406 determines a policy collection capability value 12118 in response to received data collection requests 12110. In certain embodiments, the policy creator circuit 11406 determines the policy collection capability values 12118 in response to capability considerations 12202 such as: data storage support to service the policy, data transmission support to service the policy, data availability to support the policy (e.g., are the requested data values available), data formatting, processing, and/or configuration support for the policy (e.g., can the parameters be provided in the requested units, bit depth, sampling rates, response time, etc., including whether processing support resources are available to perform formatting and/or configuration operations for collected data), resource permissions associated with the request (e.g., does an entity, flow, and/or application associated with the data collection request 12110 have sufficient permissions to utilize supporting resources, and/or sufficient permissions to consume supporting resources in a quantity needed to support the data collection request 12110), and/or priority comparisons between requests (e.g., lower priority data collection requests 12110 may be excluded if the overall policy including all requests exceeds a capability value).

Figure 123:
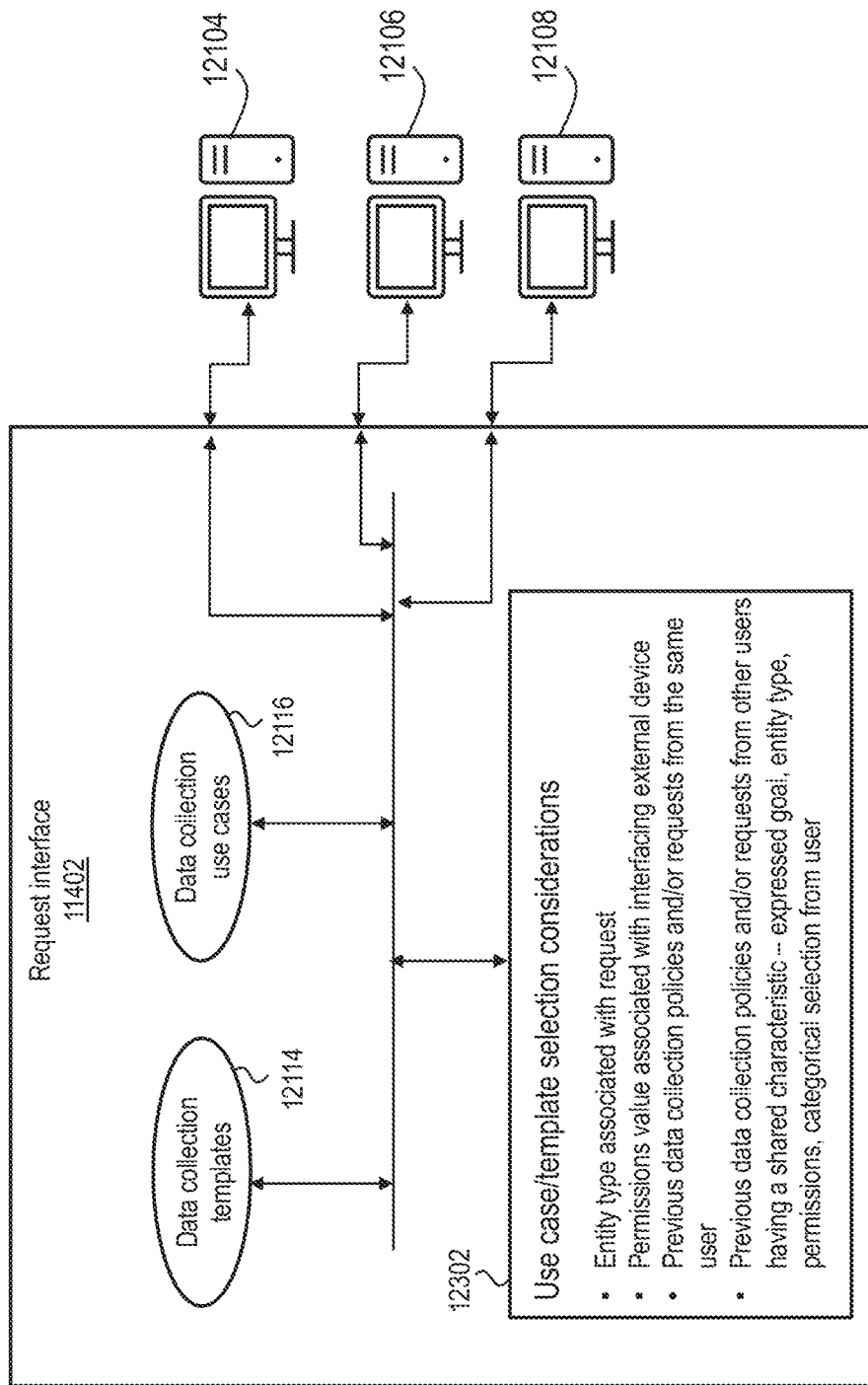

Referencing FIG. 123, an example request interface 11402 providing use case and/or template selections to external device(s) is schematically depicted. The example request interface 11402 may be utilized in any system herein, and/or may perform operations herein, related to determining, interpreting, and/or creating a policy and/or data collection operations, and/or related to receiving and processing data collection requests. The example request interface 11402 determines a data collection template 12114 and/or a data collection use case 12116 for providing to an external device 12104, 12106, 12108 on an interface, where the use case 12116 and/or template 12114 is available for selection as a data collection request, and/or for modification to rapidly configure a data collection request. The example request interface 11402 determines the data collection templates 12114 and/or data collection use cases 12116 in response to selection considerations 12302 such as: an entity type associated with a request (e.g., providing useful use cases and/or templates according to the entity type—such as a manufacturer, service organization, application developer, dealer, vehicle operator, vehicle owner, etc.); a permissions value associated with an interfacing external device (e.g., where users having a similar permissions profile may be more likely to be seeking similar data, and/or users having a similar permissions profile can efficiently utilize the same templates and/or use cases due to overlap in available parameters); previous data collection policies and/or requests from the same user (and/or same entity, same external device, same access location, etc.); and/or previous data collection policies and/or requests from other users having a shared characteristic with the user (e.g., sharing an expressed goal, an entity type, a permissions value, and/or a categorical selection, such as by a user, where the categorical selection may relate to subject matter of the data collection—location data, powertrain data, feature utilization data, etc. —and/or may relate to an intended use of the data collected—service feature, efficiency feature, operator convenience feature, etc.).

Figure 124:
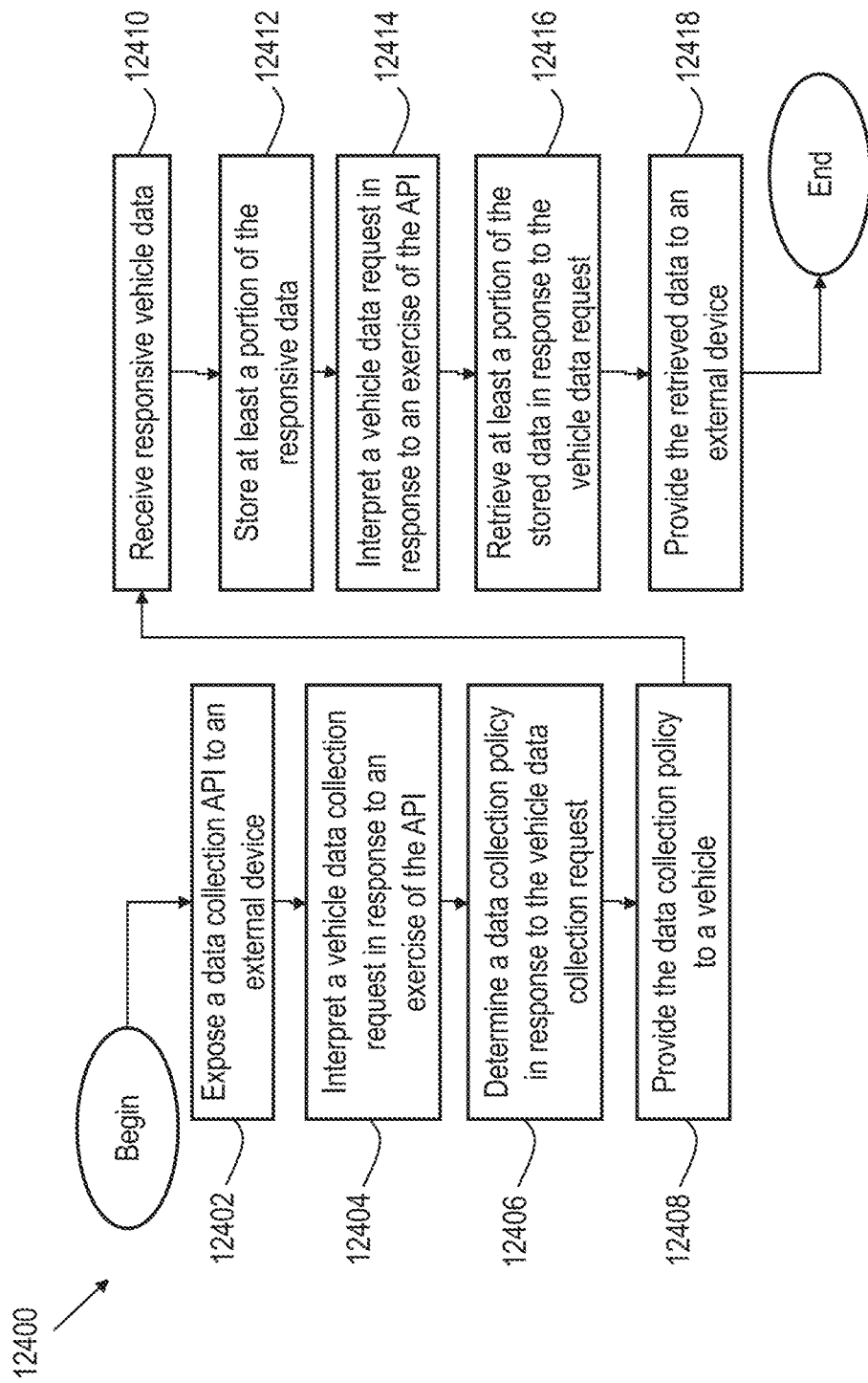

Referencing FIG. 124, an example procedure 12400 for operating a request interface to determine data collection requests and/or collected data access requests is schematically depicted. The example procedure 12400 includes an operation 12402 to expose a data collection API to an external device, an operation 12404 to interpret a vehicle data collection request in response to an exercise of the API, and an operation 12406 to determine a data collection policy in response to the vehicle data collection request. The example procedure 12400 includes an operation 12408 to provide the data collection policy to a vehicle, an operation 12410 to receive responsive vehicle data collected in response to the data collection policy, and an operation 12412 to store at least a portion of the responsive data 12412. The example procedure 12400 includes an operation 12414 to interpret a vehicle data request in response to an exercise of the API, an operation 12416 to retrieve at least a portion of the stored data in response to the vehicle data request, and an operation 12418 to provide the retrieved data to an external device.

Referencing FIGS. 125-130, example embodiments of the present disclosure are schematically depicted to operate a container based implementation of one or more control aspects of a vehicle. The apparatuses, systems, circuits, and/or operations set forth in relation to FIGS. 125-130 and the related descriptions may be utilized in any embodiments of the present disclosure, may be utilized in whole or part with embodiments of FIGS. 17-25, and/or aspects of embodiments depicted in FIGS. 17-25 may be utilized in whole or part with embodiments of FIGS. 125-130. The utilization of container based implementation of one or more control aspects of a vehicle leverage numerous aspects of embodiments of the present disclosure—for example, and without limitation: allowing for control operations and/or features to be installed, updated, enabled, disabled, and/or configured utilizing a policy implementation infrastructure described herein; allowing distribution of control operations across controllers of the vehicle, enabled from aspects such as the ability of embodiments herein to retrieve and/or provide data values to any end point on any network zone of any type, and to determine, manage, and respond to network utilization of network zones of the vehicle; performing authorization, verification, and capability determination operations utilizing the policy implementation infrastructure described herein; and allowing for external data transmission control and management, including resource management, that supports the increased burden and/or complexity introduced by implementing a container based implementation of one or more control aspects of the vehicle. In certain embodiments, a container based implementation of one or more control aspects of the vehicle encompasses all or a selected portion of available controllers on the vehicle, of selected control operations on the vehicle, and/or end points of selected network zones.

Figure 125:
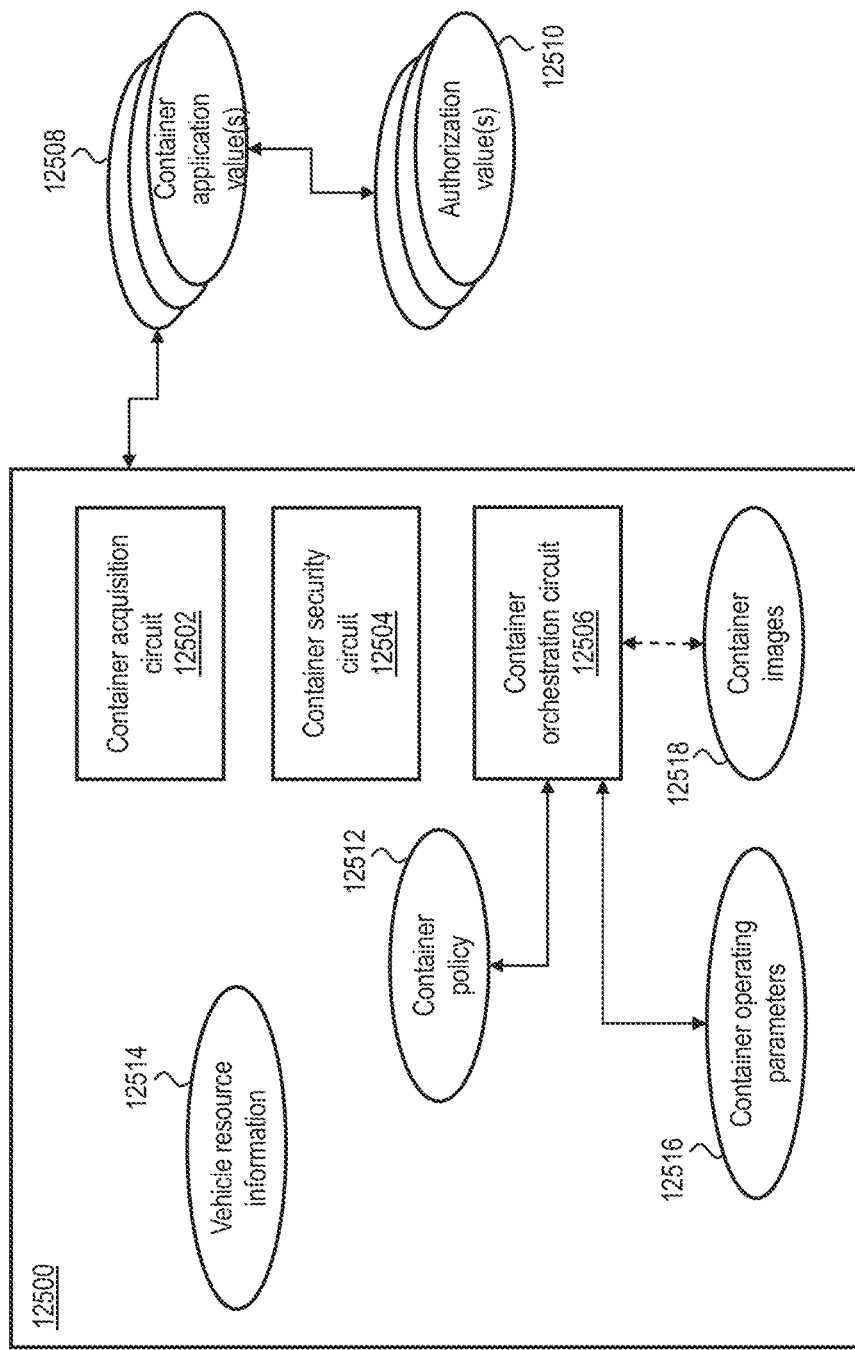

Referencing FIG. 125, an example apparatus 12500 includes a container acquisition circuit 12502 that interprets container application value(s) 12508, each including an application operable on an end point of a vehicle. The container application value(s) 12508 may include an image, e.g., a binary image, data structure having values that combine with an executable backbone stored on a controller of the vehicle, and/or another type of image, where the container application value 12508, alone or in combination with instructions on a controller of the vehicle, includes computer readable instructions which, when executed by a processor on a controller of the vehicle, cause the processor to execute operations of a feature embodied in the container application value 12508—for example a prime mover control, operator interface control, control operations for a component of the vehicle, etc. The example apparatus 12500 includes a container security circuit 12504 that interprets an authorization value 12510 associated with each of the container application values 12508. In certain embodiments, where a container application value 12508 appears to have insufficient authorization, the container application value 12508 may be rejected (e.g., not downloaded), and/or the container application value 12508 may be installed but disabled (e.g., not executed), for example to reduce a download time at a later time where the authorization value 12510 can later be corrected without having to re-download the respective container application value 12508. The example apparatus 12500 includes a container orchestration circuit 12506 that interprets a container policy 12512, and determines operation parameters 12516 for each of the plurality of container application values 12508 in response to the container policy 12512 and the authorization value 12510 associated with each of the plurality of container application values 12510. In certain embodiments, the container policy 12512 includes one or more of: an authorization description defining an authorization value 12510 required to perform certain operations on the vehicle (e.g., based on an output value of an application, accessed data for the application, an operation type of the application, etc.); a data dependency description of the container application values 12508 (e.g., which container applications depend on data from each other); an execution order of one or more of the container application values 12508 (e.g., utilized to enforce selected order dependencies for applications); priority values for one or more of the container application values 12508; and/or latency descriptions for one or more of the container application values 12508 (e.g., acceptable time lags for data utilized by an application, and/or time lags between execution events of related applications).

The example container orchestration circuit 12506 is further structured to distribute the plurality of container application values 12508 across a number of end points of the vehicle (e.g., determining which container application value is provided on which controller of the vehicle). The example container orchestration circuit 12506 is further structured to distribute the plurality of container application values 12508 to balance workloads of the controllers including the number of end points, for example to balance utilization of processing resources and/or data storage resources of the controllers. The example container orchestration circuit 12506 is further structured to distribute the plurality of container application values 12508 to balance network communication loads of a plurality of network zones of the vehicle, for example distributing container application values 12508 based on parameter values passed between applications, and the layout of controllers on various network zones, to balance utilization of network zones, and/or to limit utilization of network zones within capability limits and/or within predetermined utilization limits. The example container orchestration circuit 12506 is further structured to distribute the plurality of container application values 12508 responsive to network communication loads of the network zones of the vehicle.

An example container security circuit 12504 is further structured to determine the authorization value 12510 in response to an authorization associated with an entity providing each of the plurality of container application values, for example determining that the providing entity has authorization to access data values and/or provide actuation commands utilized by the application corresponding to the container application value 12508. An example container security circuit 12504 is further structured to determine the authorization value 12510 in response to an authorization requirement associated with operations of each of the plurality of container application values 12508. An example container security circuit 12504 is further structured to determine the authorization requirement in response to an input data value of each of the plurality of container application values 12508. An example container security circuit 12504 is further structured to determine the authorization requirement in response to an output data value of each of the plurality of container application values 12508. An example container security circuit 12504 is further structured to determine the authorization requirement in response to an actuator command value of each of the plurality of container application values 12508. An example container security circuit 12504 is further structured to determine the authorization requirement in response to a memory support value of each of the plurality of container application values 12508. Example memory support values include one or more of an installation memory support value and/or an operating memory support value. An example container security circuit 12504 is further structured to determine the authorization requirement in response to a processing support value of each of the plurality of container application values.

An example container acquisition circuit 12502 is further structured to interpret an additional container application value (e.g., utilized to update an application and/or add a new application to a vehicle), and wherein the container orchestration circuit 12506 is further structured to update the operation parameters 12516 for the plurality of container application values 12508 and the additional container application value 12508 in response to an added container application value 12508. An example container orchestration circuit 12506 is further structured to distribute the added container application value 12508 to a selected end point of the vehicle in response to a capability of the selected end point to perform the added container application value 12508. An example container orchestration circuit 12506 is further structured to change a distribution of the plurality of container application values 12508 across a number of end points of the vehicle in response to the added container application value 12508—for example to re-balance and/or provide capability to execute installed container application values 12508 in view of the added container application value 12508.

An example container acquisition circuit 12502 is further structured to interpret an enable value for at least one of the plurality of container application values 12508, for example provided in an update to the container policy 12512, an updated image of the container application value 12508, and/or provided as a part of a policy as set forth elsewhere throughout the present disclosure, where the container orchestration circuit 12506 is further structured to determine the operation parameters 12516 in response to the enable value. An example container orchestration circuit 12506 is further structured to interpret a vehicle operating condition, and to determine the operation parameters 12516 in response to the vehicle operating condition—for example delaying a reconfiguration of the operation parameters 12516 until a selected vehicle operating condition is present (e.g., stationary, shutdown, idle, etc.), and/or providing for selected operations of applications based on a vehicle operating condition, for example disabling features that are not utilized in certain operating conditions, enabling features utilized in certain operating conditions, and/or changing feature execution rate and/or execution order in response to the operating conditions. An example container orchestration circuit 12506 is further structured to interpret a vehicle configuration value (e.g., indicating a power rating, trim level, performance rating, model identifier, etc.), and to determine the operation parameters in response to the vehicle configuration value.

Figure 126:
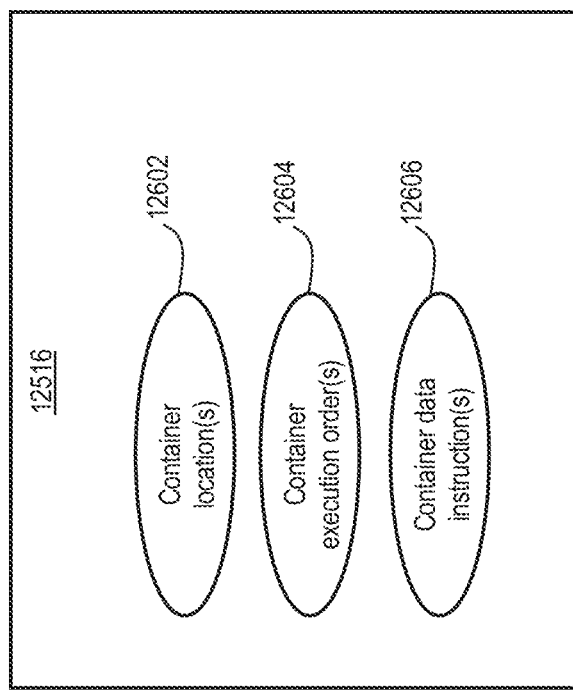

Referencing FIG. 126, an example container operating parameter 12516 is schematically depicted. In certain embodiments, the container operating parameter 12516 may be stored as a local container registry (e.g., reference FIG. 17 and the related description). The example container operating parameter 12516 includes a container location 12602 (e.g., a location where a container application value 12508 is installed), a container execution order 12604 (e.g., a listing of container application execution orders, which may in certain embodiments be specific to container application values 12508 provided on a given controller), and/or a container data instruction 12606 (e.g., providing a description of data values, including formatting and/or processing for the data values, that are utilized by and/or provided by one or more, or all, container application values 12508).

Figure 127:
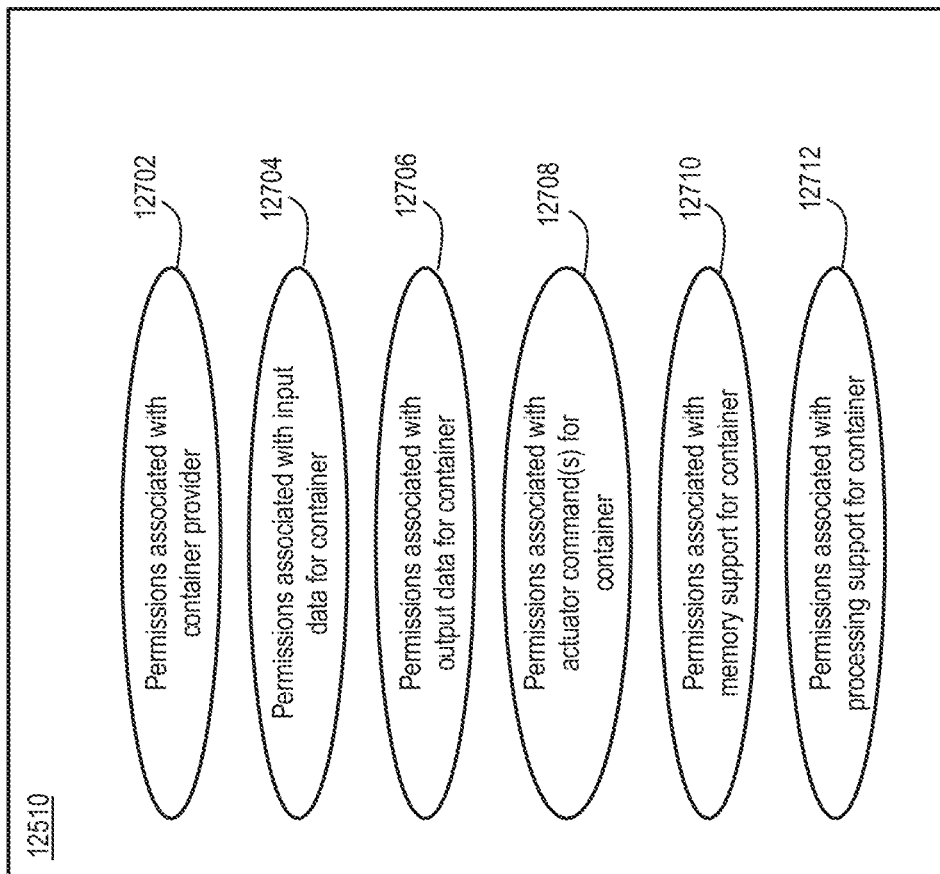

Referencing FIG. 127, an example authorization value 12510 is schematically depicted. In certain embodiments, the authorization value 12510 includes one or more of: permissions associated with a container provider 12702; permissions associated with input data for a container 12704; permissions associated with an output data for a container 12706; permissions associated with actuator command(s) accessed by a container 12708; permissions associated with memory support for a container 12710; and/or permissions associated with processing support for a container 12712.

Figure 128:
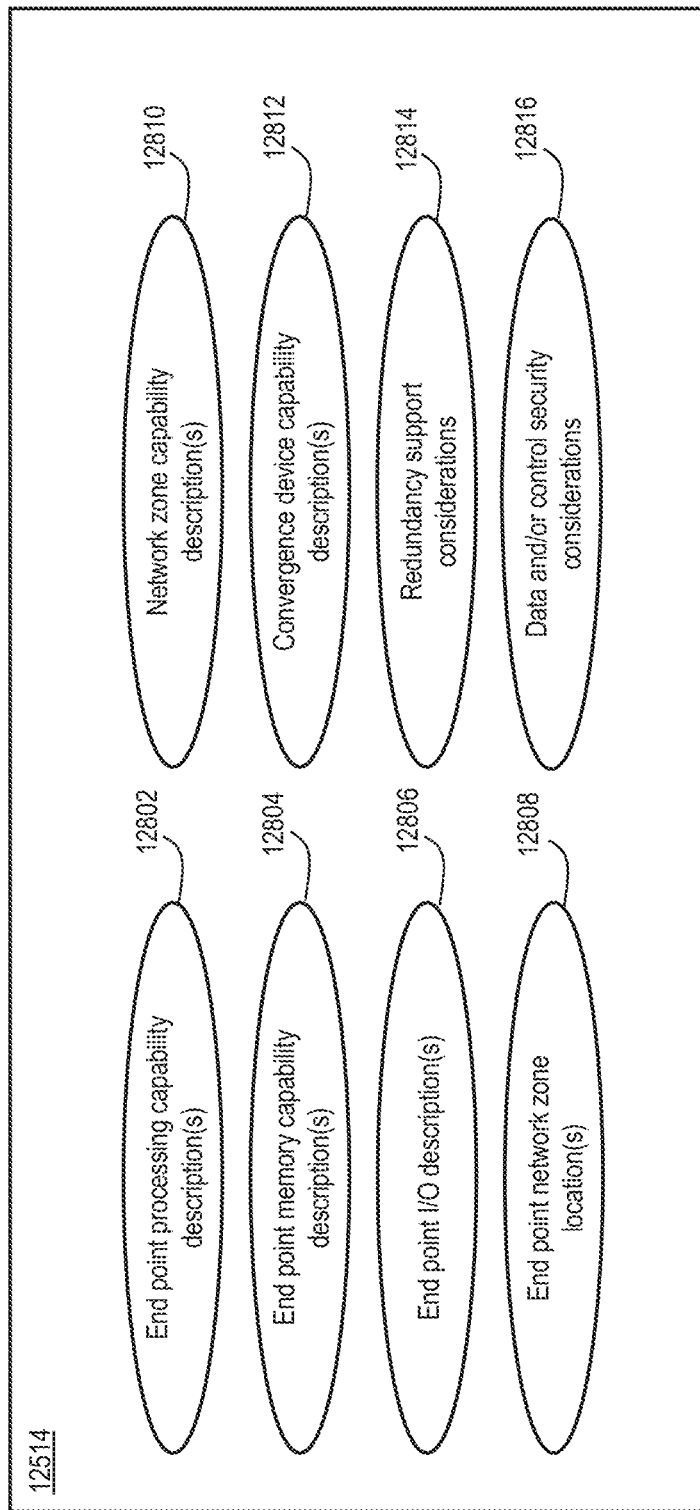

Referencing FIG. 128, an example vehicle resource information 12514 value is schematically depicted. In certain embodiments, one or more aspects of the vehicle resource information 12514 are utilized by the container orchestration circuit 12506 to determine capability and/or load balancing of container operations, to determine the container operating parameters 12516 including the distribution of container application values 12508 across end points of the vehicle. The example vehicle resource information 12514 includes one or more aspects such as: an end point processing capability description 12802; an end point memory capability description 12804; an end point I/O description 12806 (e.g., including which sensors and/or actuators are operationally coupled to a given end point, and/or configuration of the sensors and/or actuators such as voltage ranges, electrical characteristics, A/D processing operations, etc.); an end point network zone location 12808; a network zone capability description 12810 (e.g., including bandwidth, latency, synchronization description, types of messages available, network protocols, etc.); a convergence device capability description 12812 (e.g., data throughput and/or processing capability of a CEG, CES, and/or CND); a redundancy support consideration 12814 (e.g., a description of applications that may have a redundant capacity, for example a substitute container application that can perform all or a portion of operations for another container application in response to a communication loss, end point loss, off-nominal operation, etc.); and/or data and/or control security considerations 12816 (e.g., network zones that are not considered secure enough for certain types of data and/or control functions, etc.).

Figure 129:
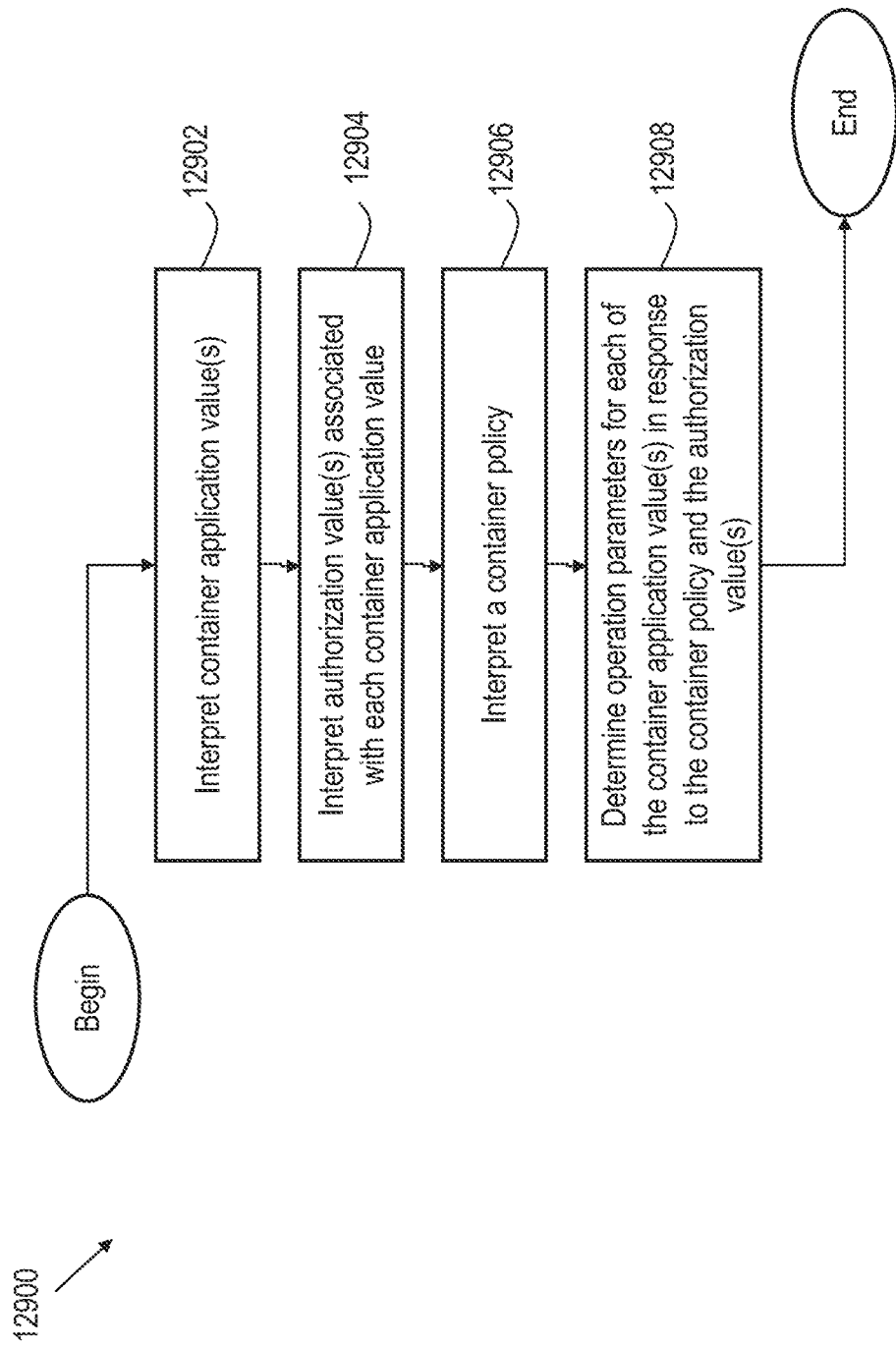
Figure 130:
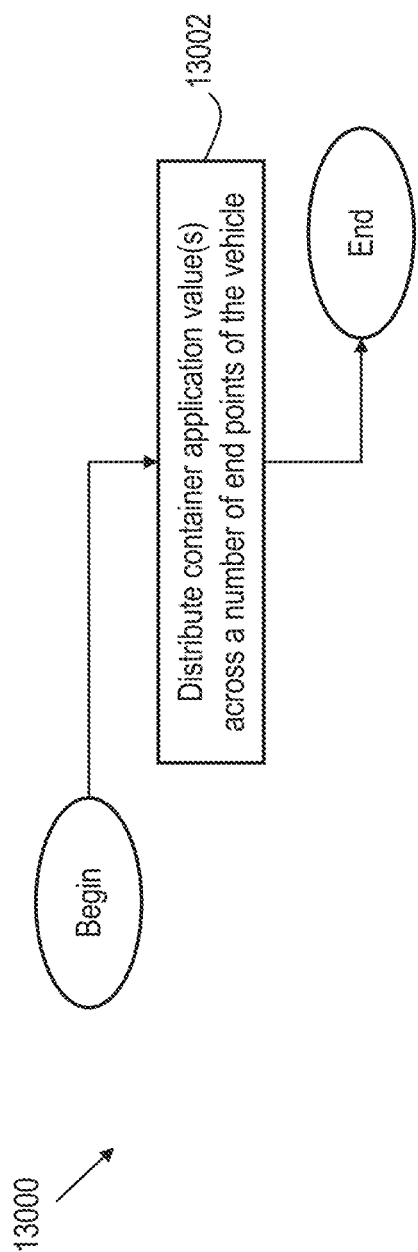

Referencing FIG. 129, an example procedure 12900 for providing a containerized implementation of one or more control operations on a vehicle is schematically depicted.

The example procedure 12900 includes an operation 12902 to interpret container application values, an operation 12904 to interpret authorization values associated with each of the container application values, an operation 12906 to interpret a container policy, and an operation 12908 to determine operation parameters for each of the container application values in response to the container policy and the authorization values. Referencing FIG. 130, an example procedure 13000 to provide a containerized implementation of one or more control operations on a vehicle is schematically depicted. The example procedure 13000 includes an operation 13002 to distribute container application values (e.g., install container applications) across a number of end points of the vehicle.

Referencing FIGS. 131-134, example embodiments of the present disclosure are schematically depicted to provide automated vehicle operations based on detected data values, response of data values, combined data values and/or responses, and/or trigger evaluations as set forth throughout the present disclosure. The apparatuses, systems, circuits, and/or operations set forth in relation to FIGS. 131-134 and the related descriptions may be utilized in any embodiments of the present disclosure, may be utilized in whole or part with embodiments of FIGS. 1-16, and/or aspects of embodiments depicted in FIGS. 1-16 may be utilized in whole or part with embodiments of FIGS. 131-134. The utilization of automated response operations of a vehicle leverage numerous aspects of embodiments of the present disclosure—for example, and without limitation: allowing for rapid implementation of features utilizing little or no application development resources for the features; allowing for installation and utilization of features having a light footprint in terms of verification, installation, and distribution of features to a number of vehicles; allowing for creative third parties and/or vehicle owner/operators to provide high value and/or convenience enhancements for interactions with the vehicle; and/or allowing for installation of feature (e.g. as a containerized application) at a first time, and enabling of the feature at a later time (e.g., to provide verification time, provide for distributed roll-out risk, etc.). In certain embodiments, aspects of the present disclosure enable high capability automated vehicle operations, including aspects such as: the ability of embodiments herein to retrieve and/or provide data values to any end point on any network zone of any type; to control access to features, end points, applications, flows, and/or actuators that are protective of vehicle security and mission integrity; allowing for access to any data on the vehicle and/or any actuator on the vehicle without requiring in-depth knowledge of the vehicle configuration; and/or utilization of an external device facing interface and API to provide a selected user experience and enable easy access to available capabilities of the vehicle.

Figure 131:
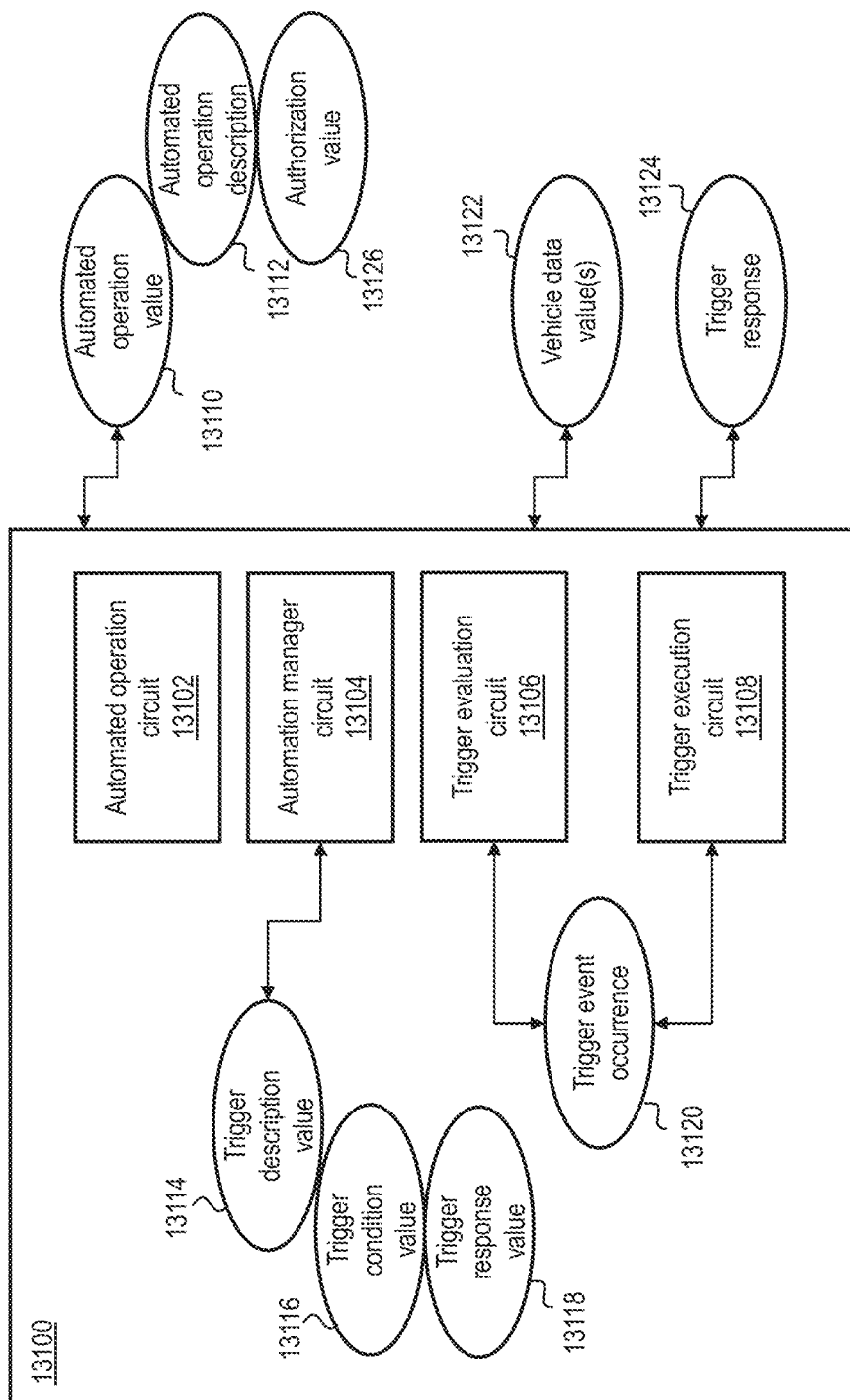

Referencing FIG. 131, an example apparatus for performing automated operations on a vehicle is schematically depicted. The example apparatus 13100 includes an automated operation circuit 13102 structured to interpret an automated operation value 13110 including an automated operation description for a vehicle 13112. The example apparatus 13100 further includes an automation manager circuit 13104 structured to determine a trigger description value 13114 in response to the automated operation value 13110, the trigger description value 13114 including a trigger condition value 13116 (e.g., data values, operating conditions, state values, and/or mode values defining detected values utilized to determine whether the trigger event has occurred), and a trigger response value 13118 (e.g., operations to be performed in response to a trigger event occurrence 13120, including operation of an actuator, collection of data, providing notifications or alerts, etc.). The example apparatus 13100 further includes a trigger evaluation circuit 13106 structured to determine a trigger event occurrence 13120 in response to the trigger condition value 13116 and at least one vehicle data value 13122. The example apparatus 13100 includes a task and/or trigger execution circuit 13108 structured to execute a trigger response 13124 in response to the trigger event occurrence 13120. Embodiments of the disclosure may execute one or more tasks without a trigger.

Example and non-limiting trigger responses 13124 include operations such as: performing a data collection operation 13402 (e.g., reference FIG. 134); providing an actuator command value 13404; and/or enabling operation of a pre-configured feature on a controller of the vehicle 13406. An example trigger response 13124 includes providing a high priority response 13408 for at least a portion of the trigger response 13124, for example to allow for a rapid user experience for at least a portion of the trigger response 13124, for example providing immediate feedback to the user that an operation has commenced, providing for a rapid notification or external communication, and/or providing a high priority actuator command (e.g., unlocking a door) as a part of the trigger response 13124. An example automated operation value 13110 includes a selection from a number of pre-configured automated operation values 13110, for example to provide pre-configured operations available on an interface to allow for rapid configuration of automated operations, and/or to ensure that certain operations are always performed together or in a determined arrangement (e.g., confirming aspects before allowing an engine start, such as enforcing a zero vehicle speed, closed doors, etc.). An example automation manager circuit 13104 is further structured to determine an authorization value 13126 associated with the automated operation value 13110, and to selectively determine the trigger description value 13114 in response to the authorization value 13126 (e.g., declining to implement the automated operation value 13110 if the authorization is insufficient, providing a notification that the automated operation value 13110 is not to be implemented, etc.). An example automation manager circuit 13104 is further structured to determine the trigger description value 13114 as a persistent value (e.g., similar to implementation of a persistent policy), and/or as a limited execution value (e.g., similar to implementation of a limited and/or discrete policy). An example automation manager circuit 13104 is further structured to maintain a receiver of the vehicle in a selected power mode during selected operating conditions of the vehicle—for example allowing for exchange of external data to support automated operations of the vehicle, and/or to enhance a response time of the vehicle, while managing power consumption. An example automation manager circuit 13104 is further structured to maintain at least one controller of the vehicle in a selected power mode during selected operating conditions of the vehicle, for example to monitor data values supporting an automated operation and/or to monitor a trigger condition value 13116, and/or to reduce a response time of the vehicle to an automated operation, for example keeping a selected controller in a power mode where a startup time is reduced and/or eliminated, while managing power consumption. An example automation manager circuit 13104 is further structured to maintain the at least one controller of the vehicle in the selected power mode in response to a content of the trigger description value 13114 (e.g., keeping controllers associated with a monitored value and/or actuator in a selected power mode).

Referencing FIG. 132, an example procedure 13200 to implement an automated operation of a vehicle is schematically depicted. The example procedure 13200 includes an operation 13202 to interpret an automated operation value, an operation 13204 to determine a trigger description value in response to the automated operation value, an operation 13206 to determine a trigger event occurrence in response to a trigger condition value and a vehicle data value, and an operation 13208 to execute a trigger response in response to the trigger event occurrence. In embodiments, one or more trigger/event responses may be included in a recipe which may be created via an external tool, e.g., a cloud application, and deployed to one or more vehicles. Referencing FIG. 133, another example procedure 13300 to implement an automated operation of the vehicle is schematically depicted. The example procedure 13300, in addition to procedure 13200, further includes an operation 13302 to maintain a controller and/or a receiver (e.g., a WiFi and/or cellular data receiver) in a selected power mode.

Referencing FIG. 135, an example apparatus 13500 for transmission operations of vehicle data with a cloud system and/or an external device is schematically depicted. The example apparatus 13500 includes a policy acquisition circuit 13502 that interprets a vehicle policy data value 13508 including at least one requested vehicle property 13510, a parameter acquisition circuit 13504 structured to interpret a plurality of vehicle parameter values 13512, responsive to the at least one requested vehicle property 13510, from a number of providing end points, each of the number of providing end points on at least one network zone of a vehicle. An example vehicle policy data value 13508 further includes an authorization value 13522, which may be utilized to determine whether transmission is authorized, and/or to determine if certain transmission resource utilizations are authorized. The example apparatus 13500 further includes a vehicle data transmission circuit 13506 that selectively transmits at least a portion of collected vehicle data 13520, for example provided by end points responsive to the vehicle parameter values 13512, and provided as transmitted vehicle data 13518. In certain embodiments, the vehicle parameter values 13512 are retrieved from a network zone of the vehicle, and/or requested from an end point where a given vehicle parameter value 13512 is not already available on a network zone.

An example vehicle data transmission circuit 13506 further selectively transmits the at least a portion of the collected vehicle data 13520 by selecting a transmission interval 13516 for the at least a portion of the collected vehicle data 13520. An example vehicle data transmission circuit 13506 is further structured to select the transmission interval 13516 in response to at least one of: an interval provided in the vehicle policy data value 13508; an interval responsive to a priority of the at least a portion of the collected vehicle data 13520; an interval responsive to an availability description for transmitting resources (e.g., based on current vehicle operating conditions, availability of external data communication, current bandwidth for a network zone supporting external communications, and/or a transceiver providing external communications, etc.) for the at least a portion of the collected vehicle data 13520; an interval responsive to a historical transmission availability for the vehicle; and/or an operating condition of the vehicle.

An example vehicle data transmission circuit 13506 is further structured to selectively transmit the at least a portion of the collected vehicle data 13520 by selecting a bandwidth utilization 13524 for the at least a portion of the collected vehicle data 13520 (e.g., a permitted bandwidth utilization for the element of the collected vehicle data 13520). An example vehicle data transmission circuit 13506 is further structured to select the bandwidth utilization 13524 in response to at least one of a bandwidth utilization provided in the vehicle policy data value; a bandwidth utilization responsive to a priority of the at least a portion of the collected vehicle data 13520; a bandwidth utilization responsive to an availability description for transmitting resources for the at least a portion of the collected vehicle data 13520; an interval responsive to a historical transmission availability for the vehicle; or an operating condition of the vehicle.

An example vehicle data transmission circuit 13506 is further structured to selectively transmit the at least a portion of the collected vehicle data by selecting a transmission interval 13516 in response to a data type 13514 of the at least a portion of the collected vehicle data 13520. The vehicle data transmission circuit 13506 is further structured to selectively transmit the at least a portion of the collected vehicle data 13520 in response to a vehicle operational impact 13536 of transmission operations (e.g., based on utilization of network zones and/or external data transfer resources according to various operating conditions of the vehicle, such as an operating state, power throughput, engine speed, etc.). The vehicle data transmission circuit is further structured to selectively transmit the at least a portion of the collected vehicle data in response to a power utilization impact of transmission operations. The vehicle data transmission circuit 13506 is further structured to selectively transmit the at least a portion of the collected vehicle data 13520 in response to a data transmission capacity value 13532. The data transmission capacity value 13532 includes at least one data transmission capacity value such as: a data transmission capacity 13532 associated with a time interval (e.g., a transmission rate, and/or an amount of data over a predetermined time period); a data transmission capacity 13532 associated with an entity related to the at least a portion of the collected vehicle data; a data transmission capacity 13532 associated with an access point name; a data transmission capacity 13532 associated with a flow related to the at least a portion of the collected vehicle data; a data transmission capacity 13532 associated with an application of the vehicle related to the at least a portion of the collected vehicle data; or a data transmission capacity 13532 associated with a vehicle function related to the at least a portion of the collected vehicle data.

An example vehicle data transmission circuit 13506 is further structured to selectively transmit the at least a portion of the collected vehicle data 13520 in response to a currently available transmission type 13526, for example a cellular data transmission, WiFi transmission, physically connected device transmission, or the like. The vehicle data transmission circuit 13506 is further structured to selectively transmit the at least a portion of the collected vehicle data by selecting a data transmission chunk size 13538 for the at least a portion of the collected vehicle data. The data transmission chunk size 13538 includes at least one of an individual message size (e.g., a packet size value) or a single transmission flow size (e.g., a data amount to be transmitted over the course of a single transmission attempt period). An example vehicle data transmission circuit 13506 is further structured to select the transmission chunk size 13538 in response to at least one of: a transmission chunk size provided in the vehicle policy data value; a transmission chunk size to a priority of the at least a portion of the collected vehicle data (e.g., increasing a chunk size to pass high priority data faster, and/or reducing a chunk size to improve a success rate of transmitting high priority data); a transmission chunk size responsive to an availability description for transmitting resources for the at least a portion of the collected vehicle data (e.g., configuring chunk size based on a capability of available transmission resources); a transmission chunk size responsive to a historical transmission availability for the vehicle; or an operating condition of the vehicle. An example vehicle data transmission circuit 13506 is further structured to adjust the selectively transmitting the at least a portion of the collected vehicle data in response to a success parameter 13534 for transmitting operations (e.g., allowing for adjustment and/or variation in transmission parameters to continuously improve transmissions, and/or adapt transmission parameters to conditions). The vehicle transmission circuit is further structured to adjust the selectively transmitting the at least a portion of the collected vehicle data in response to a quality of service parameter 13528 for transmitting operations (e.g., adapting transmission selections to improve a quality of service, to enforce a quality of service requirement, etc.).

Referencing FIG. 136, an example procedure 13600 to manage transmission operations of a vehicle is schematically depicted. The example procedure 13600 includes an operation 13602 to interpret a vehicle policy data value, an operation 13604 to interpret vehicle parameter values responsive to the vehicle properties of the vehicle policy data value, and an operation 13606 to selectively transmit at least a portion of the collected vehicle data. Referencing FIGS. 137-146, example operations 13606 to selectively transmit at least a portion of the collected vehicle data are schematically depicted. Referencing FIG. 137, an operation 13606 includes selectively transmitting collected data in response to a selected transmission interval. Referencing FIG. 138, an operation 13606 includes selectively transmitting collected data in response to a selected bandwidth utilization. Referencing FIG. 139, an operation 13606 includes selectively transmitting collected data in response to a data type of the collected data. Referencing FIG. 140, an operation 13606 includes selectively transmitting collected data in response to a vehicle operational impact of transmission operations. Referencing FIG. 141, an operation 13606 includes selectively transmitting collected data in response to a power utilization impact of transmission operations. Referencing FIG. 142, an operation 13606 includes selectively transmitting collected data in response to a data transmission capacity value. Referencing FIG. 143, an operation 13606 includes selectively transmitting collected data in response to a currently available transmission type. Referencing FIG. 144, an operation 13606 includes selectively transmitting collected data in response to a selected data transmission chunk size. Referencing FIG. 145, an example operation 13606 includes selectively transmitting collected data in response to a success parameter for transmitting operations. Referencing FIG. 146, an example operation 13606 includes selectively transmitting collected data in response to a quality of service value for transmitting operations.

Referencing FIG. 147, an example apparatus 14700 for implementing remote assistance operations for a vehicle is schematically depicted. The example apparatus 14700 includes a remote access execution circuit 14702 structured to interpret a remote access request value 14710 from a requesting device (e.g., an external device coupled to a cloud system, and/or otherwise in communication with the vehicle), the remote access request value 14710 including at least one requested vehicle property 14712. The example apparatus 14700 includes a property translation circuit 14704 structured to determine a property request value 14714 in response to the at least one requested vehicle property 14712, and a parameter acquisition circuit 14706 structured to interpret a plurality of vehicle parameter values 14716 in response to the property request value 14714. The example apparatus 14700 includes a parameter conditioning circuit 14708 structured to generate, in response to the property request value 14714, vehicle property data 14718 from the plurality of vehicle parameter values 14716, the vehicle property data 14718 corresponding to at least one the requested vehicle property 14712, where the remote access execution circuit 14702 is further structured to transmit the vehicle property data 14718 to the requesting device—for example as transmitted vehicle property data 14720. For example, the requested vehicle property 14712 describes a parameter of interest to a user of the requesting device, which may be selected from an interface—for example a service interface (e.g., where technical assistance is provided by a remote service personnel), and/or an owner or operator of the vehicle (e.g., where the owner/operator remotely accesses the vehicle to determine data of interest and/or perform a remote operation). In the example, the property request value 14714 may be provided as a value to be requested, for example from an end point of a network zone of the vehicle, and the vehicle parameter value 14716 is the responsive value provided by the end point. In a further example, the vehicle property data 14718 includes the vehicle parameter value 14716, configured according to the external value as requested in the requested vehicle property 14712, for example a value determined from one or more vehicle parameter values 14716, and/or a vehicle parameter value 14716 which has formatting, selected units, sampling rates, bit depth, etc. configured to the requested vehicle property 14712. An example apparatus 14700 includes a converged network device (CND) structured to regulate communications between a first network zone having a first network endpoint and a second network zone having a second network endpoint, wherein at least a portion of the plurality of vehicle parameter values 14716 are generated by each of the first network endpoint and the second network endpoint.

The apparatus further includes wherein the remote access request value 14710 further includes a vehicle function value 14722—for example an actuator operation, a feature to be enabled, exercised, and/or configured, and/or a sequence of operations (e.g., starting an engine, operating the vehicle through a sequence of operations, testing a number of actuators, etc.). An example property translation circuit 14704 determines an actuator command value 14726 in response to the vehicle function value 14722; and a remote operation circuit 14724 provides the actuator command value 14726 to an endpoint of a network zone of a vehicle. An example apparatus 14700 further includes a converged network device (CND) structured to regulate communications between a first network zone having a first network endpoint and a second network zone having a second network endpoint and including the network zone of the vehicle; wherein the first network endpoint provides at least a portion of the plurality of vehicle parameter values; and wherein the second network endpoint includes an actuator responsive to the actuator command value 14726. An example property translation circuit 14704 is further structured to determine the actuator command value 14726 by performing at least one operation such as: determining the actuator command value 14726 as a sequence of actuator commands corresponding to a diagnostic test operation; determining the actuator command value 14726 as a sequence of actuator commands corresponding to a remote control operation; and/or determining the actuator command value 14726 as at least one actuator command responsive to the vehicle function value 14722.

An example apparatus 14700 includes an additional number of endpoints distributed across at least the first network zone and the second network zone, wherein the additional plurality of endpoints each provide at least a portion of the plurality of vehicle parameter values 14716. An example apparatus 14700 further includes an additional number of endpoints distributed across at least the first network zone and the second network zone, wherein the additional plurality of endpoints each include a corresponding actuator, each responsive to at least a portion of the actuator command value 14726. An example remote access request value 14710 includes a policy. The policy includes at least one value such as: an authorization value of the requesting device; a data collection description including the at least one requested vehicle property; a trigger description value including a trigger condition and a trigger response value, and where the parameter acquisition circuit 14706 is further structured to generate at least a portion of the vehicle property data 14718 from the plurality of vehicle parameter values 14716 further in response to the trigger description value and/or a policy priority value.

Referencing FIG. 148, an example system including an apparatus 14700 is schematically depicted. The example system may include any apparatus as set forth herein, and is not limited to inclusion of the apparatus 14700. Additionally or alternatively, the apparatus 14700 and/or portions thereof may be provided on the vehicle 14806, and/or on the external device 14804. The example of FIG. 148 illustrates the apparatus 14700 provided as a cloud system, but a connection between the external device 14804 and the vehicle 14806 may be provided in any manner, including connection through a WiFi, LAN, and/or any other connection configuration described throughout the present disclosure. In certain embodiments, the external device 14804 may couple directly to the vehicle 14806, with operations of the apparatus 14700 performed in a cloud system, and/or on the vehicle 14806 and/or the external device 14804. The example of FIG. 148 includes a CND 14802 configured to allow data value and/or actuator access between network zones 14808, 14810 of the vehicle 14806. The system of FIG. 148 allows for remote assistance and/or remote control operations of the vehicle 14806, including access to data values, operation of actuators, and/or operation of more complex operational features, regardless of the configuration of end points on the vehicle 14806, and without requiring knowledge of the vehicle configuration by the user of the external device 14804, and/or a user configuring operations of the apparatus 14700.

Referencing FIG. 149, an example procedure 14900 for performing remote operations for a vehicle, including remote assistance operations, is schematically depicted. The example procedure 14900 includes an operation 14902 to interpret a remote access request value, including at least one requested vehicle property, an operation 14904 to determine a property request value in response to the requested vehicle property, an operation 14906 to interpret vehicle parameter value(s) in response to the requested vehicle property, an operation 14908 to generate vehicle property data, responsive to the property request value, from the vehicle parameter values, and an operation 14910 to transmit the vehicle property data to the requesting device. Referencing FIG. 150, an example procedure 15000 for performing operations for a vehicle, including remote assistance operations, is schematically depicted. The example procedure 15000 includes an operation 15002 to interpret a remote access request value, including a vehicle function value, an operation 15004 to determine an actuator command value in response to the vehicle function value, and an operation 15006 to provide an actuator command value to an end point of a network zone of the vehicle.

Referring now to FIG. 151, an embodiment of an apparatus 15100 for collecting and/or managing vehicle data in accordance with this disclosure is shown. The apparatus 15100 may be a standalone controller or form part of one or more of any of the controllers described herein. As such, in embodiments, the apparatus 15100 may be disposed onboard a vehicle. In embodiments, as explained in greater detail herein, part of, or all of the apparatus 15100 may be disposed offboard a vehicle. The apparatus 15100 includes a parameter acquisition circuit 15110 structured to interpret a vehicle parameter value 15112. The apparatus 15100 further includes a property translation circuit 15114 structured to interpret a property request value 15116 that defines, at least in part, a requested vehicle property. The apparatus 15100 further includes a property conditioning circuit 15118 structured to generate, in response to the property request value 15116, vehicle property data 15120 from the vehicle parameter value 15112. The vehicle property data 15120 may correspond to the requested vehicle property, e.g., the vehicle property defined, at least in part, by the property request value 15116.

An embodiment of the apparatus 15100 is depicted in FIG. 151 as interpreting/receiving a single vehicle parameter value 15112. It is to be understood, however, that embodiments of the apparatus 15100 may interpret/receive a plurality of vehicle parameter values 15112. For example, the apparatus 15100 may continuously collect vehicle parameter values 15112 over a period of time, e.g., for a day, week, month, year, the operating life of a vehicle, etc., and/or under certain conditions, e.g., while the vehicle is occupied and/or unoccupied, being driven and/or stationary, during periods when a parameter value is within a predetermined range, above or below a predetermined threshold, and/or in response to a characteristic of the parameter (e.g., having a rate of change greater than a predetermined value and/or within a predetermined range, having a selected value, switching between selected values, etc.). The example parameter and collection values are described as relating to a particular parameter for illustration, but collected parameters and/or collection criteria may utilize a number of parameters, an operating condition of the vehicle, or the like. Parameters for collection and/or to determine collection criteria may be quantitative (e.g., a numerical value) and/or qualitative (e.g., a category, Boolean value, state value, etc.). The vehicle parameter values 15112 may be generated by one or more vehicle sensors, vehicle controllers, and/or vehicle actuators (e.g., a feedback value, position value, fault value, etc.) as described herein. Non-limiting examples of vehicle parameter values include vehicle speed values, prime mover speed values, prime mover torque values, user actuated vehicle feature values, vehicle location values, network utilization values for a network zone of the vehicle, raw network messages from a network zone of the vehicle, network addresses for endpoints on a network zone of the vehicle, memory storage description of a controller of the vehicle, values from endpoints on a controller area network (CAN), values from endpoints from a local interconnect network (LIN), intermediate control values, an actuator state or feedback value, and/or the like. The vehicle parameter value may be any value available on a network zone of a vehicle, on an end point of the vehicle, in a memory of a controller of the vehicle, and/or available to be provided by an end point of the vehicle, for example in response to a request or command to the end point to provide the parameter.

The embodiment of the apparatus 15100 in FIG. 151 is also depicted as interpreting/receiving a single property request value 15116. It is to be understood, however, that embodiments of the apparatus 15100 may interpret/receive a plurality of property request values 15116. For example, the apparatus 15100 may continuously collect property request values 15116 over a period of time, e.g., for a day, week, month, year, the operating life of a vehicle, etc., and/or under certain conditions, e.g., while the vehicle is occupied and/or unoccupied, being driven and/or stationary, etc. The property request values 15116 may be generated offboard a vehicle by one or more computing devices, as described herein, and transmitted to the vehicle via one or more network connections, as also described herein. Non-limiting examples of vehicle properties include component temperature values, sensor raw values, component speed values, actuator feedback values, drivetrain component speed values, drive shaft speed values, drive shaft torque values, selected gear values, battery state of health values, battery state of charge values, battery throughput values, and/or the like.

The parameter acquisition circuit 15110 may include and/or communicate with one or more electrical communication ports that have access to network devices, controllers and/or sensors, disposed onboard a vehicle, that generate and/or have access to devices, e.g., vehicle sensors, that generate vehicle parameter values 15112. An example parameter acquisition circuit 15110 may be capable to communicate with any network zone of the vehicle, any end point of the vehicle, and may take data from any network zone and/or end point, a memory of a controller, and/or may command any end point to provide a value—for example a value that is available on the end point but not normally published to a network zone.

The property translation circuit 15114 may include and/or communication with one or more electrical communication ports that have access to network devices and/or controllers that have access to the property request values 15116. An example property translation circuit 15114 determines available property request values 15116 that are responsive to the vehicle parameter values 15112—for example allowing an external device and/or other user to request vehicle data using a general term for the data (e.g., "vehicle speed"), while configuring the property request value 15116 to get the selected data from the vehicle without requiring knowledge of the data location, vehicle configuration, parameter and/or control operation version, etc. Accordingly, an interface to the external device to allow request of the vehicle parameter values 15112 for collection can be configured for operations of the requesting user interface, without having to update and/or have knowledge of information about the vehicle, the vehicle network zone configuration, and/or the location or details of control operations and/or data availability on the vehicle. Additionally, without limitation to any other aspect of the present disclosure, the interface to the external device will operate properly for a range of vehicles (e.g., multiple models, model years, trims, configurations, etc.), and continue to operate properly when a specific vehicle experiences a change (e.g., movement of an end point, upgrading a control operation, addition or removal of an end point, changing control operation locations, addition of a feature or control operation, etc.).

The property conditioning circuit 15118 may communicate with the parameter acquisition circuit 15110 and/or the property translation circuit 15114. Generation of the vehicle property data 15120 may include conditioning, formatting, interpolation and/or other adjusting and/or manipulation of the vehicle parameter values 15112.

For example, turning to FIG. 152, an embodiment of the apparatus 15200 is shown where the vehicle parameter values 15210 directly correspond to the requested vehicle property, e.g., the vehicle property data 15214 conveys substantially the same information as the vehicle parameter value 15210—for example utilizing the same unit type (e.g., length, mass, time, etc.), having a difference only in the time domain (e.g., a sampling rate difference), and/or where vehicle parameter value 15210 and/or vehicle property data 15214 include sufficient information to be correlated except for potentially changes in formatting, processing, and the like. It will be understood, however, that the property conditioning circuit 15118 may adjust the format and/or units of the vehicle parameter value 15210 when generating the vehicle property data 15214. Formatting of the vehicle parameter value 15210 may include adjusting the network protocol of the vehicle parameter value 15210 for transmission off the vehicle, e.g., the vehicle parameter value 15210 may be received in CAN format with its underlying data repackaged by the property conditioning circuit 15118 into a TCP/IP packet. While the foregoing example describes a CAN to TCP/IP conversion, embodiments of the apparatus 15200 may perform conversion between other types of networks described herein. Without limitation to any other aspect of the present disclosure, formatting of the vehicle parameter value 15210 includes any one or more of: up-sampling parameter values; down-sampling parameter values; changing a bit depth of a parameter value (e.g., a number of fixed point bits assigned to the value, and/or a precision level of a floating point parameter value); changing a sampling rate of the parameter value (e.g., how often a sensor, controller, or other end point provides an updated value); changing a processing of the parameter value (e.g., filtering, de-bouncing, reserved ranges that indicate information such as faults, diagnostic values, state values, etc.); changing a name of the parameter value; and/or adding, removing, and/or modifying metadata of the parameter value (e.g., a time stamp, source end point, packet information, associated application and/or flow, etc.).

Shown in FIG. 153 is another embodiment of the apparatus 15300 wherein the property conditioning circuit 15310 may generate vehicle property data 15312 from two or more vehicle parameter values 15314 and 15316. For example, in embodiments, the property conditioning circuit 15310 may generate/derive a virtual vehicle property value 15318 (also shown in FIG. 154) from the two or more vehicle parameter values 15314 and 15316, wherein the vehicle property data 15312 includes the virtual vehicle property value 15318. For example, a property request value 15320 may request a property, e.g., an estimated vehicle operating cost value, while the vehicle may not have any sensors that directly generate the requested property. Additionally or alternatively, a virtual vehicle property value 15318 may be provided even where a directly generated property would be available—for example to reduce network traffic (e.g., while the value is available, the value can also be determined from other values already being collected); as a backup value (e.g., utilizing the virtual vehicle property value 15318 in response to a sensor associated with a directly generated property being in a fault condition); to reduce other processing (e.g., the directly available value requiring additional formatting operations, where the use of the virtual vehicle property value 15318 requires fewer formatting operations); in response to priority and/or authorization considerations (e.g., where a requesting flow, entity, application, etc. associated with the data request does not have access to the directly available value, but does have access to the virtual vehicle property value 15318, etc.). As such, the property conditioning circuit 15310 may derive the requested property as a virtual vehicle property value 15318 from the two or more vehicle parameter values 15314 and 15316, e.g., a fuel efficiency sensor or determined value, oil change detection sensor or determined value, etc. Non-limiting examples of virtual vehicle properties include: vehicle speed values; motive power efficiency values; event occurrence values; a listing of previous vehicle locations; estimated temperature values; estimated pressure values; effective temperature values; effective pressure values; heat transfer rate values; remaining life values for components; time to maintenance values for a component; diagnostic counter values; a listing of one or more user activated features; an average vehicle runtime value; an estimated vehicle operating cost value; a state value of any end point, sensor, actuator, control operation, and/or the vehicle; and/or the like. In embodiments, generation/derivation of the virtual vehicle property value 15318 from the from the two or more vehicle parameter values 15314 and 15316 may include interpolation, operation of a model, utilization of one or more lookup tables, operation of a state diagram, etc. In certain embodiments, a value that is directly available to the property conditioning circuit 15310 may be a virtual parameter value determined from a number of other parameters in the system, but treated as a directly available value by the property conditioning circuit 15310 because it is available for direct request as a parameter. In certain embodiments, a virtual vehicle property value 15318 as used herein includes a value that the property conditioning circuit 15310 determines from one or more additional directly available values, and/or a parameter provided directly by another controller where the property conditioning circuit 15310 can adjust, control, confirm, verify, and/or otherwise have visibility to the determination of the directly provided parameter value.

Illustrated in FIG. 154 is another embodiment of the apparatus 15400 for collecting and/or managing vehicle data in accordance with this disclosure. The apparatus 15400 include a parameter acquisition circuit 15110, a property translation circuit 15114 and a property conditioning circuit 15118, as described herein. The apparatus 15400 may further include a requestor verification circuit 15410 structured to determine an entity authorization value 15412, and a vehicle property provisioning circuit 15414 structured to transmit the vehicle property data 15120 in response to the entity authorization value 15412. Determination of the entity authorization value 15412 may be responsive and based at least in part on the property request value 15116. For example, the property request value 15116 may contain an indicator of a requesting entity, e.g., the entity that generated the property request value 15116, and the requestor verification circuit 15410 may check the requesting entity against an approved access list. If the approved access list indicates the requesting entity is authorized to access the requested property, then the entity authorization value may be structured to indicate the same so that the vehicle property provisioning circuit 15414 transmits the vehicle property data 15120 to the requesting entity, or to an entity and/or location indicated by the property request value 15116 as being approved by the requesting entity to receive the vehicle property data 15120. For example, the apparatus 15400 may receive a property request value 15116 from a vehicle manufacturer that calls for vehicle property data 15120 to be transmitted to an approved third-party vendor. Upon receipt of the property request value 15116, the apparatus 15400 may check, via the requestor verification circuit 15410, the vehicle manufacturer and/or the third-party vendor against an approved access list and then transmit vehicle property data 15120 to the third-party vendor if the vehicle manufacturer and/or the third-party vendor are on the approved access list. As will be understood, embodiments of the disclosure may use other forms of authentication and/or verification to control access to the vehicle property data 15120, e.g., encryption keys, digital certificates, etc.

In embodiments, the apparatus 15400 may include a subscription circuit 15416 structured to add a requesting entity, e.g., the entity that generated the property request value 15116, to a subscriber data list 15418, wherein the property provisioning circuit 15414 is structured to transmit the vehicle property data 15120 to the requesting entity in response to the subscriber data list 15418. Addition of the requesting entity to the subscriber data list 15418 may be responsive to the property request value 15116. For example, an interpreted property request value 15116 may trigger the subscription circuit 15416 to add the requesting entity to the subscriber data list 15418. The vehicle property provisioning circuit 15414 may then transmit, periodically or continuously, the vehicle property data 15120 to the requesting entity (or to an entity and/or location approved by the requesting entity) as long as the requesting entity remains on the subscriber data list 15418.

In embodiments, the apparatus 15400 may include a CND 15420, as described herein, that regulates communications between a first network zone having a first vehicle sensor and a second network zone having a second vehicle sensor. In such embodiments, the vehicle parameter value 15421 may be generated by at least one of the first and/or the second vehicle sensor. In embodiments, a first vehicle parameter value 15421 may be generated by the first vehicle sensor (in the first network zone) and a second vehicle parameter value 15422 may be generated by the second vehicle sensor (in the second network zone). In embodiments, the first network zone and the second network zone may be of distinct types, as described herein.

Referring now to FIG. 155, an embodiment of a method 15500 for collecting and/or managing vehicle data in accordance with this disclosure is shown. The method 15500 may be performed by the apparatuses 15100 and/or 15400 and/or by the controller and/or processors of any other device described herein. Accordingly, with reference to FIGS. 151 and 155, the method 15500 includes interpreting 15510 a vehicle parameter value 15112, interpreting 15512 a property request value 15116, and generating 15514 vehicle property data 15120.

With reference to FIGS. 154 and 156, in embodiments, the method 15500 may further include determining 15610, in response to and based at least in part on the property request value 15116, an entity authorization value 15412 and transmitting 15612 the vehicle property data 15120 in response to the entity authorization value 15412. The method 15500 may further include adding 15614 a requesting entity to a subscriber data list 15418 in response to the property request value 15116. In such embodiments, transmitting 15612 of the vehicle property data 15120 may be in response to the subscriber data list 15418.

With reference to FIGS. 154 and 157, in embodiments, the method 15500 may include regulating 15710 communications between a first network zone having a first vehicle sensor and a second network zone having a second vehicle sensor. The method 15500 may further include generating 15712 the vehicle parameter value(s) and/or 15421 and/or 15422 by at least one of the first and the second vehicle sensors. In embodiments, interpreting 15510 the vehicle parameter value may include interpreting 15714 a plurality of vehicle parameter values 15421 and 15422. In such embodiments, generating 15514 the vehicle property data is based, at least in part on, the plurality of vehicle parameter values 15421 and 15422. In such embodiments, a first vehicle parameter value 15421 may be from the first vehicle sensor (in the first network zone) and a second vehicle parameter 15422 may be from the second vehicle sensor (in the second network zone).

As will be appreciated, embodiments of the disclosure may provide for a requesting entity to be agnostic with respect to the manner in which different vehicles acquire/collect data, and/or the configuration (e.g., network zones, end points, control operation locations, etc.) of the vehicle. In other words, embodiments of the disclosure may provide for a requesting entity to use the same type of property request value to request the same vehicle property from different vehicles, and/or from the same vehicle having different configurations, regardless of any underlying distinctions between how the vehicles collect and configure their own vehicle parameters. For example, a first vehicle of a first make, model and year may have an oil temperature sensor disposed on a CAN. A requesting entity may be able to retrieve the oil temperature from the first vehicle via a first property request value that requests "oil temperature". The first property request value may then be interpreted by an apparatus, e.g., 15100 or 15400, which then generates first vehicle property data providing the oil temperature of the first vehicle to the requesting entity. A newer version of the model of the first vehicle, e.g., a second vehicle of the same make and model but of a newer year, may have an oil temperature sensor disposed on an Ethernet, and/or the oil temperature sensor may be of a completely different type and/or have a differently formatted output, as compared to the oil temperature of the first vehicle. Embodiments of the disclosure provide for the requesting entity to send a second property request, that is substantially the same as the first property request, requesting "oil temperature" to the second vehicle. The second property request may then be interpreted by an apparatus, e.g., 15100 or 15400, which then generates second vehicle property data, that may be substantially the same as the first vehicle property data, which provides the oil temperature of the second vehicle to the requesting entity.

Accordingly, referring now to FIG. 158, another method 15800 for collecting and/or managing vehicle data. The method 15800 includes interpreting 15810 a first property request value and generating 15812 first vehicle property data from a first plurality of vehicle parameter values. The method 15800 further includes interpreting 15814 a second property request value corresponding to the requested vehicle property and generating 15816 second vehicle property data from a second plurality of vehicle parameter values. The first vehicle data and the second vehicle data both corresponding to the requested vehicle property. In embodiments, generating the vehicle property data 15514 may include generating 15716 a virtual vehicle property 15618.

Turning to FIG. 159, in embodiments, the method 15800 may further include generating 15910 the first plurality of vehicle parameter values via a first vehicle sensor and a second vehicle sensor, the first vehicle sensor disposed on a first network of the first vehicle and the second vehicle sensor disposed on a second network of the first vehicle, the first network of a distinct type from the second network. The method 15800 may further include generating 15912 the second plurality of vehicle parameter values via a third vehicle sensor and a fourth vehicle sensor, the third vehicle sensor disposed on a third network of the second vehicle and the fourth vehicle sensor disposed on a fourth network of the second vehicle, the third network of a distinct type from the fourth network.

Referring now to FIG. 160, an embodiment of an apparatus 16000 for data collection policy intake and execution, in accordance with an embodiment of the disclosure, is shown. As will be explained in greater detail below, embodiments of the apparatus 16000 may provide for the intake, parsing, and/or execution of vehicle policies that control collection and/or transmission of vehicle data. Such policies may provide for the collection of specific types of vehicle data and/or specific time periods and/or conditions triggering collection of vehicle data. For example, a policy may be used to start and stop data collection based on a particular region, e.g., city, state/province, country, etc., and the applicable data privacy laws within such regions. In a non-limiting example, embodiments of the apparatus 16000 may trigger the collection and/or transmission of one or more types of vehicle data when sensors and/or controllers, onboard and/or offboard the vehicle, determine that the vehicle is in a region where collection of such types of vehicle data is permissible under applicable privacy laws. Similarly, embodiments of the apparatus 16000 may trigger the ceasing of collection and/or transmission of one or more types of vehicle data when sensors and/or controllers, onboard and/or offboard the vehicle, determine that the vehicle is in a region where collection of such types of vehicle data is prohibited under applicable privacy laws.

In another non-limiting example, embodiments of the apparatus 16000 may determine whether and/or when certain data is passively collected or actively collected. Passive data collection indicates, in certain embodiments, that a parameter for collection is available without operations of the apparatus 16000, for example where a parameter is ordinarily provided to a network zone by an end point, and observable on the network zone without a specific request or other action. Active data collection indicates, in certain embodiments, that a parameter for collection is not available, only intermittently available, and/or available but not in a fully usable manner for collection—for example the parameter is provided at an insufficient data rate, not provided continuously, and/or provided with insufficient resolution or other aspects, where the apparatus 16000 provides a request or instruction to the end point providing the actively collected data. It will be understood that a data parameter may be collected actively at a first time and/or during certain operating conditions, and collected passively at a second time and/or under other operating conditions. In certain embodiments, operations of the apparatus 16000 to collect a data parameter may be considered active for certain purposes (e.g., providing an instruction to an end point to provide the parameter and/or configure the parameter), but passive for other purposes (e.g., during periods when the end point is already configured to provide the parameter sufficient to meet the instructions, even if the instructions were absent).

Further, embodiments of the apparatus 16000 may provide for the delegation of the collection of vehicle data to various controllers disposed onboard and/or offboard a vehicle. In such embodiments, the apparatus 16000 may serve as a collection point for vehicle data gathered by the delegate controllers.

Accordingly, in embodiments, the apparatus 16000 includes a policy acquisition circuit 16010 structured to interpret a vehicle policy data value 16012 having at least a portion of a vehicle policy. The vehicle policy data value 16012 may be a text file having coded instructions therein, e.g., an XML file or other markup based format. In embodiments, the vehicle policy data value 16012 may be a data file having coded instructions therein, e.g., machine code, assembly, high level code, e.g., C, C #, Ada, and/or other suitable programing code. In embodiments, the policy data value may be a data structure, e.g., an instantiated class object having various fields and/or properties that store data effecting portions of a vehicle policy. The apparatus 16000 further includes a policy processing circuit 16014 structured to generate, in response to and based at least in part on the vehicle policy data value 16012, parsed policy data 16016 that includes one or more vehicle sub-policies of the vehicle policy. The apparatus 16000 further includes a policy execution circuit 16018 structured to collect vehicle data 16020 from one or more vehicle sensors, as described herein, in response to the parsed policy data 16016.

In embodiments, the policy execution circuit 16018 may electronically communicate with one or more sensors, actuators, and/or controllers in the vehicle. The policy execution circuit 16018 may also electronically communicate with and/or control the other circuits of the apparatus 16000, as described herein. The policy execution circuit 16018 may interpret portions of the parsed policy data 16016 and generate command values for controlling operation of actuators. For example, a portion of the parsed policy data 16016 may correspond to a sub-policy concerning a fuel timing rate of an engine of the vehicle, wherein the policy execution circuit 16018 may generate and transmit a command value that updates the fuel timing to a controller responsible for controlling the fuel timing of the engine. In embodiments, the policy execution circuit 16018 may interpret a portion of the parsed policy data 16016 corresponding to a sub-policy concerning what types of vehicle data are to be collected, the duration the vehicle data is to be collected, and whether the vehicle data is to be stored onboard the vehicle and/or transmitted offboard the vehicle. For example, in an embodiment, a sub-policy may dictate that location data of a vehicle is to be collected whenever the engine of the vehicle is being operated, and that the collected vehicle data is to be stored in a memory device onboard the vehicle as it is collected. The sub-policy may further dictate that the collected vehicle data is to be transmitted at pre-determined intervals, e.g., once a day, week, month, etc., to a database offboard the vehicle. As such, the policy execution circuit 16018 may direct circuits of the apparatus 16000, and/or of other controllers onboard the vehicle, to collect location data and store it within the onboard memory device. The policy execution circuit 16018 may then direct circuits of the apparatus 16000, and/or of other controllers onboard the vehicle, to transmit the collected location data at the pre-determined intervals to the offboard database. While the foregoing example concerned location data, other types of vehicle data are contemplated.

Turning to FIG. 161, another embodiment of an apparatus 16100 for data collection policy intake and execution, in accordance with an embodiment of the disclosure, is shown. The apparatus 16100 includes a policy acquisition circuit 16110 structured to interpret a vehicle policy data value 16112 having at least a portion of a vehicle policy. The apparatus 16100 further includes a policy processing circuit 16114 structured to generate, in response to and based at least in part on the vehicle policy data value 16112, parsed policy data 16116 that includes of one or more vehicle sub-policies of the vehicle policy. The apparatus 16100 further includes a policy execution circuit 16118 structured to collect vehicle data 16120 from one or more vehicle sensors, as described herein, in response to the parsed policy data 16116.

As shown in FIG. 161, the policy processing circuit 16114 may be further structured to determine from the vehicle policy data value 16112 a type value 16122 of the vehicle policy. Non-limiting examples of the type value 16122 include passive policy and active policy.

In embodiments, the policy execution circuit 16118 may be structured to passively collect the vehicle data 16120 in response to the type value 16122 being a passive policy. For example, the vehicle policy (or sub-policy) may indicate that a fuel efficiency of a vehicle is to be collected whenever the vehicle is being operated. In response, the policy execution circuit 16118 may direct various circuits within the apparatus 16100, and/or in other controllers onboard the vehicle, to collect and store fuel efficiency data of the vehicle while the vehicle is being operated in one or more memory devices, e.g., an onboard memory device.

In embodiments, the policy execution circuit 16118 may be structured to actively collect the vehicle data 16120 in response to the type value 16122 being an active policy. For example, the vehicle policy (or sub-policy) may indicate that vehicle alarm data, e.g., crash indictors, engine fire indicators, air bag status indicators, and/or other types of data that may not typically be collected in a passive manner, is to be collected and transmitted offboard the vehicle, e.g., to an emergency response entity when the vehicle has experienced a malfunction and/or accident, e.g., a crash.

As shown in FIG. 162, the policy execution circuit 16118 may be structured to transmit a begin collection command value 16124 to actively collect the vehicle data 16120. The begin collection command value 16124 may be transmitted to a circuit of the apparatus 16100, and/or to circuits of other controllers onboard a vehicle, and instruct them to begin collecting one or more types of vehicle data. The command value 16124 may include indicators identifying the type of vehicle data 16120 to be collected, the duration the vehicle data 16120 is to be collected, where the collected vehicle data 16120 should be transmitted to, conditions under which the vehicle data 16120 should be collected, and/or other types of instructions related to the collection, storage, and/or processing of the collected vehicle data 16120. For example, a command value 16124 may be transmitted to a controller in communications with a sensor monitoring a torque of a prime mover, wherein responsive to the command value 16124, the controller beings collecting vehicle data 16120 regarding the torque of the prime mover and transmitting the vehicle data 16120 to an onboard memory device for storage. While the foregoing example concerns torque of a prime mover, other types of controllers and/or sensors onboard the vehicle are contemplated.

As shown in FIG. 163, the policy execution circuit 16118 may be structured to generate, based at least in part on the collected vehicle data 16120, a vehicle property value 16310 to actively collect the vehicle data 16120.

As shown in FIG. 164, the policy execution circuit 16118 may be structured to transmit a query value 16410 to actively collect the vehicle data 16120. The query value 16410 may be transmitted to another controller and/or database, e.g., memory device, onboard and/or offboard, the vehicle to retrieve previously stored vehicle data which may then be transmitted by the apparatus 16100 offboard the vehicle and/or to a different memory device onboard the vehicle. In embodiments, the query value 16410 may be transmitted to a controller onboard the vehicle which then responsively transmits the requested vehicle data to the apparatus 16100 and/or to another device, e.g., a memory device onboard and/or offboard the vehicle.

Referring back to FIG. 161, the apparatus 16100 may include a memory device 16125 structured to store the collected vehicle data 16120. The memory device 16125 may include a database for storing the collected vehicle data 16120. The database may be in the form of a text file, e.g., comma separated file, a relational database, an object database, and/or any other type of suitable system for storing the collected vehicle data 16120.

The apparatus 16100 may include a converged network device (CND) 16126, as described in other portions of this disclosure, that regulates communications between a first network zone and a second network zone. As also described in other portions of this disclosure, the first network zone may have a first vehicle sensor, of the one or more vehicle sensors from which the vehicle data 16120 is collected, and the second network zone may have a second vehicle sensor, of the one or more vehicle sensors from which the vehicle data 16120 is collected. In embodiments, the first network zone and the second network zone may be of distinct types as described herein. In embodiments, the CND 16126 may provide for the apparatus 16100, and its circuits, to communicate with devices in either the first and/or the second network zones. For example, the vehicle policy value 16112 may be generated by a device in the first network zone and the vehicle data 16120 may be collected from a device in the second network zone.

In embodiments, the policy execution circuit 16118 may be structured to delegate collection of the vehicle data 16120 to one or more vehicle controllers, as described herein, via transmitting at least some of the parsed policy data 16116 to the one or more vehicle controllers. For example, in embodiments, the policy execution circuit 16118 may delegate collection of engine related vehicle data 16120 to a first controller, associated with monitoring and/or controlling an engine of a vehicle, and delegate collection of location data to a second controller, associated with monitoring a location of the vehicle. The delegate controllers may then transmit their collected vehicle data 16120 to the apparatus 16100, store the collected data 16120 in a memory device onboard the vehicle, and/or transmit their collected data 16120 offboard the vehicle. In embodiments, the policy execution circuit 16118 may provide a delegate controller with authorization, e.g., credentials, to access sensors and/or other devices for collecting the vehicle data 16120. In embodiments, the policy execution circuit 16118 may provide a delegate controller with authorization, e.g., credentials, to transmit the collected vehicle data 16120 offboard the vehicle. In embodiments, the policy execution circuit 16118 may delegate the collection of the vehicle data 16120 based on capacity of the controllers available onboard the vehicle. For example, the vehicle may have multiple climate controllers that monitor and/or regulate a particular vehicle system, e.g., climate control, and the policy execution circuit 16118 may select to delegate collection of climate data to a climate controller that has available processing capacity.

As further shown in FIG. 161, the apparatus 16100 may include a collected data acquisition circuit 16128 structured to interpret the vehicle data 16120 collected by the one or more vehicle controllers. In embodiments, the delegate controllers may transmit their collected data to the collected data acquisition circuit 16128 where the collected vehicle data 16120 is made accessible to the other circuits within the apparatus 16100.

In embodiments, the apparatus 16100 may include a collected data provisioning circuit 16130 structured to transmit the collected vehicle data 16120. The collected data provisioning circuit 16130 may be structured to communicate with and transmit the collected vehicle data 16120 to devices onboard the vehicle and/or to devices offboard the vehicle. In embodiments, the collected data provisioning circuit 16130 may format the collected vehicle data 16120 based on one or more formats of a communication channel used to transmit the collected vehicle data 16120 and/or a format used by a device to which the collected vehicle data 16120 is transmitted to. For example, the collected data provisioning circuit 16130 may package the collected vehicle data 16120 into a TCP/IP packet, or other network format, and/or compress the collected vehicle data 16120 prior to transmission.

Illustrated in FIG. 165 is a method 16500 for data collection policy intake and execution, in accordance with an embodiment of the disclosure. The method 16500 may be performed by the apparatus 16000, the apparatus 16100, and/or any other controller described herein. Accordingly, referring to FIGS. 160 and 165, in embodiments, the method 16500 includes interpreting 16510 a vehicle policy data value 16012 having at least a portion of a vehicle policy. The method 16500 further includes generating 16512, in response to and based at least in part onboard the vehicle policy data value 16012, parsed policy data 16016 that includes of one or more vehicle sub-policies of the vehicle policy. The method 16500 further includes collecting 16514 vehicle data 16020 from one or more vehicle sensors in response to the parsed policy data 16016.

Referring now to FIGS. 161 and 166, in embodiments, the method 16500 may include determining 16516, from the vehicle policy data value 16112, a type value 16122 of the vehicle policy. As such, collecting 16514 the vehicle data 16120 may include passively collecting 16610 the vehicle data 16120 in response to the type value 16122. In embodiments, collecting 16514 the vehicle data 16120 may include actively collecting 16612 the vehicle data 16120 in response to the type value 16122. Actively collecting 16612 the vehicle data 16120 may include transmitting 16614 a begin collection command value 16124 (FIG. 162).

As shown in FIG. 167, actively collecting 16612 the vehicle data 16120 may include generating 16710 a vehicle property value 16310 (FIG. 163) based at least in part on the collected vehicle data 16120.

As shown in FIG. 168, actively collecting 16612 the vehicle data 16120 may include transmitting 16810 a query value 16410 (FIG. 164).

Referring now to FIGS. 161 and 169, in embodiments, the method 16500 may include regulating communications 16910 between a first network zone and a second network zone. In embodiments, the first network zone may have a first vehicle sensor of the one or more vehicle sensors, from which the vehicle data 16120 is collected, and the second network zone may have a second vehicle sensor of the one or more vehicle sensors, from which the vehicle data 16120 is collected. In embodiments, the first network zone and the second network zone may be of distinct types. In embodiments, collecting 16514 the vehicle data 16120 may include delegating collection 16910 of the vehicle data 16120 to one or more vehicle controllers. Delegating collection 16910 of the vehicle data 16120 to one or more vehicle controllers may include transmitting 16912 at least some of the parsed policy data 16116 to the one or more vehicle controllers.

In embodiments, the method 16500 may further include interpreting 16914 the vehicle data 16120 collected by the one or more vehicle controllers.

In embodiments, the method 16500 may include transmitting 16916 the collected vehicle data 16120.

Referring now to FIG. 170, an embodiment of an apparatus 17000 for data collection in a mixed network environment, e.g., a car and/or other vehicle described herein, is provided. As shown in FIG. 170, the apparatus 17000 includes a converged network device (CND) 17010 which, as described herein and in other portions of this disclosure, may be structured to regulate communications between a first network zone having a first network endpoint and a second network zone having a second network endpoint. The endpoints may include vehicle sensors and/or other devices as described herein. A plurality of vehicle parameter values 17012 and 17014 is generated by the first and the second network endpoints. The apparatus 17000 further includes a parameter acquisition circuit 17016 structured to interpret the plurality of vehicle parameter values 17012 and 17014. The apparatus 17000 further includes a property translation circuit 17018 structured to interpret a property request value 17020 that includes at least a portion of a requested vehicle property. The apparatus 17000 further includes a parameter conditioning circuit 17022 structured to generate, in response to the property request value 17020, vehicle property data 17024 from the plurality of vehicle parameter values 17012 and 17014. As will be appreciated, the vehicle property data 17024 corresponds to the requested vehicle property.

Turning to FIG. 171, another embodiment of an apparatus 17100 for data collection in a mixed network environment, e.g., a car and/or other vehicle as described herein, is provided. Similar to the apparatus 17000 of FIG. 170, the apparatus 17100 includes a CND 17010 which, as described herein and in other portions of this disclosure, may be structured to regulate communications between a first network zone having a first network endpoint and a second network zone having a second network endpoint. The endpoints may include vehicle sensors and/or other devices as described herein that generate the plurality of vehicle parameter values 17012 and 17014. The apparatus 17100 further includes a parameter acquisition circuit 17016 structured to interpret the plurality of vehicle parameter values 17012 and 17014. The apparatus 17100 further includes a property translation circuit 17018 structured to interpret a property request value 17020 that includes at least a portion of a requested vehicle property. The apparatus 17100 further includes a parameter conditioning circuit 17022 structured to generate, in response to the property request value 17020, vehicle property data 17024 from the plurality of vehicle parameter values 17012 and 17014. As will be appreciated, the vehicle property data 17024 corresponds to the requested vehicle property.

As further shown in FIG. 171, the apparatus 17100 may include a parameter provisioning circuit 17110 structured to transmit the vehicle property data 17024. In embodiments, the first network zone and the second network zone are of distinct types, as described herein. In embodiments, the first network zone may include a controller area network (CAN), an Ethernet based network, and/or any other type of network described herein. In embodiments, the first and the second network endpoints may be vehicle sensors. In embodiments, the plurality of vehicle parameter values 17012 and 17014 directly corresponds to the requested vehicle property.

In embodiments, one or more of vehicle the parameter values 17012 and 17014 includes at least one of: a vehicle speed value; a prime mover speed value; a prime mover torque value; a user actuated vehicle feature value; or a vehicle location value. In embodiments, one or more of the plurality of vehicle parameter values 17012 and 17014 may include at least one of: a network utilization value for a network zone of the vehicle; a raw network message from a network zone of the vehicle; a network address for an endpoint on a network zone of the vehicle; a memory storage description of a controller of the vehicle; a value from an end point on a controller area network (CAN); a value from an end point on a local interconnect network (LIN); or an intermediate control value. In embodiments, the requested vehicle property may include at least one of: a component temperature value; a sensor raw value; a component speed value; or an actuator feedback value. In embodiments, the requested vehicle property may include at least one of: a drivetrain component speed value; a drive shaft speed value; a drive shaft torque value; a selected gear value; a battery state of health value; a battery state of charge value; or a battery power throughput value.

As further shown in FIG. 171, the parameter conditioning circuit 17022 may be structured to generate, in response to the property request value 17020, a virtual vehicle property value 17112 from two or more vehicle parameter values 17012 and/or 17014. In embodiments, the vehicle property data 17024 includes the virtual vehicle property value 17112.

In embodiments, the virtual vehicle property value 17112 includes at least one of: a vehicle speed value; a motive power efficiency value; an event occurrence value; or a listing of previous vehicle locations. In embodiments, the virtual vehicle property value 17112 includes at least one of: a listing of one or more user activated features; an average vehicle runtime value; or an estimated vehicle operating cost value.

In embodiments, the vehicle property data 17024 is of a different format than the plurality of vehicle parameter values 17012 and 17014.

Additionally, while embodiments of the CND 17010 facilitate communications between the apparatuses 17000 and 17100 and two onboard networks from which the vehicle parameter values 17012 and 17014 are transmitted over, it should be understood that, in embodiments, the CND 17010 may facilitate communication with one or more offboard networks, as described in other portions of this disclosure.

Illustrated in FIG. 172 is a method 17200 for data collection in a mixed network environment, e.g., a car and/or other vehicle described herein, in accordance with an embodiment of the disclosure. The method 17200 may be performed by the either embodiments of the apparatus 17000, 17100, and/or by any other apparatus and/or controller described herein. Accordingly, referring now to FIGS. 170 and 172, the method 17200 includes regulating 17210 communications between a first network zone having a first network endpoint and a second network zone having a second network endpoint, wherein a plurality of vehicle parameter values 17012 and 17014 is generated by the first and the second network endpoints. The method 17200 further includes interpreting 17212 the plurality of vehicle parameter values 17012 and 17014. The method 17200 further includes interpreting 17214 a property request value 17020 that defines, at least in part, a requested vehicle property. The method 17200 further includes generating 17216, in response to the property request value 17020, vehicle property data 17024 from the plurality of vehicle parameter values 17012 and 17014 such that the vehicle property data 17024 corresponds to the requested vehicle property.

Referring now to FIGS. 171 and 173, in embodiments, the method 17200 may include transmitting 17310 the vehicle property data 17024.

In embodiments, the first network zone and the second network zone may be of distinct types, as described herein. In embodiments, the first network zone may include a controller area network (CAN). In embodiments, the first and the second network endpoints may be vehicle sensors. In embodiments, the plurality of vehicle parameter values 17012 and 17014 may directly correspond to the requested vehicle property.

In embodiments, the method 17200 may include generating 17312, in response to the property request value 17020, a virtual vehicle property value 17112 from two or more vehicle parameter values 17012 and 17014. In embodiments, the vehicle property data 17024 includes the virtual vehicle property value 17112.

Referring now to FIG. 174, an apparatus 17400 for data collection process management, in accordance with an embodiment of the current disclosure, is shown. The apparatus 17400 includes a parameter acquisition circuit 17410 structured to interpret a vehicle parameter value 17412, and a property translation circuit 17414 structured to interpret a property request value 17416 that defines, at least in part, a requested vehicle property. While FIG. 174 depicts the parameter acquisition circuit 17410 interpreting a single vehicle parameter value 17412, it is to be understood that, in embodiments, the parameter acquisition circuit 17410 may interpret two or more vehicle parameter values 17412 (as shown in FIG. 175). The apparatus 17400 further includes a parameter conditioning circuit 17418 structured to generate, in response to the property request value 17416, modified vehicle parameter data 17420 from the vehicle parameter value 17412. As will be appreciated, the modified vehicle parameter data 17420 corresponds to the requested vehicle property. The modified vehicle parameter data 17420 may then be transmitted via a modified data provisioning circuit 17421. Transmission of the modified vehicle parameter data 17420 may be to a requesting entity, i.e., the entity that generated the property request value 17416, and/or to another entity and/or location specified by the requesting entity and/or as specified by a vehicle policy, as described herein.

As will be explained in greater detail below, embodiments of the parameter conditioning circuit 17418 generate the modified vehicle parameter data 17420 by formatting the vehicle parameter value 17412, deriving data and/or values from the vehicle parameter value 17412 (for inclusion in the modified vehicle parameter data 17420), and/or otherwise conditioning the data of the vehicle parameter value 17412 such that the modified vehicle parameter data 17420 contains data regarding the requested vehicle property that is in a desired format, e.g., a format usable and/or expected by an intended receiving device, e.g., another controller and/or storage device. In embodiments, the desired format may be based at least in part on units, network protocols, expected sampling and/or streaming rates, storage of the vehicle parameter value in a non-transitory computer readable medium, compression standards, and/or other types of formatting. Thus, embodiments of the apparatus 17400 provide for a requesting entity, i.e., the entity that generates the property request value 17416, to be agnostic with respect to the native/raw format(s) of the vehicle parameter values 17412 that are used to generate data corresponding to the requested property. Embodiments of the apparatus 17400 also provide for manufacturers of vehicles to be agnostic, when selecting onboard sensors and/or onboard communication infrastructures, to the formatting requirements of a requesting entity.

For example, the property request value 17416 may correspond to a request for an oil temperature in degrees Fahrenheit and the vehicle parameter value 17412 may be oil temperature in degrees Celsius. The parameter conditioning circuit 17418 may generate the modified vehicle parameter data 17420 by converting the parameter value 17412 to degrees Fahrenheit. In another non-limiting example, the property request value 17416 may correspond to a request for total mileage of the vehicle and the vehicle parameter value 17412 may be total kilometers of the vehicle. The parameter conditioning circuit 17418 may generate the modified vehicle parameter data 17420 by converting the parameter value 17412 to mileage. In yet another example, a requesting entity, or other entity or device intended to receive the modified vehicle parameter data 17420 may have a capacity to receive the modified vehicle parameter data 17420 that does match and/or otherwise align with a rate at which the vehicle parameters are generated onboard a vehicle. In such scenarios, embodiments of the apparatus 17400 may adjust the rate at which the modified vehicle parameter data 17420 is transmitted to meet the needs of the receiving entity and/or device. In yet another example, the modified vehicle parameter data 17420 may be destined for storage in a non-transitory computer readable medium, e.g., a memory device, that has a limited storage capacity. In such a scenario, embodiments of the apparatus 17400 may generate the modified vehicle parameter data 17420 such that the information, corresponding to the requested property, is in a compressed form. As will be appreciated, such compression may increase the amount of data regarding the requested vehicle property that can be stored and/or transmitted. In yet another non-limiting example, embodiments of the apparatus 17400 may adjust the transmission rate of the modified vehicle parameter data 17420 based on network transportation costs, e.g., cellular network bandwidth and/or data rates. In such embodiments, the apparatus 17400 may reduce the transmission rate of the modified vehicle parameter data 17420 when network transportation costs are expensive and increase the transmission rate of modified vehicle parameter data 17420 when network transportation costs are inexpensive. In yet another non-limiting example, embodiments of the apparatus 17400 may adjust the transmission rate of the modified vehicle parameter data 17420 based on available off-vehicle network bandwidth. In such embodiments, the apparatus 17400 may reduce the transmission rate of the modified vehicle parameter data 17420 when off-vehicle network bandwidth is limited, and/or otherwise "slow", and increase the transmission rate of modified vehicle parameter data 17420 when off-vehicle network bandwidth is not limited, and/or otherwise "fast".

Turning to FIG. 175, in embodiments, the parameter conditioning circuit 17418 may generate a virtual property value 17510. The virtual vehicle property value 17510 may be derived from and/or otherwise based at least in part on two or more vehicle parameter values 17412 and 17512. As shown in FIG. 175, the modified vehicle parameter data 17420 may include the virtual vehicle property value 17510.

In embodiments, the parameter conditioning circuit 17418 may include a formatting circuit 17514 structured to format the vehicle parameter value(s) 17412 and/or 17512 to a desired format of the requested vehicle property 17416 such that the modified vehicle parameter data 17420 has the desired format. Such formatting of the vehicle parameter value(s) 17412 and/or 17512 may include: packaging the vehicle parameter value(s) 17412 and/or 17512 in a network protocol, e.g., TCP/IP; transforming the vehicle parameter value(s) 17412 and/or 17512 into a desired data acquisition protocol (which may be subsequently packaged in a network protocol); compression of data; and/or other types of formatting.

In embodiments, the parameter conditioning circuit 17418 may include a unit conversion circuit 17516 structured to convert one or more units of the vehicle parameter value(s) 17412 and/or 17512 to one or more desired units of the requested vehicle property such that the modified vehicle parameter data 17420 has the desired one or more units. Non-limiting examples of unit types that may be converted include distances, time periods, temperatures, pressures, strains, rotation speeds, rotation counts, fuel efficiency, battery charge, etc.

In embodiments, the parameter conditioning circuit 17418 may include a sampling circuit 17518 structured to adjust a sampling rate of the vehicle parameter value(s) 17412 and/or 17512 to a desired sampling rate of the requested vehicle property such that the modified vehicle parameter data 17420 has the desired sampling rate. In embodiments, the sampling rate of the vehicle parameter value(s) 17412 and/or 17512 may be the rate at which the vehicle parameter value(s) 17412 and/or 17512 are generated, and the desired sampling rate of the requested vehicle property may be a rate at which the modified vehicle parameter data 17420 is transmitted. Accordingly, the sampling circuit 17518 may be structured to up-sample and/or down-sample the vehicle parameter value(s) 17412 and/or 17512.

For example, turning to FIG. 176, a non-limiting example of down-sampling the vehicle parameter value(s) is shown. In such embodiments, the sampling circuit 17518 may receive a plurality of vehicle parameter values 17610, 17612, 17614, and 17616 at a first rate $\nabla_1$, e.g., the sampling circuit 17518 may receive each of the vehicle parameter values 17610, 17612, 17614, and 17616 at subsequent time periods $t_0, t_1, t_2, t_3$, where $t_1 \approx t_0 + t_{\nabla 1}, t_2 \approx t_1 + t_{\nabla 1}$, and $t_3 \approx t_2 + t_{\nabla 1}$. The vehicle parameter values 17610, 17612, 17614, and 17616 may be from the same sensor or from different sensors. The sampling circuit 17518 may then cause the vehicle parameter values 17610, 17612, 17614, and 17616 to be transmitted out of the apparatus 17400 as modified vehicle parameter data 17618, 17620, 17622, and 17624 at a second rate $\nabla_2$, e.g., modified vehicle parameter data 17618, 17620, 17622, and 17624, respectively corresponding to the vehicle parameter values 17610, 17612, 17614, and 17616, may be respectively transmitted out of the apparatus 17400 at subsequent time periods of time $t_4, t_5, t_6, t_7$, where $t_5 \approx t_4 + t_{\nabla 2}, t_6 \approx t_5 + t_{\nabla 2}$, and $t_7 \approx t_6 + t_{\nabla 2}$. As will be appreciated, $\nabla_2$ may be larger than $\nabla_1$, e.g., where the modified vehicle parameter data is transmitted at a slower rate than the vehicle parameter values are received. In embodiments, the sampling circuit 17518 may adjust $\nabla_2$ based on information contained within the property request value 17416 and/or a vehicle policy, as described herein. In embodiments, the sampling circuit 17518 may adjust $\nabla_2$ based on off-vehicle network connection available bandwidth and/or transmission costs. For example, $\nabla_2$ may be decreased when off-vehicle network connection available bandwidth is high and/or when transmission costs are low. Conversely, $\nabla_2$ may be increased when off-vehicle network connection available bandwidth is low and/or when transmission costs are high.

In embodiments, the sampling circuit 17518 may reduce the number of modified vehicle parameter data, respectively corresponding to the vehicle parameter values, that are transmitted out of the apparatus 17400, e.g., the sampling circuit 17518 may respectively receive and/or interpret vehicle parameter values 17610, 17612, 17614, and 17616 at times $t_0, t_1, t_2, t_3$ and transmit modified vehicle parameter data 17618, and 17622 respectively at times $t_4$ and $t_6$. In such embodiments, the modified vehicle parameter data 17618 and 17622 may respectively correspond to the vehicle parameter values 17610 and 17614. In embodiments, the modified vehicle parameter data 17618 and 17622 may each correspond to two or more of the vehicle parameter values 17610, 17612, 17614, and 17616. For example, modified vehicle parameter data 17618 may be derived from, and/or otherwise be a combination of, vehicle parameter values 17610 and 17612, and modified vehicle parameter data 17622 may be derived from, and/or otherwise be a combination of, vehicle parameter values 17614 and 17616. In such embodiments, each of the modified vehicle parameter data 17618 and 17622 may be an average of the corresponding vehicle parameter values.

Turning to FIG. 177, a non-limiting example of up-sampling the vehicle parameter value(s) is shown. In such embodiments, the sampling circuit 17518 may receive a plurality of vehicle parameter values 17610, 17612, and 17614 at a first rate $\nabla_1$, e.g., the sampling circuit 17518 may receive each of the vehicle parameter values 17610, 17612, and 17614, at subsequent time periods $t_0, t_1$, and $t_2$, where $t_1 \sim$ to $+t_{\nabla 1}$, and $t_2 \sim t_1 + t_{\nabla 1}$. The parameter values 17610, 17612, and 17614 may be from the same sensor or from different sensors. The sampling circuit 17518 may then cause more modified vehicle parameter data 17710, 17712, 17714, 17716, 17718, and 17720, as compared to the vehicle parameter values received by the sampling circuit 17518, to be transmitted from the apparatus 17400 at subsequent time periods $t_3, t_4, t_5, t_6, t_7, t_8$, where $t_4 \approx t_3 + t_{\nabla 2}, t_5 \approx 4 + t_{\nabla 2}$, and $t_6 \approx t_5 + t_{\nabla 2}$, etc. As will be appreciated, $\nabla_2$ may be smaller than $\nabla_1$, i.e., the modified vehicle parameter data is transmitted at a faster rate than the vehicle parameter values are received. In embodiments, the sampling circuit 17518 may adjust $\nabla_2$ based on information contained within the property request value 17416 and/or a vehicle policy, as described herein. In embodiments, the sampling circuit 17518 may adjust $\nabla_2$ based on off-vehicle network connection available bandwidth and/or transmission costs. For example, $\nabla_2$ may be decreased when off-vehicle network connection available bandwidth is high and/or when transmission costs are low. Conversely, $\nabla_2$ may be increased when off-vehicle network connection available bandwidth is low and/or when transmission costs are high.

As show in the non-limiting example of FIG. 177, modified vehicle parameter data 17710, 17714, and 17718 may respectively correspond to vehicle parameter values 17610, 17612, and 17614, wherein modified vehicle parameter data 17712, 17716, and 17720 are additional modified vehicle parameter data inserted into the transmission sequence. In embodiments, the additional modified vehicle parameter data 17712, 17716, and 17720 may be interpolated, and/or otherwise derived, from the parameter values 17610, 17612, and/or 17614.

As will be appreciated, the insertion of the additional modified parameter data into the transmission sequence may provide for the modified vehicle parameter data to be transmitted to a receiving entity and/or device at an expected rate. Further, embodiments, wherein the additional modified parameter data is interpolated from the vehicle parameter values 17610, 17612, and/or 17614 may approximate higher resolution monitoring of the requested vehicle property.

Turning to FIG. 178, a method 17800 for data collection process management, in accordance with an embodiment of the disclosure, is shown. The method 17800 may be performed by the apparatus 17400 and/or any other apparatus and/or controller described herein. Accordingly, referring now to FIGS. 174 and 178, the method 17800 may include interpreting 17810 a vehicle parameter value 17412, interpreting 17812 a property request value 17416, and generating 17814, in response to the property request value 17416, modified vehicle parameter data 17420 from the vehicle parameter value 17412. The property request value 17416 defines, at least in part, a requested vehicle property, and the modified vehicle parameter data 17420 corresponds to the requested vehicle property.

Referring now to FIGS. 175 and 179, generating 17814 the modified vehicle parameter data 17420 includes generating 17910 a virtual vehicle property value 17510. The modified vehicle parameter data 17420 may include the virtual vehicle property value 17510. In embodiments, the virtual vehicle property value 17510 may be based at least in part two or more vehicle parameter values 17412 and 17512. In embodiments, the method 17800 may include formatting 17912 the vehicle parameter value(s) 17412 and/or 17512 to a desired format of the requested vehicle property such that the modified vehicle parameter data 17420 has the desired format. In embodiments, formatting 17912 the vehicle parameter value(s) 17412 and/or 17512 includes generating 17914 a network protocol packet structured to transport the vehicle parameter value 17412 (in the form of modified vehicle parameter data). In embodiments, formatting 17912 the vehicle parameter value(s) 17412 and/or 17512 includes modifying 17916 the vehicle parameter value(s) 17412 and/or 17512 for storage in a non-transitory computer readable medium. In embodiments, modifying 17916 the vehicle parameter value(s) 17412 and/or 17512 includes compressing 17918 the vehicle parameter value(s) 17412 and/or 17512. While FIG. 179 depicts compressing 17918 the vehicle parameter value(s) 17412 and/or 17512 as part of modifying 17916 the vehicle parameter value(s) 17412 and/or 17512 for storage in a non-transitory computer readable medium, in embodiments, compressing 17918 of the vehicle parameter value(s) 17412 and/or 17512 may be performed outside of modifying 17916 the vehicle parameter value(s) 17412 and/or 17512 for storage in a non-transitory computer readable medium.

In embodiments, the method 17800 may include converting 17919 one or more units of the vehicle parameter value(s) 17412 and/or 17512 to one or more desired units of the requested vehicle property such that the modified vehicle parameter data 17420 has the desired one or more units. Converting 17919 the units of the one or more units of the vehicle parameter value(s) 17412 and/or 17512 may be performed as part of generating 17814 the modified vehicle parameter data 17420.

In embodiments, the method 17800 may include adjusting 17920 a sampling rate of the vehicle parameter values 17412 and/or 17512 to a desired sampling rate of the requested vehicle property such that the modified vehicle parameter data 17420 has the desired sampling rate. Adjusting 17920 the sampling rate of the vehicle parameter values 17412 and/or 17512 may be performed as part of generating 17814 the modified vehicle parameter data 17420. In embodiments, adjusting 17920 the sampling rate of the vehicle parameter value(s) 17412 and/or 17512 includes up-sampling 17922 the vehicle parameter value(s) 17412 and/or 17512. In embodiments, adjusting 17920 the sampling rate of the vehicle parameter value(s) 17412 and/or 17512 may include down-sampling 17924 the vehicle parameter value.

Referring now to FIG. 180, an apparatus 18000 for data storage management, in accordance with an embodiment of the disclosure is shown. The apparatus 18000 includes: a parameter acquisition circuit 18010 structured to interpret a plurality of vehicle parameter values 18012 and 18014; a parameter conditioning circuit 18016 structured to condition the plurality of vehicle parameter values 18012 and 18014 for storage in one or more cache devices, as disclosed herein; and a parameter storage circuit 18020 structured to store the conditioned plurality of vehicle parameter values 18018 in the one or more cache devices. As will be explained in greater detail herein, embodiments of the apparatus 18000 may provide for efficient storage and/or retrieval of vehicle parameter values by transforming the vehicle parameter values into forms appropriate for storage in onboard vehicle memory caches, e.g., memory devices, transferring conditioned vehicle parameter values from onboard vehicle memory cache devices to offboard storage system and devices, e.g., network cloud-based storage system, and/or by storing some conditioned vehicle parameter values directly in onboard vehicle memory caches and storing some conditioned vehicle parameter values directly in offboard storage systems and/or devices. As also described herein, embodiments of the apparatus 18000 may dictate and/or control expiration of conditioned vehicle parameter values within onboard vehicle caches and/or offboard storage system. As will be appreciated, such data expiration control may assist in mitigating onboard vehicle caches and/or offboard storage system from becoming oversaturated, e.g., "full" with vehicle parameter values. Further, embodiments of the apparatus 18000 may provide for the storage of vehicle parameter values onboard the vehicle when off-vehicle network connections are slow and/or interrupted.

Accordingly, as illustrated in FIG. 181, in embodiments, the parameter conditioning circuit 18016 may be structured to determine a storage location value 18110, wherein the parameter storage circuit 18020 is further structured to store the conditioned plurality of vehicle parameter values 18018 in response to the storage location value 18110. For example, the storage location value 18110 may indicate that the conditioned plurality of vehicle parameter values 18018 are to be stored in one or more cache device onboard a vehicle. In embodiments, each of the one or more cache devices disposed onboard the vehicle may associated with an apparatus and/or controller, of the type disclosed herein, that is distinct from controllers associated with the other of the one or more cache devices. For example, the storage location value 18110 may indicate that conditioned vehicle parameter values 18018 corresponding to engine data of the vehicle are to be stored in a cache device associated with a vehicle engine controller for the vehicle, while also indicting that conditioned vehicle parameter values 18018 corresponding to location data are to be stored in a cache device associated with a controller charged with tracking the vehicle's location.

In embodiments, the storage location value 18110 may indicate that the conditioned plurality of vehicle parameter values 18018 are to be stored in one or more cache device offboard a vehicle, e.g., data centers operated by a vehicle manufacturer and/or third party. For example, the storage location value 18110 may indicate that conditioned vehicle parameter values 18018 corresponding to a vehicle occupant's use of a third-party application forming part of a vehicle's infotainment system are to be stored in a data center accessible by the third-party.

In embodiments, the storage location value 18110 may indicate that a first portion of the conditioned plurality of vehicle parameter values 18018 are to be stored on a first cache device of the one or more cache devices, and a second portion of the conditioned plurality of vehicle parameter values 18018 are to be stored on a second cache device of the one or more cache devices. In such embodiments, the first cache device may be disposed onboard a vehicle and the second cache device may be disposed offboard the vehicle. For example, in embodiments, the storage location value 18110 may indicate that high priority vehicle parameter values, e.g., vehicle parameter values that a receiving entity has a desire to see in an expeditious manner, are to be stored in offboard caches, while low priority vehicle parameter values, e.g., vehicle parameter values that a receiving entity does not need to see in an expeditious manner are to be stored in onboard vehicle caches.

As further shown in FIG. 181, the parameter conditioning circuit 18016 may be structured to generate an expiration value 18112 for the plurality of conditioned vehicle parameter values 18018, wherein the expiration value 18112 is structured to trigger a selective expiration of the conditioned plurality of vehicle parameter values 18018 in the one or more cache devices. The expiration value 18112 may be a time value corresponding to a period of time to store the plurality of vehicle parameter values in the one or more caches. For example, the expiration value 18112 may indicate that the conditioned plurality of vehicle parameter values 18018 should be stored for a number of days, weeks, months, years, decades, etc., before being deleted. In embodiments, the expiration value 18112 may indicate an ordering of the conditioned vehicle parameter values such that a cache operates as a queue and/or stack. For example, the vehicle parameter values may be an incremental identification values associated with individuals (or groups) of conditioned vehicle parameter values 18018, wherein receipt of a vehicle parameter value at a cache device triggers deletion of the vehicle parameter value(s) in the cache having the lowest identification value.

In embodiments, the parameter storage circuit 18020 may be further structured to transmit the expiration value 18112 to the one or more cache devices. Transmission of the expiration value 18112 may be with the conditioned vehicle parameter values 18018, e.g., the expiration value 18112 is included as part of the conditioned vehicle parameter values 18018. Transmission of the expiration value 18112 may also be separate from the conditioned vehicle parameter values 18018, e.g., the expiration value 18112 is sent as a different datagram and/or message from the conditioned vehicle parameter values 18018. In embodiments, a cache device receiving an expiration value 18112 may be charged with deleting corresponding conditioned vehicle parameter values stored within the cache device.

In embodiments, the expiration value 18112 may indicate that a stored conditioned vehicle parameter value is to be deleted upon the occurrence of a condition. For example, the expiration value 18112 may be an expiry date and the cache device may be structured to delete stored conditioned vehicle parameter values 18018 that have a timestamp that exceeds the expiry date. In embodiments, the expiration value 18112 may indicate that conditioned vehicle parameter values 18018 should be deleted upon the powering off of the vehicle. In embodiments, the expiration value 18112 may indicate that conditioned vehicle parameter values 18018 should be deleted upon the sale and/or transfer of a vehicle.

In embodiments, the parameter storage circuit 18020 may be structured to selectively expire the plurality of conditioned vehicle parameter values 18018 responsive to the expiration value 18112. For example, the parameter storage circuit 18020 may communicate with one or more caches storing the conditioned vehicle parameter values 18018 and send one or more commands that delete selected conditioned vehicle parameter values 18018 within the one or more caches.

As also shown in FIG. 181, in embodiments, the apparatus 18000 may include a policy acquisition circuit 18114 structured to interpret a vehicle policy data value 18116 that includes at least a portion of a vehicle policy, as described herein. In such embodiments, the parameter conditioning circuit 18016 may be structured to generate the expiration value 18112 responsive to the vehicle policy data value 18116. In embodiments, the vehicle policy may indicate where certain conditioned vehicle parameter values are to be stored, how long the conditioned vehicle parameter values are to be stored, and/or under what conditions the conditioned vehicle parameter values are to be deleted.

In embodiments, the parameter conditioning circuit 18016 may be structured to determine a type value 18118 of the plurality of vehicle parameter values 18012 and/or 18014, and further structured to generate the expiration value 18112 responsive to the type value 18118. Non-limiting examples of type values 18118 include engine data (e.g., data relating to an engine and/or prime mover, operating parameters for these, fault values related to these, and/or control parameters related to these); control data (e.g., data related to control operations of any component, system, end point, flow, application, or the like, including at least input control parameters, control outputs, and/or intermediate control values such as thresholds, set points, error values, and/or state values); mission critical data (e.g., data that is utilized for mission operations of the vehicle, and/or data where a delay, loss, and/or degradation of the data may result in a reduction and/or loss of mission performance capability); motive status data (e.g., data indicating a status and/or current operating condition related to motive operations of the vehicle, such as vehicle speed, location, selected gear values, motion related actuator feedback values, etc.); and/or motive operational data (e.g., data indicating a status and/or current operating condition of motive operations, such as a torque value, power throughput, active governor and/or control operation having authority, intermediate control values, etc.). Non-limiting examples of type values 18118 include a vehicle state value (e.g., an operating state such as "RUNNING", "SHUTDOWN", "IDLE", etc.; an environment parameter such as location, altitude, ambient temperature, etc.; and/or a state of a control operation such as nominal performance, derated performance, utilization of a substitute data value and/or control operation, etc.); a vehicle mode value (e.g., a control mode such as a control operation having authority for a function of the vehicle; an operation type such as motive power, power takeoff operation, idle operation, hoteling operation; and/or a special mode operation of any type such as high altitude operation, limp home operation, performance operation, economy operation, etc.); a diagnostic value (e.g., a diagnostic code, counter, status, and/or intermediate parameter, which may be related to any sensor, actuator, flow, application, end point, control operation, or the like); and/or a fault value (e.g., a fault status, counter, code, intermediate value, etc., which may be related to any sensor, actuator, flow, application, end point, control operation, or the like).

A mission, vehicle mission, or other similar terminology as used herein should be understood broadly. A mission, as utilized herein, references any one of: a primary function; an intended function; a critical function; and/or a minimum enabling function (e.g., a function required for operations to be considered normal, and/or acceptable to allow continued operation). A mission, for example of the vehicle, may depend upon the current operating condition of the vehicle and/or an intended use of the vehicle. For example, a vehicle mission may include an ability to provide motive power and/or motive operation, and may further include a performance description such as a minimum available power, torque, and/or vehicle speed (e.g., which may be the same as, or lower than, rated values for these). In another example, a mission may be an ability to provide power and/or functionality of a system of the vehicle—such as a light, communication operations, holding operations, cabin environment operations, or the like. In certain embodiments, some level of operation of the vehicle or component may be available, where the vehicle or component is not mission capable—for example where motive operation is available, but below acceptable performance characteristics for the vehicle. In certain embodiments, a mission related aspect may not affect the performance of the vehicle but nevertheless be mission critical—for example a loss of air bag function, ABS function, or the like may not prevent operation of the mission (e.g., motive operation), but nevertheless be considered mission critical for the vehicle to continue operation in an acceptable manner. It can be seen that the mission of a vehicle, component, control operation, or the like may depend on the context of the vehicle, including design considerations, purpose of the vehicle, policies and/or preferences of an entity related to the vehicle (e.g., a fleet owner, vehicle owner, regulatory authority, etc.), geographic location of the vehicle, and/or terrain position of the vehicle (e.g., current altitude, grade, road type, etc.). A data value or other feature may be a mission critical and/or mission related data value or feature on a first vehicle but not on a second vehicle, and/or at a first time for a given vehicle but not at a second time for the given vehicle. One of skill in the art, having the benefit of the present disclosure and information ordinarily available for a vehicle and components thereof, can readily determine whether a data value, control operation, component, or other element of the system is mission critical and/or mission related. Certain considerations to determine whether a data value, control operation, component, or other element of the system is mission critical and/or mission related include, without limitation: a rating of the vehicle, an intended use of the vehicle, a quality of service requirement associated with the vehicle, a warranty description of the vehicle or a component thereof, a duty cycle expected for the vehicle, a geographical operating region of the vehicle, a terrain operating region of the vehicle, regulatory requirements associated with the vehicle, and/or policy considerations associated with the vehicle.

In embodiments, the parameter conditioning circuit 18016 may be structured to condition the vehicle parameter values 18012 and/or 18014 via compressing the vehicle parameter values 18012 and/or 18014. Compression of the vehicle parameter values 18012 and/or 18014 may reduce their overall size so that more conditioned vehicle parameter values 18012 and/or 18014 may be stored in a given cache than would be possible in the absence of the compression.

In embodiments, the parameter conditioning circuit 18016 may be structured to condition the vehicle parameter values 18012 and/or 18014 via summarizing the vehicle parameter values 18012 and/or 18014. Summarizing of the vehicle parameter values 18012 and/or 18014 may include rounding and/or truncating raw values of the vehicle parameter values 18012 and/or 18014. Summarizing of the vehicle parameter values 18012 and/or 18014 may include reducing the vehicle parameter values 18012 and/or 18014 to a simpler data form. For example, vehicle parameter values 18012 and/or 18014 having lengthy floating-point numbers corresponding to engine temperature, oil temperature, rotations per minute, etc., which may be collectively summarized as a single bit, wherein '0' represents the engine is functioning optimally and where a '1' represents that the engine is not functioning optimally. Summarizing the vehicle parameter values 18012 and/or 18014 may reduce the overall memory requirements for storing the vehicle parameter values 18012 and/or 18014 in the caches.

Illustrated in FIG. 182 is a method 18200 for data storage management, in accordance with an embodiment of the disclosure. The method 18200 may be performed by the apparatus 18000 and/or by any other apparatus and/or controller described herein. Accordingly, referring now to FIGS. 180 and 182, the method 18200 includes interpreting 18210 a plurality of vehicle parameter values 18012 and/or 18014; conditioning 18212 the plurality of vehicle parameter values 18012 and/or 18014 for storage in one or more cache devices; and storing 18214 the conditioned plurality of vehicle parameter values 18018 in the one or more cache devices.

Referring now to FIGS. 181 and 183, in embodiments, the method 18200 may include determining 18310 a storage location value 18110. In such embodiments, storing 18214 the conditioned plurality of vehicle parameter values 18018 may be responsive to the storage location value 18110. In embodiments, the one or more cache devices may be disposed onboard a vehicle. In such embodiments, each of the one or more cache devices disposed onboard the vehicle may be associated with a controller that is distinct from controllers associated with the other of the one or more cache devices. In embodiments, the one or more cache devices may be disposed offboard a vehicle. In such embodiments, the one or more cache devices may based at least in part on a network cloud-based storage system.

Referring now to FIGS. 181 and 184, the method 18200 may include storing: 18410 a first portion of the conditioned plurality of vehicle parameter values 18018 on a first cache device; and storing 18412 a second portion of the conditioned plurality of vehicle parameter values 18018 on a second cache device, wherein the first cache device is disposed onboard a vehicle and the second cache device is disposed offboard the vehicle.

In embodiments, the method 18200 may include generating 18414 an expiration value 18112 for the plurality of vehicle parameter values 18012 and/or 18014 structured to trigger a selective expiration of the conditioned vehicle parameter values 18018 in the one or more cache devices.

In embodiments, the method 18200 may include transmitting 18416 the expiration value 18112 to the one or more cache devices.

As shown in FIG. 185, in embodiments, the method 18200 may include selectively expiring 18510 the plurality of conditioned vehicle parameter values 18018 responsive to the expiration value 18112. In embodiments, the expiration value 18112 may be a time value corresponding to a period of time to store the plurality of conditioned vehicle parameter values 18018 in the one or more caches.

Referring now to FIGS. 181 and 186, in embodiments, the method 18200 may include interpreting 18610 a vehicle policy data value 18116 that includes at least a portion of a vehicle policy, as described herein. In such embodiments, generating 18414 the expiration value 18112 for the plurality of conditioned vehicle parameter values 18018 is responsive to the vehicle policy data value 18116.

In embodiments, the method 18200 may include determining 18612 a type value 18118 of the plurality of vehicle parameter values 18012 and/or 18014. In such embodiments, generating 18414 the expiration value 18112 for the plurality of vehicle parameter values 18012 and/or 18014 is responsive to the type value 18118.

In embodiments, conditioning 18212 the plurality of vehicle parameter values 18012 and/or 18014 includes compressing 18614 the plurality of vehicle parameter values 18012 and/or 18014.

In embodiments, conditioning 18212 the plurality of vehicle parameter values 18012 and/or 18014 includes summarizing 18616 the plurality of vehicle parameter values 18012 and/or 18014.

With reference to FIG. 187, there is a box diagram illustrating an exemplary user device 18710 structured to receive a trigger description value 18701 from a user, output a response action value 18707 to a remote device, such as a cloud device, in response to trigger description value 18701, and receive at least one of identified vehicle data 18705 or an alert response value 18703 in response to the response action value 18707.

Response action value 18707 may be configured to identify vehicle data to be returned to the user subject to conditions. For example, a fleet operator user may wish to receive vehicle speed and location data once a vehicle ignition is turned on. Response action value 18707 may also be configured to specify an alert response value to be returned to the user subjection to conditions. A user may be a person or an entity such as a vehicle manufacturer, an original equipment manufacturer, a vehicle owner, a bodybuilder, a vehicle service department, a fleet operator, or a third-party vendor, to name but a few examples.

User device 18710 includes a vehicle event graphical user interface (GUI) 18711, a request circuit 18713, and a cloud interface 18715. Vehicle event graphical user interface 18711 is configured to interpret trigger description value 18701 from a user, trigger description value 18701 including a trigger condition. In certain embodiments, trigger description value 18701 includes a plurality of trigger conditions which must be evaluated to determine whether to capture a particular identified vehicle data value, or the plurality of trigger conditions may correspond to a plurality of values of the identified vehicle data from different data sources. In certain embodiments, the plurality of trigger conditions include a plurality of data types.

In certain embodiments, GUI 18711 is configured to display a vehicle use case template of a plurality of vehicle use case templates in response to a template selection from the user. For example, a mechanic may use a vehicle case template which displays selectable on-demand diagnostic tests to be performed on the vehicle. GUI 18711 may be configured to display a portion of a plurality of vehicle use template identifiers, where GUI 18711 determines the portion based on at least one of an authorization value and a location value. In certain embodiments, the authorization value may correspond to a user, such as an authorization level or tier granted to the user. The location value may correspond to a location of the user device, the location of the vehicle from which data will be collected, or the location of a device receiving alert response value 19005 in response to the data collection policy 19003. For example, a fleet operator may not be able to request vehicle data specified on a vehicle use template generated by a manufacturer. In another example, a manufacturer may be prohibited from collecting certain types of data depending on which jurisdiction the vehicle and/or user are currently located.

In certain embodiments, GUI 18711 is configured to display a plurality of vehicle use template identifiers and indicate a portion of the displayed plurality of vehicle user template identifiers are unavailable to the user. For example, the vehicle use case template may be unavailable based on a vehicle data collection parameter value, such as a requested data sampling frequency that the vehicle is unable to perform. In certain embodiments, GUI 18711 indicates by displaying a notification including a reason why a vehicle use case template is unavailable. In certain embodiments, GUI 18711 is configured to display a vehicle use template including a plurality of vehicle data identifiers based on an authorization value. For example, GUI 18711 may only display the vehicle use case templates that a user is authorized to use. An authorization value may indicate that a user is allowed to collect data, either trigger evaluation data or identified vehicle data, from certain data sources subject to vehicle data collection parameters. For example, an authorization value may indicate the user may collect vehicle speed, but only at a rate less than one sample per second. Therefore, the user would not be authorized to use a vehicle use case template where vehicle speed is collected at a sampling rate greater than one sample per second.

Request circuit 18713 is configured to determine a response action value in response to the trigger description value, the response action value including at least one of a vehicle data identifier configured to identify vehicle data to be captured in response to the trigger condition or an alert execution description to be transmitted in response to the trigger condition.

In certain embodiments, request circuit 18713 is configured to reject the trigger description value in response to the vehicle data collection parameter value and notify the user. For example, the trigger description value may be rejected where the corresponding vehicle data is already being collected. In another example, the trigger description value may be rejected when the vehicle is unable to collect the data specified by the trigger description.

Cloud interface 18715 is configured to receive at least one of at least a portion of the identified vehicle data or an alert response value determined in response to the alert execution description after transmitting the response action value 18707 to a remote device, such as a cloud device. It shall be appreciated that any or all of the foregoing features of user device 18700 may also be present in the other user devices disclosed herein.

With reference to FIG. 188, there is illustrated an exemplary user device-based vehicle data collection process 18800. Process 18800 may be implemented in whole or in part in one or more of the user devices disclosed herein. It shall be further appreciated that variations of and modifications to process 18800 are contemplated including, for example, the omission of one or more aspects of process 18800, the addition of further conditionals and operations, or the reorganization or separation of operations and conditionals into separate processes.

Process 18800 begins at operation 18801 including operating a user device including a vehicle graphical user interface, a request circuit, and a cloud interface. Process 18800 proceeds to operation 18803 where the user device interprets a trigger description value from a user, the trigger description value including a trigger condition. Process 18800 proceeds to operation 18805 where the user device determines a response action value in response to the trigger description value, the response action value including at least one of a vehicle data identifier configured to identify vehicle data to be captured in response to the trigger condition or an alert execution description to be transmitted in response to the trigger condition. Process 18800 proceeds to operation 18807 where the user device receives at least one of at least a portion of the identified vehicle data or an alert response value determined in response to the alert execution description. It shall be appreciated that any or all of the foregoing features of exemplary process 18800 may also be present in the other processes disclosed herein, such as the process illustrated in FIG. 189, to name but one example.

With reference to FIG. 189, there is illustrated an exemplary user device-based vehicle data collection process 18900. Process 18900 may be implemented in whole or in part in one or more of the user devices disclosed herein. It shall be further appreciated that variations of and modifications to process 18900 are contemplated including, for example, the omission of one or more aspects of process 18900, the addition of further conditionals and operations, or the reorganization or separation of operations and conditionals into separate processes.

Process 18900 begins at operation 18901 including operating a user device. Process 18900 proceeds to operation 18903 where the user device displays a vehicle use case template. Operation 18903 may include displaying a portion of a plurality of vehicle use template identifiers and displaying a vehicle use case template of a plurality of vehicle use case templates in response to a template selection. Operation 18903 may include displaying a plurality of vehicle use template identifiers and indicating a portion of the plurality of vehicle user template identifiers are unavailable based on a vehicle data collection parameter value, wherein the vehicle data collection parameter value indicates the identified vehicle data cannot be capture by a vehicle. Operation 18903 may include displaying a vehicle use case template including a plurality of vehicle data identifiers based on an authorization value.

Process 18900 proceeds to operation 18905 where the user device interprets a trigger description value from a user. Process 18900 proceeds to operation 18907 where the user device determines a response action value in response to the trigger description value. Operation 18907 may include rejecting the trigger description value in response to a vehicle data collection parameter value, and receiving an updated trigger description value from the user. Process 18900 proceeds to operation 18909 where the user device receives at least one of at least a portion of the identified vehicle data or an alert response value determined in response to the alert execution description. It shall be appreciated that any or all of the foregoing features of exemplary process 18900 may also be present in the other processes disclosed herein, such as the process illustrated in FIG. 188, to name but one example.

With reference to FIG. 190, there is illustrated a cloud system 19010 including cloud devices 19020 and 19030. Cloud system 19010 is structured to receive response action values 19001 from one or more user devices such as such as user device 18710 of FIG. 187, output a data collection policy 19003 to a vehicle, such as vehicle 19610 of FIG. 196, and receive at least one of an alert response value 19005 or identified vehicle data 19007 in response to data collection policy 19003.

Cloud device 19020 includes a request interface 19021, a policy creator circuit 19022, a cloud interface 19023, a template storage circuit 19024, a validation circuit 19025, and an authorization circuit 19026.

Request interface 19021 is configured to interpret a plurality of response action values. Request interface 19021 may be structured to communicate with a plurality of user devices.

Policy creator circuit 19022 is configured to determine data collection policy 19003 in response to one or more response action values. Data collection policy 19003 may include a vehicle data identifier configured to identify vehicle data to be captured, a trigger evaluation data identifier configured to identify trigger evaluation data, and a trigger condition to be evaluated in response to the identified trigger evaluation data. In certain embodiments, determining data collection policy 19003 includes mapping the vehicle data identifier to a data source of the vehicle. For example, when one of the response action values 19001 requests vehicle speed, policy creator circuit 19022 determines a source of vehicle data that observes vehicle speed and includes the identifier corresponding to the vehicle data in data collection policy 19003. In another example, data collection policy 19003 may combine vehicle data from multiple sources to form a virtual data source, and map the vehicle data identifier to the virtual data source.

In certain embodiments, the plurality of response action values 19001 includes a plurality of evaluation collection parameter values each corresponding to trigger evaluation data from a common vehicle data source. Policy creator circuit 19022 is configured to determine an evaluation collection parameter value for the data collection policy in response to the response to the plurality of evaluation collection parameter values. For example, the plurality of evaluation collection parameter values may be plurality of different frequencies and the evaluation collection parameter value of data collection policy 19003 specifies a single frequency to collect vehicle data which will satisfy the frequencies required by the response action values.

Data collection policy 19003 is configured to define a data collection procedure implemented by the vehicle. Data collection policy 19003 includes one or more trigger policies, each trigger policy including one or more triggers, each trigger including a trigger condition. According to data collection policy 19003, the vehicle collects trigger evaluation data to evaluate the trigger conditions of data collection policy 19003. The vehicle may also collect identified vehicle data from sources subject to data collection parameters, such as frequency, defined by data collection policy 19003. The data capture time window of the identified vehicle data to be collected is determined by evaluating triggers of data collection policy 19003. For example, data collection policy 19003 may cause the vehicle to start transmitting a location of the vehicle once the ignition of the vehicle is turned on and the vehicle enters a geofence, and stop transmitting the location once the ignition is turned off Data collection policy 19003 may include a plurality of trigger types. A trigger may include a trigger identifier, a trigger type identifier, and a trigger condition. A trigger may also include additional fields. The trigger identifier is a globally unique identifier configured to identify the corresponding trigger in order to distinguish the corresponding trigger from other triggers. The trigger type identifier is configured to identify the type of the trigger. For example, the trigger type identifier may be a value which identifies the trigger as a signal trigger, a vehicle status trigger, a timing trigger, a schedule trigger, or a geofence trigger, an environment trigger, a user input trigger, or an error trigger, to name but a few examples.

The trigger condition is either satisfied or unsatisfied, also known as true or false, and the evaluation of the trigger produces a Boolean result indicating whether the trigger condition is satisfied. The trigger condition may include one or more fields of the trigger.

In certain embodiments, a trigger condition is configured as a comparison expression, where a key and a value are compared. The key and value may be compared using one of a plurality of comparators, such as greater than, less than, equal to, greater than or equal to, less then or equal to, or not equal to, to name but a few examples. The key is based on trigger evaluation data interpreted by a data collection controller of the vehicle. For example, a trigger condition may be used to determine whether a vehicle speed is greater than 5 mph, where the vehicle speed collected from the vehicle is the key and five is the value. In certain embodiments, the key is a derivative or antiderivative of the trigger evaluation data. In certain embodiments, the key is a sum of the trigger evaluation data.

In certain embodiments, the trigger condition is configured as a change-to expression, where a previous value of a key, a current value of a key, and a preset value are compared. The trigger condition is satisfied if the current value of the key is equal to the preset value and if the previous value of the key was not equal to the preset value. For example, a trigger condition change-to expression may be satisfied upon determining the vehicle has started, but then is unsatisfied at a future trigger condition evaluation, even though the vehicle is still in operation.

The plurality of triggers may include a signal trigger. The data collection controller uses a signal trigger to collect data based on a value of a signal generated by the vehicle. The signal trigger includes a signal identifier configured to identify a single signal including a value, the signal being transmitted on one of the communication channels of the vehicle. The signal identifier includes a name of the signal unique across all communication channels of the vehicle. In certain embodiments, the name of the signal is based on a CAN database and an Ethernet database. The signal trigger includes a condition of the trigger which is determined to be satisfied based on evaluating an expression using the identified signal. In certain embodiments, a signal trigger condition may be evaluated to determine if the value of the identified signal satisfies a comparison expression or a change-to expression. For example, a signal trigger condition may be satisfied if the value of the identified signal changes from a previous value to a preset value indicating an ABS warning light has been turned on. In another example, a signal trigger condition may be satisfied when the value of the identified signal makes a comparison expression true, such as where a signal value is five and the expression is the signal value being greater than three.

The plurality of triggers may include a vehicle status trigger. The data collection controller uses a vehicle status trigger to collect data based on a vehicle status of the vehicle. The vehicle status trigger includes a vehicle status identifier configured to identify a vehicle status of the vehicle. For example, a vehicle status identifier may identify an accessory mode status, or one of a plurality of ignition position statuses. The vehicle status trigger includes a condition that is satisfied based on the vehicle status corresponding to the vehicle status identifier. For example, the condition may be satisfied where the vehicle status identifier corresponds to an accessory mode, the condition is that the accessory mode is on, and data collection controller determines that the accessory mode of the vehicle is indeed turned on.

The plurality of triggers may include a timing trigger. The data collection controller uses a timing trigger to collect data based on a time occurring after a discrete event. The timing trigger includes a discrete event identifier and a condition including a delay value. The discrete event identifier is configured to identify a discrete event of the vehicle, such as an engine start, to name but one example. The delay value includes a time duration, such as a number of milliseconds, to name but one example. The condition is satisfied after the time duration is completed following the discrete event, the timing trigger outputs a value indicating the timing trigger has been satisfied. For example, if the timing trigger includes a discrete event identifier for vehicle startup and a delay value of 5000 milliseconds, the condition of the timing trigger will be satisfied 5000 milliseconds after the data collector controller determines the vehicle startup has occurred.

The plurality of triggers may include a schedule trigger. The data collection controller uses a schedule trigger to collect data based on a schedule. The schedule trigger includes a condition satisfied at one or more times. The condition may include a plurality of fields, such as minutes, hours, days of the week, days of the month, months, and years, to name but a few examples. In certain embodiments, each unpopulated field of the plurality of fields corresponds to a repeated time that will satisfy the trigger. For example, with a condition including an hours field populated by 12, a minutes field populated by 0, and a days of the week field populated with Sunday, the trigger would be satisfied at 12:00 pm on Sunday for every Sunday of every month of every year. In certain embodiments, the schedule trigger includes a missed schedule field configured to indicate if the last schedule data collection was missed. If missed, the condition of the schedule trigger is satisfied, causing data collection to occur immediately rather than at the next scheduled time.

The plurality of triggers may include a geofence trigger. The data collection controller uses a geofence trigger to collect data based on a geofence. The geofence trigger includes a trigger identifier, an event field, and an area field. The event field includes a value corresponding to entering the area, being inside the area, being outside the area, or leaving the area. This area field may include coordinates defining boundaries of a geographical area. In certain embodiments, the area field includes longitude and latitude coordinates of a first position and launch two and latitude coordinates of a second position, the first and second location corresponding to opposite corners of a rectangular geographical area. The condition of the geofence trigger is satisfied when the vehicle completes the event relative to the area. For example, a geofence trigger may include an event field value corresponding to all being inside a rectangular geographic area. The condition is satisfied by determining the longitude of the vehicle is between the longitudes of the first and second positions of the area and between the latitudes of the first and second position of the area.

The plurality of triggers may include an error trigger. The data collection controller uses an error trigger to collect data based on error messages generated by the vehicle. For example, the trigger condition may specify a low oil pressure warning such that the trigger condition is satisfied when the low oil pressure warning is activated.

The plurality of triggers may include an environment trigger. The data collection controller uses an environment trigger to collect data based on an environmental parameter. For example, the trigger condition may specify an ambient temperature such that the trigger condition is satisfied when an ambient temperature exceeds a preset value.

The plurality of triggers may include a user input trigger. The data collection controller uses a user input trigger to collect data based on input received from a user. For example, the trigger condition may specific a signal from a button within the vehicle such that the trigger condition is satisfied when the button is pushed.

The trigger policies of data collection policy 19003 define which triggers are evaluated to determine a trigger event occurrence and which triggers are evaluated to determine a trigger event termination. A trigger policy may include a trigger identifier, a trigger type identifier, and a condition. A trigger policy may also include additional fields. The trigger identifier is a globally unique identifier configured to identify the corresponding trigger in order to distinguish the corresponding trigger from other triggers. The trigger type identifier is configured to identify the type of the trigger. For example, the trigger type identifier may be a value which identifies the trigger as a signal trigger, a vehicle status trigger, a timing trigger, a schedule trigger, a geofence trigger, an error trigger, an environment trigger, or a user input trigger, to name but a few examples. In certain embodiment, the trigger event termination is not determined by a trigger, but instead by a max start value, indicating a number of times the start trigger conditions can be true before the trigger should be disabled.

Data collection policy 19003 identifies vehicle data to be captured in response to each trigger policy of data collection policy 19003. Alternatively, data collection policy 19003 specifies an alert response value to be sent in response to one or more trigger policies of data collection policy 19003. Data collection policy 19003 also identifies the trigger evaluation data, which is the data required to be collected into order to evaluate the trigger conditions of data collection policy 19003. Data collection policy 19003 may cause multiple types of data to be captured and transmitted from the vehicle, and may require multiple types of data to be collected for trigger evaluation data.

Cloud interface 19023 is configured to communicate with cloud interface 19033 of cloud device 19030 and may be configured to receive identified vehicle data 19007 in response to data collection policy 19003, or an alert response value 19005 in response to data collection policy 19003.

Template storage circuit 19024 is configured to store a plurality of vehicle use case templates. In response to a request from a user device, template storage circuit 19024 may provide a requested template. In certain embodiments, template storage circuit 19024 only provides a requested template after determining the user is authorized to view the template based on an authorization value or based on a location of the vehicle or the user device.

Validation circuit 19025 is configured to determine a vehicle is capable of capturing data requested by the user and is configured to reject one of the response action values 19001. In certain embodiments, validation circuit 19025 is configured to reject one of the plurality of response action values 19001 in response to determining an execution parameter value. Validation circuit 19025 determines the execution parameter value by determining the vehicle data identified by the rejected response action value cannot be captured by a vehicle.

Authorization circuit 19026 is configured to tag a data collection policy in response to an authorization value. The authorization value indicates a user requesting one of the plurality of response action values 19001 is not authorized to receive the identified vehicle data 19007. For example, a manufacturer may request camera data from a vehicle, but the request will be tagged if the vehicle owner has not yet given authorization to the manufacturer. In this way, the camera data may still be captured and returned to cloud, but the manufacturer will not have access to the camera data until the vehicle owner grants authorization.

Cloud device 19030 includes a vehicle data storage circuit 19031, a cloud interface 19033, and a vehicle data query circuit 19027. Vehicle data storage circuit 19031 is configured to store the identified vehicle data received from a vehicle, in response to data collection policy 19003. In certain embodiments, identified vehicle data 19007 is encrypted while stored with vehicle data storage circuit 19031 such that cloud device 19030 is not configured to decrypt the identified vehicle data 19007 stored with the vehicle data storage circuit 19031. In this way, a cyber attacker who achieves access to the stored identified vehicle data 19007 will not have the means to decrypt the data, while a cyber attacker who achieves access to cloud device 19020 will also not gain access to the identified vehicle data 19007.

Cloud interface 19033 is configured to configured to provide the identified vehicle data to cloud interface 19023 in response to a vehicle data request from a vehicle data query circuit 19027 of cloud device 19020. In response to a vehicle data request, cloud device 19030 may search metadata corresponding to the identified vehicle data stored in vehicle data storage circuit 19031. It shall be appreciated that any or all of the foregoing features of cloud system 19010 may also be present in the other cloud systems disclosed herein. It shall be appreciated that any or all of the foregoing features of cloud system 19010 may also be present in the other embodiments disclosed herein. It shall be appreciated that any or all of the foregoing features of data collection policy 19003 may be present in any other embodiment disclosed herein.

Figure 191:
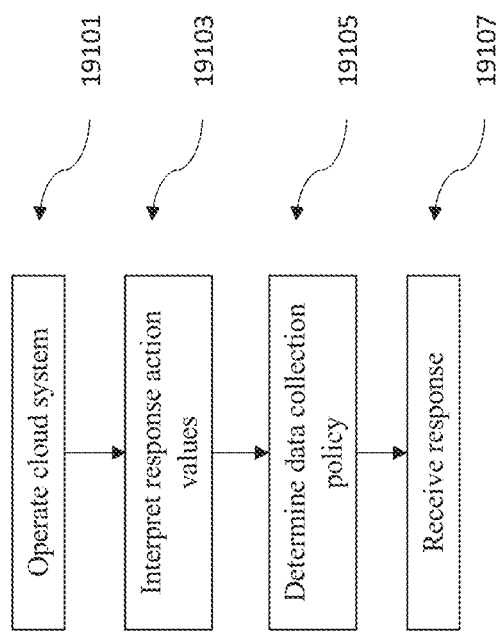

With reference to FIG. 191, there is illustrated an exemplary cloud system-based vehicle data collection process 19100. Process 19100 may be implemented in whole or in part in one or more of the cloud systems disclosed herein. It shall be further appreciated that variations of and modifications to process 19100 are contemplated including, for example, the omission of one or more aspects of process 19100, the addition of further conditionals and operations, or the reorganization or separation of operations and conditionals into separate processes.

Process 19100 begins at operation 19101 including operating a cloud system including a request interface, a policy creator circuit, and a cloud interface. Process 19100 proceeds to operation 19103 where the cloud system interprets a plurality of response action values. Process 19100 proceeds to operation 19105 where the cloud system determines a data collection policy in response to the plurality of response action values, the data collection policy including a vehicle data identifier, a trigger evaluation data identifier configured to identify trigger evaluation data, and a trigger condition to be evaluated in response to the identified trigger evaluation data. Process 19100 proceeds to operation 19107 where the cloud system receives at least one of at least a portion of identified vehicle data in response to the data collection policy, or an alert response value in response to the data collection policy. It shall be appreciated that any or all of the foregoing features of exemplary process 19100 may also be present in the other processes disclosed herein, such as processes illustrated in FIGS. 192-195, to name but a few examples.

Figure 192:
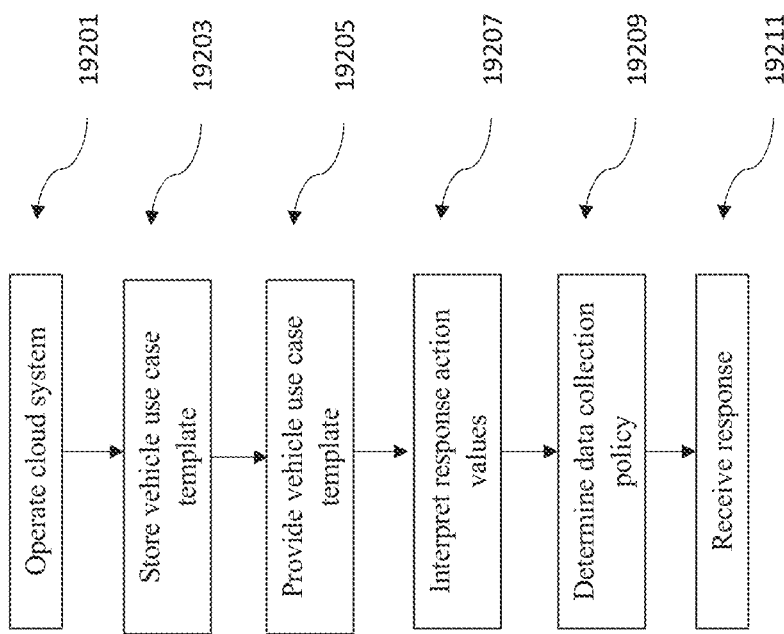

With reference to FIG. 192, there is illustrated an exemplary cloud system-based vehicle data collection process 19200. Process 19200 may be implemented in whole or in part in one or more of the cloud systems disclosed herein. It shall be further appreciated that variations of and modifications to process 19200 are contemplated including, for example, the omission of one or more aspects of process 19200, the addition of further conditionals and operations, or the reorganization or separation of operations and conditionals into separate processes.

Process 19200 begins at operation 19201 including operating a cloud system including first cloud device including a request interface, a policy creator circuit, and a cloud interface, and a second cloud device. Process 19200 proceeds to operation 19203 where the first cloud device stores a plurality of vehicle use case templates. Process 19200 proceeds to operation 19205 where the first cloud device is configured to provide one of the plurality of vehicle use case templates in response to a user device request and at least one of an authorization value or a location value. Process 19200 proceeds to operation 19207 where the first cloud device interprets a plurality of response action values. Process 19200 proceeds to operation 19209 where the first cloud device determines a data collection policy in response to the plurality of response action values, the data collection policy including a vehicle data identifier, a trigger evaluation data identifier configured to identify trigger evaluation data, and a trigger condition to be evaluated in response to the identified trigger evaluation data. Process 19200 proceeds to operation 19211 where the second cloud device receives at least one of at least a portion of identified vehicle data in response to the data collection policy, or an alert response value in response to the data collection policy. It shall be appreciated that any or all of the foregoing features of exemplary process 19200 may also be present in the other processes disclosed herein, such as processes illustrated in FIGS. 191 and 193-195, to name but a few examples.

Figure 193:
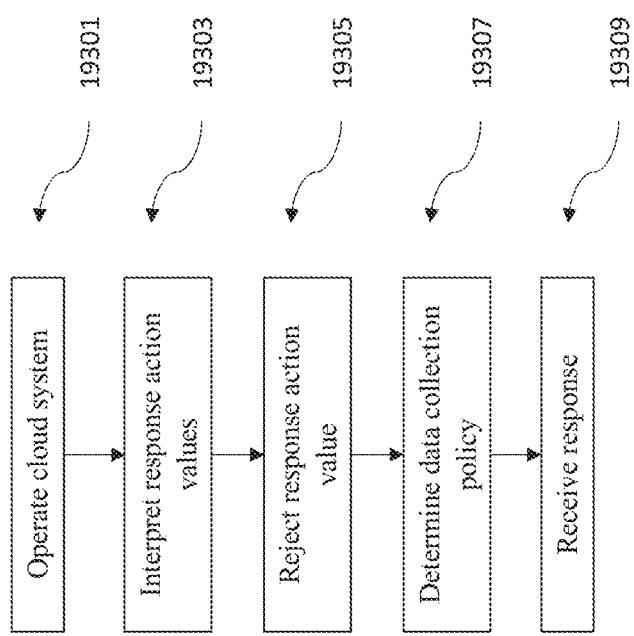

With reference to FIG. 193, there is illustrated an exemplary cloud system-based vehicle data collection process 19300. Process 19300 may be implemented in whole or in part in one or more of the cloud systems disclosed herein. It shall be further appreciated that variations of and modifications to process 19300 are contemplated including, for example, the omission of one or more aspects of process 19300, the addition of further conditionals and operations, or the reorganization or separation of operations and conditionals into separate processes.

Process 19300 begins at operation 19301 including operating a cloud system including a request interface, a policy creator circuit, a validation circuit, and a cloud interface. Process 19300 proceeds to operation 19303 where the cloud system interprets a plurality of response action values. Process 19300 proceeds to operation 19305 where the cloud system rejects one of the plurality of response action values in response to determining an execution parameter value. Process 19300 proceeds to operation 19307 where the cloud system determines a data collection policy in response to the plurality of response action values, the data collection policy including a vehicle data identifier, a trigger evaluation data identifier configured to identify trigger evaluation data, and a trigger condition to be evaluated in response to the identified trigger evaluation data. Process 19300 proceeds to operation 19309 where the cloud system receives at least one of at least a portion of identified vehicle data in response to the data collection policy, or an alert response value in response to the data collection policy. It shall be appreciated that any or all of the foregoing features of exemplary process 19200 may also be present in the other processes disclosed herein, such as processes illustrated in FIGS. 191-192 and 194-195, to name but a few examples.

Figure 194:
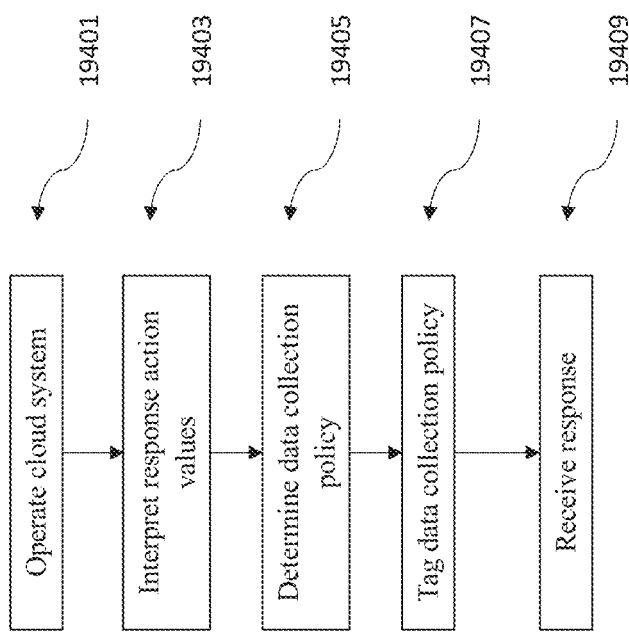

With reference to FIG. 194, there is illustrated an exemplary cloud system-based vehicle data collection process 19400. Process 19400 may be implemented in whole or in part in one or more of the cloud systems disclosed herein. It shall be further appreciated that variations of and modifications to process 19400 are contemplated including, for example, the omission of one or more aspects of process 19400, the addition of further conditionals and operations, or the reorganization or separation of operations and conditionals into separate processes.

Process 19400 begins at operation 19401 including operating a cloud system including a request interface, a policy creator circuit, an authorization circuit, and a cloud interface. Process 19400 proceeds to operation 19403 where the cloud system interprets a plurality of response action values. Process 19400 proceeds to operation 19405 where the cloud system determines a data collection policy in response to the plurality of response action values, the data collection policy including a vehicle data identifier, a trigger evaluation data identifier configured to identify trigger evaluation data, and a trigger condition to be evaluated in response to the identified trigger evaluation data. Process 19400 proceeds to operation 19407 where the cloud system tags a data collection policy in response to an authorization value, wherein the authorization value indicates a source of one of the plurality of response action values is not authorized to receive the identified vehicle data. Process 19400 proceeds to operation 19409 where the cloud system receives at least one of at least a portion of identified vehicle data in response to the data collection policy, or an alert response value in response to the data collection policy. It shall be appreciated that any or all of the foregoing features of exemplary process 19400 may also be present in the other processes disclosed herein, such as processes illustrated in FIGS. 191-193 and 195, to name but a few examples.

Figure 195:
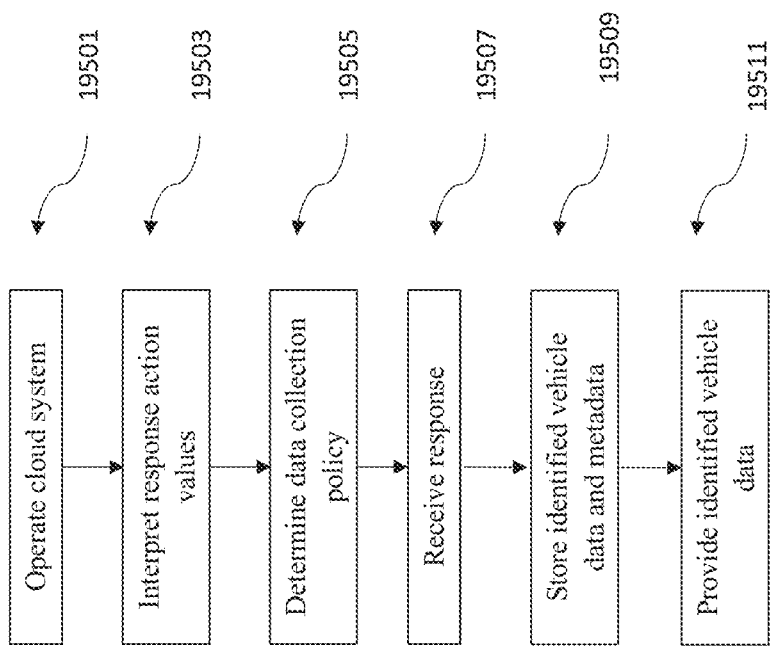

With reference to FIG. 195, there is illustrated an exemplary cloud system-based vehicle data collection process 19500. Process 19500 may be implemented in whole or in part in one or more of the cloud systems disclosed herein. It shall be further appreciated that variations of and modifications to process 19500 are contemplated including, for example, the omission of one or more aspects of process 19500, the addition of further conditionals and operations, or the reorganization or separation of operations and conditionals into separate processes.

Process 19500 begins at operation 19501 including operating a cloud system including a first cloud device and a second cloud device. Process 19500 proceeds to operation 19503 where the first cloud device interprets a plurality of response action values. Process 19500 proceeds to operation 19505 where the first cloud device determines a data collection policy in response to the plurality of response action values, the data collection policy including a vehicle data identifier, a trigger evaluation data identifier configured to identify trigger evaluation data, and a trigger condition to be evaluated in response to the identified trigger evaluation data. Process 19500 proceeds to operation 19511 where the second cloud device receives identified vehicle data in response to the data collection policy. Process 19500 proceeds to operation 19505 where the second cloud device stores identified vehicle data and metadata corresponding to the identified vehicle data. Process 19500 proceeds to operation 19505 where the second cloud device provides identified vehicle data to the first cloud device in response to a request from the first cloud device. Process 19500 proceeds to operation 19507 where the cloud system interprets a plurality of response action values.

With reference to FIG. 196, there is illustrated an exemplary vehicle 19610 including an exemplary vehicle communication system 19620 structured to receive a data collection policy 19601, determine data collection policy 19601 is valid and authorized, reconfigure the vehicle communication system 19620 to collect trigger evaluation data and potentially identified vehicle data 19605 defined by data collection policy 19601, and output at least one of an alert response value 19603 or identified vehicle data 19605 in response to data collection policy 19601.

Vehicle communication system 19620 includes a cloud interface 19621, a policy update circuit 19622, a trigger evaluation circuit 19623, a policy manager circuit 19624, and a transmission circuit 19625.

Cloud interface 19621 is configured to interpret data collection policy 19601 from a remote device, such as a cloud device. Data collection policy 19601 may include a trigger evaluation data identifier configured to identify trigger evaluation data to be collected according to a vehicle data collection parameter, the trigger evaluation data being the data required to evaluate the trigger condition(s) of data collection policy 19601. For example, data collection policy 19601 may identify vehicle speed as the trigger evaluation data, a sampling frequency as the data collection parameter, and the vehicle speed exceeding 80 mph as the trigger condition.

Policy update circuit 19622 is configured to determine whether the vehicle can perform the operations required by the data collection policy 19601. Policy update circuit 19622 may determine a collection validation value in response to the identified trigger evaluation data and a vehicle data collection parameter. The collection validation value may indicate whether the vehicle is structured to provide the trigger evaluation data or identified vehicle data. For example, if the vehicle data collection parameter includes a sampling frequency that is too high to be performed by the vehicle, the collection validation value will indicate the vehicle cannot perform data collection policy 19601.

In certain embodiments, policy update circuit 19622 is configured to determine an authorization status of data collection policy 19601. The authorization status may be determined based on an authorization value of a user requesting information from the vehicle. For example, policy update circuit 19622 may determine a manufacturer, having an authorization value, requesting vehicle data is authorized to receive the vehicle data captured in response to data collection policy 19601. In another example, policy update circuit 19622 may determine an authorization status indicating certain vehicle data may be collected based on the location of the vehicle, the location of the user requesting the data, or the location of the intermediary devices transmitting vehicle data from the vehicle to the user. In certain embodiments, the authorization value may be used to determine authorization to collect a certain vehicle data according to a corresponding data parameter. For example, a vehicle owner's authorization value may indicate authorization to collect vehicle speed, but not at a sampling rate greater than 1 Hz. In certain embodiments, policy update circuit 19622 determines a change in the authorization status of data collection policy 19601 and causes the vehicle to stop executing data collection policy 19601. For example, the execution may be stopped in response to at least one of an updated authorization value or an updated location value.

Trigger evaluation circuit 19623 is configured to evaluate the trigger conditions of data collection policy 19601 in response to the collection validation value and/or the authorization status. For example, trigger evaluation circuit 19623 may only receive the trigger conditions if the policy update circuit 19622 determines data collection policy 19601 is authorized and/or valid.

Policy manager circuit 19624 is configured to parse data collection policy 19601 in response to the collection validation value and/or the authorization status. Policy manager circuit 19624 distributes the parsed data collection policy effective to reconfigure the vehicle for collecting data according to data collection policy 19601. In certain embodiments, policy manager circuit 19624 is configured to encrypt data collection policy 19601 and replace a previous data collection policy with data collection policy 19601 in response to the collection validation value indicating data collection policy 19601 is valid and/or the authorization status indicating data collection policy 19601 is authorized.

Transmission circuit 19625 is configured to provide identified vehicle data 19605 or an alert response value in response to a trigger event occurrence determined by trigger evaluation circuit 19623. Transmission circuit 19625 may communicate with the remote device which transmitted data collection policy 19601 or another device, such as a user device. The alert response value may include at least one of: an alert criterion, an alert type, an alert content, and an alert location. It shall be appreciated that any or all of the foregoing features of vehicle 19610 may also be present in the other vehicles disclosed herein.

Figure 197:
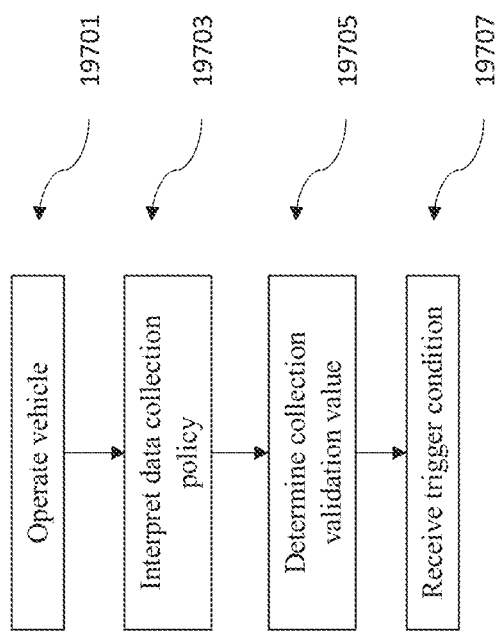

With reference to FIG. 197, there is illustrated an exemplary vehicle-based vehicle data collection process 19700. Process 19700 may be implemented in whole or in part in one or more of the vehicles disclosed herein. It shall be further appreciated that variations of and modifications to process 19700 are contemplated including, for example, the omission of one or more aspects of process 19700, the addition of further conditionals and operations, or the reorganization or separation of operations and conditionals into separate processes.

Process 19700 begins at operation 19701 including operating a vehicle including a cloud interface, a policy update circuit, and a trigger evaluation circuit. Process 19700 proceeds to operation 19703 where the vehicle interprets a data collection policy from a remote device, the data collection policy including a trigger evaluation data identifier configured to identify trigger evaluation data to be evaluated in response to a trigger condition. Process 19700 proceeds to operation 19705 where the vehicle determines a collection validation value in response to the identified trigger evaluation data and a vehicle data collection parameter. Process 19700 proceeds to operation 19707 where the trigger evaluation circuit receives the trigger condition in response to the collection validation value. It shall be appreciated that any or all of the foregoing features of exemplary process 19700 may also be present in the other processes disclosed herein, such as processes illustrated in FIGS. 198-200, to name but a few examples.

Figure 198:
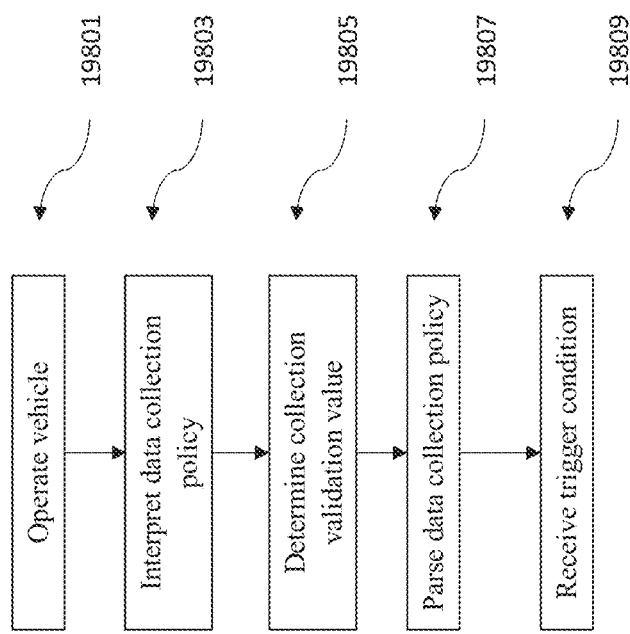

With reference to FIG. 198, there is illustrated an exemplary vehicle-based vehicle data collection process 19800. Process 19800 may be implemented in whole or in part in one or more of the vehicles disclosed herein. It shall be further appreciated that variations of and modifications to process 19800 are contemplated including, for example, the omission of one or more aspects of process 19800, the addition of further conditionals and operations, or the reorganization or separation of operations and conditionals into separate processes.

Process 19800 begins at operation 19801 including operating a vehicle including a cloud interface, a policy update circuit, and a trigger evaluation circuit. Process 19800 proceeds to operation 19803 where the vehicle interprets a data collection policy from a remote device, the data collection policy including a trigger evaluation data identifier configured to identify trigger evaluation data to be evaluated in response to a trigger condition. Process 19800 proceeds to operation 19805 where the vehicle determines a collection validation value in response to the identified trigger evaluation data and a vehicle data collection parameter. Process 19800 proceeds to operation 19807 where the vehicle parses the data collection policy in response to the collection validation value. Process 19800 proceeds to operation 19809 where the trigger evaluation receives the trigger condition in response to the collection validation value. It shall be appreciated that any or all of the foregoing features of exemplary process 19800 may also be present in the other processes disclosed herein, such as the processes illustrated in FIGS. 197 and 199-200, to name but a few examples.

Figure 199:
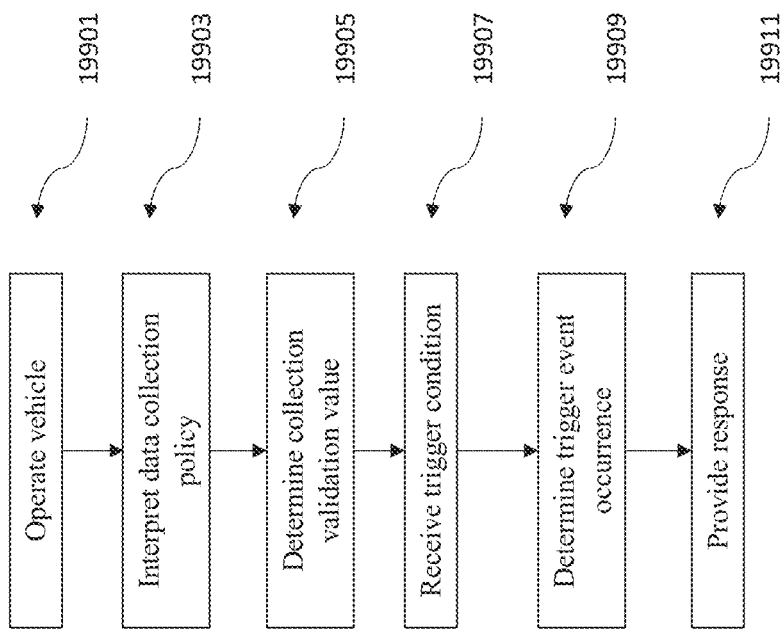

With reference to FIG. 199, there is illustrated an exemplary vehicle-based vehicle data collection process 19900. Process 19900 may be implemented in whole or in part in one or more of the vehicles disclosed herein. It shall be further appreciated that variations of and modifications to process 19900 are contemplated including, for example, the omission of one or more aspects of process 19900, the addition of further conditionals and operations, or the reorganization or separation of operations and conditionals into separate processes.

Process 19900 begins at operation 19901 including operating a vehicle including a cloud interface, a policy update circuit, and a trigger evaluation circuit. Process 19900 proceeds to operation 19903 where the vehicle interprets a data collection policy from a remote device, the data collection policy including a trigger evaluation data identifier configured to identify trigger evaluation data to be evaluated in response to a trigger condition. Process 19900 proceeds to operation 19905 where the vehicle determines a collection validation value in response to the identified trigger evaluation data and a vehicle data collection parameter. Process 19900 proceeds to operation 19907 where the trigger evaluation circuit receives the trigger condition in response to the collection validation value. Process 19900 proceeds to operation 19909 where the vehicle determines a trigger event occurrence in response to the trigger condition. Process 19900 proceeds to operation 19911 where the vehicle provides identified vehicle data in response to the trigger event occurrence, or an alert response value in response to the trigger event occurrence.

Figure 200:
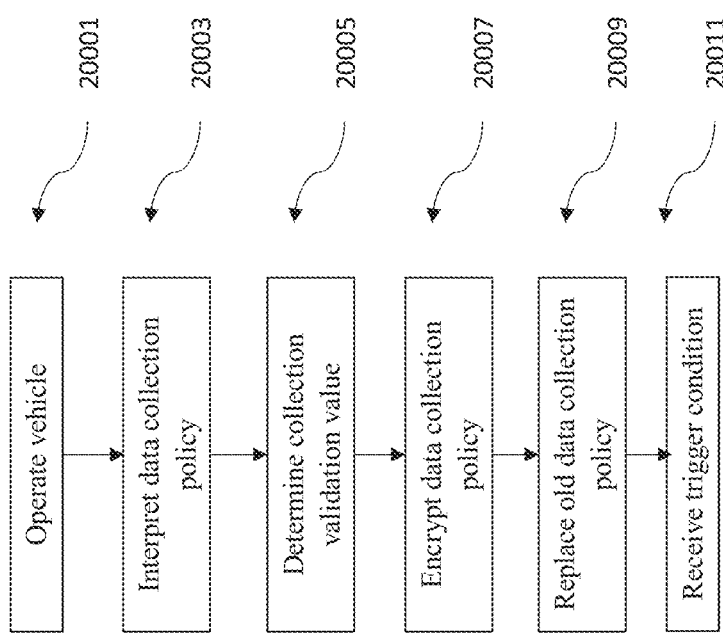

With reference to FIG. 200, there is illustrated an exemplary vehicle-based vehicle data collection process 20000. Process 20000 may be implemented in whole or in part in one or more of the vehicles disclosed herein. It shall be further appreciated that variations of and modifications to process 20000 are contemplated including, for example, the omission of one or more aspects of process 20000, the addition of further conditionals and operations, or the reorganization or separation of operations and conditionals into separate processes.

Process 20000 begins at operation 20001 including operating a vehicle including a cloud interface, a policy update circuit, a policy manager circuit, and a trigger evaluation circuit. Process 20000 proceeds to operation 20003 where the vehicle interprets a data collection policy from a remote device, the data collection policy including a trigger evaluation data identifier configured to identify trigger evaluation data to be evaluated in response to a trigger condition. Process 20000 proceeds to operation 20005 where the vehicle determines a collection validation value in response to the identified trigger evaluation data and a vehicle data collection parameter. Process 20000 proceeds to operation 20007 where a policy manager circuit encrypts the data collection policy. Process 20000 proceeds to operation 20009 where the policy manager circuit replaces a previous data collection policy with the data collection policy in response to collection validation value. Process 20000 proceeds to operation 20011 where the vehicle receives the trigger condition in response to the collection validation value.

With reference to FIG. 201, there is a block diagram illustrating an exemplary vehicle 20110 including a vehicle communication system 20120. The vehicle communication system is structured to receive a data collection policy 20105 from a remote device, such as a cloud device, and output at least one of an alert response value 20101 or identified vehicle data 20103 in response to data collection policy 20105. In certain embodiments, vehicle communication system 20120 is configured to simultaneously implement at least two of an on-demand data collection policy, a persistent data collection policy, and a streaming data collection policy. It shall be appreciated that the topology of vehicle communication system 20120 is illustrated for the purpose of explanation and is not intended as a limitation of the present disclosure. For example, vehicle communication system 20120 may include a plurality of data sources coupled to one of a plurality of end points by way of one of the plurality of data source networks. In another example, vehicle communication system 20120 may include a single end point or a single data source network, to name but a few examples.

Vehicle communication system 20120 includes a data collection controller 20121, an ethernet switch 20123, a plurality of end points 20125, a plurality of data source networks 20127, and a plurality of data sources 20129. Ethernet switch 20123 is communicatively coupled between data collection controller 20121 and the plurality of end points 20125. Each end point of the plurality of end points 20125 is communicatively coupled between ethernet switch 20123 and at least one of the plurality of data source networks 20127. Each data source of the plurality of data sources is communicatively coupled to an end point of the plurality of end points 20125 by way of a data source network of the plurality of data source networks 20127.

Data collection controller 20121 is configured to receive data collection policy 20105 and determine a set of data that must be collected from one or more data sources according to data collection parameters in order to evaluate trigger conditions of data collection policy 20105, referred to herein as trigger evaluation data. Data collection controller 20121 may also be configured to determine data to be collected from one or more data sources of the vehicle according to data collection parameters, at least a portion of which will be transmitted from the vehicle once at least one trigger condition of data collection policy 20105 is satisfied, referred to herein as identified vehicle data. Data collection controller 20121 is configured to output instructions or a portion of data collection policy 20105 effective to reconfigure ethernet switch 20123 and the plurality of end points 20125 to collect a raw vehicle data stream including a trigger evaluation data stream and an identified vehicle data stream. In certain embodiments, ethernet switch 20123 and the plurality of end points 20125 are reconfigured to collect the identified vehicle data stream after a trigger condition has been satisfied.

Ethernet switch 20123 is configured to receive data from the plurality of end points 20125 and output the data to data collection controller 20121. In certain embodiments, ethernet switch 20123 includes a data source from which to collect a value of the trigger evaluation data or the identified vehicle data. For example, trigger evaluation data may include network traffic data for ethernet switch 20123. In certain embodiments, data collection controller 20121 is incorporated into an electronic control unit of ethernet switch 20123.

The plurality of end points 20125 are configured to receive data from the plurality of data sources 20129. In certain embodiments, data collection controller 20121 reconfigures one or more of the plurality of end points to collect a portion of the trigger evaluation data stream or identified vehicle data stream. For example, data collection controller 20121 may provide an end point with a list of CAN signals required by the data collection controller 20121 for trigger evaluation data. The trigger evaluation data may need to include data from a data source that does not already output the required data, in which case the endpoint is reconfigured to request the data from the data source. The new data may include new CAN messages or CAN signals, to name but a few examples.

In another example, an end point may be reconfigured to request a data source output data according to a different data collection parameter, such as an increased frequency. Each end point may be configured to provide a raw vehicle data stream including the trigger evaluation data stream and the identified vehicle data stream in response to data collection policy 20201. In certain embodiments, the raw data stream transmitted from the end point includes only a portion of the data received by the end point. For example, an end point may be reconfigured to receive data from a data source having a high sampling frequency, filter the data, and output the raw vehicle data stream including the data having a reduced sampling frequency.

In certain embodiments, data collection policy 20105 includes trigger conditions requiring the same trigger evaluation data value collected from the same source at different frequencies. In response, an end point is configured to collect the trigger evaluation data value at the highest required frequency or at a frequency which is a multiple of one or more of the different frequencies. For example, one trigger condition may require vehicle speed at a frequency of two samples per second and a second trigger condition may require vehicle speed at a frequency of three samples per second. The end point may be configured to collect vehicle speed at 3 samples per second or six samples per second. It shall be appreciated that any or all of the foregoing features of vehicle 20110 may also be present in the other vehicles disclosed herein.

With reference to FIG. 202, there is illustrated an exemplary data collection controller 20210 of an exemplary vehicle communication system configured to receive a data collection policy 20201 and reconfigure the vehicle communication system, including the components of data collection controller 20210, to collect trigger evaluation data identified by data collection policy 20201. Data collection controller 20210 may also reconfigure the vehicle communication system, including the components of data collection controller 20210, to collect identified vehicle data identified by data collection policy 20201.

Controller 20210 includes a policy manager circuit 20211, a filtering circuit 20213, a vehicle data processing circuit 20215, a rotating buffer circuit 20217, a trigger evaluation circuit 20219, a data storage circuit 20221, a compression circuit 20223, an encryption circuit 20225, and a cloud interface 20227. In other embodiments, controller 20210 may include fewer components or more components.

Policy manager circuit 20211 is communicatively coupled to filtering circuit 20213, vehicle data processing circuit 20215, rotating buffer circuit 20217, trigger evaluation circuit 20219, data storage circuit 20221, compression circuit 20223, encryption circuit 20225, and cloud interface 20227. Policy manager circuit 20211 is configured to interpret data collection policy 20201, configured to identify trigger evaluation data, and may be configured to identify vehicle data. Policy manager circuit 20211 is further configured to parse data collection policy 20201 in order to reconfigure the components of data collection controller 20210 and the other components of the vehicle communication system to evaluate the trigger conditions of data collection policy 20201 and transmit at least one of identified vehicle data 20203 or alert response value 20205.

Filtering circuit 20213 interprets the raw vehicle data stream and is configured to determine the trigger evaluation data stream of the raw vehicle data stream in response to trigger evaluation data identifiers provided by policy manager circuit 20211. Filtering circuit 20213 may then provide the trigger evaluation data stream to vehicle data processing circuit 20215 or, in embodiments where data collection controller 20210 does not includes circuit 20215, to rotating buffer circuit 20217. Filtering circuit 20213 may also be configured to determine the identified vehicle data stream of the raw vehicle data stream in response to the vehicle data identifiers provided by policy manager circuit 20211. In certain embodiments, filtering circuit 20213 is configured to discard any remaining portion of the raw vehicle data stream that is not the trigger evaluation data or the identified vehicle data stream.

Vehicle data processing circuit 20215 is configured to preprocess the data filtered by filtering circuit 20213. In certain embodiments, vehicle data processing circuit 20215 is configured by policy manager circuit 20211 to sample the trigger evaluation data stream or identified vehicle data stream in response to a sampling parameter of data collection policy 20201. For example, vehicle data processing circuit 20215 may reduce a sampling frequency of a value of the trigger evaluation data stream where the sampling parameter of the data collection policy 20201 specifies a sampling frequency required for trigger condition evaluation that is less the sampling frequency received by vehicle data processing circuit 20215. In certain embodiments, vehicle data processing circuit 20215 is configured by policy manager circuit 20211 to normalize a trigger evaluation data value format or an identified vehicle data value format. For example, a value of the trigger evaluation data may be converted from miles per hour to meters per second, where the trigger evaluation data value format required by a trigger condition is meters per second. In certain embodiments, vehicle data processing circuit 20215 is configured to determine a trigger evaluation data aggregation parameter required to evaluate a trigger condition of data collection policy 20201. A data aggregation parameter may include an average, a sum, a minimum, a maximum, a mean, or a count of a value stream of the trigger evaluation data stream, to name but a few examples. In certain embodiments, vehicle data processing circuit 20215 is configured to determine an identified vehicle data aggregation parameter of identified vehicle data in response to collection policy 20201.

Rotating buffer circuit 20217 may be configured to store a rotating time window of the trigger evaluation data stream or identified vehicle data stream. Different values of the trigger evaluation data stream may be stored according to time windows of different sizes. The size of the time window for the trigger evaluation data stream is determined in response to a trigger condition. For example, if a trigger condition is satisfied when a peak vehicle speed during the previous two minutes exceeds a preset value, rotating buffer circuit 20217 will be configured by policy manager circuit 20211 to store a two minute time window of the vehicle speed value of the trigger evaluation data. The size of the time window for the identified vehicle data stream is determined in response to data collection policy 20201. For example, if data collection policy 20201 specifies image data is to be captured beginning thirty seconds before a trigger occurrence indicating a vehicle crash, rotating buffer circuit 20217 stores a thirty second time window of image data of the identified vehicle data stream.

Policy manager circuit 20211 is configured to provide the trigger evaluation circuit 20219 with trigger policies including one or more trigger conditions. Trigger evaluation circuit 20219 may be configured to determine a trigger event occurrence in response to evaluating the trigger condition using the first rotating time window. Trigger evaluation circuit 20219 is configured to evaluate a plurality of trigger conditions of the data collection policy simultaneously, and wherein trigger evaluation circuit 20219 is configured to determine the trigger event occurrence in response to a plurality of trigger conditions.

Vehicle data storage circuit 20221 may be configured to store identified vehicle data 20203 of the identified vehicle data stream in response to the trigger event occurrence and the data collection policy. Policy manager circuit 20211 may configure vehicle data storage circuit 20221 to store data based on a transmission parameter of the data collection policy 20201. For example, vehicle data storage circuit 20221 may store identified vehicle data if the transmission parameter indicates identified vehicle data should be transmitted from the vehicle periodically rather than streamed in real time.

In certain embodiments, vehicle data storage circuit 20221 discards stored data according to a priority defined by data collection policy 20105. For example, data may be discarded based on the age of the data, whether a receipt confirmation for the data has been received from the cloud device, or a change in memory space of data storage circuit 20221, to name but a few examples.

Compression circuit 20223 may be configured to compress the identified vehicle data to increase bandwidth efficiency. Encryption circuit 20225 may be configured to encrypt the identified vehicle data. Cloud interface 20227 may be configured to provide identified vehicle data 20203 of the identified vehicle data stream in response to a trigger event occurrence and transmission parameter value of the data collection policy 20201. Cloud interface 20227 may be configured to provide an alert response value 20205 in response to the trigger event occurrence. In certain embodiments, data will be uploaded to the cloud using HTTPS with ciphers defined by the HMC Cloud Security standard. Transmission may occur at a fixed interval or as soon as a trigger condition termination occurs, to name but a few examples.

It shall be appreciated that any or all of the foregoing features of data collection controller 20210 may also be present in the other vehicles disclosed herein.

With reference to FIG. 203, there is illustrated an exemplary vehicle data collection process 20300. Process 20300 may be implemented in whole or in part in one or more of the vehicle communication systems disclosed herein. It shall be further appreciated that variations of and modifications to process 20300 are contemplated including, for example, the omission of one or more aspects of process 20300, the addition of further conditionals and operations, or the reorganization or separation of operations and conditionals into separate processes.

Process 20300 begins at operation 20301 where a vehicle is operated, the vehicle including a vehicle communication system including a policy manager circuit and an endpoint. In certain embodiments, the vehicle communication system includes a data collection controller including at least one of the policy manager circuit, a filtering circuit, a vehicle data processing circuit, a rotating buffer circuit, a trigger evaluation circuit, a vehicle data storage circuit, a vehicle data compression circuit, a vehicle data encryption circuit, or a cloud interface.

Process 20300 proceeds to operation 20303 where the vehicle communication system interprets a data collection policy. In certain embodiments, operation 20303 includes interpreting, with the policy manager circuit, a data collection policy including a trigger condition, a vehicle data identifier configured to identify vehicle data to be captured in response to a trigger event occurrence, and a trigger evaluation data identifier configured to identify trigger evaluation data to be captured in response to the trigger condition.

Process 20300 proceeds to operation 20305 where the vehicle communication system provides a raw vehicle data stream, which includes a trigger evaluation data stream and may include an identified vehicle data stream, in response to the data collection policy.

Process 20300 proceeds to operation 20307 where the vehicle communication system filters the raw vehicle data stream. Operation 20307 may include determining, with the filtering circuit, the trigger evaluation data stream of the raw vehicle data stream in response to trigger evaluation data identifier. Operation 20307 may include determining, with the filtering circuit, the identified vehicle data stream in response to the vehicle data identifier.

Process 20300 proceeds to operation 20309 where the vehicle communication system preprocesses the trigger evaluation data stream. Operation 20309 may include at least one of: sampling the trigger evaluation data stream in response to a sampling parameter of the data collection policy, normalizing a trigger evaluation data value format, or determining a trigger evaluation data aggregation parameter in response to a plurality of trigger conditions of the data collection policy.

Process 20300 proceeds to operation 20311 where the vehicle communication system determines a time window of the trigger evaluation data stream. Operation 20311 may include determining, with the rotating buffer circuit, a rotating time window in response to the trigger condition. Operation 20311 may also include determining, with the rotating buffer circuit, a second rotating time window in response to the data collection policy.

Process 20300 proceeds to operation 20313 where the vehicle communication system stores the time window of the trigger evaluation data stream determined in operation 20311. Operation 20313 may include storing, with the rotating buffer circuit, the rotating time window of trigger evaluation data. Operation 20313 may also include storing a second rotating time window of the identified vehicle data stream in response to the data collection policy.

Process 20300 proceeds to operation 20315 where the vehicle communication system determines a trigger event occurrence. Operation 20315 may include determining, with the trigger evaluation circuit, a trigger event occurrence in response to evaluating the trigger condition using the rotating time window of trigger evaluation data stored with the rotating buffer circuit. In certain embodiments, the trigger evaluation circuit evaluates a plurality of trigger conditions of the data collection policy simultaneously determines the trigger event occurrence in response to evaluating a plurality of trigger conditions using the rotating time window.

Process 20300 proceeds to operation 20317 where the vehicle communication system determines a trigger event termination. Operation 20317 may include determining a trigger event termination in response to a trigger condition of the data collection policy.

Process 20300 proceeds to operation 20319 where the vehicle communication system stores identified vehicle data captured in response to at least one of the trigger event occurrence or the trigger event termination. Operation 20319 may include storing, with the vehicle data storage circuit, identified vehicle data of the identified vehicle data stream in response to the trigger event occurrence and the data collection policy. In certain embodiments, at least a portion of the identified vehicle data has occurred before the trigger event occurrence.

Process 20300 proceeds to operation 20321 where the vehicle communication system provides the identified vehicle data. Operation 20321 may include providing, with the cloud interface, identified vehicle data of the identified vehicle data stream in response to the trigger event occurrence and a transmission parameter value of the data collection policy. Operation 20321 may also include providing, with a cloud interface, an alert response value in response to the trigger event occurrence, wherein the alert response value includes at least one of an alert criterion, an alert type, an alert content, and an alert location. It shall be appreciated that any or all of the foregoing features of exemplary process 20300 may also be present in the other processes disclosed herein, such as the processes illustrated in FIGS. 204-205, to name but a few examples.

With reference to FIG. 204, there is illustrated an exemplary vehicle data collection process 20400. Process 20400 may be implemented in whole or in part in one or more of the vehicle communication systems disclosed herein. It shall be further appreciated that variations of and modifications to process 20400 are contemplated including, for example, the omission of one or more aspects of process 20400, the addition of further conditionals and operations, or the reorganization or separation of operations and conditionals into separate processes.

Process 20400 begins at operation 20401 where a vehicle is operated, the vehicle including a vehicle communication system including a policy manager circuit and an endpoint. In certain embodiments, the vehicle communication system includes a data collection controller including at least one of the policy manager circuit, a filtering circuit, a vehicle data processing circuit, a rotating buffer circuit, a trigger evaluation circuit, a vehicle data storage circuit, a vehicle data compression circuit, a vehicle data encryption circuit, or a cloud interface.

Process 20400 proceeds to operation 20403 where the vehicle communication system interprets a data collection policy. In certain embodiments, operation 20403 includes interpreting, with the policy manager circuit, a data collection policy including a trigger condition and a trigger evaluation data identifier configured to identify trigger evaluation data to be captured in response to the trigger condition.

Process 20400 proceeds to operation 20405 where the vehicle communication system provides a raw vehicle data stream, which includes a trigger evaluation data stream in response to the data collection policy.

Process 20400 proceeds to operation 20407 where the vehicle communication system filters the raw vehicle data stream. Operation 20407 may include determining, with the filtering circuit, the trigger evaluation data stream of the raw vehicle data stream in response to trigger evaluation data identifier.

Process 20400 proceeds to operation 20409 where the vehicle communication system preprocesses the raw vehicle data stream. Operation 20409 may include at least one of: sampling the trigger evaluation data stream in response to a sampling parameter of the data collection policy, normalizing a trigger evaluation data value format, or determining a trigger evaluation data aggregation parameter in response to a plurality of trigger conditions of the data collection policy.

Process 20400 proceeds to operation 20411 where the vehicle communication system determines a time window of the trigger evaluation data stream. Operation 20411 may include determining, with the rotating buffer circuit, one or more rotating time windows of the trigger evaluation data in response to the trigger condition.

Process 20400 proceeds to operation 20413 where the vehicle communication system stores the time window of the trigger evaluation data stream determined in operation 20411. Operation 20413 may include storing, with the rotating buffer circuit, the multiple time windows for multiple values of the trigger evaluation data stream.

Process 20400 proceeds to operation 20415 where the vehicle communication system determines a trigger event occurrence. Operation 20415 may include determining, with the trigger evaluation circuit, a trigger event occurrence in response to evaluating the trigger condition using the rotating time window of trigger evaluation data stored with the rotating buffer circuit. In certain embodiments, the trigger evaluation circuit evaluates a plurality of trigger conditions of the data collection policy simultaneously determines the trigger event occurrence in response to evaluating a plurality of trigger conditions using the rotating time window.

Process 20400 proceeds to operation 20417 where the vehicle communication system provides an alert response value in response to the trigger event occurrence, wherein the alert response value includes at least one of an alert criterion, an alert type, an alert content, and an alert location. It shall be appreciated that any or all of the foregoing features of exemplary process 20400 may also be present in the other processes disclosed herein, such as the processes illustrated in FIG. 203 or 205, to name but a few examples.

With reference to FIG. 205, there is illustrated an exemplary vehicle data collection process 20500. Process 20500 may be implemented in whole or in part in one or more of the vehicle communication systems disclosed herein. It shall be further appreciated that variations of and modifications to process 20500 are contemplated including, for example, the omission of one or more aspects of process 20500, the addition of further conditionals and operations, or the reorganization or separation of operations and conditionals into separate processes.

Process 20500 begins at operation 20501 where a vehicle is operated, the vehicle including a vehicle communication system including a policy manager circuit and an endpoint. In certain embodiments, the vehicle communication system includes a data collection controller including at least one of the policy manager circuit, a filtering circuit, a vehicle data processing circuit, a rotating buffer circuit, a trigger evaluation circuit, a vehicle data storage circuit, a vehicle data compression circuit, a vehicle data encryption circuit, or a cloud interface.

Process 20500 proceeds to operation 20503 where the vehicle communication system interprets a data collection policy. In certain embodiments, operation 20503 includes interpreting, with the policy manager circuit, a data collection policy including a trigger condition, a vehicle data identifier configured to identify vehicle data to be captured in response to a trigger event occurrence, and a trigger evaluation data identifier configured to identify trigger evaluation data to be captured in response to the trigger condition.

Process 20500 proceeds to operation 20505 where the vehicle communication system provides a raw vehicle data stream, which includes a trigger evaluation data stream and may include an identified vehicle data stream, in response to the data collection policy. It shall be appreciated that any or all of the foregoing features of exemplary process 20500 may also be present in the other processes disclosed herein, such as the processes illustrated in FIGS. 203-204, to name but a few examples.

With reference to FIG. 206, there is a block diagram illustrating an exemplary vehicle 20610 including a vehicle communication system 20620. The vehicle communication system is structured to receive a data collection policy 20601 from a remote device, such as a cloud device, and update the operation of vehicle communication system 20620 in response to data collection policy 20601. It shall be appreciated that the topology of vehicle communication system 20620 is illustrated for the purpose of explanation and is not intended as a limitation of the present disclosure. For example, vehicle communication system 20620 may include more or fewer end points, more or fewer data source networks, or more or fewer data sources, to name but a few examples.

Vehicle communication system 20620 includes data collection controller 20630, ethernet switch 20621, a plurality of end points 20623, a plurality of data source networks 20625, and a plurality of data sources 20627. Data collection controller 20630 may be configured to receive a data collection policy 20601 from a remote device, such as a cloud system, and capture vehicle data from data sources of the vehicle including the plurality of data sources 20627 in response to data collection policy 20601.

In the illustrated embodiment, data collection controller 20630 includes a policy manager circuit 20631 and a vehicle data interface 20633. In certain embodiments, data collection controller 20630 includes additional components, such as the components of the data collection controllers illustrated in FIGS. 202 and 207. It shall be appreciated that the components of data collection controller 20630 may include instructions, a memory device configured to store the instructions, and a processing device configured to execute the stored instructions effective to perform the operations attributed to the components of data collection controller 20630 described herein. In certain embodiments, one or more of the components of data collection controller 20630 may share a memory device or a processing device.

A processing device of data collection controller 20630 in different embodiments may be a programmable type, a dedicated, hardwired state machine, or a combination thereof. The processing device may further include multiple processors, Arithmetic-Logic Units (ALUs), Central Processing Units (CPUs), Digital Signal Processors (DSPs), Field-programmable Gate Array (FPGA), to name but a few examples. For forms of a processing device with multiple processing units, distributed, pipelined, or parallel processing may be used as appropriate. The processing device may be dedicated to performance of just the operations described herein or may be utilized in one or more additional applications. The processing device may be a programmable variety that executes processes and processes data in accordance with programming instructions (such as software or firmware) stored in a memory device of data collection controller 20630. Alternatively or additionally, programming instructions may be defined by hardwired logic or other hardware. The processing device may be comprised of one or more components of any type suitable to process the signals received from an input/output device, and provide desired output signals. Such processing device components may include digital circuitry, analog circuitry, or a combination of both.

A memory device of data collection controller 20630 in different embodiments is of one or more types, such as a solid-state variety, electromagnetic variety, optical variety, or a combination of these forms, to name but a few examples. Furthermore, the memory device may be volatile, nonvolatile, transitory, non-transitory or a combination of these types, and some or all of the memory device may be of a portable variety, such as a disk, tape, memory stick, cartridge, to name but a few examples. In addition, the memory device may store data that is manipulated by the processing device of data collection controller 20630, such as data representative of signals received from or sent to an input/output device in addition to or in lieu of storing programming instructions, just to name one example.

Policy manager circuit 20631 is configured to interpret data collection policy 20601. As described in detail above, data collection policy 20601 is configured to identify data required to be evaluated by trigger conditions and may be configured to identify vehicle data to be captured when the trigger conditions are satisfied. In certain embodiments, data collection policy 20601 includes a plurality of trigger evaluation data identifiers configured to identify trigger evaluation data to be evaluated by a plurality of trigger conditions of the data collection policy. In certain embodiments, data collection policy 20601 includes a plurality of vehicle data identifiers configured to identify vehicle data to be captured in response to trigger conditions specified by a trigger policy. The trigger evaluation data identifiers and vehicle data identifiers may correspond to a plurality of data types including at least two of a controller area network (CAN) message, a CAN signal, an ethernet packet, a vehicle location, a vehicle status, diagnostic trouble codes, an ethernet status, a file stored within the vehicle, or vehicle communication controller statistics, to name but a few examples.

In response to data collection policy 20601, policy manager circuit 20631 is configured to cause vehicle communication system 20620 to collect the data identified by data collection policy 20601 and transmit a raw vehicle data stream to data collection controller 20630. The raw vehicle data stream may include a trigger evaluation data stream and an identified vehicle data stream. In certain embodiments, the trigger evaluation data stream and identified vehicle data stream may include a common value of the raw vehicle data stream. In certain embodiments, the trigger evaluation data stream and identified vehicle data stream may include no common value of the raw vehicle data stream. Each value of the trigger evaluation data stream or identified vehicle data stream corresponds to data received from a data source of the vehicle according to data collection parameters specified by data collection policy 20601. The trigger evaluation data stream or the identified vehicle data stream may include a plurality of value streams from a plurality of data sources of vehicle 20610.

Vehicle data interface 20633 is configured to receive the raw vehicle data stream which includes the trigger evaluation data stream and may include the identified vehicle data stream.

Each end point of the plurality of end points 20623 may be configured to capture at least a portion of a trigger evaluation data stream in response to data collection policy 20601. In certain embodiments, more than one end point of the plurality of end points 20623 are configured to capture and output portions of the trigger evaluation data stream or the identified vehicle data stream. Each end point of the plurality of end points 20623 may be communicatively coupled to an ethernet switch 20621. In certain embodiments, one end point is communicatively coupled to more than one of the plurality of networks 20625 configured to communicate data sources using a plurality of communication protocols.

In certain embodiments, the trigger evaluation data stream or the identified vehicle data stream includes data from data sources configured to communicate with one end point using different communication protocols. For example, the trigger evaluation data stream received by an end point may include a CAN message from a CAN bus network and an ethernet packet received from another network communicatively coupled between the data source and the end point. In certain embodiments, the end point does not need to request a value of the trigger evaluation data stream or identified vehicle data stream because the data source is already providing the data. In certain embodiments, the end point, in response to data collection policy 20601, requests the trigger evaluation data stream value or the identified vehicle data stream value from a data source communicatively coupled to the end point. It shall be appreciated that any or all of the foregoing features of vehicle 20610 may also be present in the other vehicles disclosed herein.

With reference to FIG. 207, there is illustrated an exemplary vehicle 20700 including a data collection controller 20710. Data collection controller 20710 is configured to receive a raw vehicle data stream 20701 and output at least one of identified vehicle data 20703 or an alert response value 20705. It shall be appreciated that data collection controller 20710 may include components and features described herein with respect to other illustrated data collection controllers, such as data collection controller 20210 of FIG. 202.

The illustrated data collection controller 20710 includes a policy manager circuit 20711, a vehicle data interface 20713, a filtering circuit 20715, a vehicle data processing circuit 20717, a rotating buffer circuit 20719, a trigger evaluation circuit 20721, a data storage circuit 20723, a compression circuit 20725, an encryption circuit 20727, and a cloud interface 20729. In other embodiments, data collection controller 20710 may include more or fewer components.

Policy manager circuit 20711 may be configured to interpret a data collection policy including a vehicle data identifier and a trigger configured to define a trigger condition. The data collection policy may include a plurality of trigger types, the plurality of trigger types including a signal trigger, a vehicle status trigger, a timing trigger, a schedule trigger, a geofence trigger, an error trigger, an environment trigger, or a user input trigger. In certain embodiments, the plurality of trigger conditions of the plurality of triggers correspond to the same value of the trigger evaluation data.

In certain embodiments, the trigger evaluation data or identified vehicle data includes at least one of a vehicle state, a vehicle status, a vehicle operating mode, or a vehicle discrete event. In certain embodiments, the plurality of trigger evaluation data or the identified vehicle data corresponds to a plurality of data types, including at least two of a controller area network (CAN) message, a CAN signal, an ethernet packet, a vehicle location, a vehicle status, and a diagnostic trouble code. In certain embodiments, the trigger evaluation data or the identified vehicle data includes a virtual sensor value derived from a plurality of vehicle data values.

Filtering circuit 20715 may be configured to receive raw vehicle data stream 20701 from vehicle data interface 20713, determine a trigger evaluation data stream or identified vehicle data stream from raw vehicle data stream 20701, and output only the trigger evaluation data stream or identified vehicle data stream. In certain embodiments, filtering circuit 20715 discards the remaining portion of raw vehicle data stream 20701.

Vehicle data processing circuit 20717 may be configured to receive the trigger evaluation data stream or identified vehicle data stream, preprocess the received stream for either trigger evaluation circuit 20721 or cloud interface 20729, and output the received stream to rotating buffer circuit 20719.

Rotating buffer circuit 20719 is configured to store the time window of a value stream of the trigger evaluation data stream or identified vehicle data stream in response to the data collection policy. The size of the time window is based on the historical values of the value stream required by the data collection policy. For example, the time window of an engine temperature value stream may be five minutes if trigger condition corresponding to the value stream is satisfied when a threshold temperature is exceeded within the past five minutes. In another example, the time window of a vehicle speed value stream may be two minutes if the data collection policy specifies that two minutes of historical vehicle speed will be collected in response to a vehicle crash. Rotating buffer circuit 20719 may be configured to provide a time window of trigger evaluation data to trigger evaluation circuit 20721 while storing identified vehicle data until the trigger condition corresponding to the trigger evaluation data is satisfied. In certain embodiments, at least a portion of the trigger evaluation data is not stored by rotating buffer circuit 20719.

Trigger evaluation circuit 20721 is configured to determine a trigger event occurrence in response to a trigger condition and trigger evaluation data. In certain embodiments, trigger evaluation circuit 20721 determines the trigger event occurrence by evaluating the trigger evaluation data using the trigger condition, wherein the trigger condition defines a relationship with a preset value that may be satisfied or unsatisfied by the trigger evaluation data. For example, trigger evaluation circuit may determine a trigger occurrence if a trigger condition evaluating whether vehicle speed exceeds a threshold value is satisfied. In certain embodiments, trigger evaluation circuit 20721 determines a trigger event occurrence in response to a plurality of trigger conditions. For example, trigger evaluation circuit 20721 may determine a trigger event occurrence if a vehicle ignition is on and a warning CAN signal is being transmitted. In certain embodiments, trigger evaluation circuit 20721 determines the trigger event occurrence in response to at least two trigger conditions. In certain embodiments, determining the trigger event occurrence is based on a plurality of trigger conditions of different trigger types.

Trigger evaluation circuit 20721 is configured to determine a trigger event termination. Trigger evaluation circuit 20721 may determine the trigger event termination in response to a trigger condition or after a period of time following the trigger event occurrence. In certain embodiments, determining the trigger event termination includes determining a plurality of trigger conditions of different trigger types are satisfied.

Trigger evaluation circuit 20721 is configured to determine a data capture window in response to the trigger event occurrence, trigger event termination, and the data collection policy. The portion of the identified vehicle data stream generated during the data capture window is the identified vehicle data that will be transmitted from vehicle 20700. In certain embodiments, the data capture window may begin at the trigger event occurrence or end at the trigger event termination. In certain embodiments, the data capture window may begin before the trigger event occurrence or end after the trigger event termination. In certain embodiments, the data collection policy may specify identified vehicle data should be captured that occurred before the trigger event occurrence or after the trigger event termination. For example, the data collection policy may specify collecting thirty minutes of engine temperature values that were collected before an engine failure. In another example, the data collection policy may specify collecting data two seconds after trigger event termination to allow a measured value to stabilize before measurement following the trigger event termination.

Data storage circuit 20723 is configured to store identified vehicle data captured within the data capture window if the data collection policy specifies the identified vehicle data is to be stored before being transmitted. For example, the data collection policy may specify a transmission interval during which captured identified vehicle data is to be aggregated before transmitting. In another example, data storage circuit 20723 may not store identified vehicle data value within the data capture window where the data collection policy indicates the value is to be streamed from the vehicle in real time.

Compression circuit 20725 is configured to compress aggregated identified vehicle data before transmission to increase bandwidth efficiency. Encryption circuit 20727 is configured to encrypt the identified vehicle data to be transmitted from the vehicle. In certain embodiments, the identified vehicle data is encrypted using a key that is unavailable to the remote device that will receive and store the identified vehicle data.

Cloud interface 20729 is configured to provide at least one of identified vehicle data 20703 or an alert response value 20705 to a remote device, such as a cloud device. In certain embodiments, cloud interface 20729 may be configured to provide an alert response value 20705 directly to a user device.

Alert response value 20705 may include at least one of an alert criterion, an alert type, an alert content, and an alert location. The alert criterion may be configured to notify a user that a trigger condition has been satisfied or that a trigger event occurrence. An alert type may be configured to identify a notification medium, such as a text message or haptic feedback, to name but a few examples. An alert content may be configured to convey a notification to the user and may include a prompt for user response. An alert location may be configured to identify a location of the vehicle. It shall be appreciated that any or all of the foregoing features of vehicle 20700 may also be present in the other vehicles disclosed herein.

In one example, data collection controller 20710 may transmit an alert response value 20705 to notify a user a trigger event occurrence has occurred. In another example, data collection controller 20710 may send an alert response value 20705 to a specified device once a trigger event occurrence has occurred. In another example, data collection controller 20710 may send an alert response value 20705 to notify a user identified vehicle data 20703 has been captured and transmitted from the vehicle. In another example, data collection controller 20710 may send an alert response value 20705 in response to policy manager circuit 20711 determining a data collection policy or trigger policy is invalid. In another example, data collection controller 20710 may send an alert response value 20705 in response to policy manager circuit 20711 determining a data collection policy is valid, but the user is not yet authorized to receive the captured identified vehicle data. In another example, data collection controller 20710 may send an alert response value 20705 configured to provide a periodic summary of the data collection policy execution on the vehicle. In certain embodiments, data collection controller 20710 transmits identified vehicle data 20703 and/or alert response values 20705 to multiple external devices.

With reference to FIG. 208, there is illustrated an exemplary vehicle data collection process 20800. Process 20800 may be implemented in whole or in part in one or more of the vehicle communication systems disclosed herein. It shall be further appreciated that variations of and modifications to process 20800 are contemplated including, for example, the omission of one or more aspects of process 20800, the addition of further conditionals and operations, or the reorganization or separation of operations and conditionals into separate processes.

Process 20800 begins at operation 20801 including operating a vehicle including a policy manager circuit, an end point, and a vehicle data interface. Process 20800 proceeds to operation 20803 where the vehicle interprets a data collection policy including a trigger condition and a trigger evaluation data identifier. In certain embodiments, the data collection policy includes a plurality of trigger evaluation data identifiers configured to identify trigger evaluation to be evaluated by a plurality of trigger conditions of the data collection policy, wherein the trigger evaluation data identifiers correspond to a plurality of data types including at least two of a controller area network (CAN) message, a CAN signal, an ethernet packet, a vehicle location, a vehicle status, and a diagnostic trouble code.

Process 20800 proceeds to operation 20805 where the vehicle captures a trigger evaluation data stream in response to the trigger evaluation data identifier and the trigger condition. In certain embodiments, the vehicle includes a plurality of end points communicatively coupled to an ethernet switch and at least a portion of the plurality of end points capture a portion of the plurality of trigger evaluation data stream in response to the data collection policy. In certain embodiments, the end point is communicatively coupled to a plurality of networks configured to communicate using a plurality of communication protocols and the end point captures a plurality of trigger evaluation data streams from the plurality of networks in response to the data collection policy. In certain embodiments, capturing the trigger evaluation data stream includes receiving the trigger evaluation data stream from a data source communicatively coupled to the end point without requesting the trigger evaluation data, or requesting the trigger evaluation data stream from a data source communicatively coupled to the end point.

Process 20800 proceeds to operation 20805 where the vehicle data interface receives the trigger evaluation data stream. It shall be appreciated that any or all of the foregoing features of exemplary process 20800 may also be present in the other processes disclosed herein, such as the processes illustrated in FIG. 209 or 210, to name but a few examples.

With reference to FIG. 209, there is illustrated an exemplary vehicle data collection process 20900. Process 20900 may be implemented in whole or in part in one or more of the vehicle communication systems disclosed herein. It shall be further appreciated that variations of and modifications to process 20900 are contemplated including, for example, the omission of one or more aspects of process 20900, the addition of further conditionals and operations, or the reorganization or separation of operations and conditionals into separate processes.

Process 20900 begins at operation 20901 including operating a vehicle including a policy manager circuit and a trigger evaluation circuit. Process 20900 proceeds to operation 20903 where the vehicle interprets a data collection policy including a vehicle data identifier and a trigger configured to define a trigger condition. Process 20900 proceeds to operation 20905 where the vehicle determines a trigger event occurrence in response to a trigger condition and trigger evaluation data. Determining the trigger event occurrence may include evaluating the trigger evaluation data using the trigger condition, wherein the trigger condition defines a relationship with a present value that may be satisfied or unsatisfied by the trigger evaluation data. In certain embodiments, the vehicle determines the trigger event occurrence in response to at least two trigger conditions. In certain embodiments, determining the trigger event occurrence is based on evaluating multiple trigger conditions of different trigger types.

Process 20900 proceeds to operation 20907 where the vehicle determines a trigger event termination. Process 20900 proceeds to operation 20909 where the vehicle determines a data capture window in response to the trigger event occurrence, trigger event termination, and the data collection policy. Process 20900 proceeds to operation 20911 where the vehicle captures identified vehicle data in response to the data capture window and the vehicle data identifier. It shall be appreciated that any or all of the foregoing features of exemplary process 20900 may also be present in the other processes disclosed herein, such as the processes illustrated in FIG. 208 or 210, to name but a few examples.

With reference to FIG. 210, there is illustrated an exemplary vehicle data collection process 21000. Process 21000 may be implemented in whole or in part in one or more of the vehicle communication systems disclosed herein. It shall be further appreciated that variations of and modifications to process 21000 are contemplated including, for example, the omission of one or more aspects of process 21000, the addition of further conditionals and operations, or the reorganization or separation of operations and conditionals into separate processes.

Process 21000 begins at operation 21001 including operating a vehicle including a policy manager circuit, a rotating buffer circuit, a trigger evaluation circuit, a vehicle data storage circuit, and a cloud interface. Process 21000 proceeds to operation 21003 where the vehicle interprets a data collection policy including a vehicle data identifier and a trigger configured to define a trigger condition. Process 21000 proceeds to operation 21005 where the vehicle stores a time window of the identified vehicle data and a time window of the trigger evaluation data.

Process 21000 proceeds to operation 21007 where the vehicle determines a trigger event occurrence in response to a trigger condition and trigger evaluation data. Process 21000 proceeds to operation 21009 where the vehicle determines a trigger event termination. Process 21000 proceeds to operation 21011 where the vehicle determines a data capture window in response to the trigger event occurrence, trigger event termination, and the data collection policy. Process 21000 proceeds to operation 21013 where the vehicle captures identified vehicle data in response to the data capture window and the data collection policy. Process 21000 proceeds to operation 21015 where the vehicle stores identified vehicle data in response to the data capture window. In certain embodiments, at least a portion of the identified vehicle data occurs before the trigger event occurrence. Process 21000 proceeds to operation 21017 where the vehicle provides at least a portion of the identified vehicle data to a cloud system in response to the data collection policy. It shall be appreciated that any or all of the foregoing features of exemplary process 21000 may also be present in the other processes disclosed herein, such as the processes illustrated in FIG. 208 or 210, to name but a few examples.

An example embodiment of the present disclosure, utilizing one or more aspects as set forth preceding, includes an operation to download and store one or more new features, configurations, and/or content for a mobile application, which may be downloaded utilizing one or more of a cellular, WiFi, Bluetooth, hard wired, or other data connection, and/or which may be stored utilizing shared storage resources present on the mobile application. An example embodiment further includes receiving an approval from a user (e.g., operator, owner, fleet personnel, etc.), which may further include prompting the user for approval, and implementing the one or more new features, configurations, and/or content in response to the approval. An example embodiment further includes dynamically re-routing data collection and/or communication to implement the one or more new features, configurations, and/or content. Embodiments of the present disclosure include new features, configurations, and/or content such as, but not limited to: vehicle upgrades; implementation and/or upgrading of consumer features; changes to vehicle control set points, thresholds, and/or fault descriptions; changes to vehicle rating, classification, and/or utilization parameters; and/or changes to collected data, data collection triggers, automation triggers, and/or remote control triggers. Embodiments are described in the context of a vehicle after production and during utilization by an operator for convenience of illustration, but embodiments may be implemented at any point in a mobile application life cycle, including without limitation: during production (e.g., at a selected stage of the production, etc.); before a first sale of the mobile application (e.g., by an OEM, body builder, dealer, service department, etc.); in response to selected events of the mobile application (e.g., a refit; upgrade; change of application, usage, or duty cycle; a sale of the mobile application to another party; a recall or campaign event related to the mobile application; and/or a refurbishing or remanufacturing event of the mobile application or portions thereof).

An example embodiment of the present disclosure, utilizing one or more aspects as set forth preceding, includes communicative coupling to a charging station network (e.g., via WiFi, internet access, utilization of an application, and/or communications over a power coupling), and further includes allowing a user (e.g., operator, owner, fleet personnel, etc.) to review prices, begin or terminate charging, set charging parameters, monitor charging operations, review transaction parameters (e.g., cost, power transfer, logged data, etc.), and/or authorize payment. Example and non-limiting embodiments include interacting with the user through a user interface, such as a vehicle display, mobile device, web application, or the like. In certain further embodiments, operations include providing the user with additional information, such as: availability of alternative charging locations and/or related costs, availability, and/or capability; and/or charge status relative to a threshold such as a planned driving distance, battery management charge target, and/or planned operations for the mobile application mission.

An example embodiment of the present disclosure, utilizing one or more aspects as set forth preceding, includes detecting an incident (e.g., utilizing a shock sensor; a door actuator position; and/or other physical incident related determination; and/or utilizing an external communication such as an intrusion alarm from a home security system), and notifying a user (e.g., operator, owner, fleet personnel, etc.) about the incident. The notification of the incident may further include additional information, such as pictures, video clips, audio information, incident determination descriptions (e.g., sensor/actuator value indicating intrusion, and/or selected descriptions for these such as "door accessed without key," "hood opened improperly," "impact detected," etc.). The external information may be generated by devices related to the mobile application (e.g., cameras on the vehicle) and/or communicated to the mobile application (e.g., video provided by a security system). Additionally or alternatively, information can be streamed to a selected device, such as a mobile application, cloud server, web application, etc., associated with the user. Additionally or alternatively, information can be provided in response to a user request. In certain embodiments, information can be stored (e.g., on vehicle, in a shared network storage, communicated to a cloud server for storage, and/or streamed to another external device such as a home PC, security device, USB storage device, etc.), which may be performed automatically and/or upon a request from a user. In certain embodiments, external device provided data, such as security camera footage, security system status, or the like, may be provided to the user and/or stored, in response to the incident. For example, where an incident indicates a potential intrusion to the vehicle (e.g., a door opening event without a key access), vehicle camera data is stored and/or streamed to a user, and/or an external device is accessed (e.g., a home or parking garage security camera), and related data is streamed to the vehicle and/or user, and/or the vehicle requests that the corresponding data be stored for later access.

An example embodiment of the present disclosure, utilizing one or more aspects as set forth preceding, includes detecting that a geographic boundary has been crossed and/or is being approached (e.g., changing between states of a country, between countries, between relevant operating conditions such as city or rural conditions, altitude changes, road grade changes, etc.).

In certain further embodiments, one or more users (e.g., operator, owner, fleet personnel, etc.) are notified of the boundary change and/or approaching change, and a description of changes to operations (e.g., current values, thresholds, speed, audio volume, data collection changes, etc.) applied in response to the boundary change. Example and non-limiting embodiments include tracking and/or configuration of vehicle operations: by fleet managers, vehicle owners, and/or rental companies; by insurance companies (e.g., to determine risk and/or implement agreed risk management procedures with the owner/operator); to recover a stolen vehicle; by an implementing entity for a warranty related to the vehicle; and/or by parents or guardians of an operator. Example and non-limiting embodiments include: configuring a mobile application to be compliant with multiple jurisdictions and/or geographic conditions; configuring a mobile application to be compliant with data collection and/or privacy policies according to jurisdiction and/or location; and/or configuring a mobile application to modulate performance according to jurisdiction and/or geographic conditions.

An example embodiment of the present disclosure, utilizing one or more aspects as set forth preceding, includes determining a present operator of the mobile application (e.g., the current driver of a vehicle), determining preferences and/or characteristics of the present operator, and implementing operations of the mobile application in response to the driver preferences. For example, comfort, performance, entertainment, travel (e.g., routing, stop time scheduling, etc.), subscriptions, insurance, payment data, event triggers, notifications, etc., may have differences between a first driver and a second driver, due to driver preferences and/or other driver differences (e.g., age, permissions, ownership status, etc.), and the example embodiment includes implementing operations according to the present disclosure in response to the distinct preferences and differences between the drivers. An example embodiment of the present disclosure includes accessing driver preferences and/or characteristics (e.g., downloading from a cloud server and/or web application), and utilizing the driver preferences and/or characteristics in a second vehicle (e.g., a recently purchased vehicle, a rented vehicle, a shared vehicle, and/or a borrowed vehicle). The utilization of the driver preferences and/or characteristics in the second vehicle may include omitting the utilization of some values (e.g., setting a cruise control speed where a second vehicle does not have cruise control), and/or adjusting values according to characteristics of the second vehicle (e.g., where the second vehicle may have distinct capabilities, performance characteristics, and/or where the driver may have a different set of privileges and/or authorization with respect to the second vehicle). In certain embodiments, data associated with the driver may be removed from the second vehicle, such as when operations are completed, the vehicle is returned, the vehicle is sold, and/or when another driver operates the vehicle. In certain embodiments, data related to the driver may be uploaded for utilization by an external device (e.g., an application operating on as a web application, on a cloud server, etc.), by the first vehicle (e.g., tracking hours of operation or distance driven by the driver, learning algorithms utilizing driving data for the driver, etc.), and/or for download to a next vehicle (e.g., to allow for transfer of preferences to a newly purchased vehicle).

An example embodiment of the present disclosure, utilizing one or more aspects as set forth preceding, includes operations to customize operations of the mobile application based on user defined settings and actions, based on a range of inputs. Example customization operations to illustrate some of the customization options made available by aspects of the present disclosure include: voice activated commands that automate operations of any sensors or actuators of the present disclosure; a vocal "Spring is Here!" command, whereby embodiments of the present disclosure lowers a convertible top, adjusts HAC and seat heater settings to selected values, implement a selected music playlist, and adjusts audio volume to a selected value; a vocal "Spa mode" command, whereby embodiments of the present disclosure analyze heart rate of an operator from a connected wearable device, and adjusts vehicle lighting, audio volume (and/or audio content selection), climate control, seat heating and/or massage functions (e.g., to help the driver relax and focus on driving). Example customization operations are described in response to voice commands, although commands may be provided through any mechanism, including inputs on a mobile device, vehicle display, and/or may further include event-driven determinations as all or a part of a command (e.g., a seat adjustment to a selected range followed by a seat belt operation of the driver implements a particular audio, climate, and/or lighting scheme; a fuel filling event followed by a movement of the vehicle provides travel and fueling data to a third party application; a change in driver provides a separate fuel economy determination bucket, etc.).

An example data collection use case (e.g., reference FIG. 121 and the related description) includes a field support scenario and/or situation. For example, a field support team for a vehicle may receive a call and/or other notification that a vehicle is having an issue, e.g., the vehicle operator is sensing excessive vibrations on the steering wheel. The field support team may then transmit an on-demand policy to get selected data, e.g., data from various sensors affiliated with the vehicle's steering system. Upon receipt of the on-demand policy, one or more apparatuses, as described herein, may interpret the on-demand policy and begin transmitting, immediately or near immediately, the selected data to the field support team in accordance with the on-demand policy.

Another example data collection use case (e.g., reference FIG. 121 and the related description) includes a business team, that wishes to real-time monitor, e.g., via a real-time map, selected vehicles that have been driven. In embodiments, the business team may construct a streaming policy intended for continuous execution. The streaming policy may then be pushed out to the selected vehicles, in turn, causing one or more apparatuses onboard those vehicles, as described herein, to transmit vehicle location data. The vehicle location data may be transmitted back to the business team in real-time, or near real-time. If a selected vehicle is unable to transmit its location data, and/or if the selected vehicle's location data is lost in transmission to the business team, e.g., the selected vehicle is in a location with poor cellular coverage, the selected vehicle may continue to attempt to transmit its location data so that its location data will be received by the business team once the selected vehicle is able to transmit again. In embodiments, the streaming policy may also cause the selected vehicles to report back information concerning "how" the vehicle is being driven, e.g., speed, braking, acceleration, etc. and/or other data regarding a driver's operation of the vehicle.

Another example data collection use case (e.g., reference FIG. 121 and the related description) includes a research and development team that wishes to monitor and/or verify the performance of a new product, e.g., a new vehicle, vehicle accessory, vehicle component, infotainment application, etc. The research and development team may have a significant and/or extended period of time to verify and/or determine the performance of the new product. As such, the research and development team may create a policy that is pushed out to selected vehicles associated with the new product wherein the policy causes the selected vehicle to transmit data regarding the new product back to the research and development team. In embodiments, the policy may call for the data regarding the new product to be transmitted to the research and development team on a daily, weekly, monthly, and/or other periodic basis.

Another example data collection use case (e.g., reference FIG. 121 and the related description) includes the tracking of common vehicle parameters for a selected group of vehicles for a manufacturer. For example, the manufacturer may wish to support certain features on the selected vehicles, provide historic data regarding the selected vehicles to their respective drivers (and/or owners), detect abnormal occurrences regarding the selected vehicles, and/or use the vehicle parameters to monitor corresponding warranties.

Another example data collection use case (e.g., reference FIG. 121 and the related description) includes using data collected from a vehicle to predict future maintenance requirements of the vehicle (e.g., reference FIG. 121 and the related description). For example, embodiments of the disclosure may track various properties of a vehicle such as wear on wheel bearings, oil level and/or age, coolant level and/or age, etc., which in turn may be used by onboard and/or offboard apparatuses, as described herein, to predict when a vehicle needs to be serviced, e.g., an oil change.

Another example data collection use case (e.g., reference FIG. 121 and the related description) includes initially capturing vehicle data after the occurrence of an event/issue of which the vehicle owner, service provider, manufacturer, etc., is not aware. For example, an engine may experience timing sequence issues on a magnitude unnoticeable to the driver of the vehicle. Embodiments of the disclosure may capture data related to the event/issue and store it onboard and/or offboard the vehicle so that the captured data can be accessed and reviewed at a later time by the vehicle owner, service provider, manufacturer, etc. Upon reviewing the data, the vehicle owner, service provider, manufacturer, etc., may notice discrepancies in the captured data that may make them aware of the event/issue and/or provide for them to diagnose the event/issue and/or take corrective action.

Another example data collection use case (e.g., reference FIG. 121 and the related description) includes identifying features of a vehicle used often and/or the most by occupants of the vehicle so that a dealership can promote the identified features.

Another example data collection use case (e.g., reference FIG. 121 and the related description) includes using the captured vehicle data for insurance monitoring purposes. For example, data regarding a driver's behavior, e.g., acceleration, braking, speed, etc., may be directly transmitted from the vehicle to a company (or other entity) that insures the vehicle and/or the driver. In embodiments, such monitoring may require driver and/or owner consent.

Another example data collection use case (e.g., reference FIG. 121 and the related description) includes monitoring of various aspects/parameters/properties, e.g., battery and/or charging systems, of the vehicle. Such monitoring may provide for the detection of trends concerning the vehicle components and/or systems corresponding to the collected data.

Another example data collection use case (e.g., reference FIG. 121 and the related description) includes monitoring data for vehicle fleet concerns. For example, embodiments of the disclosure may provide for the operator of a commercial fleet of vehicles to see trends and/or patterns regarding the vehicles within the fleet. Embodiments of the disclosure may also provide for the operator of a commercial fleet of vehicles to detect if a particular vehicle is generating data outside of the trends and/or patterns.

Another example data collection use case (e.g., reference FIG. 131 and the related description) includes using triggers based on time, e.g., triggers that are related to calendar dates and/or events.

Another example data collection use case (e.g., reference FIG. 131 and the related description) includes using triggers based on signals, e.g., vehicle parameters related to speed, air bag deployment, etc.

Another example data collection use case (e.g., reference FIG. 131 and the related description) includes using triggers based on errors, e.g., detected faults. Embodiments may also use triggers based on comparisons of values, e.g., comparing vehicle speed to vehicle location, for example, determining that a vehicle is exceeding a known speed limit for a particular section of road.

Another example data collection use case (e.g., reference FIG. 131 and the related description) includes using triggers based on location. For example, a trigger may initiate capture of vehicle data when the vehicle enters and/or leaves a geographic region, i.e., geo-fencing, etc.

Another example data collection use case (e.g., reference FIG. 131 and the related description) includes using triggers based on external data, e.g., data from outside a vehicle such as temperature/environment and/or data received from a signal sent to the vehicle from an external source.

Another example data collection use case (e.g., reference FIG. 131 and the related description) includes using triggers that may be effected as an immediate user response for data collection. For example, a user may press a button and/or other actuator which turns on a recording feature of a camera. Embodiments also provide for a user to initiate capture of other types of vehicle data. For example, a user may detect abnormal sounds coming from a wheel and/or the engine and subsequently press a button and/or other actuator that initiates collection of vehicle data corresponding to the wheel and/or engine.

Another example data collection use case (e.g., reference FIG. 131 and the related description) includes using, in an autonomous vehicle, triggers based on detection that the vehicle has made a sharp turn, braked harshly, and/or other types of events that may be of interest. Embodiments of the disclosure may also use "virtual sensors" for detection of events that serve as triggers for data collection.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Network and/or communication resources include, without limitation, local area network, wide area network, wireless, internet, or any other known communication resources and protocols. Example and non-limiting hardware and/or computing devices include, without limitation, a general purpose computer, a server, an embedded computer, a mobile device, a virtual machine, and/or an emulated computing device. A computing device may be a distributed resource included as an aspect of several devices, included as an interoperable set of resources to perform described functions of the computing device, such that the distributed resources function together to perform the operations of the computing device. In certain embodiments, each computing device may be on separate hardware, and/or one or more hardware devices may include aspects of more than one computing device, for example as separately executable instructions stored on the device, and/or as logically partitioned aspects of a set of executable instructions, with some aspects comprising a part of one of a first computing device, and some aspects comprising a part of another of the computing devices.

A computing device may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, and the like. Additionally, this coupling and/or connection may facilitate remote execution of instructions across the network. The networking of some or all of these devices may facilitate parallel processing of program code, instructions, and/or programs at one or more locations without deviating from the scope of the disclosure. In addition, all the devices attached to the server through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods, program code, instructions, and/or programs may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, program code, instructions, and/or programs as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of methods, program code, instructions, and/or programs across the network. The networking of some or all of these devices may facilitate parallel processing of methods, program code, instructions, and/or programs at one or more locations without deviating from the scope of the disclosure. In addition, all the devices attached to the client through an interface may include at least one storage medium capable of storing methods, program code, instructions, and/or programs. A central repository may provide program instructions to be executed on different devices. In this implementation, the remote repository may act as a storage medium for methods, program code, instructions, and/or programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules, and/or components as known in the art. The computing and/or non-computing device(s) associated with the network infrastructure may include, apart from other components, a storage medium such as flash memory, buffer, stack, RAM, ROM and the like. The methods, program code, instructions, and/or programs described herein and elsewhere may be executed by one or more of the network infrastructural elements.

The methods, program code, instructions, and/or programs described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, program code, instructions, and/or programs described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute methods, program code, instructions, and/or programs stored thereon. Alternatively, the mobile devices may be configured to execute instructions in collaboration with other devices. The mobile devices may communicate with base stations interfaced with servers and configured to execute methods, program code, instructions, and/or programs. The mobile devices may communicate on a peer to peer network, mesh network, or other communications network. The methods, program code, instructions, and/or programs may be stored on the storage medium associated with the server and executed by a computing device embedded within the server. The base station may include a computing device and a storage medium. The storage device may store methods, program code, instructions, and/or programs executed by the computing devices associated with the base station.

The methods, program code, instructions, and/or programs may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and computer readable instructions, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

What is claimed is:

1. An apparatus comprising:
a parameter acquisition circuit structured to interpret a plurality of vehicle parameter values;
a parameter conditioning circuit structured to condition the plurality of vehicle parameter values for storage in one or more cache devices, and determine a storage location value; and
a parameter storage circuit structured to store the conditioned plurality of vehicle parameter values in the one or more cache devices, and in response to the storage location value, store:
a first portion of the conditioned plurality of vehicle parameter values on a first cache device of the one or more cache devices, and
a second portion of the conditioned plurality of vehicle parameter values on a second cache device of the one or more cache devices;
wherein the first cache device is disposed onboard a vehicle and the second cache device is disposed offboard the vehicle.

2. The apparatus of claim 1, wherein at least one of the one or more cache devices comprises a non-volatile memory.

3. The apparatus of claim 2, wherein the parameter storage circuit is further structured to store the conditioned plurality of vehicle parameter values in the non-volatile memory in response to a data communication limitation.

4. The apparatus of claim 1, wherein:
the parameter conditioning circuit is further structured to determine a storage location value;

the parameter storage circuit is further structured to store the conditioned plurality of vehicle parameter values in response to the storage location value; and the one or more cache devices are disposed onboard a vehicle.

5. The apparatus of claim 4, wherein each of the one or more cache devices disposed onboard the vehicle is associated with a controller that is distinct from controllers associated with the other of the one or more cache devices.

6. The apparatus of claim 1, wherein:

the parameter conditioning circuit is further structured to determine a storage location value;

the parameter storage circuit is further structured to store the conditioned plurality of vehicle parameter values in response to the storage location value; and the one or more cache devices are disposed offboard a vehicle.

7. The apparatus of claim 6, wherein the one or more cache devices are based at least in part on a network cloud-based storage system.

8. The apparatus of claim 1, wherein the parameter conditioning circuit is further structured to generate an expiration value for the plurality of vehicle parameter values structured to trigger a selective expiration of the plurality of vehicle parameter values in the one or more cache devices.

9. The apparatus of claim 8, wherein the parameter storage circuit is further structured to transmit the expiration value to the one or more cache devices.

10. The apparatus of claim 8, wherein the parameter storage circuit is further structured to selectively expire the plurality of vehicle parameter values responsive to the expiration value.

11. The apparatus of claim 8, wherein the expiration value is a time value corresponding to a period of time to store the plurality of vehicle parameter values in the one or more cache devices.

12. The apparatus of claim 8 further comprising:

a policy acquisition circuit structured to interpret a vehicle policy data value comprising at least a portion of a vehicle policy;

wherein the parameter conditioning circuit is further structured to generate the expiration value responsive to the vehicle policy data value.

13. The apparatus of claim 8, wherein the parameter conditioning circuit is further structured to:

determine a type value of the plurality of vehicle parameter values; and generate the expiration value responsive to the type value.

14. The apparatus of claim 13, wherein the type value corresponds to at least one of:

engine data;
control data;
mission critical data;
motive status data; or
motive operational data.

15. The apparatus of claim 13, wherein the type value corresponds to at least one of:

a vehicle state value;
a vehicle mode value;
a diagnostic value; or
a fault value.

16. The apparatus of claim 1, wherein the parameter conditioning circuit is further structured to condition the plurality of vehicle parameter values via compressing the plurality of vehicle parameter values.

17. The apparatus of claim 1, wherein the parameter conditioning circuit is further structured to condition the plurality of vehicle parameter values via summarizing the plurality of vehicle parameter values.

18. A method comprising:

interpreting a plurality of vehicle parameter values;

conditioning the plurality of vehicle parameter values for storage in one or more cache devices;

storing the conditioned plurality of vehicle parameter values in the one or more cache devices; and determining a storage location value;

wherein storing the conditioned plurality of vehicle parameter values is responsive to the storage location value and comprises:

storing a first portion of the conditioned plurality of vehicle parameter values on a first cache device of the one or more cache devices; and storing a second portion of the conditioned plurality of vehicle parameter values on a second cache device of the one or more cache devices;

wherein the first cache device is disposed onboard a vehicle and the second cache device is disposed offboard the vehicle.

19. The method of claim 18, wherein at least one of the one or more cache devices comprises a non-volatile memory and the method further comprises:

selecting to store at least a portion of the conditioned plurality of vehicle parameter values in the non-volatile memory.

20. The method of claim 19, wherein selecting to store the at least a portion of the conditioned plurality of vehicle parameter values in the non-volatile memory is in response to a data communication limitation.

21. The method of claim 18 further comprising:

determining a storage location value;

wherein:

storing the conditioned plurality of vehicle parameter values is responsive to the storage location value; and the one or more cache devices are disposed onboard a vehicle.

22. The method of claim 18 further comprising:

determining a storage location value;

wherein:

storing the conditioned plurality of vehicle parameter values is responsive to the storage location value; and the one or more cache devices are disposed offboard a vehicle.

23. The method of claim 18 further comprising:

generating an expiration value for the plurality of vehicle parameter values structured to trigger a selective expiration of the plurality of vehicle parameter values in the one or more cache devices; and transmitting the expiration value to the one or more cache devices.

24. The method of claim 23 further comprising:

selectively expiring the plurality of vehicle parameter values responsive to the expiration value.

25. The method of claim 23 further comprising:

interpreting a vehicle policy data value comprising at least a portion of a vehicle policy;

wherein generating the expiration value for the plurality of vehicle parameter values is responsive to the vehicle policy data value.

26. The method of claim 23 further comprising:

determining a type value of the plurality of vehicle parameter values;

wherein generating the expiration value for the plurality of vehicle parameter values is responsive to the type value.

27. The method of claim 18, wherein conditioning the plurality of vehicle parameter values comprises at least one of:
   compressing the plurality of vehicle parameter values; or
   summarizing the plurality of vehicle parameter values.

* * * * *